US007406425B1

(12) United States Patent
Frank et al.

(10) Patent No.: US 7,406,425 B1
(45) Date of Patent: Jul. 29, 2008

(54) SYSTEM AND METHOD FOR MANAGING INTELLECTUAL PROPERTY LIFE CYCLES

(75) Inventors: Scott M. Frank, Dunwoody, GA (US); Carol T. Beckham, Marietta, GA (US); Martin L. McLendon, Tucker, GA (US); Shannon M. Short, Atlanta, GA (US); Michael Bishop, Atlanta, GA (US); Maia Y. Sharpley, New York, NY (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 0 days.

(21) Appl. No.: 09/946,593

(22) Filed: Sep. 6, 2001

Related U.S. Application Data

(63) Continuation of application No. 09/750,136, filed on Dec. 29, 2000, now abandoned.

(60) Provisional application No. 60/173,919, filed on Dec. 30, 1999, provisional application No. 60/192,862, filed on Mar. 29, 2000.

(51) Int. Cl.
*G06Q 99/00* (2006.01)

(52) U.S. Cl. .......................................... 705/1; 705/10

(58) Field of Classification Search .................... 705/1, 705/10

See application file for complete search history.

(56) References Cited

U.S. PATENT DOCUMENTS

| | | | | |
|---|---|---|---|---|
| 5,208,765 | A | 5/1993 | Turnbull | |
| 5,526,257 | A * | 6/1996 | Lerner | 705/10 |
| 5,917,912 | A * | 6/1999 | Ginter et al. | 713/187 |
| 5,991,751 | A * | 11/1999 | Rivette et al. | 707/1 |
| 6,044,354 | A | 3/2000 | Asplen, Jr. | |
| 6,049,811 | A * | 4/2000 | Petruzzi et al. | 707/507 |
| 6,061,660 | A | 5/2000 | Eggleston et al. | |
| 6,236,977 | B1 * | 5/2001 | Verba et al. | 705/10 |
| 6,289,341 | B1 * | 9/2001 | Barney | 707/10 |
| 6,298,327 | B1 * | 10/2001 | Hunter et al. | 705/1 |
| 6,321,983 | B1 * | 11/2001 | Katayanagi et al. | 235/375 |
| 6,345,239 | B1 * | 2/2002 | Bowman-Amuah | 703/6 |
| 6,389,538 | B1 * | 5/2002 | Gruse et al. | 713/194 |
| 6,542,871 | B1 * | 4/2003 | Harshaw | 705/7 |
| 2001/0010041 | A1 * | 7/2001 | Harshaw | 705/10 |
| 2001/0018178 | A1 * | 8/2001 | Siefert | 434/322 |
| 2001/0032189 | A1 | 10/2001 | Powell | |

(Continued)

FOREIGN PATENT DOCUMENTS

| | | |
|---|---|---|
| WO | WO 01/24035 | 4/2001 |

OTHER PUBLICATIONS

"Electronic Intellectual Property Management System," Morris et al., WIPO-PCT, International Publication No. WO 01/08031 A2, Publication Date: Feb. 1, 2001.*

(Continued)

*Primary Examiner*—Jonathan Ouellette
(74) *Attorney, Agent, or Firm*—Thomas, Kayden, Horstemeyer & Risley LLP

(57) ABSTRACT

The present invention relates to methods and systems for managing intellectual property assets. In an embodiment, an intellectual property protection life cycle of an intellectual property asset is managed, and an intellectual property marketing life cycle of the intellectual property asset is managed.

57 Claims, 223 Drawing Sheets

U.S. PATENT DOCUMENTS

| | | | | |
|---|---|---|---|---|
| 2002/0032659 | A1 | 3/2002 | Waters | |
| 2002/0077835 | A1* | 6/2002 | Hagelin | 705/1 |
| 2002/0178120 | A1 | 11/2002 | Reid et al. | |
| 2003/0171949 | A1 | 9/2003 | Degnan et al. | |
| 2004/0220881 | A1 | 11/2004 | Powell | |

OTHER PUBLICATIONS

Berkowitz, Leonard "Getting the most from your patents," Research-Technology Management, v32n2, pp. 26-31, Mar./Apr. 1993.*
Hufker, Tim, "Patents: A managerial perspective," Journal of Product & Brand Management, v3n4, pp. 44-54, 1994.*
Murray, Kathleen, "HR takes steps to protect trade secrets," Personnel Journal, v73n6, pp. 98-109, Jun. 1994.*
Wineburg, Arthur, "Managing intellectual property—An international capital asset," Commercial Law Journal, v99n3, pp. 366-383, Fall 1994.*
Kempner, Richard; Sampson, Ian, "Many a slip," Managing Intellectual Property, v7n42, pp. 15-26, Sep. 1994.*
Kimmerling, George, "A Licensing Primer for Trainers," Training & Development, v51n1, pp. 30-35, Jan. 1997.*
Bjorner, Susan N.; Patent and Trademark Databases: Intellectual Property for the Masses (includes related article) (Focus: Intellectual Property); Link -Up, v9n4, pp. 14 (total 5 pages), Jul.-Aug. 1992.
Iandiorio, Joseph S.; Patents and Copyrights: Protecting Intellectual Property, Microwave Journal, v35n4, pp. 30-37 (total 7 pages), Apr. 1991.
DICTIONARY.COM, Intellectual Property Definition, printed May 24, 2005.
Frank; Notice of Allowance and Fees Due mailed Oct. 19, 2007; U.S. Appl. No. 10/188,209 filed Jul. 3, 2002 .
Frank; Non- Final Rejection mailed Sep. 3, 2004; U.S. Appl. No. 09/750,130 filed Dec. 29, 2000.
Frank; Examiner Interview Summary Record mailed May 26, 2005; U.S. Appl. No. 09/750,130 filed Dec. 29, 2000.
Frank; Examiner Interview Summary Record mailed Feb. 7, 2006; U.S. Appl. No. 09/750,130 filed Dec. 29, 2000.
Frank; Notice of Allowance and Fees Due mailed Feb. 7, 2006; U.S. Appl. No. 09/750,130 filed Dec. 29, 2000.
Frank; Notice of Allowance and Fees Due mailed Aug. 18, 2006; U.S. Appl. No. 09/750,130 filed Dec. 29, 2000.
www.3m.com/us/office/pastpresent/history_t1.html; "The Evolution of the Post-it Notes" printed Apr. 16, 2007, 2 pages.
Frank; U.S. Appl. No. 10/188,209 filed Jul. 3, 2002.
Frank; U.S. Appl. No. 09/750,154 filed Dec. 29, 2000.
Frank; U.S. Appl. No. 09/946,457 filed Sep. 6, 2001.
Frank; U.S. Appl. No. 11/290,203 filed Nov. 30, 2005.
Frank; U.S. Appl. No. 11/446,091 filed Jun. 2, 2006.
Frank; U.S. Appl. No. 09/750,001 filed Dec. 29, 2000.
Frank; U.S. Appl. No. 11/290,226 filed Nov. 30, 2005.
Frank; U.S. Appl. No. 11/289,859 filed Nov. 30, 2005.
Frank; U.S. Appl. No. 09/750,130 filed Dec. 29, 2000.
Frank; U.S. Appl. No. 10/004,497 filed Dec. 6, 2001.
Frank; U.S. Appl. No. 09/750,000 filed Dec. 29, 2000.
Frank; U.S. Appl. No. 09/750,136 filed Dec. 29, 2000.
Frank; U.S. Appl. No. 11/290,231 filed Nov. 30, 2005.
Frank; U.S. Appl. No. 09/750,012 filed Dec. 29, 2000.
Frank; Non-Final Rejection mailed Sep. 10, 2004; U.S. Appl. No. 09/750,154 filed Dec. 29, 2000.
Frank; Examiner Interview Summary Record mailed Jun. 8, 2005; U.S. Appl. No. 09/750,154 filed Dec. 29, 2000.
Frank; Final Rejection mailed Jun. 8, 2005; U.S. Appl. No. 09/750,154 filed Dec. 29, 2000.
Frank; Examiner Interview Summary Record mailed Jan. 31, 2006; U.S. Appl. No. 09/750,154 filed Dec. 29, 2000.
Frank; Non- Final Rejection mailed Jan. 31, 2006; U.S. Appl. No. 09/750,154 filed Dec. 29, 2000.
Frank; Examiner Interview Summary Record mailed Aug. 7, 2006; U.S. Appl. No. 09/750,154 filed Dec. 29, 2000.
Frank; Non-Final Rejection mailed Aug. 7, 2006; U.S. Appl. No. 09/750,154 filed Dec. 29, 2000.
Frank; Examiner Interview Summary Record mailed May 8, 2007; U.S. Appl. No. 09/750,154 filed Dec. 29, 2000.
Frank; Notice of Allowance and Fees Due mailed May 8, 2007; U.S. Appl. No. 09/750,154 filed Dec. 29, 2000.
Frank; Examiner Interview Summary mailed Aug. 17, 2007; U.S. Appl. No. 09/750,154 filed Dec. 29, 2000.
Frank; Non- Final Rejection mailed Sep. 9, 2004; U.S. Appl. No. 09/946,457 filed Sep. 6, 2001.
Frank; Final Rejection mailed Feb. 2, 2006; U.S. Appl. No. 09/946,457 filed Sep. 6, 2001.
Frank; Examiner Interview Summary Record mailed Aug. 7, 2006; U.S. Appl. No. 09/946,457 filed Sep. 6, 2001.
Frank; Non- Final Rejection mailed Aug. 7, 2006; U.S. Appl. No. 09/946,457 filed Sep. 6, 2001.
Frank; Examiner Interview Summary Record mailed May 4, 2007; U.S. Appl. No. 09/946,457 filed Sep. 6, 2001.
Frank; Notice of Allowance and Fees Due mailed May 4, 2007; U.S. Appl. No. 09/946,457 filed Sep. 6, 2001.
Frank; Non-Final Rejection mailed Sep. 26, 2007; U.S. Appl. No. 11/290,203 filed Nov. 30, 2005.
Frank; Non-Final Rejection mailed Sep. 21, 2004; U.S. Appl. No. 09/750,001 filed Dec. 29, 2000.
Frank; Final Rejection mailed May 31, 2005; U.S. Appl. No. 09/750,001 filed Dec. 29, 2000.
Frank; Examiner Interview Record Summary mailed Jan. 27, 2006; U.S. Appl. No. 09/750,001 filed Dec. 29, 2000.
Frank; Non- Final Rejection mailed Jan. 27, 2006; U.S. Appl. No. 09/750,001 filed Dec. 29, 2000.
Frank; Examiner Interview Record Summary mailed Sug. 7, 2006; U.S. Appl. No. 09/750,001 filed Dec. 29, 2000.
Frank; Non-Final Rejection mailed Aug. 7, 2006; U.S. Appl. No. 09/750,001 filed Dec. 29, 2000.
Frank; Examiner Interview Summary Record mailed May 7, 2007; U.S. Appl. No. 09/750,001 filed Dec. 29, 2000.
Frank; Final Rejection mailed May 7, 2007; U.S. Appl. No. 09/750,001 filed Dec. 29, 2000.
Frank; Non-Final Rejection mailed Sep. 26, 2007; U.S. Appl. No. 09/750,001 filed Dec. 29, 2000.
Frank; Non- Final Rejection mailed Sep. 26, 2007; U.S. Appl. No. 11/289,859 filed Nov. 30, 2005.
Frank; Non-Final Rejection mailed Sep. 10, 2004; U.S. Appl. No. 10/188,209 filed Jul. 3, 2002.
Frank; Examiner Interview Summary Record mailed Jun. 8, 2005; U.S. Appl. No. 10/188,209 filed Jul. 3, 2002.
Frank; Final Rejection mailed Jun. 8, 2005; U.S. Appl. No. 10/188,209 filed Jul. 3, 2002.
Frank; Non- Final Rejection mailed Jan. 31, 2006; U.S. Appl. No. 10/188,209 filed Jul. 3, 2002.
Frank; Examiner Interview Summary Record mailed Aug. 8, 2006; U.S. Appl. No. 10/188,209 filed Jul. 3, 2002.
Frank; Non-Final Rejection mailed Aug. 8, 2006; U.S. Appl. No. 10/188,209 filed Jul. 3, 2002.
Frank; Examiner Interview Summary Record mailed Apr. 18, 2007; U.S. Appl. No. 10/188,209 filed Jul. 3, 2002.
Frank; Final Rejection mailed Apr. 18, 2007; U.S. Appl. No. 10/188,209 filed Jul. 3, 2002.

* cited by examiner

Continuous Intellectual Property Process

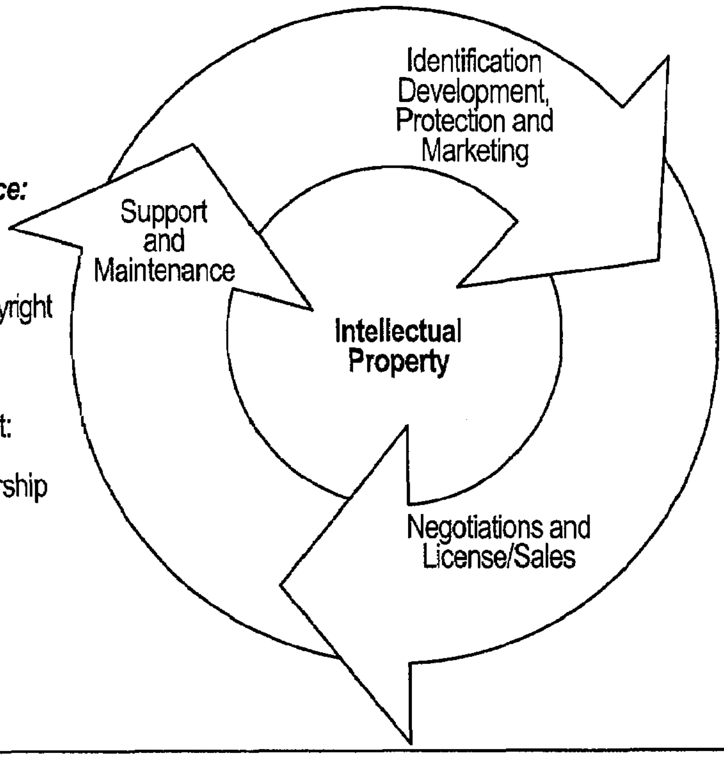

*I. Identification, Development, Protection and Marketing:*

- Identification:
  - Identify new intellectual property (inventions, technology, ideas, brands)
  - Identify potential marketing opportunities
- Development:
  - Develop inventions, technology, ideas for IP protection
  - Develop marketing sales channels
- Protection:
  - Protect IP with patents, copyrights, trade secrets, trademarks
  - Protect with Non-Disclosure Agreements
- Marketing:
  - Market & competitive analysis
  - Financial analysis

*II. Negotiations and License/Sales:*

- IP Negotiations (e.g., with customers, government agencies)
- License/Sales Initiation
  - Contact vendors
  - Contact end users
- Contract development, negotiation and completion

*III. Support and Maintenance:*

- Internal reward and recognition programs
- IP protection and policing:
  - Patent, trademark , copyright trade secret, portfolio management
  - Policing IP
- Relationship Management:
  - Internal Entities
  - External Sales Partnership and End Users
- Royalty Management
- Quality Standards Management October 1999

IP Protection Life Cycle

Continuous IP Process: Support | Identification, Development and Protection | Negotiations and Sales | Maintenance

| | Innovation Identification (L0) | Innovation Development (L1) | IP Protection Initiation (L2) | IP Protection Pending (L3) | IP Registration (L4) | IP Maintenance (L5) |
|---|---|---|---|---|---|---|
| Effort Spent: | • 1-2 hours/product | • 1-2 hours<br>• 3-5 hours<br>• 1-2 hours | • 3-5 hours/patent<br>3-5 hours/trademark<br>1 hour/copyright | • 3-5 hours/patent<br>4-6 hours/trademark<br>1 hours/copyright | • 3-5hours/patent<br>1-2 hours/trademark<br>1 hours/copyright | • 1-2 hours |
| Time Elapsed (per level): | • 1-5 days | • 1-5 days | • 3-5 months/patent<br>1-5 days/trademark<br>1/5 days/copyright | • 18-24 months/patent<br>6-12 mos/trademark<br>2-3 months/copyright | • 1-5 days/patent<br>1-5 days/trademark<br>1-5 days/copyright | • 1 day + periodic |
| Time Elapsed (total): | • <1 week | • 1-2 weeks | • 4-6 months/patent<br>1-3 mos/trademark<br>3-4 weeks/copyright | • 22-3 months/patent<br>12-18 mos/trademark<br>3-4 months/copyright | • 2-2.5 years/patent<br>1-3.5 yrs/trademark<br>3-4 months/copyright | • 20 years/patent<br>5-10 years/trademark<br>10 years/copyright |

Note: Trade secrets need not be registered, but reasonable steps must be taken to keep secret, including proper markings and use of Non-Disclosure Agreements.

| | L0 | L1 | L2 | L3 | L4 | L5 |
|---|---|---|---|---|---|---|
| IP Protection Activities: | • Internal awareness and education<br>• Internal relationship building<br>• Identify protection opportunities<br>• Identify type of protection(s) needed<br>• Catalog and qualify opportunities<br>• Notification to IP Marketing for marketing<br>• IP Protection team member assigned | • Further educate innovation generator on information needed for IP protection<br>• Assist innovation generator in getting innovation to point for protection with IP<br>• Assist IP Marketing with technical understanding<br>• Disclosure form received<br>• Clearance Searches | • Assess disclosure form<br>• Notification to IP Protection legal<br>• Verify disclosure award received (if any)<br>• Follow up with innovation generator and legal<br>• Application filed | • Verify filing award received (if any)<br>• Assist innovation generator with issues relating to using innovation while IP protection pending<br>• Follow up with legal regarding status<br>• Review written documents from government agency where application filed & assist in response | • Assist in notification to innovation generator<br>• Assist innovation generator in marking innovation with registration information<br>• Assist innovation generator in understanding extent of IP protection<br>• Verify registration | • Verify issuance award received (if any)<br>• Record all relevant IP information<br>• Internal follow up<br>• IP policing |
| Measures: | • Innovations identified (#/types)<br>• Quality of innovations | • # Disclosures<br>• Innovation Attributes known and cataloged | • # Applications filed<br>• Quality of applications | • Proper innovation usage during IP<br>• Pendency | • # Registration<br>• Proper markings | • IP attributes cataloged |

October 1999

IP Marketing Life Cycle

| Continuous IP Process: | Support | Identification, Development and Protection | | Negotiations and Sales | | Maintenance |
|---|---|---|---|---|---|---|
| | Potential Opportunity Identification (L0) | Initial Research in Progress (L1) | Awaiting Execution of Pre-Transaction Report (L2) | Negotiations w/External Party in Progress (L3) | Awaiting Execution Agreement/ Transaction Report (L4) | Closed Deal Maintenance (L5) |
| Effort Spent:<br>Time Elapsed (per level):<br>Time Elapsed (total): | • 1-5 days<br>• 1-2 hours/product<br>• <1 week | • 7-10 days<br>• 5-10 hours/product<br>• 1-2 weeks | • 7-10 days<br>• 5-10 hours/deal<br>• 2-3 weeks | • 1-5 months<br>• 10-50 hours/deal<br>• 2-6 months | • 7-10 days<br>• 1-2 hours/deal<br>• 2-6 months | • 1 day + ongoing<br>• 1-2 hours/deal +<br>• 2-6 months |
| IP Protection Activities: | • Internal awareness and education<br>• Internal relationship building<br>• Identify potential marketing opportunities<br>• Catalog and qualify potential opportunities<br>• Notification to IP Protection for disclosure<br>• IP Marketing team member assigned | • Begin market research<br>• Follow-up interview with SME<br>• Begin product scorecard research<br>• Access competitive environment<br>• Initial valuation of product<br>• Prioritize product within portfolio<br>• Make Go-No Go decision<br>• Begin to get internal buy-in<br>• Draft & submit PTR | • Conduct in-dept interview with SME & Continue to build relationship<br>• Begin channel strategy<br>• Continue competitive research and valuation of product<br>• Initiate contact with chosen sales partners/ end users<br>• Utilize NDAs<br>• Protect IP prior to disclosing (when possible) | • Continue product valuation, market research, & channel strategy<br>• Create product overview presentation (external)<br>• Determine structure & pricing of deal<br>• Begin and complete negotiations/ contracts<br>• Draft & submit Transaction Report | • Finalize fine points of contract<br>• Manage technical and logistic issues of product | • Sign contracts<br>• Record all relevant product information<br>• Record all relevant deal information<br>• Track royalties<br>• Sales partner/ end user relationship management<br>• Internal followup<br>• Quality standards management<br>• IP policing |
| Measures: | • Products identified<br>• Quality of products | • Product attributes known & cataloged | • PTR for all deals | • Accuracy of valuations<br>• Terms of deals<br>• # times contract reworked | • TR for all deals | • Revenues<br>• % licensed with patent protection<br>• Deal attributes cataloged |

October 1999

*Fig. 3*

| | PRODUCT | B/U | LEAD | L1 | L2 | L3 | L4 | L5 | L6 | L7 | L8 | L9 | L10 | GOAL | $ | % |
|---|---|---|---|---|---|---|---|---|---|---|---|---|---|---|---|---|
| 1 | PROD A | BU B | X | | | | | | 42 | | | | | 2001 | 3.5M | 0.5 |
| 2 | PROD B | BU C | Z | | | | | | | | | | 45 | 4Q 00 | 1M | 0.9 |
| 3 | PROD C | BU A | Z | | | | 35 | | | | | | | 4Q 00 | 3.5M | 0.25 |
| 4 | PROD D | BU A | Y | | | | | 35 | | | | | | 4Q 00 | 3.5M+ | 0.5 |
| 5 | PROD E | BU D | X | | | | | 35 | | | | | | 4Q 00 | 3.5M | 0.5 |
| 6 | PROD F | BU E | W | | | | | 35 | | | | | | | | |
| 7 | PROD G | BU D | W | | 35 | | | | | | | | | | | |
| 8 | PROD H | BU C | X | | | | | 35 | | | | | | 2001 | 500K | |
| 9 | PROD I | BU E | Z | | | | | | 35 | | | | | 2001 | | |
| 10 | PROD J | BU E | X | | | | | 40 | | | | | | 2001 | 5M | 0.33 |
| 11 | PROD K | BU B | W | | | | | | | | 47 | | | 2001 | 6M | 0.9 |
| 12 | PROD L | BU D | Y | 31X | | | | | | | | | | — | — | — |
| 13 | PROD M | BU B | Y | | | | | 35 | | | | | | | | |
| 14 | PROD N | BU A | W | | | | 38 | | | | | | | 2001 | | |
| 15 | PROD O | BU C | Y | 36X | | | | | | | | | | — | — | — |
| | | | | INITIAL RESEARCH | MARKET RESEARCH | PTR APPROVAL | MARKET PLAN | SELL | NEGOTIATE | TR APPROVAL | EXECUTE CONTRACT | SETUP CONTRACT | AUDIT CONTRACT | | | |

*Fig. 15*

| | PRODUCT | B/U | LEAD | L1 | L2 | L3 | L4 | L5 | L6 | L7 | L8 | L9 | L10 | GOAL | $ | % |
|---|---|---|---|---|---|---|---|---|---|---|---|---|---|---|---|---|
| 1 | PROD F | BU E | W | | | | | | | | | | | | | |
| 2 | PROD G | BU D | W | | 35 | | | | | | | | | | | |
| 3 | PROD K | BU B | W | | | | | | | | 47 | | | 2001 | 6M | 0.9 |
| 4 | PROD N | BU A | W | | | | 38 | | | | | | | 2001 | | |
| 5 | PROD A | BU B | X | | | | | | 42 | | | | | 2001 | 3.5M | 0.5 |
| 6 | PROD E | BU D | X | | | | | 35 | | | | | | 4Q 00 | 3.5M | 0.05 |
| 7 | PROD H | BU C | X | | | | | 35 | | | | | | 2001 | 500K | |
| 8 | PROD J | BU E | X | | | | | 40 | | | | | | 2001 | 5M | 0.33 |
| 9 | PROD D | BU A | Y | | | | | 35 | | | | | | 4Q 00 | 3.5M+ | 0.5 |
| 10 | PROD L | BU D | Y | 31X | | | | | | | | | | — | — | — |
| 11 | PROD M | BU B | Y | | | | | 35 | | | | | | | | |
| 12 | PROD O | BU C | Y | 36X | | | | | | | | | | — | — | — |
| 13 | PROD B | BU C | Z | | | | | | | | | | 45 | 4Q 00 | 1M | 0.9 |
| 14 | PROD C | BU A | Z | | | | 35 | | | | | | | 4Q 00 | 3.5M | 0.25 |
| 15 | PROD I | BU E | Z | | | | | | 35 | | | | | 2001 | | |
| | | | | INITIAL RESEARCH | MARKET RESEARCH | PTR APPROVAL | MARKET PLAN | SELL | NEGOTIATE | TR APPROVAL | EXECUTE CONTRACT | SETUP CONTRACT | AUDIT CONTRACT | | | |

*Fig. 16*

| | PRODUCT | B/U | LEAD | L1 | L2 | L3 | L4 | L5 | L6 | L7 | L8 | L9 | L10 | GOAL | $ | % |
|---|---|---|---|---|---|---|---|---|---|---|---|---|---|---|---|---|
| 1 | PROD B | BU C | Z | | | | | | | | | | 45 | 4Q 00 | 1M | 0.9 |
| 2 | PROD K | BU B | W | | | | | | | | 47 | | | 2001 | 6M | 0.9 |
| 3 | PROD A | BU B | X | | | | | | 42 | | | | | 2001 | 3.5M | 0.5 |
| 4 | PROD I | BU E | Z | | | | 38 | | 35 | | | | | 2001 | | |
| 5 | PROD D | BU A | Y | | | | | 35 | | | | | | 4Q 00 | 3.5M+ | 0.5 |
| 6 | PROD E | BU D | X | | | | | 35 | | | | | | 4Q 00 | 3.5M | 0.05 |
| 7 | PROD F | BU E | W | | | | | 35 | | | | | | | | |
| 8 | PROD H | BU C | X | | | | | 35 | | | | | | 2001 | 500K | |
| 9 | PROD M | BU B | Y | | | | | 35 | | | | | | | | |
| 10 | PROD J | BU E | X | | | | | 35 | | | | | | 2001 | 5M | 0.33 |
| 11 | PROD C | BU A | Z | | | | 35 | 40 | | | | | | 4Q 00 | 3.5M | 0.25 |
| 12 | PROD N | BU A | W | | | | 38 | | | | | | | 2001 | | |
| 13 | PROD G | BU D | W | | 35 | | | | | | | | | | | |
| 14 | PROD L | BU D | Y | 31X | | | | | | | | | | — | — | — |
| 15 | PROD O | BU C | Y | 36X | | | | | 35 | | | | | — | — | — |
| | | | | INITIAL RESEARCH | MARKET RESEARCH | PTR APPROVAL | MARKET PLAN | SELL | NEGOTIATE | TR APPROVAL | EXECUTE CONTRACT | SETUP CONTRACT | AUDIT CONTRACT | | | |

*Fig. 17*

| Intellectual Property Development, Marketing and Maintenance Database System | | |
|---|---|---|
| **IP Marketing Database - Tables** | | |
| **Table** | | **Description** |
| Companies | | Table of companies |
| Marketing Opps | | Table of IP marketing opportunties |
| **IP Marketing Database - Companies Table** | | |
| **Field Name** | **Data Type** | **Description** |
| Formal Name | Text | Mailstop |
| **IP Marketing Database - Marketing Opps Table** | | |
| **Field Name** | **Data Type** | **Description** |
| Opp # | AutoNumber | |
| Status | Text | |
| Estimated Mktg Date | Date/Time | |
| Product/Project Name | Text | |
| Product Group | Text | |
| Product Type | Text | |
| Type of IP Involved | Text | |
| BellSouth Entity | Text | |
| BellSouth Contacts | Memo | |
| BIPMAN Contact1 | Text | |
| BIPMAN Contact2 | Text | |
| BIPMAN Contact3 | Text | |
| BIPMAN Contact4 | Text | |
| Mktg Participant Name | Text | |
| Mktg Participant Address1 | Text | |
| Mktg Participant Address 2 | Text | |
| Mktg Participant City, State | Text | |
| Mktg Participant Contacts | Memo | |
| Mktg Participant Type | Text | |
| Deal Size | Text | |
| Estimated Deal Range | Text | |
| Estimated Deal Value | Text | |
| Priority | Text | |
| Description of Opportunity | Memo | |
| Background of Deal | Memo | |
| Financial Analysis | Memo | |
| Competitive Analysis | Memo | |
| Status of Deal | Memo | |
| Anticipated Timelines | Memo | |
| Pre-Trans Approval Person | Text | |
| Pre-Trans BellSouth Co | Text | |
| Title of Pre-Trans Approver | Text | |
| Date Pre-Trans Approved | Date/Time | |
| Final Bus Approval Person | Text | |
| Final Bus Approver's BellSouth | Text | |
| Title of Final Bus Approver | Text | |
| Data Final Bus Approved | Date/Time | |
| Final Legal Approval Person | Text | |
| Final legal Approver's BellSouth | Text | |
| Title of Legal Bus Approver | Text | |

Fig. 21

| | | |
|---|---|---|
| Date Legal Bus Approved | Date/Time | |
| Follow-Up Date | Date/Time | |
| Follow-Up Needed | Memo | |
| Patent Status | Text | |
| IT Platform | Memo | |
| Level 1 Date | Date/Time | |
| Level 1 Date | Date/Time | |
| Level 1 Date | Date/Time | |
| Level 1 Date | Date/Time | |
| Level 1 Date | Date/Time | |
| Sub-entity | Text | |
| Top25 | Yes/No | |

IP Marketing Database - Queries

| Queries | | Description |
|---|---|---|
| CoAlphaSort | | |
| Level 0 WIP Report | | |
| Level 1 WIP Report | | |
| Level 2 WIP Report | | |
| Level 3 WIP Report | | |
| Level 4 WIP Report | | |
| Level 5 WIP Report | | |
| Marketing Opps Query | | |
| Most Recent New Deals | | |
| Opportunity Summaries - Specify 1 Entity Only | | |
| Report by Entity-Specify 1 Entity Only | | |
| Top 25 Report | | |

IP Marketing Database - Forms

| Forms | | Description |
|---|---|---|
| Marketing Opps | | |

IP Marketing Database - Reports

| Reports | | Description |
|---|---|---|
| Deal Overview by Vendor | | |
| Level 0 WIP Report | | |
| Level 1 WIP Report | | |
| Level 2 WIP Report | | |
| Level 3 WIP Report | | |
| Level 4 WIP Report | | |
| Level 5 WIP Report | | |
| Most Recent New Deals | | |
| Opportunity Summaries - Al l | | |
| Opportunity Summaries - Specify 1 Entity Only | | |
| Report by Entity - All | | |
| Report by Entity - Specify 1 Entity Only | | |
| Sales Funnel by Status | | |
| Sales Funnel Tracking by Date | | |
| Top Deals Report | | |

Fig. 22

| Contract Tracking Database - Tables | | |
|---|---|---|
| **Tables** | | **Description** |
| Agreement Types | | |
| Companies | | |
| Contracts Listing | | |

| Contract Tracking Database - Agreement Types Table | | |
|---|---|---|
| **Field Name** | **Data Type** | **Description** |
| ID | | |
| Agreement Types | | |
| Description | | |

| Contract Tracking Database - Agreement Types Table | | |
|---|---|---|
| **Field Name** | **Data Type** | **Description** |
| ID | | |
| Field1 | | |

| Contract Tracking Database - Contracts Listing Table | | |
|---|---|---|
| **Field Name** | **Data Type** | **Description** |
| ID | AutoNumber | |
| First Party | Text | |
| Second Party | Text | |
| Third Party | Text | |
| Effective Date | Date/Time | |
| Termination or Renewal Date | Date/Time | |
| Termination/Renewal Terms | Memo | |
| Confidentiality Period? | Text | |
| Executed Copy on File? | Text | |
| Location of Original | Text | |
| Additional Comments | Memo | |
| Agreement Type | Text | |
| Executed Contract Image | Hyperlink | Link to scanned image of signed original agreement |
| Other Document Image | Hyperlink | Link to scanned image of signed original agreement |
| Transaction Report Image | Hyperlink | Link to scanned image of signed original agreement |
| Affiliate Involved | Text | |
| Transaction Type | Text | |
| Types of IP Involved | Text | |
| Freqency of payment | Text | |
| Payment/Royalty Due Date | Date/Time | |
| Additional Payment Terms | Text | |
| Amount Due | Text | |
| 1999 YTD Payments | Currency | |
| 2000 YTD Payments | Currency | |
| 2001 YTD Payments | Currency | |
| 2002 YTD Payments | Currency | |
| 2003 YTD Payments | Currency | |
| IP Typc 1 | Text | |
| IP Type 2 | Text | |
| IP Type 3 | Text | |
| IP Type 4 | Text | |
| IP Type 5 | Text | |
| Project Name | Text | |

| Contract Tracking Database - Queries | | |
|---|---|---|
| **Queries** | | **Description** |

*Fig. 23*

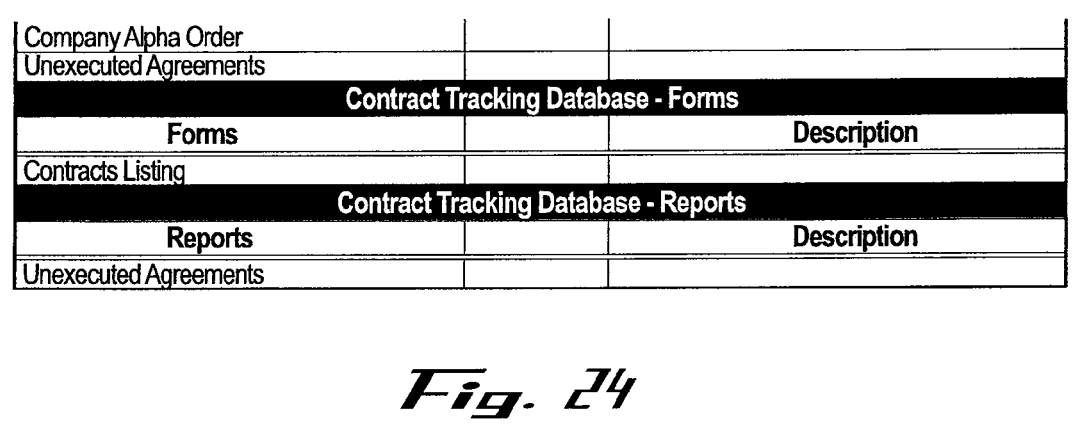

| | | |
|---|---|---|
| Company Alpha Order | | |
| Unexecuted Agreements | | |
| **Contract Tracking Database - Forms** | | |
| **Forms** | | **Description** |
| Contracts Listing | | |
| **Contract Tracking Database - Reports** | | |
| **Reports** | | **Description** |
| Unexecuted Agreements | | |

Fig. 24

| Innovation Awards Database - Tables | | |
|---|---|---|
| **Tables** | | **Description** |
| Awards | | |
| Company Addresses | | |
| ESP Coordinators | | |
| IP Coordinators | | |

| Innovation Awards Database - Awards Table | | |
|---|---|---|
| **Field Name** | **Data Type** | **Description** |
| Key # | AutoNumber | Unique Key |
| Award # | Text | Award ID# |
| LegalCaseNo | Text | Legal Dept. Case No |
| Greeting | Text | Mr., Ms., Dr. etc. |
| FullName | Text | Recipient's Full Name |
| CompanyName | Text | Company Name |
| BusAdr1 | Text | Mailstop |
| BusAdr2 | Text | Street Address |
| City | Text | City |
| State | Text | State |
| ZipCode | Text | Zip |
| Phone# | Text | Business Phone |
| FAX# | Text | Business FAX |
| IP ID# | Text | Name of IP Coordinator |
| SupvGreetings | Text | Mr., Ms., Dr. etc. |
| SupervisorName | Text | Supervisor's Name |
| SupvBusAdr1 | Text | Supervisor's Mailstop |
| SupvBusAdr2 | Text | Supervisor's Street Address |
| SupvCity | Text | Supervisor's City |
| CupvState | Text | Supervisor's State |
| SupvZipCode | Text | Supervisor's Zip |
| DHGreeting | Text | Mr., Ms., Dr. etc. |
| DeptHead | Text | Name of Department Head |
| DHBusAdr1 | Text | Department Head Mailstop |
| DHBusAdr2 | Text | Department Head Street Address |
| DGCity | Text | Department Head City |
| DHState | Text | Department Head State |
| DHZipCode | Text | Department Head Zip |
| Disclosure Received by Legal | Text | Date Disclosure Received by Legal |
| Disclosure Received by BIPMAN | Text | Date Disclosure Received by BIPMAN |
| Letter & Gift Sent to Inventor | Date/Time | Date Letter and Gift Sent to Inventor |
| Date Application Filed | Date/Time | Date Application Filed |
| Date BIPMAN Notified of Filing | Date/Time | Date BIPMAN Notified by Legal |
| Filing Award Request sent to IPC | Date/Time | Date Payment Request Sent to IP Coordinator |
| Filing Awd Payment Conf Rec'd | Date/Time | Confirmation of Payment to Inventors Rec'd |
| Filing Award Recognized at Luncheon | Date/Time | Date Award was Recognized at Inn. Awds. Banquet |
| Date Application Issued | Date/Time | Date Application Issued |
| US Patent Number | Text | US Patent Number |
| Date BIPMAN Notified of Filing | Date/Time | Date BIPMAN Notified by Legal |
| Issuance Award Request sent to IPC | Date/Time | Date Payment Request Sent to IP Coordinator |
| Iss Awd Payment Conf Rec'd | Date/Time | Confirmation of Payment to Inventors Rec'd |
| Iss Award Recognized at Luncheon | Date/Time | Date Award was Recognized at Inn. Awds. Banquet |
| Date 5th Patent Issued | Date/Time | Date Application Issued |
| US Patent Numbers | Text | US PATENT Numbers for 5 Issued Patents |

Fig. 25

| | | |
|---|---|---|
| Date BIPMAN Notified of Inv Ach Awd | Date/Time | Date BIPMAN Notified by Legal |
| Inv Ach Award Request sent to IPC | Date/Time | Date Payment Request Sent to IP Coordinator |
| Inv Ach Awd Payment Conf Rec'd | Date/Time | Confirmation of Payment to Inventors Rec'd |
| Inv Ach Award Recognized at Luncheon | Date/Time | Date Award was Recognized at Inn. Awds. Banquet |
| Date General Award Appl Rec'd | Date/Time | Date Application Filed |
| General Award Request sent to IPC | Date/Time | Date Payment Request Sent to IP Coordinator |
| General Awd Payment Conf Rec'd | Date/Time | Confirmation of Payment to Inventors Rec'd |
| General Award Recognized at Luncheon | Date/Time | Date Award was Recognized at Inn. Awds. Banquet |
| Date Article Published | Date/Time | Date Application Filed |
| Date BIPMAN Notified of Publication | Date/Time | Date BIPMAN Notified by Legal |
| Rec'd Request for Release Form | Date/Time | Req. for Release Form Rec'd |
| Publicaton Award Request sent to IPC | Date/Time | Date Payment Request Sent to IP Coordinator |
| Confirmation of Paymnet Rec'd | Date/Time | Confirmation of Payment to Inventors Rec'd |
| Publ Award Recognized at Luncheon | Date/Time | Date Award was Recognized at Inn. Awds. Banquet |
| General Notes | Memo | Comments |
| Award Type | Text | Type of Award |
| Gift Received | Text | Gift Sent to Inventor |
| Disclosure Title | Memo | Title of Patent Disclosure |
| Application Title | Memo | Title of Patent Application |
| Patent Title | Memo | Title of Issued Patent |
| Publication Title | Memo | Title of Published Article |
| General Award Title | Memo | Reason for General Award |
| $ Amount of General Awrd | Text | $ Amount of General Award |
| BellSouth Employee | Text | Still with BellSouth? |
| DHTitle | Text | Department Head's Title |
| BSCC ESP Disclosure | Text | Designates if disclosure was rec'd thru BSCC ESP Program |
| ESP Coordinator | Text | Esp Coordinator's Name |

Innovation Awards Database - Company Addresses Table

| Field Name | Data Type | Description |
|---|---|---|
| CompanyName | Text | |
| FormalName | Text | |
| BusAdr2 | Text | |
| City | Text | |
| State | Text | |
| ZipCode | Text | |

Innovation Awards Database - ESP Coordinators Table

| Field Name | Data Type | Description |
|---|---|---|
| ESP Coordinators | Text | |
| Company | Text | |
| Market | Text | |
| Department | Text | |
| State/Region | Text | |
| Phone | Text | |
| Fax | Text | |
| Street Address 1 | Text | |
| Street Address 2 | Text | |
| City | Text | |
| State | Text | |
| ZipCode | Number | |
| Mail Code | Text | |

*Fig. 26*

| Innovation Awards Database - IP Coordinators Table | | |
|---|---|---|
| **Field Name** | **Data Type** | **Description** |
| IP ID # | Text | IP Coordinator ID # |
| FullNameIPC | Text | Coordinator's Full Name |
| Title | Text | Mr., Ms., Dr., etc. |
| CompanyName | Text | Company Name |
| BusAdr1 | Text | Mailstop |
| BusAdr2 | Text | Street Address |
| City | Text | City |
| State | Text | State |
| ZipCode | Text | Zip |
| Phone # | Text | Business Phone |
| FAX# | Text | Business FAX |

| Innovation Awards Database - Queries | | |
|---|---|---|
| **Queries** | | **Description** |
| Awards Query | | |
| By Date & IPC - Apps Filed | | |
| By Date & IPC - Disclosures Filed | | |
| By Date & IPC - Patents Granted | | |
| By Date & IPC - Apps Filed | | |
| Certificates for Publication Awards | | |
| Certificates for Recipients of Filing Awards | | |
| Certificates for recipients of Issuance Awards | | |
| Company Order | | |
| DH Mailing Labels - Filing Awards | | |
| DH Mailing Labels - Inv Ach Awards | | |
| DH Mailing Labels - Issuance Awards | | |
| DH Mailing Labels - Publication Awards | | |
| DH of Recipients of Filing Awards | | |
| DH of Recipients of Inventor Ach Awards | | |
| DH of Recipients of Issuance Awards | | |
| DH of Recipients of Publication Awards | | |
| Disclosure Award Letter | | |
| Disclosure Award Letter Query | | |
| Disclosure Gift Check | | |
| General Award | | |
| Inventor Achievement Award | | |
| Inventor Mailing Labels - Filing Awards | | |
| Inventor Mailing Labels - Inv Ach Awards | | |
| Inventor Mailing Labels - Issuance Awards | | |
| Inventor Mailing Labels - Publication Awards | | |
| Issuance Award Winner Check | | |
| Open Filing Awards | | |
| Open General Awards | | |
| Open Inventor Achievement Awards | | |
| Open Issuance Awards | | |
| Open Publications Awards | | |
| Patent Filing Award | | |
| Patent Issuance Award | | |
| Progress Report | | |
| Publications Award | | |
| Recipients of Filing Awards | | |

Fig. 27

| | | |
|---|---|---|
| Recipients of Inventor Achievement Awards | | |
| Recipients of Issuance Awards | | |
| Recipients of Publication | | |
| **Innovation Awards Database - Forms** | | |
| **Forms** | | **Description** |
| Awards | | |
| Company Addresses | | |
| ESP Coordinators | | |
| IP Coordinators | | |
| **Innovation Awards Database - Reports** | | |
| **Forms** | | **Description** |
| Awards | | |
| By Date & IPC - Apps Filed | | |
| By Date & IPC - Disclosures Filed | | |
| By Date & IPC - Patents Granted | | |
| Copy of Recipients of Issuance Awards - Reports for Award Mfg. | | |
| DH of Recipients of Filing Awards | | |
| DH of Recipients of Inventor Ach Awards | | |
| DH of Recipients of Issuance Awards | | |
| DH of Recipients of Publication Awards | | |
| Disclosure Award Letter | | |
| General Award Form | | |
| Inventor Achievement Award Form - 10 issued | | |
| Inventor Achievement Award Form - 5 issued | | |
| Open Filing Awards | | |
| Open General Awards | | |
| Open Inventor Achievement Awards | | |
| Open Issuance Awards | | |
| Open Publications Awards | | |
| Patent Filing Award Form | | |
| Patent Issuance Award Form | | |
| Progress Report | | |
| Publication Award Form | | |
| Recipients of Filing Awards - sort by Award # | | |
| Recipients of Filing Awards - Sort by Inventor Name | | |
| Recipients of Inventor Achievement Awards - Sort | | |
| by Award # | | |
| Recipients of Issuance Awards - Sort by Award # | | |
| Recipients of Issuance Awards - Sort by Inventor Name | | |
| Recipients of Publication Awards - Sort by Award # | | |
| Recipients of Publication Awards - Sort by Inventor Name | | |
| Verification Table | | |

Fig. 28

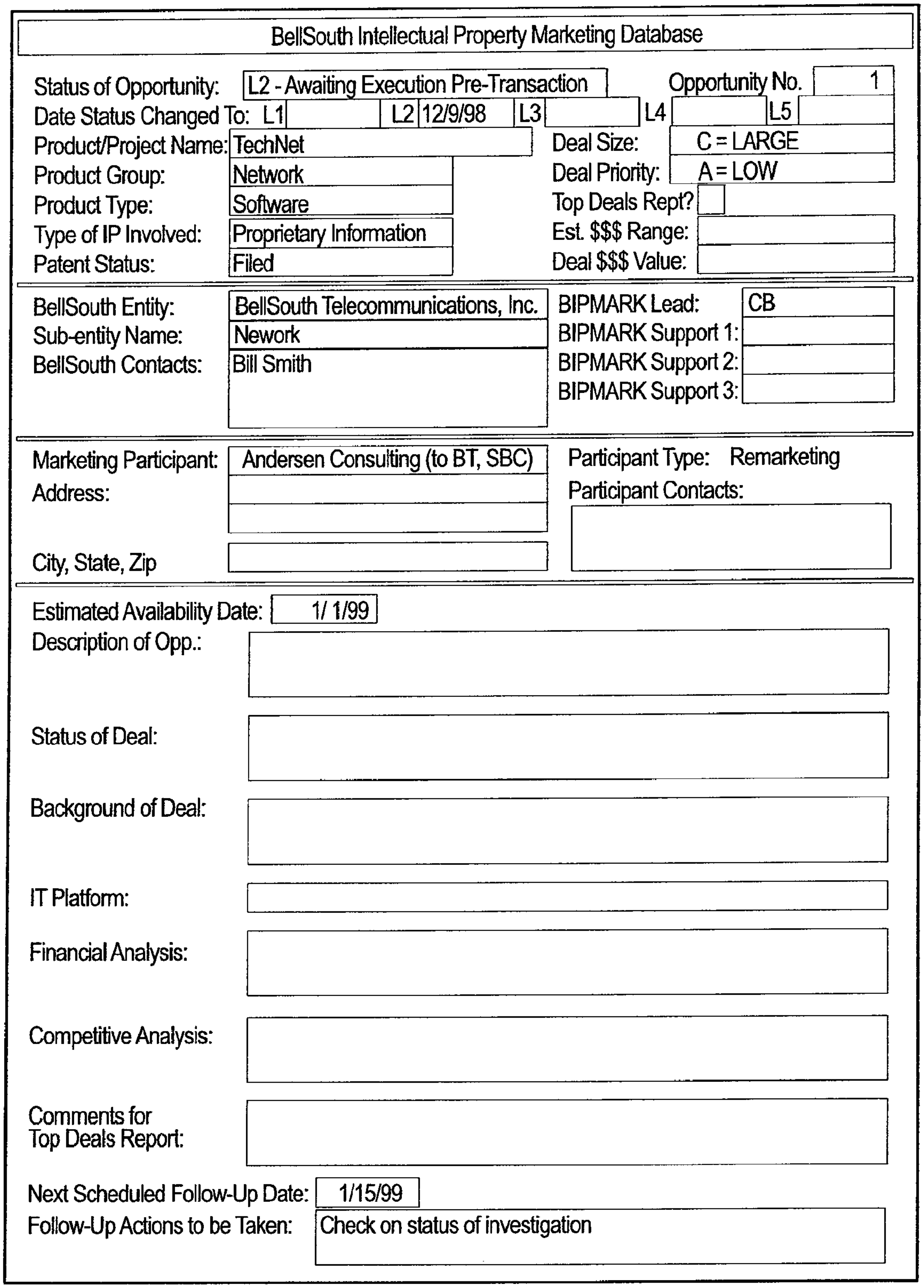

BellSouth Intellectual Property Marketing Database

| | | | |
|---|---|---|---|
| Status of Opportunity: | L2 - Awaiting Execution Pre-Transaction | Opportunity No. | 1 |
| Date Status Changed To: | L1 \| L2 12/9/98 \| L3 \| L4 \| L5 | | |
| Product/Project Name: | TechNet | Deal Size: | C = LARGE |
| Product Group: | Network | Deal Priority: | A = LOW |
| Product Type: | Software | Top Deals Rept? | |
| Type of IP Involved: | Proprietary Information | Est. $$$ Range: | |
| Patent Status: | Filed | Deal $$$ Value: | |

| | | | |
|---|---|---|---|
| BellSouth Entity: | BellSouth Telecommunications, Inc. | BIPMARK Lead: | CB |
| Sub-entity Name: | Nework | BIPMARK Support 1: | |
| BellSouth Contacts: | Bill Smith | BIPMARK Support 2: | |
| | | BIPMARK Support 3: | |

| | | | |
|---|---|---|---|
| Marketing Participant: | Andersen Consulting (to BT, SBC) | Participant Type: | Remarketing |
| Address: | | Participant Contacts: | |
| City, State, Zip | | | |

Estimated Availability Date: 1/ 1/99

Description of Opp.:

Status of Deal:

Background of Deal:

IT Platform:

Financial Analysis:

Competitive Analysis:

Comments for Top Deals Report:

Next Scheduled Follow-Up Date: 1/15/99

Follow-Up Actions to be Taken: Check on status of investigation

Fig. 29

Deals/Potential Opportunities
Priortization of Top Deals

| Status | Product/Project Name | Opp# | BellSouth Entity | Patent Status | Company Name | Lead | Support | Est. Value | Deal Size | Priority | Reason/Comments |
|---|---|---|---|---|---|---|---|---|---|---|---|

[L0=Potential Opportunity] [L1=Initial Research in Progress] [L2=Awaiting Exec. Pre-Transaction Report] [L3=Negotiations in Progress] [L4=Awaiting Exec. Agmt/Transaction Report] [L5=Contract Completed/Closed]

*Tuesday, December 14, 1999*

PRIVATE/PROPRIETARY
Contains private/proprietary information. May not be used or disclosed outside the BellSouth companies except pursuant to a written agreement.

*Page 1 of 6*

Fig. 30

BellSouth Intellectual Property Marketing Corporation
Level 1 (Initial Research in Progress) WIP Report Date Generated: Tuesday, December 14, 1999

| Product/Project Name | Subsidiary Name | Opp# | Patent Status | Company Name | BIPMARK Lead | BIPMARK Support | Est. Value | Deal Size | Priority | Date Chgd to L1 |
|---|---|---|---|---|---|---|---|---|---|---|

PRIVATE/PROPRIETARY
Contains private/proprietary information. May not be used or disclosed outside the BellSouth companies except pursuant to a written agreement.

Page 1 of 2

Fig. 31

Unexecuted Agreements

| Agreement Type | First Party | Second Party |
|---|---|---|

Tuesday, December 14, 1999

Page 1 of 1

*Fig. 33*

Award# D99-192 Type Disclosure Award Legal Case # 99192 Key # 868

Inventor Information

Title Mr. Name
BellSouth Co.
Suite
Address
City State Zip

Phone No.:
FAX No.s
Still BellSouth employee?
IP Coordinator ID#:

Inventor's Supervisor

Title Name
Suite
Address
City State Zip

Inventor's Department Head

Grtg Name
Title
Suite
Address
City. State Zip

Disclosure Award

Title: Sales Information Storage/Tracking/Notification

11/11/99 Disclosure Received by Legal
11/11/99 Disclosure Received by BIPMAN
11/16/99 Letter and Gift Sent to Inventor
Gift Sent Wooden Pen
BSCC ESP Program No Coord. Name

Filing Award

Title:

Date Application Filed
Date BIPMAN Notified of Filing
Filing Award Request Sent to IPC
Filing Award Payment Conf. Rec'd
Filing Award Recognized at Banquet

Assuance Award

US Patent Number
Title:

Date Patent Issued
Date BIPMAN Notified of Issuance
Issuance Award Request Sent to IPC
Issuance Award Payment Conf. Rec'd
Iss. Award Recognized at Banquet

Publication Award

Title/ Public Name:

Date Article Published
Date BIPMAN Notified of Publication
Rec'd Request for Release Form
Publication Award Request Sent to IPC
Confirmation of Payment Rec'd
Publ. Award Recognized at Banquet

Inventor Achievement Award

Patent Nos.

Date Last Patent Issued
Date BIPMAN Notified of Inv. Ach Awd
Inv. Ach. Award Request Sent to IPC
Inv. Ach. Award Payment Conf. Rec'd
Inv. Ach. Award Recognized at Banquet

General Award

Title:

$ Amount of General Award
Date General Award Appl Rec'd
General Award Request Sent to IPC
General Award Payment Conf. Rec'd
Gen. Award Recognized at Banquet General Notes

Fig. 34

Innovation Award Request
Patent Filing Award

| Date of Request | BellSouth File No. | Innovation Award No. |
|---|---|---|
| *December 8, 1999* | *98059* | *A99-075* |

Date Application Filed:

Title of Application:

*Please arrange payment of a Specific Innovation Award for filing of a patent application for the inventor listed below. Innovation Awards should be grossed up for federal and state taxes. Due to the significance of this contribution to BellSouth, the award should be presented in an appropriate ceremony in the presence of the inventor's peers and/or higher management.*

*Award Amount:*

*Approved By:* _X_ *IP Legal*
____ *BellSouth IP Management Corp.*

| Inventor Name | Inventor Signature |
|---|---|
| Supervisor Name | Supervisor Signature |
| IP Coordinator Name | IP Coordinator Signature |

*Certification of payment and this signed request form must be returned to:*

Julia Spires, Intellectual Property Administrator
1155 Peachtree Streed, NE - Suite 500 - Atlanta, GA 30309
(404) 249-2961

PRIVATE/PROPRIETARY/LOCK

Contains Private and/or Proprietary Information. May not be used or disclosed outside the BellSouth Companies except pursuant to a written agreement. Must be stored in locked files when not in use.

Fig. 38

MEMORANDUM

To: John E. Lewis
From: Marcus Delgado
Date: December 8, 1999
RE: Notification of Patent Application Filing for
Title:
BellSouth No.:
Filing Date:

---

The above-referenced patent application was filed in the U.S. Patent and Trademark Office ("PTO") on the filng date shown above. We expect the official filing receipt, including the assigned serial number for this application, within the next several weeks.

We will keep you advised of further progress as the application proceeds through the PTO.

cc: Donna Post

PRIVATE/PROPRIETARY/LOCK
Contains Private and/or Proprietary Information. May not be used or disclosed outside the BellSouth Companies except sursuant to a written agreement. Must be stored in locked files when not in use.

Fig. 39

*Patents Granted 9/1/99 Through 11/30/99*

| *Award* | *Legal No.* | *Inventor Name* | *Company Name* | *Patent Title* | *US Patent No.* | *Date Issued* |
|---|---|---|---|---|---|---|
| A99-067 | 96013 | JoAnn Blount (retired) | BSCC - BellSouth Cellular Corp. | Method and System for Automatically Connecting Telephone Calls to Multiple Devices Having Different Directory Numbers (as amended) | 5,963,864 | 10/5/99 |

*Tuesday, December 14, 1999* *Page 1 of 1*

Fig. 40

| Intellectual Property Management Database System | | | | | | | |
|---|---|---|---|---|---|---|---|
| Marketing Table | | | | | | | |
| Field Name | Data Type | Description | Relates (KEY) | Location of Data | Editable | Security | Comments |
| Project Number | Number | Unique number to keep track of each project | PK | System generated | Non-editable | | |
| Project Name | Character | Name of the project | | Free Form Entry | Editable | | |
| Status of Project | Character | Status of the project | | Lookup Table | Editable | | |
| Status Date | Date | Anticipated dates for different status levels | | Can be system generated and/or free form. | Editable | | A version can update when changing status levels |
| Customer | | Pulls additional information into database, Name contact, Phone - from People/Address table | | Lookup Table | Editable | | |
| | | Customer Name | | | | | |
| | | Contact | | | | | |
| | | Phone | | | | | |
| | | Party to final contract? | | | | | |
| Remarketing Partner | | Pulls additional information into database, Name, Contact, Phone, party to final contract - from People/Address table | | Lookup Table | Editable | | |
| | | Company Name | | | | | |
| | | Contact | | | | | |
| | | Phone | | | | | |
| | | Party to final contract? | | | | | |
| IP Group Personnel | | Pulls additional information into database, Name, Role, party to final contract - from People/Address table | | Lookup Table | Editable | | |
| | | Name | | | | | |
| | | Role | | | | | |
| Products | Character | Pointer back to product table | | Lookup Table | Editable | | |
| | | Product Name | | | | | |
| Deal Size | Character | Drop Down Estimate, small, medium and large | | Lookup Table | Editable | | |
| Deal Value | Number | Actual deal value entered after the deal is closed | | Free Form | Editable | | |
| Deal Priority | Character | low, medium, high | | Lookup Table | Editable | | |
| Include in Top Deals Report | Y/N (or CHAR) | Check box designating as important deal | | Free Form | Editable | | |
| Description of Project | Character | | | Freeform | Editable | | |
| Followup Date | DATE | Next Scheduled Followup Date | | Freeform | Editable | | |
| Followup Actions | Character | Follow-up Actions to be Taken | | Freeform | Editable | | |
| Responsible Party | Character | Responsible Party for Follow-up - Looks at People/Address Table - Potentially allow multiple values | | Lookup Table | Editable | | |

*Fig. 41*

| | | | | | | | |
|---|---|---|---|---|---|---|---|
| Files | Character | pointer back to files and file comments | | Freeform | Editable | | |
| | | File | | | | | |
| | | Comments | | | | | |
| Associated Contract | | Pointer that pulls information from contract table - including name | | Lookup Table | Editable | | |
| | | Name | | | | | |
| | | Agreement Type | | | | | |

Contract Tracking Table

| Field Name | Data Type | Description | Relates (KEY) | Location Data | Editable | Security | Comments |
|---|---|---|---|---|---|---|---|
| Agreement Number | Number | | KEY | System Generated | Non-Editable | | |
| Agreement Name | Character | | | Freeform | Editable | | |
| Agreement Type | Character | | | Lookup Table | Editable | | |
| Project Number | Number | Key field for linking to marketing opportunities | Potentially a Foreign Key | Potentially a Foreign Key | Non-Editable | | |
| Parties | Character | Lookup to People/Address table | | Lookup Table | Editable | | Should be able to add to the list |
| | | Company Name | | | | | |
| | | Type | | | | | |
| | | Contact | | | | | |
| Effective Date | DATE | | | Freeform | Editable | | |
| Termination/Renewal Date | DATE | | | Freeform | Editable | | |
| Termination/Renewal Terms | Character | | | Freeform | Editable | | |
| List IP | Character | List of IP Involved; pop-up box to add IP pointers, IP Type, Name, Ref # | Potentially a Foreign Key | Potentially a Foreign Key | Non-Editable | | User can modify which IP is licensed |
| | | IP Type | | | | | |
| | | Name | | | | | |
| | | Ref. # | | | | | |
| Exclusivity | Character | values: exclusive, non-exclusive | | Lookup Table | Editable | | |
| Form of Agreement | Character | values: Distribution License, Straight Use License, Strategic Agreement | | Lookup Table | Editable | | |
| Description | Character | | | Freeform | Editable | | |
| Type of Revenuw | Character | values: cash, savings, cash & savings | | Lookup Table | Editable | | |
| Unique T&C | Character | | | Freeform | Editable | | |
| Frequency of Payment | Character | | | Lookup Table | Editable | | |
| Reason for Termination | Character | | | Freeform | Editable | | |
| Type of License | Character | Do we still want this?...not on screen shots | | Lookup Table | | | |
| Confidentiality Period | DATE | | | Freeform | Editable | | This can be a range or a final date. |

| | | | | | | | |
|---|---|---|---|---|---|---|---|
| File | Character | Pointer to attached files and comments | | Freeform | Editable | | |
| | | File Name | | | | | |
| | | Comments | | | | | |
| Product | Character | | | | | | |
| BellSouth Business Unit | Character | Pointer to BellSouth Business Unit and Royalty Percentage | | Lookup Table | Editable | | |
| | | BellSouth Business Unit | | | | | |
| | | Royalty Percentage | | | | | |
| Notice Date | Date | | | | | | |
| Customers Party to Contract | Character | | | | | | |
| Parties to Contract | Character | | | | | | |
| Underlying IP of Product | Character | | | | | | |
| Action | Character | Button (field) that points to information in the action table | | Lookup Table | | | |
| | | Expected Due Date | | | | | |
| | | Actual Date | | | | | |
| | | Action Type (Lookup) | | | | | |
| | | Expected Amount | | | | | |
| | | Actual Amount | | | | | |
| | | Expected Action | | | | | |
| | | Actual Action | | | | | |
| | | Internal Contact | | | | | |
| | | External Contact | | | | | |
| | | Comments | | | | | |
| Comments | Character | | | Freeform | | | |
| **IP TABLE (Trade Secrets or Copyrights)** | | | | | | | |
| Field Name | Data Type | Description | Relates (KEY) | Location Data | Editable | Security | Comments |
| IP # | Number | System Generated | Primary Key | Primary Key | Non-Editable | | |
| IP Type | Character | TX or Copyright or Both | | Lookup Table | Editable | | |
| IP Name | Character | | | Freeform | Editable | | |
| BellSouth Sub-entity | Character | | | Freeform | Editable | | |
| BellSouth Business Unit | Character | | | Lookup Table | Editable | | Could also be freeform |
| IP Description | Character | Freeform comments | | Freeform | Editable | | |
| Associated Files Attached | Character | Pointer to electronic file and comments | | Freeform | Editable | | |
| | | File Name | | | | | |
| | | Comments | | | | | |
| Copyright Filed? | Character | Build Lookup N/A, Yes or No. | | Lookup Table | Editable | | |

Fig. 47

Product Table

| Field Name | Data Type | Description | Relates (KEY) | Location Data | Editable | Security | Comments |
|---|---|---|---|---|---|---|---|
| Product Description | Character | Product Description | | Freeform | Editable | | |
| Product Number | Number | System Generated | Primary Key | Primary Key | Non-Editable | | System Generated |
| BellSouth Sub-entity | Character | | | Freeform | Lookup Table | | |
| BellSouth Business Uni | Character | Allow multiple values | | Lookup Table | Editable | | Could also be freeform |
| | | Pointer to People/Address Table, Name, Phone and | | | | | |
| BellSouth Contacts | Character | Position (e.g., role) | | Freeform | Editable | | |
| | | Name | | | | | |
| | | Phone # | | | | | |
| | | Position | | | | | |
| List of Patents | Character | Pointer to CPI Patent Database Records | | CPI System | Editable | | |
| | | Status | | | | | |
| | | Docket # | | | | | |
| | | Country | | | | | |
| | | App. # | | | | | |
| | | Filing Data | | | | | |
| | | Patent # | | | | | |
| | | Issue Date | | | | | |
| | | Inventor | | | | | |
| | | Title | | | | | |
| | | Comments - Not sure if in CPI | | | | | |
| List of TM | Character | Pointer to CPI TM Databse Records | | CPI System | Editable | | |
| | | Status | | | | | |
| | | Mark | | | | | |
| | | Country | | | | | |
| | | app.# | | | | | |
| | | Docket # | | | | | |
| | | Filing Date | | | | | |
| | | Reg. # | | | | | |
| | | Reg. Date | | | | | |
| | | Renewal Date | | | | | |
| | | Comments - Not sure if in CPI | | | | | |
| List of Trade Secrets & Copyrights | Character | Pointer to IP Table | | Lookup Table | Editable | | |
| | | Name | | | | | |
| | | Description | | | | | |
| | | BellSouth Sub-entity | | | | | |
| | | BellSouth Business Unit | | | | | |
| | | IP # | | | | | |

*Fig. 44*

| | | | | | | | |
|---|---|---|---|---|---|---|---|
| Date Available for Sa e | DATE | | | Freeform | Editable | | |
| Technical Requirements | Character | | | Freeform | Editable | | |
| Product Name | Character | allow multiple values | | Freeform | Editable | | |
| Files | Character | pointer to files and comments | | Lookup Table | Editable | | |
| | | File Name | | | | | |
| | | Comments | | | | | |
| **Patents Table (CPI)-Used in IP Table** | | | | | | | |
| Field Name | Data Type | Description | Relates (KEY) | Location Data | Editable | Security | Comments |
| Patent # | | | | | | | |
| Issue Date | | | | | | | |
| Inventor | | | | | | | |
| Status | | | | | | | |
| Docket # | | | | | | | |
| Title | | | | | | | |
| Country | | | | | | | |
| App # | | | | | | | |
| Filing Date | | | | | | | |
| Comments | | This may not be in CPI | | | | | |
| **Trademark Table (CPI) Used in IP Table** | | | | | | | |
| Field Name | Data Type | Description | Relates (KEY) | Location Data | Editable | Security | Comments |
| Mark | | | | | | | |
| Reg. # | | | | | | | |
| Registration Date | | | | | | | |
| Status | | | | | | | |
| App # | | | | | | | |
| Docket # | | | | | | | |
| Country | | | | | | | |
| Filing Date | | | | | | | |
| Renewal Date | | | | | | | |
| Comments | | This may not be in CPI | | | | | |
| **Corp/Org. Table** | | | | | | | |
| Field Name | Data Type | Description | Relates (KEY) | Location Data | Editable | Security | Comments |
| Name | | | | | | | |
| Type | | IP Group, Remarking, Customer, Alliance | | | | | |

Fig. 45

People/Address Table

| Field Name | Data Type | Description | Relates (KEY) | Location Data | Editable | Security | Comments |
|---|---|---|---|---|---|---|---|
| Org | | | | | | | |
| Name | | | | | | | |
| Phone | | | | | | | |
| Address | | | | | | | |
| Comments | | | | | | | |
| Position | | | | | | | |
| Roles Lookup Values | | | | | | | |
| Contact | | | | | | | |
| Research | | | | | | | |
| Other | | | | | | | |
| Contact Lookup Values | | | | | | | |
| IP Group Personne | | | | | | | |
| End Users/Customers | | | | | | | |
| BellSouth Business Unit | | | | | | | |
| Status Lockup Values | | Used in Marketing Module | | | | | |
| Conduct Initial Research | | | | | | | |
| Conduct Market Researcn and Analysis | | | | | | | |
| Develope marketing plan & package | | | | | | | |
| Sell product | | | | | | | |
| Negotiate contract | | | | | | | |
| Complete and approve transaction report | | | | | | | |
| Execute contract | | | | | | | |
| Set up maintenance plan | | | | | | | |
| Close out project | | | | | | | |
| BellSouth Business Units Lookup Values | | Used in IP Inventory Module, Product Inventory Module | | | | | |
| BASC (Affiliate Service Corp.) | | | | | | | |
| BBI (Billing Inc.) | | | | | | | |
| BBS (Business Systems) | | | | | | | |
| BPC (Public Communications) | | | | | | | |
| BSC (Corporate) | | | | | | | |
| BSCC (Cellular) | | | | | | | |
| BSE (Entertainment | | | | | | | |
| BSI (International) | | | | | | | |
| BSNET (.Net) | | | | | | | |
| BST (Telecommunications | | | | | | | |

Fig. 46

| | | | | | | | |
|---|---|---|---|---|---|---|---|
| BAPCO (Advertising and Publishing | | | | | | | |
| BAT (Applied Technology) | | | | | | | |
| BCS (Communication Systems) | | | | | | | |
| BWD (Wireless Data) | | | | | | | |
| Agreement Type Lookup Values | | Used in Contract Module | | | | | |
| Administrative Services Agreement | | | | | | | |
| Master Licensing Agreement | | | | | | | |
| Sublicensing Agreement | | | | | | | |
| Services Agreement | | | | | | | |
| Sublease Agreement | | | | | | | |
| Consulting Agreements | | | | | | | |
| Recruiter Agreements | | | | | | | |
| Remarketing Agreements | | | | | | | |
| Freq. of Payments Lookup Values | | Used in Contract Module | | | | | |
| One-time Development/Maintenance Savings | | | | | | | |
| One Time Up-Front License Fee | | | | | | | |
| One Time Up-Front License Fee w/Future Royalties Due | | | | | | | |
| Monthly Report/Royalty Payment | | | | | | | |
| Quarterly Report/Royalty Payment | | | | | | | |
| Annual Report/Royalty Payment | | | | | | | |

*Fig. 47*

ACTION TABLE

| Field Name | Data Type | Description | Relates (KEY) | Location Data | Editable | Security | Comments |
|---|---|---|---|---|---|---|---|
| Action Due Date | Date | | | Freeform | | | |
| Action Type | Character | | | Freeform | | | |
| Expected Amount | Number | | | Freeform | | | |
| Expected Action | Character | | | Freeform | | | |
| BellSouth Sub-entity | Character | | | Freeform | | | This can be business unit |
| Royalty Expected Due Date | Date | | | Freeform | | | |
| Royalty Actual Date | Date | | | Freeform | | | |
| Royalty Action Type | Character | | | Lookup Table | | | |
| Royalty Expected Amourt | Number | | | Freeform | | | |
| Royalty Actual Amount | Number | | | Freeform | | | |
| Royalty Expected Action | Character | | | Freeform | | | |
| Royalty Actual Action | Character | | | Freeform | | | |
| Royalty Internal Contac: | Character | | | Lookup Table | | | |
| Royalty External Contact | Character | | | Lookup Table | | | |
| Royalty Comments | Character | | | Freeform | | | |
| Start Date | Date | | | Freeform | | | |
| End Date | Date | | | Freeform | | | |
| Period | Character | | | Lookup | | | |

*Fig. 48*

Contacts TABLE

| Field Name | Data Type | Description | Relates (KEY) | Location of Data | Editable | Security | Comments |
|---|---|---|---|---|---|---|---|
| Company Name | | | | Freeform | | | |
| BellSouth Sub-entity | | | | Freeform | | | |
| Type | | IP Group, Remarketing, Customer, Alliance, BellSouth Internal | | | | | |
| Events | | Pointer to Events table | | Freeform | | | |
| | | Date | | | | | |
| | | Comments | | | | | |
| | | Attached Files | | | | | |
| Contacts | | | | | | | |
| | | Name | | | | | |
| | | Title | | | | | |
| | | Country | | | | | |
| | | Address1 | | | | | |
| | | Address2 | | | | | |
| | | City | | | | | |
| | | State | | | | | |
| | | Zip | | | | | |
| | | Phone | | | | | |
| ndividual Contact Events | | Pointer to Individual Contact Events Table | | | | | |
| | | Date | | | | | |
| | | Comments | | | | | |
| | | Attached Files | | | | | |

*Fig. 49*

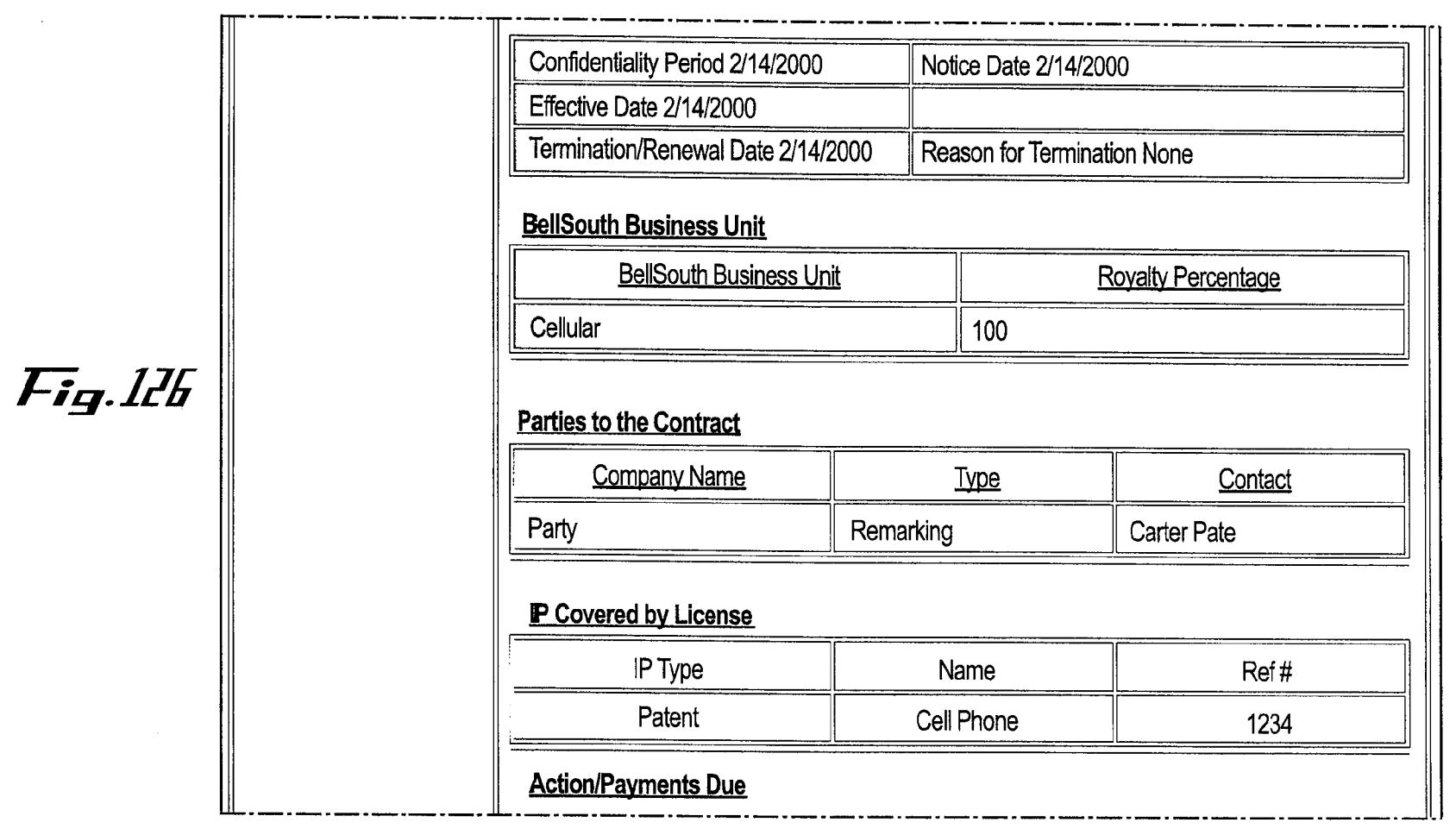

| | |
|---|---|
| Confidentiality Period 2/14/2000 | Notice Date 2/14/2000 |
| Effective Date 2/14/2000 | |
| Termination/Renewal Date 2/14/2000 | Reason for Termination None |

BellSouth Business Unit

| BellSouth Business Unit | Royalty Percentage |
|---|---|
| Cellular | 100 |

Parties to the Contract

| Company Name | Type | Contact |
|---|---|---|
| Party | Remarking | Carter Pate |

IP Covered by License

| IP Type | Name | Ref # |
|---|---|---|
| Patent | Cell Phone | 1234 |

Action/Payments Due

Fig. 126

Project Template Project Plan

| ID | Ⓐ | WBS | Task Name | Duration | Start | Finish | Pred | Succ | % Comp | Del | Resources |
|---|---|---|---|---|---|---|---|---|---|---|---|
| 1 | | 1 | Conduct Initial research | 5 days | Mon 1/3/00 | Fri 1/7/00 | | | 0 % | No | Product Mgr |
| 13 | | 2 | Conduct market research and analysis | 10 days | Mon 1/10/00 | Fri 1/21/00 | | | 0 % | No | Mktg Analyst |
| 31 | | 3 | Complete and approve pre-transaction report (PTR) | 15 days | Mon 1/24/00 | Fri 2/11/00 | | | 0 % | No | Product Mgr |
| 39 | | 4 | Develop marketing plan & package | 15 days | Mon 1/24/00 | Fri 2/11/00 | | | 0 % | No | Mktg/Sales Rep |
| 51 | ◈ | 5 | Sell product | 50 days | Mon 2/14/00 | Fri 4/21/00 | | | 0 % | No | Mktg/Sales Rep |
| 66 | | 6 | Negotiate contract | 50 days | Mon 4/24/00 | Fri 6/30/00 | | | 0 % | No | Contract Mgr |
| 69 | | 7 | Complete & approve transaction report (TR) | 15 days | Mon 7/3/00 | Fri 7/21/00 | | | 0 % | No | Contract Mgr |
| 78 | | 8 | Execute contract | 10 days | Mon 7/24/00 | Fri 8/4/00 | | | 0 % | No | Contract Mgr |
| 79 | | 9 | Set up maintenance plan | 5 days | Mon 8/7/00 | Fri 8/11/00 | | 89 | 0 % | No | Mktg/Sales Rep |
| 88 | ◈ | 10 | Close out project | 5 days | Mon 8/14/00 | Fri 8/18/00 | | | 0 % | Yes | Project Lead |

Project Template, Draft - Mon 3/27/00

Page 1 of 2

*Fig. 189*

Project Template Project Plan

51 Sell product
At this point, duplicate project plan for each target customer for the specified product.
88 Close out project
Project may potentially end any one of several points within project plan. Must complete close out tasks at where ever project end falls within project plan.

Project Template, Draft - Mon 3/27/00

Page 2 of 2

Project Template Project Plan

| ID | Ⓐ | WBS | Task Name | Duration | Start | Finish | Pred | Succ | % Comp | Del | Resources |
|---|---|---|---|---|---|---|---|---|---|---|---|
| 1 | | 1 | Conduct Initial research | 5 days | Mon 1/3/00 | Fri 1/7/00 | | | 0% | No | Product Mgr |
| 2 | | 1.1 | Schedule & prepare for client interview | 1 day | Mon 1/3/00 | Mon 1/3/00 | | 3 | 0% | No | Product Mgr |
| 3 | | 1.2 | Conduct & document client interview | 1 day | Tue 1/4/00 | Tue 1/4/00 | 2 | 10,11 | 0% | No | Product Mgr |
| 4 | | 1.2.1 | Gather product information | 1 day | Tue 1/4/00 | Tue 1/4/00 | | | 0% | No | Product Mgr |
| 5 | | 1.2.2 | ID tech support issues | 1 day | Tue 1/4/00 | Tue 1/4/00 | | | 0% | No | Product Mgr |
| 6 | | 1.2.3 | ID potential roadblocks | 1 day | Tue 1/4/00 | Tue 1/4/00 | | | 0% | No | Product Mgr |
| 7 | | 1.2.4 | ID potential customers/suppliers | 1 day | Tue 1/4/00 | Tue 1/4/00 | | | 0% | No | Product Mgr |
| 8 | | 1.2.5 | Perform initial assessment of IP issues | 1 day | Tue 1/4/00 | Tue 1/4/00 | | | 0% | No | Product Mgr |
| 9 | | 1.2.6 | ID client organization decision makers | 1 day | Tue 1/4/00 | Tue 1/4/00 | | | 0% | No | Product Mgr |
| 10 | | 1.3 | Communicate and review interview results | 2 days | Wed 1/5/00 | Thu 1/6/00 | 3 | 12 | 0% | No | Product Mgr |
| 11 | | 1.4 | Notify IPMAN to begin patent process | 1 day | Wed 1/5/00 | Wed 1/5/00 | 3 | | 0% | Yes | Product Mgr |
| 12 | | 1.5 | Make & document prelim go/no-go decision | 1 day | Fri 1/7/00 | Fri 1/7/00 | 10 | 25,14,21 | 0% | Yes | Product Mgr |
| 13 | | 2 | Conduct market research and analysis | 10 days | Mon 1/10/00 | Fri 1/21/00 | | | 0% | No | Mkt Analyst |
| 14 | | 2.1 | Assess competitive environment | 4 days | Mon 1/10/00 | Thu 1/13/00 | 12 | 24 | 0% | No | Mkt Analyst |
| 15 | | 2.1.1 | ID similar products | 4 days | Mon 1/10/00 | Thu 1/13/00 | | | 0% | No | Mkt Analyst |
| 16 | | 2.1.2 | ID existing suppliers | 4 days | Mon 1/10/00 | Thu 1/13/00 | | | 0% | No | Mkt Analyst |
| 17 | | 2.1.3 | ID potential suppliers | 4 days | Mon 1/10/00 | Thu 1/13/00 | | | 0% | No | Mkt Analyst |
| 18 | | 2.1.4 | ID potential customer base | 4 days | Mon 1/10/00 | Thu 1/13/00 | | 41 | 0% | No | Mkt Analyst |
| 19 | | 2.1.5 | Update & expand product benefits | 4 days | Mon 1/10/00 | Thu 1/13/00 | | | 0% | No | Mkt Analyst |
| 20 | | 2.1.6 | Determine market value/price | 4 days | Mon 1/10/00 | Thu 1/13/00 | | | 0% | No | Mkt Analyst |
| 21 | | 2.2 | Assess Internal marketing issues | 4 days | Mon 1/10/00 | Thu 1/13/00 | 12 | 24 | 0% | No | Product Mgr |
| 22 | | 2.2.1 | ID & assess IP Issues | 4 days | Mon 1/10/00 | Thu 1/13/00 | | | 0% | No | Product Mgr |
| 23 | | 2.2.2 | ID & assess tech support issues | 4 days | Mon 1/10/00 | Thu 1/13/00 | | | 0% | No | Product Mgr |

Project Template, Draft - Mon 3/27/00

Page 1 of 6

Fig. 192

Project Template Project Plan

| ID | Ⓐ | WBS | Task Name | Duration | Start | Finish | Pred | Succ | % Comp | Del | Resources |
|---|---|---|---|---|---|---|---|---|---|---|---|
| 24 | ◈ | 2.3 | Prepare market research summary | 1 day | Fri 1/14/00 | Fri 1/14/00 | 14,21 | 26 | 0% | Yes | Mktg Analyst |
| 25 | ◈ | 2.4 | Id decision makers | 1 day | Mon 1/10/00 | Mon 1/10/00 | 12 | 26 | 0% | Yes | Product Mgr |
| 26 | | 2.5 | Communicate and review research results | 2 days | Mon 1/17/00 | Mon 1/18/00 | 24,25 | 27 | 0% | No | Mktg Analyst |
| 27 | | 2.6 | Conduct team evaluation on results | 1 day | Wed 1/19/00 | Wed 1/19/00 | 26 | 28 | 0% | No | Product Mgr |
| 28 | ◈ | 2.7 | Make & document product go/no-go decision | 1 day | Thu 1/20/00 | Thu 1/20/00 | 27 | 29,30 | 0% | Yes | Product Mgr |
| 29 | ◈ | 2.8 | Priortize project opportunity or notify client of no go decision | 1 day | Fri 1/21/00 | Fri 1/21/00 | 28 | 41,34,35,32,33,4 | 0% | Yes | Product Mgr |
| 30 | | 2.9 | Review & update project plan | 1 day | Fri 1/21/00 | Fri 1/21/00 | 28 | | 0% | Yes | Product Mgr |
| 31 | | 3 | Complete and approve pre-transaction report (PTR) | 15 days | Mon 1/24/00 | Fri 2/11/00 | | | 0% | No | Product Mgr |
| 32 | ◈ | 3.1 | Review/update market research summary | 1 day | Mon 1/24/00 | Mon 1/24/00 | 29 | | 0% | Yes | Mktg Analyst |
| 33 | | 3.2 | Notify IPMAN of potential sale/move patent process into high priority | 1 day | Mon 1/24/00 | Mon 1/24/00 | 29 | | 0% | No | Product Mgr |
| 34 | ◈ | 3.3 | Prepare PTE | 5 days | Mon 1/24/00 | Fri 1/28/00 | 29 | 36 | 0% | Yes | Product Mgr |
| 35 | ◈ | 3.4 | ID decision makers | 1 day | Mon 1/24/00 | Mon 1/24/00 | 29 | | 0% | Yes | Product Mgr |
| 36 | | 3.5 | Gain client organization approval | 4 days | Mon 1/31/00 | Thu 2/3/00 | 34 | 27 | 0% | Yes | Product Mgr |
| 37 | | 3.6 | Gain VP Corporate Development approval | 3 days | Fri 2/4/00 | Tue 2/8/00 | 36 | 38 | 0% | Yes | Product Mgr |
| 38 | | 3.7 | Gain VP CIO approval | 3 days | Wed 2/9/00 | Fri 2/11/00 | 37 | 52 | 0% | Yes | Product Mgr |
| 39 | | 4 | Develop marketing plan & package | 15 days | Mon 1/24/00 | Fri 2/11/00 | | | 0% | No | Mktg/Sales Rep |
| 40 | | 4.1 | Gather marketing plan details | 5 days | Mon 1/24/00 | Fri 1/28/00 | 29 | 47 | 0% | No | Mktg/Sales Rep |
| 41 | | 4.1.1 | ID & prioritize target customer(s)/sales partners | 5 days | Mon 1/24/00 | Fri 1/28/00 | 18,29 | | 0% | Yes | Mktg/Sales Rep |
| 42 | ◈ | 4.1.2 | ID & document customer-specific benefits | 5 days | Mon 1/24/00 | Fri 1/28/00 | | | 0% | Yes | Mktg/Sales Rep |
| 43 | ◈ | 4.1.3 | Determine final valuation & price structure | 5 days | Mon 1/24/00 | Fri 1/28/00 | | | 0% | Yes | Mktg Analyst |
| 44 | | 4.1.4 | Develop channel strategy | 5 days | Mon 1/24/00 | Fri 1/28/00 | | | 0% | Yes | Mktg/Sales Rep |
| 45 | | 4.1.5 | Develop IP strategy | 5 days | Mon 1/24/00 | Fri 1/28/00 | | | 0% | No | Mktg/Sales Rep |
| 46 | | 4.1.6 | ID & develop available tech support | 5 days | Mon 1/24/00 | Fri 1/28/00 | | | 0% | No | Mktg/Sales Rep |

Project Template, Draft - Mon 3/27/00

Page 2 of 6

Project Template Project Plan

| ID | Ⓐ | WBS | Task Name | Duration | Start | Finish | Pred | Succ | % Comp | Del | Resources |
|---|---|---|---|---|---|---|---|---|---|---|---|
| 47 | | 4.2 | Formalize marketing plan | 5 days | Mon 1/3/00 | Fri 2/4/00 | 40 | 50,49 | 0% | Yes | Mktg/Sales Rep |
| 48 | | 4.3 | Create marketing materials | 5 days | Mon 2/7/00 | Fri 2/11/00 | | | 0% | No | Product Mgr |
| 49 | | 4.3.1 | Create/customize sales presentation | 5 days | Mon 2/7/00 | Fri 2/11/00 | 47 | | 0% | Yes | Product Mgr |
| 50 | | 4.3.2 | Create/customize other marketing materials | 5 days | Mon 2/7/00 | Fri 2/11/00 | 47 | | 0% | Yes | Product Mgr |
| 51 | | 5 | Sell product | 50 days | Mon 2/14/00 | Fri 4/21/00 | | | 0% | No | Mktg/Sales Rep |
| 52 | | 5.1 | Make initial contact with customer(s)/sales partners | 3 days | Mon 2/14/00 | Wed 2/16/00 | 38 | 53 | 0% | Yes | Mktg/Sales Rep |
| 53 | | 5.2 | Obtain NDA from customer/sales partner | 5 days | Thur 2/17/00 | Wed 2/23/00 | 52 | 54 | 0% | Yes | Mktg/Sales Rep |
| 54 | | 5.3 | Coordinate & plan sales meeting | 10 days | Thur 2/24/00 | Wed 3/8/00 | 53 | 55 | 0% | Yes | Mktg/Sales Rep |
| 55 | | 5.4 | Conduct sales meeting | 1 day | Thurs 3/9/00 | Thu 3/9/00 | 54 | 56 | 0% | No | Mktg/Sales Rep |
| 56 | | 5.5 | ID follow-up sales activities | 1 day | Fri 3/10/00 | Fri 3/10/00 | 55 | 57 | 0% | Yes | Mktg/Sales Rep |
| 57 | | 5.6 | Perform follow-up sales activifies | 5 days | Mon 3/13/00 | Fri 3/17/00 | 56 | 58 | 0% | No | Mktg/Sales Rep |
| 58 | | 5.7 | Finalize sales decision | 10 days | Mon 3/20/00 | Fri 3/31/00 | 57 | 59,60,62 | 0% | Yes | Mktg/Sales Rep |
| 59 | | 5.8 | Document go/no go sale decision | 1 day | Mon 4/3/00 | Mon 4/3/00 | 58 | | 0% | Yes | Mktg/Sales Rep |
| 60 | | 5.9 | Review & update project plan | 1 day | Mon 4/3/00 | Mon 4/3/00 | 58 | | 0% | Yes | Mktg/Sales Rep |
| 61 | | 5.10 | Perform pre-negotiation activities | 15 days | Mon 4/3/00 | Fri 4/21/00 | | | 0% | No | Mktg/Sales Rep |
| 62 | | 5.10.1 | Coordinate & plan meeting to discuss deal parameters | 10 days | Mon 4/3/00 | Fri 4/14/00 | 58 | 63 | 0% | Yes | Mktg/Sales Rep |
| 63 | | 5.10.2 | Conduct meeting to discuss deal parameters | 1 day | Mon 4/17/00 | Mon 4/17/00 | 62 | 64 | 0% | No | Mktg/Sales Rep |
| 64 | | 5.10.3 | Prepare term sheet | 3 days | Tue 4/18/00 | Thu 4/20/00 | 63 | 65 | 0% | Yes | Mktg/Sales Rep |
| 65 | | 5.10.4 | Communicate term sheet to Contracts | 1 day | Fri 4/21/00 | Fri 4/21/00 | 64 | 67 | 0% | No | Mktg/Sales Rep |
| 66 | | 6 | Negotiate contract | 50 days | Mon 4/24/00 | Fri 6/30/00 | | | 0% | No | Contract Mgr |
| 67 | | 6.1 | Generate draft contract for customer | 5 days | Mon 4/24/00 | Fri 4/28/00 | 65 | 68 | 0% | Yes | Contract Mgr |
| 68 | | 6.2 | Negotiate and finalize contract | 45 days | Mon 5/1/00 | Fri 6/30/00 | 67 | 70,71 | 0% | Yes | Contract Mgr |
| 69 | | 7 | Complete & approve transaction report (TR) | 15 days | Mon 7/3/00 | Fri 7/21/00 | | | 0% | No | Contract Mgr |

Project Template, Draft - Mon 3/27/00 Page 3 of 6

Project Template Project Plan

| ID | Ⓐ | WBS | Task Name | Duration | Start | Finish | Pred | Succ | % Comp | Del | Resources |
|---|---|---|---|---|---|---|---|---|---|---|---|
| 70 | | 7.1 | Review/Update decision makers | 1 day | Mon 7/3/00 | Mon 7/3/00 | 68 | | 0% | Yes | Mktg/Sales Rep |
| 71 | ◈ | 7.2 | Prepare TR | 5 days | Mon 7/3/00 | Fri 7/7/00 | 68 | 72 | 0% | Yes | Mktg/Sales Rep |
| 72 | | 7.3 | Obtain IPMARK legal approval | 1 day | Mon 7/10/00 | Mon 7/10/00 | 71 | 73 | 0% | Yes | Contract Mgr |
| 73 | | 7.4 | Obtain client organization approval | 3 days | Mon 7/11/00 | Thu 7/13/00 | 72 | 74 | 0% | Yes | Contract Mgr |
| 74 | | 7.5 | Obtain VP Corporate Development approval | 3 days | Fri 7/14/00 | Tue 7/18/00 | 73 | 75 | 0% | Yes | Contract Mgr |
| 75 | | 7.6 | Obtain VP CIO approval | 3 days | Wed 7/19/00 | Fri 7/21/00 | 74 | 77 | 0% | Yes | Contract Mgr |
| 76 | | 8 | Execute contract | 3 days | Mon 7/24/00 | Fri 8/4/00 | | | 0% | No | Contract Mgr |
| 77 | | 8.1 | Obtain customer contract signature | 10 days | Mon 7/24/00 | Wed 8/2/00 | 75 | 78 | 0% | Yes | Contract Mgr |
| 78 | | 8.2 | Obtain IPMARK contract signature | 8 days | thur 8/3/00 | Fri 8/4/00 | 77 | 80,83 | 0% | Yes | Contract Mgr |
| 79 | | 9 | Set up maintenance plan | 2 days | Mon 8/7/00 | Fri 8/11/00 | | 89 | 0% | No | Mktg/Sales Rep |
| 80 | | 9.1 | Launch customer management plan | 5 days | Mon 8/7/00 | Fri 8/11/00 | 78 | | 0% | No | Mktg/Sales Rep |
| 81 | | 9.1.1 | Implement relationship management process | 5 days | Mon 8/7/00 | Fri 8/11/00 | | | 0% | No | Mktg/Sales Rep |
| 82 | | 9.1.2 | Implement internal follow-up procedures | 5 days | Mon 8/7/00 | Fri 8/11/00 | | | 0% | No | Mktg/Sales Rep |
| 83 | | 9.2 | Launch contract management plan | 5 days | Mon 8/7/00 | Fri 8/11/00 | 78 | | 0% | No | Contract Mgr |
| 84 | | 9.2.1 | Implement royalty tracking process | 5 days | Mon 8/7/00 | Fri 8/11/00 | | | 0% | No | Contract Mgr |
| 85 | ◈ | 9.2.2 | Implement quality standard management process | 5 days | Mon 8/7/00 | Fri 8/11/00 | | | 0% | No | Contract Mgr |
| 86 | | 9.2.3 | Implement IP policing | 5 days | Mon 8/7/00 | Fri 8/11/00 | | | 0% | No | Contract Mgr |
| 87 | | 9.2.4 | Implement terms management process | 5 days | Mon 8/7/00 | Fri 8/11/00 | | | 0% | No | Contract Mgr |
| 88 | ◈ | 10 | Close out project | 5 days | Mon 8/14/00 | Fri 8/18/00 | | | 0% | Yes | Project Lead |
| 89 | ◈ | 10.1 | Perform final updates to project plan | 1 day | Mon 8/14/00 | Mon 8/14/00 | 79 | 90 | 0% | Yes | Project Lead |
| 90 | ◈ | 10.2 | Identify lessons learned & perform follow-up activities | 2 days | Tue 8/15/00 | Wed 8/16/00 | 89 | 91 | 0% | Yes | Project Lead |
| 91 | ◈ | 10.3 | Organize & file project plan & documentation | 2 days | Thu 8/17/00 | Fri 8/18/00 | 90 | | 0% | Yes | Project Lead |
| | | | | | | | | | | | |

Project Template, Draft - Mon 3/27/00

Page 4 of 6

Project Template Project Plan

3 Conduct & document client interview
If create interview form, can eliminate tasks 1.2.1 thru 1.2.6
4 Gather product information
Must Include product benefits, similar products, etc.

5 ID tech support issues
Type of support required? Tech transfer? Support partner? No support?
8 Perform initial assessment of IP Issues
Title and rights:
1. Ownership?
2. Protection?
3. Possible infringement?
9 ID client organization decision makers
Consider decision makers and needed officer buy-in.
11 Notify IPMAN to begin patent process
Potential checklist/form for interview process. If form, change task to "Provide Interview form (name or number) to IPMAN". This notification will trigger IPMAN to review patent status.
12 Make & document prelim go/no-go decision
Potential form to doc reasons for go/no-go.

14 Assess competitive environment
Potential checklist or standard form for assessing comp. environment. If so, may choose to delete 2.1.1 thru 2.1.7 and change 2.1 task name to something like complete Form XXX, Competitive Environment Assessment.
22 ID & assess IP Issues
Expanded investigation of any ownership, protection, potential infringement issues.
24 Prepare market research summary
Potential Score Card form. If so, indicate in task field.

25 ID decision makers
Verify that all key decision makers are identified
28 Make & document product go/no go decision
Potential form to doc reasons for go/no go decision
29 Prioritize project opportunity or notify client of no go decision
Create scorecard to prioritize.
Create form letter that thanks client and notifies of status of product.

32 Review/update market research summary
Potential form, Part 2 of Score Card, more market plan specific info.
34 Prepare PTR
No formal client interview but Product Manager will communicate with client regularly while preparing the PTR
35 Id decision makers
May require multiple client approvals. If so, add task for additional approve(s) - i.e. business unit and IT approval. If patent license, add task for owner approval.
42 ID & document customer-specific benefits
If form a checklist, can eliminate this task. May be considered part of marketing plan.
43 Determine final valuation & price structure
If form or checklist, can eliminate this task.

Project Template, Draft - Mon 3/27/00 Page 5 of 6

*Fig. 195*

Project Template Project Plan

51 Sell product
At this point, duplicate project plan for each target customer for the specified product.
52 Make initial contact with customer(s)/sales partners
Must have signed PTR before initial contact with potential customer 53 Obtain NDA from customer/sales partner
Inbound NDA for receiving information and mutual NDA also available on h: drive
55 Conduct sales meeting
Including PowerPoint sales presentation
56 ID follow-up sales activities
May include demos, site visits to existing customers, brochures, additional presentations, response to meeting questions...OR NOTHING!
58 Finalize sales decision
Resource for this task is actually the customer.
63 Conduct meeting to discuss deal parameters
Recommend use term sheet for outline of meeting agenda. See link to term sheet on task 5.10.3, Prepare term sheet.
68 Negotiate and finalize contract
Could be multiple drafts and result in additional meetings between IPMARK and customer, Includes obtaining all necessary approvals
71 Prepare TR
If time & resources permit, Mktg/Sales rep should begin pulling together the TR in parallel with task 6.2, Negotiate & finalize contract.
85 Implement quality standard management process
follow up with new customer/sales partner for samples of products to check for product quality.
88 Close out project
Project may potentially end any one of several points within project plan. Must complete close out tasks at where ever project end falls within project plan.
89 Perform final updates to project plan
Final updates include any clean-up to project plan, e.g. review/update task durations to accurately represent time spent on project tasks. Final update helpful in accurately tracking project and
project plan efficiency to allow for process improvement.
90 Identify lessons learned & perform follow-up activities
Follow-up could include analyzing project effectiveness and updating generic plan
91 Organize & file project plan & documentation
Final project plan should be part of project documentation. Need to develop checklist for keep/not keep documentation. May want to choose std color file for this so always identifiable. Also consider one color for project in progress and another color for project complete.

Project Template, Draft - Mon 3/27/00 Page 6 of 6

Fig. 196

Client Interview questionnaire (task 1.2)
(Completion Date:____________)

1. Gather project information

2. ID tech support issues

3. ID potential roadblocks

4. ID potential customers/suppliers

5. Perform initial assessment of IP issues

6. ID client organization decision makers

Fig. 197

Assess competitive environment checklist (task 2.1)
(Duration: 4 days - Complete by:____________)

ID similar products .......................................................................... ________

ID existing suppliers ........................................................................ ________

ID potential suppliers ....................................................................... ________

ID potential customer base ............................................................. ________

Update & expand project benefits ................................................... ________

Determine market value/price .......................................................... ________

Assess Comp Envir.doc

Fig. 198

Assess internal marketing issues checklist (task 2.2)
(Addresses internal IP and Tech Support issues)

1. ID & assess IP issues

2. ID & assess tech support issues

Fig. 199

INTELLECTUAL PROPERTY OUTMARKETING
PRE-TRANSACTION REPORT

Product/Project Name: ______________________

Entity Requesting: ______________________

Contacts (Entity Name, Phone Numbers, Email): ______________________

Outmarketing Party(s) (Company, Address, State of Incorporation, Contacts, Phone Phone Numbers): ______________________

Intellectual Property Involved: (Patents, Trademarks, Trade Secrets, Software, etc.) ______________________

Background of Deal (How Deal Developed, Summary of Intellectual Property Functionality/Uses, Deal Structure): ______________________

Financial Analysis (Revenue to be Recognized, Cost Savings, etc.): ______________________

Competitive Analysis (Worldwide, Outside US, US only, Outside 9 State Region, etc.): ______________________

Status of Deal (Ready to Sign Up, Need Negotiation Assistance): ______________________

Anticipated Timeline (Initial meeting, Demos, Sign Contract, etc.): ______________________

________________, a ______ Corporation subsidiary, requests ________ IPMARK ________ on its behalf to enter into an intellectual property outmarketing agreement according to the above-described terms.

| Requestor | Entity/Dept. | Title | Date |
|---|---|---|---|

*Fig. 200*

Marketing Plan checklist (task 4.1)

ID & prioritize target customer(s)/sales partners .................................... ______

ID & document customer-specific benefits .................................... ______

Determine final valuation & price structure .................................... ______

Develop channel strategy .................................... ______

Develop IP strategy .................................... ______

ID & develop available tech support .................................... ______

Formalize marketing plan .................................... ______

Fig. 201

NONDISCLOSURE AGREEMENT

THIS NONDISCLOSURE AGREEMENT is made by and between [Name of ________ [Entity], a corporation organized under the laws of ________ ("OWNER"), and ________________, a corporation organized under the laws of ________________ (the "Company"), effective as of ____________ ,20____. The parties agree as follows:

1. Project Defined. The Company may receive from OWNER information of a non-public nature for use by the Company and its officers,directors, agents, employees and representatives, including financial and legal advisers (collectively "representatives"), in the course of the performance of the Company's services for OWNER in connection with ________________________________________ ________________________________________ (the "Project).

2. Information Defined. The Company acknowledges that, in the course of its performance of services for or discussions with OWNER in connection with the Project, the Company will receive certain private and proprietary information from or about OWNER or its affiliates, including but not limited to technical, financial or business information and models, names of customers or partners; proposed business deals, reports, plans, market projections, software programs, data or any other private and proprietary information relating to the Project which may include certain trade secrets ("Information"). The term "Information" as used herein also includes: (i) the fact that the Information has been made available to or is being inspected or evaluated by the Company; (ii) the fact that the Company is providing services to OWNER or is otherwise involved in or discussing the Project; and (iii) any information, work papers, analyses, compilations, projections, studies, documents, terms, conditions, correspondence, facts or other materials derived or produced by the Company or its representatives for OWNER in connection with the Project. Any information supplied by OWNER to the Company prior to the execution of this Agreement shall be subject to the same treatment as the information made available after the execution of this Agreement.

3. Exclusions for Definition. The term "Information" as used herein does not include any data or information that: (a) is already known to the Company at the time it is disclosed to the Company; or (b) before being divulged by the Company: (i) has become generally known to the public through no wrongful act of the Company or its representatives; (ii) has been rightfully received by the Company from a third party without restriction on disclosure and without a breach of an obligation of confidentiality

PRIVATE/PROPRIETERY/LOCK

Fig. 202 running directly or indirectly to OWNER; (iii) has been approved for release by a written authorization by OWNER; or (iv) is independently developed by the Company without use directly or indirectly, of the information received from OWNER.

4. Nondisclosure Obligation. The Company shall keep the Information confidential and shall not disclose such Information, in whole or in part, to any person other than its Representatives who need to know such Information in connection with the Company's performance of services for OWNER in connection with the Project except with the prior written consent of OWNER or as otherwise permitted hereunder. Such Representatives shall be informed by the Company of the confidential nature of the Information and shall be required by the Company to agree in writing to be bound by this Agreement. The Information shall be used by the Company solely for the purpose of performing services for or otherwise evaluating the Information provided by OWNER in connection with the Project, and shall not be otherwise used for the Company's own benefit or for any purpose detrimental to the interest of __________.

5. Standard or Protection. For the purpose of complying with the obligations set forth herein, the Company shall use efforts commensurate with those that it employs for the protection of corresponding sensitive Information of its own, which shall in any event be no lesser a standard than the type of efforts that would be taken by a reasonable business for the protection of its own highly confidential information and trade secrets.

6. Compliance with Legal Process. In the event that the Company is legally-requested or required (by oral questions, interrogatories, requests for information or documents, subpoena, Civil Investigative Demand or similar process or, in the opinion of counsel for the Company, by federal or state securities or other statutes, regulations or laws) ot disclose any Information, the Company shall promptly notify OWNER of such request or requirement prior to disclosure so that OWNER may seek an appropriate protective order and/or waive compliance with the terms of this Agreement.

7. Ownership: Return of Information. All Information (including tangible copies and computerized or electronic versions and summaries thereof) shall remain the property of OWNER. Within ten (10) days following the receipt of a written request from OWNER, the Company shall deliver to OWNER all tangible materials containing or embodying the information received from OWNER, together with a certificate executed by an officer of the Company certifying that all such materials in the Company's possession or control have been delivered to OWNER or destroyed. The Company shall not assert directly or indirectly any right with respect to the information which may impair or be adverse to OWNER's ownership thereof.

PRIVATE/PROPRIETARY/LOCK

Fig. 203

8. Remedies for Breach. The Company understands and agrees that money damages would not be a sufficient remedy for any breach of this Agreement and that OWNER shall be entitles to seek injunctive or other equitable relief to remedy or Forestall any such breach or threatened breach. Such remedy shall not be deemed to be the exclusive remedy for any breach of this Agreement, but shall be in addition to all other rights and remedies available at law or in equity.

9. No Representations or Further Obligations. Neither this Agreement nor the disclosure of Information shall constitute or imply any promise or intention to make any purchase or services by OWNER. None of the Information which may be disclosed by OWNER shall constitute any representation, warranty, assurance, guarantee or inducement by OWNER to the Company of any kind, and in particular, with respect to the accuracy or completeness of any Information or the non-infringement of trademarks, patents, copyrights, mask protection rights or any other intellectual property rights, or other rights of third persons. It is understood that this Agreement does not obligate OWNER to enter into any further agreements or to proceed with any possible relationship or other transaction.

10. Term; Termination. This Agreement shall terminate as to the exchange of any new Information three (3) years after the effective date hereof. Either party may terminate the exchange of Information under this Agreement at any time by written notice to the other specifically referencing this Agreement. In any event, however, the obligations of the Company to maintain the confidentiality of the Information it has received under this Agreement shall continue for a period of three (3) years after such termination and then terminate, provided, however, that such obligation shall continue indefinitely as to Information constituting a trade secret under applicable law for so long as such Information remains a trade secret.

11. No Waiver. No failure or delay by OWNER is exercising any right, power or privilege hereunder shall operate as a waiver thereof, nor shall any single or partial exercise thereof preclude any other or further exercise thereof or the exercise of any other right, power or privilege hereunder.

12. Amendment. This Agreement may not be modified, supplemented or amended orally, but only by a writing signed by both parties hereto.

13. Applicability to Associated Parties. Any information disclosed to the Company by any of OWNER's affiliated companies or by any company, person or other entity participating with OWNER in any consortium, partnership, joint venture or

PRIVATE/PROPRIETARY/LOCK

Fig. 204 similar business combination in connection with the Project, which would otherwise constitute Information hereunder if disclosed by OWNER shall be deemed to constitute Information under this Agreement, and the rights of OWNER under this Agreement may be enforced by any such affiliate or other entity in addition to with respect to any violation relating to the Information disclosed by such affiliate or other entity, as if such entity were also a party to this Agreement.

14. Governing Law. This Agreement shall be governed by and construed and enforced in accordance with the laws of the State of ________, without regard to its choice of law provisions.

IN WITNESS WHEREOF, the parties have executed and delivered this Nondisclosure Agreement effective as of the date first written above.

| OWNER: | Company: |
|---|---|
| By:____________________ | By:____________________ |
| Name:__________________ | Name:__________________ |
| Title:_________________ | Title:_________________ |

PRIVATE/PROPRIETARY/LOCK

Fig. 205

Product Name

License Agreement Term Sheet

Definitions
What is licensed?

Specs of the Software (exhibit)
Definition/description?

Delivery, testing and acceptance
How should this work?

Grant and Scope of License
Exclusive? Non-exclusive? Etc.?

Term and Limitations on Use and reproduction
What can partnership do with it?

Sublicensing and transfer limitations

Pricing Terms
Royalties? Buy? Savings?

Acct and audit rights
As stated in the partnership agmt?

Sales and Property tax liability
Who liable?

Trade secret protection/Confidentiality terms
Need to be strict. In what manner may disclosure be made to vendors, particularly STB mfts?

Fig. 206

Title to original software and owner infringement reps
Positive stmt of ownership-will we indemnify the partnership?

Ownership of mods enhancement and additions
Who owns?

Source code inclusion/exclusion and protection
Must source be disclosed to partnership?

Training and documentation req's
Any?

Protection of Trademarks
Partnership must honor OWNER's marks

SW maintenance and technical support obligations

Vendor warranty obligations and scope

Limitation of liability and types of damages

Vendor indemnify and obligations in event of infringement

Dispute resolution provisions

Insurance terms (vendor on site?)

Assignment limitations

Std boilerplate (merger, written agmt, force majeur, etc)

Fig. 207

INTELLECTUAL PROPERTY OUTMARKETING
TRANSACTION REPORT

INTELLECTUAL PROPERTY INVOLVED:

OUTMARKETING PARTY:

BUSINESS DEAL CONTACTS:

INTELLECTUAL PROPERTY CONTACTS:

ESTIMATED VALUE: Up Front Savings
Revenues (Years) =__________

I. Executive Summary

II. Background

Page 1 of 3

Fig. 208

III. Deal Structure

IV. Financial Analysis

V. Competitive Analysis (1) Customers:

(2) Territory:

(3) Standardization:

Page 2 of 3

Fig. 209

VI. Recommendation

| | BUSINESS APPROVAL | LEGAL APPROVAL |
|---|---|---|
| Signature: | ____________ | ____________ |
| Printed Name: | ____________ | ____________ |
| Title: | ____________ | ____________ |
| Entity: | ____________ | ____________ |
| Date: | ____________ | ____________ |

Fig. 210

MS Project Activity Sheet

Project Name:________________________________________
Project Start Date:____________________
Project Resources:
Product Mgr____________________ Contact Mgr____________________
Mktg Analyst ____________________ Mktg/Sales Rep____________________

Instructions:

1. All updates in MS Project are made t the sub-task level only.
2. In the Task # field, enter the # of the task being updated or "new" if adding a task.
3. Find the column for the field you wish to update for the task and enter update information in the space provided.
4. Use the following guidelines for updating fields in MS Project:
   - Start/Finish Date - Change the <u>duration</u> of the appropriate task(s) to arrive at the new start/finish date
   - % Complete - Enter the new % complete for the task(s), either manually or using the up/down arrows
   - Deliverable - Change deliverable field to Yes, either manually or using the option in the drop down box

| Task# | Start Date | Finish Date | % Comp | Del | Add/Delete Task (incl. info for all project fields) |
|---|---|---|---|---|---|
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |
| | | | | | |

Fig. 211

Opportunity Score Card

Scoring Date:________ Scorer Initials:________ Total Score:

Product/Project Name________

Business Unit________

Business Unit Primary Contact:
Name________
Phone________

IPMARK Primary Contact:
Name________
Phone________

| Score Card Key Factors | Scoring & Explanation |
|---|---|
| 1. MARKET POTENTIAL<br>-Product viability (i.e. unique product, benefits, support/maintanance?)<br>-Potential customers?<br>-Few competitive products/suppliers?<br>-Large market, low market saturation?<br><br>High Potential ———— Low Potential<br>10 9 8 7 6 5 4 3 2 1 | Market Potential Rating: |
| 2. PROJECT TIMEFRAME<br>-Product developed & ready to market?<br>-Ownership? Patent status?<br>-Identified interested parties?<br>-Deal simple or complex?<br>-Anticipated time to sell/close/recognize$?<br><br>Today —6 —12 —18+ mths<br>10 9 8 7 6 5 4 3 2 1 | Project Timeframe Rating: |
| 3. PROJECTED REVENUE POTENTIAL<br>-Anticipated total revenue from project?<br>(if no strong customers, use 1X value)<br><br>Over 5M—4M—1M———Under 100K<br>10 9 8 7 6 5 4 3 2 1 | Revenue Potential Rating: |
| 4. COMPETITIVE THREAT TO BELLSOUTH<br>-Sale give customer competitive advantage over BellSouth?<br><br>No Threat ———— High Threat<br>10 9 8 7 6 5 4 3 2 1 | Competitive Threat Rating: |
| 5. INTANGIBLE VALUE<br>-Set stage for future big # deals?<br>-Build/foster relationship w/existing/future customer?<br>-Officer request/interest?<br>-Public relations opportunity?<br><br>High Profile ———— Low Profile<br>10 9 8 7 6 5 4 3 2 1 | Intangible Threat Rating: |
| | TOTAL SCORE: |

Fig. 212

Company Intellectual Property
10 Step Checklist

✓Patents

- ☐ Work produced by Company employees or with Company resources has been assessed for patentability if, at least one of the following occurred:
  - ⇨ Development of a new product, feature, process or software that seems unique
  - ⇨ Improvements to existing technology, product, process, or software
  - ⇨ Results that cut cuss and/or improve efficiency
  - ⇨ Creation of a new business method It is critical that employees bring their inventions to the attention of the Director of Technology (404 xxx-xxxx or the Technology Asset Manager (404) xxx-xxxx as soon as possible, and especially before any public disclosure of the invention!

✓Trademarks

- ☐ The Company mark and subbrands have been used in accordance with the company's graphics standards to ensure that the significant value of the mark is not diluted.
- ☐ All subbrands have been cleared by the Director of Trademarks.
- ☐ All third party(such as agents, distributors, co-brand parties, and sponsored parties) use of Company's trademarks have been authorized in writing using language approved by Company Intellectual Property Marketing Corp.

Any questions regarding Graphics and Sponsorships should be brought to the attention of the Director of Corporate Identify (404) xxx-xxxx and other Trademark questions should be directed to the Director of Trademarks (4040 xxx-xxxx.

✓Copyrights

- ☐ Every Company work product created by an employee or by a vendor under a "work made for hire" contact have been properly marked with a copyright notice.

It is not necessary to register the copyright in order to place the copyright notice on the work.

Any questions regarding Copyrights should be brought to the attention of the Director of administration (404) xxx-xxxx.

✓Proprietary Information

- ☐ All proprietary information has been physically marked by its originator at the bottom center margin using the approved markings.
- ☐ All proprietary information has been securely stored and properly disposed.
- ☐ An NDA or IEA has been executed due to the necessity of sharing Company proprietary information in order to discuss or negotiate a potential business relationship, and:
  - ⇨ only the minimum amount of proprietary information necessary to facilitate our business purposes has been shared or received; and
  - ⇨ any necessary patent applications have been filed prior to such disclosures.

Any questions regarding proprietary information should be brought to the attention of the Director of Administration (404) xxx-xxxx.

✓Ownership

- ☐ Before any development work to be done by an outside vendor (such as software, training courses of advertising) is begun, a specific written contract has been executed ensuring that Company will be the owner of the intellectual property rights in the developed technology, or work of authorship. (see Executive Directive 12).

Any questions regarding Ownership should be brought to the attention of the Vice President of Company Intellectual Property Management Corporation (404) xxx-xxxx.

✓Marketing

Company's policy is to maximize the value from its intellectual property.

- ☐ Opportunities to outmarket Company technology, software, systems, processes or other intellectual property to another company have been identified.

Any marketing opportunities should be brought to the attention of the Vice President of Company Intellectual Property Marketing Corporation (404) xxx-xxxx.

Fig. 220

SYSTEM AND METHOD FOR MANAGING INTELLECTUAL PROPERTY LIFE CYCLES

RELATED APPLICATIONS

This application is a continuation of U.S. patent application Ser. No. 09/750,136filed Dec. 29, 2000, now abandoned, which claims the benefits of U.S. Provisional Patent Application Ser. Nos. 60/173,919 filed Dec. 30, 1999, and 60/192,862 filed Mar. 29, 2000.

BACKGROUND

1. Field of the Invention

The present invention relates generally to the field of intellectual property management, and more particularly to systems and methods for managing intellectual property life cycles.

2. Background of the Invention

The field of intellectual property is vigorously expanding and evolving. Intellectual property has traditionally been defined as trademarks, patents, copyrights, and trade secrets. More and more, theorists are enlarging the concept to include "intellectual capital," a term becoming well known in the field. For the purposes of this invention, it is intended that the term "intellectual property" ("IP") has a broad definition comprising not only the foregoing definitions, but also including technology (e.g., hardware, software, computer programs and systems, training methods, methods of doing business) embodying the intellectual property, as well as the know-how and methods for using the intellectual property.

Corporations and individuals are scrambling as they try to convert intellectual property to revenue or otherwise maximize the value of their intellectual property assets. Some corporations are aggressively licensing their patent portfolios to generate revenue. Others are flexing their intellectual property muscles by enforcing their rights to exclude others from making, using, or selling technology that infringes on their intellectual property rights. Still others are using their intellectual property to gain access to markets that would otherwise be prohibitively expensive to enter. Furthermore, intellectual property may also be used defensively by its owner to protect its market share. Moreover, a corporation may donate its intellectual property to increase its public relations and obtain tax benefits.

Creating and leveraging intellectual property to generate revenue has become a priority for many corporations, particularly those with significant intellectual property portfolios. Unfortunately, however, intellectual property management has been done haphazardly by many corporations. Intellectual property typically has been viewed as an asset with a definite, useful life span. For example, once a patent term has expired, the patent is effectively declared useless, or figuratively speaking, dead. No further effort is made to extract further value from it.

Over the years, many companies have struggled with effectively managing the development and exploitation of their intellectual property assets, such as, for example, patents, trademarks, copyrights, and trade secrets. For example, many of them do not file appropriate patent applications and copyright registrations in a timely manner. These problems are often exacerbated in large corporations where the decision making authority for addressing intellectual property-related issues is often splintered and not well-defined. Many such organizations, therefore, perhaps due to their failure to effectively manage and market their intellectual property assets, are foregoing significant value that could otherwise be generated from licensing selling, trading, or donating such assets.

Accordingly, no one has sufficiently managed the life cycle of intellectual property. There are a few systems available which enable corporations or individuals to track a portion of the life cycle or subsets of intellectual property. For example, Aurigin of Mountain View, Calif. markets a system in which patents and patent families can be tracked, such tracking being available for both a corporation's patent portfolio and those of its competitors. Computer Packages Inc. ("CPI") of Rockville, Md. is one of several companies that market computer systems (e.g., computer software), typically used by law firms, for docketing domestic and international patent prosecution dates. However, these systems do not fully manage the entire life cycle of intellectual property.

Accordingly, there is a need for an integrated system and method for managing the entire life cycle of intellectual property development, marketing, and maintenance to be used by owners and/or managers of intellectual property. There is a need for an effective method for managing decisions and resources relating to the development and exploitation of intellectual property assets.

SUMMARY OF THE INVENTION

Embodiments of the present invention relate to methods and systems for managing intellectual property assets. An intellectual property protection life cycle of an intellectual property asset is managed, and an intellectual property marketing life cycle of the intellectual property asset is managed.

BRIEF DESCRIPTION OF THE DRAWINGS

FIG. 2 is a schematic diagram showing an IP protection life cycle.

FIG. 3 is a schematic diagram showing a IP marketing life cycle.

FIG. 10 is a schematic diagram showing an embodiment of a system architecture of the present invention.

FIGS. 15-20 show illustrations of embodiments related to a product opportunity scoring pipeline.

FIGS. 21-40 show an embodiment of an intellectual property database system for the development, marketing and maintenance of intellectual property.

FIGS. 41-49 show an embodiment of an intellectual property management database system in accordance with an embodiment of present invention.

FIGS. 178-188 show a system level diagram of a management of IP marketing system in accordance with an embodiment of the present invention.

FIGS. 189-190 illustrate an overview of a project template plan according to an embodiment of the present invention.

FIGS. 191-196 show a more detailed illustration of the project template plan illustrated in FIGS. 189-190.

FIG. 197 is a client interview questionnaire of an embodiment of the present invention.

FIG. 198 is a checklist of an embodiment of the present invention for assessing the competitive environment concerning an asset.

FIG. 199 is a checklist of an embodiment of the present invention for assessing internal marketing issues relating to an asset.

FIG. 200 is an intellectual property outmarketing pre-transaction report of an embodiment of the present invention.

FIG. 201 is a marketing plan checklist of an embodiment of the present invention.

FIGS. 202-205 illustrate a nondisclosure agreement of an embodiment of the present invention.

FIGS. 206-207 show a license agreement term sheet of an embodiment of the present invention FIGS. 208-210 illustrate an intellectual property outmarketing transaction report of an embodiment of the present invention.

FIG. 211 is a project activity form of an embodiment of the present invention.

FIG. 212 shows an illustration of an opportunity score card of an embodiment of the present invention.

FIG. 220 illustrates an embodiment of a company intellectual property checklist.

DETAILED DESCRIPTION OF THE INVENTION

Overview

Figure 4:
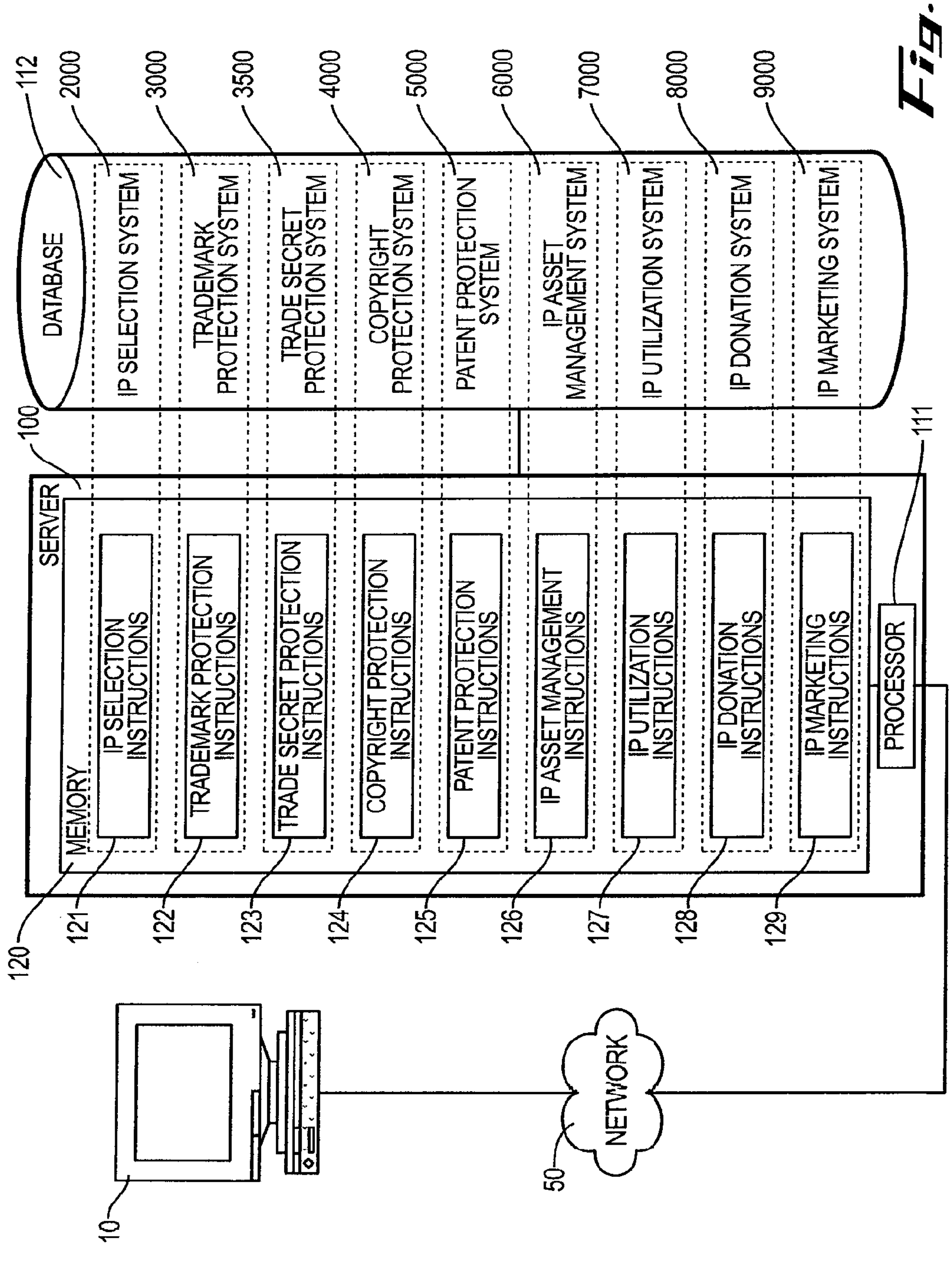
FIG. 4 is a schematic diagram showing a preferred embodiment of the system architecture of the present invention.

Embodiments of the present invention relate to systems and methods for managing the life cycle of intellectual property ("IP"), including the development, management, maintenance and marketing of intellectual property. IP may include, without limitation, patents, trademarks, copyrights, trade secrets, technology, training methods, business methods, know how, and other like assets from which value may be extracted.

According to an embodiment of the present invention, intellectual property management data is stored in at least one data system having at least one database. A preferred embodiment of the present invention comprises a plurality of data systems, where each of the data systems can have more than one database. For example, a first data system can comprise a patent and trademark application docketing system and be coupled to a second data system. The second data system can comprise a system to store IP inventory data (e.g., trade secret inventory data, copyright inventory data, etc.), project data, contract/agreements data, innovator data, innovation awards data, and other data related to the development, marketing and maintenance of intellectual property assets. As used to describe embodiments of the present invention, the term "coupled" encompasses a direct connection, an indirect connection, or a combination thereof. Moreover, two devices that are coupled can engage in direct communications, in indirect communications, or a combination thereof.

Virtual IP packets can be generated using tagging data within the various databases. For example, a virtual IP packet can include an IP data record corresponding to an IP asset and also data records associated with the IP data record (e.g., other IP data records, product data records, computer files, project data records, contract data records, an so forth). For a given product or service, a broad view of the IP associated with a particular packet can be obtained. That broad view can include at least some of the following: the technology embodying the intellectual property, the type or types of IP protection obtained for that technology, a status of the protection (i.e., patent pending, issued, maintenance fees due, etc.), prospective and actual licensees and key licensing terms, financial valuation competitive analysis, enforcement proceedings, and so forth.

The system can provide a reporting structure for phases of the life cycle and reporting capabilities on the interrelationship of the various phases. The system preferably includes components which form the building blocks to create the entire life cycle management system. For example, the IP life cycle may be considered to comprise three phases. The phases may include activities that (1) identify and develop IP, (2) protect and maintain IP, and (3) market IP. Each phase of the life cycle can comprise a plurality of stages.

Identify and Develop Intellectual Property

The steps in managing the life cycle of intellectual property begin with the definition of the life cycle. This life cycle typically begins with the research and development planning cycle. It is during this R&D planning cycle that intellectual property considerations should first be discussed. Innovations should be identified and appropriate protection methodologies chosen to protect those innovations. Throughout the development process, the intellectual property considerations should preferably be iteratively revised in order to stay abreast of the development effort as well as trends in the relevant industries. A by-product of this effort will be a database of technology that can be used as a technology transfer vehicle between various organizations or subsidiaries. Incentives are also vital to the development of intellectual property. Innovation award databases can be integrated into the system of the present invention.

Protect and Maintain Intellectual Property

As will be appreciated by those skilled in the art, there are numerous legal devices available for protecting intellectual property. Patents, copyrights, trademarks and trade secrets are all available to intellectual property owners. Databases for tracking each type of intellectual property are developed and integrated into the identification and development system. Such databases are used primarily by the IP owners (e.g., the business owners). Identification tags are used in order to map innovations to the protection mechanism which may be on a one-to-one basis, but may be on a one-to-multiple or multiple-to-one basis.

The aforementioned databases also are preferably integrated with the legal databases used for docketing and otherwise tracking the protection phase. Critical concepts such as filing dates, issue dates, maintenance fees/annuity due dates, are typically contained within the legal databases, but such dates are essential to the business plan. Mapping to other databases also can be provided.

Market Intellectual Property

A business plan for intellectual property life cycle management preferably includes marketing (e.g., licensing, selling) intellectual property assets for value. The business plan should not be an "after the fact" occurrence, but rather should be integrated into the identification and development cycle and the protection and maintenance cycle. With the business plan, a business owner can fully realize the potential value of IP. The marketing databases are also tagged so as to enable mapping between the marketing system, the identification/development system, and the protection/maintenance system.

As will be understood by those skilled in the art, marketing not only includes licensing and selling, but also includes the decision not to license or sell (in other words, exercising an owners right to exclude others from making, using, or selling). Accordingly, as part of the marketing system, there can be an enforcement (e.g., litigation) mechanism and a decision tree leading thereto. Marketing can also include cross-licensing, donations, and even abandonment. The marketing system can include a contract database, a license/sales "leads" database, a licensing revenue tracking system, competitive intelligence data, and other data.

In accordance with an embodiment of the present invention, there is provided a method of managing decisions and resources relating to the management and leveraging of intellectual property assets.

Additional advantages and novel features of the invention will be set forth in the description which follows, and in part will become apparent to those skilled the art or upon examination of the following detailed description or may be learned by practice of the invention. The detailed description shows the preferred embodiment of the invention by way of illustration of the best mode contemplated for carrying out the invention. As will be realized, the invention is capable of other and different embodiments, and its several details are capable of modifications in various obvious respects, all without departing from the scope and spirit of the present invention. Accordingly, the drawings and descriptions are to be regarded as illustrative in nature, and not as restrictive.

Section 1: The Life Cycle of Intellectual Property

Figure 1I:
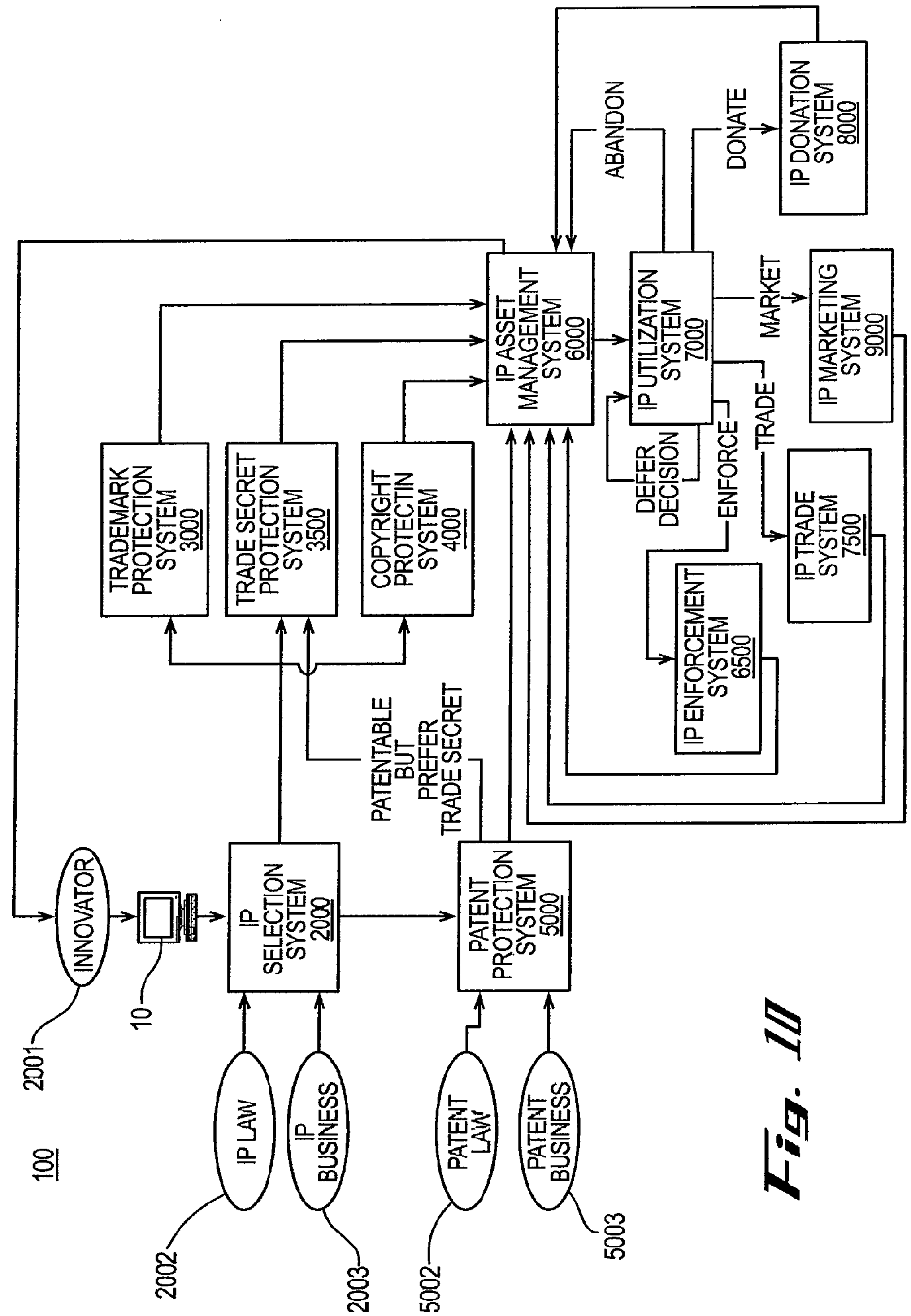
FIG. 1 is a schematic diagram showing a process for managing the life cycle of intellectual property.

FIG. 1 is a schematic diagram showing a continuous IP process, which may be considered a life cycle of IP. The life cycle of IP may be broadly defined to include three related phases: (1) the Identification, Development, Protection and Marketing Phase; (2) the Negotiations, License/Sales Initiation, and Contract Development Phase; and (3) the Support and Maintenance Phase.

1.1 The Identification, Development, Protection and Marketing Phase

The first phase relates to various stages that involve the creation of an IP asset. The first phase can comprise four distinct stages of IP management: identification, development, protection, and marketing.

1.1.1 Identification Stage

Various IP assets may be identified during the Identification Stage. For example, an invention may have been conceived, a new brand for a product may have been thought up, a software product may have been envisioned, an idea to solve a problem may have been discovered, a new technology may have been developed, or some other IP may have been created or otherwise be in the process of being created. Identification of the IP may be made through a number of venues. For example, the IP may be submitted by its creator. Furthermore, the IP may be identified by a team of IP miners through an IP audit. In addition, the IP may be an unsolicited submission received from external entities. Potential market opportunities for the IP may also be identified during the identification stage. For example, potential customers of the IP may be identified at this stage of the life cycle. Modifications and improvements to the IP asset may also be identified in view of the potential marketing opportunities.

1.1.2 Development Stage

During the development stage, the new IP identified during the Identification Stage can be developed, if the IP has not been fully developed. For example, a conceived invention may be reduced to practice, and a software product can be tested and debugged during the development stage. Also, during the development stage, marketing sales channels may be developed for the IP. Preferably, the development of the IP and the marketing sales channels are performed concurrently. At this stage, further modifications and improvements to the invention and IP may also be developed in light of potential marketing opportunities.

1.1.3 Protection Stage

In the protection stage, appropriate steps are taken to protect the IP identified and developed in the earlier stages. Protection of the IP may be accomplished in a number of ways. For example, patents may be obtained to protect inventions, trademark registrations may be sought for trademarks and service marks, copyright registrations may be secured for original works of authorship embodied in tangible media of expression, and appropriate procedures may be implemented to safeguard trade secrets. Furthermore, additional protection may be obtained through non-disclosure agreements, "clean room" procedures, and other measures.

1.1.4 Marketing Stage

Analyses related to the market for and the competitiveness of the IP may be performed in the Marketing Stage. In addition, financial analyses can be conducted. These analyses may be performed to evaluate the potential of marketing of the IP. For example, the results of the analyses may provide rough estimates of how much commercial value may be derived from the IP. Furthermore, the results may indicate whether the IP can be successfully leveraged in light of the assessed market condition, including how the IP asset may fare with any competition. Moreover, the results may lead to a conclusion that additional financial assistance must be obtained to compete with a number of competitors. By this stage, a number of potential customers of the IP can be identified.

1.2 The Negotiations, License/Sales Initiation, and Contract Development Phase

During the second phase, efforts can be undertaken to derive value from the IP developed during the first phase. For example, the IP may be sold or licensed to the potential customers identified during the first phase. The potential customers may be internal or external entities. Internal entities include other operating units of the company. External entities may include customers, government agencies, and even potential competitors. In addition, value for the IP may be derived through donation. For example, the IP may be donated (e.g., to universities, to other institution of higher learning, to non-profit organizations, to charities, and so forth) and value may be realized through public relations benefits and tax benefits associated with the donation. The second phase may include three IP management stages: negotiations, license/sales initiation, and contract development.

1.2.1 Negotiations Stage

Negotiations can be conducted with various entities. For example, negotiations may be had with government agencies, suppliers, and end users concerning utilization of the IP. Negotiations can also be conducted with potential recipients of IP donations concerning the scope of the IP donation and any collateral agreements, undertakings, and activities.

1.2.2 License/Sales Initiation Stage

Licensing and sales activities can be commenced with internal customers and external customers. For example, an IP asset may be developed that is related to a product or service delivered by a vendor. That vendor can be contacted to inform the vendor of the IP asset and initiate discussions regarding sale of the IP, licensing of the IP, cross-licensing of the IP, and so forth. Likewise, an IP asset may be developed regarding a product or service that is to be delivered. Accordingly, end users of the product or service related to the IP asset can be contacted to initiate sales, licensing and other marketing activities.

1.2.3 Contract Development, Negotiation and Completion Stage

The Contract Development, Negotiation and Completion Stage can include contract development, contract negotiation, and contract completion related tasks. For example, form contracts can be updated and/or particularized for the purposes of contract negotiations with the client. Various drafts of the contract may be tracked for different instances of the negotiations. Approval of draft contract terms can be obtained prior to the initiation of contract negotiations. After contract negotiations have been conducted, a tentative contract can be communicated to appropriate decision makers concerning final approval of the contract. Activities related to the execution of a contract can be tracked and recorded. For example, after a contract is executed, a computer file containing an image of the executed contract can be stored and associated with related data records (e.g., associated with project data records, product data records, IP data records, and so forth). In another embodiment, the contract may include electronic signatures and the electronically-executed contract can be associated with related data records.

1.3 The Support and Maintenance Phase

During the third phase, the IP developed and marketed in the earlier phases may receive continuous support and maintenance. The third phase can include five stages related to support and maintenance of IP: internal reward and recognition, IP protection and policing, relationship management, royalty management, and quality standards management.

1.3.1 Internal Reward and Recognition Programs Stage

During the Internal Reward and Recognition Programs Stage, innovators who have contributed to the development of IP can be rewarded and recognized. The programs can be an effective vehicle to show appreciation to the innovators. Reward and recognition of the innovators may involve a payment in cash or in other forms of compensation. In addition, recognition may be done through publications, award ceremonies, banquets, etc. In addition, the programs can further encourage the innovators to submit additional innovations such as related innovations, improvements, and new innovations. Furthermore, the programs may also stimulate other innovators to come forward with new innovations. Related innovations, improvements, and new innovations may then be the basis for continuing the IP Life Cycle at the Identification, Development, Protection and Marketing Phase and Negotiations and License/Sales Phase.

1.3.2 IP Protection and Policing Stage

During this stage, patent, trademark, copyright, and/or trade secret portfolio management activities can be undertaken, tracked, and monitored. For example, patent maintenance fee payments and decisions can be made. In an embodiment, the likely potential value of a patent prior to payment of a maintenance fee can be estimated and a decision as to whether or not to pay the maintenance fee can be made based at least in part on the likely potential value estimate. When the potential value is less than the maintenance fee, the maintenance fee payment may not be made or the patent can be donated to another entity that may or may not pay the maintenance fee. IP policing activities can also be undertaken, monitored and reported, wherein certain infringers are notified and made to stop such infringing activity. Examples of IP policing activities include identification of products and services that infringe one's IP, and the development of certain strategical approaches to enforce one's IP against the owners of such infringing products and services. Such identifications and developments may lead to additional innovations and improvements to the IP that may be the basis for continuing the IP Life Cycle at the Identification, Development, Protection and Marketing Phase. Additionally, these identifications and developments may be the basis for initiating and negotiating a license or sale of the IP to the infringer.

1.3.3 Relationship Management Stage

The Support and Maintenance Phase can include relationship management activities to manage relationships with entities such as internal corporate entities, internal customers, external corporate entities, external customers, external sales partners, and end users. End users can include product and service end users and IP asset end users. Examples of relationship management activities include contacting the entity to assess any shortcomings in the IP, any new challenges of the entity, and any new thoughts on the IP. Such activities may lead to the generation of new IP to meet such shortcomings and challenges, where such new IP may be the basis for continuing the IP Life Cycle at the Identification, Development, Protection and Marketing Phase and Negotiations and License/Sales Initiation, and Contract Development Phase. Also, such shortcomings, challenges, and thoughts may lead to the identification of other innovations and IP in one's portfolio, which may be the basis for continuing the IP Life Cycle at the Identification, Development, Protection and Marketing Phase and Negotiations and License/Sales Initiation, and Contract Development Phase.

1.3.4 Royalty Management Stage

Royalty management activities can be undertaken and analyzed as part of intellectual property support and maintenance. Audits can be conducted and reviewed to determine whether the licensees are operating within the scope of their licenses and paying the appropriate royalty and/or licensing fees. Other royalty management activities include determining whether any additional support from the IP owner is required to maintain use of the IP or to assist in licensing or selling it to other end users.

1.3.5 Quality Standards Management Stage

The Support and Maintenance Phase can also include activities related to quality standards management. For example, quality standards management activities can include review and analysis of marketing projects to determine how the marketing activities and/or process can be improved. Evaluations of the terms of contracts and/or amount of review generated by entities and personnel associated with the marketing of IP can be conducted. Objective and subjective data can be analyzed to determine whether innovations are being effectively identified, developed and marketed. Examples of other quality standards management activities include ensuring that the products or services meet the quality standards set by the licensor, especially if the licensor's trademark is being affixed to the product or services, and ensuring appropriate IP markings, such as ©, ®, ™, patent pending, patent number are affixed to the product or service.

Section 2: IP Protection Life Cycle

FIG. 2 is a schematic diagram showing an IP protection life cycle. The continuous IP process for this IP protection life cycle may include six levels: Innovation Identification (IP Protection Level 0), Innovation Development (IP Protection Level 1), IP Protection Initiation (IP Protection Level 2), IP Protection Pending (IP Protection Level 3), IP Registration (IP Protection Level 4), and IP Maintenance (IP Protection Level 5). Each of these levels of operation can, for example, include data relating to effort spent, time elapsed per level, time elapsed total, IP management activities, and IP management measures. Using a system based, at least in part, on guidelines illustrated in FIG. 2, a person can determine how long certain operations should take and can manage an IP protection life cycle. For example, a data system associated with the IP protection life cycle can be programmed to remind the person about certain operations of the life cycle and to determine how much time and resources will be needed. The following further describes the levels of the IP protection life cycle and sets forth some examples as to effort spent, time elapsed per level, time elapsed total, and activities and measures.

2.1 Innovation Identification (IP Protection Level 0)

The efforts spent at the Innovation Identification Level in one embodiment can be one to two hours per innovation. An innovation may be a product. The time elapsed per level can be one to five days. The total time elapsed including this level may be up to one week. The IP management operations undertaken in this level include the following: internal awareness in education; internal relationship building; identifying protection opportunities; identifying type of protections needed; catalogue and qualify opportunities; notifying to IP marketing unit for marketing; and assigning a business unit IP management team member. The measures operations that can be taken at this level include innovations identified including the number of types and the quality of innovations.

2.2 Innovation Development (IP Protection Level 1)

The efforts spent at the Innovation Development Level can be one to five hours depending on the type of IP involved. The time elapsed during this level can be one to five days, and the total time elapsed up to and including the Innovation Development Level can be one to two weeks. The IP management operations undertaken as part of the Innovation Development Level of the IP protection life cycle can include: further educate innovator on information needed for IP protection; assist innovator in getting the innovation to the point that protection can be obtained for the IP; assist the business unit IP marketing unit with technical understanding; and confirm receipt of an innovation disclosure form. The measures operations that can be a part of the Innovation Development Level include a measurement of the number of disclosures and a measurement of the innovation attributes that are known and catalogued.

2.3 IP Protection Initiation (IP Protection Level 2)

The efforts spent at the IP Protection Initiation Level of the IP protection life cycle in an embodiment can include three to five hours per patent related innovation, three to five hours for trademark innovation and one hour per copyright innovation. The time elapsed during the IP Protection Initiation Level can be three to five months per patent, one to five days per trademark and one to five days per copyright. The total time elapsed up to and including the IP Protection Initiation Level maybe four to six months per patent, one to three months per trademark and three to four weeks per copyright. The IP management operations that can be undertaken during the IP Protection Initiation Level can include: access disclosure form; notify the legal department of the business unit IP marketing unit; verify disclosure award received; follow up with innovator and legal department, and file application; Measures include applications filed, quality of applications filed, and cost management of applications filed.

2.4 IP Protection Pending (IP Protection Level 3)

The efforts spent at the IP Protection Pending Level of the IP protection life cycle in an embodiment can include three to five hours per patent related innovation, four to six hours for trademark innovation and one hour per copyright innovation. The time elapsed during the IP Protection Pending Level can be 18 to 24 months per patent, six to 12 months per trademark, and two to three months per copyright. The total time elapsed up to and including the IP Protection Pending Level maybe 22 to 30 months per patent, 12 to 18 months per trademark, and three to four months per copyright.

The IP management operations that can be undertaken during the IP registration level include assisting in notifying the innovator that IP protection was obtained such as the issuance of a patent, the issuance of a trademark registration, etc; assisting the innovator in marking the innovation with the IP protection information; assisting the innovator in understanding the extent of the IP protection; and verifying the IP registration. The IP management operations that can be undertaken during the IP Protection Pending Level can include: verifying that a filing award, if any, was received by the innovator; assisting the innovator with issues relating to using the innovation while IP protection is pending; following up with legal personnel regarding the status of the IP protection efforts; and reviewing written documents from the government agency with which the application was filed and assisting in response to those written documents. The measurement operations that can be undertaken at the IP Protection Pending Level include a measurement of proper innovation usage during the IP Protection Pending Level and a measurement of pendency of the IP application.

2.5 IP Registration (IP Protection Level 4)

The efforts spent at the IP Registration Level can be three to five hours per patent, one to two hours per trademark and one hour per copyright. At the IP Registration Level the time elapsed can be one to five days per patent, one to five days per trademark and one to five days for copyright. Up to and including the IP Registration Level the total time elapsed can be two to two-and-a-half years per patent, one to three-and-a-half years per trademark and three to four months per copyright. The registration operation includes assisting in notification to innovation generator; assisting innovator generator in marking innovation with registration information; assisting innovation generator in understanding extent of IP protection; and verifying registration. The measurement operations that can be undertaken at the IP Registration Level include a measurement of the number of registrations obtained such as the number of patents obtained, the number of trademark registrations obtained, etc., a determination that proper markings of intellectual property protection registration have been undertaken and cost management of registration fees.

2.6 IP Maintenance (IP Protection Level 5)

The IP Maintenance Level can require one to two hours of effort. The time elapsed at the IP Maintenance Level can be one day and ongoing. Up to and including the IP Maintenance Level, the total time elapsed can be twenty years per patent, five to ten years per trademark and ten years per copyright. The IP management operations that can be undertaken at the IP Maintenance Level include verifying that the innovator received an IP protection issuance award; recording all relevant IP protection information; internal follow-up; and IP policing. The measurement operations that can be undertaken at the IP Maintenance Level include a measurement of the IP attributes catalogue and cost management of maintenance fees.

Section 3: IP Marketing Life Cycle

FIG. 3 is a schematic diagram showing a IP marketing life cycle. The continuous IP process for this IP marketing life cycle may be described as including six levels of operations including Potential Opportunity Identification (IP Marketing Level 0), Initial Research in Progress (IP Marketing Level 1), Awaiting Execution of Pre-Transaction Report (IP Marketing Level 2), Negotiation with External Party in Progress (IP Marketing Level 3), Awaiting Execution Agreement and Transaction Report (IP Marketing Level 4), and Close Deal Maintenance (IP Marketing Level 5). Each of these levels of operations can, for example, include data relating to effort spent, time elapsed per level, time elapsed total, intellectual property management activities, and intellectual property management measures. A system based, at least in part, on the guidelines illustrated in FIG. 3 can allow a person to determine know how long certain operations should take and to effectively manage a IP marketing life cycle. For example, a data system associated with the IP marketing life cycle can be programmed to help the person plan for and allocate resources for the IP marketing life cycle. The following further describes the levels of the IP marketing life cycle and sets forth some examples as to effort spent, time elapsed per level, time elapsed total, activities and measures.

3.1 Potential Opportunity Identification (IP Marketing Level 0)

The efforts spent at the Potential Opportunity Identification Level can be one to five days at the Potential Opportunity Identification Level. The time elapsed can be one to two hours per innovation (or product). The time elapsed during the Potential Opportunity Identification Level can be up to one week. The IP marketing operations of the Potential Opportunity Identification Level of the IP marketing life cycle process include: internal awareness in education; internal relationship building; identifying potential marketing opportunities; cataloging and qualifying potential opportunities; notifying the intellectual property management unit for disclosure purposes; and assigning a team member of the intellectual property marketing unit. The measurement operations undertaken during the Potential Opportunity Identification Level can include a measurement of the innovations (products) identified, a measurement of the quality of innovations (products), and numbers of people identifying innovations (products).

3.2 Initial Research in Progress (IP Marketing Level 1)

The effort spent at the Initial Research in Progress Level of the IP marketing life cycle process can be seven to ten days. The time elapsed at the Initial Research in Progress Level can be five to ten hours per innovation (product). Up to and including the Initial Research in Progress Level, the total time elapsed can be one to two weeks. The IP marketing operations at the initial research in progress level include: beginning market research; following up with an interview with subject matter expert ("SME"); beginning innovation (product) scorecard research; assessing the competitive environment; initially valuing the innovation (product); prioritizing innovation (product) with portfolio; making a go-no-go decision; beginning to get an internal buy-in; and drafting and submitting a pretransaction report ("PTR"). The measurement operations undertaken at the initial research in progress level include a measurement of innovation (product) attributes that are known and catalogued.

3.3 Awaiting Execution of Pre-Transaction Report (IP Marketing Level 2)

The time spent at the Awaiting Execution of Pre-Transaction Report Level can be seven to ten days. The time elapsed at this level can be five to ten hours per deal. The time elapsed up to and including the Awaiting Execution of Pre-Transaction Report Level can be two to three weeks. The IP marketing operations undertaken at the Awaiting Execution of Pre-Transaction Report Level include: conducting in-depth interview with SME; continuing to build relationship; beginning channel strategy; continuing competitive research and evaluation of innovation (product); initiating contact with chosen sales partners or end users; utilizing non-disclosure agreements ("NDAs"); and protecting IP prior to disclosure. The measurement operations that can be performed at the Awaiting Execution of Pre-Transaction Report Level include a measurement of the Pre-Transaction Report for all deals.

3.4 Negotiation with External Party in Progress (IP Marketing Level 3)

The efforts spent at the Negotiations with External Party in Progress Level of the IP marketing life cycle can be one to five months. The time elapsed at this level can be ten to 50 hours per deal. Up to and including the Negotiations with External Party in Progress Level, the total elapsed time can be two to six months. The IP marketing operations undertaken at the Negotiations with External Party in Progress Level include: continuing innovation (product) valuation market research and channel strategy; creating innovation (product) overview and presentation for external purposes; determining structure in pricing of deals; beginning and completing negotiations and/or contracts; and drafting and submitting transaction report. The measurement operations that can be conducted at this level include a measurement of the accuracy evaluations, a measurement of terms of deals and a measurement of the number of times the contract was reworked.

3.5 Awaiting Execution Agreement and Transaction Report (IP Marketing Level 4)

The effort spent at the Awaiting Execution Agreement/Transaction Report Level can be seven to ten days. At this level the time elapsed can be one to two hours per deal. Up to and including the Awaiting Execution Agreement/Transaction Report Level the total time elapsed can be two to six months. The IP marketing operations undertaken at the Awaiting Execution Agreement/Transaction Report Level include: finalizing fine points of contract; and managing technical and logistical issues of the innovation (product). The measurement operation at this level include whether there is a transaction report for all deals.

3.6 Closed Deal Maintenance (IP Marketing Level 5).

The effort spent at the Closed Deal Maintenance Level can be one day as well as ongoing. The time elapsed at this level can be one to two hours per deal or more. Up to and including the Closed Deal Maintenance Level the total time elapsed can be two to six months. The IP marketing operations undertaken during the Closed Deal Maintenance Level of the IP marketing life cycle process include: signing contracts; recording all relevant innovation (product) information; recording all relevant deal information; tracking royalties; managing the sales partners/end user relationship; conducting internal follow-ups; managing quality standards; and IP policing. The measurement operations that can be undertaken at the Closed Deal Maintenance Level include a measurement of revenues, a measurement of the percent of innovations licensed with patent protection and a measurement of the deal attribute catalogued.

Section 4: System Architectures

Overview

FIG. 4 is a schematic diagram showing a preferred embodiment of the system architecture of the present invention. Terminal 10 is coupled to server 100 via network 50. Server 100 includes and/or is coupled to a plurality of data systems including IP selection system 2000, trademark protection system 3000, trade secret protection system 3500, copyright protection system 4000, patent protection system 5000, IP asset management system 6000, IP utilization system 7000, IP donation system 8000, and IP marketing system 9000. In an embodiment, each of systems 2000, 3000, 3500, 4000, 5000, 6000, 7000, 8000, 9000 comprise data systems including instructions to be executed by a processor and data storage (e.g., a portion of data storage of a database 112). Network 50 may be a local area network (LAN), a wide area network (WAN), an HTTP network, the Internet, a wireless network, a wired network, or another communications network.

In the preferred embodiment, server 100 includes processor 111, database 112, and memory 120. Server 100 also can be, for example, a plurality of coupled servers. Processor 111 can be, for example, an Intel Pentium® III processor, manufactured by Intel Corp. of Santa Clara, Calif. As another example, processor 111 can be an Application Specific Integrated Circuit (ASIC). Server 100 can be, for example, a UNIX server from Sun Microsystems, Inc. of Palo Alto, Calif. Memory 120 may be a random access memory (RAM), a dynamic RAM (DRAM), a static RAM (SRAM), a volatile memory, a non-volatile memory, a flash RAM, a cache memory, a hard disk drive, a magnetic storage device, an optical storage device, a magneto-optical storage device, or a combination thereof.

Memory 120 of server 100 can store IP life cycle management instructions which can comprise instructions to store data, access data, generate user interfaces, generate reports, and perform other functions and operations as described herein. In an embodiment, the IP life cycle instructions can include IP selection instructions 121, trademark protection instructions 122, trade secret protection instructions 123, copyright protection instructions 124, patent protection instructions 125, IP asset management instructions object 126, IP utilization instructions 127, IP donation instructions 128, and IP marketing instructions 129. For example, the IP life cycle instructions 121-129 can be constructed using Object Oriented (OO) development methods.

The data systems and corresponding instructions (e.g., IP selection system 2000 including IP selection instructions 121, trademark protection system 3000 and trademark protection instructions 122, IP asset management system 6000 and IP asset management instructions 126, etc.) can perform functions and operations related to the development, marketing, and maintenance of intellectual property as described herein.

FIG. 4 shows an embodiment of the present invention in which the functions and operations described herein are performed at least in part by terminal 10, server 100 and database 1112. For example, in an embodiment, the intellection property management system illustrated in FIGS. 50-165 can be implemented with at least terminal 10, server 100, and database 112. In such an embodiment, the marketing module illustrated in FIGS. 84-110 can correspond to IP marketing system 9000, which includes IP marketing instructions 129 and data storage of at least a portion of database 112.

In accordance with an embodiment of the present invention, instructions adapted to be executed by a processor to perform a method are stored on a computer-readable medium. The computer-readable medium can be a device that stores digital information. For example, a computer-readable medium includes a CD-ROM as is known in the art for storing software. The computer-readable medium is accessed by a processor suitable for executing instructions adapted to be executed. The terms "instructions adapted to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Figure 5:
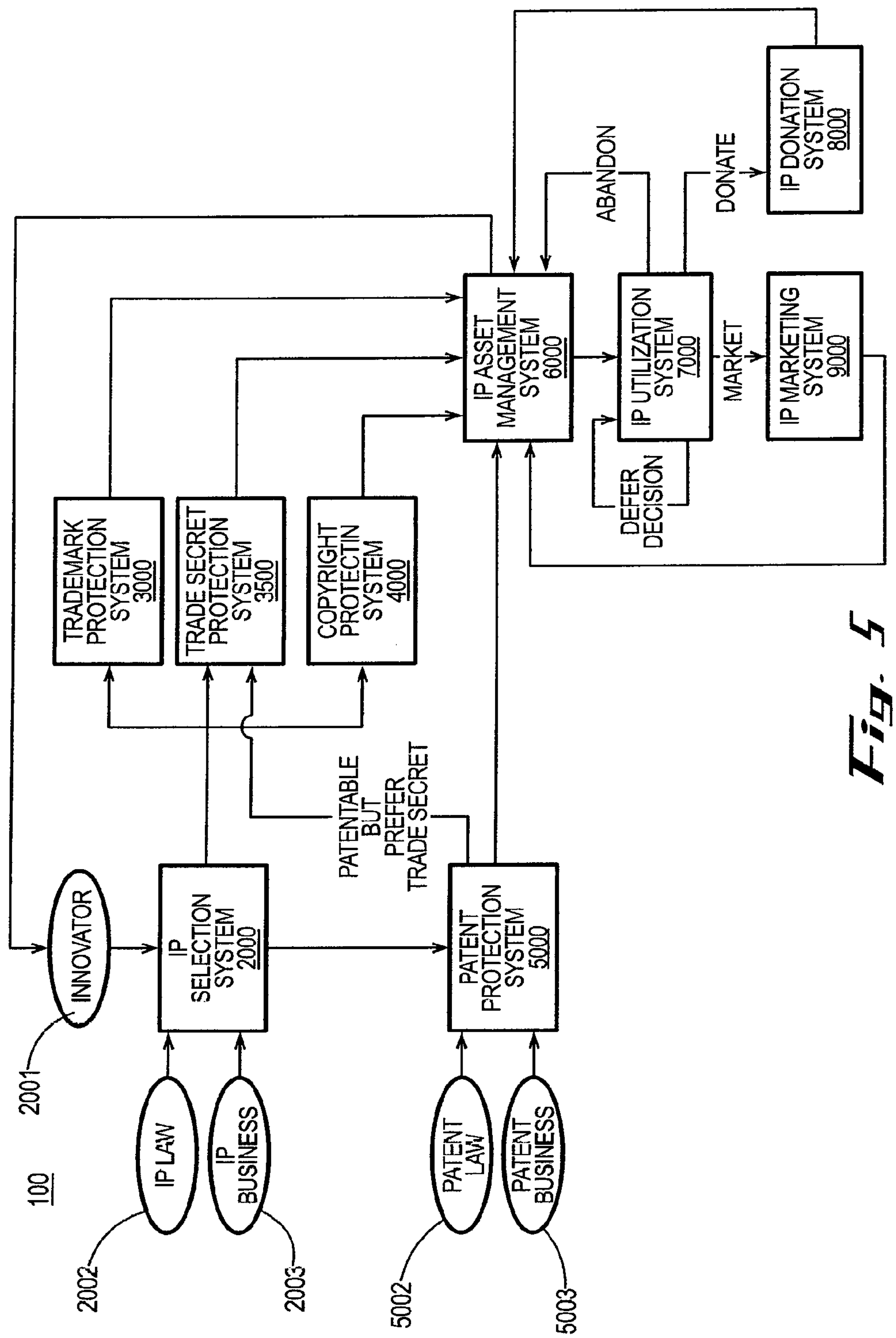
FIG. 5 is a schematic diagram showing another preferred embodiment of the system architecture of the present invention.

FIG. 5 is a schematic diagram showing an embodiment of the system architecture of the present invention. In this embodiment, each of the plurality of data systems correspond to the plurality of data systems illustrated in FIG. 4. In another embodiment, each data system can be a stand alone system, i.e., each of the data systems can include a server having a memory, a processor, and mass storage (e.g., to store data of a database). As is readily apparent to one skilled in the art, the data systems may also be grouped in a number of combinations or permutations. For example, trademark protection system 3000, trade secret protection system 3500, copyright protection system 4000, and patent protection system 5000 may be embodied in one server, and IP marketing system 9000 and IP donation system 8000 may be embodied in a second server.

According to an embodiment of the present invention, innovator 2001 can send submission including an innovation description to IP selection system 2000. For example, innovator 2001 can describe the innovation in an online form that can then be sent to (e.g., saved to, stored on) IP selection system 2000. In another embodiment, innovator 2001 can submit a hard copy of an innovation disclosure form and a user can enter information from the innovation disclosure form into IP selection system 2000. Innovator 2001 also can send a submission that includes a product description (e.g., a description of an article of commerce, a process, a method, an article of manufacture, a system) to IP selection system 2000.

IP selection system 2000 can access information such as IP law information from IP law source 2002 and IP business information from IP business source 2003 to determine whether the submission includes subject matter that can be protected by a trademark via trademark protection system 3000, as a trade secret by trade secret protection system 3500, by a copyright protection system 4000, or by a patent protection system 5000. In an embodiment, information submitted by innovator 2001 can be compared against the IP law information and IP business information to determine which one or more of systems 3000, 3500, 4000, or 5000 can be utilized to potentially obtain intellectual property protection for subject matter of the submission.

In an embodiment, a submission may be capable of multiple forms of intellectual property protection. For example, computer code can be both patentable and copyrightable. An article of manufacture may be protectable by one or more patents and have aspects that can be protected by one or more trademarks and/or trade secrets. When a submission is capable of multiple instances of protection, duplicate data records or information can be created and linked with one set of data records being communicated to a first protection system and a second set of data records being communicated to a second protection system. In another embodiment, when a submission is capable of multiple instances of protection, a single set of data records or information can be created but processed by more than one protection system (e.g., concurrently processed, serially processed, processed in parallel, etc.).

In an embodiment, IP selection system 2000 can communicate subject matter of the submission received from innovator 2001 to patent protection system 5000. Patent protection system 5000 can access information such as patent law information from patent law source 5002 and patent business information from patent business source 5003 to determine whether patent protection should be sought for the subject matter. For example, the patent law information may include examples of patentable subject matter, such as products and methods of doing business, statutory bar date criteria and the like. For example, patent business information may include data concerning areas of technology in which a corporation seeks patent protection. When the subject matter corresponds to a desired technological area or relates to a product having a potential for high business impact, the patent protection process can be initiated for the subject matter. Alternatively, the subject matter may correspond to an area of technology in which the corporation does not want to undertake the expense of obtaining patent protection, and the subject matter can be transferred to trade secret protection system 3500 for potential protection as a trade secret.

In an embodiment, as the subject matter is processed (e.g., tracked, monitored, the subject of generated reports, and so on) by one or more of trademark protection system 3000, trade secret protection system 3500, copyright protection system 4000, and patent protection system 5000, status information concerning the subject matter (e.g., an IP unit, an IP asset) can be sent to IP asset management system 6000. IP asset management system 6000 can include data records corresponding to IP assets, i.e., IP data records. An IP data record can uniquely identify an IP asset and can be associated with other data records relating to intellectual property management (e.g., development, marketing, and maintenance). Thus, an IP data record can indicate whether subject matter is protected by a patent (i.e., is a patent asset), that a patent application is pending, has been copyrighted, and so forth. In an embodiment, as the subject matter is processed by one or more protection systems, the IP management system information is updated (e.g., to indicate a patent has issued, that a trademark application was abandoned, and so on).

Figure 9:
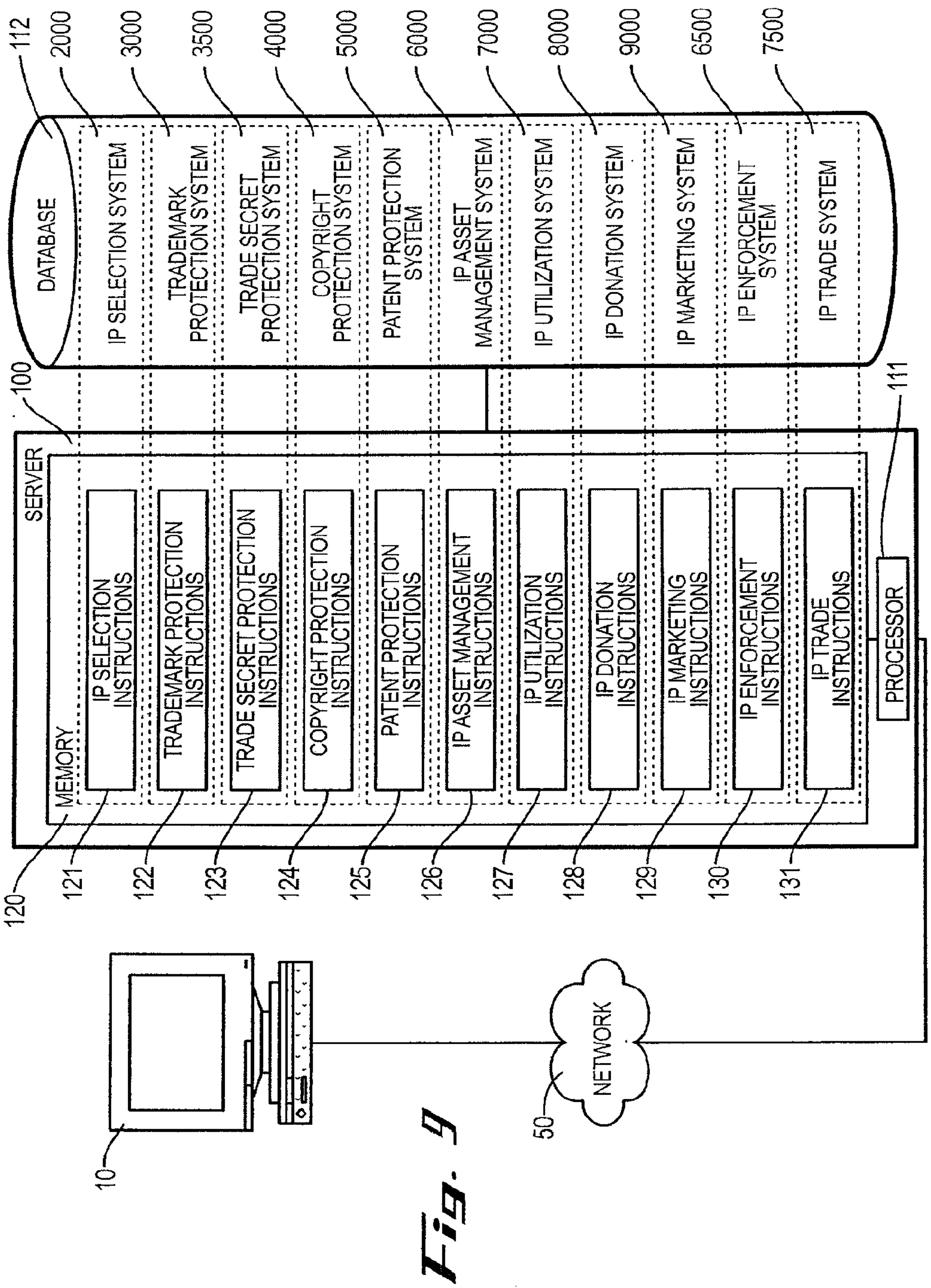
FIG. 9 is a schematic diagram showing another embodiment of a system architecture of the present invention.

IP utilization system 7000 can receive information from IP asset management system 6000 in order to process decisions concerning the leveraging of IP assets. In an embodiment, IP utilization system 7000 can store, access and report information related to decisions to abandon an IP asset (e.g., to forego paying a maintenance fee), donate an IP asset (e.g., to realize a tax advantage), or market an IP asset (e.g., to sell, license, enforce). IP asset management system data records can be updated based at least in part on a decision to abandon an IP asset, a decision to donate an IP asset communicated by IP donation system 8000, or a decision/update regarding marketing of an IP asset communicated by IP marketing system 9000. Also, in an embodiment as illustrated in FIGS. 9 and 10, IP enforcement system 6500 can store, access and report information related to maintaining competitive advantages. Similarly, IP trade system 7500 can store, access and report information related to gaining design freedom, gaining access to technology, or fending off an IP enforcement lawsuit.

In an embodiment, IP asset management system 6000 can generate a communication to innovator 2001 regarding an IP asset. For example, a patent award notification can be sent to innovator 2001 after a patent application is filed on subject matter submitted by the innovator, after a patent issues incorporating subject matter submitted by the innovator, and so on. In another embodiment, after an innovator is awarded multiple patents (e.g., five or more), an enhanced award notification can be sent to innovator 2001 to recognize the contributions of the innovator and to further incentivize the innovator to innovate and report innovations. In a further embodiment, various groups in a company may obtain information related to the IP assets. For example, the accounting department may obtain information on the amount of money generated from some or all of the patents, trademarks, copyrights, and trade secrets.

Figure 6:
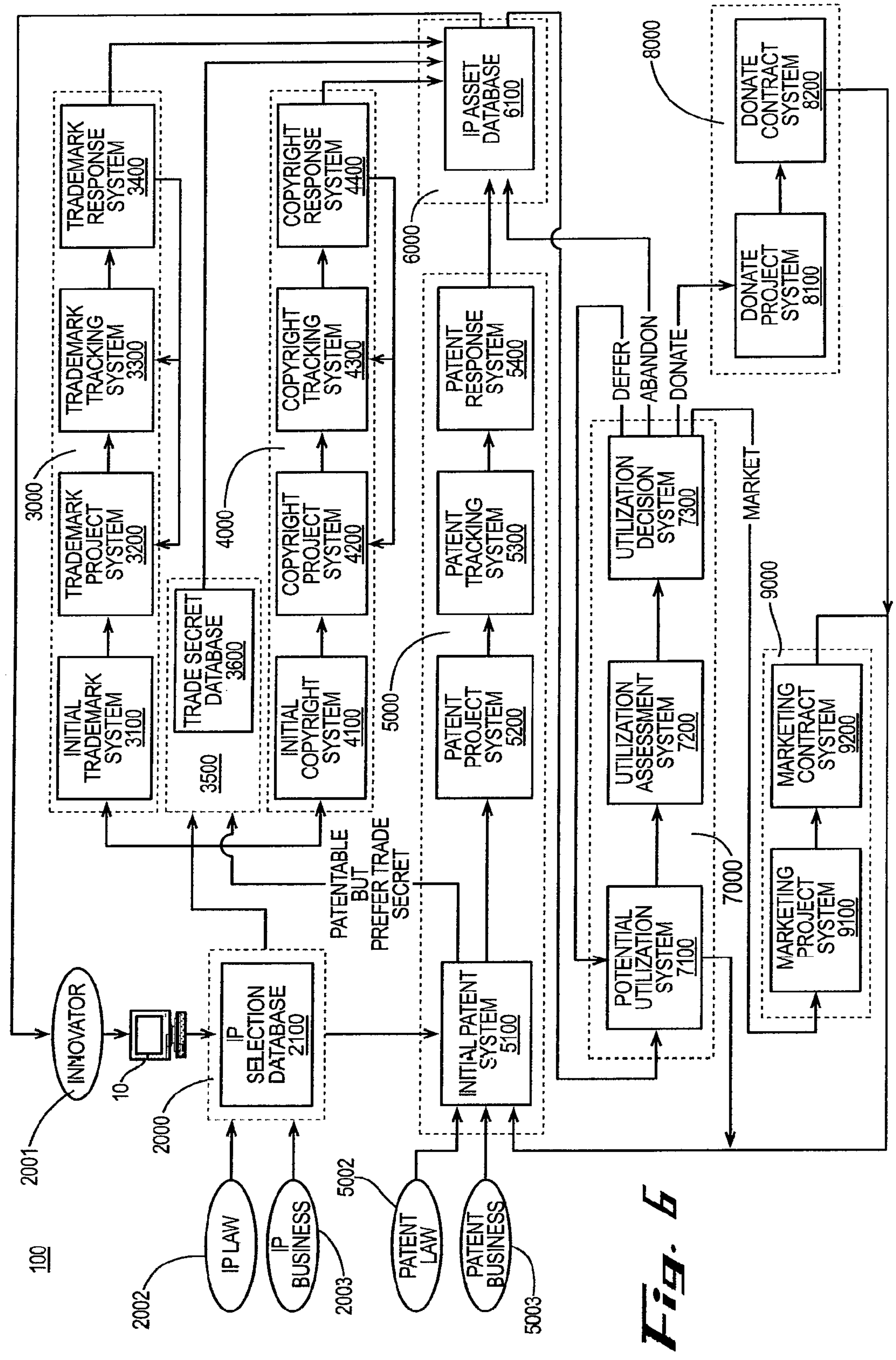
FIG. 6 is a schematic diagram showing a specific implementation of a preferred embodiment of the present invention.

FIG. 6 is a schematic diagram showing a specific implementation of an embodiment of the present invention. As illustrated in FIG. 6, IP selection system 2000 can include IP selection database 2100. Trademark protection system 3000 can comprise initial trademark system 3100, trademark project system 3200, trademark tracking system 3300, and trademark response system 3400. Trade secret protection system 3500 can include trade secret database 3600. Copyright protection system 4000 can comprise initial copyright system 4100, copyright project system 4200, copyright tracking system 4300, and copyright response system 4400. Similarly, patent protection system 5000 may comprise initial patent system 5100, patent project system 5200, patent tracking system 5300, and patent response system 5400. Furthermore, IP asset management system 6000 may comprise IP asset database 6100. IP utilization system 7000 may comprise potential utilization system 7100, utilization assessment system 7200, and utilization decision system 7300. IP donation system 8000 may comprise donate project system 8100 and donate contract system 8200. IP marketing system 9000 may comprise marketing project system 9100 and marketing contract system 9200. The various systems are described in additional detail as follows.

IP Selection System

IP selection system 2000, in an embodiment, can receive submission descriptions and conduct preliminarily evaluations of subject matter described in the submission descriptions. The subject matter of the submission can relate to, for example, patents, trademarks, trade secrets, copyrights, trade dress, service marks, software, literary arts, music, movies, inventions, business methods, processes, articles of manufacture, services, and other subject matter related to innovation and/or intellectual property rights. IP selection system 2000 can include an IP selection database 2100 to store data based on information received (e.g., innovator submissions), legal data, and business data.

Innovator 2001 can be a source of innovation. For example, innovator 2001 can produce IP, and the life cycle of that IP can be managed by embodiments of the present invention. Innovator 2001 may be an internal entity. The internal entity may be a person or a collection of persons in one or more business units. For example, the person may be an engineer who is hired to innovate. The business unit may be a technical unit, research and development unit, a marketing department, a legal department, an IP department, a manufacturing facility, and so forth. Innovator 2001 may also be an external entity. The external entity may be a joint-venture partner, a vendor, a supplier, or any other entity that may contribute IP assets that can be acquired and managed by an embodiment of the present invention. An innovator 2001 can also be any entity that wishes and/or agrees to assign its rights to the innovation to a company, corporation, organization, individual and/or entity. Thus, innovator 2001 could be a scientist or someone who produces advertising materials. The innovation may be bought through a strategic acquisition process from others. In short, innovations may come from an internal sources (employees, R&D, etc) or external sources (acquisition, contracts, joint ventures, etc.). Innovator 2001 also can use computer 10 with a GUI to input data into system 100.

In addition to receiving submissions relating to innovations, IP selection system 2000 can receive additional IP information. One of the reasons why many business entities have been unable to manage IP efficiently is that many companies concentrate on the legal aspects of IP protection. Often, companies do not fully appreciate the importance of business information. In a preferred embodiment of the present invention, IP selection system 2000 may be used to collect and organize IP information.

IP information may include legal information and business data. Legal information may be received from IP law source 2002, and business data may be received from IP business source 2003. Legal information can include statements of law defining what subject matter is eligible for legal protection, data tables including legal criteria, and other legal data. For example, statements of law may include data based on statutes and regulations that define legal parameters relating to trademarks, trade secret, copyright, patent, and the like as well as legal articles and other publications that do the same. Examples of business data may include the strategic goals of the company's technology development, the company's known competitors, and the demand in the market for the company's technologies. The IP information accessible by IP selection system 2000 can be utilized to analyze submissions by innovators, assist in valuation of IP assets, and prioritize the development of submissions (e.g., technology, subject matter, inventions, and so forth). IP law source 2002 and IP business source 2003 may be internal or external entities.

IP selection system 2000 may also be a data system that provides replies to queries. For example, innovator 2001 can access IP selection system 2000 to determine whether an innovation is eligible of patent protection. Innovator 2001 may access IP selection system 2000 via a network (e.g., a corporate LAN, the Internet), and IP selection system 2000 can send one or more queries to solicit replies from innovator 2001. Based on the answer or answers provided by innovator 2001, IP selection system 2000 can review IP information in IP selection database 2100 to inform innovator 2001 whether an innovation is patent eligible.

Alternatively, innovator 2001 can fill out a form received from IP selection system 2000 (e.g., an offline form that can be sent to IP selection system 2000, a Web browser-based form displayed by a user's computer that is coupled to IP selection system 2000). For example, innovator 2001 may provide answers to a number of questions on the form. Once innovator 2001 has completed answering the questions, innovator 2001 can hit the "enter" key, and the completed form will be automatically forwarded for analysis and/or review. A person other than innovator 2001, e.g., a person familiar with patent laws, may access IP selection system 2000 to review the completed form. The reviewer may be a patent agent or a patent attorney. The reviewer can then respond to innovator 2001. Alternatively, the IP selection system 2000 can analyze the innovator's answers against established criteria, and forward information to one of trademark protection system 3000, trade secret protection system 3500, copyright protection system 4000, or patent protection system 5000.

An alternative way of identifying innovation for IP protection is to have one or more persons dedicated to mining IP. These persons may be referred to IP miners. The IP miners are preferably those people who have significant experience with IP identification and protection. Suitable candidates for mining patentable innovations include innovators who have obtained at least one patent, former examiners of the U.S. Patent and Trademark Office, patent agents, and patent attorneys.

IP selection system 2000 may further comprise additional information that is designed to help innovators to further develop their innovations. For example, the information may comprise detailed instructions on what the innovator needs to produce and develop from that point forward. Specific examples may include information related to whether an invention has been reduced to practice and whether the innovator has prepared sufficient information to enable someone to make and use the invention. IP selection system 2000 may further include information or examples of technical disclosures of similar technologies.

At IP selection system 2000, each innovation may be reviewed to determine which type or types IP categories are most appropriate. In the preferred embodiment, a priority is given to innovations that have been identified as patent eligible. If an innovation is determined to be patent eligible, information related to the innovation is forwarded to patent protection system 5000. In addition, regardless of patent eligibility, information related to the innovation can also be forwarded to one or more of trademark protection system 3000, trade secret protection system 3500, and copyright protection system 4000 as appropriate.

Trademark Protection System

Information related to innovations that may be protected under trademark laws can be directed to trademark protection system 3000. Trademark protection system 3000 may be used to ensure that applications for trademark registration are filed to protect the innovations. The trademark registration applications can be tracked and processed by a plurality of system such as initial trademark system 3100, trademark project system 3200, trademark tracking system 3300, and trademark response system 3400. Examples of the operations of these systems are described below.

Initial Trademark System

Information related to an innovation for which one or more trademark registrations are desirable may be received from IP selection database 2100. The trademark information may be stored in initial trademark system 3100. A trademark professional familiar with trademark laws may review the trademark information in initial trademark system 3100. Based on the trademark information, a decision may be made as to whether a trademark registration process should be initiated. If it is determined that a trademark registration should be obtained for the innovation, the trademark information may be provided to trademark project system 3200.

Trademark Project System

Trademark project system 3200 can contain the trademark information received from initial trademark system 3100. Trademark project system 3200 may be used to schedule disclosure meetings between innovators and trademark professionals. Trademark professionals may be trademark attorneys, attorneys, legal assistants, legal secretaries, administrators, and so on. Trademark project system 3200 can also track the progress of scheduling, conducting, and follow-up disclosure meetings. Trademark project system 3200 can enable trademark applications to be filed in a timely manner. For example, trademark project system 3200 can be adapted to provide a warning or a reminder if a trademark application process is not making a projected or anticipated progress. For example, an e-mail may be generated to a person responsible for filing the trademark registration.

Trademark Tracking System

Trademark tracking system 3300 can track the progress of trademark applications. For example, trademark tracking system 3300 can be used to track deadlines related to response to office actions. Commercial software packages may be used in conjunction with trademark tracking system 3300. For example, CPI may be used to track a docket of trademark applications. Trademark tracking system 3300 can also be adapted to cross-reference related trademark applications.

Trademark Response System

Trademark response system 3400 can generate responses to office actions, such as draft responses, response templates, response forms, etc. The responses can contain boilerplate passages such as standard paragraphs containing arguments to overcome standard rejections (e.g., boilerplate rejections, common rejections, typical rejections). Trademark response system 3400 can also have links to articles and publications addressing strategies and the state of the law. In addition, trademark response system 3400 can also have links to TMEP, WestLaw®, Lexis®, Dialog® and other online resources. Trademark response system 3400 can be organized to contain responses to office actions in a systematic way with standard arguments to overcome responses and links to articles and other publications addressing strategies and the state of the law. The responses can be retrieved for use in future office actions that have similar rejections or objections.

Trade Secret Protection System

Information related to innovations that may be protected under trade secret laws may be forwarded to trade secret protection system 3500. Protection of innovations under trade secret laws neither requires registration nor involves an application process. Trade secret database 3600 may be used to store information related to protection of innovations as trade secret, trade secret-related IP data records that can identify and inventory trade secrets, etc. The information may comprise identifiers of the trade secret, the steps being taken to protect the innovation as a trade secret, identification of personnel and/or products associated with the trade secret, and so forth.

Copyright Protection System

Information related to innovations that may be protected under copyright laws may be sent to copyright protection system 4000. Copyright protection system 4000 can comprise a plurality of systems such as initial copyright system 4100, copyright project system 4200, copyright tracking system 4300, and copyright response system 4400. Examples of the operations performed by these systems are provided below.

Initial Copyright System

Information related to an innovation for which copyright registrations are desirable may be received from IP selection database 2100. The copyright information may be stored in initial copyright system 4100. A copyright professional familiar with copyright laws and procedures can review the copyright information in initial copyright system 4100. Based on the copyright information, a decision may be made as to whether a copyright registration process should be initiated. If it is determined that a copyright registration should be obtained for the innovation, the copyright information may be provided to copyright project system 4200.

Copyright Project System

Copyright project system 4200 can contain the copyright information received from initial copyright system 4100. Copyright project system 4200 may be used to schedule disclosure meetings between innovators and copyright professionals. Copyright professionals may be copyright attorneys, general attorneys, legal assistants, secretaries, administrators, managers, and so on. The progress of disclosure meeting scheduling, execution and follow-up can be tracked by copyright project system 4200. Among other things, copyright project system 4200 can assist in ensuring that copyright applications are filed in a timely manner. For example, copyright project system 4200 can be adapted to provide a warning or a reminder if a copyright application process is not making a projected or anticipated progress. For example, an e-mail may be generated to a person responsible for filing the copyright registration, or to a manager having responsibility for corporate copyright protection.

Copyright Tracking System

Copyright tracking system 4300 can track the progress of copyright applications For example, copyright tracking system 4300 can be used to track deadline related to copyright registrations. Commercial software packages may be used in conjunction with copyright tracking system 4300. Copyright tracking system 4300 can also be adapted to cross referencing related copyright applications.

Copyright Response System

Copyright response system 4400 may be adapted to generate response to office actions. Copyright response system 4400 can be organized to contain responses to a copyright registration agency in a systematic way with standard arguments to overcome responses and links to articles and other publications addressing strategies and the state of the law. The responses can be retrieved for use in future correspondences from the agency concerning similar rejections, objections, requirements, or actions.

Patent Protection System

For innovations that are patent eligible, information related to the innovations may be forwarded to patent protection system 5000. Patent protection system 5000 may comprise a plurality of systems such as initial patent system 5100, patent project system 5200, patent tracking system 5300, and patent response system 5400. Examples of the operations of these systems are described below.

In an embodiment, when it is determined that a better scope of protection for an innovation can be achieved by treating the innovation as a trade secret, then information related to the innovation can forwarded to trade secret protection system 3500 for protection of the innovation as a trade secret.

Initial Patent System

Initial patent system 5100 can contain information that helps identify, develop, assess, and evaluate patent eligible innovations. Initial patent system 5100 can determine whether a patent application is to be filed for an innovation in light of the patent law information received from patent law source 5002 and patent-related business information from patent business source 5003. Initial patent system 5100 can generate and send patent-related information (e.g., not enabling, already barred, and already patented) to innovators. Furthermore, initial patent system 5100 may process information from innovators and log/inventory the innovations. Preferably, each innovation submitted is associated with an invention number by initial patent system 5100.

Initial patent system 5100 can receive patent-related information from patent law source 5002 and patent business source 5003 and store such information in a database. The patent related information may comprise, among other things, statements regarding patent laws, patent regulations, and patent business data. Statements regarding patent laws received from patent law source 5002 can include summaries, synopsis, restatements, and analyses of patent law statutes and regulations. In addition, an electronic version of the Manual of Patent Examining Procedure can be coupled to initial patent system 5100. Further, information related to the development of patent laws may be received. Patent protection system 5000 may be adapted to receive information from online service providers, such as Lexis® and Westlaw®.

Examples of patent business data received from patent business source 5003 may include patent portfolio information of competitors, news related to the company's technologies, information about similar innovations being developed by others, and the like. The development of business method patents in the United States may be an example of information that is received by initial patent system 5100. Patent protection system 5000 may be adapted to receive information from the Internet. For example, patent protection system 5000 may be configured so that it can receive patent information from one or more websites. The patent information may be related to the state of the art of the technologies similar to those being developed.

Patent-related information can further include who the competitors are, and what the competitors are doing. Furthermore, the patent-related information may concern what competing products are in the market and how a particular invention of the company may be improved to compete with those products.

Initial patent system 5100 can determine and/or provide a report whether one or more innovations (e.g., inventions) are to the subject of a patent application. After a determination has been made that a patent application is to be filed, information related to the application can then be transferred to patent project system 5200.

Figure 8:
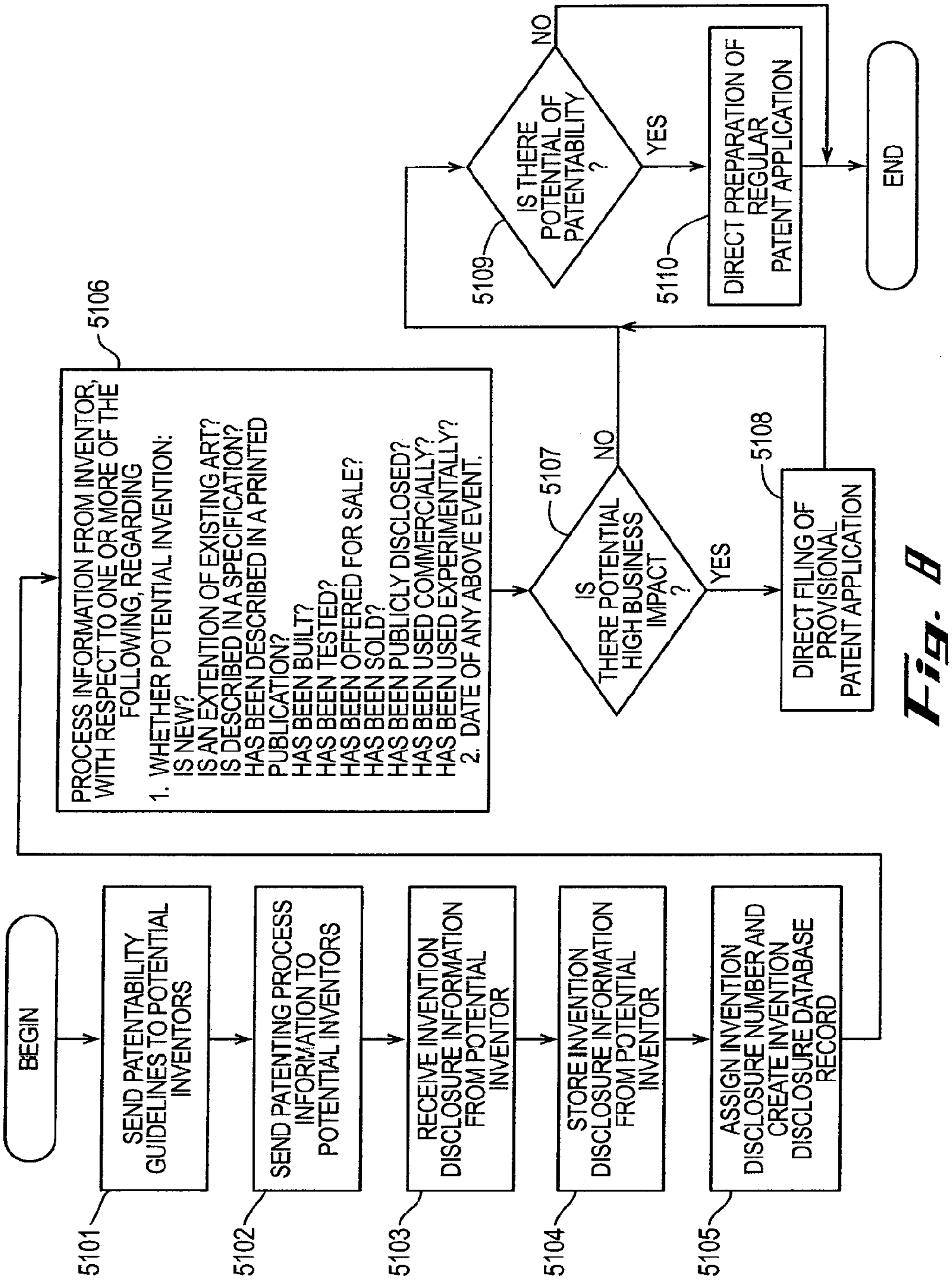
FIG. 8 shows a illustration of an initial patent system in accordance with an embodiment of the present invention.

FIG. 8 shows an illustration of an embodiment of the present invention. In an embodiment, an initial patent system can perform a method to stimulate and process innovations. Patentability guidelines can be sent to potential inventors (e.g., innovators) (box 5101). For example, such guidelines can be e-mailed or sent by a Web server. Also, patenting process information can be sent to potential inventors (box 5102). Examples of patenting process information include directions for preparing invention disclosures, guidelines with respect to potentially patentable subject matter, and so on. Invention disclosure information can be received from a potential inventor (box 5103) and stored (box 5104). An invention disclosure number can be assigned to the invention disclosure and a corresponding database record can be created (box 5105). In an embodiment, the invention disclosure can be analyzed based on information from the inventor with respect to whether potential invention is new; is an extension of the existing art; is described in a specification; has been described in a printed publication; has been built; has been tested; has been offered for sale; has been sold; has been publicly disclosed; has been used commercially; has been used experimentally; and the date of any of the foregoing, if any; and other information related to patentability (box 5106). It is then determined if there is a potentially high business impact to the invention (e.g., based on inventor submitted information, based on a subject matter expert (SME) opinion, based on a manager's assessment, etc.) (box 5107). When there is a potential high business impact, filing of a provisional patent application can be directed (5108). Whether or not a provisional patent application is filed, it can subsequently be determined (box 5109) if there is a potential of patentability. When there is a potential of patentability, preparation of a regular patent application can be directed (box 5110).

Patent Project System

Patent project system 5200 can store and track information related to patent applications. Patent project system 5200 may be used to schedule, execute, and track the progress of disclosure meetings between innovators and patent professionals. Patent professionals may be patent agents and patent attorneys. Among other things, patent project system 5200 helps ensure that patent applications are filed before a bar date. For example, patent project system 5200 can be adapted to provide a warning or a reminder if a patent application process is not making projected or anticipated progress. For example, an e-mail may be generated to a person responsible for filing the patent application, to a manager of a corporation's patent department, etc.

Patent Tracking System

Patent tracking system 5300 can track the progress of patent applications. For example, patent tracking system 5300 can be used to track deadlines related to response to office actions. Commercial software packages may be used in conjunction with patent tracking system 5300. For example, CPI may be used to track a docket of inventions for which patent applications will be filed or have been filed. Patent tracking system 5300 can also be adapted to cross reference related patent applications. Furthermore, patent tracking system 5300 may be used to generate information disclosure statements that must be filed with the U.S. Patent and Trademark Office ("PTO").

Patent Response System

Patent response system 5400 can generate responses to office actions such as draft responses, response templates, and response forms. The responses, for example, can include boilerplate passages. The boilerplate passages can comprise standard paragraphs containing arguments to overcome common rejections and/or boilerplate rejections. Patent response system 5400 can be organized to contain responses to office actions in a systematic way. The responses can be retrieved for use in future office actions that recite similar rejections or objections.

IP Asset Management System

After an innovator submission has been processed by one or more of trademark protection system 3000, trade secret protection system 3500, copyright protection system 4000 and patent protection system 5000, the innovator submission (i.e., the innovation) may be considered an IP asset. Information related to the IP asset can be stored in IP asset database 6100 of IP asset management system 6000.

IP asset database 6100 can include a plurality of data records, where each IP asset has a corresponding data record (e.g., an IP data record). An IP data record can store and/or associate information related to the IP asset. For example, if the IP asset is a patent, the information can include the patent number, filing date, inventor or inventors, and other information. Similarly, if the IP asset is a trademark, the information can include, among other data, the trademark registration number, the application filing date, and the claimed date of first use of the mark. In another embodiment of the present invention, IP asset database 6100 can include information for categorizing the IP asset (e.g., categorizing the IP assets according to application types such as parent, child, divisional, continuation, continuation-in-part, categorizing the IP assets by technology, and categorizing the IP assets by other relevant characteristics).

IP asset management system 6000 can include data records related to innovators, IP management personnel, products, innovation award programs, and other data records related to the development, maintenance and marketing of intellectual property assets. For example, an IP data record of an IP asset can include information associating the IP data record with data records that identify the innovators of the IP asset, personnel responsible for IP asset management (e.g., development, maintenance, marketing), products that embody the IP asset, companies that are potential licensees or purchasers of the IP asset, and so forth.

Information in IP asset database 6100 may be provided to IP utilization system 7000. In addition, IP asset management system 6000 can be utilized to conduct follow-up communications with innovator 2001. For example, an innovator 2001 can receive awards when a patent disclosure is submitted, when a patent application is filed, when a patent is issued, and so forth. IP asset management system 6000 can store information and generate reports and forms related to innovator award programs. As another example, IP asset management system 6000 can assist in scheduling and conducting follow-up sessions and communications with an innovator to obtain new innovations from innovator 2001 (e.g., a follow-up innovation related to a prior invention disclosure, a new innovation related to a commercial project, an innovation related to a service and/or product being developed for internal use, and so on).

IP Utilization System

IP utilization system 7000 can comprise a plurality of systems such as potential utilization system 7100, utilization assessment system 7200, and utilization decision system 7300. Examples of the operations of these systems are described below. IP utilization system 7000 can receive information from IP asset management system 6000 to determine and/or generate reports regarding how an IP asset is to be utilized, e.g., abandoned, marketed, and/or donated.

Potential Utilization System

Potential utilization system 7100 can receive information from IP asset management system 6000 such as IP asset utilization information. IP asset utilization information can include reports as to newly-issued; patents newly-registered trademarks and copyrights; newly-filed patent trademark, and copyright applications; updated reports concerning the scope of a patent portfolio; new trade secrets; and so on. The reports can group the IP asset information based on related innovative products or services as well as dates and other criteria. In an embodiment, IP utilization system 7000 can collect information regarding an initial valuation of an IP asset. The initial valuation can be based on an objective standard, a subjective standard, or a combination thereof. An objective standard can be based on how the market is likely to value an IP asset, historical data regarding valuations of similar IP assets, and/or marketing data of comparable IP assets, etc. A subjective standard may be based on perceived value or importance of the IP asset to the company.

In another embodiment of the present invention, potential utilization system 7100 can generate a prioritization assessment of an IP asset. Prioritization of an IP asset may be based at least in part on an initial valuation of an IP. Prioritization can also be based at least in part on a timing factor related to the creation of the IP asset. The timing factor may be a ranking based on whether the IP asset is likely to generate revenue for the company in the near term or whether the IP asset is ahead of its time in terms of revenue generation (e.g., revenue generation from marketing of a commercial embodiment, revenue generation from marketing of the IP asset, etc.). Another factor for prioritization of an IP asset can be a likelihood of the IP asset being commercialized. For example, a prioritization factor can be based at least in part on how likely the IP asset is going to be transformed into a commercial product or service. For example, whether commercialization of the IP asset is going to make immediate profits for the company or whether it is a "shot in the dark."

Thus, each IP asset in a potential utilization database of potential utilization system 7100 can be associated with a utilization assessment (e.g., based on a valuation, a prioritization). The company may establish a threshold value for determining utilization of an IP asset. An IP asset with a value exceeding the value threshold may be considered to have higher potential for utilization. Conversely, an IP asset with a value not meeting the value threshold may be considered to have little or no potential for utilization.

In another embodiment, potential utilization system 7100 can be a subset of IP asset management system 6000. For example, while IP asset management system 6000 can store and track all patent-related innovations (e.g., patent applications, issued patents, patent disclosures for which applications are being drafted), potential utilization system 7100 can store information and generate reports for realized IP assets such as issued patents, registered trademarks, registered copyrights, and so on.

Utilization Assessment System

Utilization assessment system 7200 can be adapted to receive information from potential utilization system 7100. For example, utilization assessment system 7200 may be configured to retrieve information associated with IP assets with high potential for utilization.

Utilization assessment system 7200 may be adapted to contain links to other resources. For example, a user of utilization assessment system 7200 can link to other resources to assess how the IP assets may be utilized. Preferably, the resources may be linked via the Internet. The resources may include, without limitation, a competitor's websites, the PTO, Lexis, and so on.

The user can input a variety of information into utilization assessment system 7200. The information input are related to the IP assets, including valuation information, competitive product information, patent information, customer information, infringement information. The user may also link to internal databases. Internal databases may include information related to, among other items, the company's core technology and competitive issues.

Utilization Decision System

When assessment with respect to an IP asset is done, information related to the IP asset may be forwarded to utilization decision system 7300. A user could use utilization decision system 7300 to make a number of decisions. The decisions made using utilization decision system 7300 may include: (1) abandoning an IP asset; (2) marketing an IP asset (e.g., whether to license or sell the IP asset, whether to assert an IP asset, whether to cross-license the patent, etc.), and (3) whether to donate the IP asset. In another embodiment, the decisions can include (4) a do-not-market decision because the IP asset provides a competitive advantage, or (5) a do-not-market decision because the IP asset can be used as a defensive asset (e.g., as the basis of a counterclaim when a competitor sues on its patents). In still another embodiment, the decisions could include (6) a decision to enforce the IP assets or (7) a decision to trade the IP asset.

Utilization decision system 7300 can generate a decision and/or reports based at least in part, on information received from utilization assessment system 7200. For example, a utilization decision can be based on a scoring scheme that weighs a variety of factors. In an embodiment, when an IP asset receives an extremely high score from the scoring scheme, the decision may be to market the IP asset. On the other extreme, when an IP asset has a very low score from the scoring scheme, it may be appropriate to abandon the IP asset altogether (e.g., a patent can be abandoned by deciding not to pay a maintenance fee, etc.). When a decision to abandon an IP asset is made, the abandonment decision can be communicated to IP asset management system 6000 to update the appropriate records.

In an embodiment, two ranges of scores can lead to a decision to donate an IP asset or a decision to defer the utilization. For example, there can be two middle range scores, each of which is less than the score that indicates marketing of an IP asset and greater than the score that indicates abandonment of the IP asset. The lesser of the two middle ranges (e.g., just above the abandonment range) can indicate that an IP asset should be donated. For example, the IP asset may have value but not enough value to allocate corporate resources for marketing of the IP asset (e.g., the corporate resources are focused upon higher return opportunities). Accordingly, the IP asset can be donated to generate revenue in the form of a tax benefit or to generate goodwill for the corporation. The greater of the two middle ranges (e.g., just below the marketing range) can indicate that an IP asset may be a candidate for marketing, but at present it does not meet the requirements for establishing a marketing project. Thus, the IP asset can remain an IP asset that may be marketed, but a final decision regarding utilization is deferred for subsequent consideration.

IP Donation System

IP donation system 8000 may comprise a plurality of systems, such as donate project system 8100 and donate contract system 8200. Examples of the operations of these systems are described below.

Donate Project System

When a decision is made to donate an IP asset, information related to the IP asset can be forwarded to donate project system 8100. Donate project system 8100 can include data records of past and/or potential donees of IP asset. Donate project system 8100 can store data and generate reports regarding the donation of an IP asset. For example, donate project system 8100 can generate a report outlining advantages and disadvantages associated with each potential donee, reports regarding prior donations, detailed report regarding donees, and so forth. Potential donees of an IP asset can include universities, government research facilities, not-for-profit organizations, and charitable organizations. When a donate decision has been made, information related to the donation may be forwarded to donate contract system 8200.

Donate Contract System

Donate contract system 8200 comprises information related to generation of a contract to donate an IP asset. For example, when an IP asset is to be donated to a university, donate contract system 8200 can generate form contracts, contract templates, reports regarding the execution of contracts, and so on. After a contract to donate an IP asset is executed, the executed contract can be indexed by information in the donate contract system 8200 so that information about the contract is associated with an IP data record corresponding to the donated IP asset.

Marketing System

After a decision is made that an IP asset should be marketed, information associated with the IP asset can be forwarded to IP marketing system 9000. IP marketing system 9000 may comprise a plurality of systems, such as marketing project system 9100 and marketing contract system 9200. Examples of the operations of these systems are described below.

Marketing Project System

Marketing project system 9100 can store, track and report information related to a project to market an IP asset. For each IP asset to be marketed, a marketing project can be established to define marketing steps and deadlines. In an embodiment, when a marketing project identifies a plurality of customers of an IP asset, after a decision to market to each customer is made, a separate project is created for each IP asset/customer transaction to track and monitor the progress of marketing the IP asset to each customer.

Figure 182:
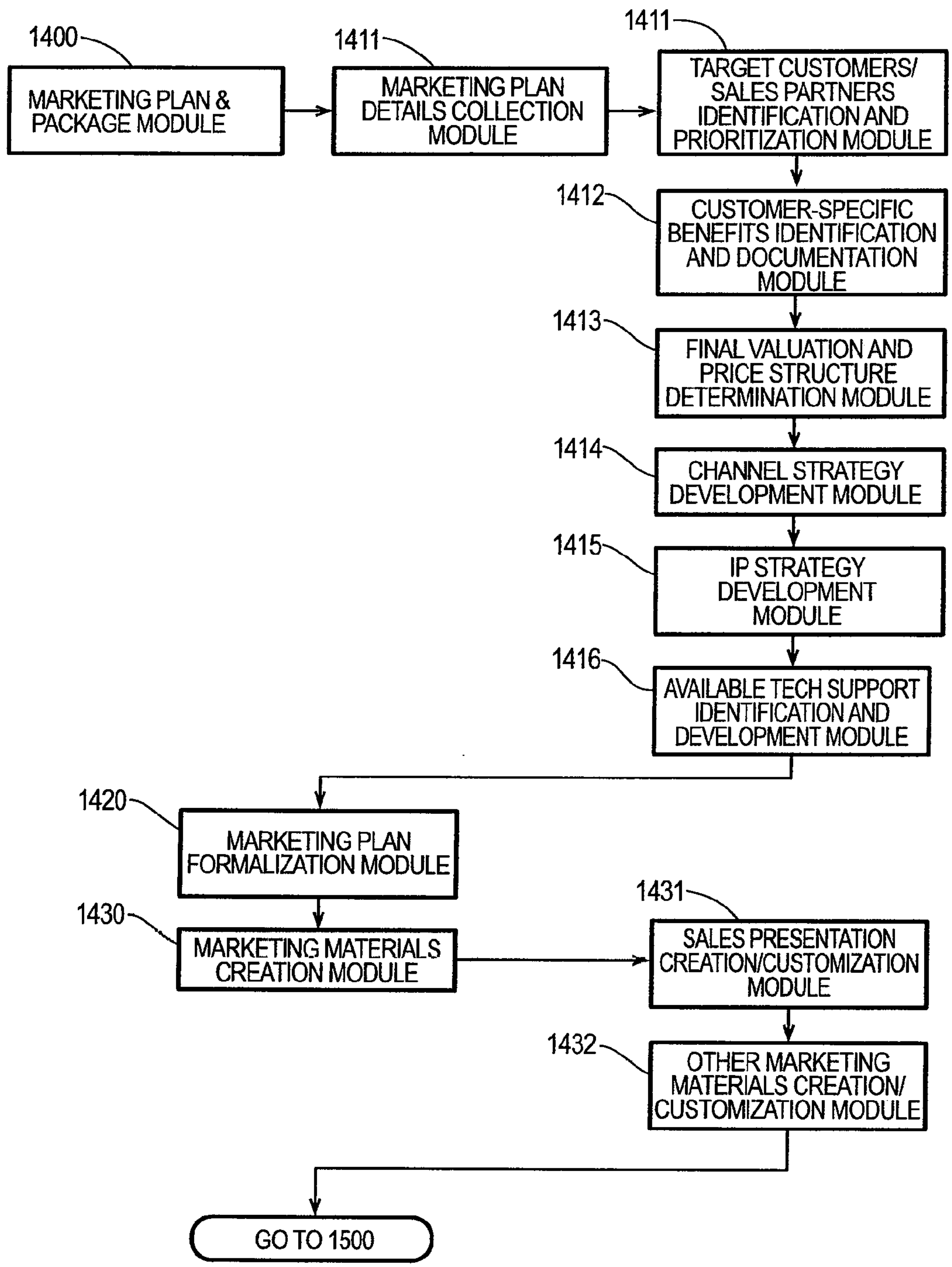
Figure 183:
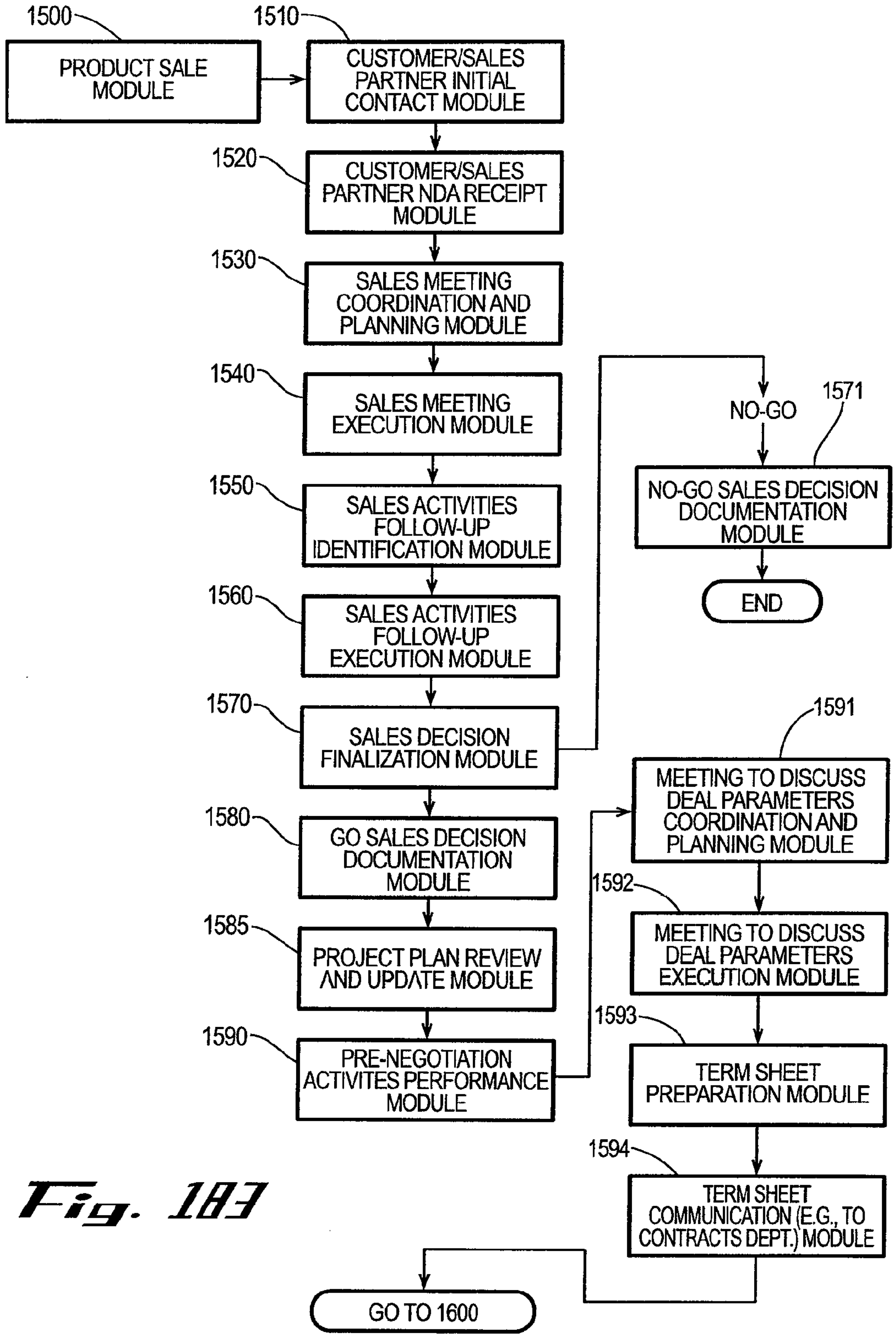

Each marketing project can include, for example, a project data record that identifies the project and associated information such as the IP asset being marketed, potential customers, actual customers, internal personnel associated with the project, project actions, individual action, and so on. For example, FIGS. 182-183 show methods, systems, and modules for marketing an IP asset. In another embodiment, FIGS. 192-193 also show steps and substeps for marketing an IP asset such as task 4—Develop marketing plan & package, and task 5—Sell product. As another example, FIGS. 84-110 show an embodiment of a marketing module of an IP management system.

Marketing Contract System

In an embodiment, when an IP asset is successfully marketed, the marketing effort culminates with the execution of a contract. Marketing contract system 9200 can receive information for marketing project system 9100 to generate and track execution of a contract to market an IP asset. In an embodiment, marketing contract system can generate draft contracts based on contract templates or previously executed contracts. Marketing contract system 9200, in an embodiment, can define, track, and report on the progress of contract execution.

Figure 184:
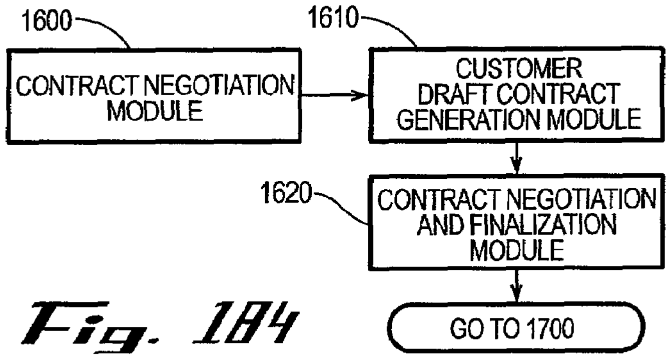
Figure 185:
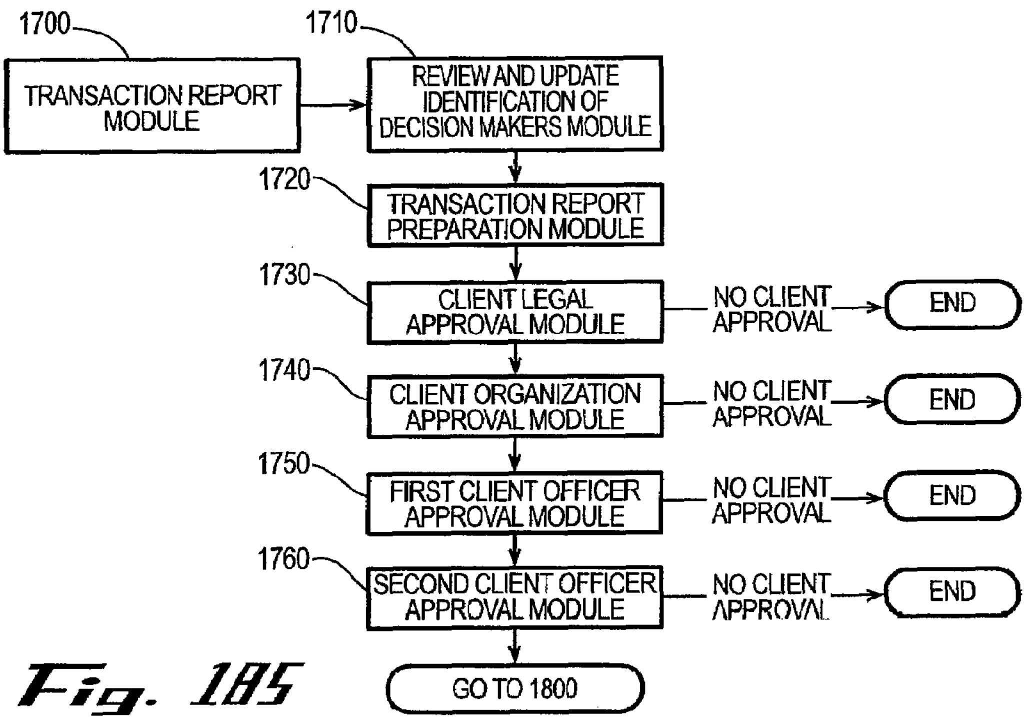
Figure 186:
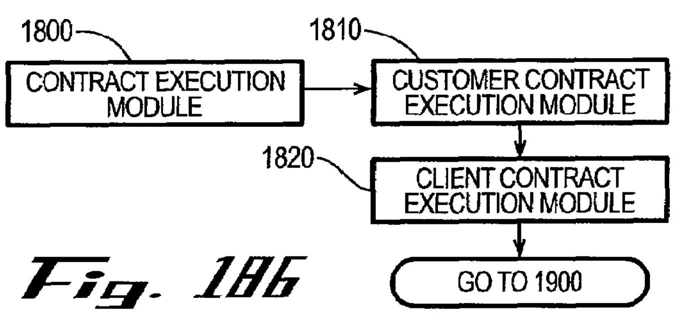

For example, FIGS. 184-186 show methods, systems, and modules for generating a marketing contract with respect to the marketing of an IP asset. In another embodiment, FIGS. 193-194 show steps and substeps for generating a marketing contract with respect to marketing of an IP asset such as: task 6—Negotiate contract; task 7—Complete & approve transaction report; and task 8—Execute contract. As another example, FIGS. 111-150 show an embodiment of a contracts/agreements module of an IP management system.

In an embodiment related to the management of trademarks and trademark-related intellectual property assets (e.g., a trademark application), quality control can be a significant issue. More specifically, for a trademark owner to maintain its rights in a trademark, the trademark owner is responsible for maintaining the consistent use of the trademark, including color, font, spelling and the like. Maintaining consistent use typically involves regularly auditing uses of the mark. Examples of a such auditing include auditing within an organization, contracting to have audits performed, and auditing an external entity. Maintaining consistent use of a trademark can be easier to do when the trademark owner is the one using the mark, as compared to when an external entity is using the trademark. The task of contracting and auditing is more difficult if the trademark owner is allowing many external entities to use the trademark (e.g., as a licensee) for marking products and services, for events the entity sponsors, for representing themselves as sales or service agents, and the like. The difficulty of the task continues to increase if the external entities are spread across a large geographic region, such as a state, country or the world.

Figure 226:
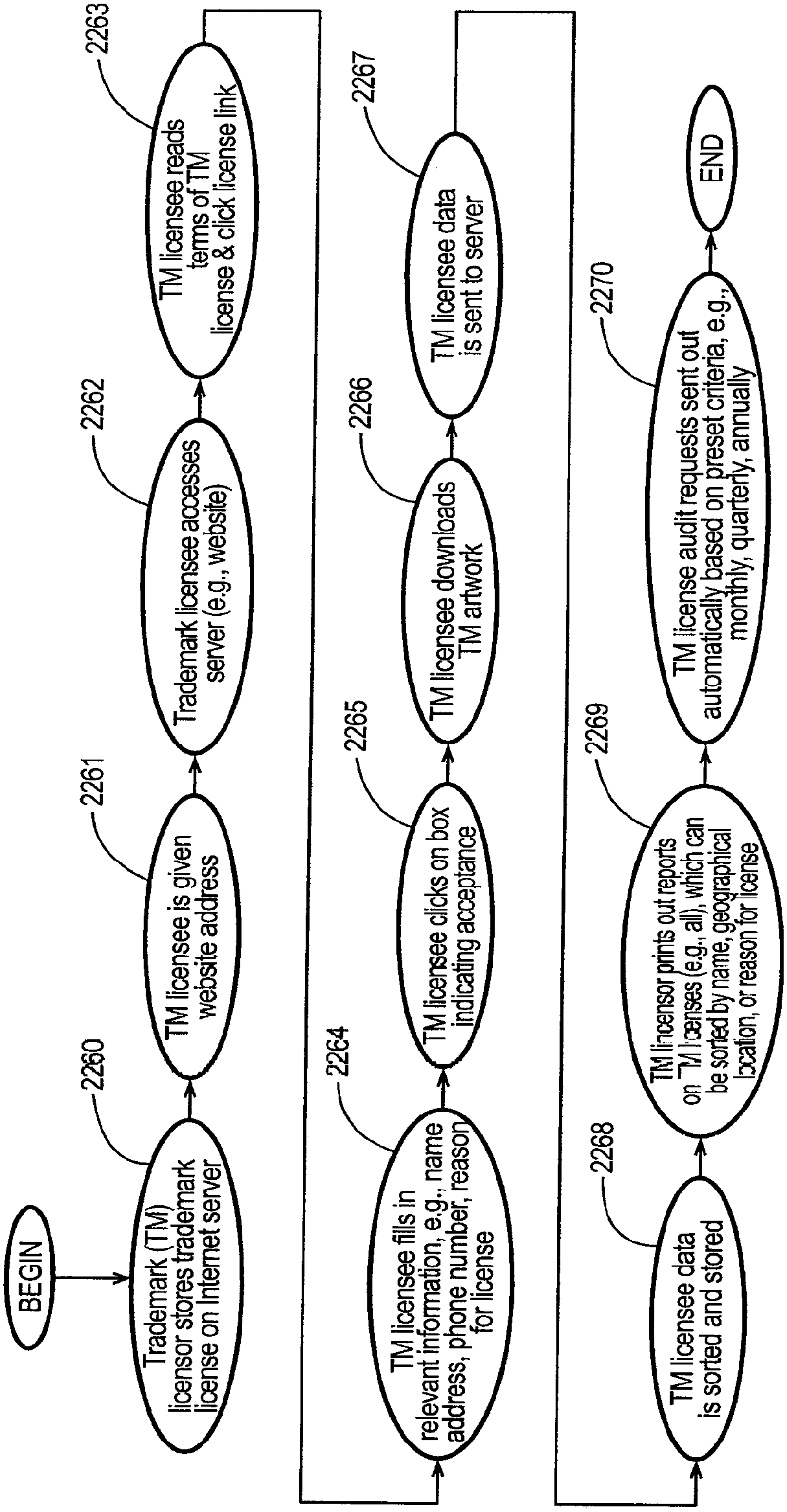
FIG. 226 shows an illustration of a trademark management process in accordance with an embodiment of the present invention.

For such situations, a stellar trademark owner may be sending out trademark licensee agreements to hundreds, or even thousands, of trademark licenses across a wide geographic area on an annual basis. Getting these contracts sent out in the mail or electronically, signed by the external parties, returned in the mail, sorted and stored for later auditing is typically an arduous process. Accordingly, as shown in FIG. 226, and in another embodiment of the present invention, marketing contract system 9200 can include trademark licensing and auditing modules. A trademark licensor can store trademark license terms on an Internet server (box 2260). A trademark licensee (e.g., prospective, current, and so on) can be given the website address to access the trademark license (box 2261). The trademark licenssee can access the server (box 2262), read the terms of the trademark license, and click a link to license a trademark (box 2263). The trademark licensee can fill in relevant information in an online form (e.g., name, address, phone number, reason for license, etc.) (box 2264) and click to indicate acceptance (box 2265). The trademark licensee can then download trademark artwork, if desired (box 2266), and trademark licensee data can be sent to the server (box 2267). The trademark licensee data can be sorted and stored (box 2268). In an embodiment, the trademark licensee data can include information for cataloging and/or categorizing registered trademarks (e.g., cataloging trademarks by family, status (e.g., filed, contested, allowed, registered), and/or application type (e.g., continuation, divisional, primary, secondary). The trademark licensor can print out reports on trademark licenses (box 2269) in one of several sorted formats. The trademark licensor can also send out audit requests (box 2270). The audit requests can be sent out automatically periodically, e.g., monthly, quarterly, or annually. This contract system can be adapted for patent, copyright, and trade secret as well.

Figure 7:
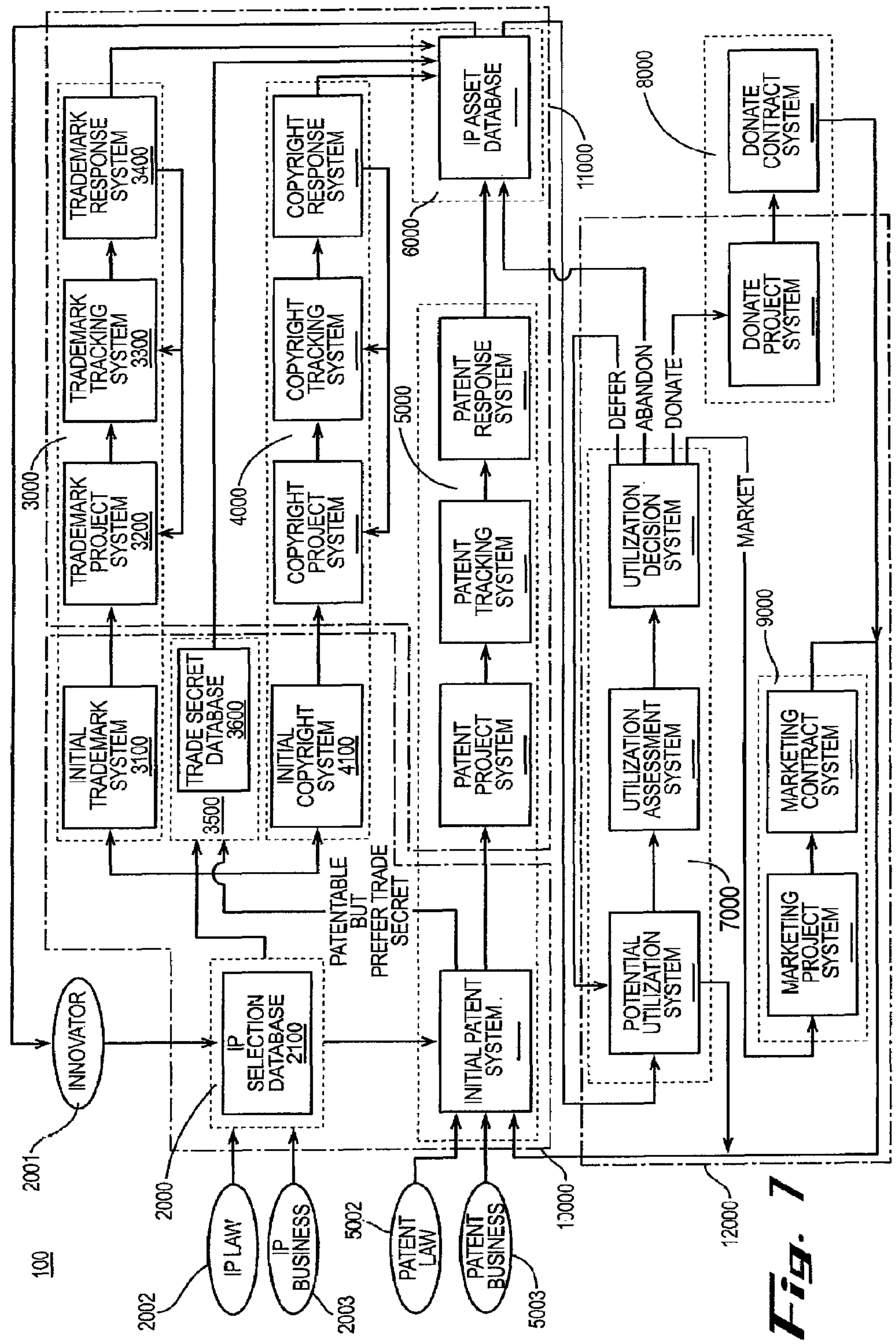
FIG. 7 is a schematic diagram showing a specific implementation of a preferred embodiment of the present invention.

FIG. 7 is a schematic diagram showing a specific implementation of a preferred embodiment of the present invention. In particular, FIG. 7 shows a system to identify and develop intellectual property 10000, a system to protect and maintain intellectual property 11000, and a system to utilize intellectual property 12000.

FIG. 9 is a schematic diagram showing another embodiment of a system architecture of the present invention. Server 100 includes and/or is coupled to a plurality of data systems including IP enforcement system 6500 and IP trade system 7500. Each of IP enforcement system 6500 and IP trade system 7500 can comprise data systems including instructions to be executed by a processor and data storage (e.g., a portion of data storage of database 112). For example, IP enforcement system 6500 can include IP enforcement instructions 130. Also, IP trade system 7500 can include IP trade instructions 131.

IP enforcement system 6500 and IP trade system 7500 can perform functions and operations related to the development, marketing and maintenance of intellectual property as described herein. For example, IP enforcement system 6500 can perform functions and operations related to enforcement of intellectual property rights. Enforcement of intellectual property rights can include operations that look to maintain a competitive advantage by obtaining an injunction against a competitor, thus stopping such competitor from using, making, selling, copying, or offering to sell such IP asset. For example, enforcement of intellectual property rights can include the initiation of infringement suits such as patent infringement suits, copyright infringement suits, trademark infringement suits, and trade secret infringement suits against competitors.

IP trade system 7500 can perform functions and operations related to trading of intellectual property rights. For an example, in an embodiment, intellectual property rights can be traded to gain access to other intellectual property rights such as the intellectual property rights of a competitor, the intellectual property rights of a partner, the intellectual property rights of a supplier, and the intellectual property rights of a customer. In another embodiment, IP trade system 7500 can perform functions and operations related to defending against intellectual property law suits initiated by competitors. For example, an IP trade system 7500 can track and maintain information about intellectual property assets that may not be used offensively to maintain a competitive advantage, but can be used defensively to assist in defending against in intellectual property lawsuit initiated and maintained by a competitor. In another embodiment, IP trade system 7500 can include information related to obtaining and/or maintaining design freedom of products and services to be developed, implemented and/or marketed. For such examples, the system may sort and identify similar or related IP assets to those being asserted against or into such areas that design freedom is desired. The system could also sort and identify IP assets related to other areas in which each party has product and services that might be infringing or into design freedom.

FIG. 10 is a schematic diagram showing an embodiment of a system architecture of the present invention. In this embodiment, each of the plurality of data systems correspond to the plurality of data systems illustrated in FIG. 9. In another embodiment, each data system can be a stand alone system, i.e., each of the data systems can include a server having a memory, a processor and mass storage (e.g., to store data of a data base).

In an embodiment of the present invention, IP enforcement system 6500 is coupled to IP utilization system 7000. IP utilization system 7000 can receive information from IP asset management system 6000 in order to process decisions concerning the enforcement of intellectual property assets. In an embodiment, IP utilization system 7000 can store, access and report information related to decisions to enforce an IP asset. IP asset management system data records can be updated based, at least in part, on a decision to enforce an IP asset.

In an embodiment, IP trade system 7500 is coupled to IP utilization system 7000. IP utilization system 7000 can receive information from IP asset management system 6000 in order to process decisions concerning the trading of IP assets. In an embodiment, IP utilization system 7000 can store, access and report information related to decisions to trade an IP asset. IP asset management system data records can be updated based, at least in part, on a decision to trade an IP asset.

Figure 11:
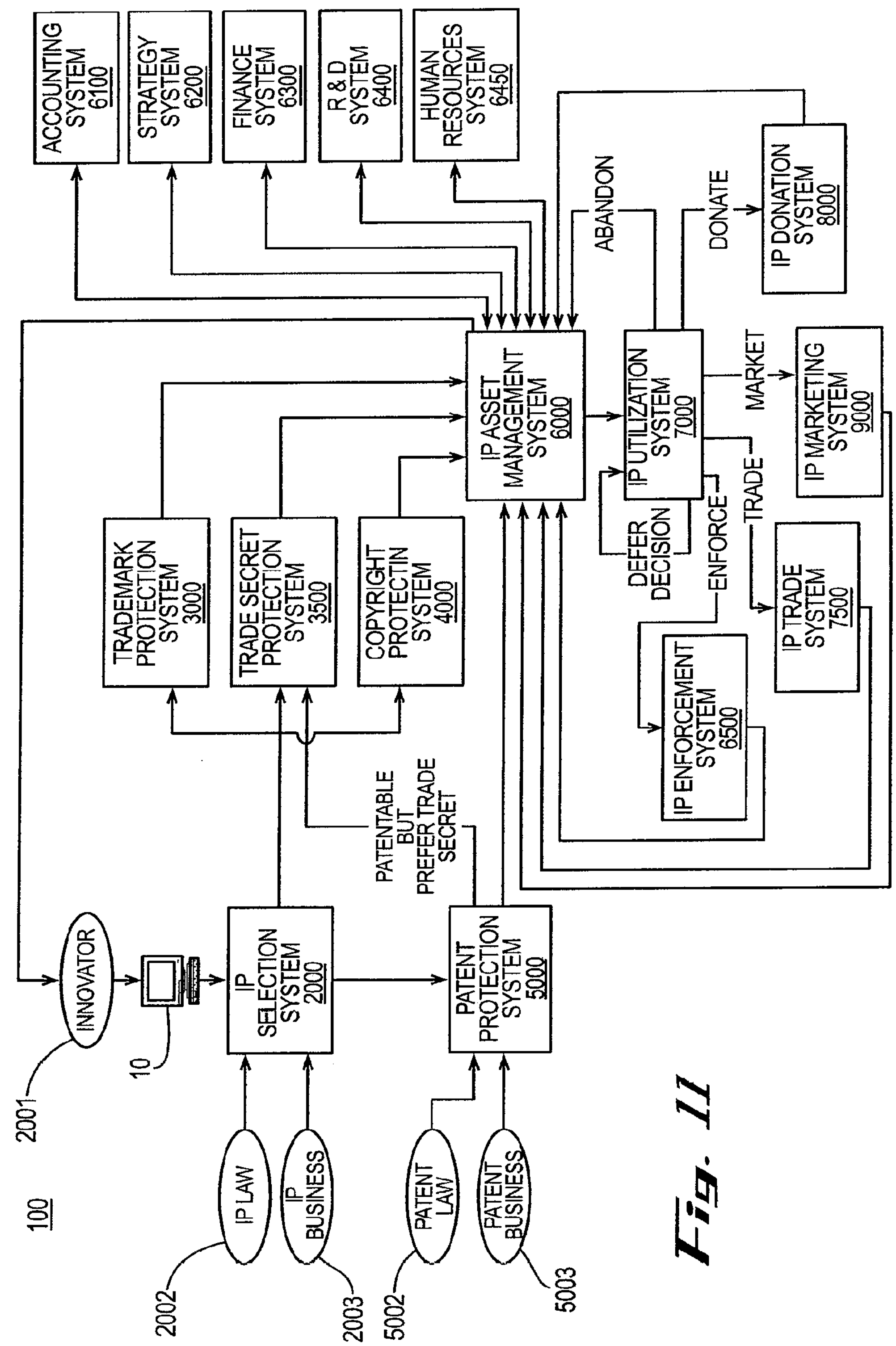
FIG. 11 shows a schematic diagram of an illustration of an embodiment of a system architecture of the present invention.

FIG. 11 shows a schematic diagram of an illustration of an embodiment of a system architecture of the present invention. In this embodiment, IP asset management system 6000 is coupled to other standard functioning systems of an organization, such as accounting system 6100, strategy system 6200, finance system 6300, research and development (R&D) system 6400, and human resources (HR) system 6450. In this embodiment, IP asset management system 6000 can receive information from and send information to each of accounting system 6100, strategy system 6200, finance system 6300, R&D system 6400, and HR system 6450 for inventor information comprising legal name, address, start date, supervisor information for approvals/innovation award, etc. related to management of IP assets. For example, in an embodiment, accounting system 6100 can track revenues associated with products and services protected by IP assets, revenues generated by utilizing the IP assets (marketing, licensing, selling, and tax savings from donating IP assets. Strategy system 6200 can track core business areas of an organization in relation to the organization's IP assets to ensure properly and fully protected and to consider whether market, license, sell, donate, enforce, and trade. Finance system 6300 can generate models forecasting future IP assets revenues and value generators, and budgeting of future expenses associate with such IP assets. Finance system 6300 can also track costs associated with protecting IP assets, including filing costs, maintenance costs and marketing IP assets, including packaging, presentations, and advertising. R&D system 6400 can track costs associated with developing IP assets by relating the IP asset to the development or innovation project in the organization, can track to ensure proper IP assets obtained for each R&D project, and can track top innovators in the R&D groups. HR system 6450 can track issues and information related to human resources.

Figure 12:
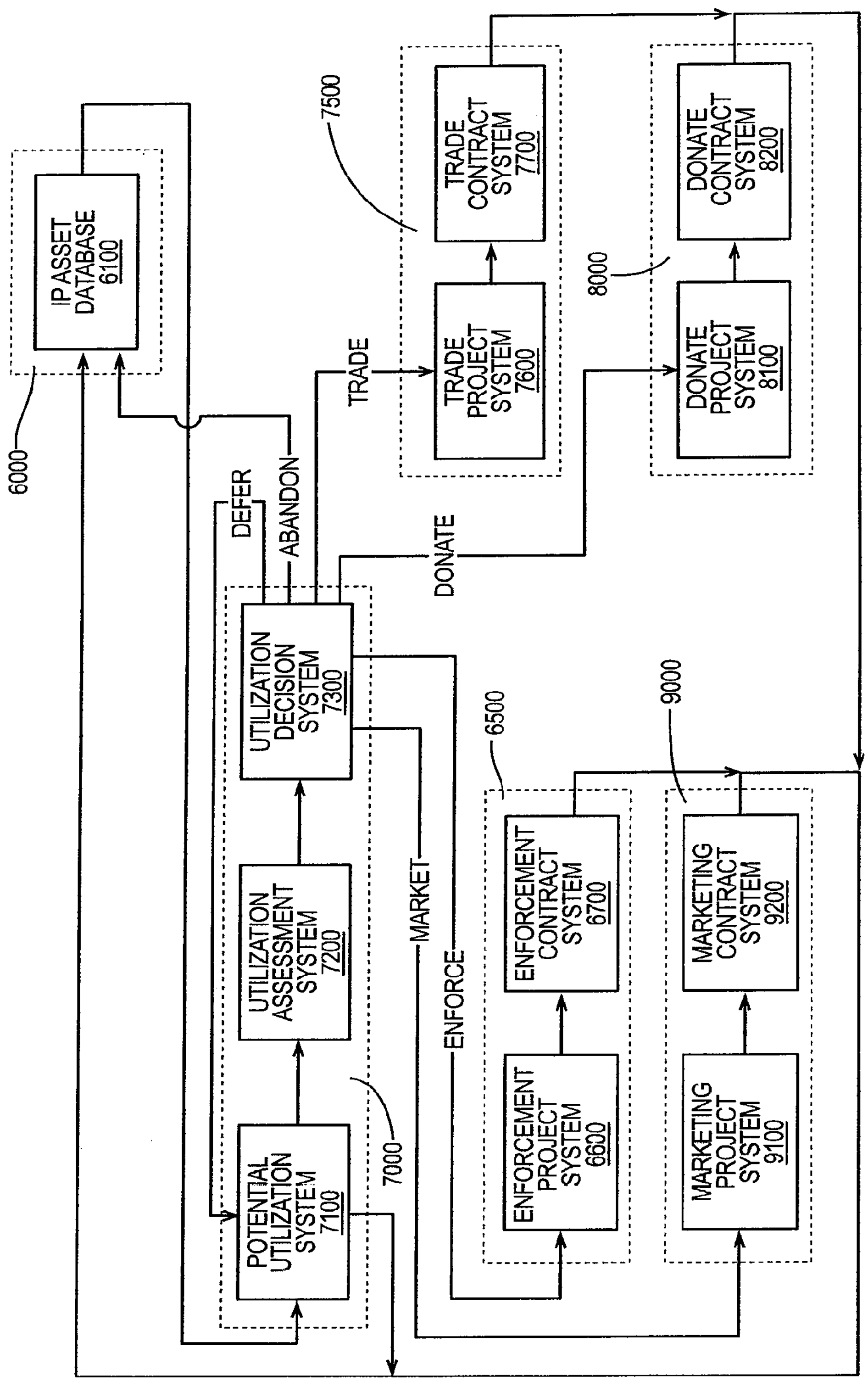
FIG. 12 shows an illustration of an embodiment of the system architecture of the present invention.

FIG. 12 shows an illustration of an embodiment of the system architecture of the present invention. IP enforcement system 6500 may comprise a plurality of systems such as enforcement project system 6600 and enforcement contract system 6700. Examples of the operations of the systems are described below.

When a decision is made to enforce an IP asset, information related to the IP asset can be forwarded to enforcement project system 6600. Enforcement project system 6600 can include data records of past and/or potential enforcement projects related to an IP asset. Enforcement project system 6600 can store data and generate reports regarding the enforcement of an IP asset. For example, enforcement project system 6600 can generate a report concerning strong IP assets, potential infringer products and services, IP assets owned by such potential infringer, and claim charts related to such potentially infringing products and services. Enforcement project system 6600 can also generate a report concerning the status of each enforcement project concerning enforcement or lawsuits associated with IP asset. When an enforcement project is completed, either permanently or temporarily, information related to the enforcement project may be forwarded to enforcement contract system 6700.

Enforcement contract system 6700 can comprise information related to generation of a contract related to enforcement of an IP asset. For example, after a successful enforcement of an IP asset, a contract may be executed to provide for licensing, royalties and/or payment of damages. Enforcement contract system 6700 can generate foreign contracts, contract templates, reports regarding the execution of contracts and so on. After a contract related to enforcement of an IP asset is executed, the executed contract can be indexed by information in the enforcement contract system 6700 so that information about the contract is associated with an IP data record corresponding to the enforced IP asset.

IP trade system 7500 can comprise a plurality of systems such as trade project system 7600 and trade contract system 7700. Examples of the operations of these systems are described below.

When a decision is made related to a trade of an IP asset, information related to the trade of the IP asset can be forwarded to the trade project system 7600. Trade project system 7600 can include data records of past and/or potentially traded IP assets. Trade project system 7600 can store data and generate reports regarding strong tradeable IP assets, potential related or infringing products or services of another entity, IP assets owned by such entity, claim charts or for each party's IP assets. Trade project system 7600 can also generate reports regarding a trade of an IP asset. For example, trade project system 7600 can generate a report regarding past and potentially traded IP assets. Reports regarding prior traded IP assets, detailed reports regarding entities with whom IP assets were traded and so forth. When a trade decision has been made relating to an IP asset, information related to the trade may be forwarded to trade contract system 7700. Trade contract system 7700 comprises information relating to generation of a contract to trade an IP asset. For example, when an IP asset is traded by cross-licensing or by patent pooling with one or more competitor, partner, customer and supplier. Trade contract system 7700 can generate form contracts, contract templates, reports regarding the execution of contracts and so on. After a contract to trade an IP asset is executed, the executed contract can be indexed by information in trade contract system 7700 so that information about the contract is associated with an IP data record corresponding to the traded IP asset.

Figure 13:
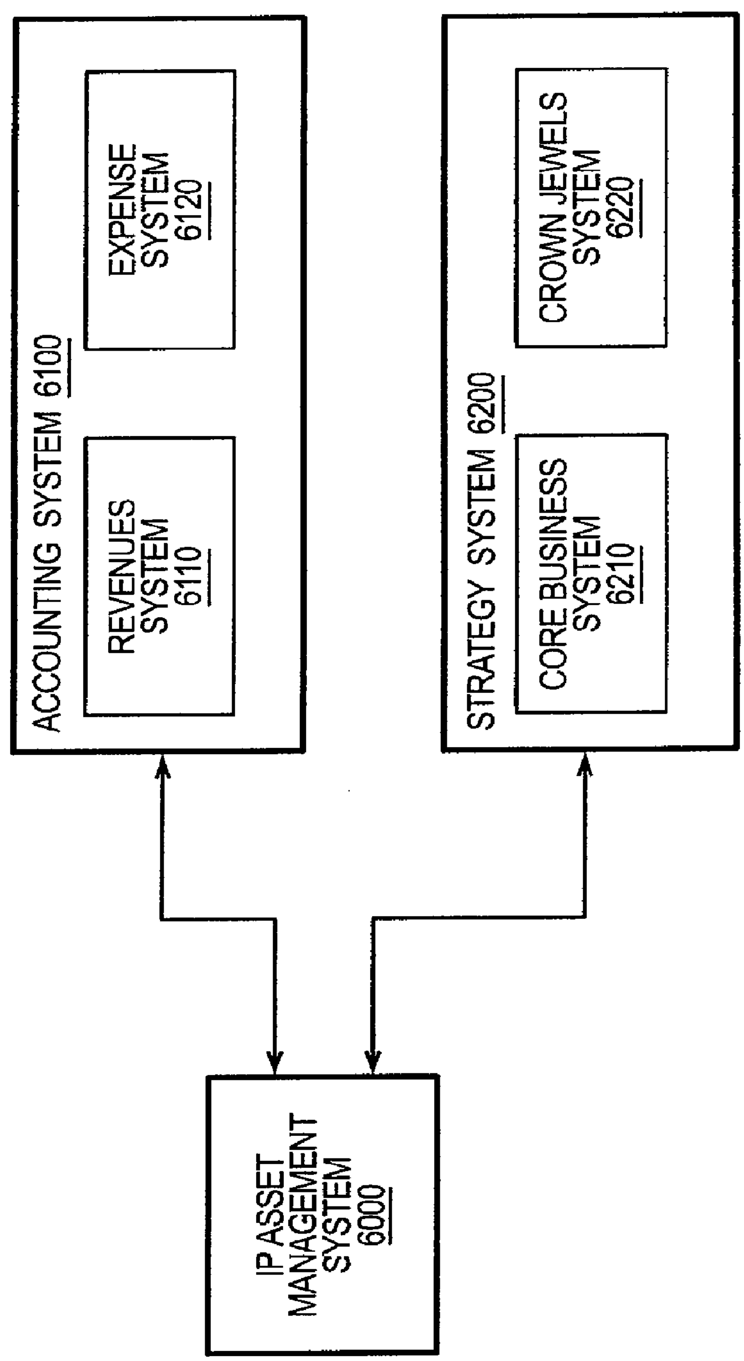
FIG. 13 shows a more detailed illustration of the accounting system and strategy system illustrated in FIG. 11.

FIG. 13 shows a more detailed illustration of accounting system 6100 and strategy system 6200. In an embodiment, IP asset management system 6000 is coupled to accounting system 6100. Accounting system 6100 can include a plurality of systems such as revenues system 6110 and expense system 6120. Revenues system 6110 can track revenues and costs associated with all products and services associated with IP assets sold by the entity, and expense system 6120 can track costs associated with protecting marketing such as IP costs. In another embodiment, IP asset management system 6000 is coupled to strategy system 6200. Strategy system 6200 can include a plurality of systems such as core business system 6210 and crown jewels system 6220. Core business system 6210 can track core business areas of an organization in relation to organization's IP assets to ensure fully protected. Crown jewels system 6220 can ensure key IP assets are enforced and not marketed, licensed, sold, donated, or traded.

Figure 14:
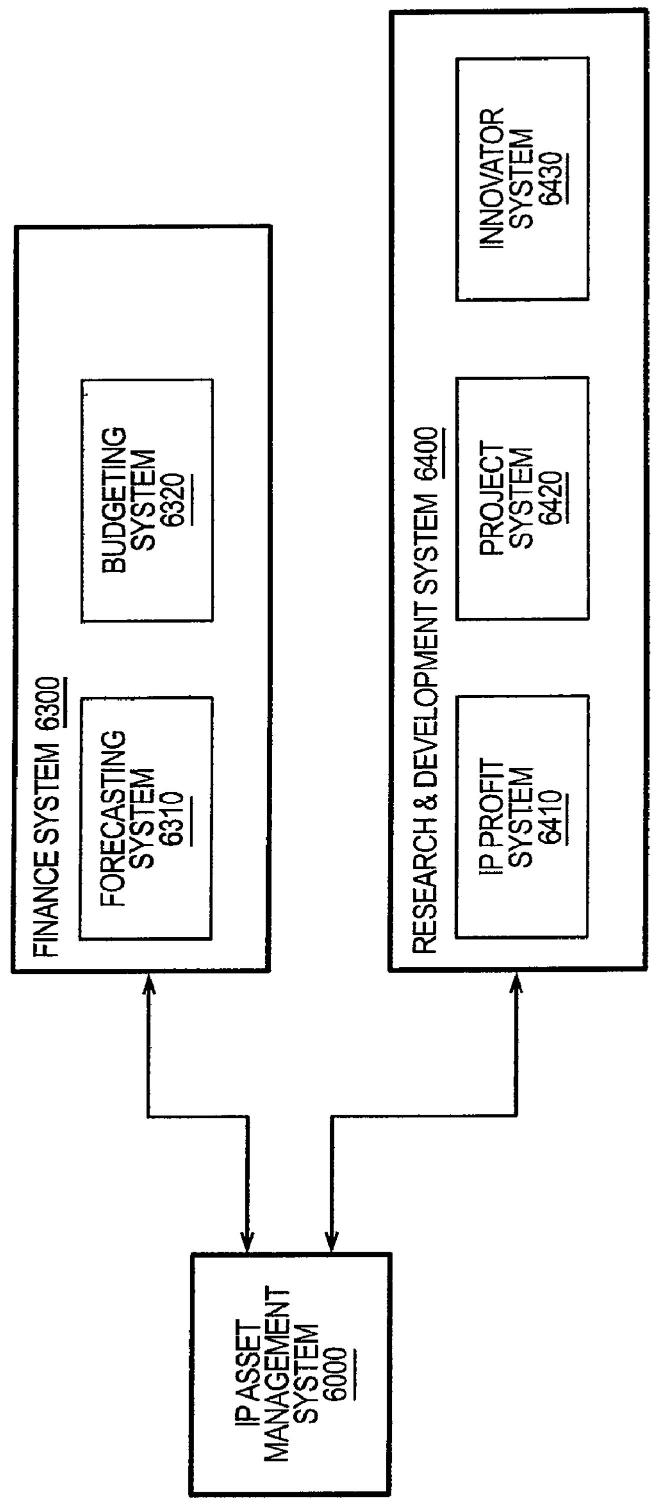
FIG. 14 shows a more detailed illustration of the finance system and research and development system illustrated in FIG. 11.

FIG. 14 shows a more detailed illustration of finance system 6300 and Research and Development system 6400. In an embodiment IP asset management system 6000 is coupled to finance system 6300. Finance system 6300 can include a plurality of systems such as forecasting system 6310 and budgeting system 6320. Forecasting system 6310 can model future IP asset revenues and value generation. Budget system 6320 can estimate future costs associated with protecting marketing such IP assets. In another embodiment, IP asset management system 6000 is coupled to research and development (R&D) system 6400. R&D system 6400 can include a plurality of systems such as IP profit system 6410 and project system 6420 and innovator system 6430. Profit system 6410 can track revenues and costs for IP assets associated with each R&D project. Project system 6420 can track all R&D projects to ensure properly protected with IP assets, and innovator system 6430 can track top innovators in R&D groups.

FIG. 15 shows an illustration of a product opportunity scoring pipeline in accordance with an embodiment of the present invention. The product opportunity scoring pipeline illustrated in FIG. 15 can include information relating to the marketing of intellectual property assets. In accordance with an embodiment, a product opportunity relates to the marketing of an IP asset. A product opportunity scoring pipeline in accordance with an embodiment of the present invention can store, organize, index and present information relating to a plurality of IP assets that are in the process of being marketed. For example, in the embodiment illustrated in FIG. 15, the product opportunity scoring pipeline can store information relating to the marketing of 15 products identified in the "PRODUCT" column as products A, B, C . . . O (i.e., PROD A, PROD B, PROD C . . . PROD O). The product opportunity scoring pipeline can display information relating to the marketing of products A-O. In an embodiment, the products can comprise innovations, intellectual property assets, or a combination thereof.

For example, the product opportunity scoring pipeline can include a plurality of categories such as a product category ("PRODUCT"), a business unit category ("B/U"), a lead personnel category ("LEAD"), a plurality of progress level categories ("L1 through L10"), a completion date goal category ("GOAL"), a product opportunity value category ("%"), and a percentage complete category ("$"). For an example, in an embodiment, the plurality of level progress categories can include progress level 1 through progress level 10 (i.e., L1 through L10). In an embodiment, progress level 1 corresponds to an initial research level, progress level 2 corresponds to a market research level, progress level 3 corresponds to a preliminary transaction report ("PTR") approval level, progress level 4 corresponds to a market plan level, progress level 5 corresponds to a cell level, progress level 6 corresponds to a negotiate level, progress level 7 corresponds to a transaction report approval level, progress level 8 corresponds to an execute contract level, progress level 9 corresponds to a set up contract level, and progress level 10 corresponds to an audit contract level.

In the product opportunity scoring pipeline illustrated in FIG. 15, each product has a corresponding product opportunity score. For example, in an embodiment, a product opportunity score is generated by a opportunity scoring system as illustrated in FIG. 212. In another embodiment, a product opportunity score is generated in accordance with an IP marketing opportunity scoring module illustrated in FIGS. 213 to 218. The product opportunity score for each project can be associated with one of the plurality of progress level categories. For example, in the embodiment illustrated in FIG. 15, the plurality of progress level categories include progress levels 1 through 10. The products A through 0 are each categorized as being in one progress level of the plurality of progress levels. For example, product A is indicated as being in the negotiate level, (progress level 6), and having a product opportunity score of 42. Likewise, product B is indicated as having a product opportunity score of 45 and is at the audit contract level (progress level 10). Moreover, for each product that is included in the product opportunity scoring pipeline, the specific business unit, lead personnel, completion date goal, product opportunity value and percentage complete can be identified.

The product opportunity scoring pipeline illustrated in FIG. 15 can display progress information corresponding to the marketing of one or more products, and each product can correspond to an IP asset that is being marketed. The product opportunity scoring pipeline illustrated in FIG. 15 can store and categorize information to allow for effective management and administration of intellectual property assets. For example, the product opportunity scoring pipeline illustrated in FIG. 15 can be reformatted to display information categorized by each of the categories. For example, in the embodiment illustrated in FIG. 15, the product opportunities are arranged alphabetically.

FIG. 16 shows an embodiment of a product opportunity scoring pipeline in which the product opportunity scoring pipeline information is categorized by lead person responsible for each product opportunity. For example, in the embodiment illustrated in FIG. 16, the product opportunity scoring pipeline shows in an efficient manner the lead person responsible each of the product opportunities (e.g., a person W, a person X, a person Y, and a person Z).

FIG. 17 shows an illustration of a product opportunity scoring pipeline in which products are organized according to progress level or work in progress (WIP). For example, as illustrated in FIG. 17, the products are arranged in order from those product opportunities that have advanced to the highest level (progress level 10) to those that are at the earliest level (progress level 1). Thus, the product opportunity scoring pipeline provides valuable information as to the progress status of the overall marketing efforts as well as the relative distribution of product opportunities in terms of progress towards completion. The product opportunity scoring pipeline can also be viewed based on other categories such as by business unit, by completion date goal, by product opportunity value, and by percent complete. For example, in an embodiment of the present invention, the product opportunities can be sorted and displayed by product opportunity value (e.g., from the product opportunity having the highest product opportunity score to the product opportunity having the lowest product opportunity score).

Figure 18:
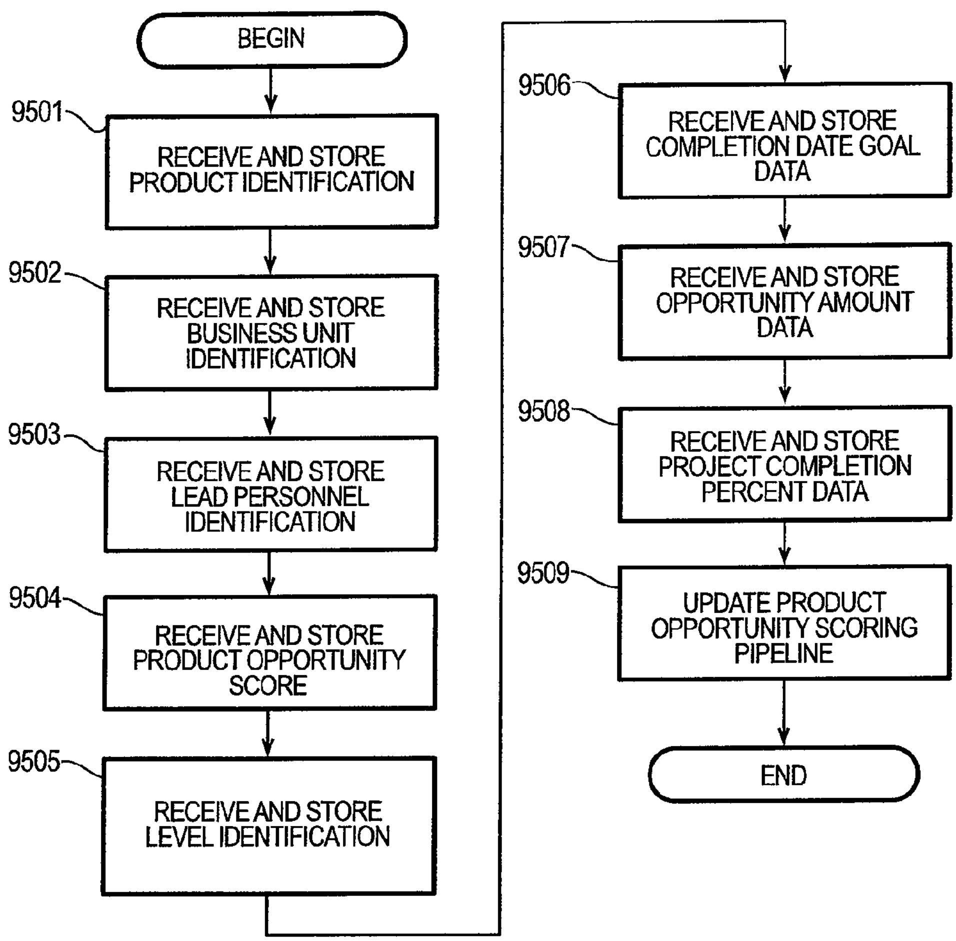

FIG. 18 shows an illustration of an embodiment of the present invention. In an embodiment of the present invention, information about product opportunities are populated into a product opportunity scoring pipeline. A product identification can be received and stored (box 9501). A business unit identification corresponding to the product can be received and stored (box 9502). An identification of a lead personnel responsible for the product opportunity can be received and stored (box 9503). A product opportunity score can be received and stored (box 9504). Moreover, a level identification of the product opportunity can be received and stored (box 9505). A completion date goal data, opportunity value data, and project completion percent data, can be received and stored (boxes 9506-9508). Based on the received product opportunity scoring pipeline data, the product opportunity scoring pipeline can be updated (box 9509).

Figure 19:
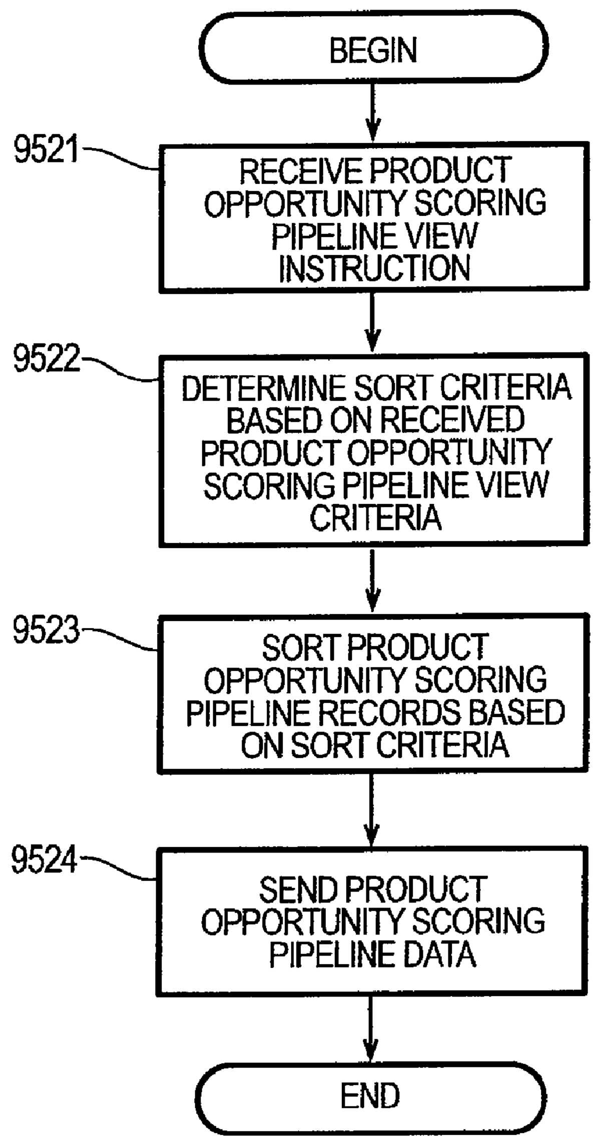

FIG. 19 shows an illustration of an embodiment of the present invention. A product opportunity scoring pipeline view instruction can be received (box 9521). For example, according to an embodiment of the present invention, a person responsible for management of oversight of the marketing of intellectual property assets can communicate an instruction to view the product opportunity scoring pipeline, e.g. via a computer. Based on the received product opportunity scoring pipeline instruction, a view criteria can be determined and used as a sorting criteria for the product opportunity scoring pipeline (box 9522). The product opportunity scoring pipeline records can be sorted based on the determined sort criteria (box 9523). Then, the product opportunity scoring pipeline data can be sent (box 9524). Thus, in an embodiment of the present invention, a user can view the status of the product opportunity scoring pipeline, e.g. on a computer, on a mobile computing device and so forth.

Figure 20:
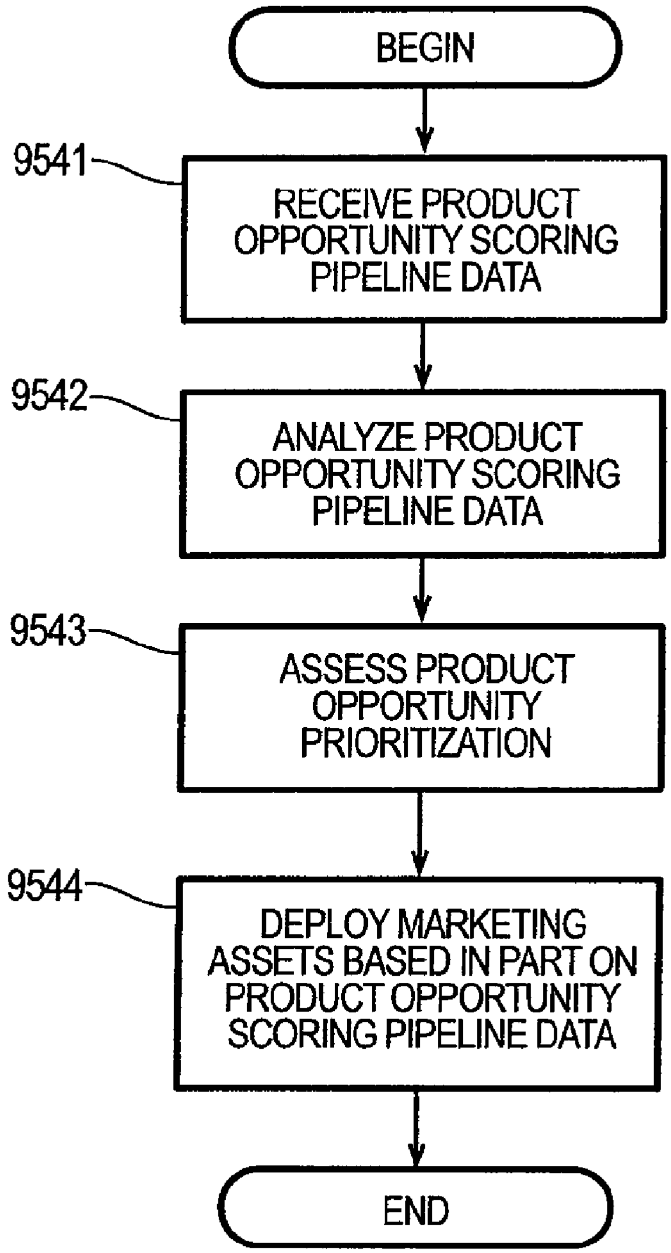

FIG. 20 shows an illustration of the present invention. In an embodiment, product opportunity scoring pipeline data is received (box 9541). For example, a computer can receive product opportunity scoring pipeline data and display the product opportunity scoring pipeline to a user. In another embodiment, a mobile computing device such as a personal digital assistant can receive the product opportunity scoring pipeline data. A user can analyze the product opportunity scoring pipeline data (box 9542). Product prioritization can be assessed (box 9543). For example, based on the product opportunity scoring pipeline and consideration of other assets and resources, product opportunity marketing decisions can be made based on a product opportunity prioritization. Based in part on the product opportunity scoring pipeline data, and other relevant data, marketing assets can be deployed to further advance appropriate marketing product opportunities (box 9544).

Section 5: IP Management Database Systems

EXAMPLE ONE

FIGS. 21-40 show an embodiment of an intellectual property database system for the development, marketing and maintenance of intellectual property. The intellectual property database system illustrated in FIGS. 21-40 can include a plurality of databases, such as an IP marketing database, a contract tracking database, and an innovations award database. The databases can include tables that describe the data fields of data records, tables that list the tables describing data records, queries that can utilized to generate reports, forms that can display data fields and data records, reports that can be generated, and other typical database components.

FIGS. 21 and 22 show an embodiment of IP marketing database that can be part of an intellectual property development, marketing, and maintenance database system. The IP marketing database illustrated in FIGS. 21-22 can include a plurality of tables that include data relating to the marketing of intellectual property. For example, the IP marketing database can include a companies table and a marketing opportunities table, which can respectively describe the data fields of a companies data record and a marketing opportunities data record. Other tables in the marketing opportunities database could include competitor's database, sales partner's database, end user's database, internal support database, internal developer database, financial analysis database, etc. In an embodiment, the companies table can describe one or more data fields, such as a field storing the formal name of a company or of a company's data record. The marketing opportunities table of the IP marketing database can describe a plurality of data fields of marketing opportunities data records, such as those illustrated in FIGS. 21 and 22. The data fields of the marketing opportunities data record of the IP marketing database can store information such as an opportunity number, a status, an estimated marketing date, and so on. For example, customer contact information such as when contacted, by who, and what was discussed can be stored.

The IP marketing database can include a plurality of predefined queries for generating a query of the information stored in the IP marketing database. For example, the predefined queries of the IP marketing database can include a company alpha sort query, a level zero work in progress report query, a level one work in progress report query, and so forth. Further examples of the queries of the IP marketing database can include a marketing opportunities query, a most recent new deals query, and/or a twenty-five opportunities report query.

The IP marketing database can include a plurality of predefined forms such as a marketing opportunities form. FIG. 29 shows an illustration of an embodiment of a marketing opportunities form. The marketing opportunities form illustrated in FIG. 29 can present to a user information from the IP marketing database and/or other databases of the intellectual property development, marketing and maintenance database system. For example, the marketing opportunities form illustrated in FIG. 29 can show the status of an opportunity, the opportunity number, the date the status changed to various levels, and other information as shown in FIG. 29.

In an embodiment, IP marketing database can include a plurality of predefined reports regarding the information stored in the IP marketing database. For example, the reports can include a deal overview by vendor report, a level 0 work-in-progress report, a level 1 work-in-progress report, a most recent new deals report, an opportunity summaries report, reports by entity, and a top deals report. For example, FIG. 30 shows an illustration of an embodiment of a deals/potential opportunities report. The report illustrated in FIG. 30 can show a prioritization of top deals. In an embodiment, a prioritization of top deals report as illustrated in FIG. 30 can provide information from a plurality of data records including information such as the status of a marketing opportunity, a product/project name, an opportunity number, a corporate entity, a patent status, trademark status (not shown), copyright status (not shown), trade secret (not shown), NDA (not shown), a company name, an identification of a lead personnel, an identification of a support personnel, an estimated value, an indication regarding a deal size, a priority value and/or a reason/comments.

FIG. 31 shows an illustration of an embodiment of a level 1 work-in-progress report. A level 1 work-in-progress report can include a listing of information from data records corresponding to a marketing opportunity having a level 1 status. For example, in an embodiment, the level 1 work-in-progress report illustrated in FIG. 31 can include information corresponding to marketing opportunities such as the product/project name, the subsidiary name, the opportunity number, the patent status, trademark status (not shown), copyright status (not shown), trade secret (not shown), NDA (not shown), the company name, an identification of a lead person, a identification of a support person, an estimated value, an indication regarding a deal size, an indication regarding a priority, and a date the marketing opportunity was classified as being at level 1.

FIGS. 23 and 24 show an illustration of an embodiment of a contract tracking database of a intellectual property development, marketing, and maintenance database system in accordance with an embodiment of the present invention. In an embodiment, the contract tracking database can include a plurality of tables such as an agreement types table, a companies table, and a contracts listing table. An agreement types table can describe a plurality of data fields of an agreement types data record such as an ID field, an agreement type field, and a description field. The companies table of the contract tracking database can describe a plurality of data fields of a contract tracking data record including an ID field, and a first field to specify a company name. In an embodiment, the contracts listing table of the contract tracking database can describe a plurality of data fields such as the fields illustrated in FIG. 23. The plurality of data fields, for example, can include an ID field, a first party field, a second party field, a third party field, and effective date field, a termination or renewal date field, and so forth.

Figure 32:
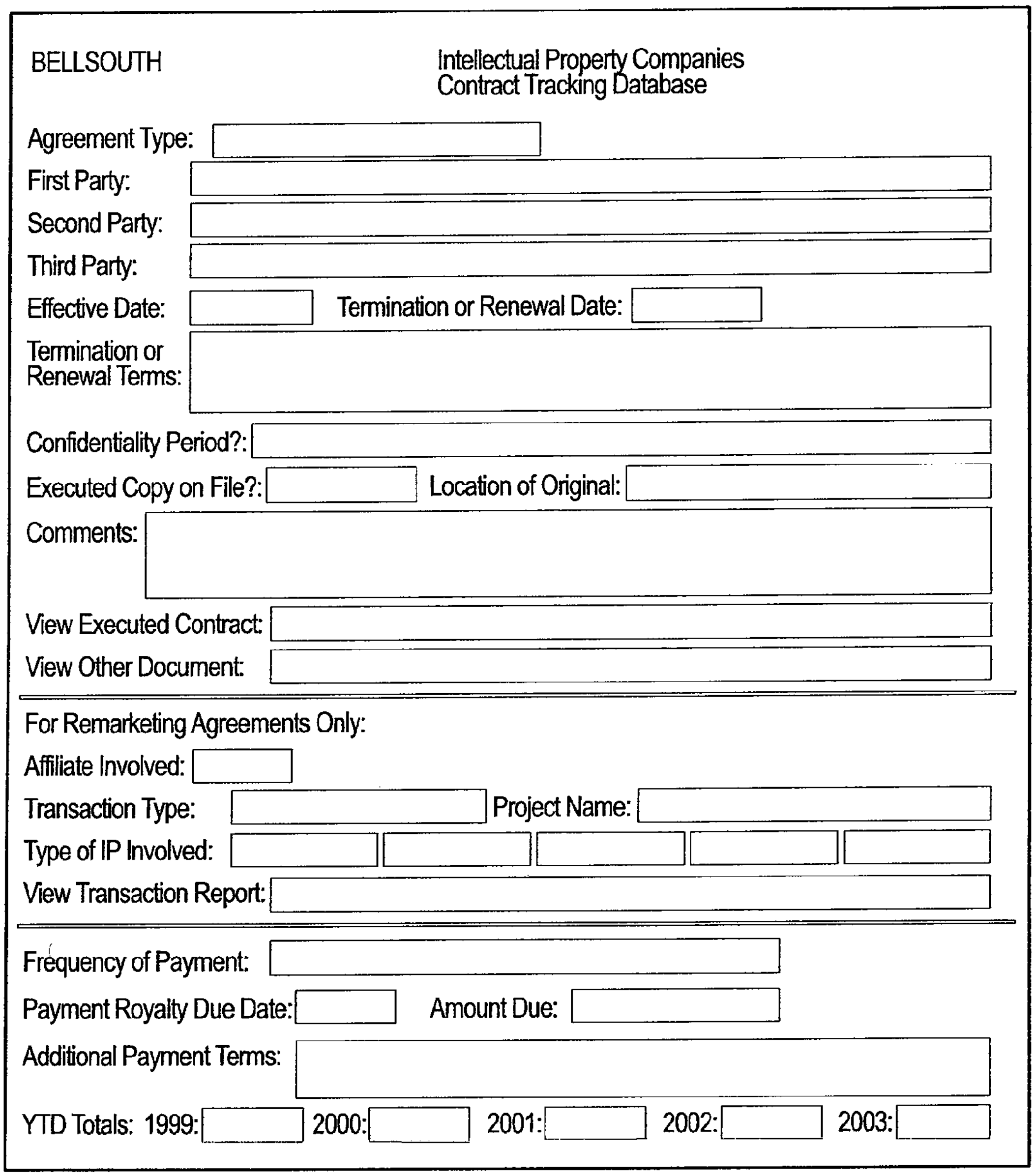

According to an embodiment, a contract tracking database can include a plurality of predefined queries. The plurality of predefined queries can include a company alphabetical order query, and an unexecuted agreements query. A user can execute a query of the contract tracking database in order to display information from contract tracking data records. In an embodiment, the contract tracking database can include an plurality of predefined forms such as a contracts listing form. FIG. 32 shows an illustration of an embodiment of a contracts listing form. Information displayable by the contracts listing form illustrated in FIG. 32 can include information from the data records of the contract tracking database and/or information from other databases of the intellectual property development, marketing, and maintenance database systems. For example, the contracts listing form can display to a user information such as an agreement type, a first party, a second party, a third party, and other information as illustrated in FIG. 32.

A contract tracking database can also include one or more predefined reports. In an embodiment, the one or more predefined reports can include an unexecuted agreements report that can be generated based upon information stored in the contract tracking database and/or in other databases in the intellectual property development, marketing, and maintenance database system. FIG. 33 shows an illustration of an embodiment of an unexecuted agreement report. The unexecuted agreements report can display information from a plurality of data records such as information for each contract data record that meets the criteria of the unexecuted agreements report including the agreement type, an identification of the first party, and an identification of the second party.

FIGS. 25-28 shows an illustration of an embodiment of an innovation awards database of an intellectual property development, marketing, and maintenance database system. The innovation awards database illustrated in FIGS. 25-28 can store information relating to inventors, potential inventors, employees, and other potential developers of intellectual property. The innovation awards database can store information to allow a user to determine whether employees and/or other potential developers of intellectual property have been provided an award for developing potential intellectual property. The innovation awards database can be accessed by a user to generate reports and forms to allow a user to manage the development and maintenance of intellectual property.

For example, an innovation awards database can include a plurality of tables such as an awards table, a company addresses table, an ESP ("Employee Suggestion Plan") Coordinators Table, and an IP Coordinators Table. In an embodiment, the awards table of the innovation awards database can describe data fields of award data records such as a key number field that stores a unique key. An award data record can be generated to store and track information relating to the awards presented to potential developers of intellectual property. For example, the fields of an award data record can include a key number that uniquely identifies the award data record, an award number corresponding to an award, a legal case number corresponding to a case number of a legal department, information identifying a recipient of an award, and other information relating to the presentation of awards to potential developers of intellectual property as illustrated in FIGS. 25-26.

In an embodiment, the innovation awards database can include company address data records having a plurality of data fields. The company addresses table illustrated in FIG. 26 shows a description of data fields of a company address data record. For example, a company address data record can have a plurality of fields such as a company name field, a formal name field, business address field, and other fields related to company addresses.

The innovation awards database illustrated in FIGS. 25-28 can include a plurality of ESP coordinators data records. The ESP coordinators table of the innovation awards database shows a listing of data fields of an ESP coordinators data record in accordance with an embodiment of the present invention. For example an ESP coordinators data record can include a plurality of fields such as, an ESP coordinators field, a company field, a market field, a department field, and so on as illustrated in FIG. 26.

The innovation awards database can also include an IP coordinators table to illustrate the data fields of an IP coordinators data record, where an IP coordinator may be the point person for a particular business unit, group, or division. In an embodiment, an IP coordinators data record can include a plurality of data fields such as an IP ID number, a fullname field, company information field, and other information relating to an IP coordinator.

The innovation awards database can include a plurality of queries that can be selected by a user to display information stored in the innovation awards database. For example, the innovation awards database can include a plurality of predefined queries such as an award query, a query regarding applications filed by date and intellectual property coordinator, a query regarding disclosures filed by date and intellectual property coordinator, and so on as illustrated in FIGS. 27-28.

In accordance with an embodiment of the present invention, an innovation awards database can include a plurality of predefined forms to display information corresponding to the data records of the innovation awards database and data records of other databases of the intellectual property development, marketing and maintenance database system. For example, the plurality of forms in the innovation awards database can include an awards form, a company addresses form, an ESP coordinators form, and an IP coordinators form. FIG. 34 shows an illustration of an awards form in accordance with an embodiment of the present invention. The awards form illustrated in FIG. 34 can display to a user information from an awards data record and/or other data records of the intellectual property development, marketing, and maintenance database system. For example, the awards form can display information such as an award number, and award type, the legal case number, a key number, inventor information, inventor's supervisor information, disclosure award information, filing award information, issuance award information, publication award information, inventor achievement award information, general award information, and other information related to innovation awards.

Figure 35:
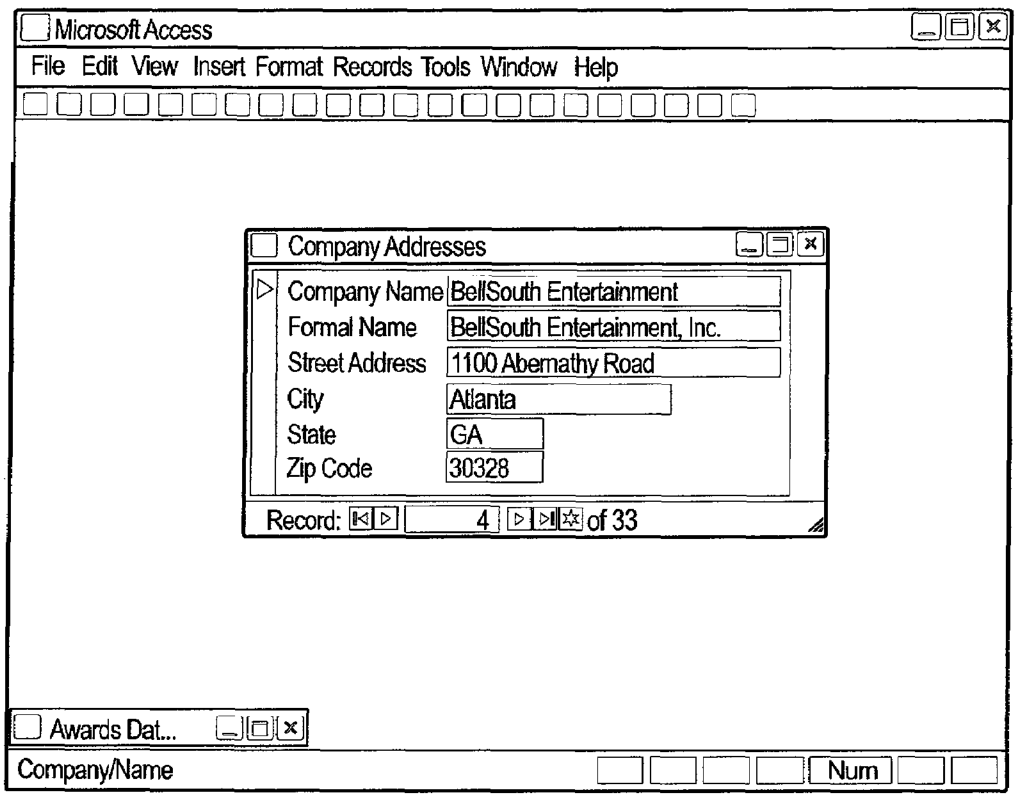
Figure 36:
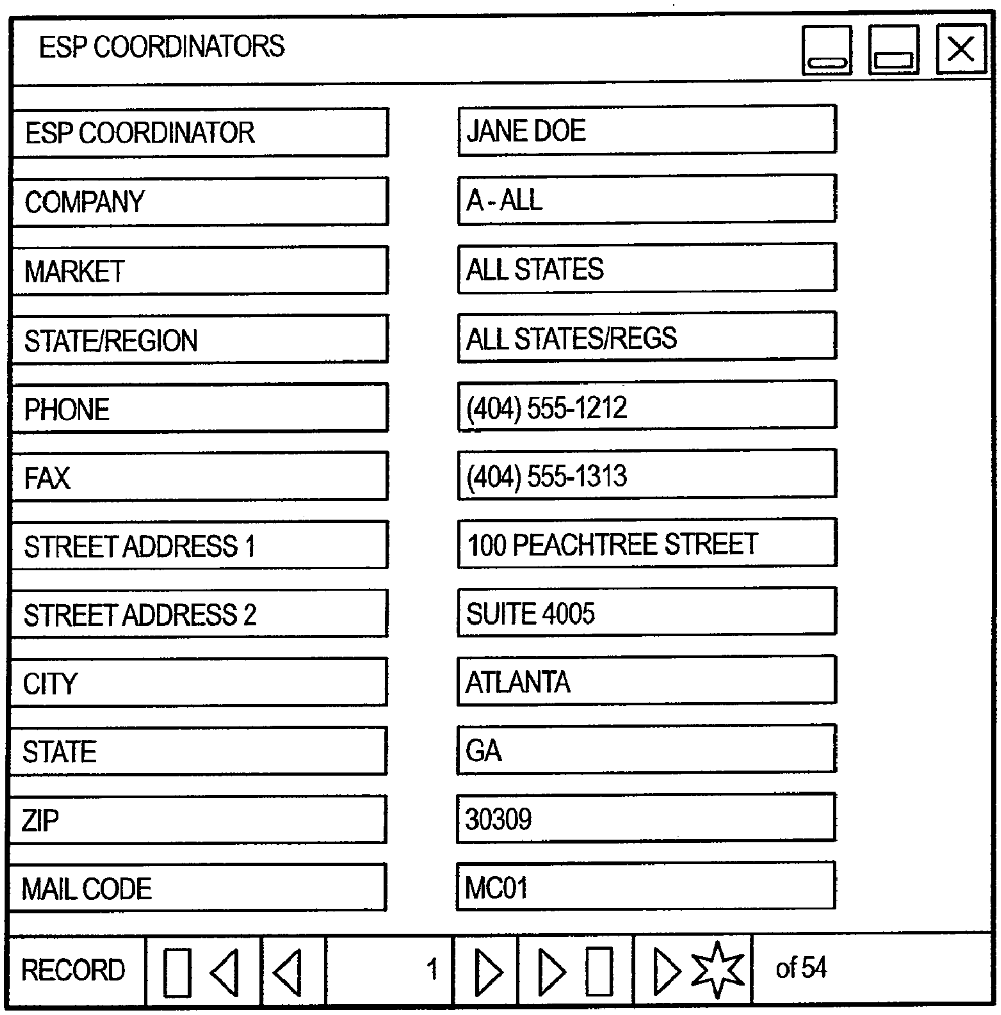
Figure 37:
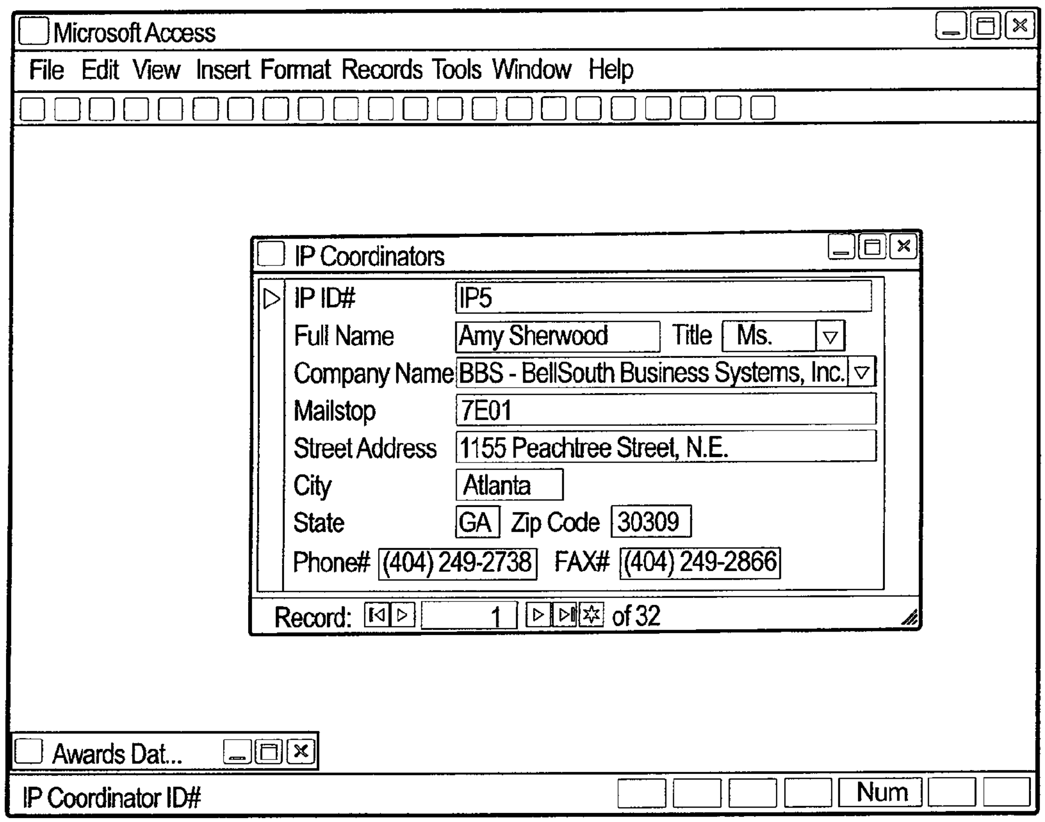

FIG. 35 shows an illustration of a company addresses form. A company addresses form can present information of a company addresses data record such as company name, formal name, address information, and other information regarding the company addresses. FIG. 36 shows an illustration of an ESP coordinators form in accordance with an embodiment of the present invention. An ESP coordinators form can display information regarding an ESP coordinator data record such as an identification of the ESP coordinator, company and address information, and other information relating to an ESP coordinator. FIG. 37 shows an illustration of an embodiment of an IP coordinators form of an innovation awards database. The IP coordinators form illustrated in FIG. 37 can display information corresponding to an IP coordinator data record of the innovations award database. For example, the IP coordinators form can display information such as an IP/ID number, a name of an IP coordinator, address information relating to the IP coordinator, and other information relating to an IP coordinator and/or an IP coordinator data record.

In an embodiment, an Innovation Awards Database can include a plurality of predefined reports. The plurality of predefined reports can present information from the innovation awards database and/or the intellectual property development, marketing, and maintenance database system. For example, the predefined reports of the innovation awards database can include reports such as an awards report, an application filed by date and intellectual property coordinator's report, a disclosures filed by date and intellectual property coordinator's report, a report regarding a disclosure award letter, a report regarding a general award form, and other reports as illustrated in FIG. 28. For example, FIG. 38 shows an illustration of a report relating to an innovation award request patent filing award. The innovation award request patent filing award report can be generated based on information stored in the Innovation Award Database and/or information from the intellectual property development, marketing, and maintenance database system. For example, the innovation award request patent filing award report illustrated in FIG. 38 includes information such as an innovation award number, an inventor name, a supervisor name, an intellectual property coordinator name, and other information relating to an innovation award.

FIG. 39 shows an illustration of another report that can be generated by an Innovation Award Database. FIG. 39 shows an illustration of a memorandum regarding a notification of a patent application filing. The memorandum regarding notification of patent application filing illustrated in FIG. 39 can be generated at least in part based on information stored and tracked in the innovation awards database and/or other databases of an intellectual property development, marketing, and maintenance database system. For example, the memorandum regarding notification of patent application filing report illustrated in FIG. 39 can include the innovator name, the name of an intellectual property coordinator, and information from other databases of the intellectual property development, marketing, and maintenance database system such as the title of a patent application, a company number identifying the patent application, and/or the filing date of the patent application. For example, in an embodiment, the intellectual property development, marketing, and maintenance database system illustrated in FIGS. 21 through 40 is coupled to a patent application docketing system and can retrieve information regarding patent application filings.

FIG. 40 shows an illustration of a patents granted report in accordance with an embodiment of the present invention. The patents granted report illustrated in FIG. 40 can include information from data records of the innovation awards database, data records of other databases of the intellectual property development, marketing, and maintenance database system, and other databases relating to intellectual property. For example, the patents granted report illustrated in FIG. 40 can be generated and include information corresponding to one or more awards relating to patents granted. As another example, the patents granted report illustrated in FIG. 40 can include information such as an award identifier, a legal number, an inventor name, a company name, a patent title, a US patent number, and an issue date. In another embodiment of the present invention, other information relating to patents granted and/or an award associated with patents granted can be included in reports.

EXAMPLE TWO

Figure 50:
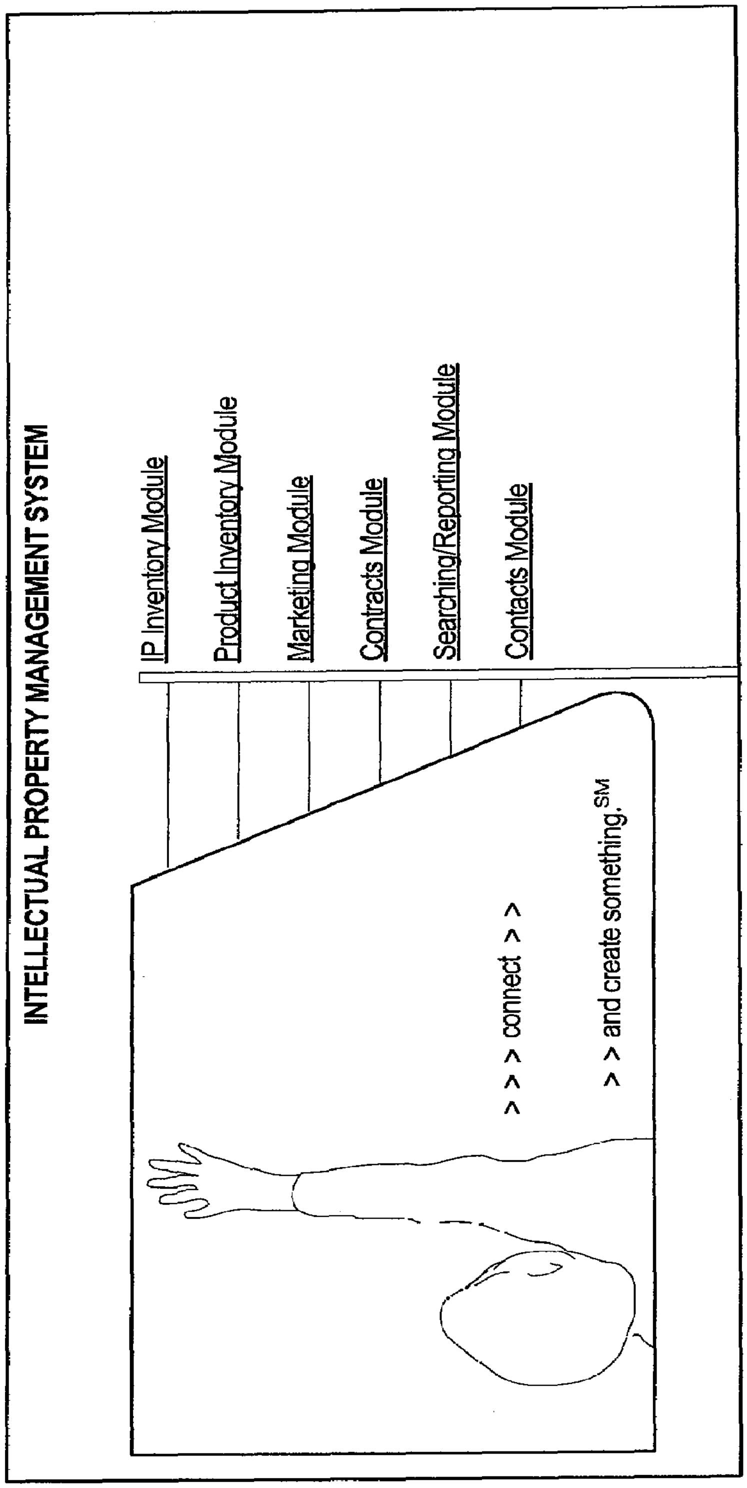
FIGS. 50-165 including 103A and 120A illustrate an IP management system including a relational database for IP management, marketing and contracting activities.
Figure 165:
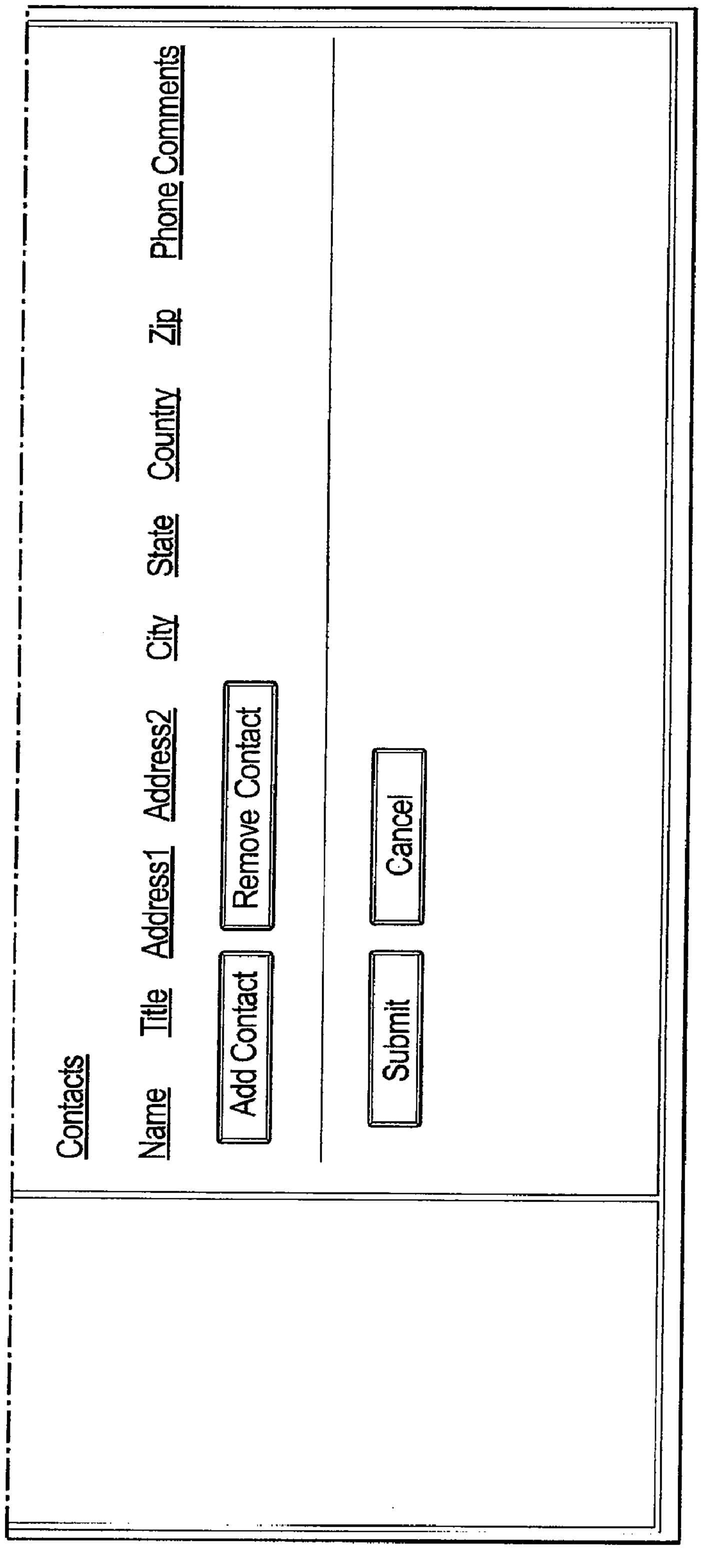

FIGS. 41-49 show an embodiment of an intellectual property management database system in accordance with an embodiment of present invention. The embodiment of the IP management database system illustrated in FIGS. 41-49 can store data relating to the marketing of intellectual property. In an embodiment, a user can be provided access to information stored in the IP management database system via a user interface, such as a text base user interface, a graphical user interface, a combination text and graphics user interface, a voice interactive user interface, and/or other user interface. For example, FIGS. 50-165 show an embodiment of an intellectual property management system having a graphical user interface that presents a Web browser-based user interface to a user for access to an IP management database system. In an embodiment, the graphical user interface and system illustrated in FIGS. 50-165 can provide a user access to an IP management database system as illustrated in FIGS. 41-49. In another embodiment, the graphical user interface and system set forth in FIGS. 50-165 can provide a user access to another embodiment of an IP management database system.

FIGS. 41 through 49 illustrate a plurality of database tables, where each database table of the plurality of database tables describe data fields of data records of the IP management database system. For example, FIGS. 41-42 include an illustration of a marketing table showing the data fields of marketing data records. FIGS. 42-43 show an embodiment of a contract tracking table describing the data fields of contract tracking data records of the IP management database system. FIG. 43 shows an illustration of an IP table that describes the data fields of IP data records. FIGS. 44-45 show an illustration of a product table that describes the data fields of product data. FIG. 45 shows a patent table describing data fields of patent data. FIG. 45 shows an illustration of a trademark table describing data fields of trademark data records. FIG. 45 shows an illustration of a corporation/organization table describing data fields of corporation/organization data records. FIGS. 46-47 show an illustration of an embodiment of a people/address table describing data fields of people/address data record. FIG. 48 includes an illustration of an action table describing data fields of action data records of the IP management database system. FIG. 49 shows an illustration of a contacts table describing data fields of contacts data.

According to embodiment to the present invention, a user can populate data fields of the data record of the IP management database system by entering text and/or selecting values from a set of lookup values. For example, FIGS. 46-47 illustrate sets of predefined values that can be presented to a user to select a value for a data field of a database record. In particular, FIGS. 46-47 set forth a plurality of listings of lookup values, such as roles lookup values, contact lookup values, status lookup values, company business units lookup values, agreement type lookup values, and frequency of payments lookup values. For example, roles lookup values can include a plurality of predefined roles values, such as contact, research, and other. In an embodiment, the roles lookup values can be presented to a user for a particular data field via a pop down or drag down menu.

Contact lookup values can include contact values, such as IP group personnel, end users/customers, and company business unit. As illustrated in FIGS. 46-47 a plurality of lookup values are described for the status lookup values, the company business unit lookup values, the agreement type, lookup values, and the frequency of payments lookup values.

According to an embodiment of the present invention, methods and systems for the management of intellectual property development, marketing and maintenance can be based on and/or include an embodiment of an IP management database system as illustrated in FIGS. 41-49.

Section 6: IP Management System—a GUI Embodiment Overview

FIGS. 50 through 165 illustrate an IP management system including a relational data base for IP management, marketing and contracting activities. The IP property management system can be integrated with a patent and/or trademark application docketing system. The IP management system can provide a graphical user interface ("GUI") to allow users to enter new data and retrieve existing data. In an embodiment, the IP management system GUI can provide read only access to patent and/or trademark docketing information, as well as read and write access to intellectual data records. Embodiments of the present invention can allow users to record and retrieve information with respect to marketing opportunities, contracts/license agreements, license fees, product inventory records mapped to associated IP units, and trade secret copyright and other IP data records.

FIG. 50 shows an illustration of a top-level GUI component that provides access to top-level modules of the IP management system. For example, when a user first accesses the IP management system, the top-level GUI component illustrated in FIG. 50 can be displayed to the user. The top-level GUI component can include a plurality of links to top-level modules of the IP management systems. The top-level modules can include an IP inventory module, a product inventory module, a marketing module, a contracts module, a searching/reporting module, and a contacts module. A user can select and activate one or more of the links to the top-level modules in order to access the corresponding top-level module. In accordance with an embodiment, a user can select and activate a link by pointing and clicking with a computer mouse.

Inventory Module

Figure 51:
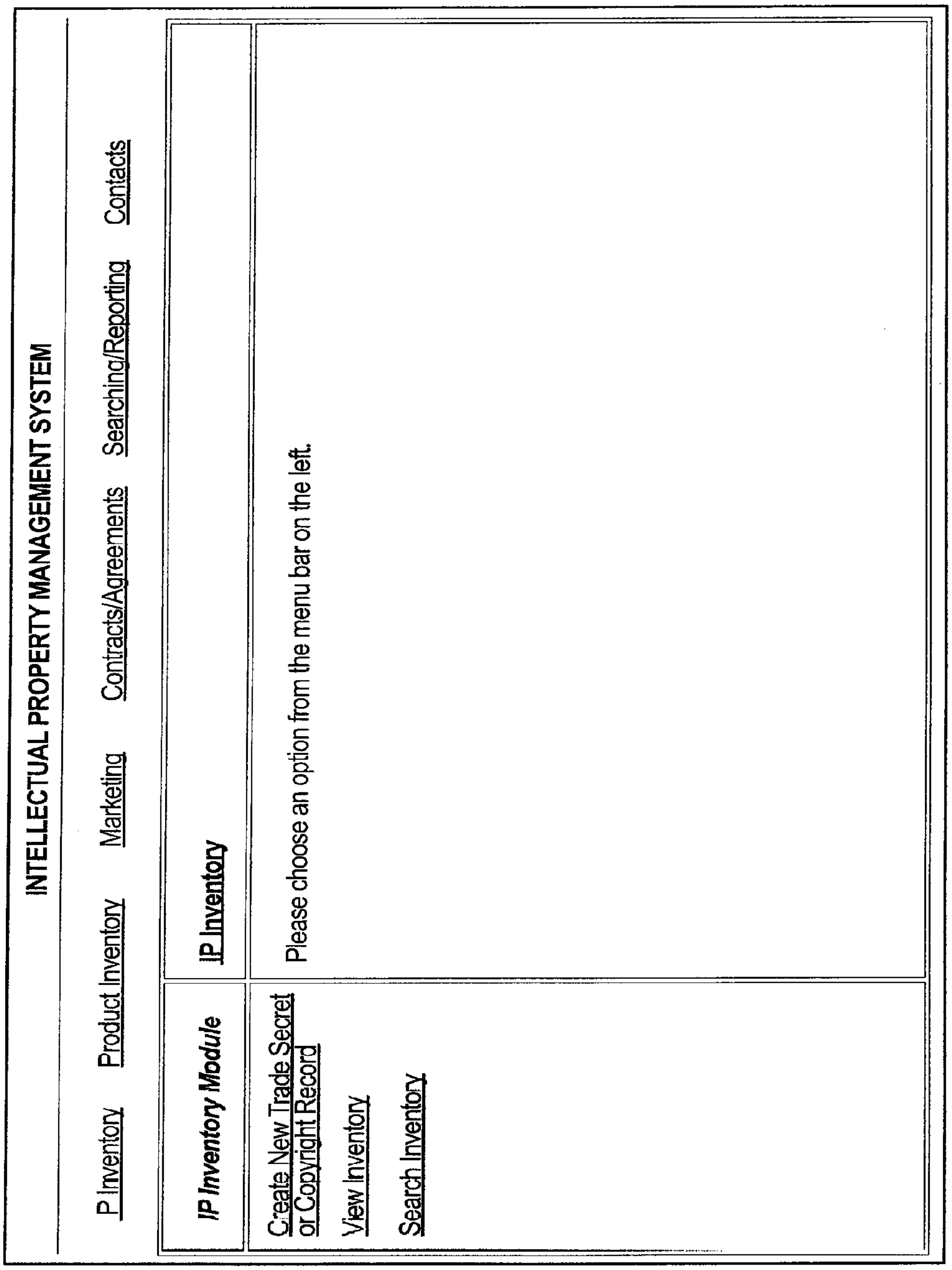

FIG. 51 shows an IP inventory GUI component corresponding to an IP inventory top-level module of the IP management system. The IP inventory GUI component illustrated in FIG. 51 can be displayed to the user after the user selects and activates the link to the IP inventory module illustrated in FIG. 50. The IP inventory GUI component can include three links to sub-modules of the IP inventory module. The IP inventory GUI component can also include links to other top-level modules of the IP management system. For example, in the embodiment illustrated in FIG. 51, the IP inventory GUI component includes links to the product inventory top-level module, the marketing top-level module, the contracts/agreement top-level module, the searching/reporting module and the contacts top-level module. The user can move from the IP inventory module to one of the other top-level modules by selecting and activating the corresponding link. The user can access one of the sub-module of the IP inventory module by selecting and activating the appropriate sub-module link. For example, the sub-module links can include a link to a create new trade secret or copyright record sub-module, a link to a view inventory sub-module, and/or a link to a search inventory sub-module.

Figure 52:
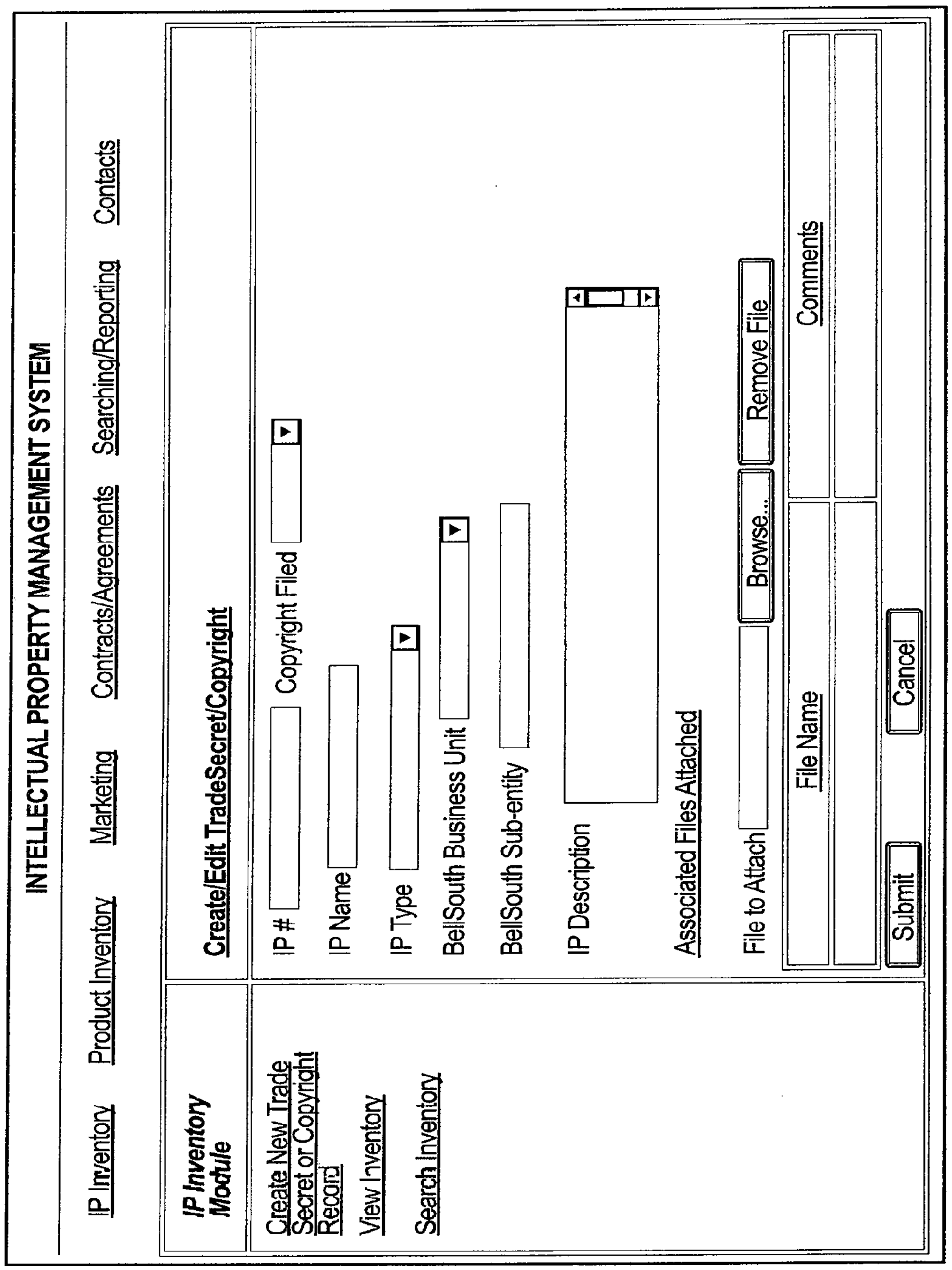

When a user selects and activates the create new trade secret or copyright record link, the create/edit trade secret/copyright GUI component illustrated in FIG. 52 can be displayed to the user. The create/edit trade secret/copyright GUI component can be used to create a trade secret and/or copyright data record. A user can create an IP data record for each trade secret and/or copyright. In another embodiment, a create/edit IP data record GUI component can create a patent-related IP data record, a trademark-related IP data record, a trade secret related IP data record, a copyright related IP data record, and so forth. The create/edit trade secret/copyright GUI component illustrated in FIG. 52 can include a field to display an IP data record number. In an embodiment each IP data record is assigned an unique IP data record number. For example, when a user selects display of the create/edit trade secret/copyright GUI component, it can include the next available IP data record number. Thus, there can be a unique IP data record number that identifies an IP data record corresponding to an intellectual property unit. Examples of an IP unit include an invention that maybe patentable, an invention that maybe protected as a trade secret, a business method process or product that is to be protected as a trade secret, a trademark, a copyright, and other IP. The create/edit trade secret/copyright GUI component can include text entry fields with or without dropdown menus for the entry of additional information related to the IP data record. For example, the create/edit trade secret/copyright GUI component can include fields for the input of information relating to whether or not a copyright is/was filed; a name of the IP unit corresponding to the IP data record; the type of IP related to the IP unit; the corporate business unit associated with the IP unit; the corporate sub-entity associated with the IP unit; and a description, if any, of the IP unit associated with the IP data record. The create/edit trade secret/copyright GUI component illustrated in FIG. 52 can also include an attached file/remove file section to allow users to associate and dissociate files with the IP data record. For example, a computer file can include information relating to an IP unit that can be linked with the IP data record corresponding to the IP unit. A user can identify a related computer file by entering the address of the file and/or selecting a browse dialog box that allows the user to select a document that is stored on, for example, a local hard disk drive or a network storage location. The user can also include comments related to the file, such as a brief explanation of the relevance of the file to the IP unit corresponding to the IP data record. The create/edit trade secret/copyright GUI component can allow a user to attach one or more computer files to the IP data record. After the a user has entered information about the IP unit and/or the IP data record via the create/edit trade secret/copyright GUI component, the user can select a submit button link to save the information to the IP management system. Alternatively, the user can select and activate the cancel link button to clear the data entry fields of the create/edit trade secret/copyright GUI component and/or return to previous screen.

Figure 53:
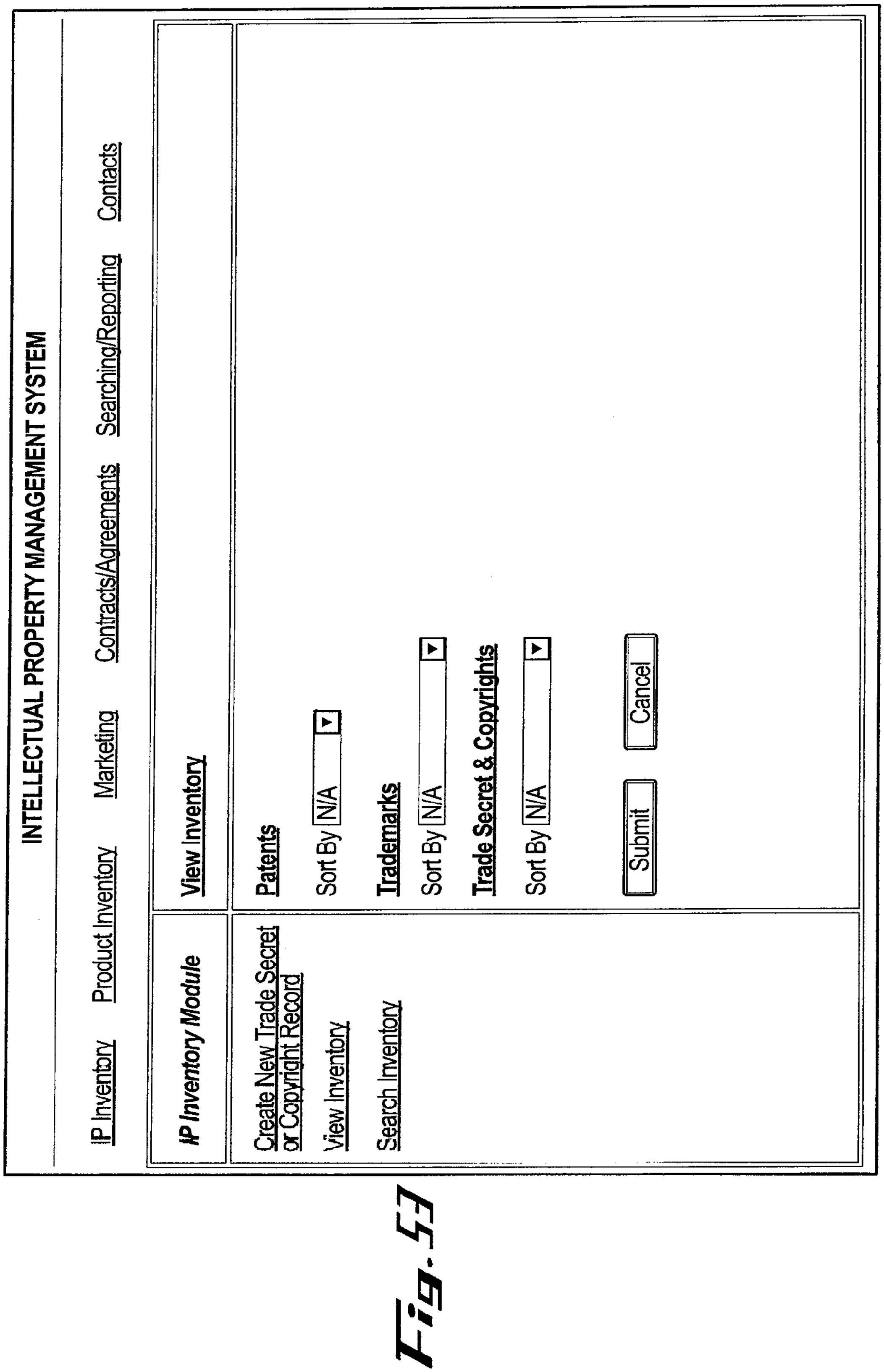

FIG. 53 shows an illustration of a view inventory GUI component. A user can interact with the view inventory GUI component to view IP data records, such as patent-related IP data records, trademark-related records, and/or trade secret/copyright-related IP data records. The view inventory GUI component can include data entry fields with or without dropdown menus to specify criteria for sorting the IP data records. The dropdown menus can allow users to choose how the IP data records are sorted when they are displayed. In an embodiment, a user can specify that a type of IP data record is not to be displayed by indicating that type of IP data record should not be displayed. For example, a user can select to sort by N/A to indicate that that type of IP data record should not be displayed.

Figure 54:
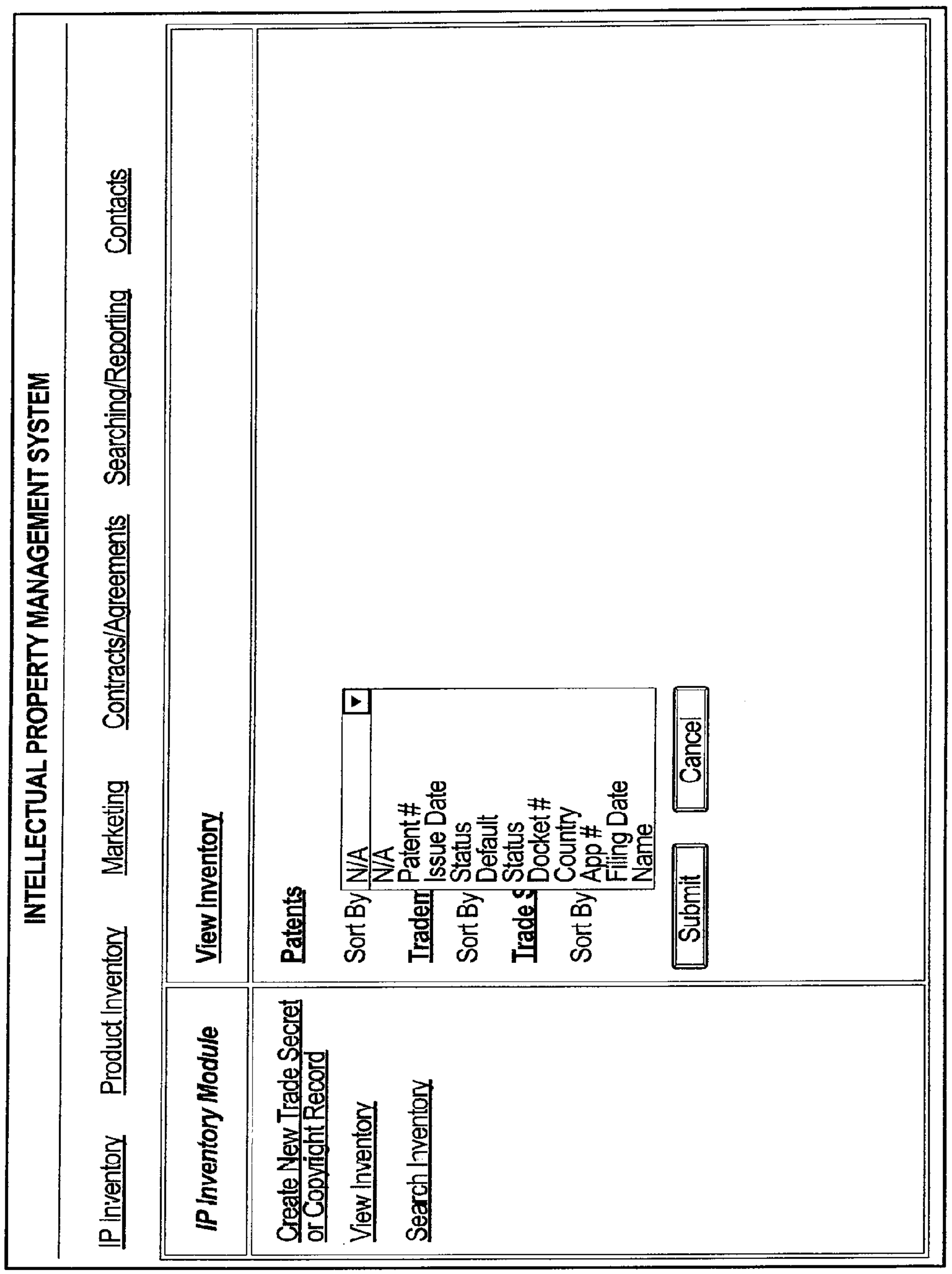

FIG. 54 shows an illustration of a dropdown menu including sort criteria for patent-related IP data records. As illustrated in FIG. 54, the patent-related IP data record search criteria can include: N/A to indicate that patent-related data records are not to be displayed; patent number; issue date; status; default; docket number; country; application number; filing date; and name.

Figure 55:
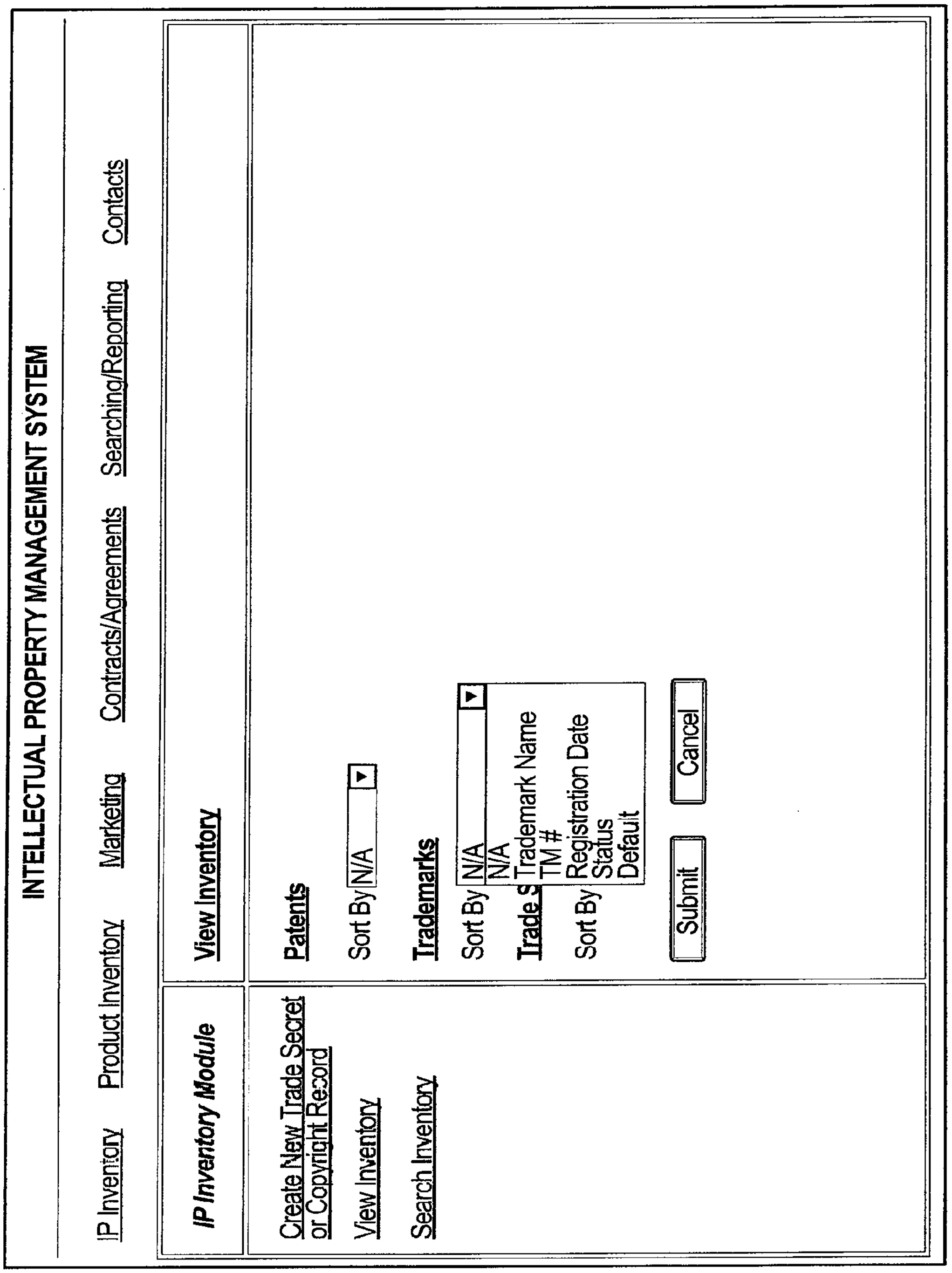

As illustrated in FIG. 55, the trademark-related IP data records can be sorted by one of a plurality of sort criteria including: N/A to indicate that trademark-related IP data records are not to be displayed; trademark name; trademark number; registration date; status; and a default sort criteria.

Figure 56:
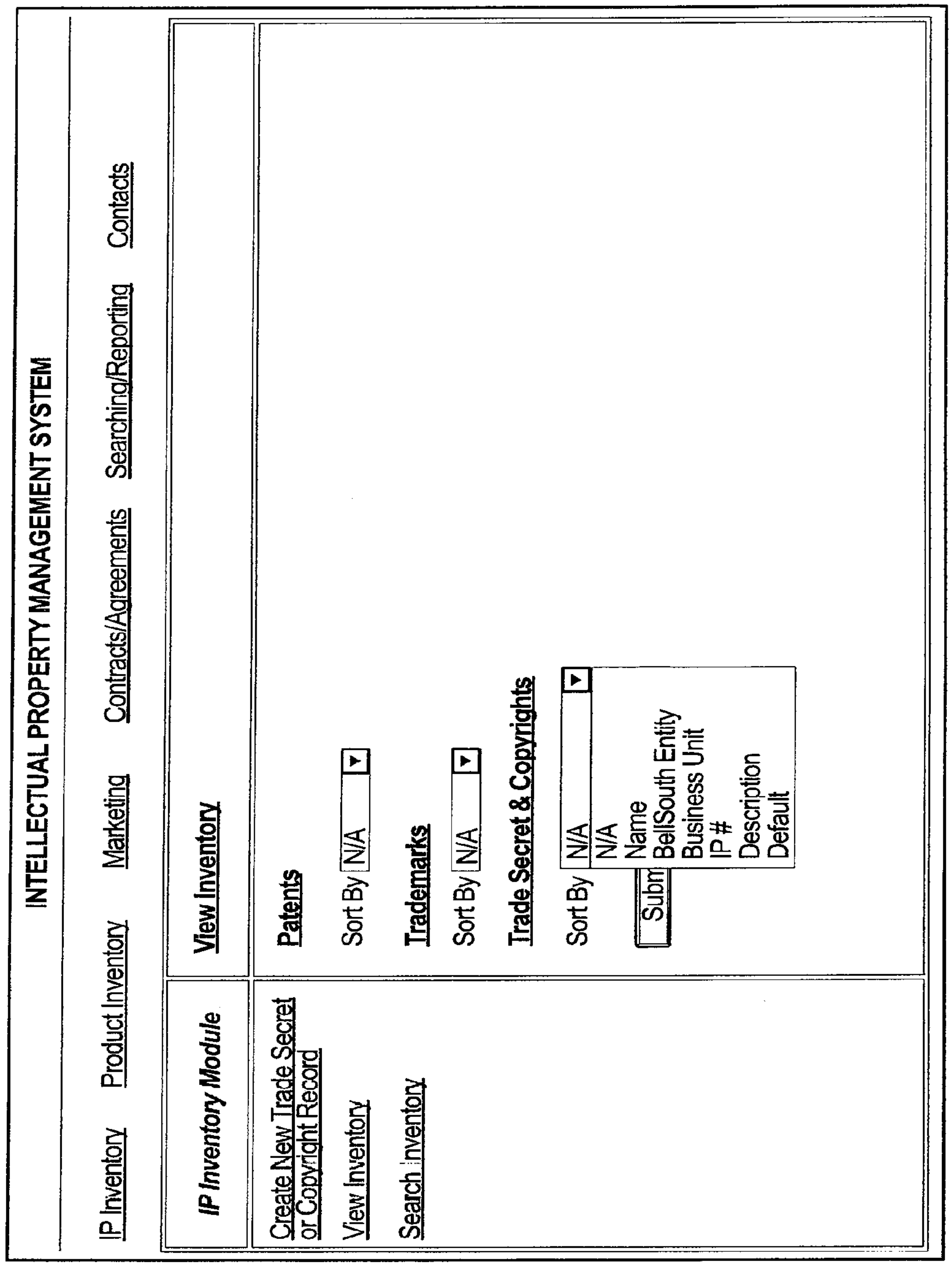

As illustrated in FIG. 56, the trade secret and copyrights related IP data records can be sorted by one of a plurality of sort criteria including; N/A to indicate that trade secret and copyright-related IP data records are not to be displayed; name; corporate entity; business unit; IP number; description; and a default sort criteria.

Figure 57:
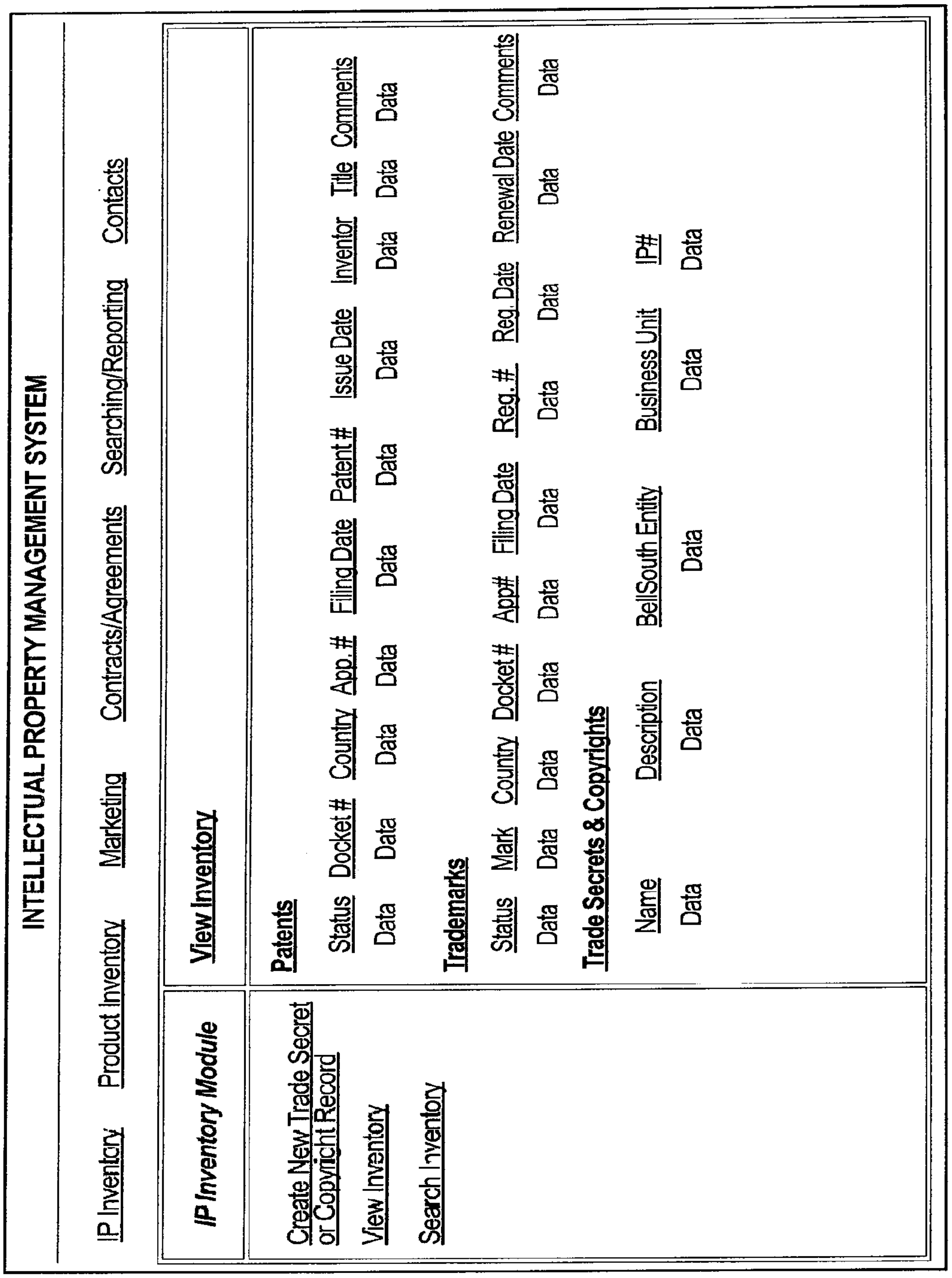

FIG. 57 shows a display of IP data record information according to an embodiment of a view inventory sub-module of an IP inventory module of the IP management system. The display of IP data record information can include patent-related IP data records, trademark related IP data records and trade secret/copyright related IP data records. For example, each patent-related IP data record displayed by the view inventory module can include information related to a patent-related IP unit, such as the status, docket number, country, application number, filing date, patent number, issue date, inventor, title, and/or comments. The information that can be displayed relating to a trademark-related IP data unit includes information such as status, mark, country, docket number, application number, filing date, registration number, registration date, renewal date, and comments. Information that can be displayed for trade secret/copyright-related IP data records includes information such as name, description, corporate entity, business unit, and IP data record number.

Figure 58:
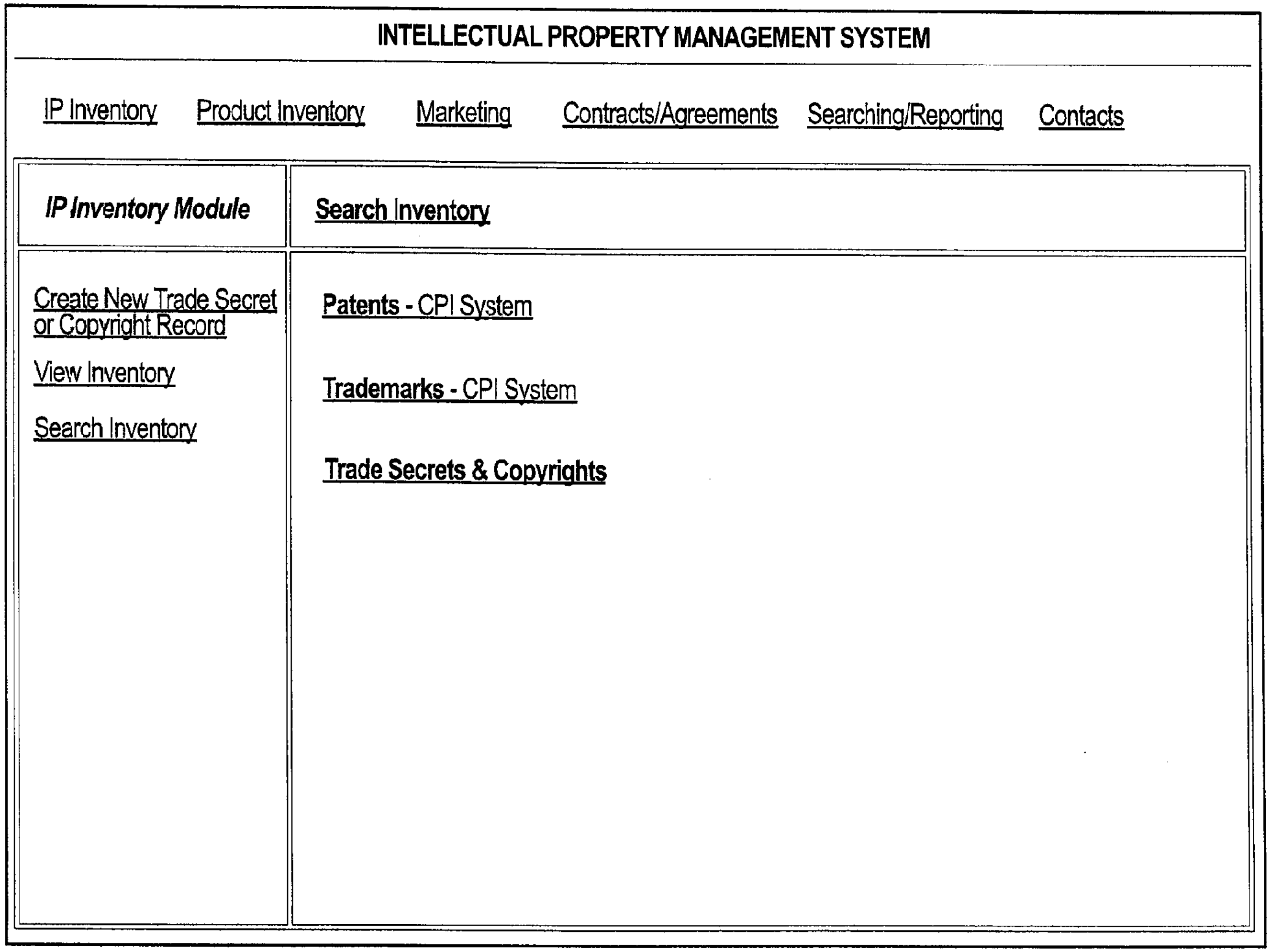

FIG. 58 shows an illustration of a search inventory GUI module of the IP inventory module to allow a user to search for one or more IP data records. In accordance with an embodiment of the present invention, the IP management system is coupled to a patent application and/or trademark application docketing system. For example, a known patent and/or trademark application docketing system manufactured and sold by CPI is named CPI. The CPI system can store information relating to pending patent applications and/or trademark applications. The IP management system can store information related to trade secrets and copyrights. In another embodiment, the IP management system includes modules for patent application docket management, trademark application docket management, and trade secret and copyright management. The search inventory GUI module illustrated in FIG. 58 can include a plurality of links to search modules that can search for an IP data record corresponding to an IP unit, such as patent-related IP, trademark-related IP, trade secret-related IP, and copyright-related IP. The search inventory GUI module illustrated in FIG. 58 can include links to separate search modules for searching patent-related IP data records, trademark-related IP data records, and trade secret and copyright-related IP data records. For example, a user can select the search patents link of the search inventory GUI module illustrated in FIG. 58.

Figure 59:
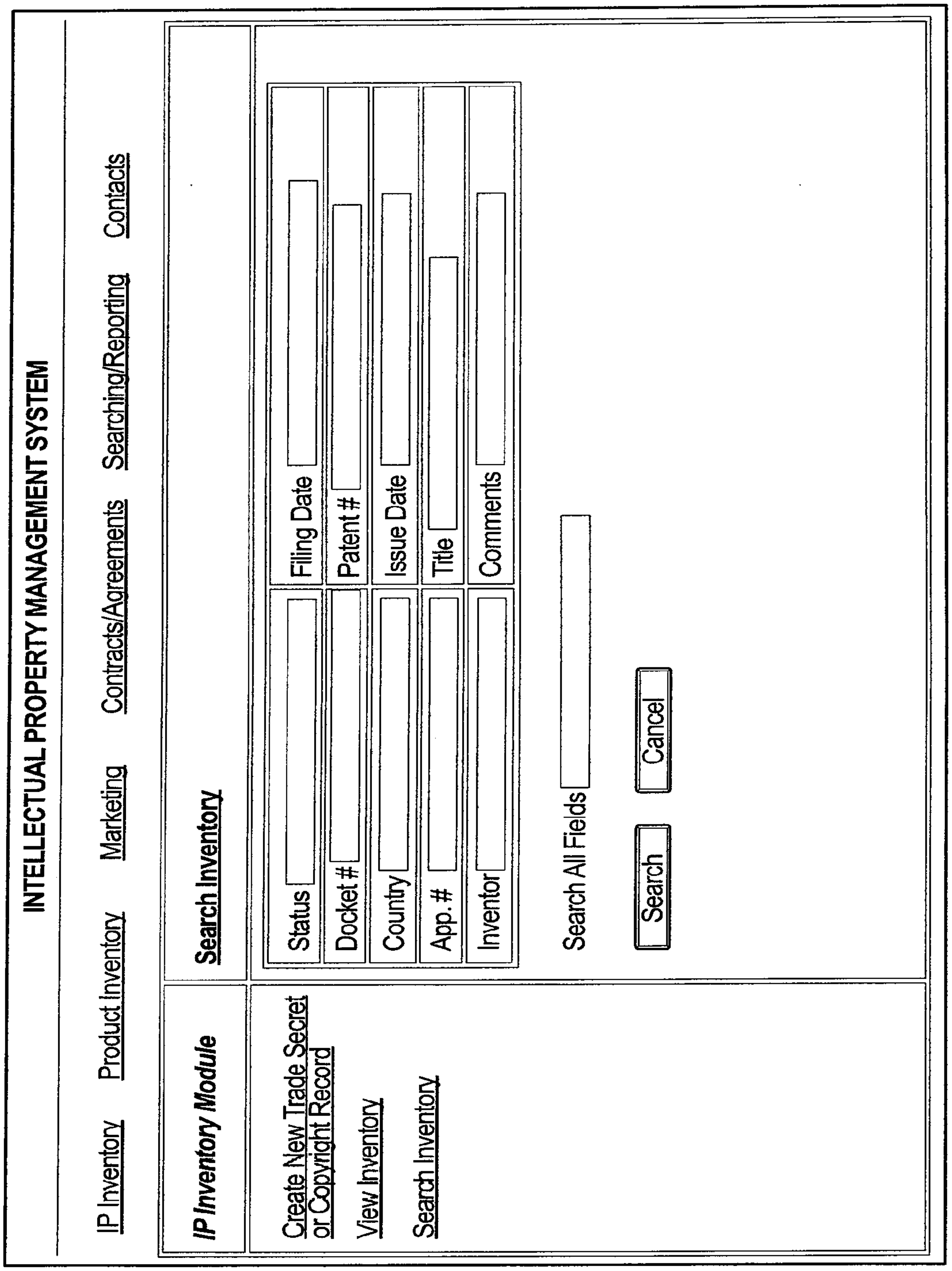

FIG. 59 shows an illustration of a search patents GUI module in accordance with an embodiment of the present invention. The search patents GUI module can include a plurality of data entry fields for the input of search terms and/or search criteria. For example, the search patents GUI module illustrated in FIG. 59 includes data entry fields related to searching based on: status; filing date; docket number; patent number; country; issue date; application number; title; inventor; and comments. The search patents GUI module can also include a data entry field that can allow searching all fields of patent-related IP data records for a particular search term. After a user has entered search terms, if any, the user can select the search button link to direct the IP management system to perform the specified search. For example, the IP management system can generate a search query based on the user input search values that can be communicated to the patent application docketing system.

Figure 60:
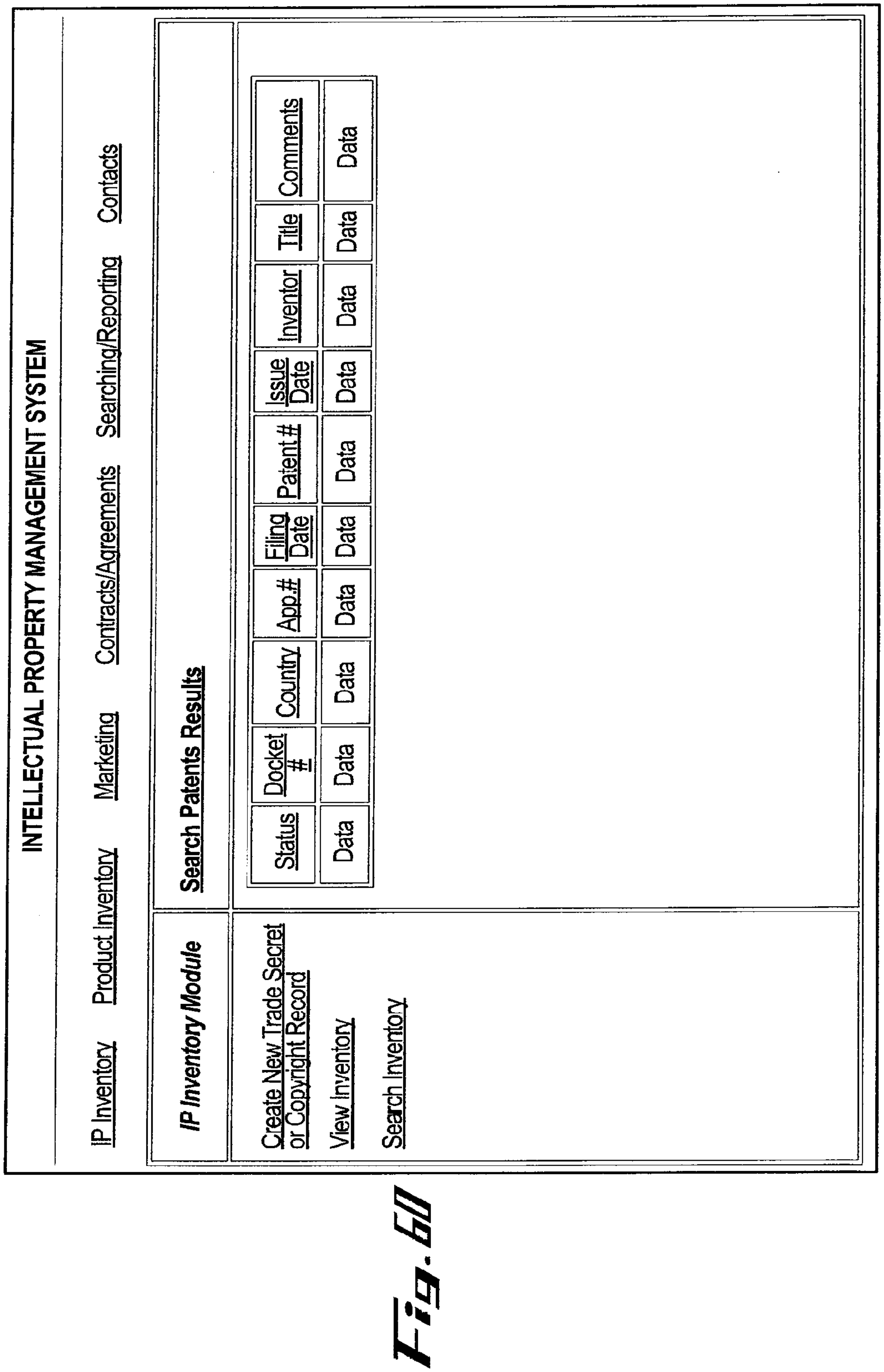

FIG. 60 shows an illustration of data displayed pursuant to a search of the patent-related IP data records. Information that can be displayed for each patent-related IP data record can include: status; docket cumber; country; application number; filing date; patent number; issue date; inventor; title; and comment. The information for each patent-related IP data record can be presented in a row and a user can select and activate that row to display the particular IP data record. For example, the search patents results GUI illustrated in FIG. 60 can include data relating to six patents, where the information for each patent is presented in a particular row. Selecting and activating the information in that row can cause the display of additional information relating to that patent-related IP data record. In an embodiment in which the IP management system is coupled to a patent application docketing system, the information is retrieved from the patent application docketing system and displayed.

Figure 61:
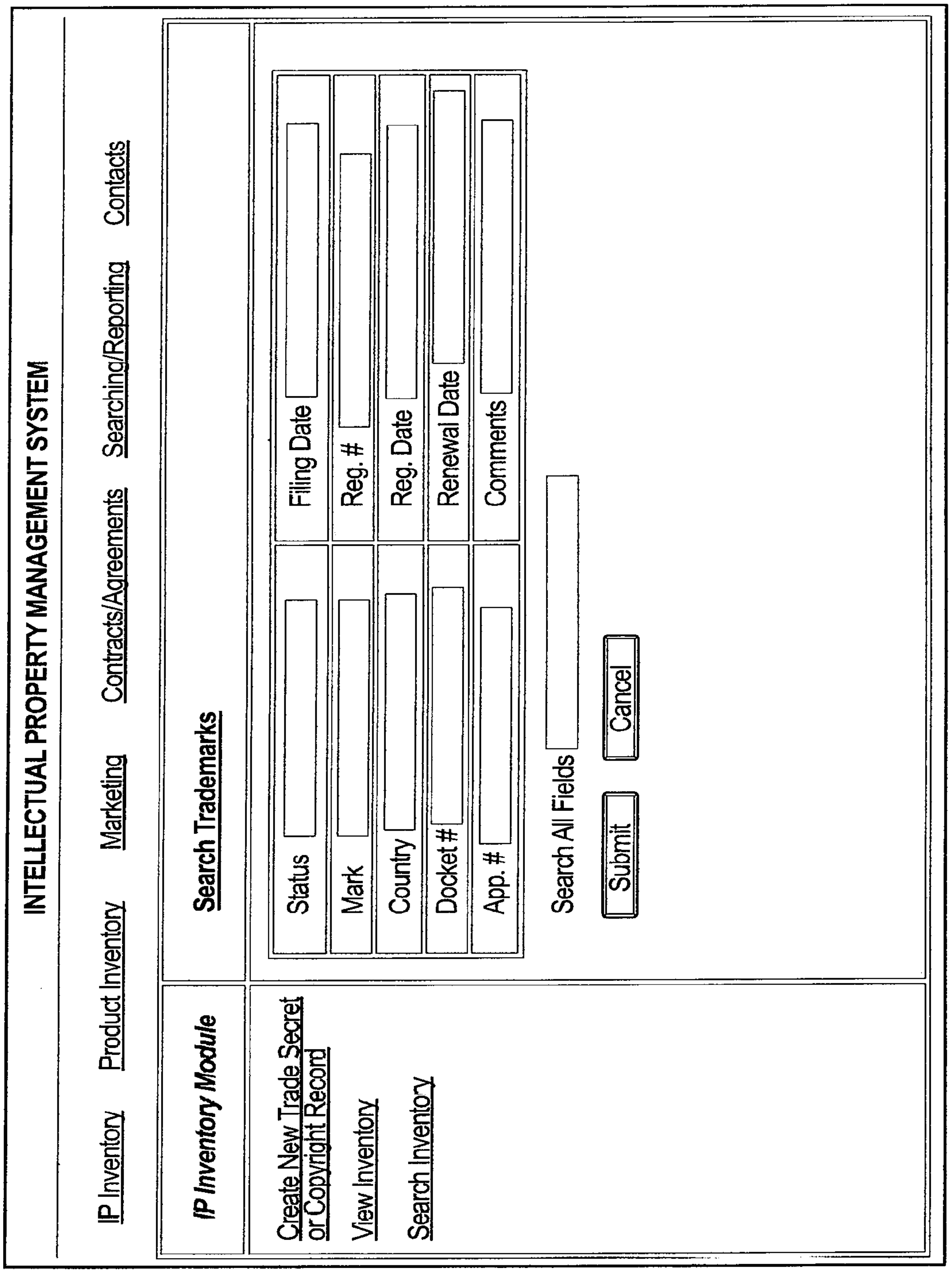

FIG. 61 shows a search trademarks GUI module. The search trademarks GUI component can include a plurality of data fields to allow a user to specify search terms. For example, a user can specify a search of the trademark-related IP data records based on: status; filing date; mark; registration number; country; registration date; docket number; renewal date; application number; and comments. In an embodiment, a user can enter a search term that is used to search all fields of trademark-related IP data records.

Figure 62:
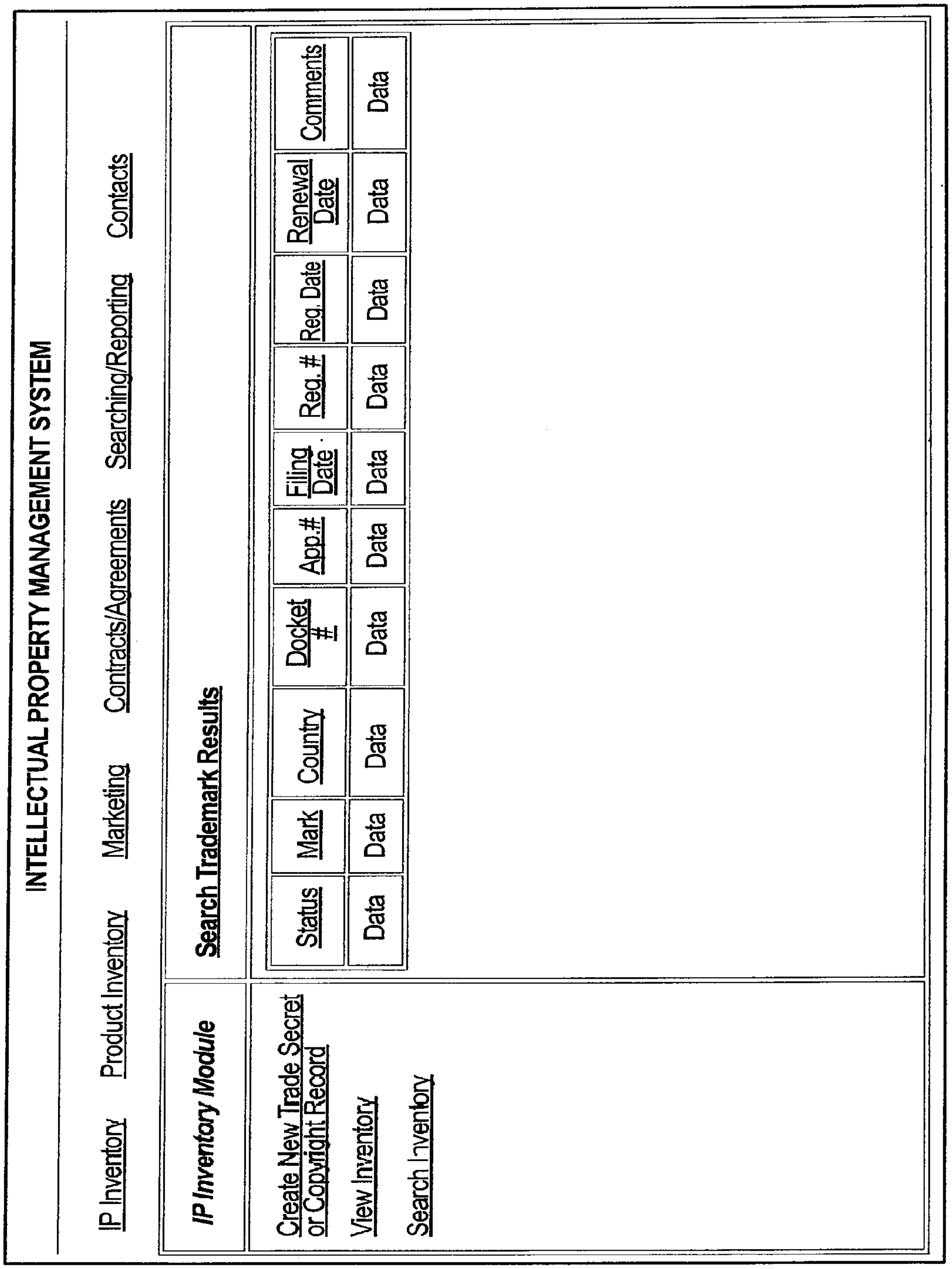

FIG. 62 shows an illustration of an embodiment of search trademark results GUI model. A search trademark results GUI module can display the trademark-related IP data record located in a user-specified search. The trademark-related IP data record information can be displayed in rows where each row corresponds to a separate trademark-related IP data record. For a trademark-related data record, the information displayed can include: the status; mark; country; docket number; application number; filing date; registration number; registration date; renewal date; and comments. A user can click on a row corresponding to a trademark-related IP data record and cause a more detailed display of information for that trademark-related IP data record. In an embodiment in which the IP management system is coupled to a trademark application docketing system, the search trademarks GUI module illustrated in FIG. 61 can generate a query based on user input that is sent to the trademark application docketing system. The trademark application docketing system can reply with the trademark-related IP data unit information, which can be displayed by the search trademarks results GUI module illustrated in FIG. 62.

Figure 63:
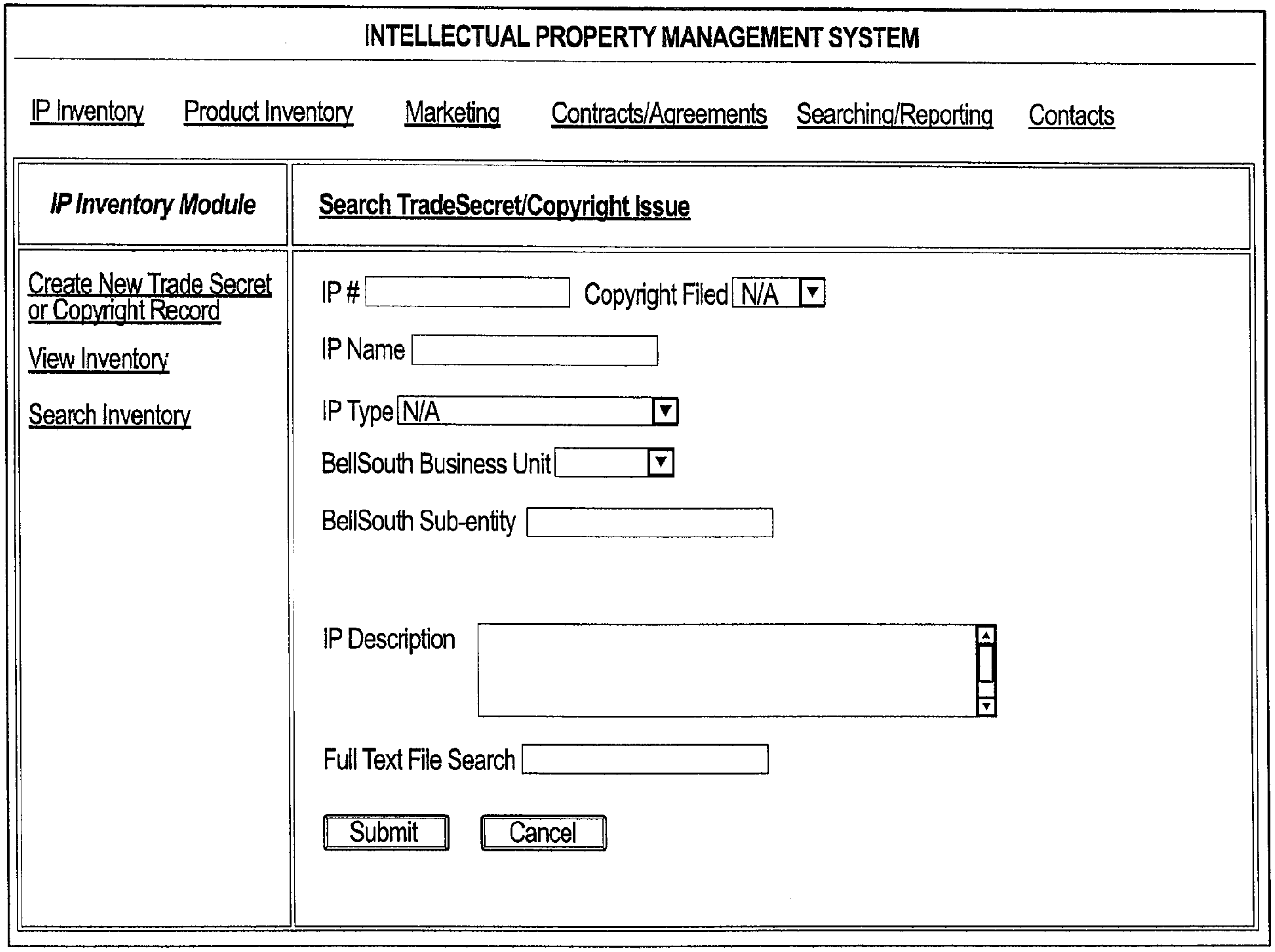

FIG. 63 shows a search trade secret/copyright GUI module in accordance with an embodiment of the present invention. A user can input search terms and/or select criteria to specify a particular search of the trade secret/copyright-related IP data records. For example, the search trade secret/copyright GUI module illustrated in FIG. 63 can generate a search based on: IP number; copyright filed indicator; IP name; IP type; corporate business unit; corporate sub-entity; IP description; and full text file search. A user can select the search button link to direct execution of the specified search, or to select a cancel button link to cancel the search.

Figure 64:
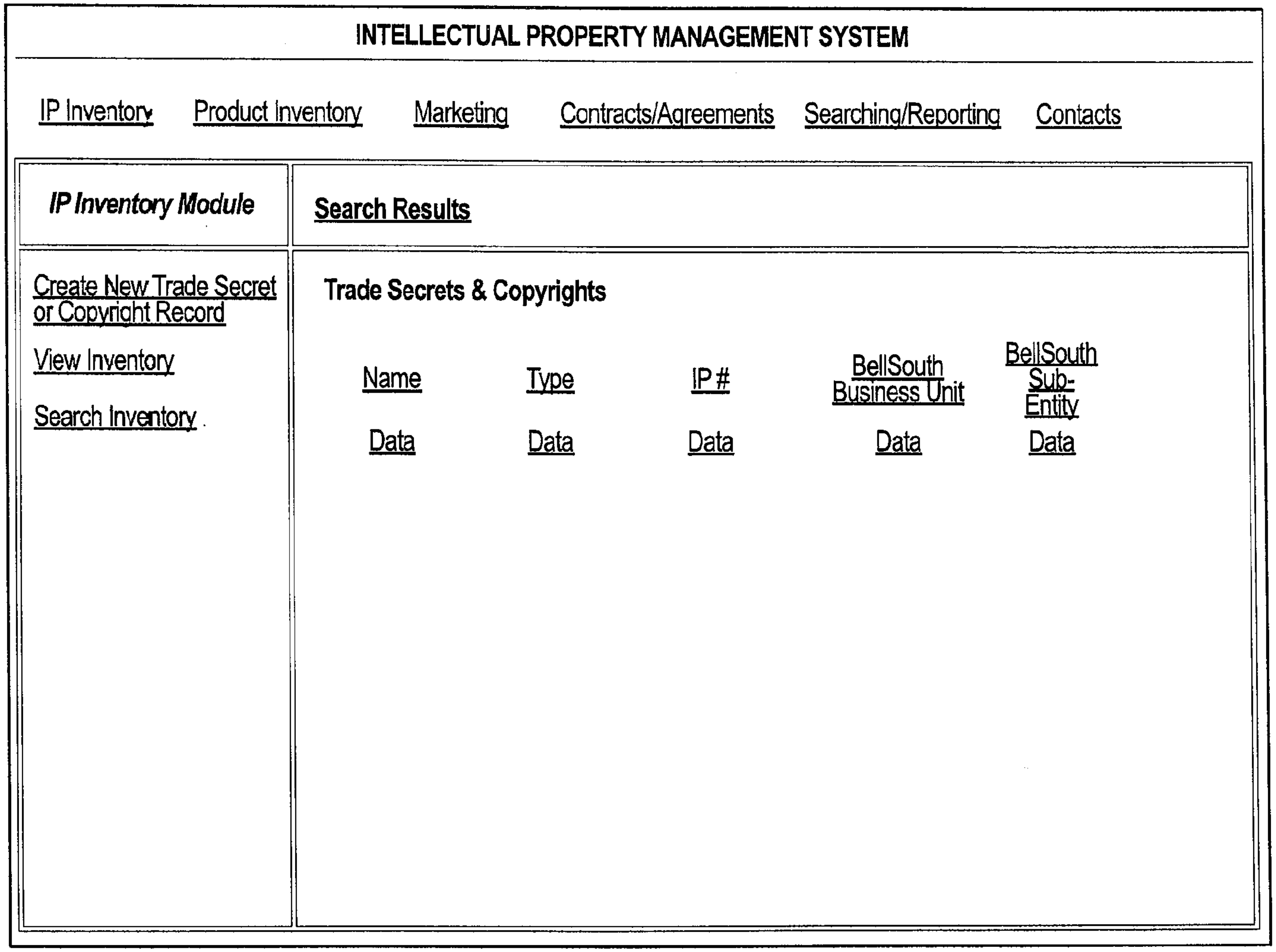

FIG. 64 shows an illustration of a trade secrets/copyrights search results GUI module. The search results GUI module illustrated in FIG. 64 can display information pertaining to the type of trade secret/copyright IP data records, such as the name; type; IP number; corporate business unit and sub-entity. The trade secret/copyright-related IP data record information can be displayed in rows, each row displaying information related to a particular trade secret/copyright-related IP data record. A user can select and activate a row corresponding to a trade secret/copyright-related IP data record to cause the display of additional information corresponding to the trade secret/copyright-related IP data record.

Product Inventory Module

Figure 65:
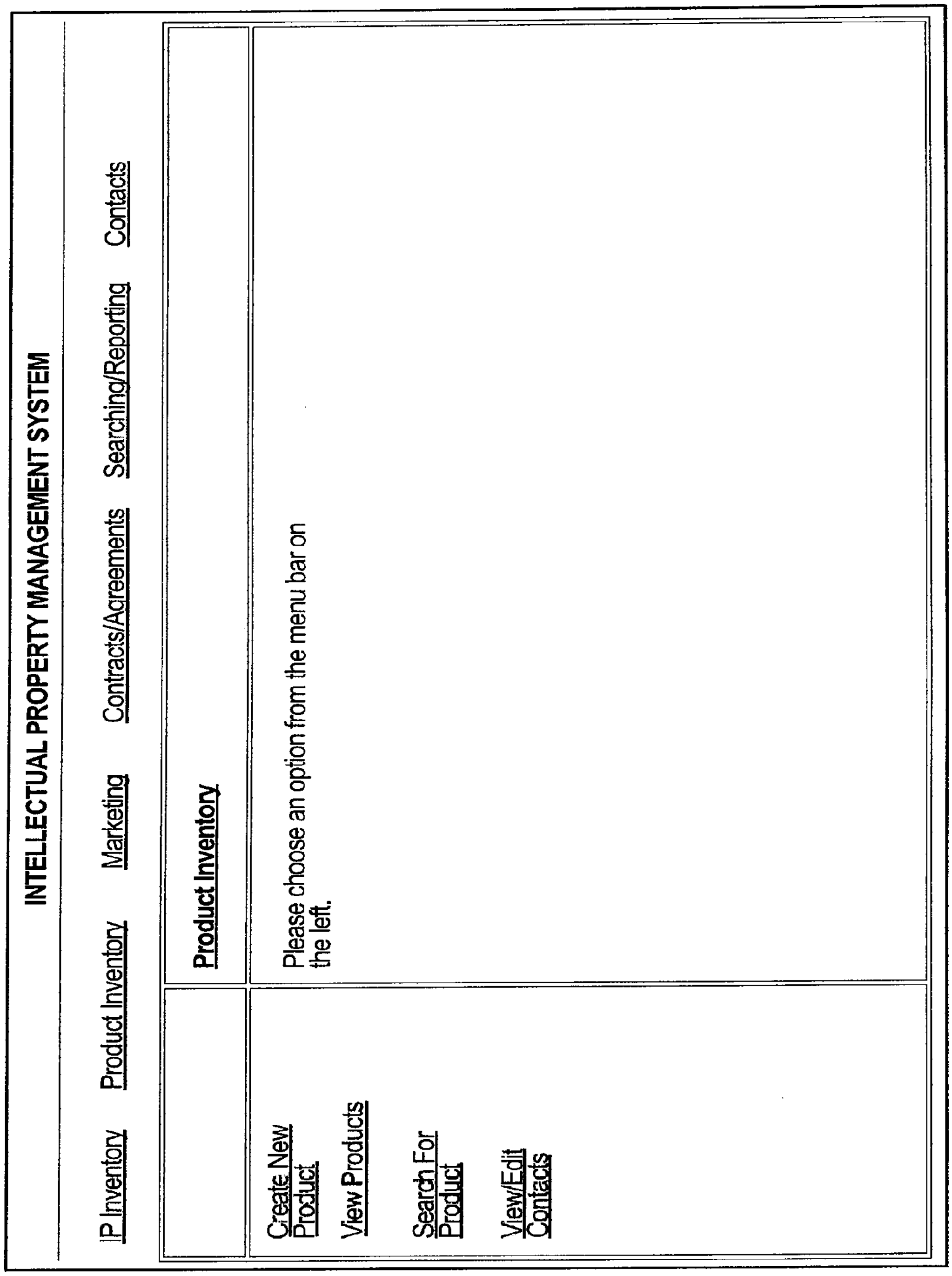

FIG. 65 shows an illustration of a product inventory GUI module in accordance with an embodiment of the present invention. The product inventory GUI module is one of the top-level modules of the Intellectual Property Management System. The product inventory GUI module illustrated in FIG. 65 can include a plurality of links to product inventory submodules including a link to a create new product new product, a link to a view products submodule, a link to a search for product submodule, and a link to a view/edit contacts submodule. A user can access one of the product inventory submodules by selecting and activating the link to the corresponding product inventory submodule. The product inventory GUI module can also include a plurality of links to the other top level modules such as the IP inventory top level module, the marketing top-level module, the contracts/agreements top-level module, the searching/reporting top-level module, and the contacts top-level module.

Figure 66:
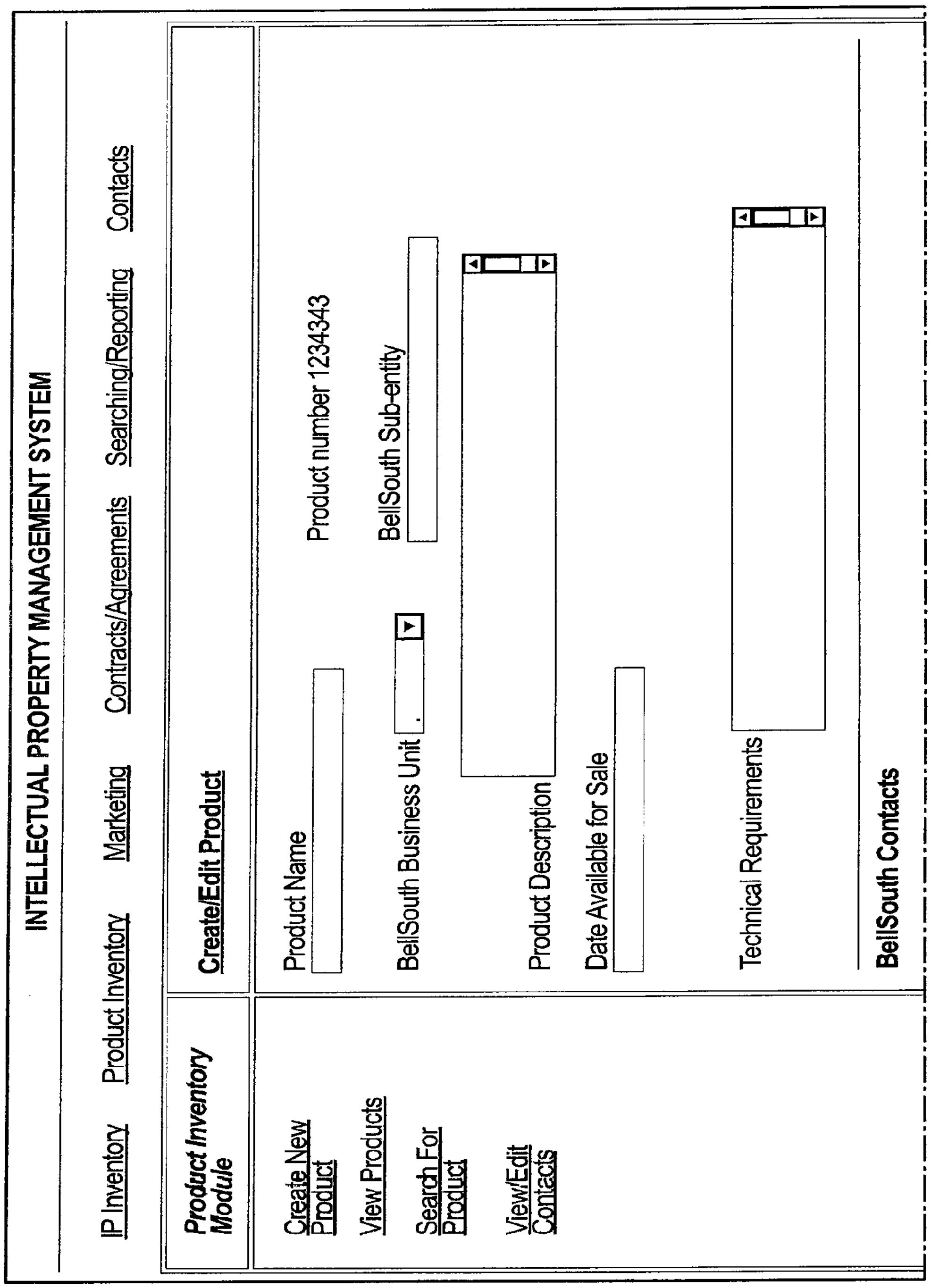
Figure 67:
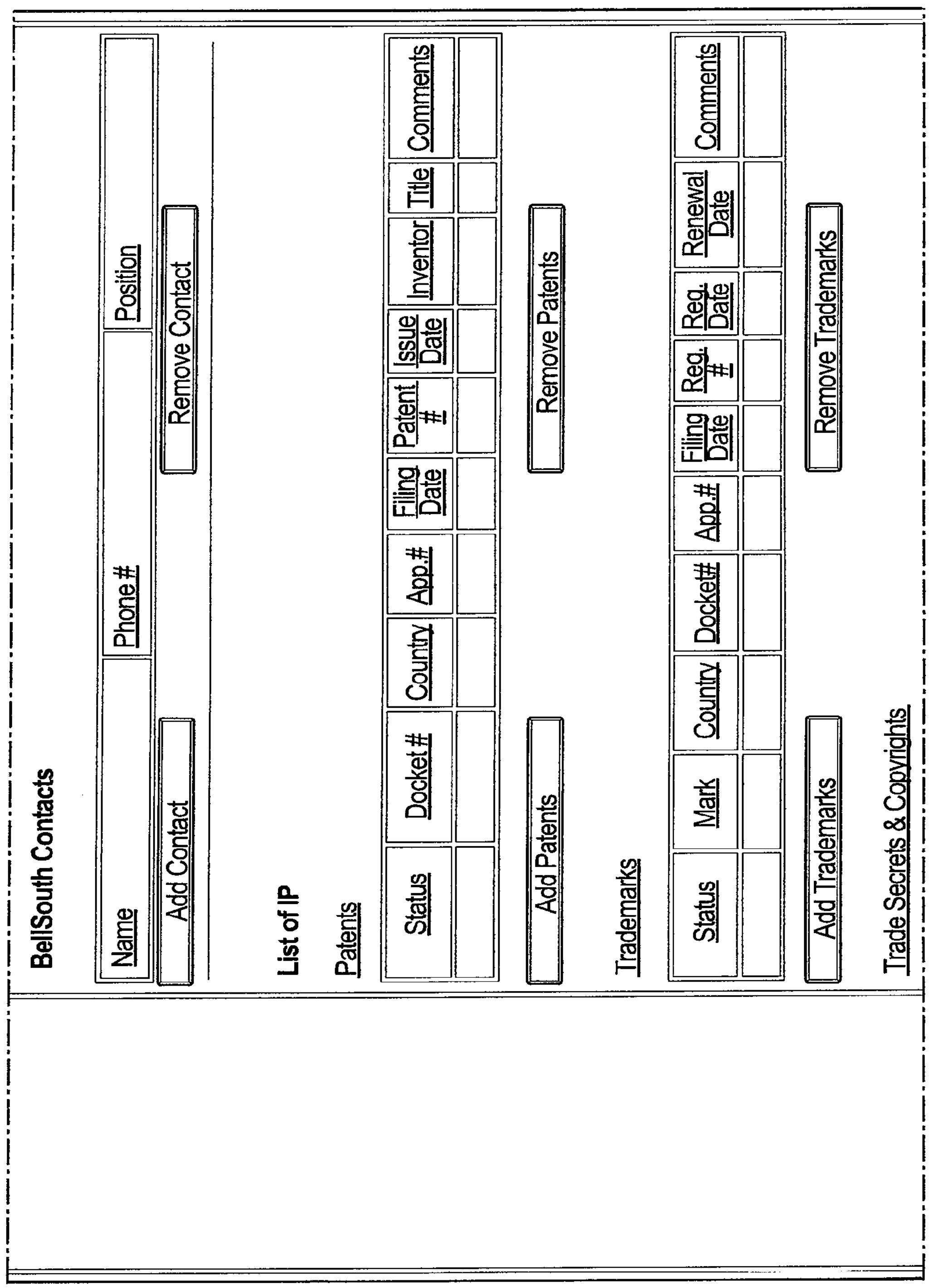
Figure 68:
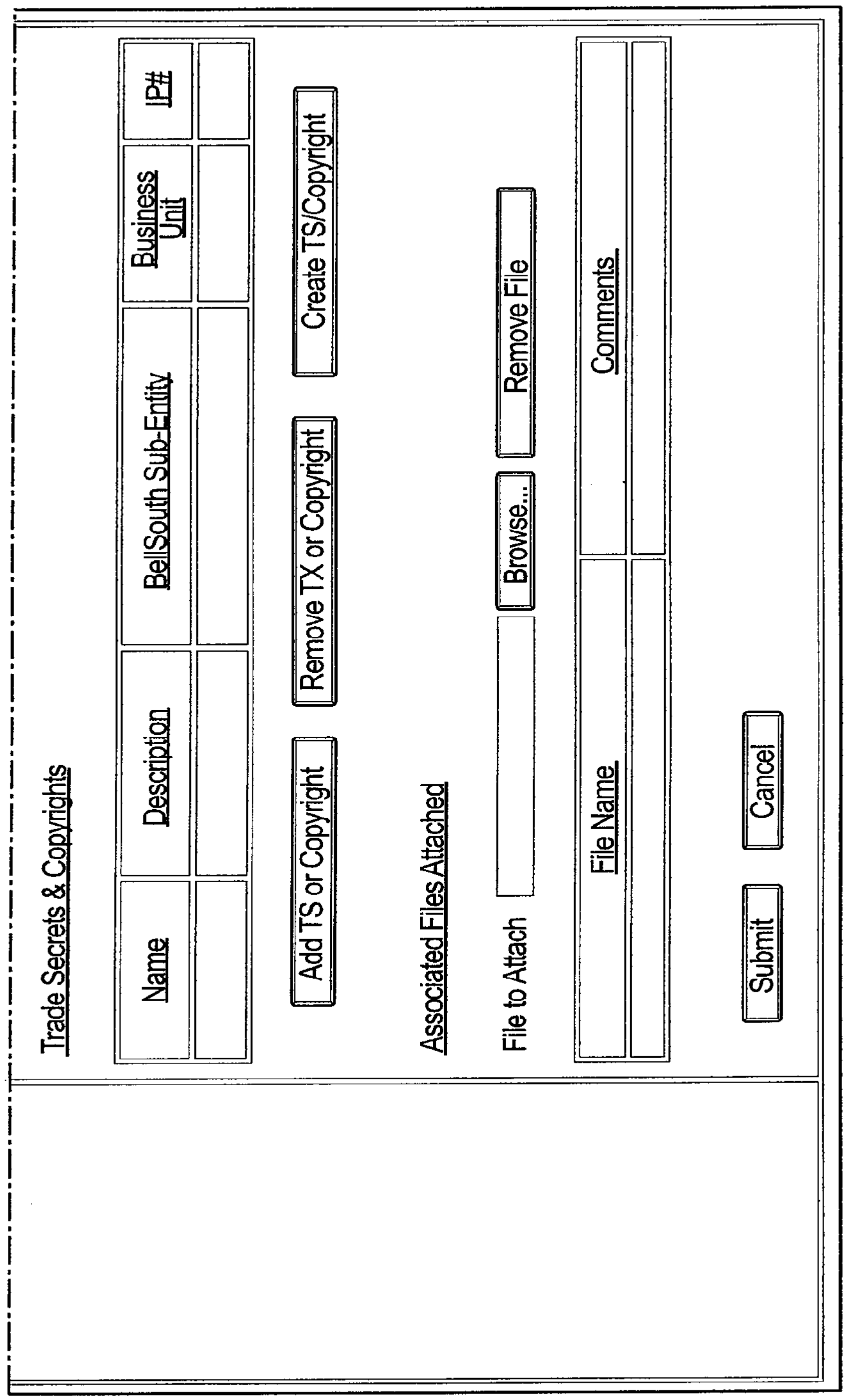

FIGS. 66, 67 and 68 show an illustration of a create/edit product GUI module. The create/edit product GUI module allows a user to create a product data record corresponding to a product. A product can be a service, an article of commerce, an article of manufacture, or another type of product. A user can create a product data record by entering information via the create/edit product GUI module. A user can also edit an existing product data record using the create/edit product GUI module. When a user accesses the create/edit product GUI module to create a product data record, the create/edit product GUI module can display a unique product number to uniquely identify the product data record and/or the corresponding product. The create/edit product GUI module allows a user to input additional information about the product. The create/edit product GUI module can include a plurality of data entry fields for the entry of data into the product data record. For example, a user can enter a product name and identify an associated business unit and/or business sub-entity related to the product. The user can include in the product data record a product description, a date available for sale, and an explanation of any technical requirement. The create/edit product GUI module allows a user to associate one or more contact data records with the product data record. For example, the create/edit product GUI module allows a user to add and remove associated contact data records to the product data record. For example, a user can associate a contact data record with the product data record to specify the name, phone number and position of an associated contact. A user can select and activate the add contact button link to access an add contact screen. The add contact screen can allow a user to search for and select a particular contact data record to be associated with the product data record. After a user designates the contact data record as associated with the product data record, the contact information can be displayed by the create/edit product GUI module as associated with the product data record. The create/edit product GUI module can include a remove contact button link to allow a user to remove a particular contact so that the contact data record is no longer associated with the product data record.

The create/edit product GUI module can include links to modules to add and/or remove intellectual property units as being associated with the product data record and/or the corresponding product. For example, the create/edit product GUI module can include links to modules to associate particular patent-related IP data records, trademark-related IP data records, and/or trade secret/copyright-related IP data records. The create/edit product GUI module illustrated in FIGS. 66-68 can include an add patents button link to access an add patent module to allow the user to search for and/or identify a particular patent-related IP data record that is to be associated with the product data record and the corresponding product. After the user has specified that a patent-related IP data record is to be associated with the product data record, the create/edit product GUI module can display information about that patent-related IP data record such as the status; docket number; country; application number; filing date; patent number; inventor; title; and comments. The create/edit product GUI module can also include a remove patents button link that can access a module to remove a patent so that patent-related IP data record is no longer associated with the product data record.

Likewise, the create/edit product GUI module can include an add trademarks button links and/or a remove trademarks button link to add and/or remove a trademark-related IP data record as being associated with the product data record and the corresponding product. For example, when a user selects the add trademarks button link, the user can access an add the trademarks module that allows the user to specify and/or select a particular trademark-related IP data record as being associated with the product data record and the corresponding product. After the user has identified the trademark-related IP data record as being associated with the product data record, the create/edit product GUI module can display information from the trademark-related IP data record such as status; mark; country; docket number; application number; registration number; registration date; renewal date; and comments. A user can select and activate the remove trademarks button link of the create/edit product GUI module to remove a trademark-related IP data record such that the trademark-related IP data record is no longer associated with the product data record and the corresponding product.

The create/edit product GUI module can include a button link to add and/or remove trade secret/copyright IP data records with respect to the product data record and the corresponding product. For example, the create/edit product GUI module can include an add trade secret and/or copyright button link to access an add trade secret or copyright module that allows a user to specify a particular trade secret/copyright-related IP data record as being associated with the product data record and the corresponding product. After the user has selected a trade secret/copyright-related IP data record as being associated with the product data record and the corresponding product, the create/edit product GUI module can display information from the trade secret/copyright-related IP data record such as the name; description; corporate sub-entity; corporate business unit; and IP number. The create/edit product GUI module can include a remove trade secret or copyright button link to access a module that allows a user to remove a trade secret/copyright-related IP data record from association with the product data record and the corresponding product.

In an embodiment the create/edit product GUI module can include a create/edit trade secret/copyright button link that can access the create/edit trade secret/copyright GUI module to create a trade secret/copyright-related IP data record. The create/edit product GUI module can also include a section to allow a user to attach associated files to the product data record. For example, the create/edit product GUI module can include a link to display information about computer files that are presently associated with the product data record. The create/edit product GUI module can also include a data entry field to allow a user to specify a filename of a file that is to be associated with the product data record and/or the corresponding product. A user can also select and activate a browse button link to allow the user to browse listings of computer files stored locally and/or on a network that can be associated with the product data record. A remove file button link can be included to allow a user to remove an associated file such that the file is no longer associated with the product data record and/or the corresponding product. After a user has attached a file as being associated with the product data record and/or the corresponding product, the create/edit product GUI module can display information about the associated file such as the filename and any comments entered by a user with respect to that associated file.

The create/edit product GUI module can include a submit button link to allow a user to indicate that the product data record should be saved. The create/edit product GUI module can also include a cancel button link to allow a user to cancel creation or editing of a product data record such that the data fields in the create/edit product GUI module can be cleared and/or the user can be returned to a previous screen.

Figure 69:
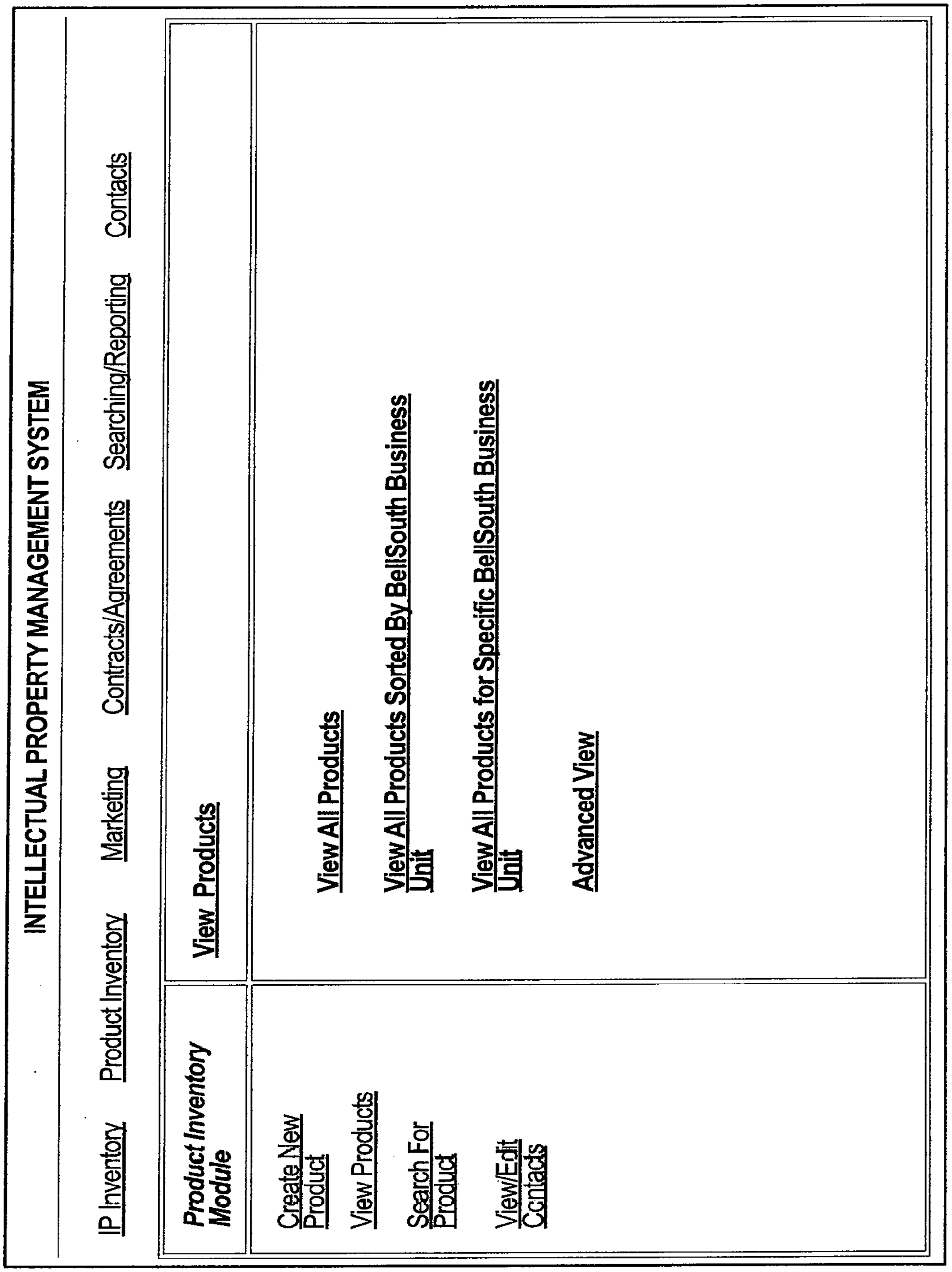

FIG. 69 shows an illustration of an embodiment of a view products GUI components corresponding to the view products submodule of the product inventory module. The view products GUI component allows a user to view product data records in one or more of a plurality of manners. As illustrated in FIG. 69, the view products GUI component can include a plurality of links to modules that allow viewing of product data records. For example, the modules for viewing product data records can include: a module to view all product data records; a module to view all product data records viewed by a corporate business unit; a module to view all product data record for a specific corporate business unit; and a module for an advanced view of all product data records. Accordingly, the view products GUI component illustrated in FIG. 69 includes a plurality of links to each of the modules that allow viewing of product data records.

Figure 70:
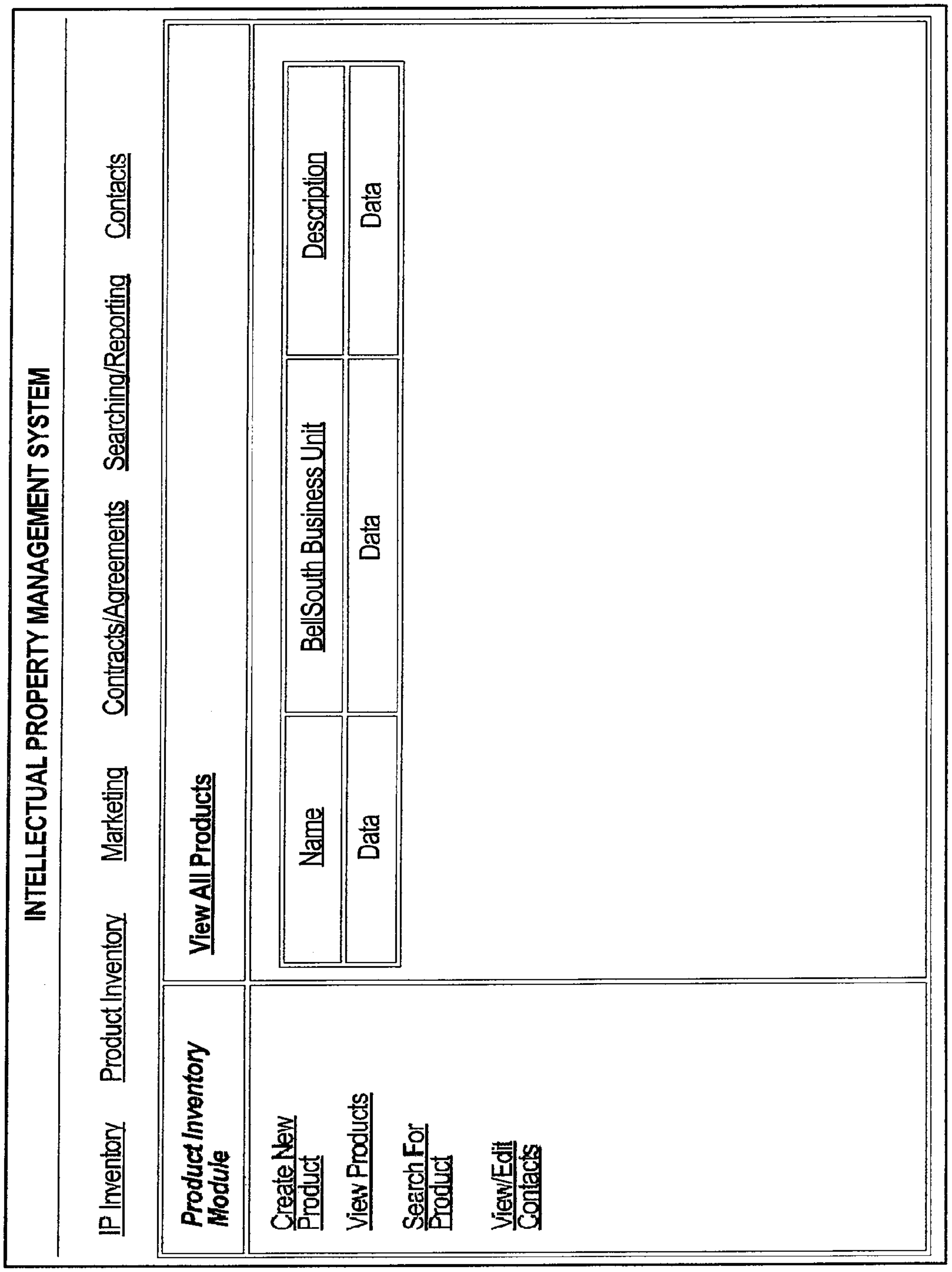

FIG. 70 is an illustration of a view all products GUI component that can be accessed when a user selects and activates the link to the view the all products module of the view products GUI component illustrated in FIG. 69. The view all products GUI component illustrated in FIG. 70 can display a listing of all product data records. The listing of all product data records can display information corresponding to each product data record information in an individual row. A row of the listing of the product data record information can include for each product data record: the name of the product corresponding to the product, the data record the corporate business unit of the product and a description of the product. In another embodiment other data fields of the product data record and/or other data fields of other data records can be displayed. To view additional information relating to an individual product data record, a user can click on a row in the listing of the product data records. The user will then be presented with a view individual product record GUI component that can display additional information relating to the product data record, such as a more complete listing of the data fields of the product data record.

Figure 71:
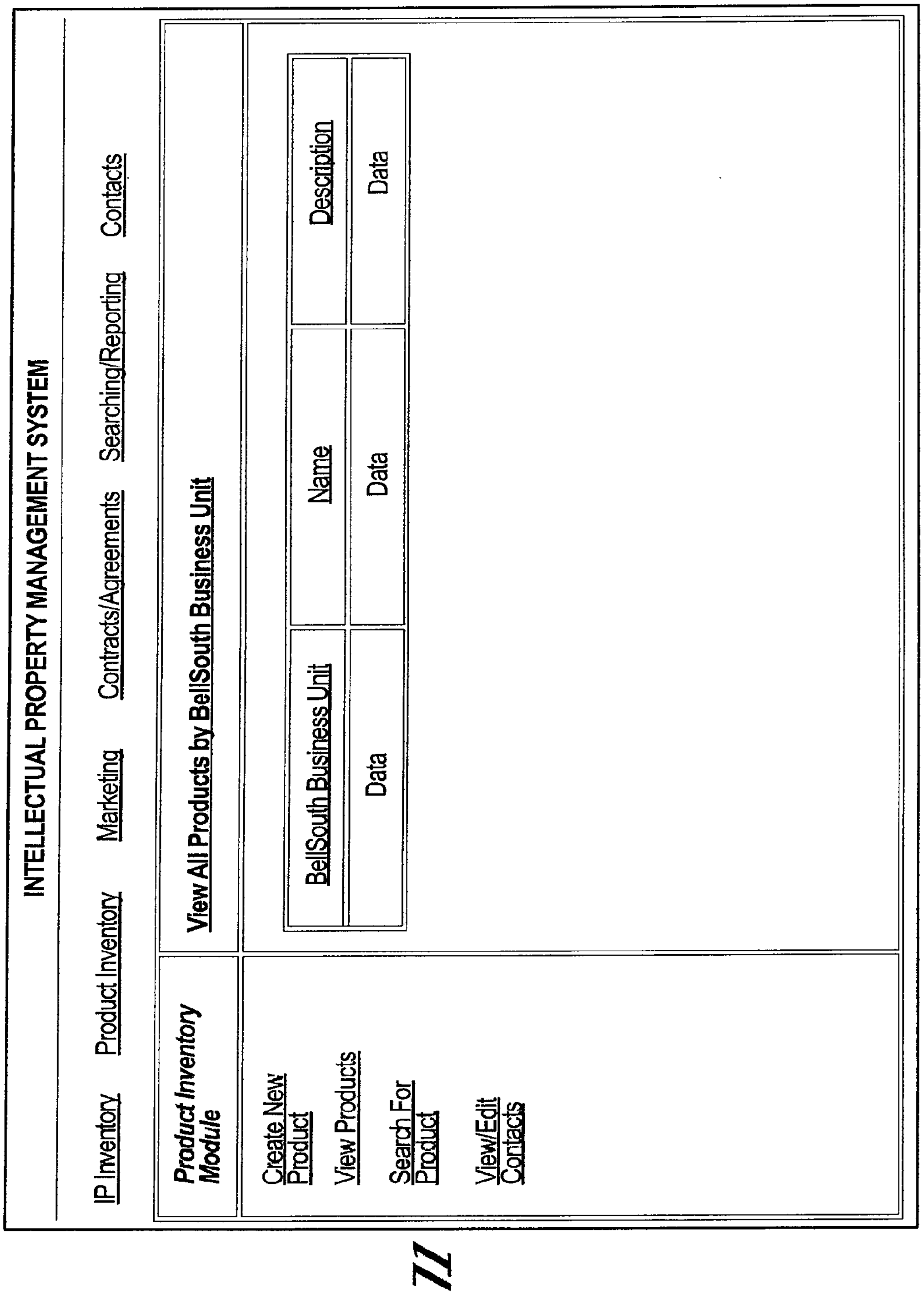

FIG. 71 is a view all products sorted by corporate business unit GUI component. A user can access the view all products sorted by corporate business unit GUI component illustrated in FIG. 71 by selecting and activating the corresponding link in the view products GUI component illustrated in FIG. 69. The view all products sorted by corporate business unit GUI component can display a listing of all product data records sorted by corporate business unit. The product data records can be displayed in a listing where each product data record is displayed in an individual row. A user can view a more detailed information corresponding to the product data record by clicking on the row listing that product data record.

Figure 72:
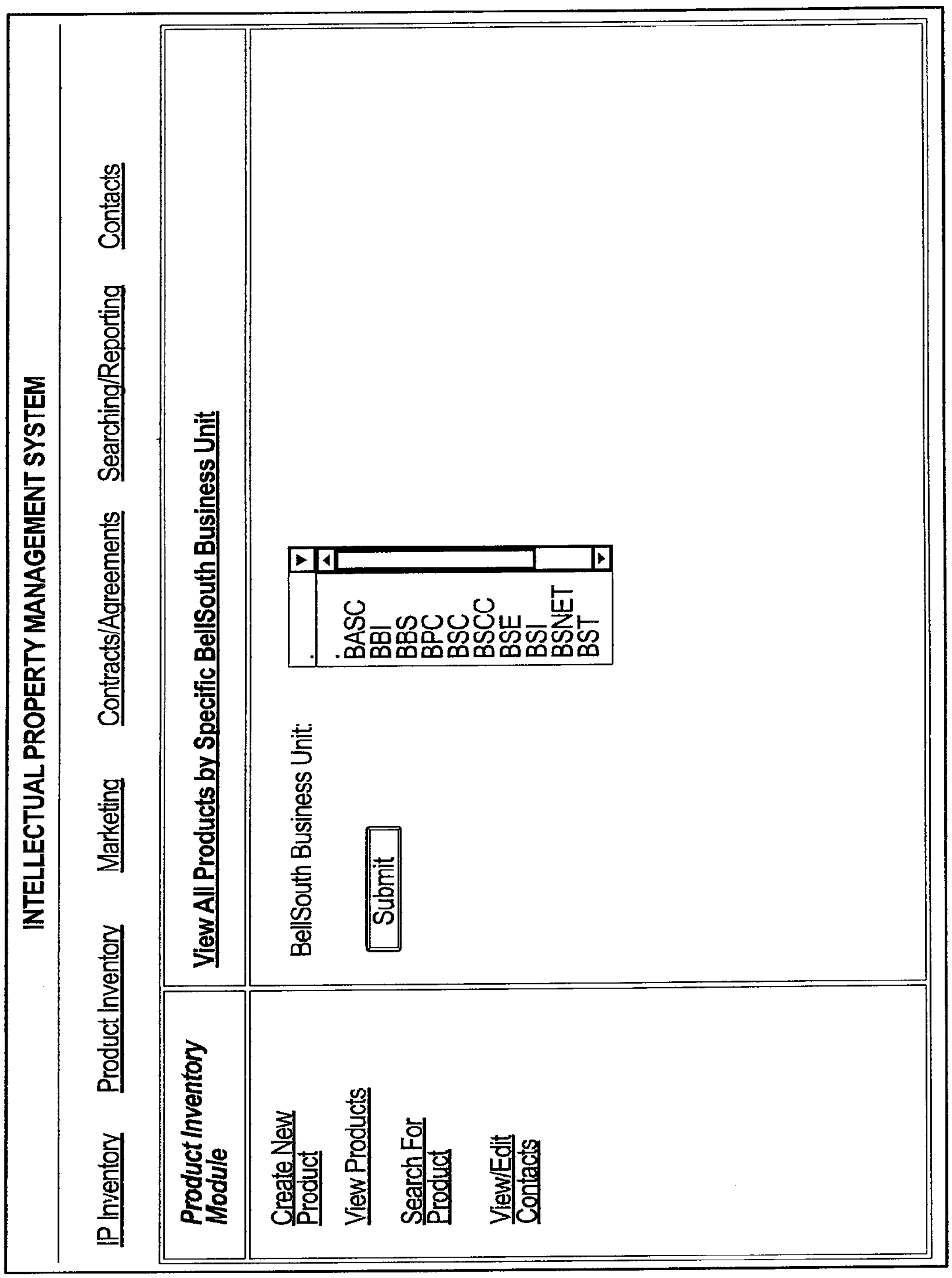

FIG. 72 shows an illustration of a select view all product by a specific corporate business unit GUI component. The select view all products by specific corporate business unit GUI component allows a user to specify a specific corporate business unit and cause the display of the product data records related to that specific corporate business unit. A user can specify the specific corporate business unit by entering information in a data entry field and/or select a business unit via a drop down menu as illustrated in FIG. 72. After a user has selected the appropriate corporate business unit, the user can select and activate the submit button link to cause a display of information relating to each product data record of the specific corporate business unit.

Figure 73:
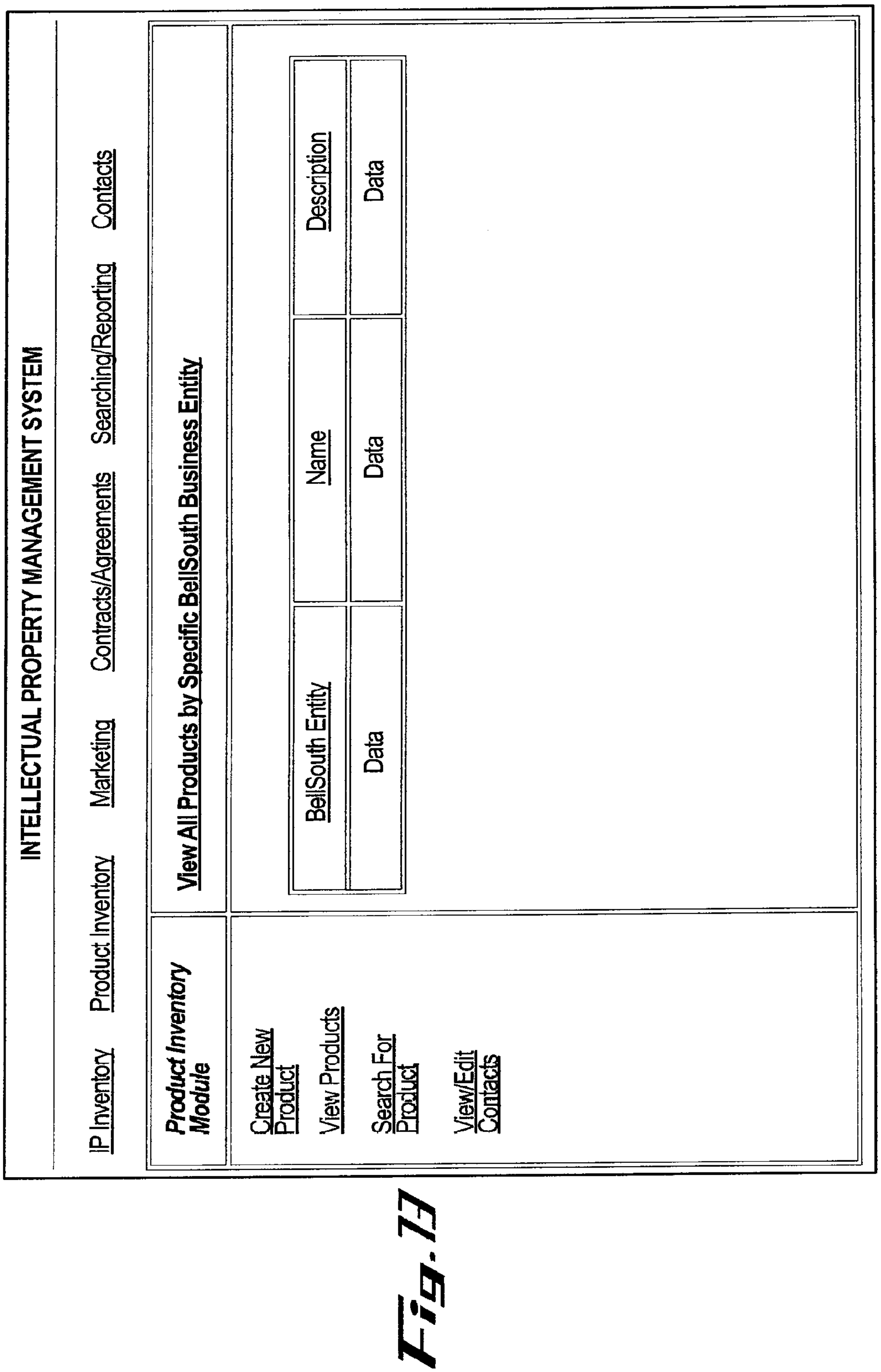

FIG. 73 shows an illustration of a view all products by specified corporate business unit GUI component. The product data records corresponding to the specified corporate business unit can be displayed in a listing where each product data record is displayed in a row. A user can cause a more detailed view of information relating to the product data record to be displayed by selecting and activating a specific row.

Figure 74:
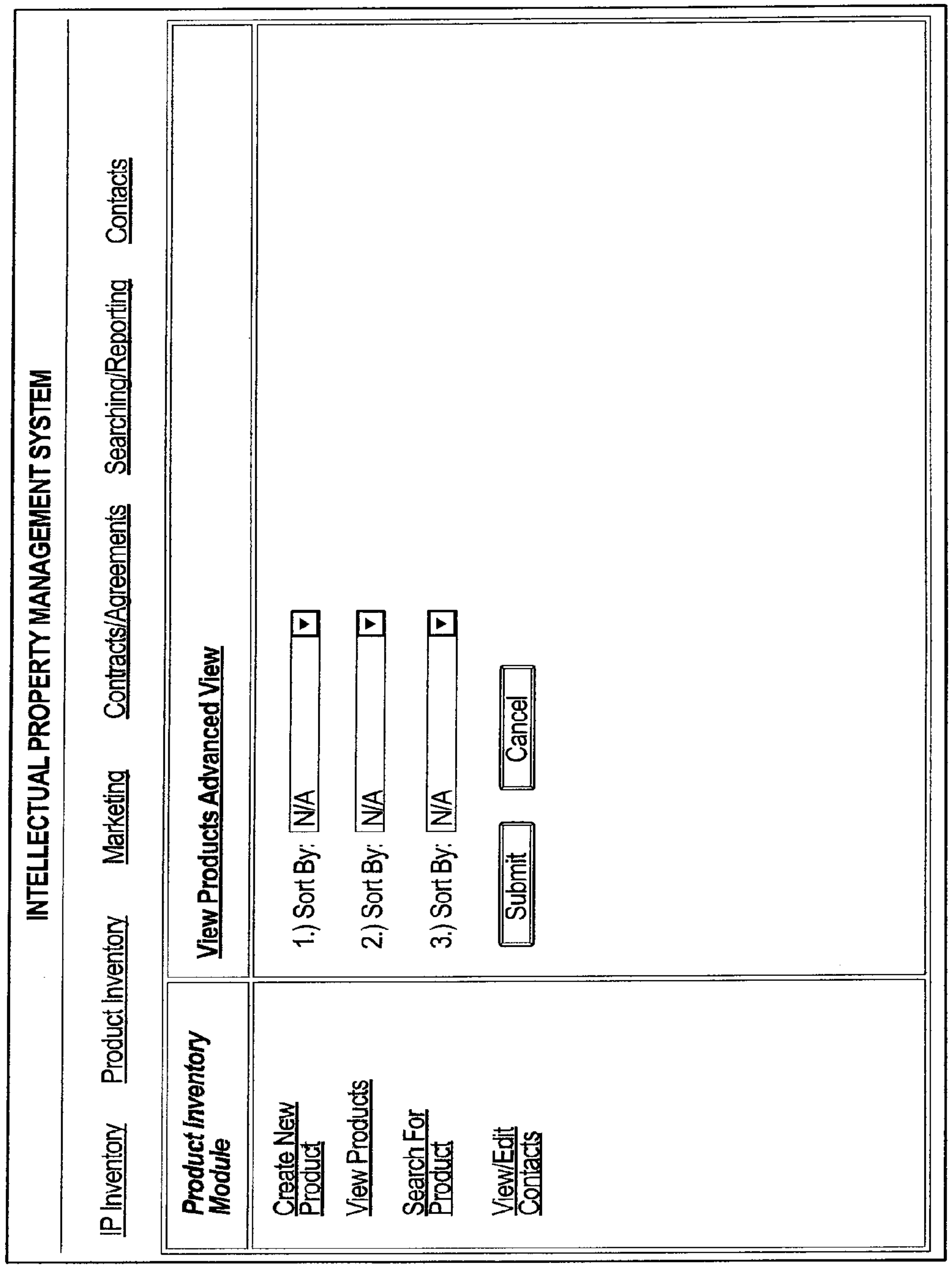
Figure 75:
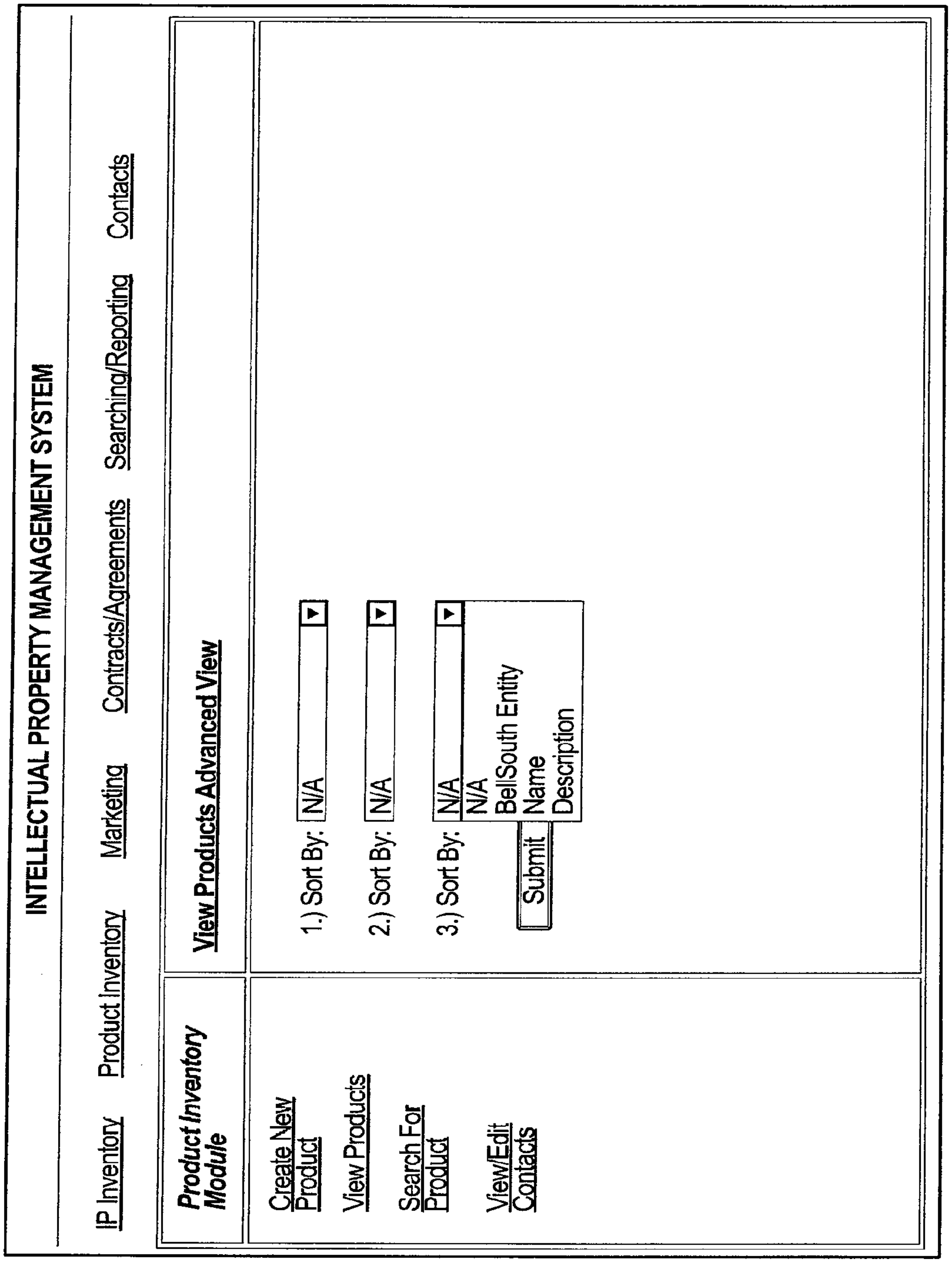
Figure 76:
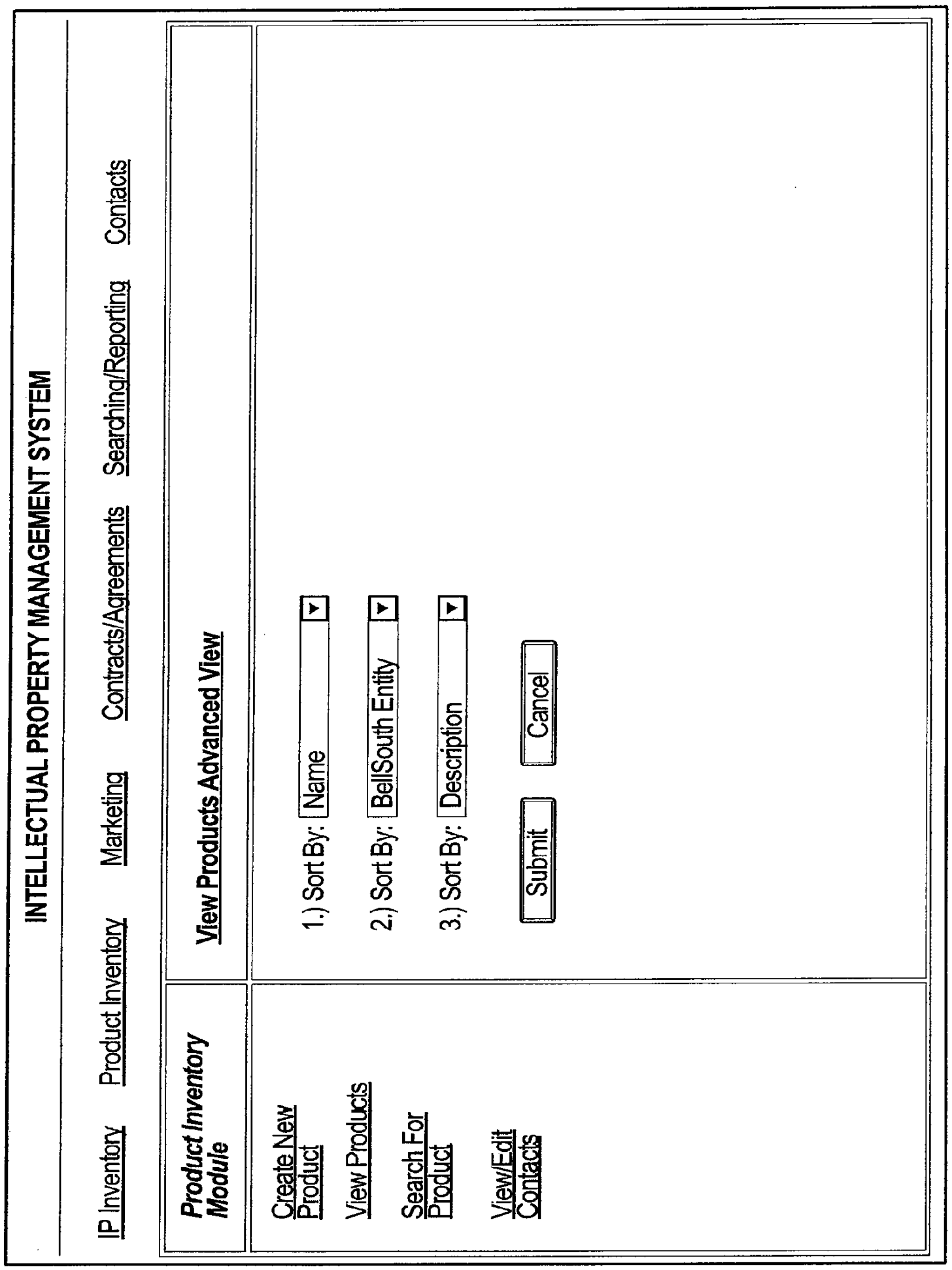

FIG. 74 shows an illustration of a view products advanced view GUI component. The view products advanced view GUI component can allow a user to specify particular sort criteria for the display of the product data records. The user can enter sort criteria into a data entry field or select sort criteria from a drop down menu. For example, FIG. 75 shows a drop down menu that can present a listing of sort criteria such as corporate business unit, name, and/or description. FIG. 76 shows an illustration of the view products advanced view GUI component in which a user has selected the first sort criterion to be the product name, the second sort criterion to be the corporate entity and/or business unit, and the third sort criterion to be the description. After a user has specified the sort criteria, the user can select and activate the submit button link to direct display of the sorted product data records. Alternatively, the user can select and activate the cancel button link to cause a redisplay of the view products advanced view GUI component without any specified sort criteria and/or cause the IP management system to display the prior screen.

Figure 77:
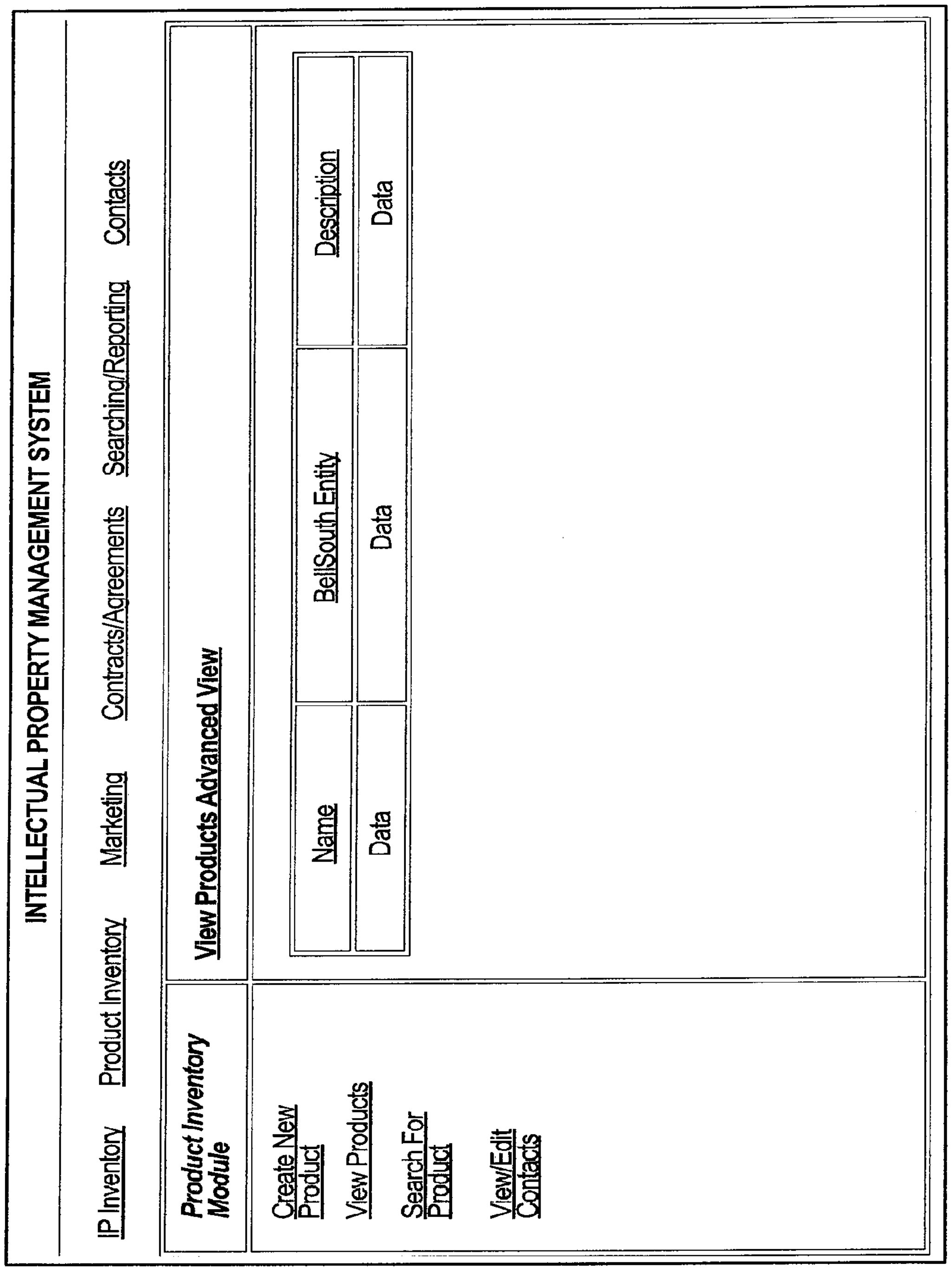

FIG. 77 shows the view products advanced view GUI component that can display a listing of product data records according to the specified sort criteria. The product data records can be listed in rows where each product data record is listed in a particular row. The information displayed for each particular product data record can include the name of the product, the corporate business unit and/or business entity associated with the product, and/or a description of the product corresponding to the product data record. In another embodiment, other data fields relating to the product data record are displayed. A user can cause a more detailed view of a product data record to be displayed by selecting and activating a product data record displayed by the view products advanced GUI component.

Figure 78:
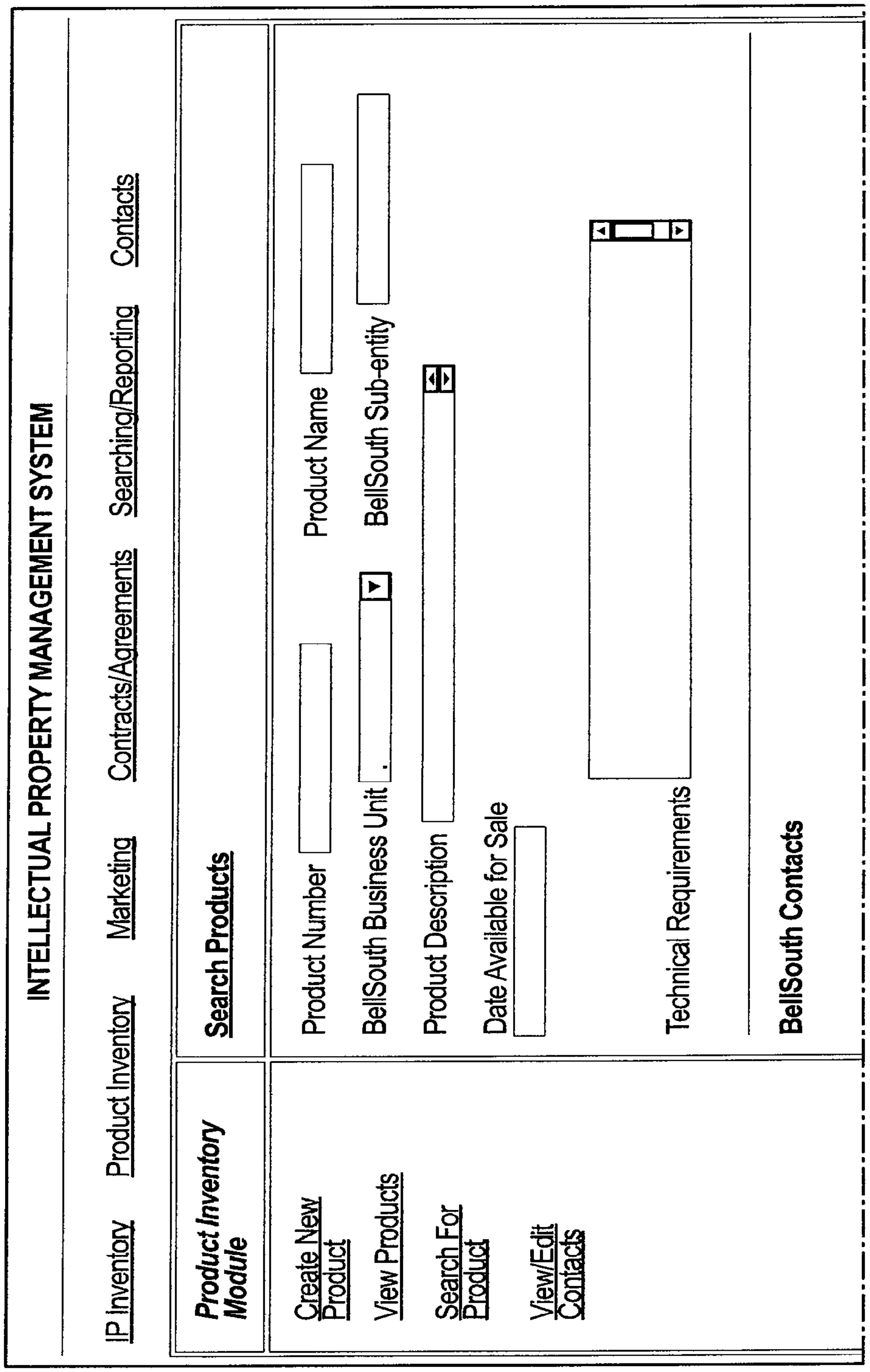
Figure 79:
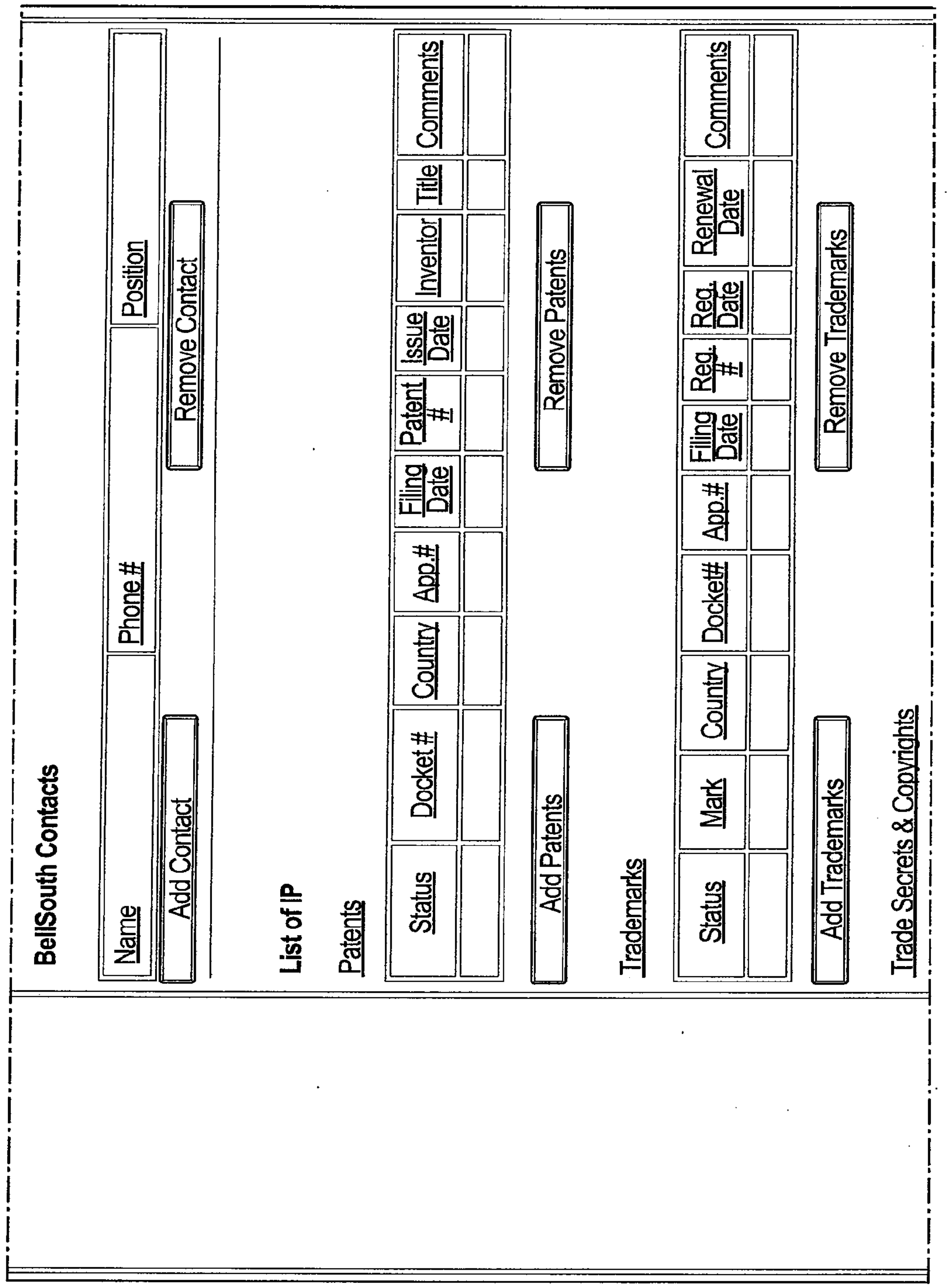
Figure 80:
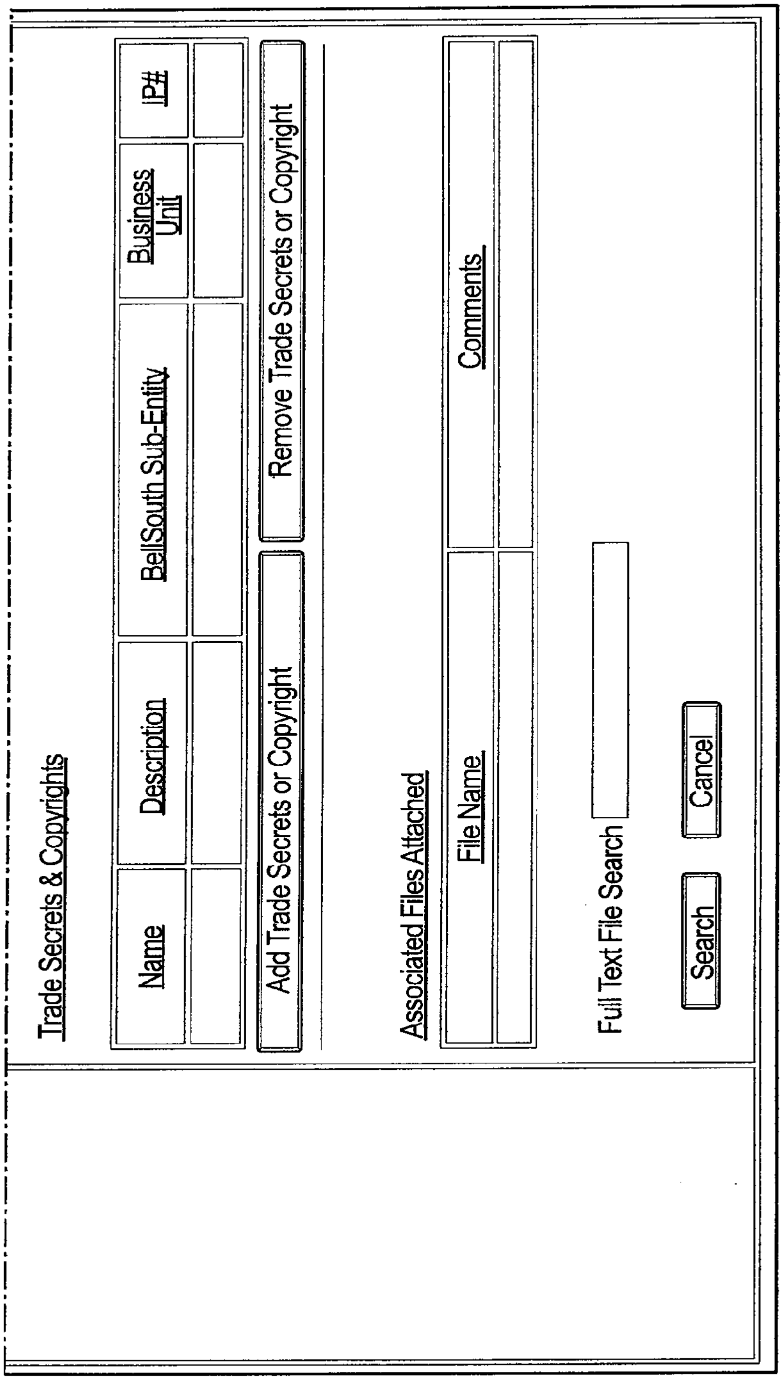

FIGS. 78-80 show an illustration of an embodiment of a search products GUI component corresponding to a search products submodule of the product inventory module. The search products GUI component allows a user to search for a particular product data record based on user selectable criteria. For example, the search products GUI component can allow a user to specify one or more of the following criteria: product number; product name; corporate business unit; corporate subentity; product description; date available for sale; technical requirements; contacts; associated contacts; associated patent-related IP data records; associated trademark-related IP data records; associated trade secret/copyright-related IP data records; and/or associated files.

A user may also enter sort criteria via a data entry field to search the product data records using a full text file search. In an embodiment, the search products GUI component includes an add contact button link and a remove contact button link to add and/or remove an associated contact data record from the search criteria. When an associated contact data record is specified as a search criteria, a description of that associated contact can be displayed by the search products GUI component illustrated in FIGS. 78-80. For example, when an associated contact data record is included as a search criterion, the name, phone number and position data from the associated contact data record can be displayed. Likewise, the search products GUI component can include an add patents button link and a remove patents button link to add or remove as a search criteria a particular patent-related IP data record. When a patent-related IP data record is selected as a search criterion, a description of that patent-related IP data record can be displayed. For example, for an associated patent-related IP data record that is specified as a search criterion, the status, docket number, country, application number, filing date, patent number, issue date, inventor, and title, comments data for the patent-related IP data record can be displayed.

The search products GUI component illustrated in FIGS. 78-80 can also include an add trademarks button link and a remove trademarks button link to add and/or remove trademark-related IP data records as search criteria. For a trademark-related IP data record that is included as a search criterion, the status, mark, country, docket number, application number, filing date, registration number, registration date, renewal date, and comments data of the trademark-related IP data record can be displayed. The search products GUI component can also include an add trade secret/copyright button link and/or remove trade secret/copyright button link to add and/or remove trade secret/copyright related IP data records as search criteria. When one or more trade secret/copyright related IP data records are selected as search criteria, the search products GUI component can display the name, description, corporate entity, corporate business unit, and IP number of the trade secret/copyright-related IP data record. In an embodiment, the search products GUI component includes an add associated file button link and/or a remove associated file button link to add and/or remove an associated computer file as a search criterion. When an associated file is selected as a search criterion, the search products GUI component can display the filename of the associated file and any comments regarding the associated computer file. After a user has specified the search criterion via the search products GUI components, the user can select and activate the search button link to direct searching of the product data records based on the specified search criterion. Alternatively, to cancel the search, the user can select and activate the cancel button link to cause the search products GUI component to be redisplayed without any specified search criterion and/or cause the IP management system to display the prior screen (e.g., the screen last displayed prior to the display of the search products GUI component).

Figure 81:
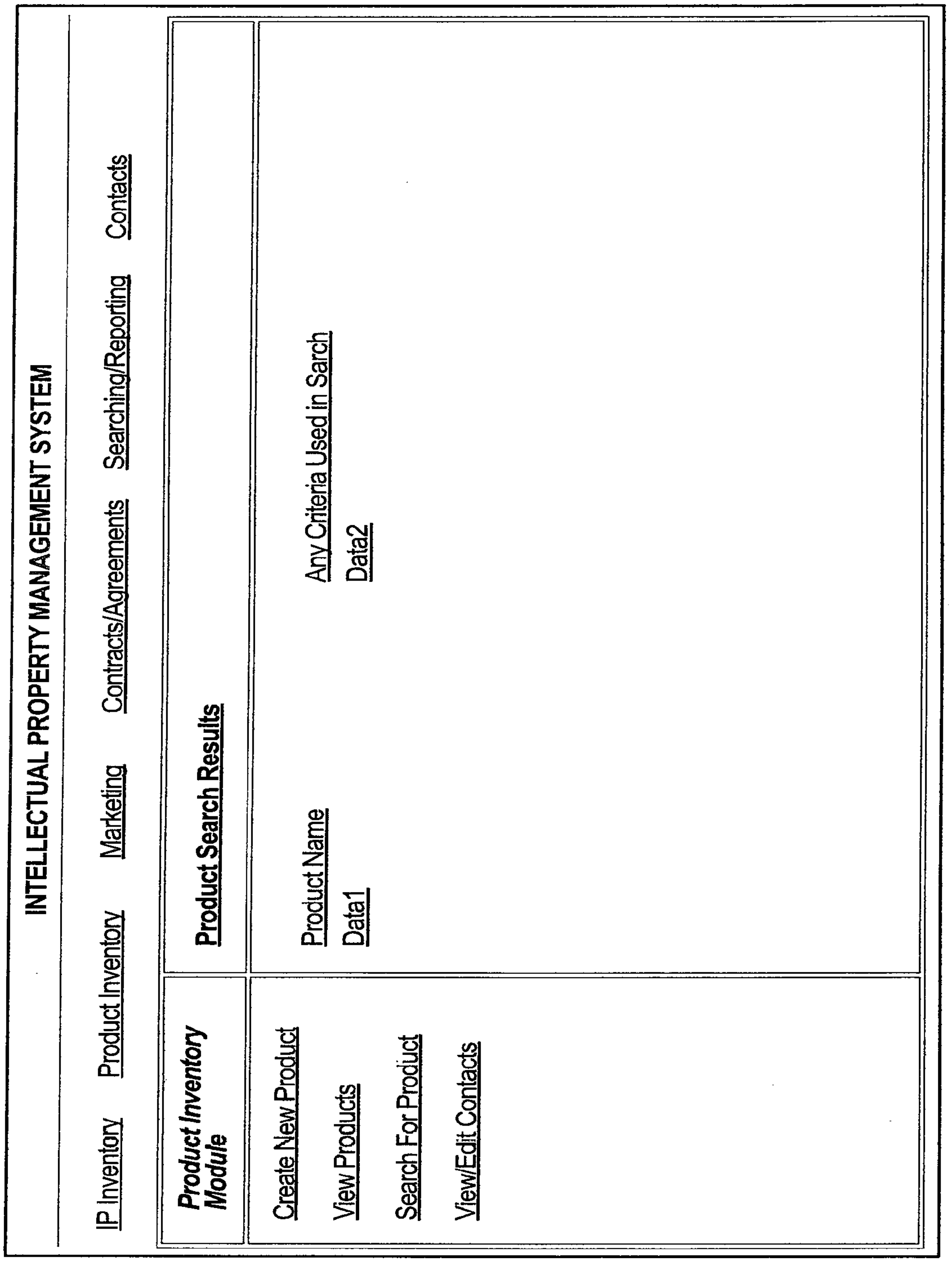
Figure 82:
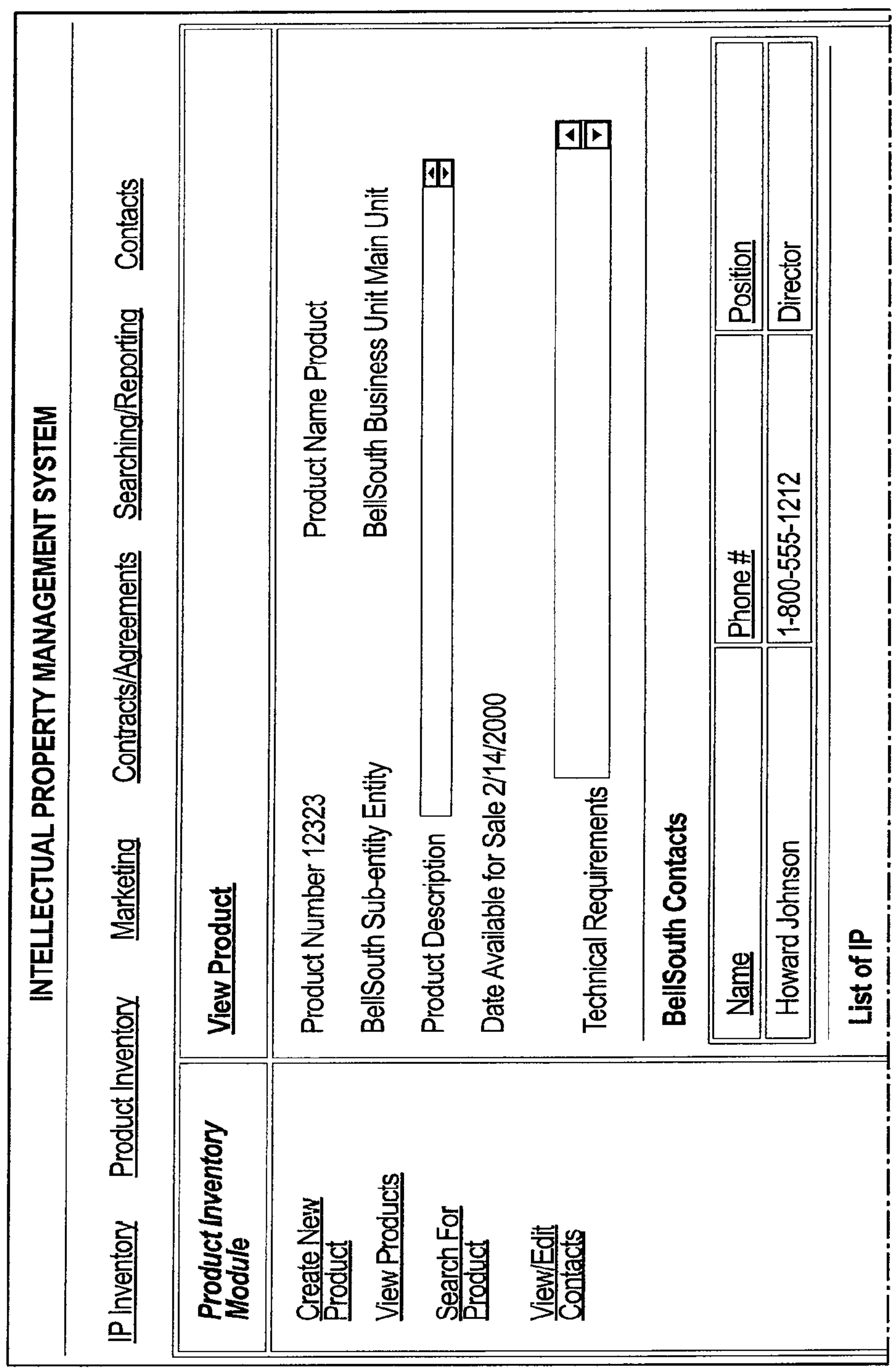
Figure 83:
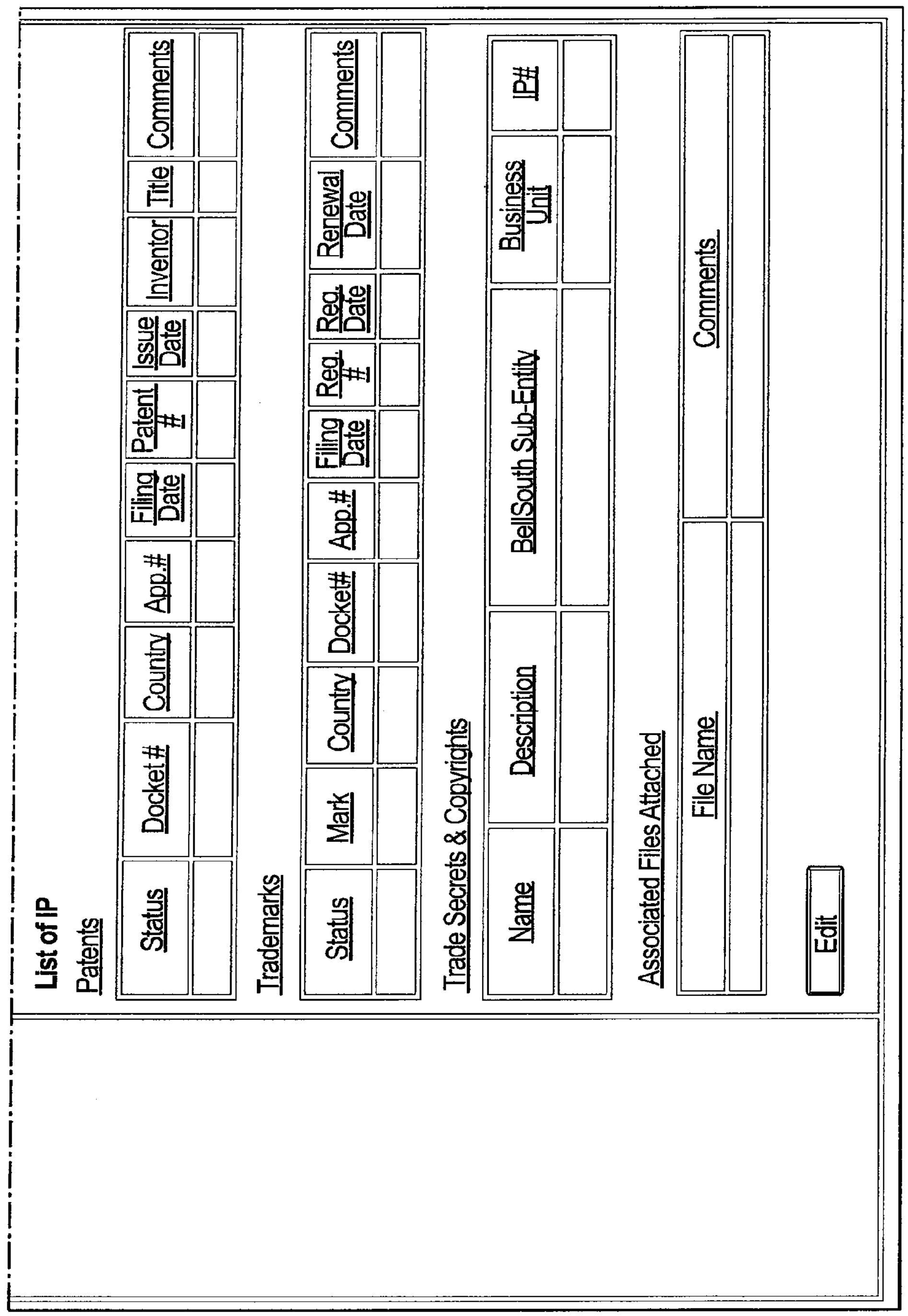

FIG. 81 shows an illustration of an embodiment of a product search results GUI component. The product search results GUI component can display the product data records that met the criteria as specified by a user via the search products GUI component illustrated in FIGS. 78-80. For example, the product search results GUI component can include a listing of the product data records corresponding to the specified search criteria. The product search results GUI components illustrated in FIG. 81 shows an example of a search in which the product name was a specified search criterion. Accordingly, the data displayed for each product data record that met the specified search criterion can include a display of the product data field and a data field corresponding to any other search criteria specified. A user can cause a more detailed view of a product data record to be displayed by selecting and activating the product data record displayed by the product search results GUI component of FIG. 81. For example, FIGS. 82-83 show a view product GUI component that displays a more detailed view of a product data record. The view product GUI component as illustrated in FIGS. 82-83 can cause the display of data fields of the product data record such as: the product number; the product name; the corporate subentity; the corporate business unit; the product description; the date available for sale; technical requirements, if any; any associated contacts; any associated IP data records such as patent-related IP data records, trademark-related IP data records, and/or trade secret/copyright-related IP data records; and associated files. The view product GUI component can also include an edit button link that can be selected and activated by a user to cause the display of a GUI component allowing a user to edit the product data record being displayed. For example, in an embodiment, when a user selects and activates the edit button link of the view products GUI component illustrated in FIGS. 82-83, the create/edit product GUI component illustrated in FIGS. 66-68 is displayed to a user to allow editing of the product data record.

The product inventory top level GUI component illustrated in FIG. 65 also includes a link to a view/edit contacts submodule of the product inventory module. The view/edit contacts submodule corresponds to the contacts top-level module of the IP management system, and an embodiment of the contacts top-level module is described in FIGS. 157-165 and the accompanying text regarding those figures.

Marketing Module

Figure 84:
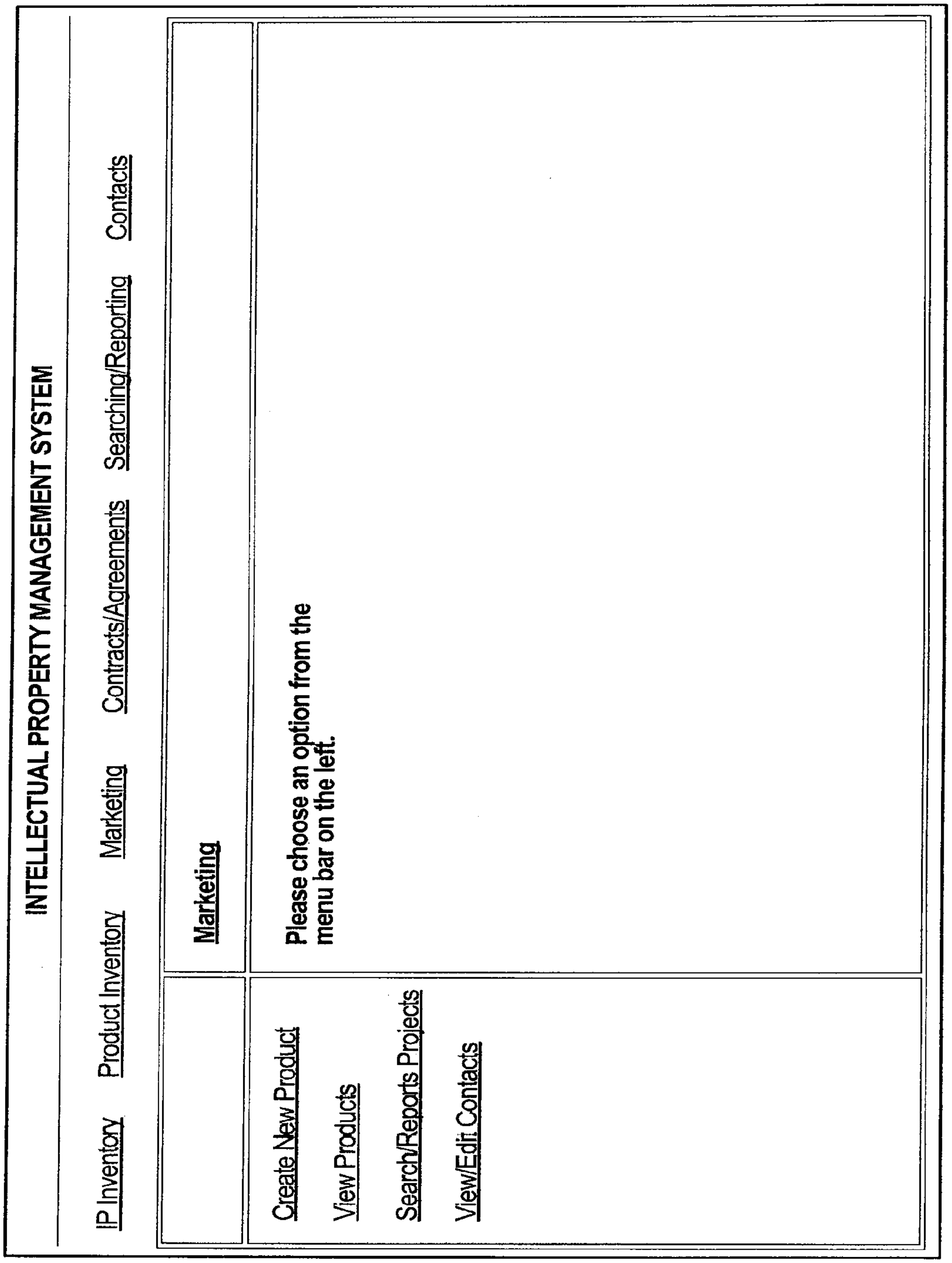

FIGS. 84 to 110 illustrates an embodiment of the marketing top-level module of the IP management system. FIG. 84 shows an illustration of an embodiment of a marketing top-level GUI component. The marketing top-level GUI component illustrated in FIG. 84 can include a plurality of links to submodules of the marketing module including links to: a create new project module; a link to a view/edit project module; a link to a search/report project submodule; and a link to a view/edit contacts module. In an embodiment the link to the view/edit contacts module is a link to the contacts top level module of the IP management system. The link to the view/edit contacts module can be included in the marketing top-level GUI component and other GUI components of the submodules of the marketing module in order to provide a user with easy access to a module to view and edit contact data records.

Figure 85:
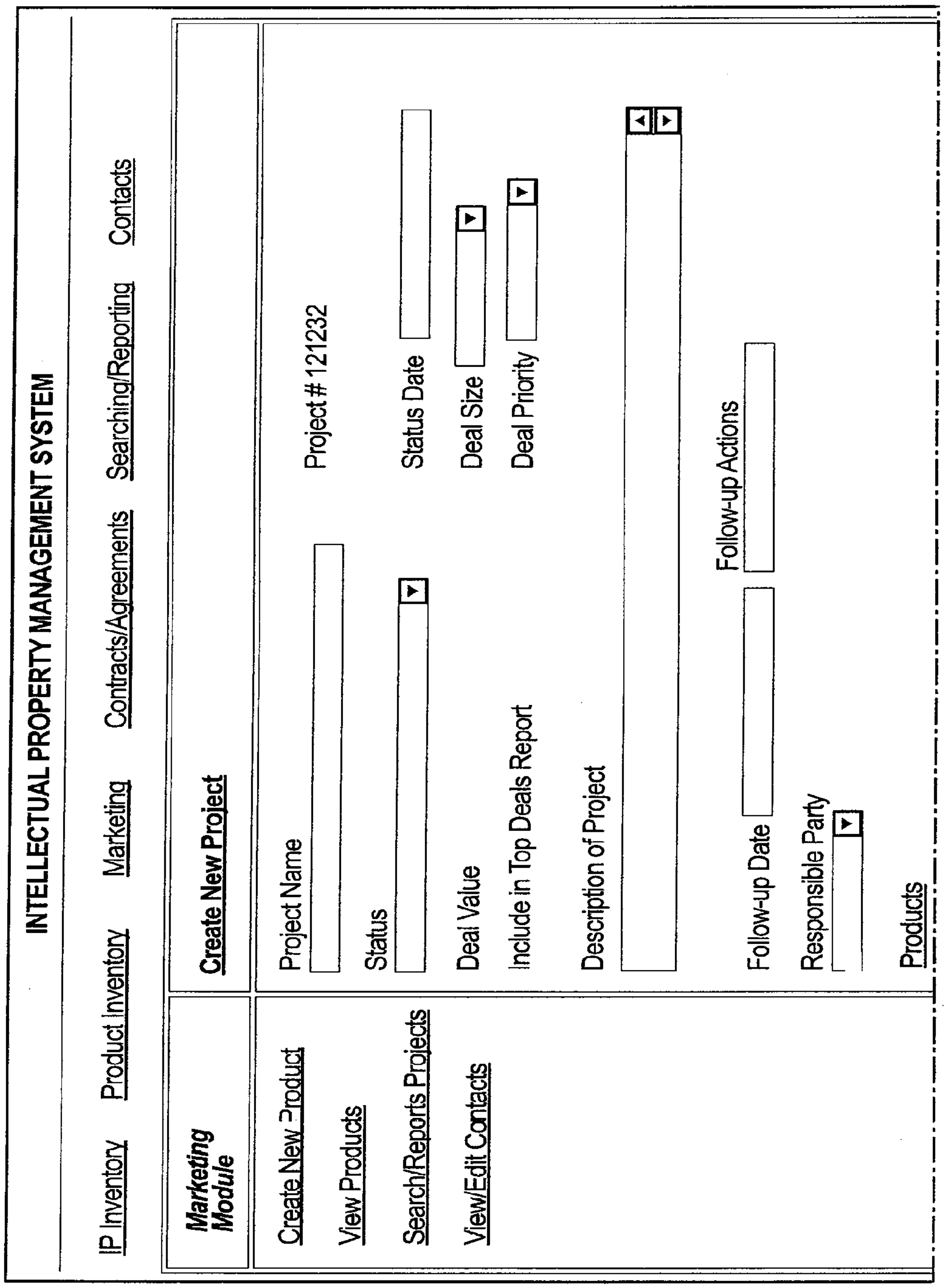
Figure 86:
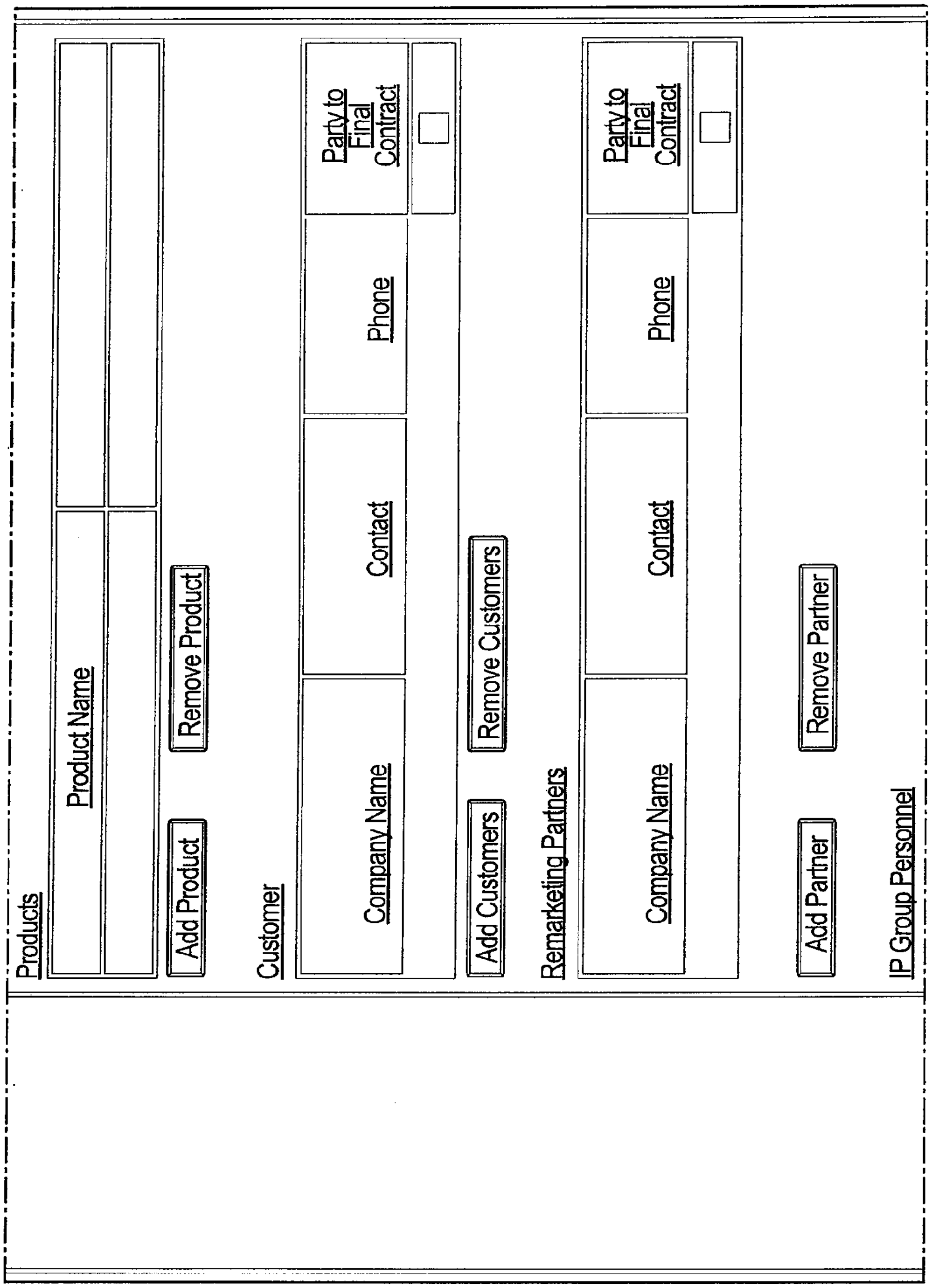
Figure 87:
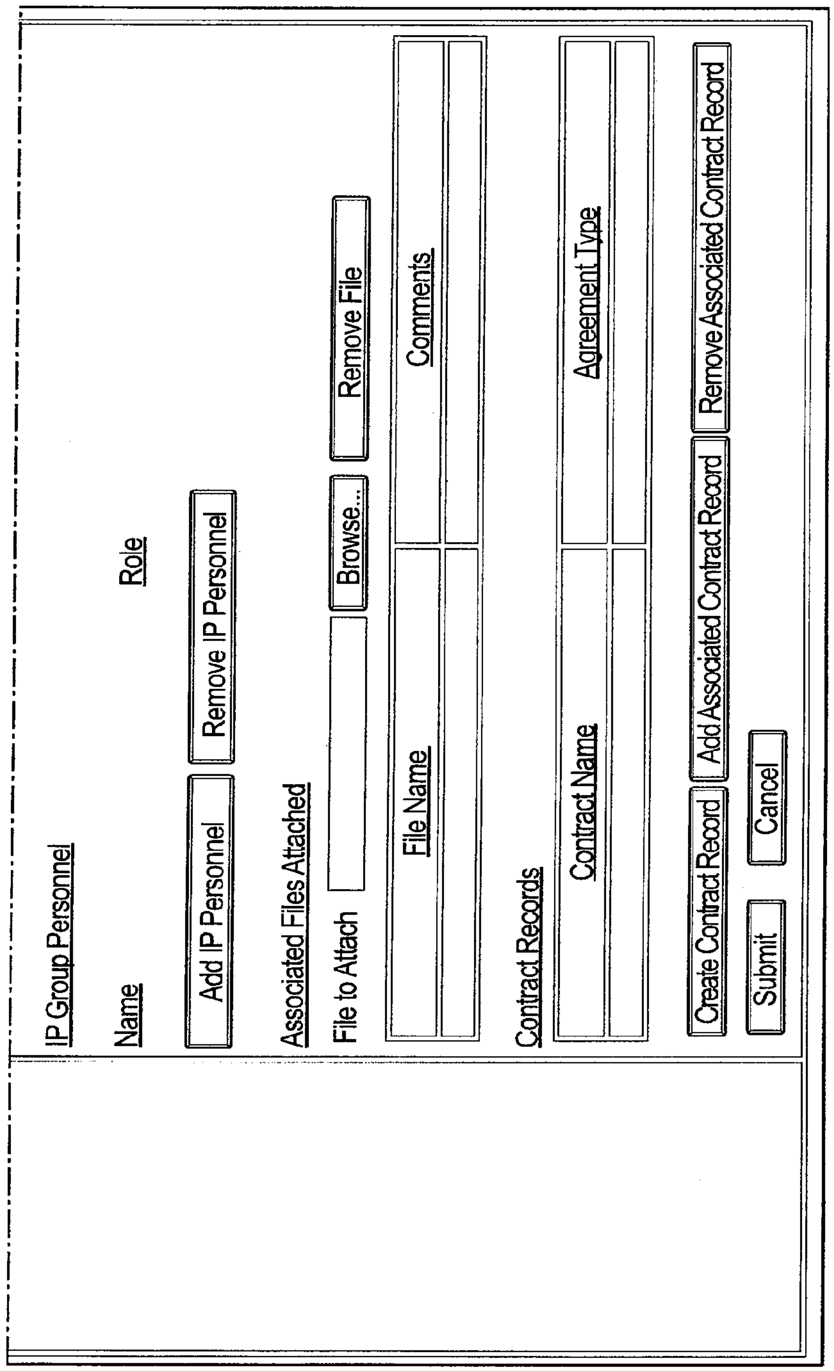

FIGS. 85 through 87 show an illustration of an embodiment of a create/new project GUI component. A create/new project GUI component can allow a user to create a project data record associated with the marketing of intellectual property. The create/new project GUI component illustrated in FIGS. 85-87 can allow a user to enter data into data fields of a project data record. For example, the create/new project GUI component can include data entry fields for the entry of project data record data such as: project name; status; status date; deal value; deal size; deal priority; an include in top deals report indicator; description of project; follow-up date; follow-up action; and responsible party.

The create/new project GUI component can also include an add product button link and/or a remove product button link to allow a user to specify a product data record to be associated with the project data record. For example, when a user selects and activates the add product button link the user can specify and/or select a product data record that is to be associated with the project data record. In an embodiment, a user can be presented with a search screen that allows the user to search for and select a product data record to be associated with the project data record. After a user has selected a project data record to be associated with the project data record, information corresponding to the product data record can be displayed by the create/new project GUI component. For example, the product name data of the project data record can be displayed. Additional and/or other data of the project data record and other data records can also be displayed by the create/new project GUI component.

The create/new project GUI component illustrated in FIGS. 85-87, can also include an add customers button link and/or a remove customers button link. A user can select and activate the add customers button link to specify a customer data record that is to be associated with the project data record. After a user has specified a customer data record as being associated with a project data record information corresponding to the customer data record, the customer data record can be displayed by the create/new project GUI component. For example, the customer name, contact, phone, and an indicator as to whether the customer is a party to a final contract can be displayed. The remove customer button link can allow a user to deselect a customer data record as being associated with a project data record such that the customer data record is no longer associated with the project data record or displayed by the create/new project GUI component. The create/new GUI project can also include an add partner button link and a remove partner button link to allow a user to add and/or remove a partner data record as associated with the project data record. For example, a partner data record can correspond to an entity that may be a marketing partner with respect to the marketing of an intellectual property unit. When the user has selected a partner data record as associated with the project data record, the create/new project GUI component can display information corresponding to the partner data record such as the company name, the contact, the phone and an indicator whether the partner corresponding to the partner data record is a party to a final contract.

IP personnel data records can also be associated with a project data record. Accordingly, a create/new project GUI component can include an add IP personnel button link and/or a remove IP personnel button link to specify that an IP personnel member is associated with a project. For example, a user can select and activate the add IP personnel button link and select from a listing of IP personnel data records one or more IP personnel data records to be associated with the project data record. When one or more IP personnel are associated with a project, the create/new project GUI component can display information about the associated IP personnel such as the name and a specified role of the respective IP personnel. In an embodiment, when a user selects one or more IP personnel as associated with the project, the user can specify a particular role for each particular IP member. A user can also remove one or more IP personnel from being associated with a project by selecting and activating the remove IP personnel button link.

The create/new project GUI component illustrated in FIGS. 85 through 87 can also include a data entry field to specify a particular computer data file as being associated with the project data record. Alternatively, a user can select and activate a button link to browse a listing of computer files stored locally or on a network that can be selected and associated with the project data record. The create/new project GUI component can display information regarding the associated files such as the file name and any comments about the file. The create/new project GUI component can also include a remove file button link to allow a user to indicate that a particular computer file is no longer associated with a project data record.

A project data record can also be associated with one or more contract data records. Examples of the contract data records that can be associated with a project data record include contract data records related to the licensing, sale, and marketing of intellectual property units. For example, the create/new project GUI component can include an add associated contract button link and a remove associated contract record button link to allow a user to add and/or remove contract records as being associated with a project data record. When a user selects and activates the add associated contract record button link, the user can select from a listing of contract records one or more contract data records to be associated with the project data record. When a contract data record is associated with a project data record, the create/new project GUI component can display information corresponding to that contract record such as the contract name and/or the agreement type. Additional and/or other information relating to the contract data record and other related data records can be displayed. A user can remove an associated contract data record from being associated with the project data record by selecting and activating the remove associated contract record button link. In an embodiment, the create/new project GUI component includes a create contract record button link. The create contract button link can cause the IP management system to access the add contract/agreement submodule of the contracts/agreements top-level module of the IP management system. The add contract/agreement submodule of the contracts/agreements top-level module is illustrated in FIGS. 112-120 (including 120A) and described hereinafter.

After a user has entered information relating to a project using the create/new project GUI component, the user can select and activate the submit button link to cause the information to be saved in a project data record. Alternatively, a user may cancel saving of the project data record information by selecting and activating the cancel button link. The cancel button link can cause the redisplay of the create/new project GUI component without any information entered in the data entry fields and/or cause the display of the previous screen.

Figure 88:
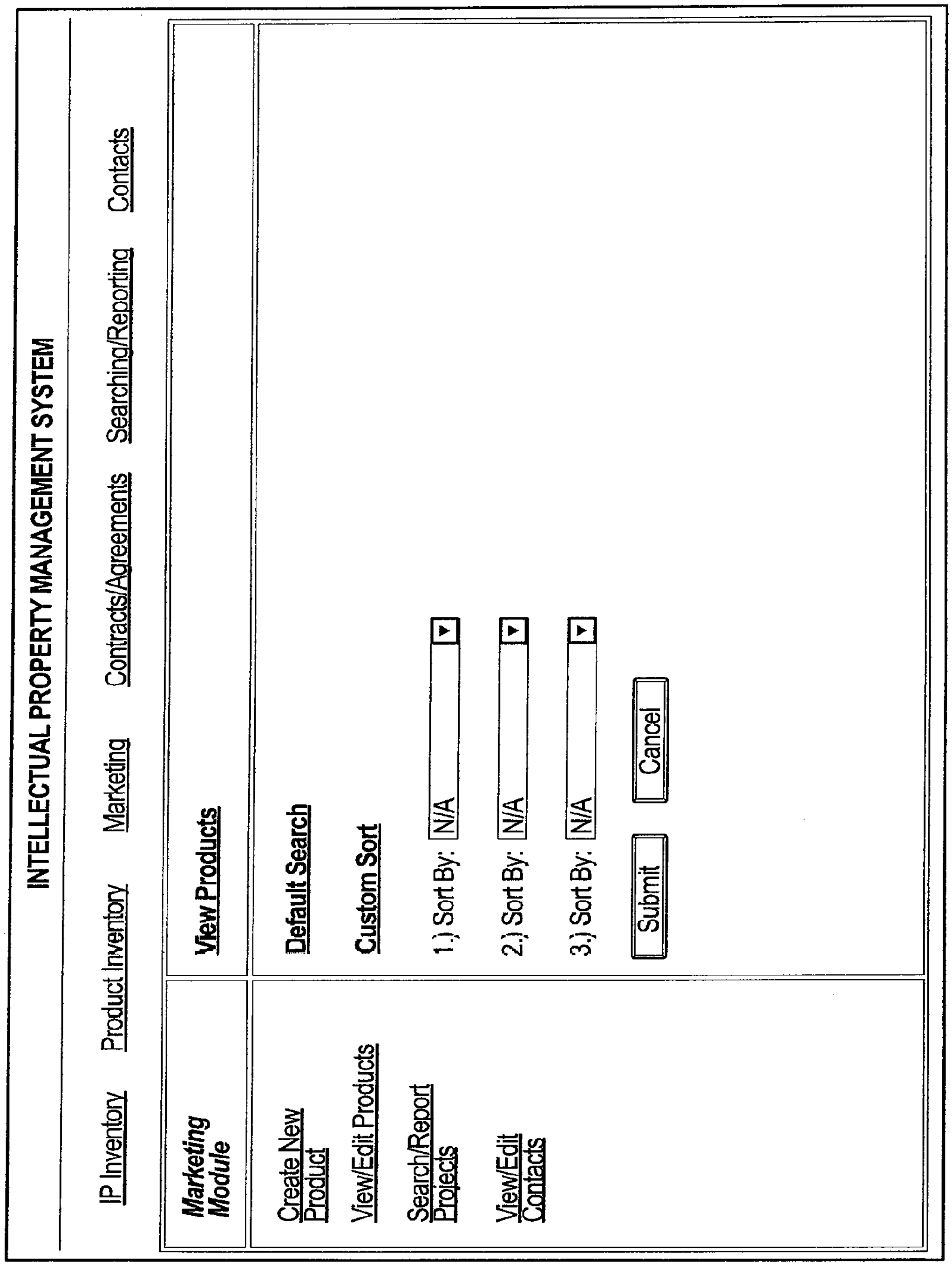

FIG. 88 is an illustration of the view projects GUI component. The view projects GUI component allows a user to view project data records via by a default search and/or a custom sort. In an embodiment, the view project GUI component illustrated in FIG. 88 includes a link to a default search module and a link to a custom sort module. When a user selects and activates the default search link, a search of the project data record is executed based on default search criteria.

Figure 89:
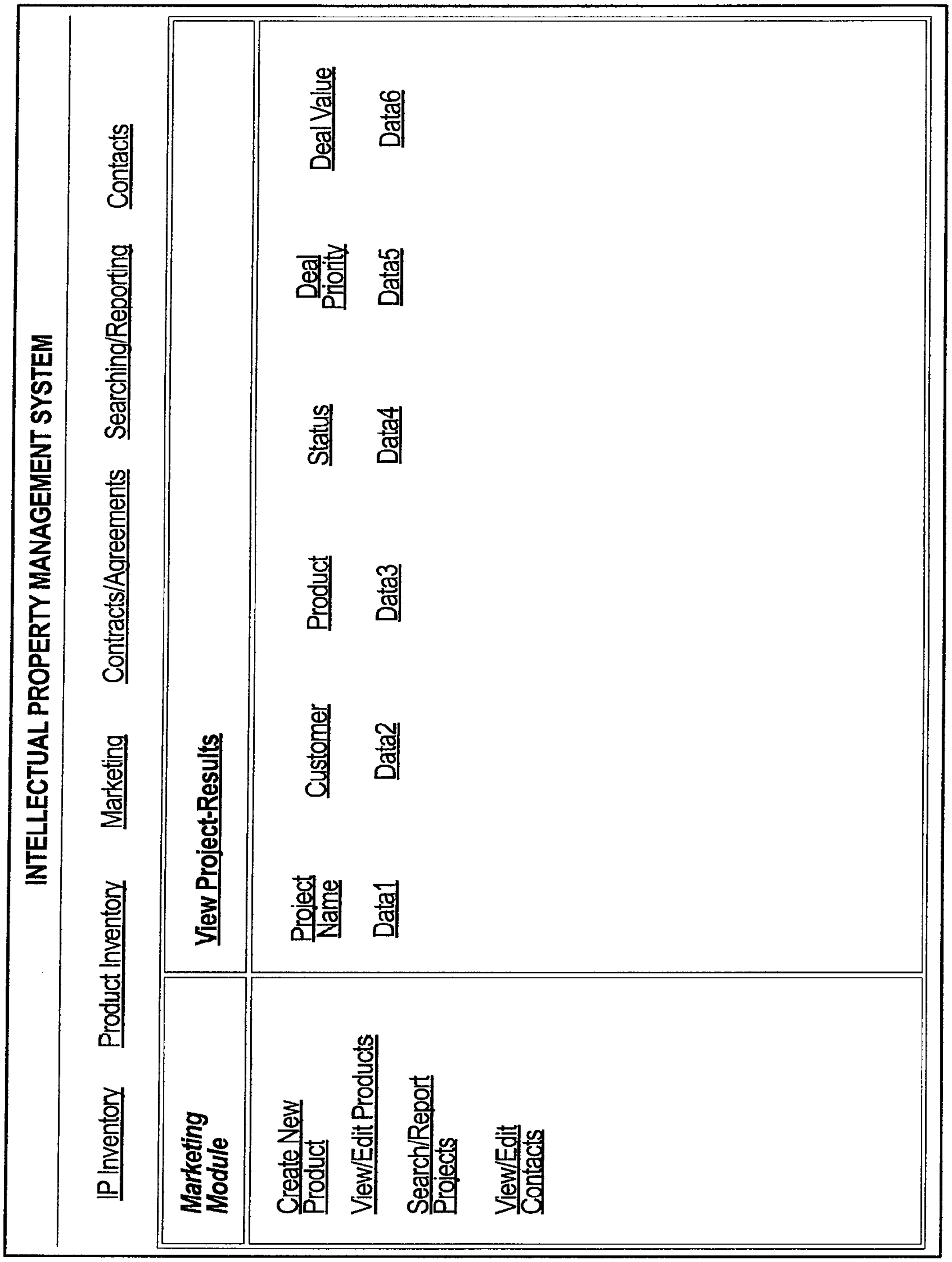

FIG. 89 shows an embodiment of a view project results GUI component. For example, after a user has selected and activated a link to the default search module, the IP management system can conduct a search of the project data records based on the default criteria and cause the display of information from project data records that meet the default search criteria. In an embodiment, a default search can be a search to display all project data records. In another embodiment, a default search can be a search of project data records to display all active or pending project data records. The view project results GUI component illustrated in FIG. 89 can display a listing of each project data record meeting the specified search criteria, where each project data record is displayed in a row of a listing. Each row in the listing can be display information corresponding to the project data record such as the project name, customer, product, status, deal priority, and deal value. In another embodiment, additional and/or other information from the project data record and/or related data records can be displayed. A user can cause the display of a more detailed view of the project data record and other related data by selecting and activating a row in the listing of the project data records.

Figure 90:
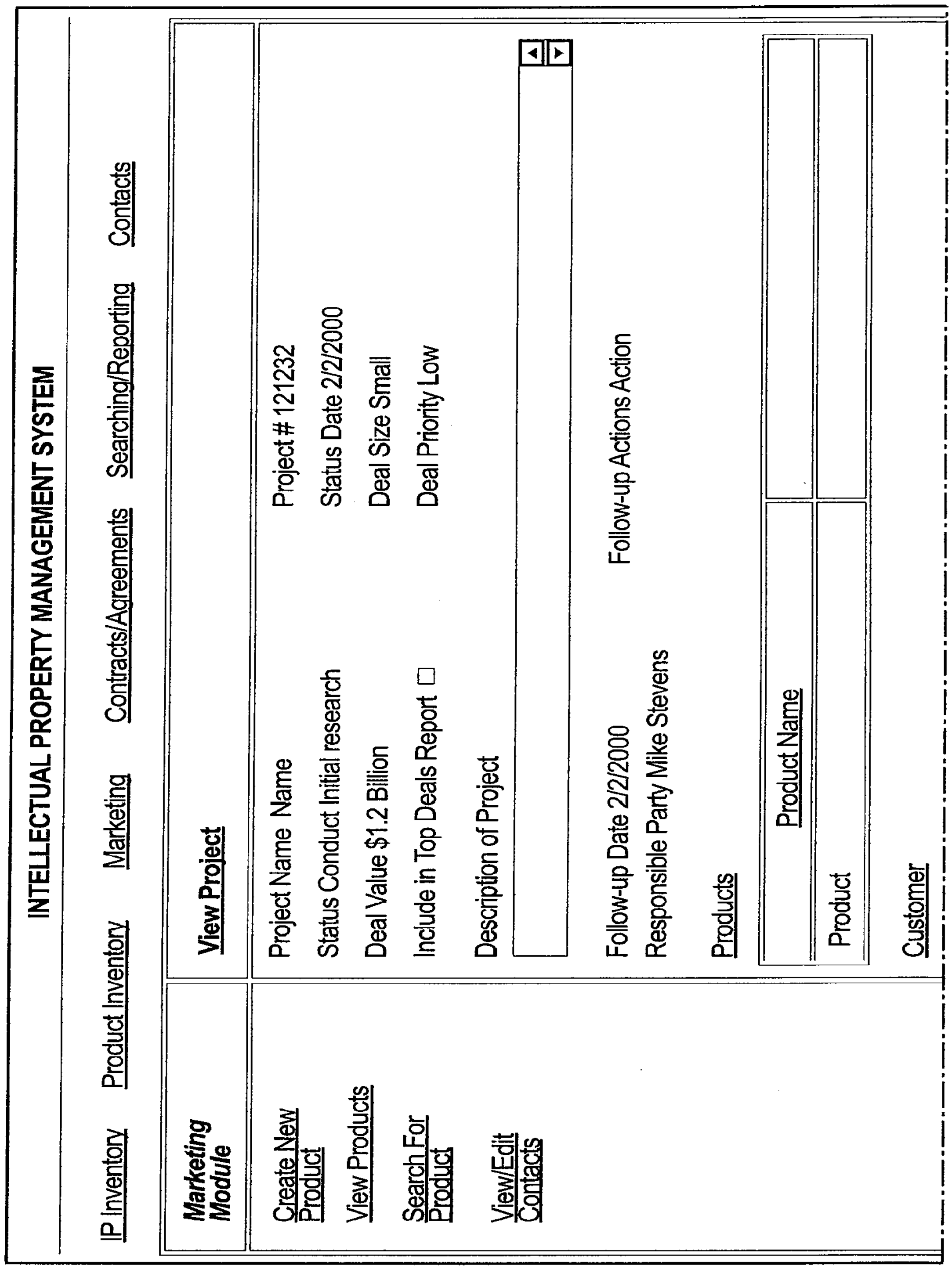
Figure 91:
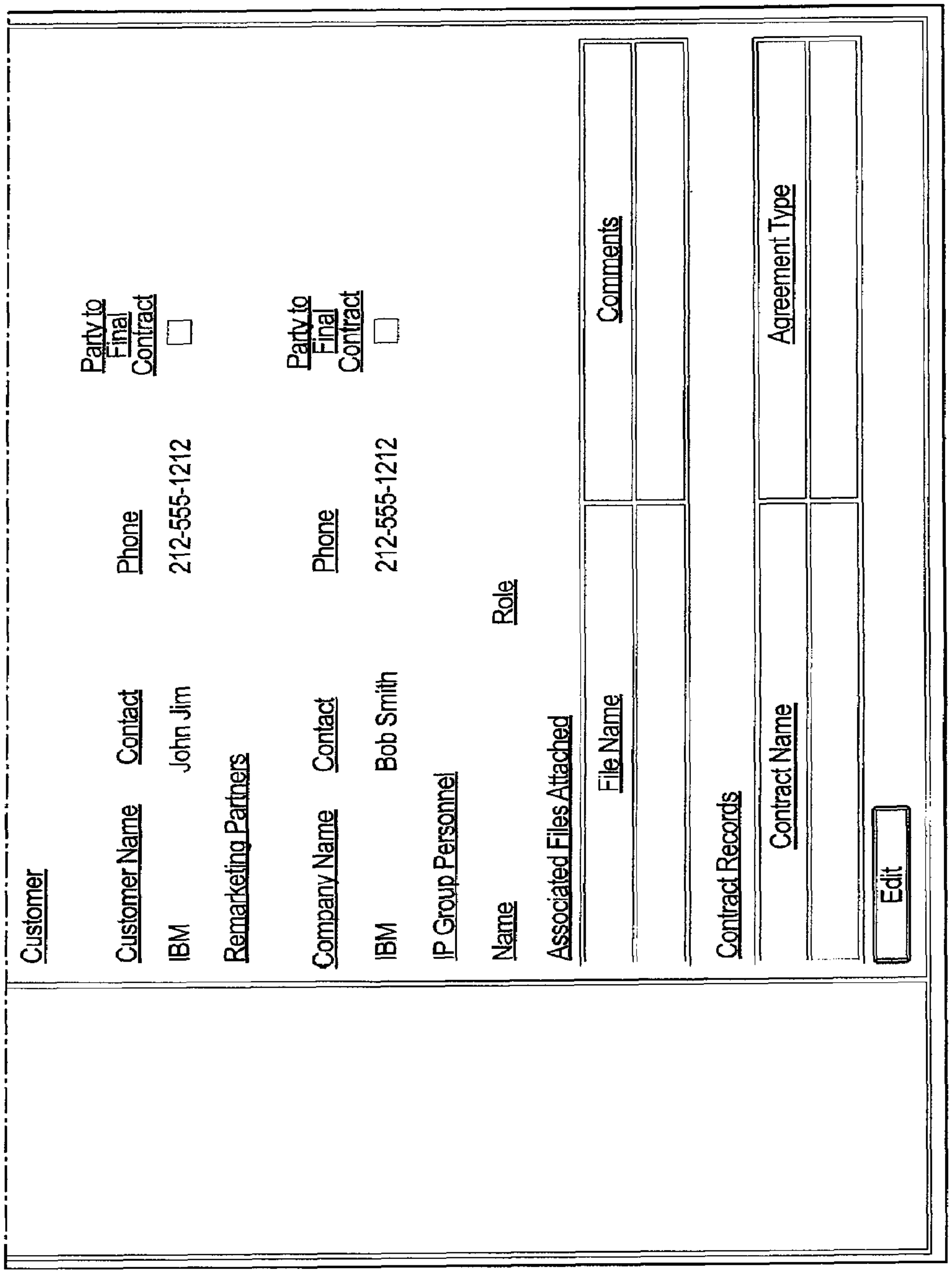

FIGS. 90-91 illustrate a view project GUI component that provides a more detailed viewing of information corresponding to a project data record. For example, the view project GUI component can display information corresponding to the project data record such as the project name; project number; status; status date; deal value; deal size; an indicator as to whether or not to include the project corresponding to the project data record in a top deals report; a deal priority; a description of the project; a follow-up date; a follow action; a responsible party; a listing of information corresponding to associated project data records; a listing of information corresponding to associated customer data records; a listing of information corresponding to associated remarketing partners data records; a listing of information corresponding to associated IP group personnel; a listing of information corresponding to associated files; and a listing of information corresponding to associated contract records. In an embodiment, the view project GUI component can include an edit button link that can be selected and activated by a user to cause access to an edit project GUI component. An example of an edit project GUI component is illustrated in FIGS. 94-96 and is described as set forth herein.

Figure 92:
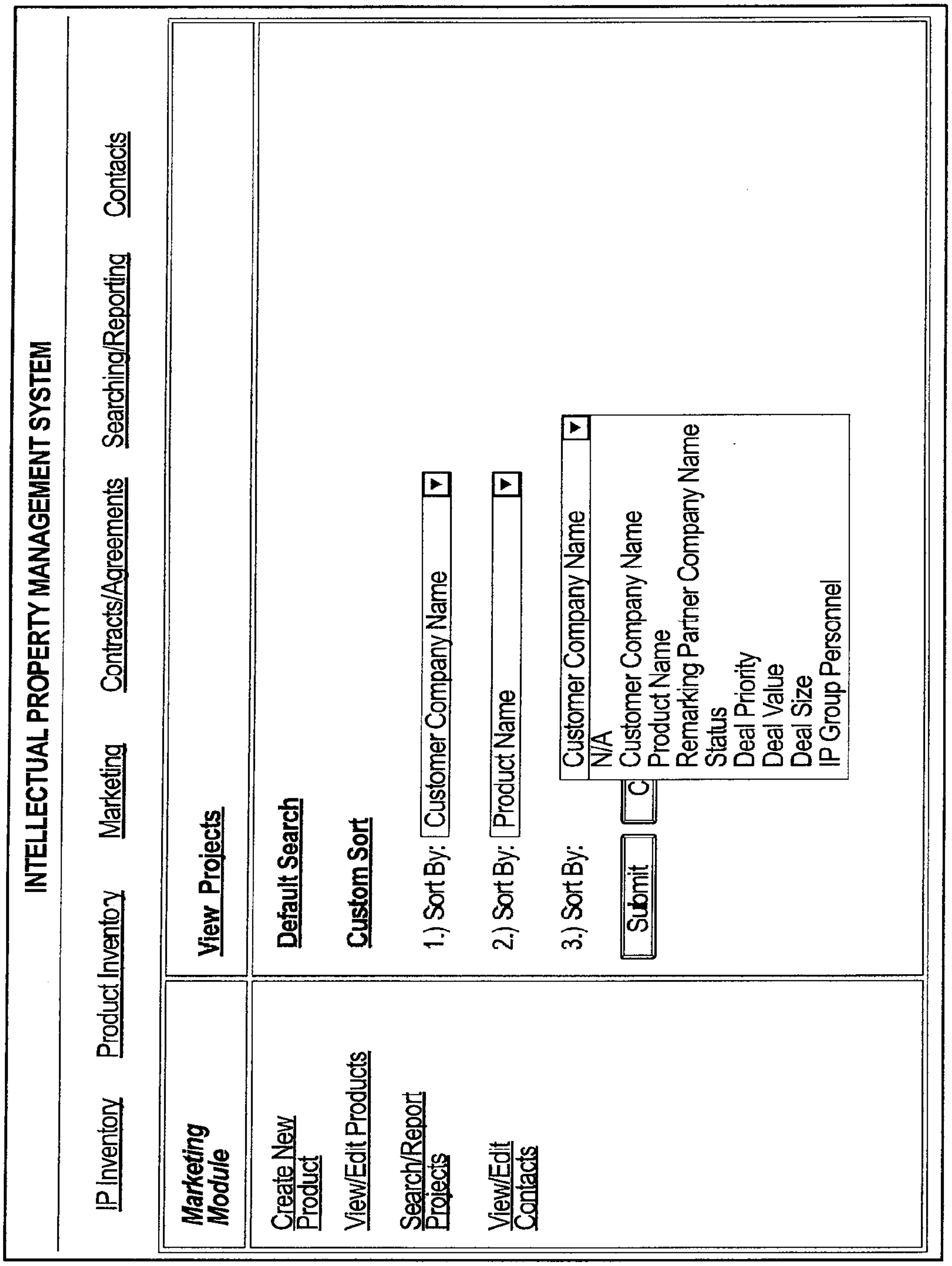

FIG. 92 shows an illustration of an embodiment of a view projects GUI component where a user can specify a custom sort of project data records. In an embodiment, a user can specify sort criteria by entering sort criteria into a data entry field. In another embodiment, a user can specify sort criteria in a data entry field having drop-down menus as illustrated in FIG. 92. For example, a user can specify one or more sort criteria where the sort criteria can be selected from a list of criteria including customer company name, project name, remarketing partner company name, status, deal priority, deal value, deal size, and IP group personnel. After a user has specified one more custom sort criteria, the user can select and activate a submit button link to cause the sorting and displaying of the project data records based on these specified custom sort criteria. Alternatively, a user can select and activate a cancel button link to clear the data fields of the view project GUI component and/or cause the IP management system to display the prior screen.

Figure 93:
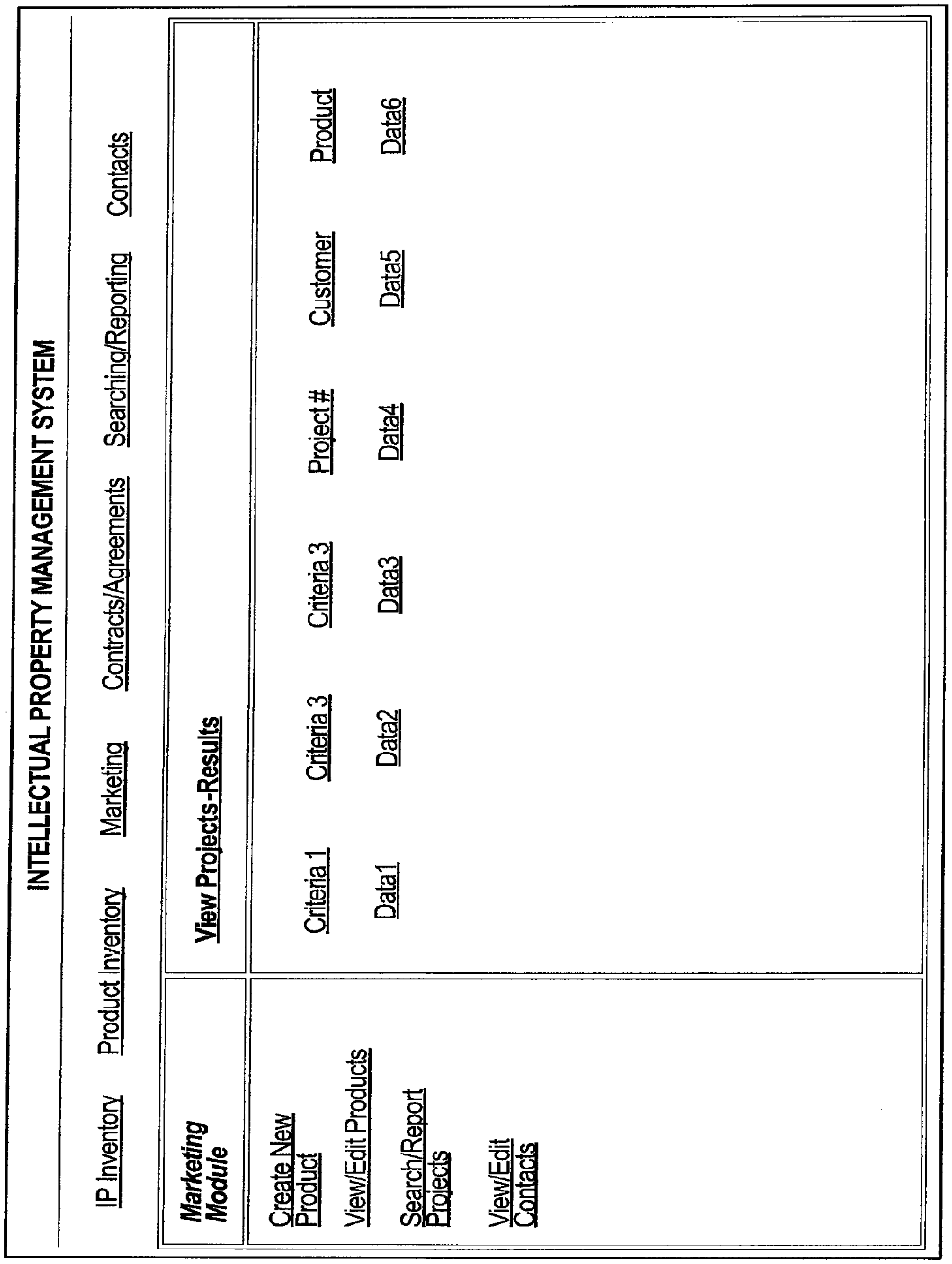

FIG. 93 shows a view project result GUI component that shows the display of project data records in accordance with a custom sort of the project data records. The view project results GUI component can show information corresponding to each project data record corresponding to the user-specified search criteria. For example, in the embodiment illustrated in FIG. 93, the project data records can be sorted and displayed according to a first custom sort criterion, a second custom sort criterion, a third custom sort criterion, a project number, a customer number, a customer, and a product. Information from each data record corresponding to those criteria can be displayed. In an embodiment, each project data record is displayed in a row of a plurality of rows, where each project data record corresponds to a row of the plurality of rows. A user may cause a more detailed display of a project data record and/or associated data records by selecting and activating a project data record displayed by the view project results GUI component illustrated in FIG. 93.

Figure 94:
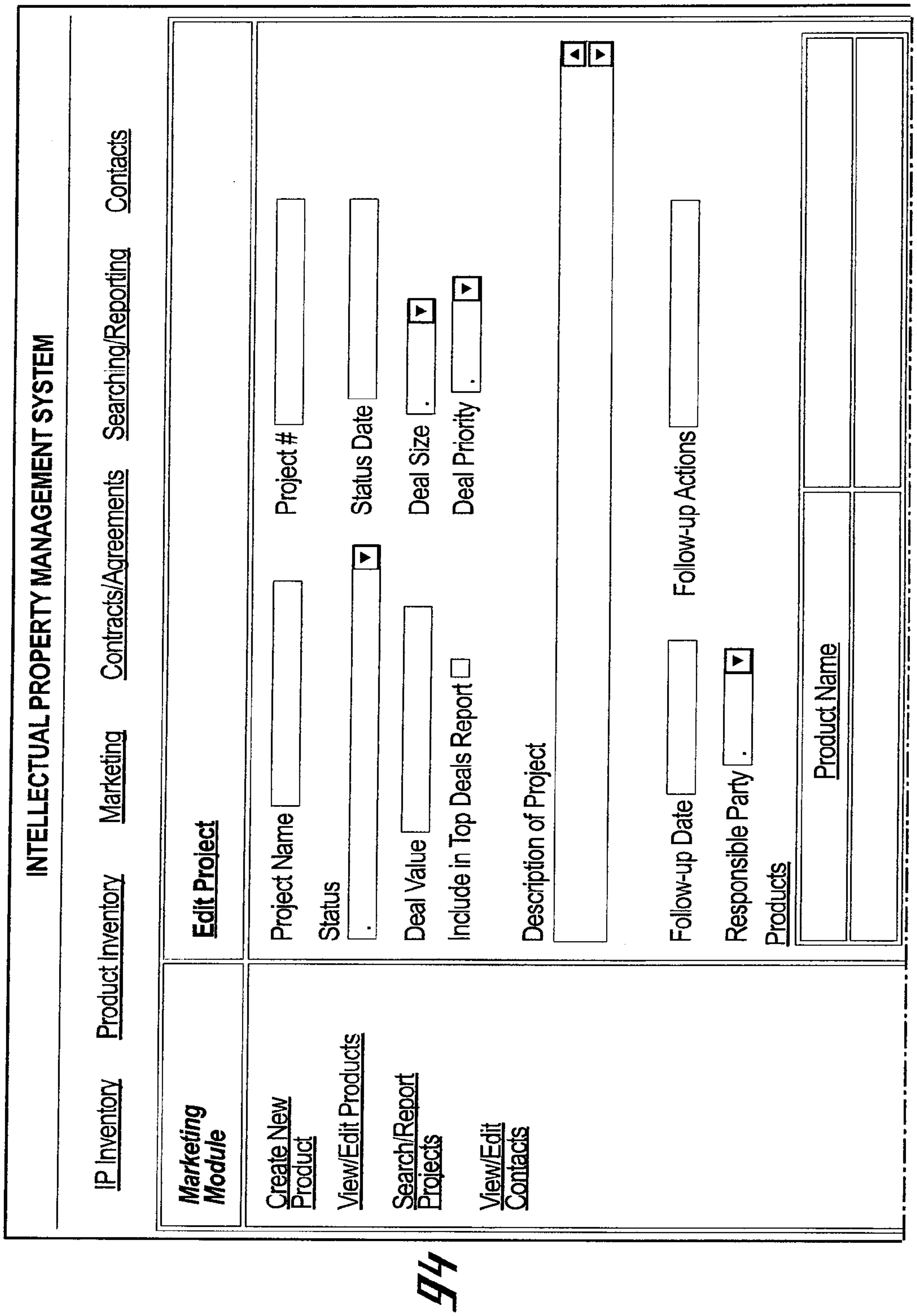
Figure 95:
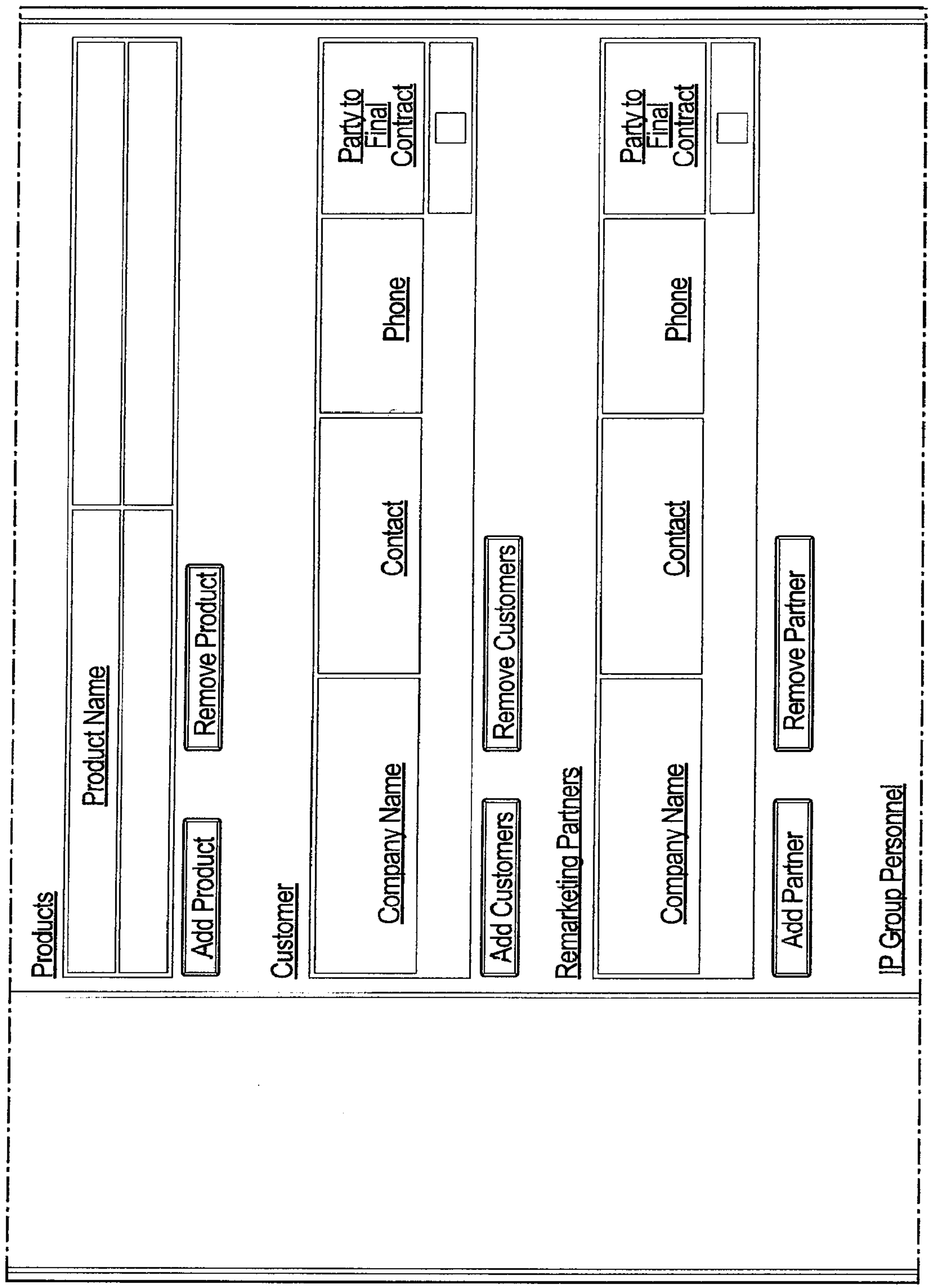
Figure 96:
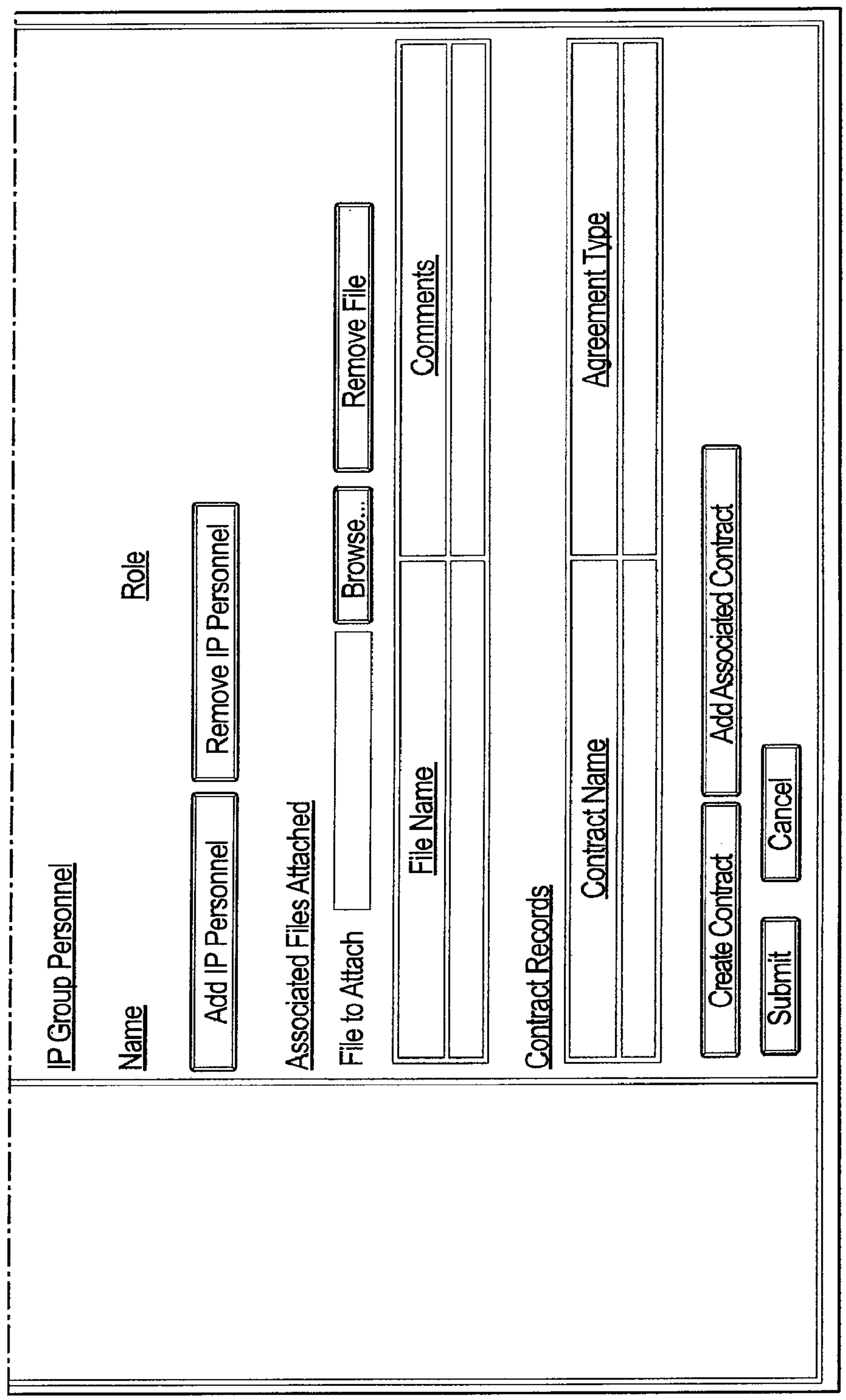

FIGS. 94-96 is an illustration of an embodiment of an edit project GUI component. In this embodiment, the edit project GUI component closely corresponds to the create/new project GUI component illustrated in FIGS. 85-87. The edit project GUI component can display a project data record and allow a user to edit the various data fields of the project data record and/or the identification of associated data records. In an embodiment, one difference between the create/new project GUI component illustrated in FIGS. 85-87 and the edit project GUI component illustrated in FIGS. 94-96 is that the create/new project GUI component assigns a project number that can uniquely identify the new project data record. In an embodiment, the create/new project GUI components selects the next available project number so that each project data record has a unique project number. In an embodiment, the edit project GUI component allows a user to edit a project number. For example, a user may wish to modify project numbers so that associated projects are sequentially numbered. When a user attempts to modify a project number via the edit project GUI component illustrated in FIGS. 94-96, the IP management system can verify that the new project number specified by the user is available such that no two project data records will have the same project number. In another embodiment of the present invention, the edit project GUI component will not allow a user to edit a project number. In an embodiment of the present invention, the edit project GUI component illustrated in FIGS. 94-96 allows a user to modify the data fields of the project data record in much the same manner as information can be originally specified for the project data record via the create/new project GUI component illustrated in FIGS. 85-87. In accordance with an embodiment, after a user has modified data fields of the project data record, if any, the user can select and activate the submit button link to cause a save of the updated, if any, information. Alternatively, the user may select and activate the cancel button link such that there is no change to the data fields of the project data record.

Figure 97:
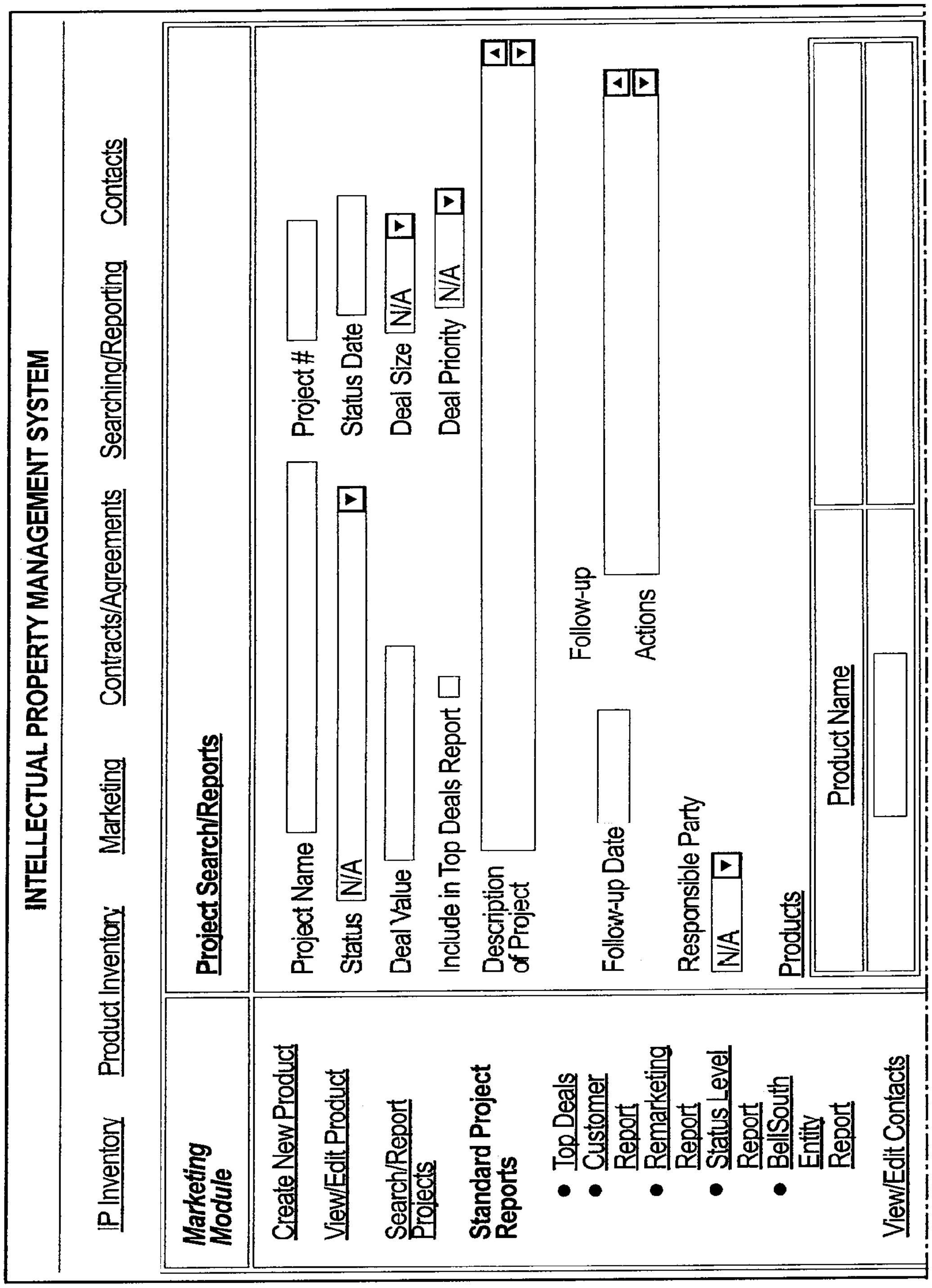
Figure 98:
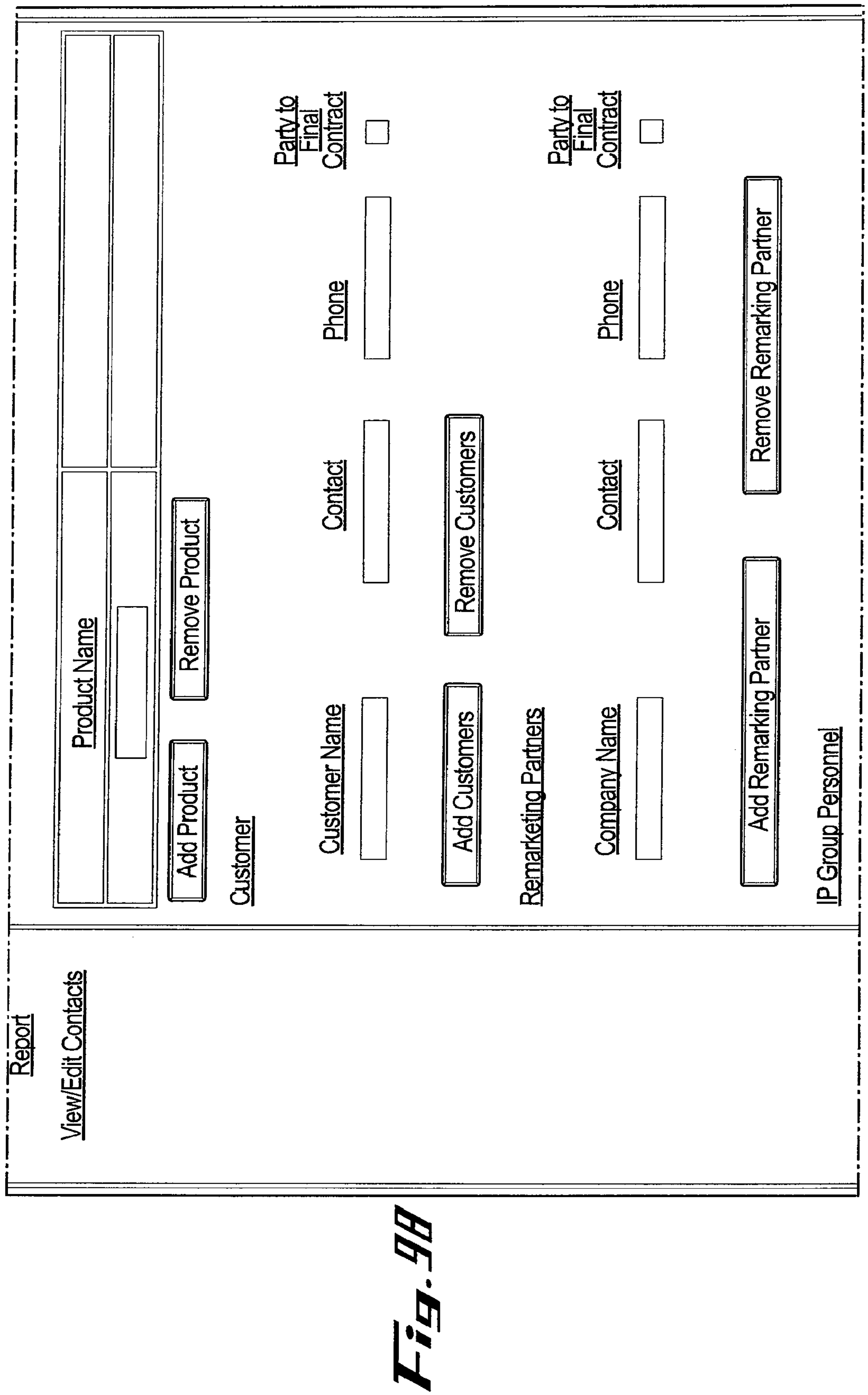
Figure 99:
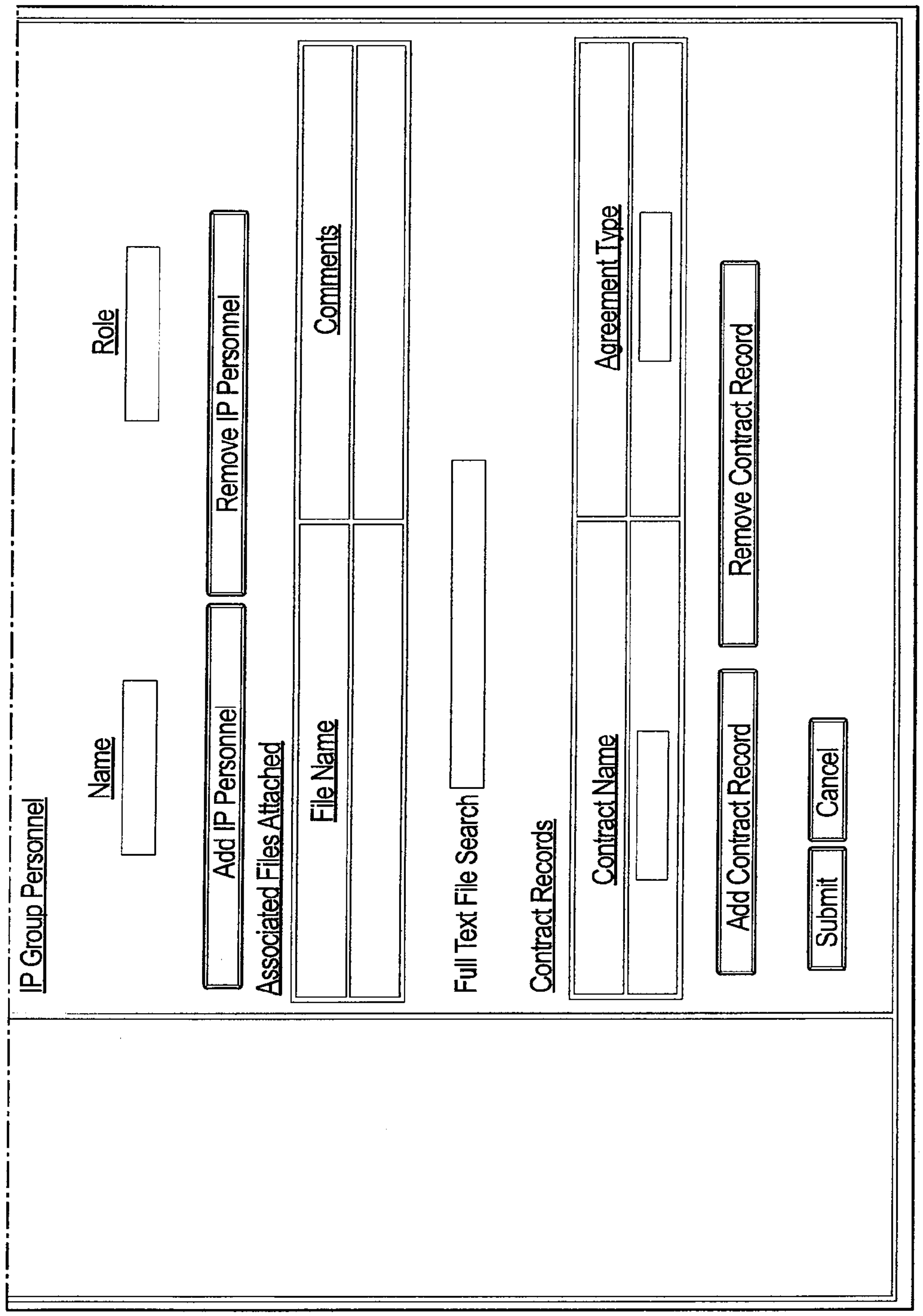

FIGS. 97 to 99 are illustrations of an embodiment of a project search/report GUI component. The project search/reports GUI component can correspond to a project search/reports submodule of the marketing module. The project search/results GUI component can allow a user to specify search criteria and generate a report of projects that meet the specified criteria. For example, the project search/reports GUI component can allow a user to specify a criterion, and a search of the project data record can be conducted based on that criterion. For example, criteria that can be entered via the project search/reports GUI module can include criteria relating to: project name; project number; status; status date; deal value; deal size; an indicator relating to whether a project is included in a top deals report; deal priority; description of project; follow-up date; follow-up actions; responsible party; project name; associated products; associated project data records; customer name; contact; phone; an indicator whether or not a customer is a party to a final contract; an associated customer data record; a remarketing partner company name; a remarketing partner contact; a remarketing partner phone; an indicator as to whether a remarketing partner is a party to a final contract, and associated remarketing partner data record; an IP group personnel name; an IP group personnel role; whether an IP group personnel data record is associated; an associated file; a contract name; an agreement type; and a contract record that can be associated with a project data record. In an embodiment, a user can enter one or more search terms that can be the basis of a full text file search. The search criteria can be entered via data entry fields which can include drop down menus. For example, a deal size criteria can be specified via a drop down menu, a deal priority can be specified by a drop down priority, and a responsible party can be specified by a drop down menu. Each drop down menu can include a listing of criteria such as deal size, deal priority, or responsible party.

Figure 100:
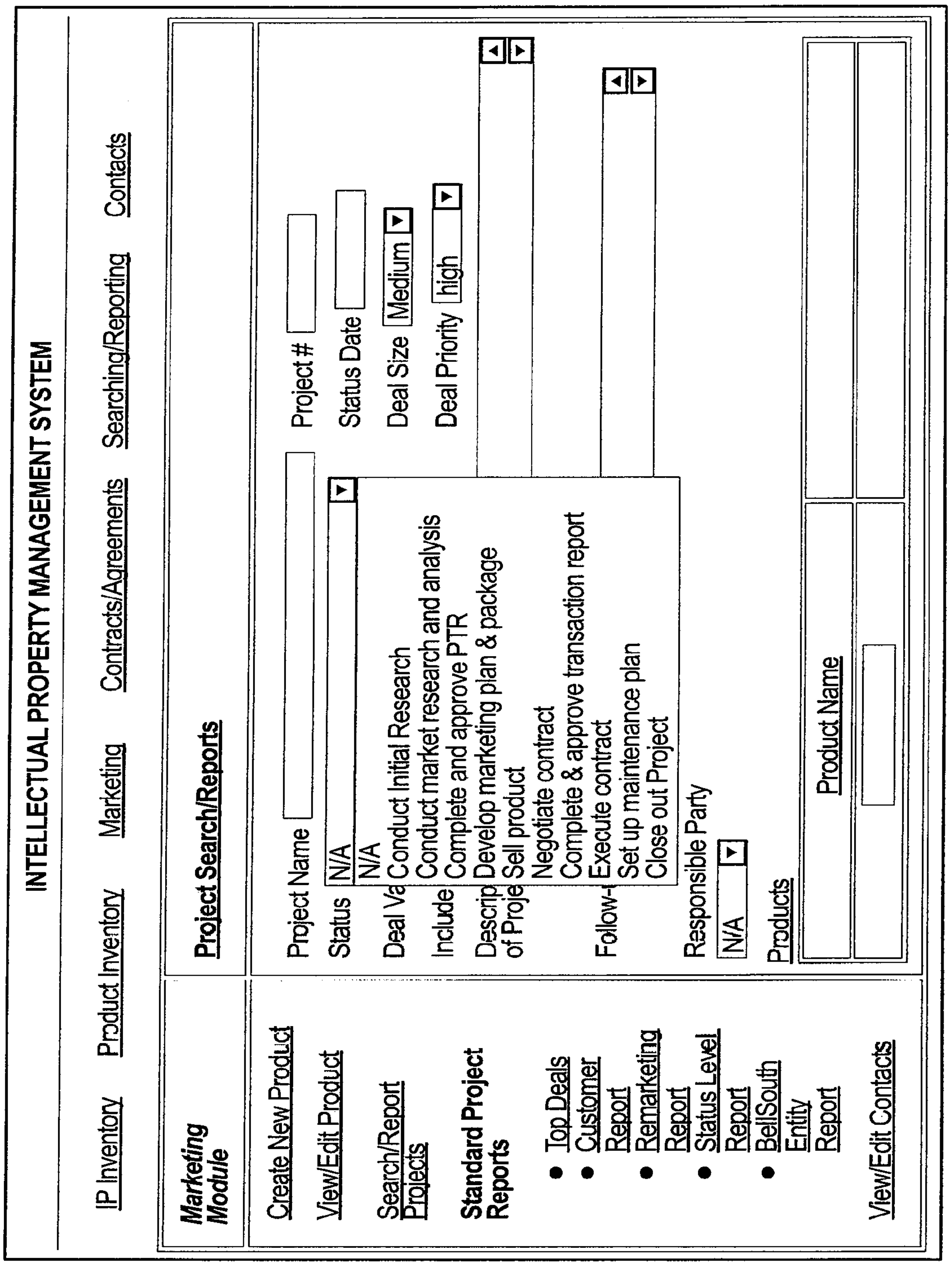

For example, FIG. 100 shows a portion of the project search/reports GUI component, showing the drop down menu that can specify potential status criteria. For example, a project data record can have one of a plurality of statuses including: a conduct initial research status; a conduct market research and analysis status; a complete and approved preliminary transaction report status; a developed marketing plan and package status; a sell project status; a negotiate contract status; a complete and approved transaction report status; an execute contract status; a set-up maintenance plan status; and a close out project status. For example, a user can specify that a search of the project data records be conducted via the project search/reports GUI component to identify and display each of the projects having a certain status (e.g., each of the projects having a status of conduct initial research, each project having a status of conduct market research and analysis, and so on). The project search/reports GUI component illustrated in FIG. 100 also shows drop down menu values that can be specified for deal size (e.g.: medium, and so on) and deal priority (e.g.: high, and so forth).

Figure 101:
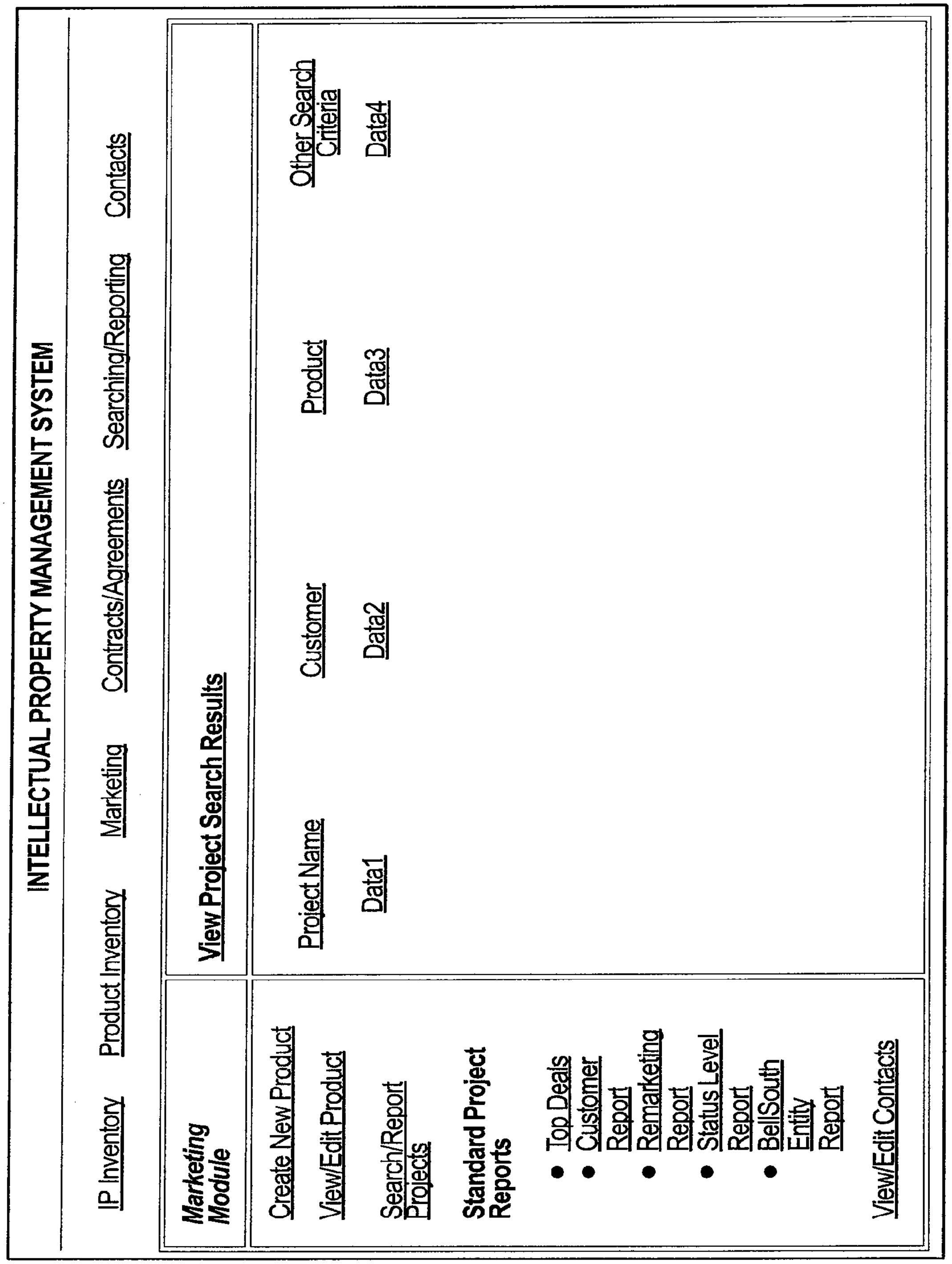

FIG. 101 is an illustration of a view project search results GUI component that lists the project data record that meet specified search criteria. For example, the view project search results GUI component can display a listing of information relating to each project data record such that the project name, customer, product, and/or other search criteria data fields of the project data record are listed. Each project data record can be displayed in a row of a plurality of rows. In another embodiment, other data fields of the project data records can be displayed. A user can cause a more detail view of a project data record to be displayed by selecting and activating a data record of the project data records displayed in the listing of project data records.

In an embodiment, the Project Search/Reports GUI Module can include links to a plurality of pre-defined standard project reports. For example, as illustrated in the project search/reports GUI component illustrated in FIGS. 97-99, the project search/reports GUI component can include links to a plurality of standard project reports module. The plurality of standard project report modules can include: a top deals report module; a customer report module; a remarketing report module; a status level report module; and a corporate entity report module. In an embodiment of the project search/reports GUI component illustrated in FIG. 97-99, a user can select and activate one or more of the links to the standard reports modules to cause the IP management system to generate a report based on the criteria of the selected standard project reports module.

Figure 102:
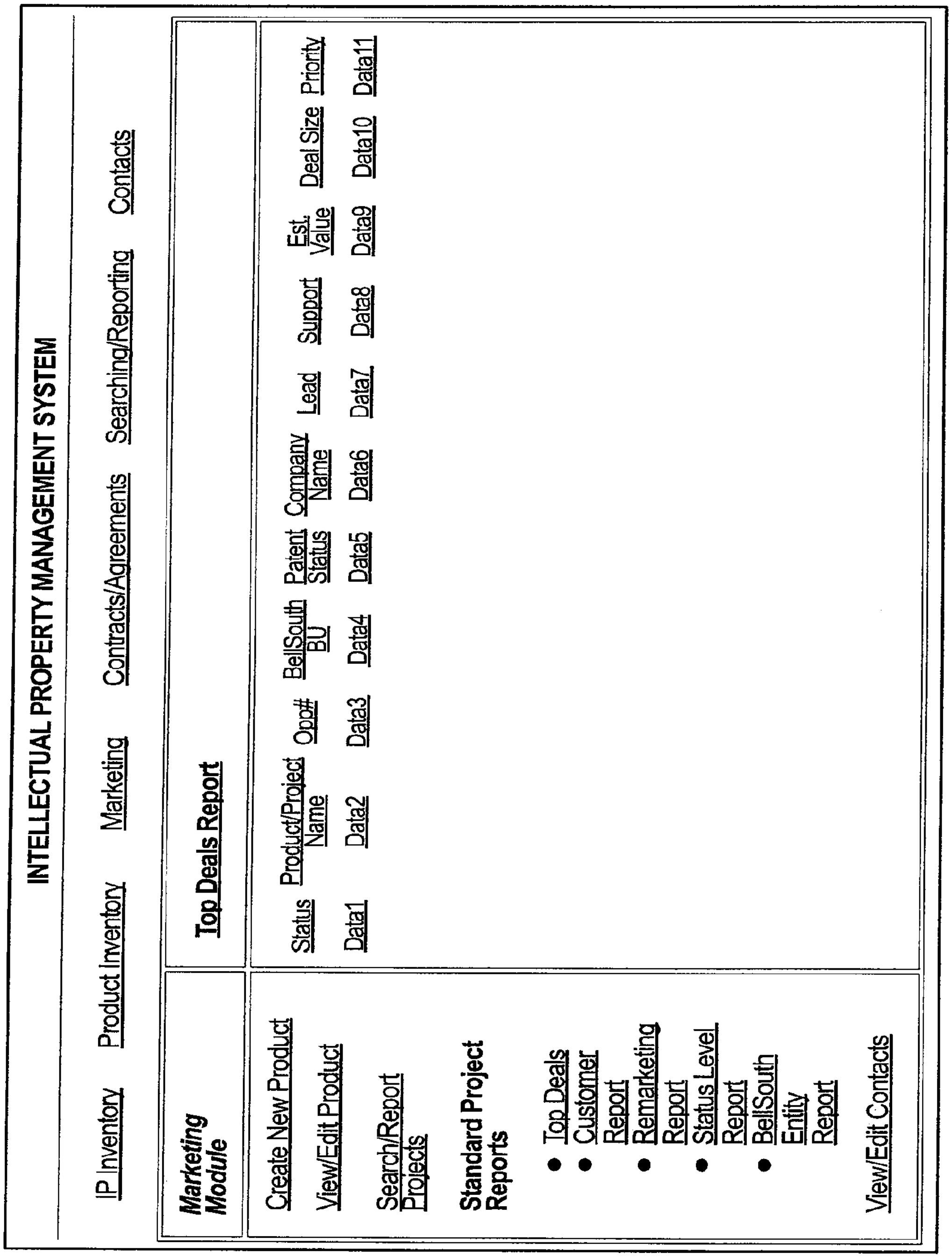

FIG. 102 shows an embodiment of a top deals report GUI module that can be displayed after a user selects and activates the link to the top deals report module of the standard project report modules. Each project data record can include an indication as to whether or not a project is to be considered a top deal. When a user selects the module to generate the top deals report, to the IP management system can display a listing of each project data record that includes an indication that the project data record corresponds to a project that is a top deal. The top deals report GUI module illustrated in FIG. 102 can list each of the project data records that include the top deals indicator, where each top deal project data record is listed in a row. The top deals report GUI module can display information corresponding to each one of the top deals project data records such as: the status; product/project name; opportunity number; company business unit; a patent status if any; a company name; a lead; a support; an estimated value; the deal size; and a priority. In another embodiment, other data fields of the project data records and/or associated data records can be displayed. For example, in an embodiment a top deal can be related to a product data record and/or a project data record. A patent-related IP data record can be associated with a product data record and/or a project data record that is designated as a top deal. Accordingly, in an embodiment, when a top deals report is generated, the top deals report GUI module can display information from the project data record and/or information from the associated patent-related IP data record such as patent status. In an embodiment of the present invention, a top deals report can include information related to a top deal such as: status; product; product/project name; opportunity number; corporate business unit; patent status; company name; lead; support; estimated value; deal size; and priority. In another embodiment, the top deals report can include other data fields from other data records of the IP management system. The top deals report GUI component illustrated in FIG. 102 can display the top deals in a listing where each top deals data record and/or data records are displayed in a row. A user can obtain additional details by selecting and activating the data field of an identified top deal data record. For example, when a user selects and activates an indicator regarding patent status, a patent-related IP data record can be viewed in more detail. Alternatively, in an embodiment when a user selects and activates a data field corresponding to the product/project name, a product data record and/or a project data record is displayed in more detail.

Figure 103:
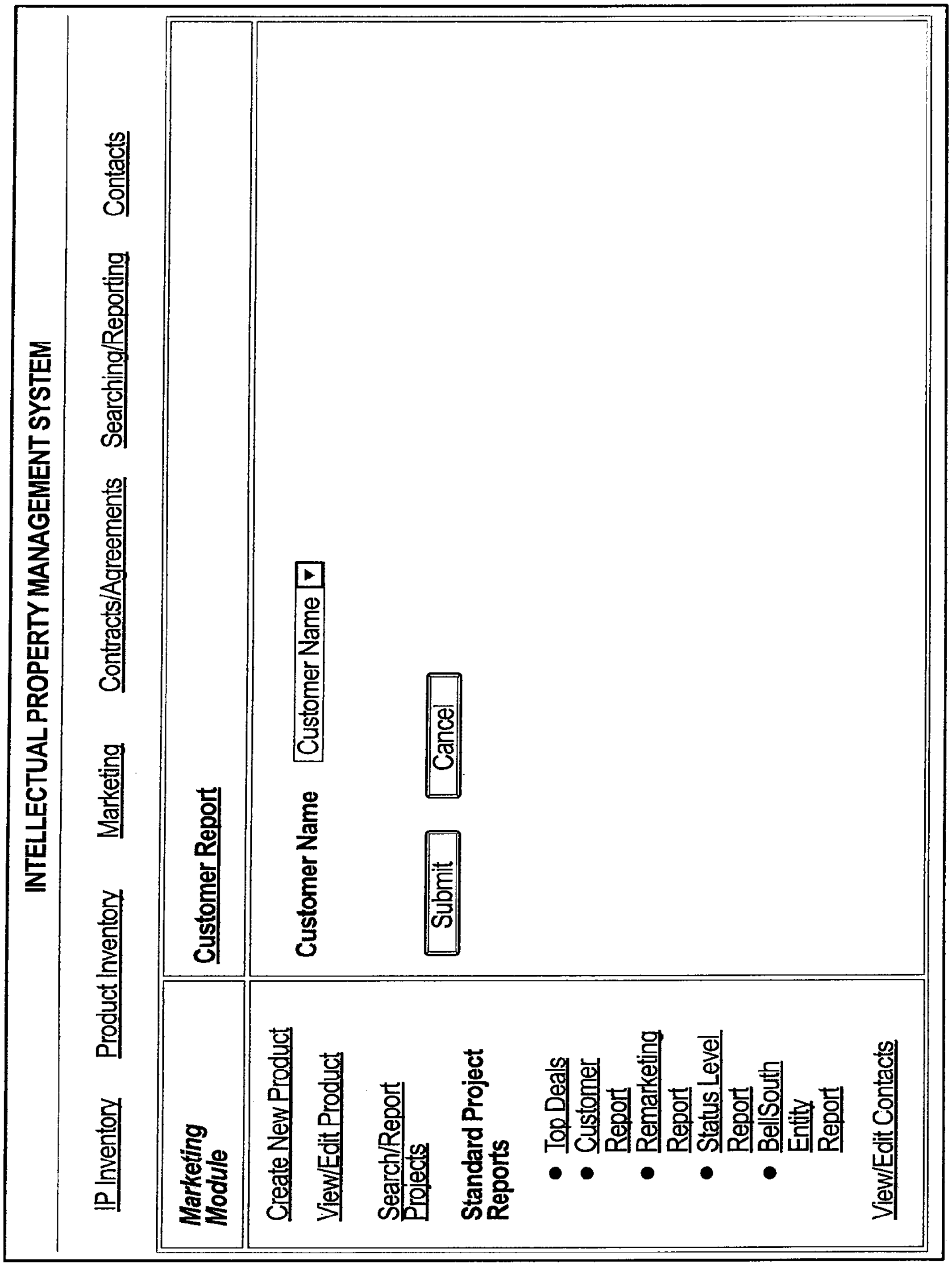
Figure 107A:
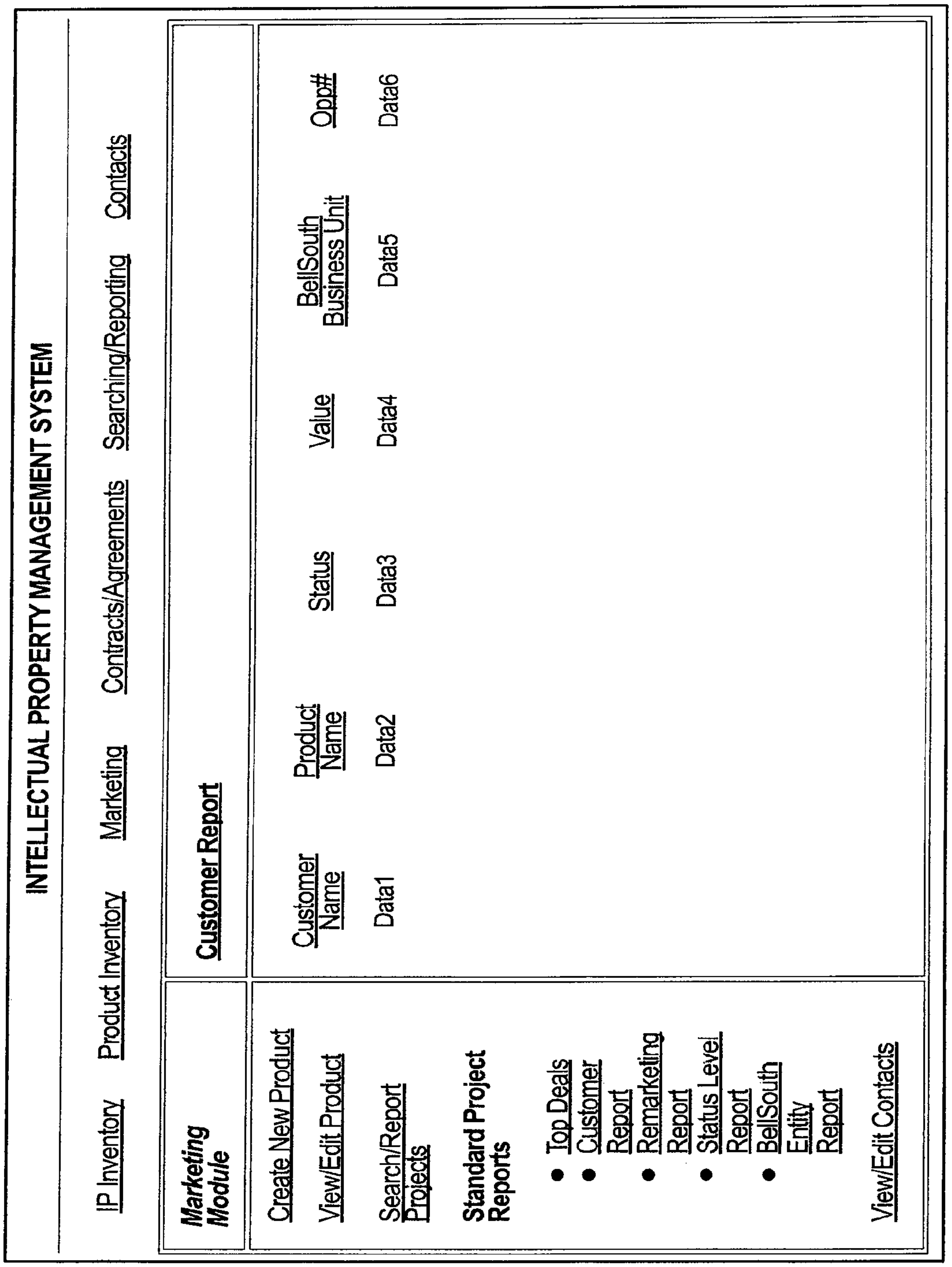

FIG. 103 is an illustration of an embodiment of a customer report generation GUI component. The customer report generation GUI component can allow a user to select a customer name and generate a report based on the selected customer name. In an embodiment, a user can select a customer name from a predefined list of customer names via a drop down menu as is illustrated in FIG. 103. In another embodiment a user can specify a customer name by entering text into a data entry field. After a user has specified a customer name for generation of a customer report, the user can select and activate the submit button link of the customer report generation GUI component illustrated in FIG. 103 to direct generation of the appropriate customer report.

FIG. 103A shows an embodiment of a customer report results GUI component. The customer report results GUI component can display project data records meeting the specified customer name. In an embodiment, information corresponding to each of the project data records having the specified customer name can be displayed in a list of project data records where each project data record corresponds to a row. Information corresponding to the project data record can be displayed by the customer report results GUI component including: the customer name, product name, status, value, company business unit, and opportunity number. In an embodiment, the data displayed for each project data record can include information from associated data records. The customer report results GUI component illustrated in FIG. 103A allows a user to generate a more detailed view of the information displayed by the customer report GUI component by selecting and activating the particular data record for which more information is sought. For example, a user can select and activate the data corresponding to the customer name to pull up additional information about the customer. Alternatively, the user can select and activate the data corresponding to the product name to display a more detailed view of data relating to the product. In an embodiment, after generating a more detailed review of the corresponding data record, the user may be able to edit and/or update the data record.

Figure 104:
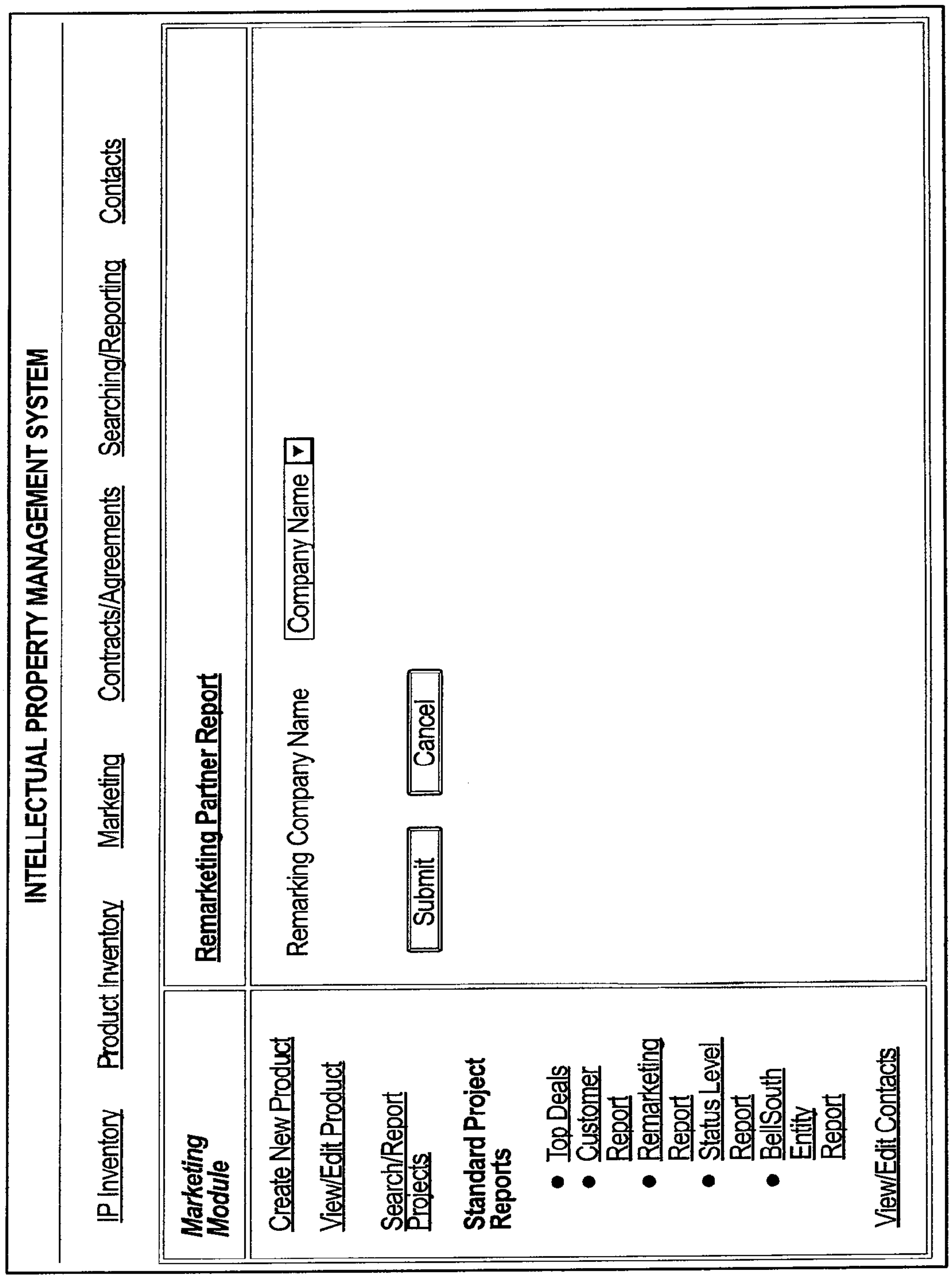

FIG. 104 shows an embodiment of a remarketing partner report generation GUI component. The remarketing partner report generation GUI component allows a project report to be generated based on a specified remarketing company name. The remarketing company name can be selected from a drop-down list, a drop-down menu, or entered by a user. After a particular remarketing company name is specified, a user can select and activate the submit button link to cause generation of the specified remarketing partner report.

Figure 105:
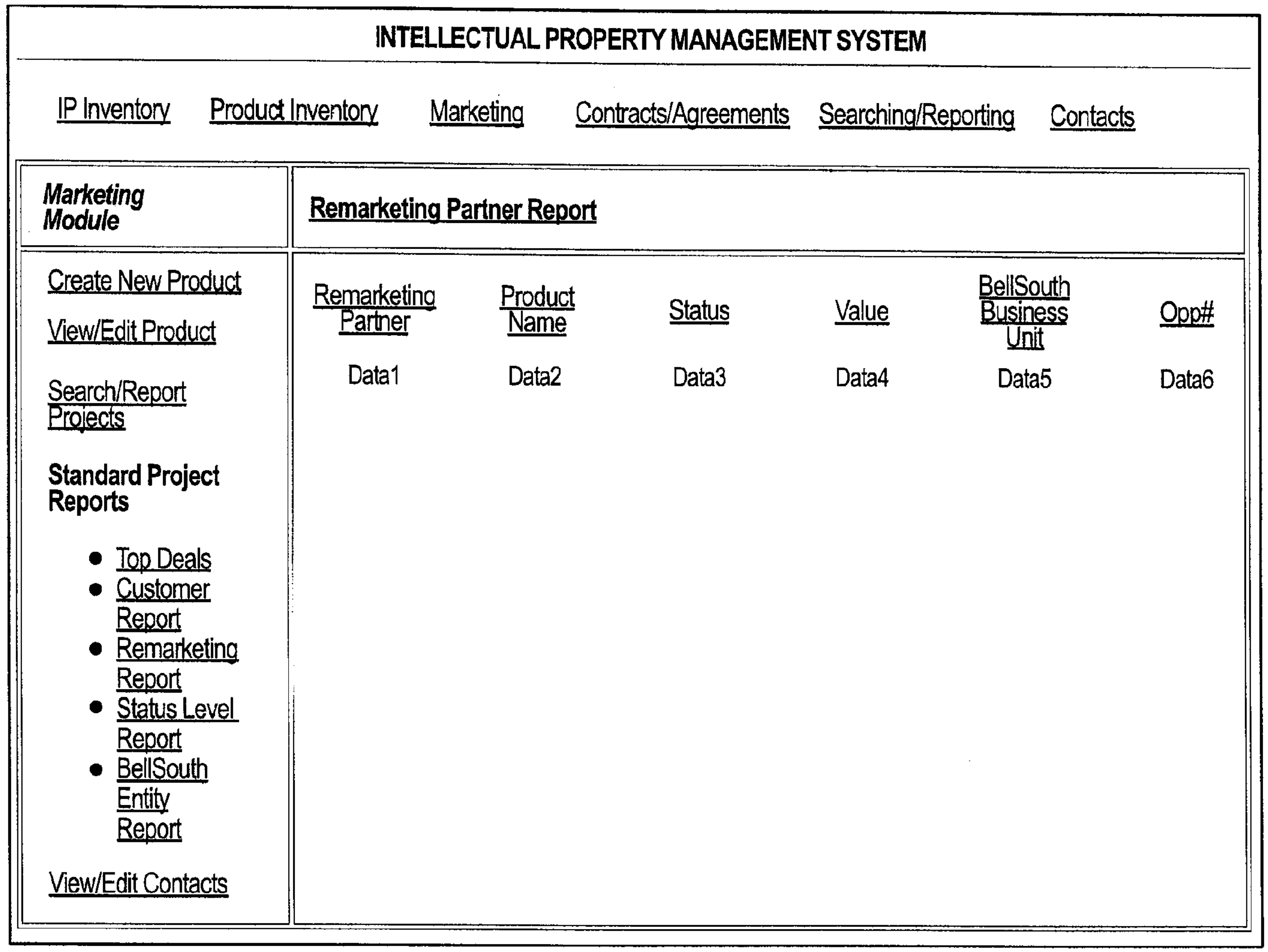

FIG. 105 shows an illustration of an embodiment of a remarketing partner report results GUI component. The remarketing partner report results GUI component can display information about the data records associated with a particular remarketing partner. In an embodiment, the data records associated with the remarketing partner are displayed in rows. The display of information corresponding to the data records can include data relating to the remarketing partner, the product name, status, value, company business unit, and opportunity number. A user can cause a more detailed view of the corresponding data record and/or associated data records to be displayed by selecting and activating data that is displayed by the remarketing partner report GUI report.

Figure 106:
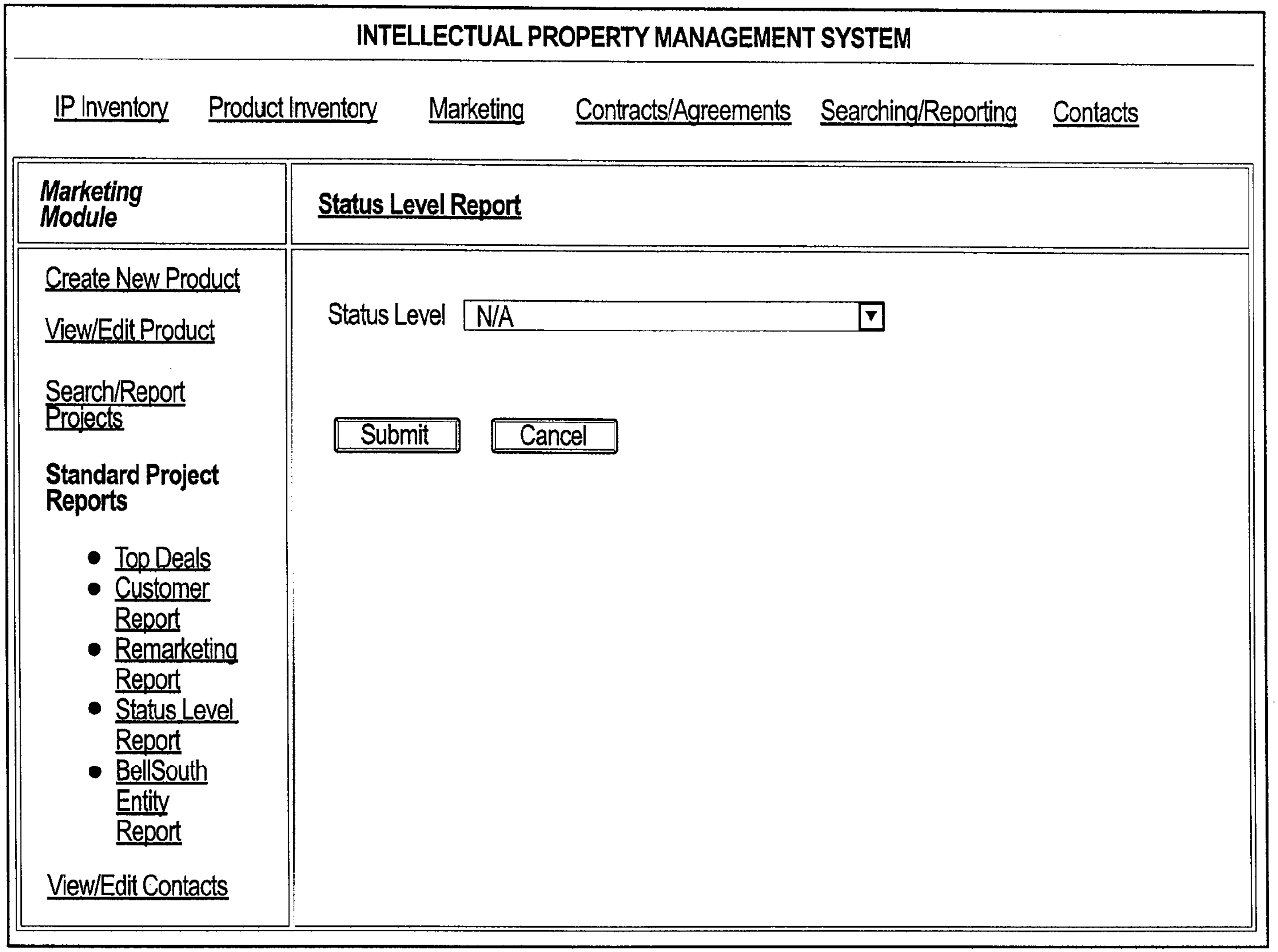
Figure 107:
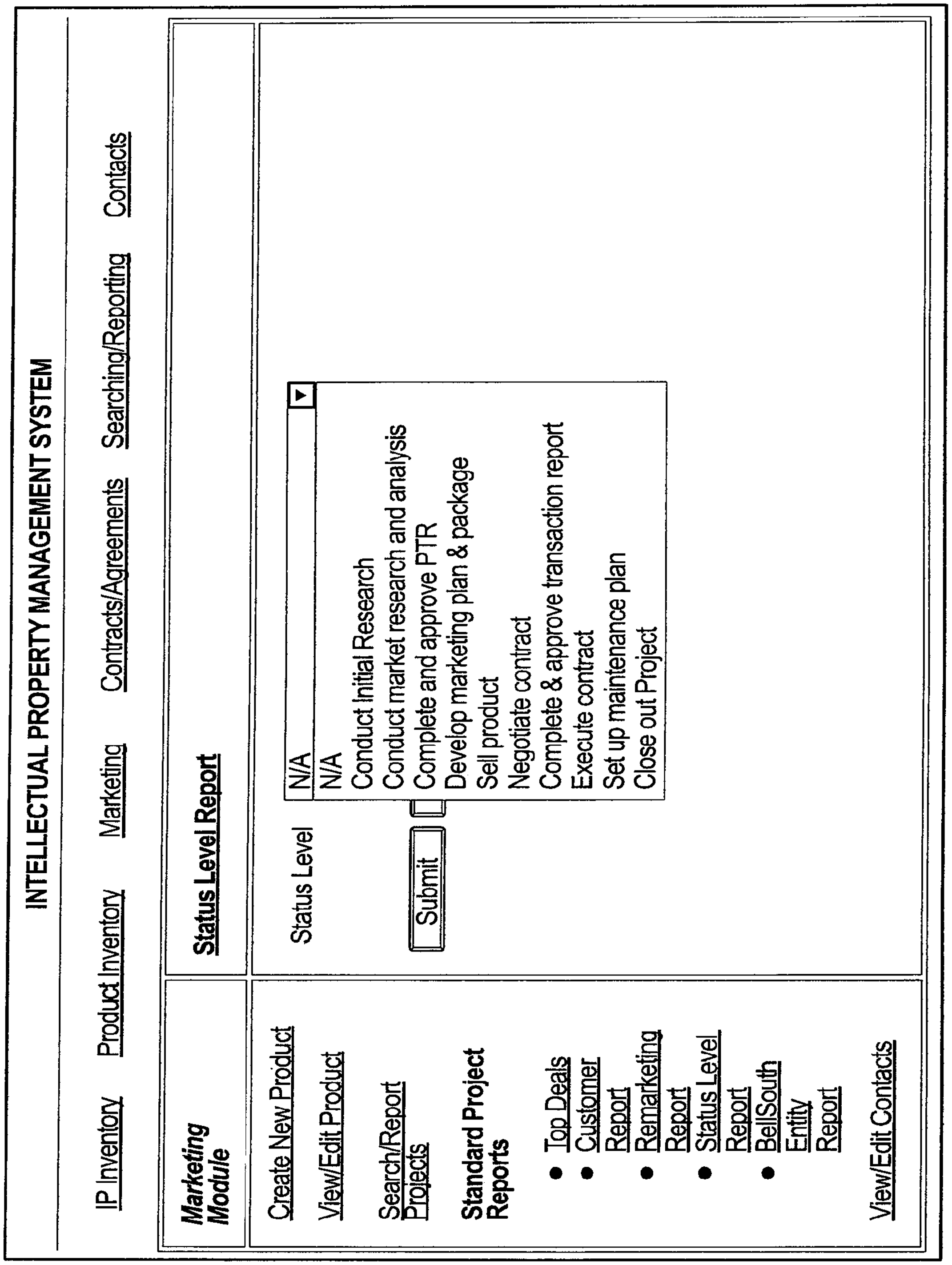

FIG. 106 is an illustration of an embodiment of a status level report GUI component. A user can select a status level upon which generation of a status level report can be based. For example, FIG. 107 shows that a user can select one of a plurality of status levels as the basis for the generation of a status level report. In an embodiment, the plurality of status levels include a conduct initial research status level, a conduct market research and analysis status level, a complete and approved preliminary transaction report status level, a developed marketing plan and package status level, a sell product status level, a negotiate contract status level, a complete and approved transaction report status level, an execute contract status level, a set-up maintenance plan status level, and a close-out project status level. After a user has selected a status level, either by selecting one of a list of status levels or entering text specifying a status level, the user can select and activate the submit button link to cause generation of the specified status level report.

Figure 108:
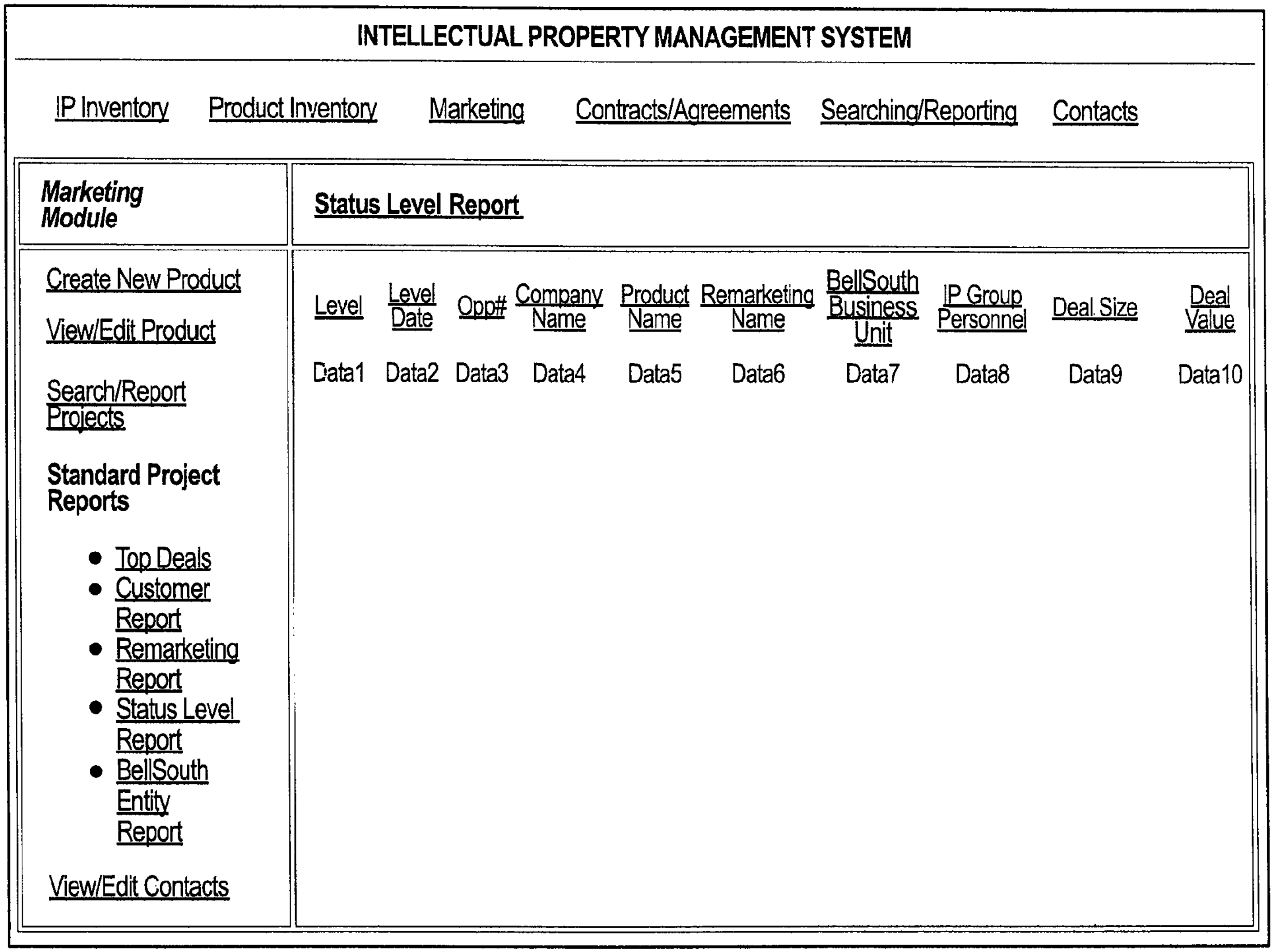

FIG. 108 shows an illustration of an embodiment of a status level report results GUI component. The status level report results GUI component can display information corresponding to project data records having the specified status level. The project data records can be displayed in rows, and each row can display information corresponding to the project data records having the specified status level such as the status level, level date, opportunity number, company name, product name, remarketing partner, company business unit, IP group personnel, deal size, deal value. In an embodiment, the status level report results GUI component can display information from the selected project data record and data records associated with the selected project data record. In an embodiment, a user can view additional details relating to information corresponding to a data record by selecting and activating that information.

FIG. 109 is an illustration of an embodiment of a company business unit report. The company business unit report generation GUI component allows a user to specify a particular business unit for which project data records are to be selected and displayed. In one embodiment, a user can enter text into a data entry field to specify a company business unit. In another embodiment, a user may select a business unit from a list of business units using a drop-down menu. After a user has specified a particular business unit, the user can select and activate the submit button link to cause generation and display of the company business unit report.

Figure 110:
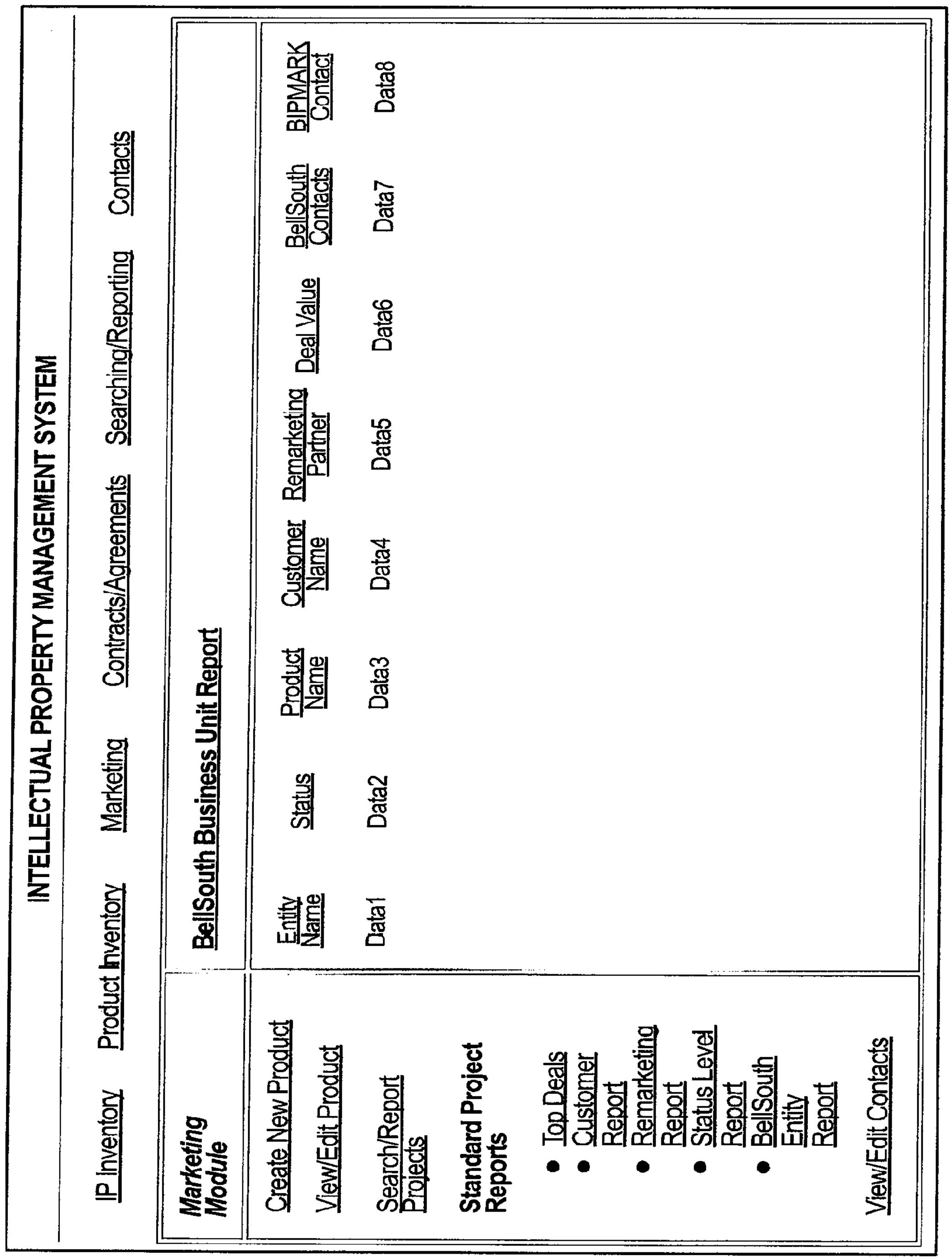

FIG. 110 is an illustration of an embodiment of a company business unit report display GUI component. The company business unit report display GUI component can display information corresponding to data records associated with the specified business unit. For example, the information from the data records associated with the business unit report can include information from project data records and associated data records such as entity name, status, product name, customer name, remarketing partner, deal value, company contacts, and entity contact.

Contracts/Agreements Module

FIGS. 111-150 are an illustration of a contracts/agreements top-level module of the IP management system and include illustrations of submodules of the contracts/agreements top-level module. In an embodiment of the present invention, a contracts/agreements top-level module and associated submodules can provide a method and systems for creating contract data record related to the marketing of intellectual property.

Figure 111:
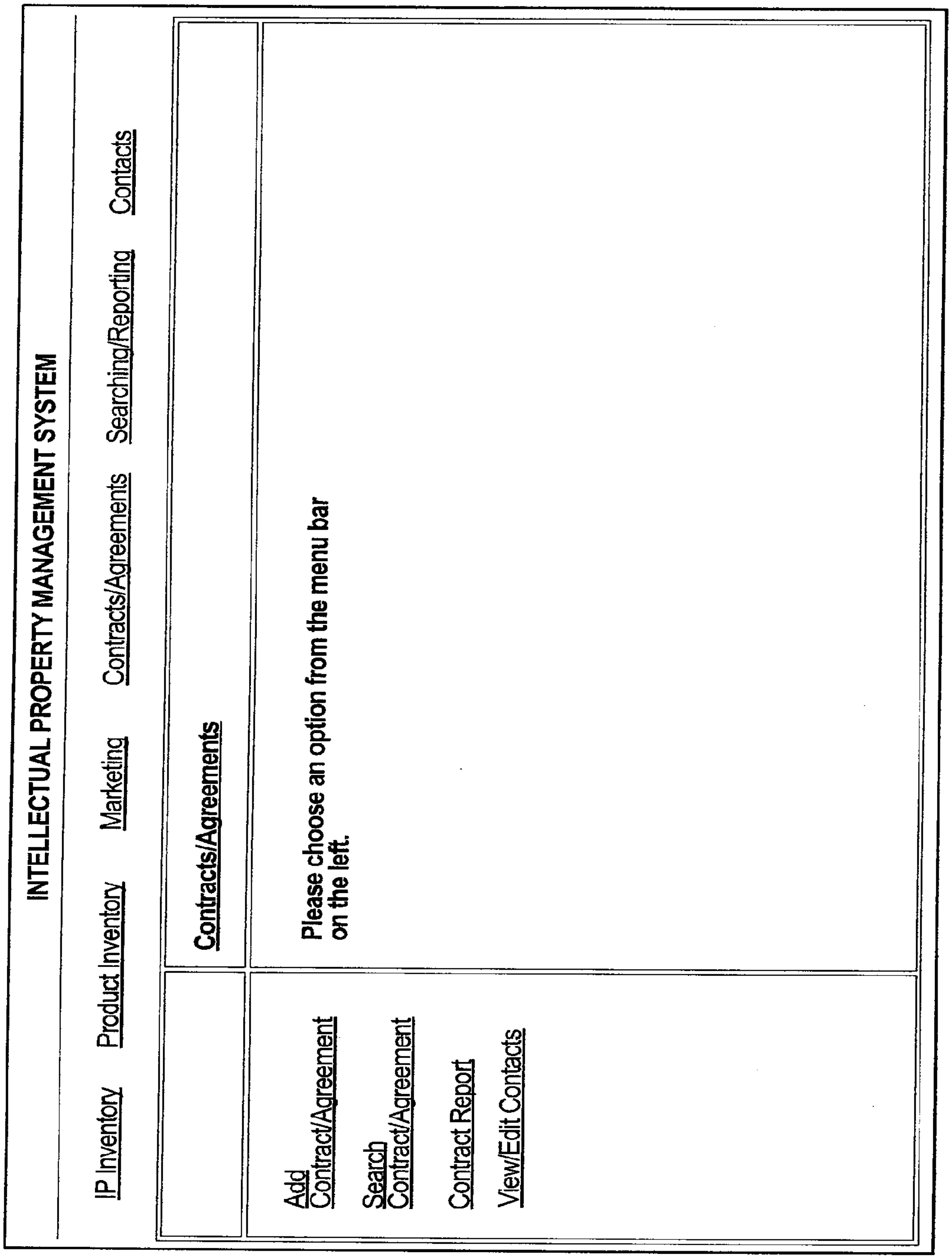
Figure 112:
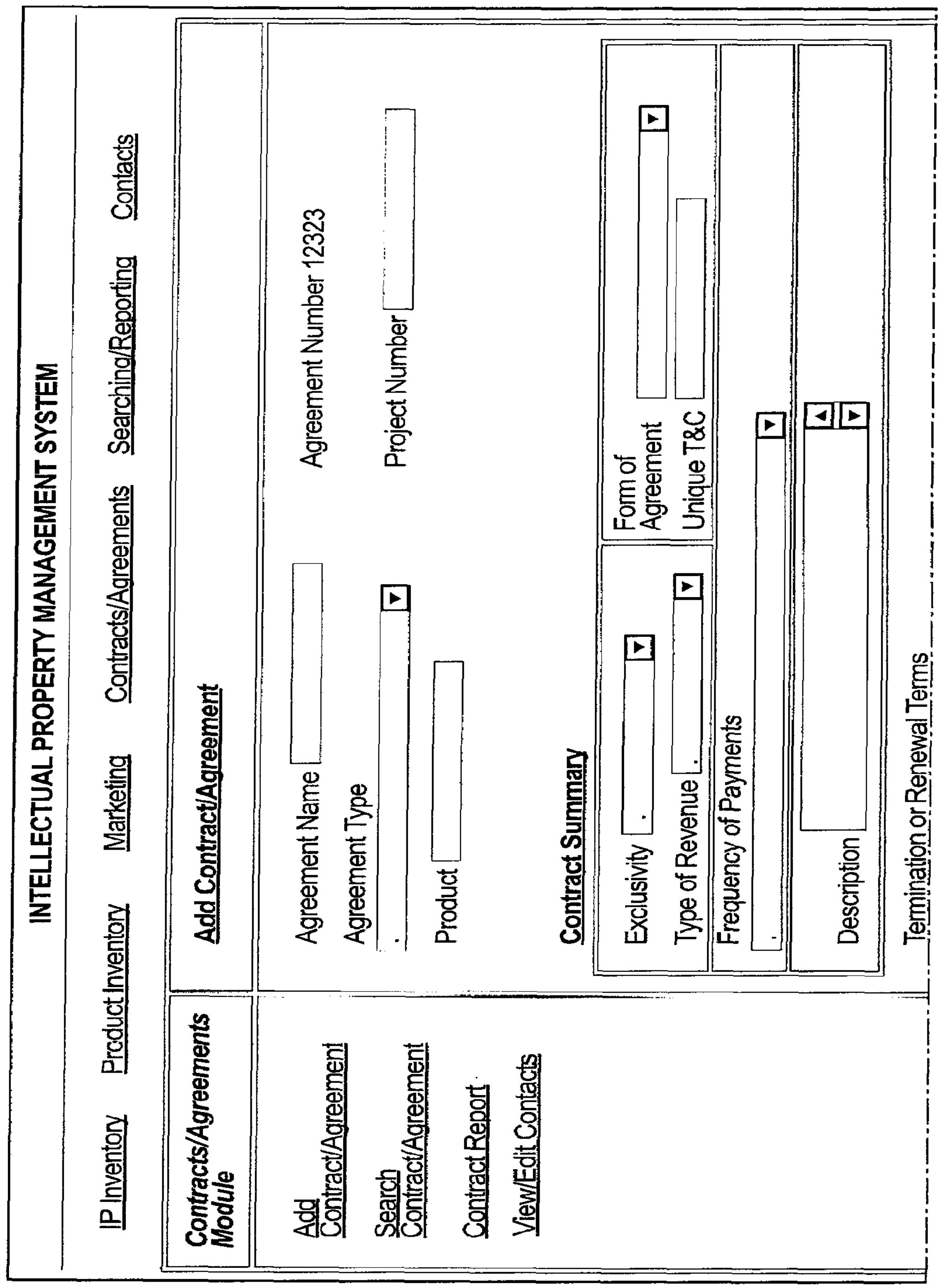
Figure 113:
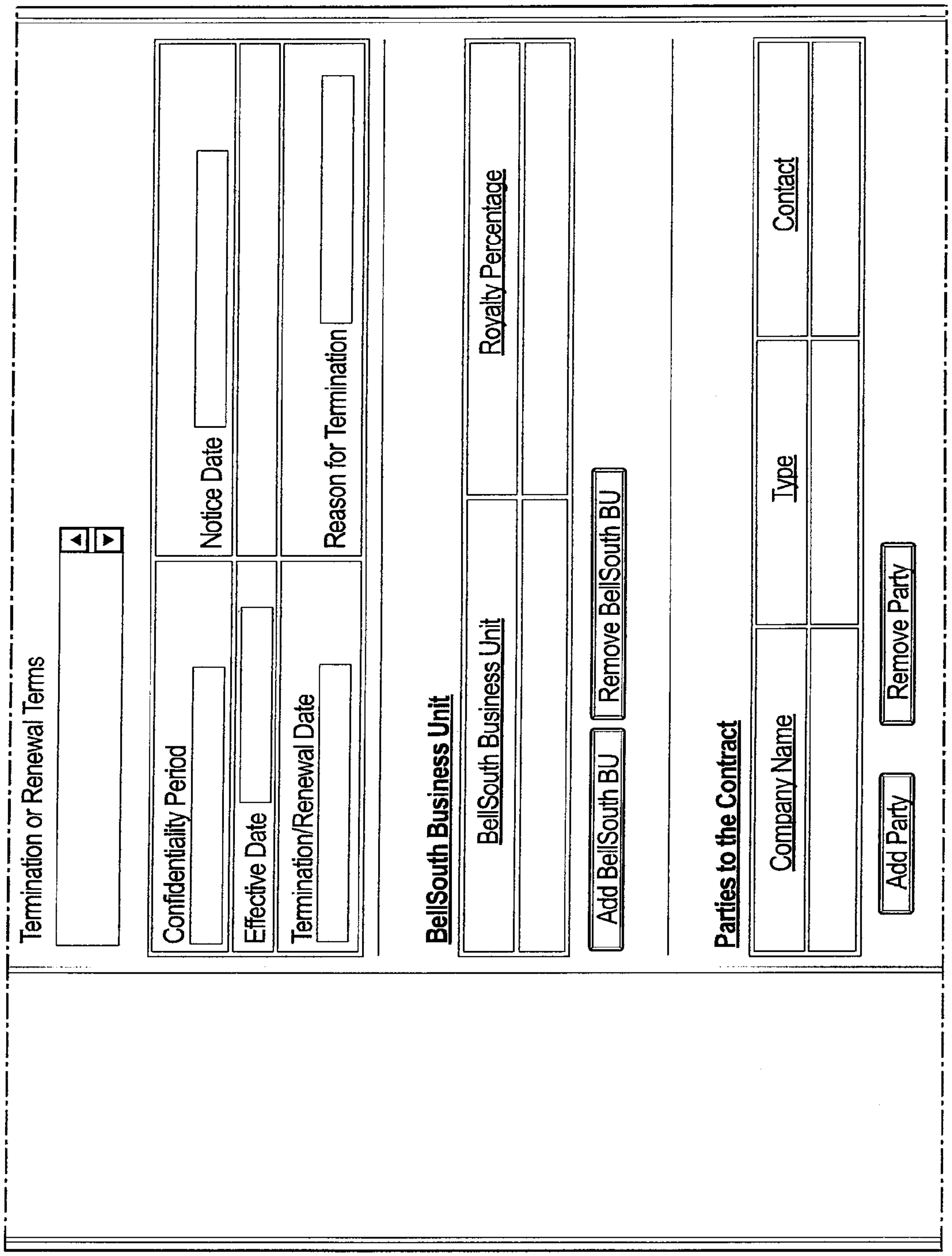

FIG. 111 shows an embodiment of a contracts/agreements top-level GUI component. The contracts/agreements top-level GUI component can include links to a plurality of submodules of the contracts/agreements top-level module. For example, accordingly to an embodiment of the present invention, a contracts/agreements GUI component can include a link to an add contract/agreements submodule, a link to a search contract/agreements submodule, a link to a contract reports submodule, and a link to a view/edit contacts submodule. In an embodiment to the present invention, the link to the view/edit contact modules is a link to the contacts top-level module of the IP management system. The contracts/agreements GUI component can include the link to the view/edit contacts submodule to allow a user to edit and view contacts while accessing the contracts/agreements module and its submodules.

FIGS. 112-115 are an illustration of an embodiment of an add contract/agreement GUI component. According to an embodiment of the present invention, the add contract/agreement GUI component can cause the creation of a contract/agreement data record based on inputs received from a user. The contract/agreement data record can include information corresponding to a contract/agreement to market, sell, license, and other marketing activities related to the marketing of intellectual property. Marketing of intellectual property can include marketing of patents, trademarks, copyrights, trade secrets, and inventions that may be patentable, terms or slogans that may be protected as trademarks, expressions or software that may be protected under the copyright laws, and other intellectual property related items. According to an embodiment of the present invention, a user can cause the IP management system to display the add contract/agreement GUI component illustrated in FIGS. 112-115 by selecting and activating the corresponding link displayed by the contract/agreement top-level GUI component illustrated in FIG. 111. The add contract/agreement GUI component can display a plurality of text data entry fields into which text can be entered and/or value can be selected that are related to a contract/agreement data record and a corresponding contract/agreement. In addition, other data records such as company business unit data records, party data records, associated intellectual property data records, data records related to action items, internal party data records, comments, and associated files can be associated with a contract/agreement data record via by the add contract/agreement GUI component illustrated in FIGS. 112-115.

The add contract/agreement GUI component can include an assigned agreement number when the add contract/agreement GUI component is first displayed. The assigned agreement number can be a unique agreement number that corresponds to the contract/agreement product data record and uniquely identifies the contract/agreement data record. In one embodiment, the assigned agreement number is generated by determining the next available agreement number. A user can specify and/or enter additional data corresponding to the contracts/agreement data record by entering data such as: agreement name, agreement type, project number, and product number. In addition, a user can enter information relating to a contract summary corresponding to the contract/agreement product record. For example, the contract summary information can include: exclusivity information, form of agreement information, type of revenue information, unique terms and conditions information, frequency of payments information, a description, termination or renewal terms, a confidentiality period, a notice date, an effective date, a termination/renewal date, and a reason for termination. The add contract/agreement GUI component can include an add company business unit link and a remove company business unit button link to allow a user to specify a company business unit data record that is to be associated with the contracts/agreement data record. In one embodiment, when a user selects and activates the add company business unit button link, the user can select and/or specify a company business unit by selecting a company business unit from a list of company business units. In addition, the user may be able to specify a royalty percentage that the associated company business unit will receive relating to the corresponding contract/agreement. After a user has selected an associated company business unit data record, the add contract/agreement GUI component can display information corresponding to the selected company business unit data record such as the name of the company business unit and the royalty percentage. In another embodiment, other data corresponding to the company data unit can be displayed. The remove company business unit button link can allow a user to remove a company business unit such that the company business unit is no longer associated with the contract/agreement.

The add contract/agreement GUI component illustrated in FIGS. 112-115 can include an add party button link and a remove party button link to allow a user to associate a party data record with the contract/agreement data record. After a user has specified a party data record as being associated with the contract/agreement data record, the add contract/agreement GUI component can display information corresponding to the associated party data record such as company name, type and contract. In an embodiment, a user can select the party data record to be associated from a listing of locally stored or network-stored party data records. The remove party button link can allow a user to remove an associated party data record such that the party data record is no longer associated with the contract/agreement data record.

In an embodiment, the add contract/agreement GUI component can include an add associated IP button link and/or a remove associated IP button link, that can allow a user to add and/or remove as associated with the contract/agreement data record one or more IP data records. After a user has selected and activated the add associated IP button link, the user can be presented with a listing of associated IP data records. The associated IP data records can be stored locally or stored on a network. The associated IP data records can include patent-related IP data records, trademark-related IP data records, and/or trade secrets/copyright-related IP data records. After a user has selected an IP data record as being associated with the contract/agreement data record, the add contract/agreement GUI component can display information corresponding to the associated IP data record such as IP type, name, and reference number. According to an embodiment of the present invention, other data and/or additional data corresponding to the associated IP data record can be displayed by the add contract/agreement GUI component.

Figure 120:
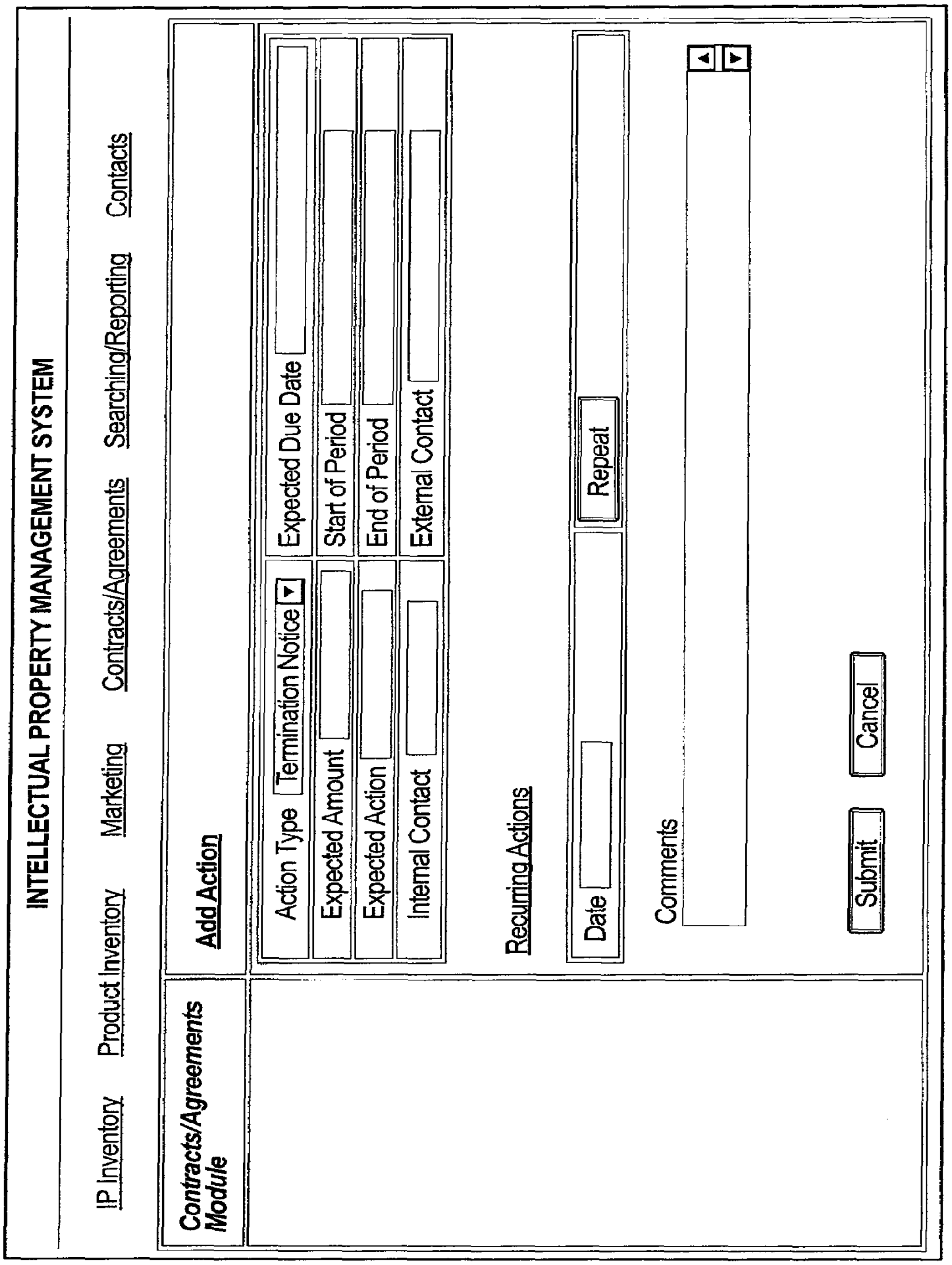
Figure 120A:
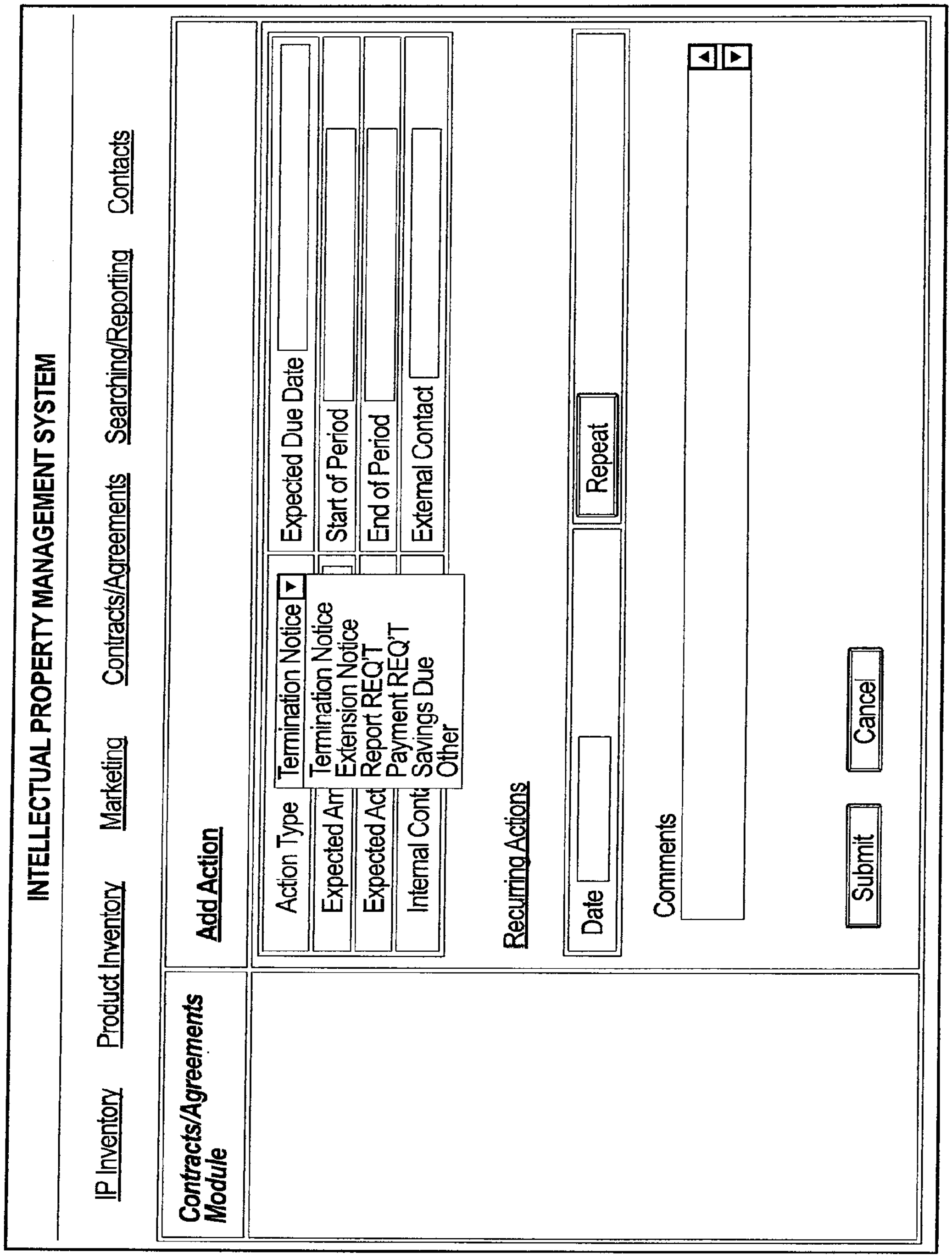

The add contracts/agreements GUI component can include an add action item button link and a remove action item button link to allow a user to associate an action item with the contract/agreement. For example, a user that selects and activates the add action item button link can have an add action GUI component displayed to the user. An example of an add action GUI component is illustrated in FIG. 120. The add action GUI component can include data fields to allow a user to specify an action and related information for creation of an action data record. The user can enter the action related information via data entry fields into which a user can enter text and/or specify data via a drop-down menu. For example, the add action GUI component illustrated in FIG. 120 allows a user to specify with respect to an action information such as product, an action data record, an action type, an expected due date, an expected amount, an expected action, a start-up period, an end of period, an internal contact, an external contact, an indicator regarding whether the action is a recurring action, a time period for the recurring action, and comments. FIG. 120A shows an illustration of the types of actions that can be specified via a drop-down menu and include a termination notice, an extension notice, a report requirement, a payment requirement, a savings due and/or other action type. After a user has entered the action related information, the user can select and activate the submit button link to cause the action data record to be saved. Alternatively, the user can select and activate the cancel button link to cause a redisplay of the add action GUI component without any data entered into the data fields and/or cause a display of the prior screen (e.g., the add contract/agreement GUI component).

Figure 114:
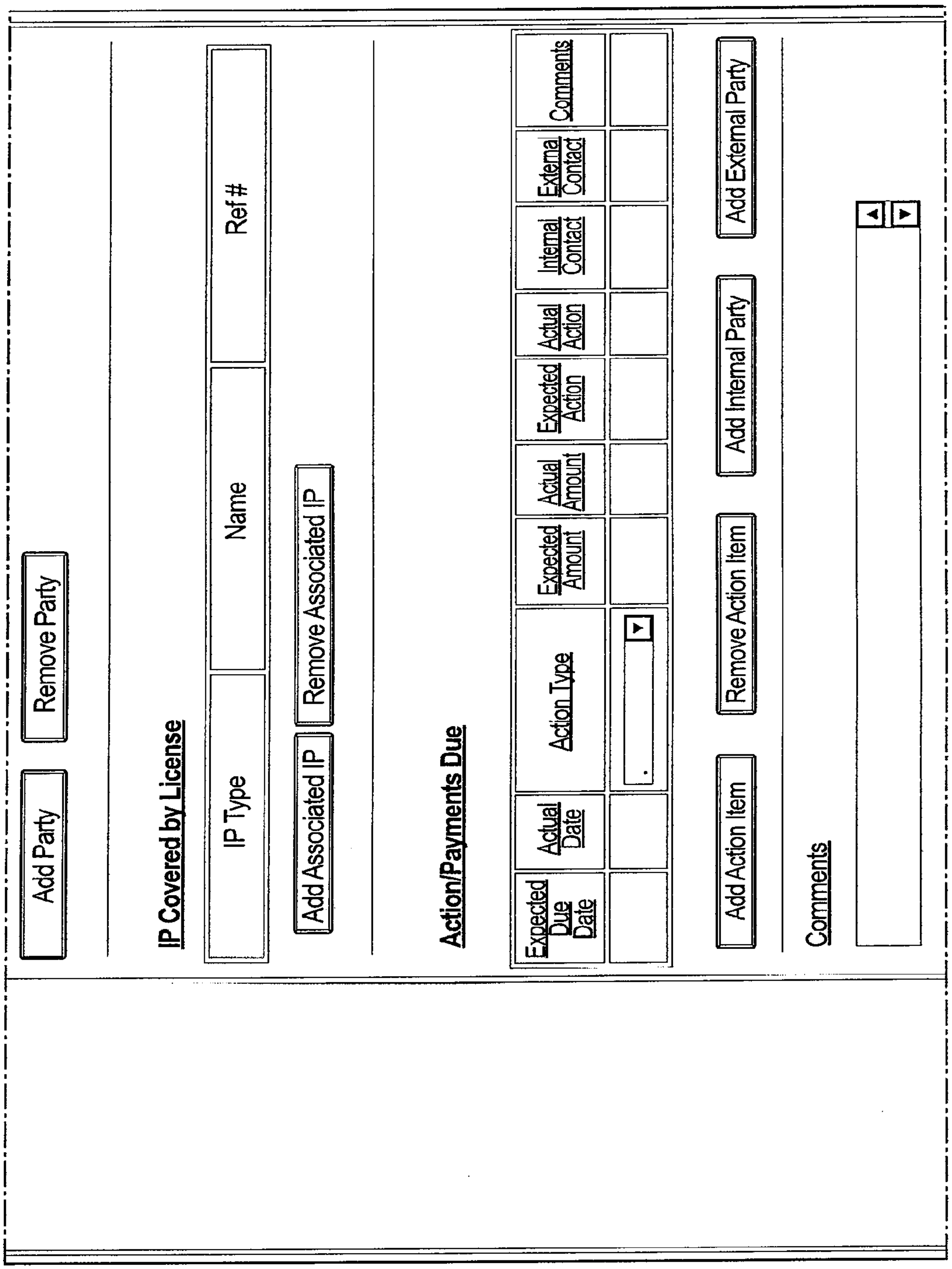
Figure 115:
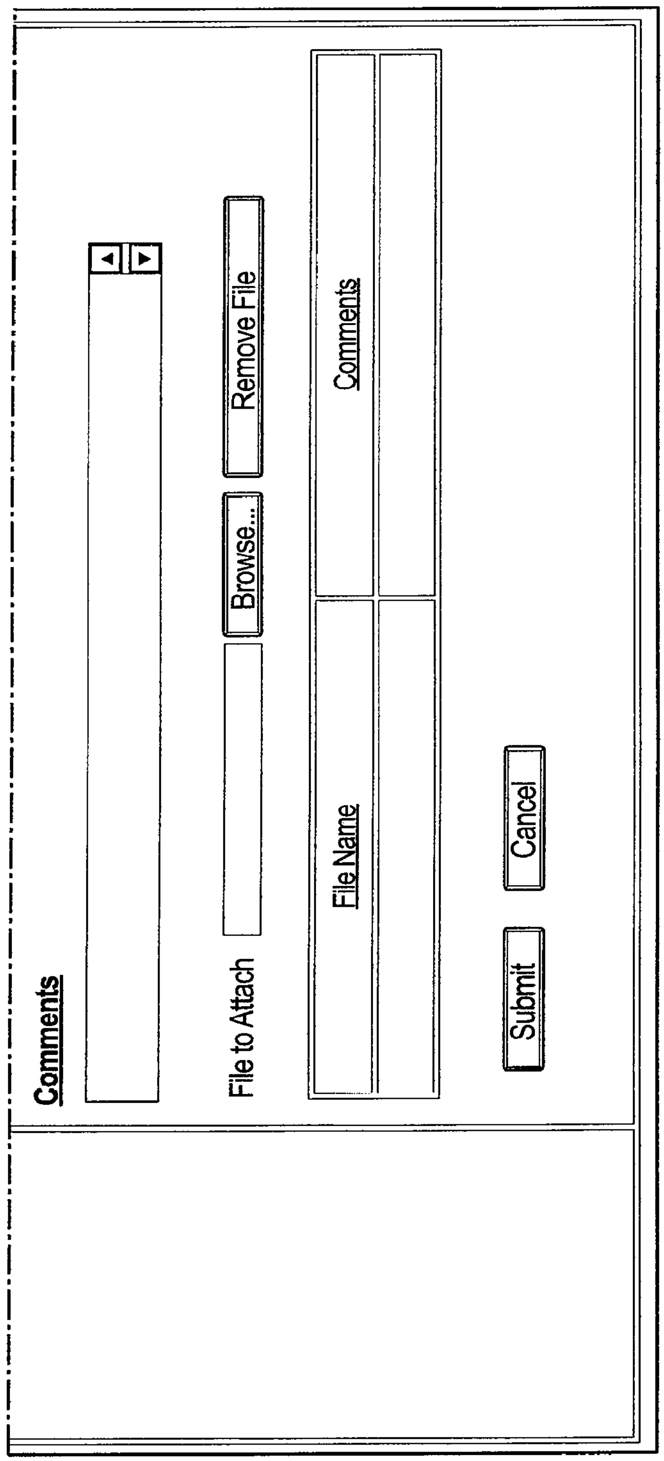

The add contracts/agreement GUI component illustrated in FIGS. 112-115 can include a display of information corresponding to an action item associated with the contract/agreement data record. For example, as illustrated in FIG. 114, for an action item associated with a contract/agreement the following information can be displayed by the add contracts/agreement, GUI component: expected due date; actual date; action type; expected amount; actual amount; expected actions; actual actions; internal contact; external contact; and comments. In an embodiment, each action item data record is listed in a row and information related to the action item can be displayed in additional detail by selecting and activating the action item information.

The add contracts/agreement GUI component can include an add internal party button link and/or an add external party button link to allow a user to associate an internal party data record and/or an external party data record as being associated with the contracts/agreement data record. The add contracts/agreement GUI component can also include button links to provide for removing an associated internal party and/or removing an associated external party. In an embodiment, a user can specify a computer file is associated with the contracts/agreement data record by entering text specifying a computer file and/or activating a browse button link to cause the display of locally-stored and/or network-stored computer files that can be associated with the contract/agreement data record. After a user has selected a computer file as being associated with the contract/agreement data record, the add contracts/agreement GUI component can display information corresponding to the associated computer file such as the file name and comments regarding the file. For example, where there is an executed contract that is stored in a computer file (e.g., an image of a contract, an electronically signed contract, and so on), that computer file can be associated with the contracts/agreement data record. The add contracts/agreement GUI component can include a remove file button link to allow a user to remove a file from its association with the contracts/agreement data record. After a user has entered information corresponding to the contract/agreement data record, the user can select and activate a submit button link to cause the contract/agreement data record to be saved. Alternatively, the user can select and activate a cancel button link to cause the contract/agreement GUI component to be redisplayed without any information entered in the data fields and/or cause the prior screen to be displayed (e.g., the contract/agreement top-level GUI component illustrated in FIG. 111).

Figure 116:
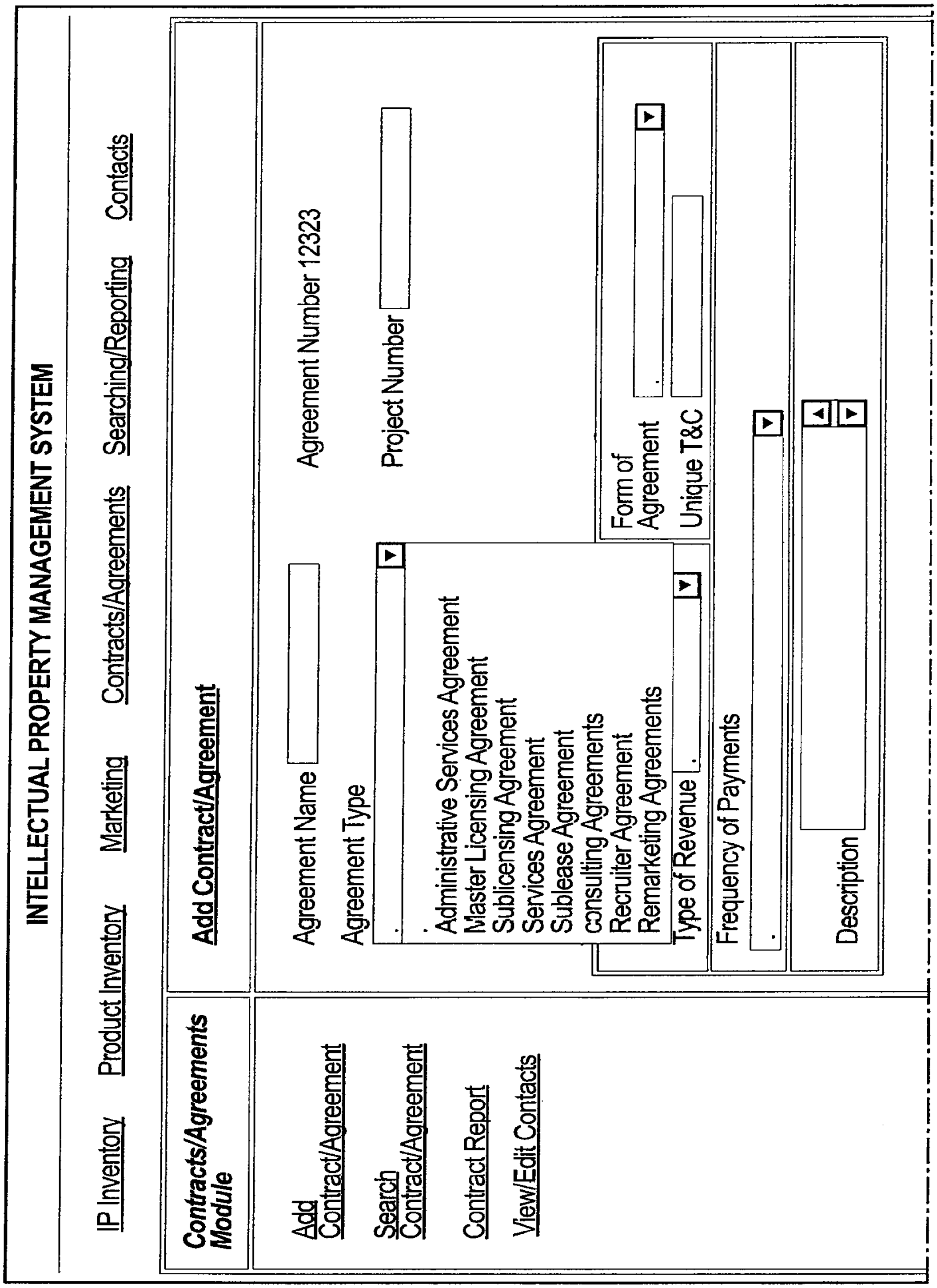

FIG. 116 illustrates an embodiment of an add contract/agreement GUI component that includes a plurality of agreement types that can be selected by a user to specify the agreement type. The plurality of agreement types can be displayed and selected via a drop-down menu and can include an administrative services agreement, a master licensing agreement, a sublicensing agreement, a services agreement, a sublease agreement, a consulting agreement, a recruiter agreement, and a remarketing agreement.

Figure 119:
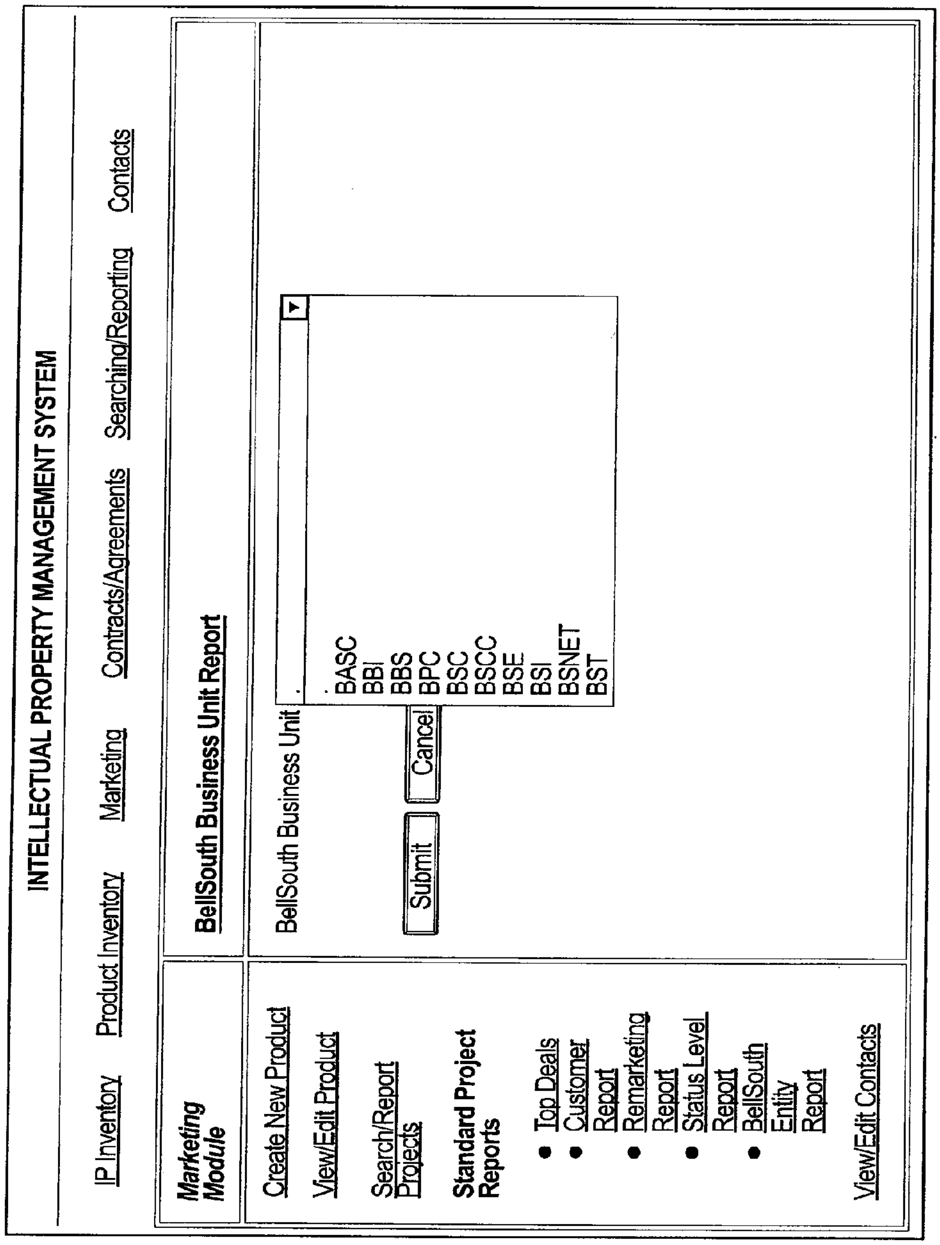
Figure 117:
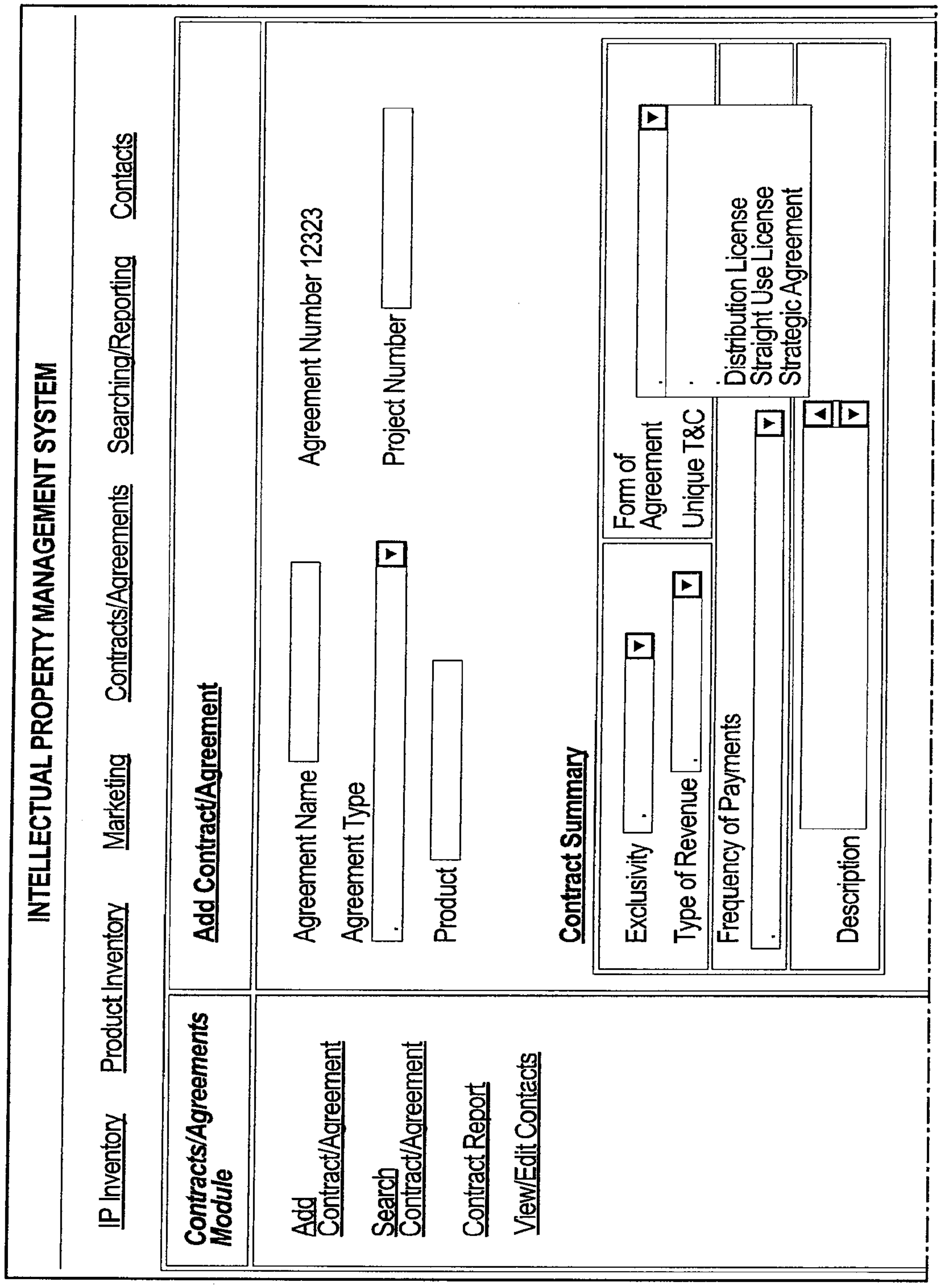
Figure 11A:
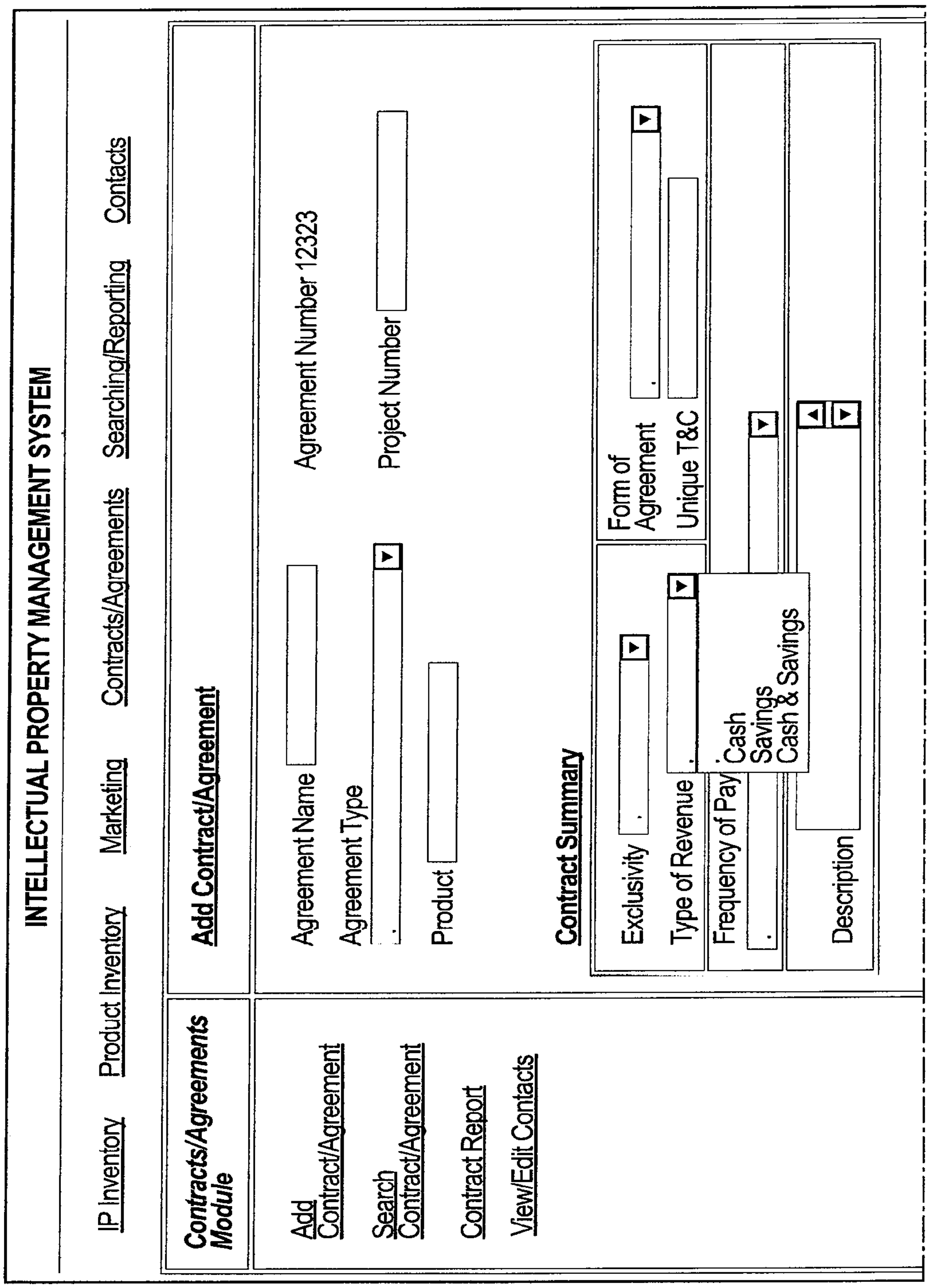
Figure 119:
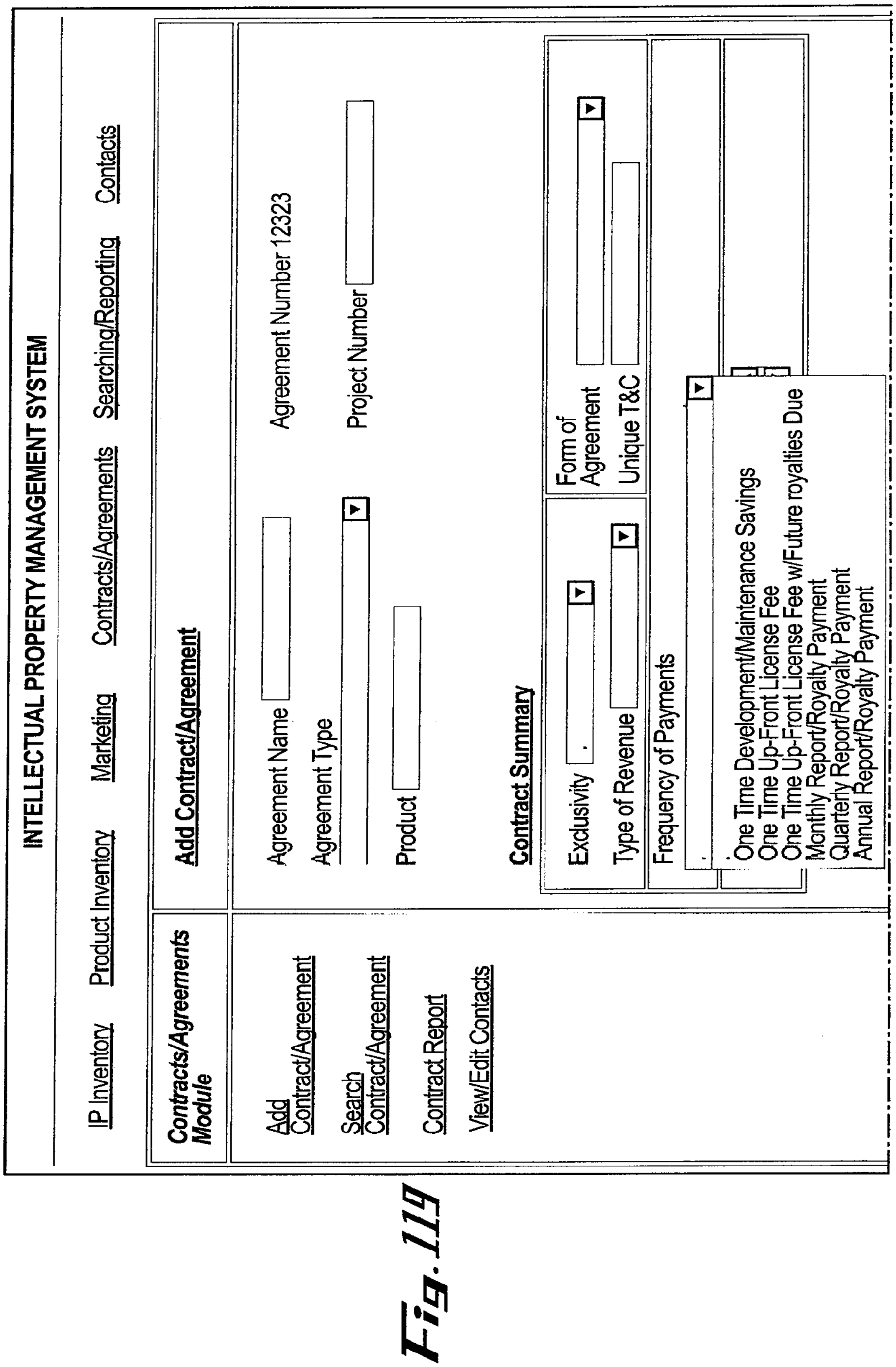

FIG. 117 illustrates an embodiment of an add contract/agreement GUI component where a user can select a form of agreement from a predefined list of forms of agreement via a drop-down menu. The forms of agreement can include a distribution license, straight use license, and a strategic agreement. FIG. 118 shows an illustration of an add contract/agreement GUI component that includes a drop-down menu that can specify the type of revenue corresponding to the contract/agreement corresponding to the contracts/agreement data record. The types of revenue can be specified by a drop-down menu including types of revenue such as cash, savings, and cash and savings. FIG. 119 shows an embodiment of an add contract/agreement GUI component where a listing of frequency of payments can be presented by a drop-down menu. The frequency of payments can include: one-time development/maintenance savings; one time up-front license fee, one time up-front license fee w/future royalties due; monthly report/royalty payment; quarterly report/royalty payment; and annual report/royalty payment.

Figure 121:
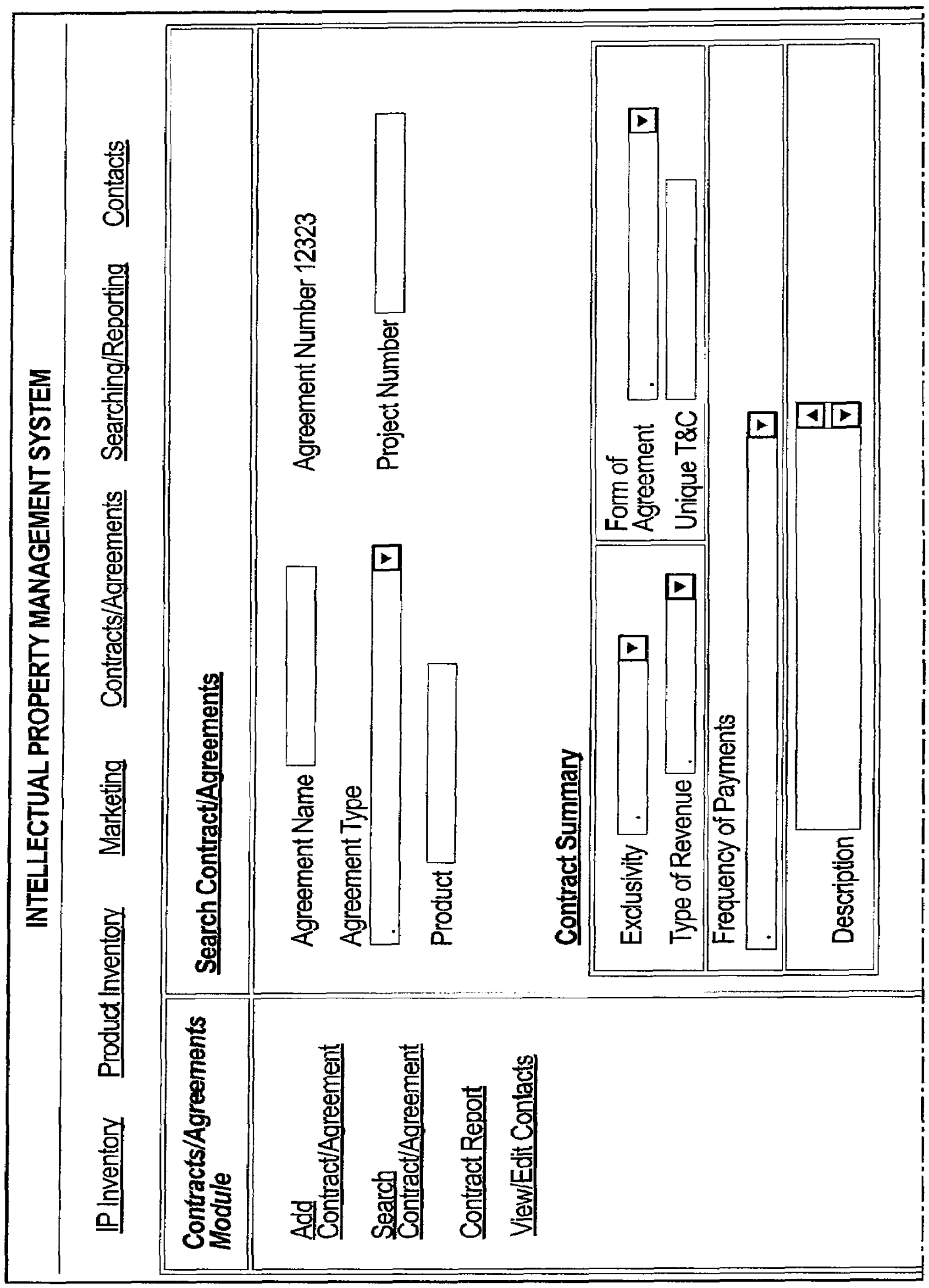
Figure 122:
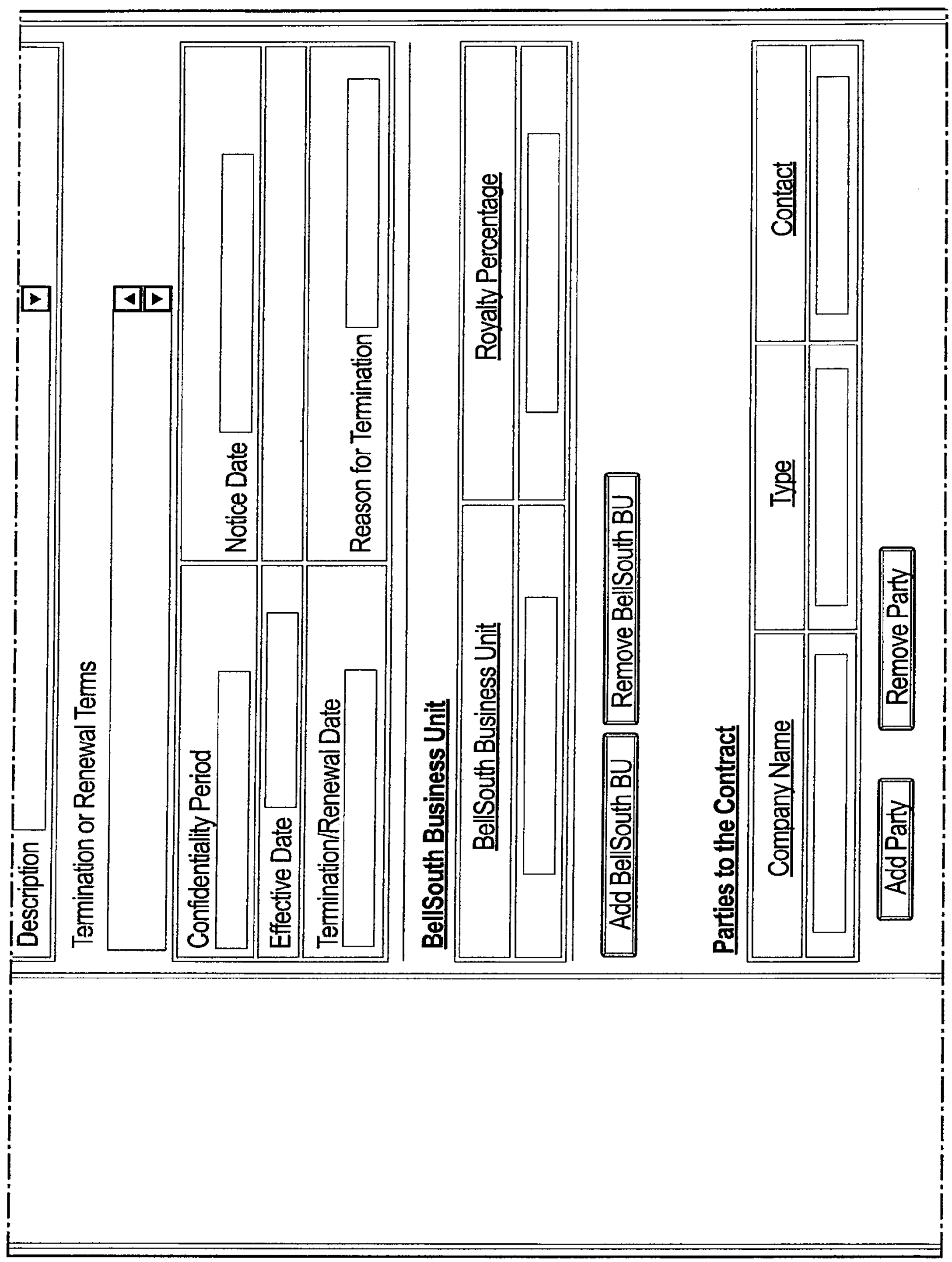
Figure 123:
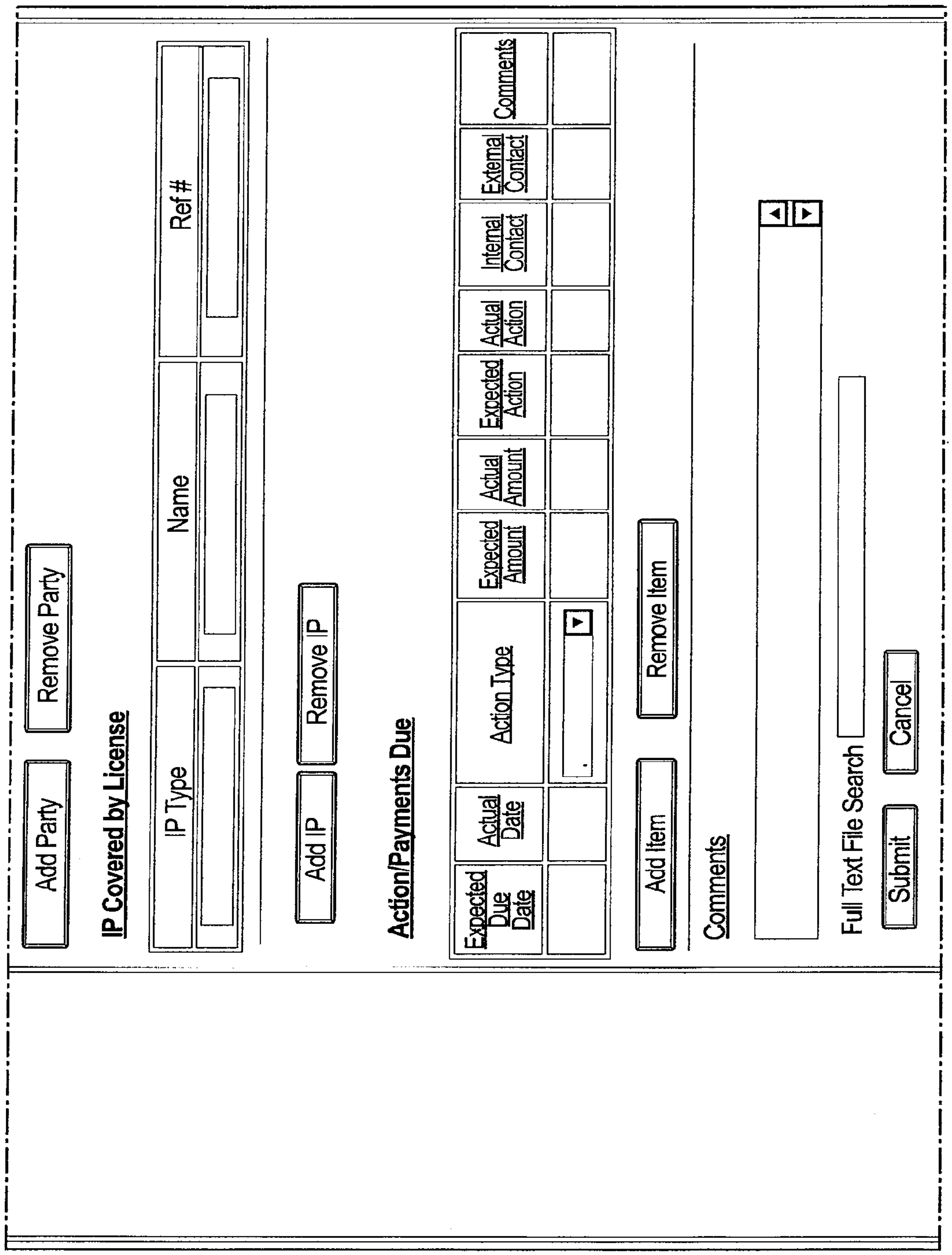

FIGS. 121-123 are illustrations of an embodiment of a search contract/agreement GUI component corresponding to a search contract/agreements submodule of the contract/agreement module of the IP management system. In an embodiment, the search contract/agreement GUI component can allow a user to specify search terms and/or criteria for selection and display of contract/agreement data records corresponding to these specified search terms and/or search criteria. The search terms and/or criteria can be entered via data entry fields and/or drop-down menus. For example, the search terms or criteria that can be specified for a search of the contract/agreement data records via the search contract/agreement GUI component include: agreement name; agreement number; project number, agreement type, and product. Search terms or criteria can also be specified relating to a contract summary such as exclusivity; form of agreement, type of revenue; unique terms and conditions; frequency of payments; description; termination or renewal terms; confidentiality period; notice date; effective date; termination/renewal date; and reason for termination. In an embodiment, a user can specify whether other data records associated with a contracts/agreement data record are search criteria. For example, a user can specify that the search criteria includes a company business unit data record, a party data record, an IP data record, an action data record, and/or an associated file. In another embodiment, the search contracts/agreement GUI component illustrated in FIGS. 121-123 can allow the user to specify the search of the contract/agreement data records based on additional search terms such as company business unit; royalty percentage; party company name; party type; party contact; IP type; name; reference number; and/or any comments. In another embodiment of the present invention, a user can enter search terms that can be the basis of a full text file search of the contract/agreement data records. After a user has entered search terms W and/or criteria, the user can select and activate a submit button link to direct execution of the search of the contract/agreement data records based on a specified criteria and/or search terms. Alternatively, the user can select and activate a cancel button link to cause the search contract/agreement GUI component to be redisplayed without any search criteria and/or search terms or cause the IP management system to display the prior screen.

Figure 124:
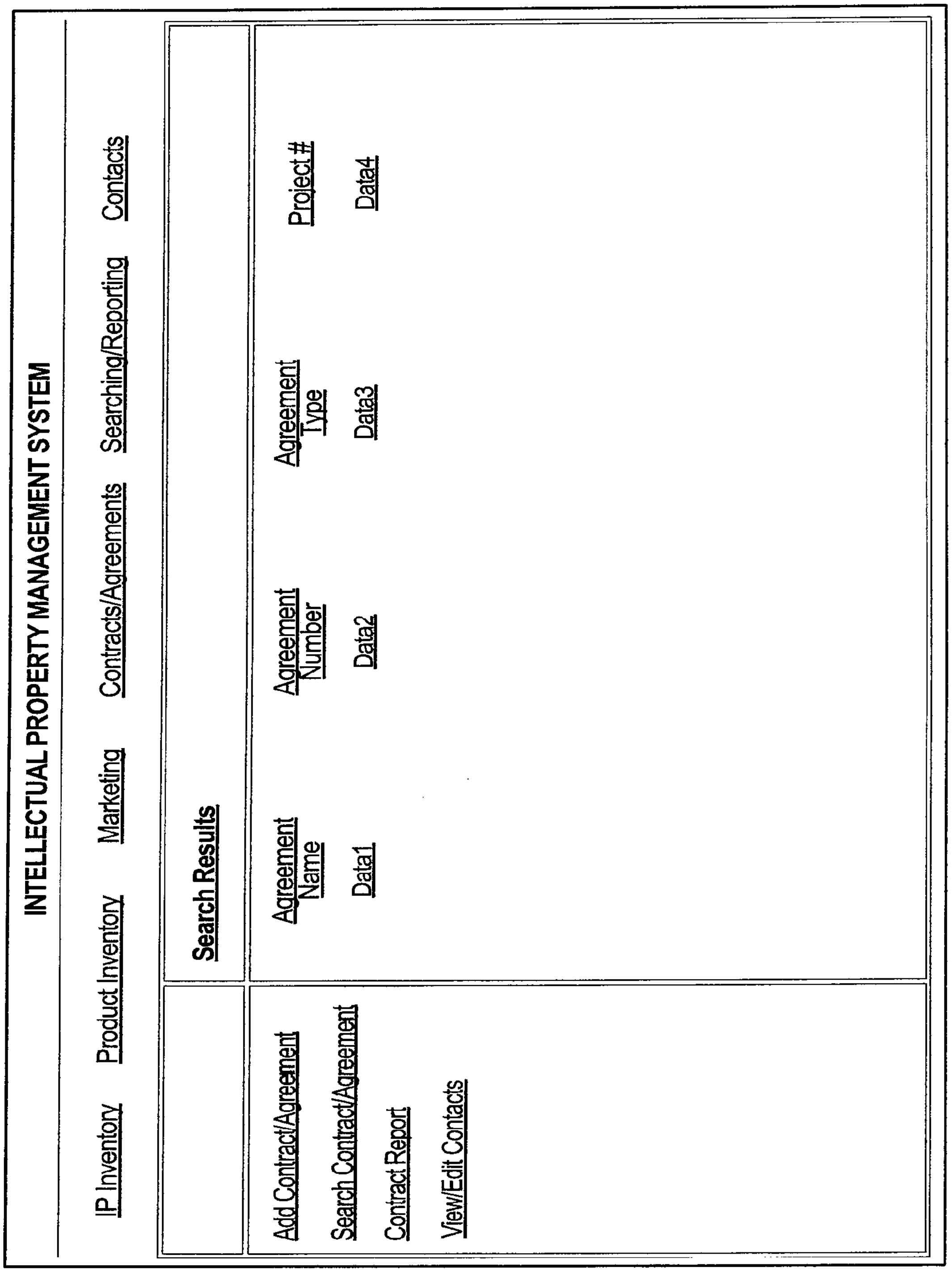

FIG. 124 shows an embodiment of a search results GUI component that can display contract/agreement data records that satisfy user-selected search criteria and/or search terms. Information relating to the contract/agreement data records meeting the terms and/or criteria of a search can be displayed in rows and can include information corresponding to the contract/agreement data record such as agreement name, agreement number, agreement type, and project number. In another embodiment additional and/or other information corresponding to the contract/agreement data records can be displayed. A user can cause a more detailed view of the data of the contract/agreement data records to be displayed by selecting and activating a row of information displayed by the search results GUI component and/or a particular data field of a row of contract/agreement product record information displayed by the search results GUI component.

Figure 125:
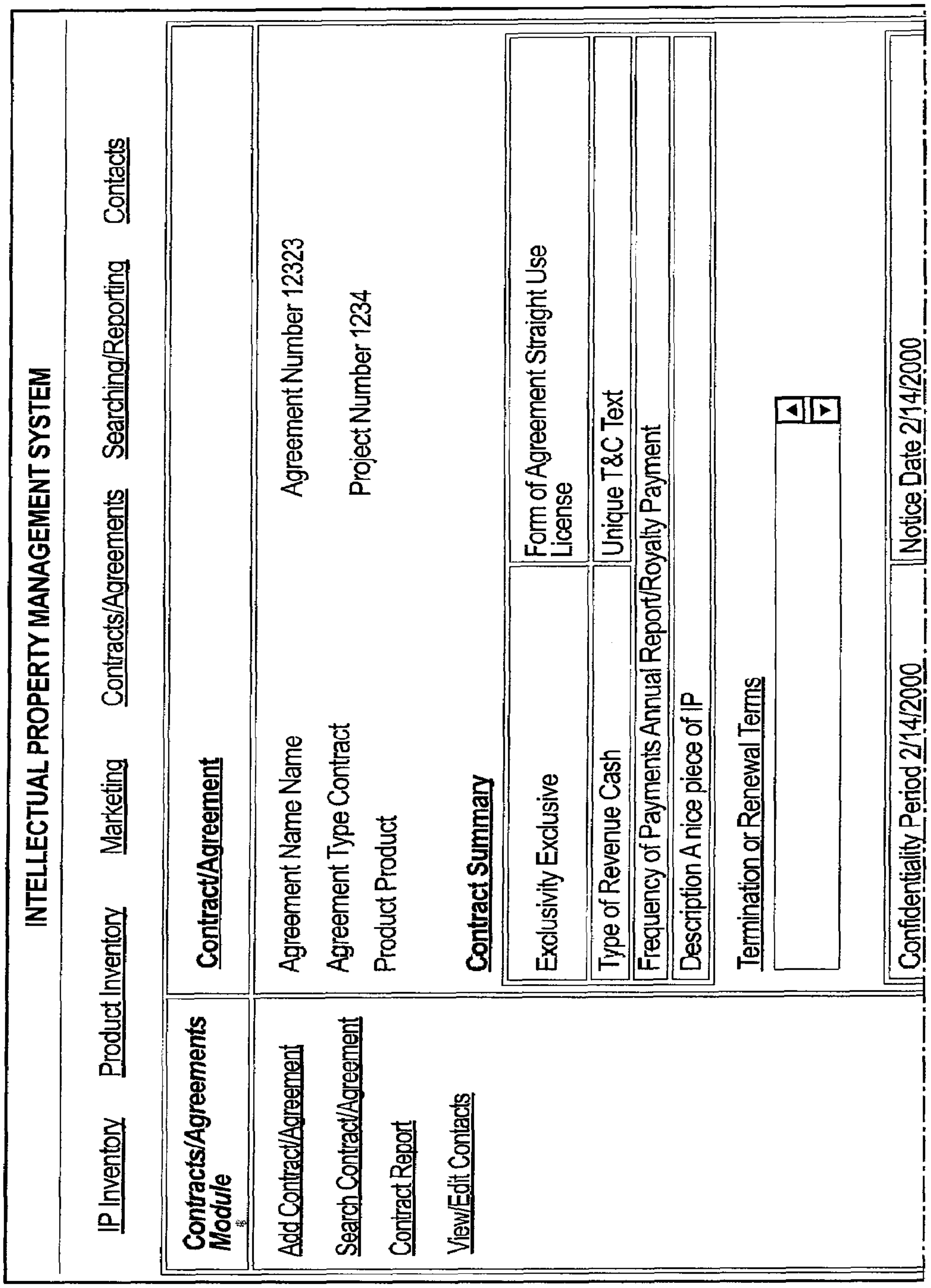
Figure 127:
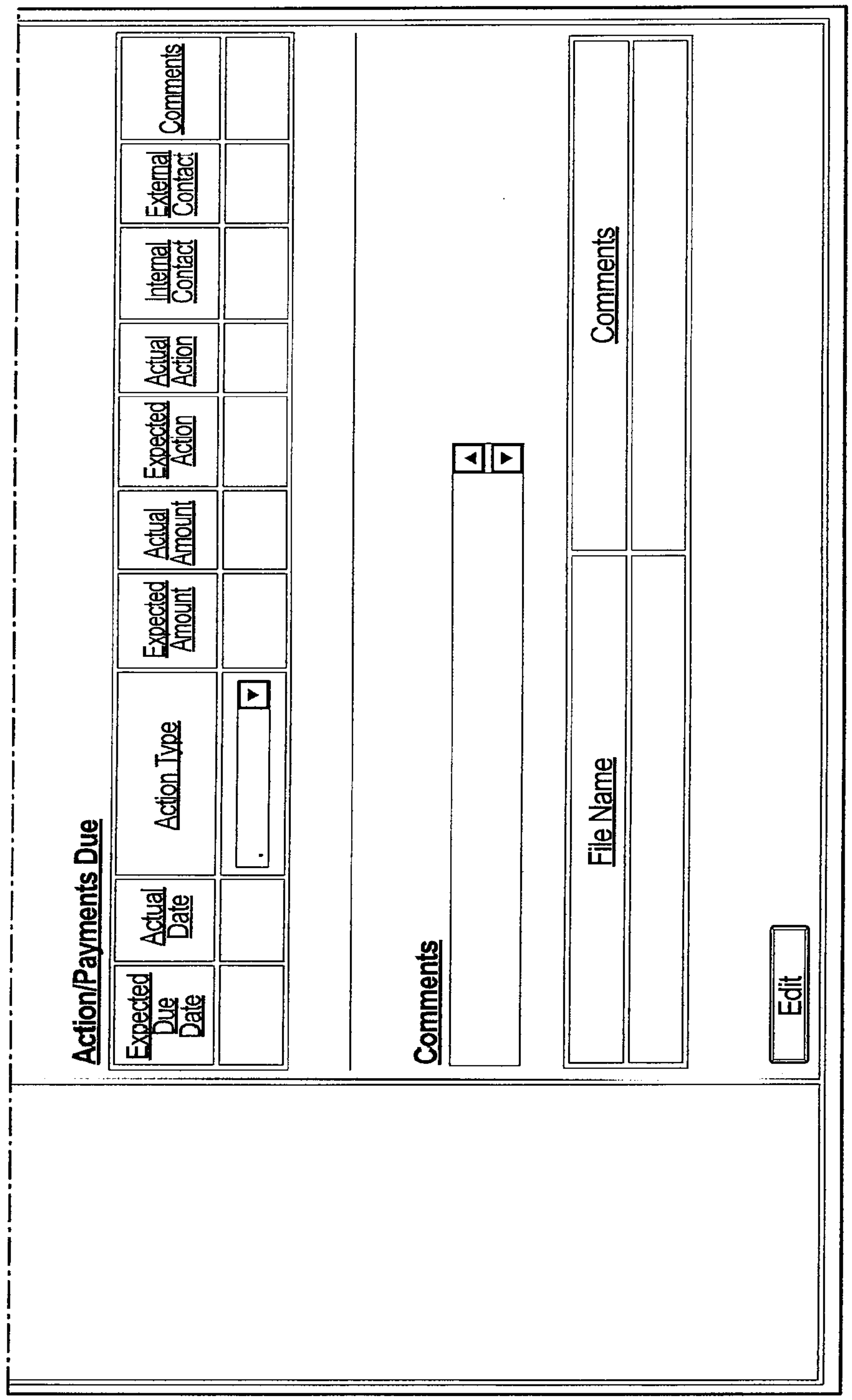
Figure 128:
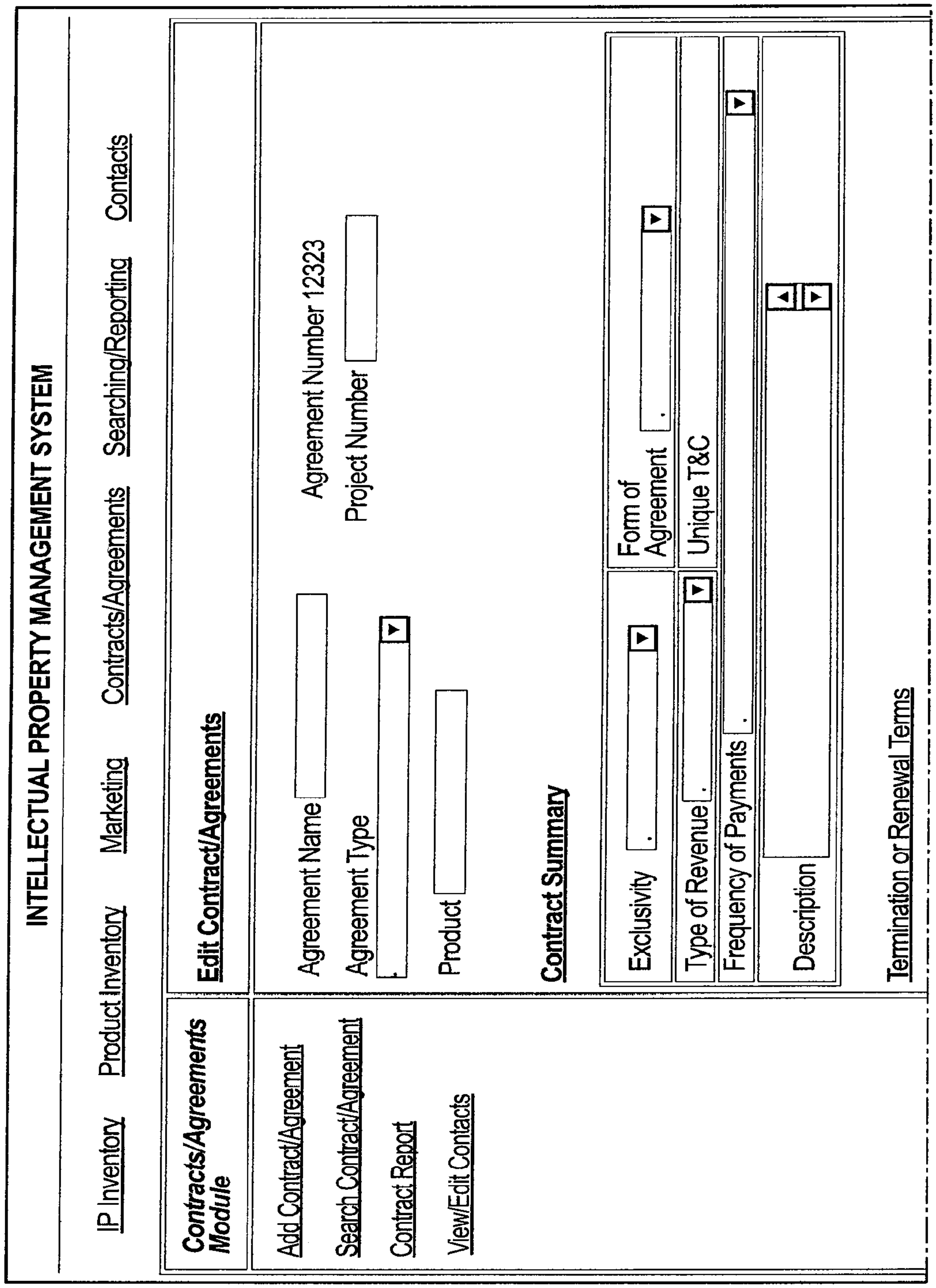
Figure 129:
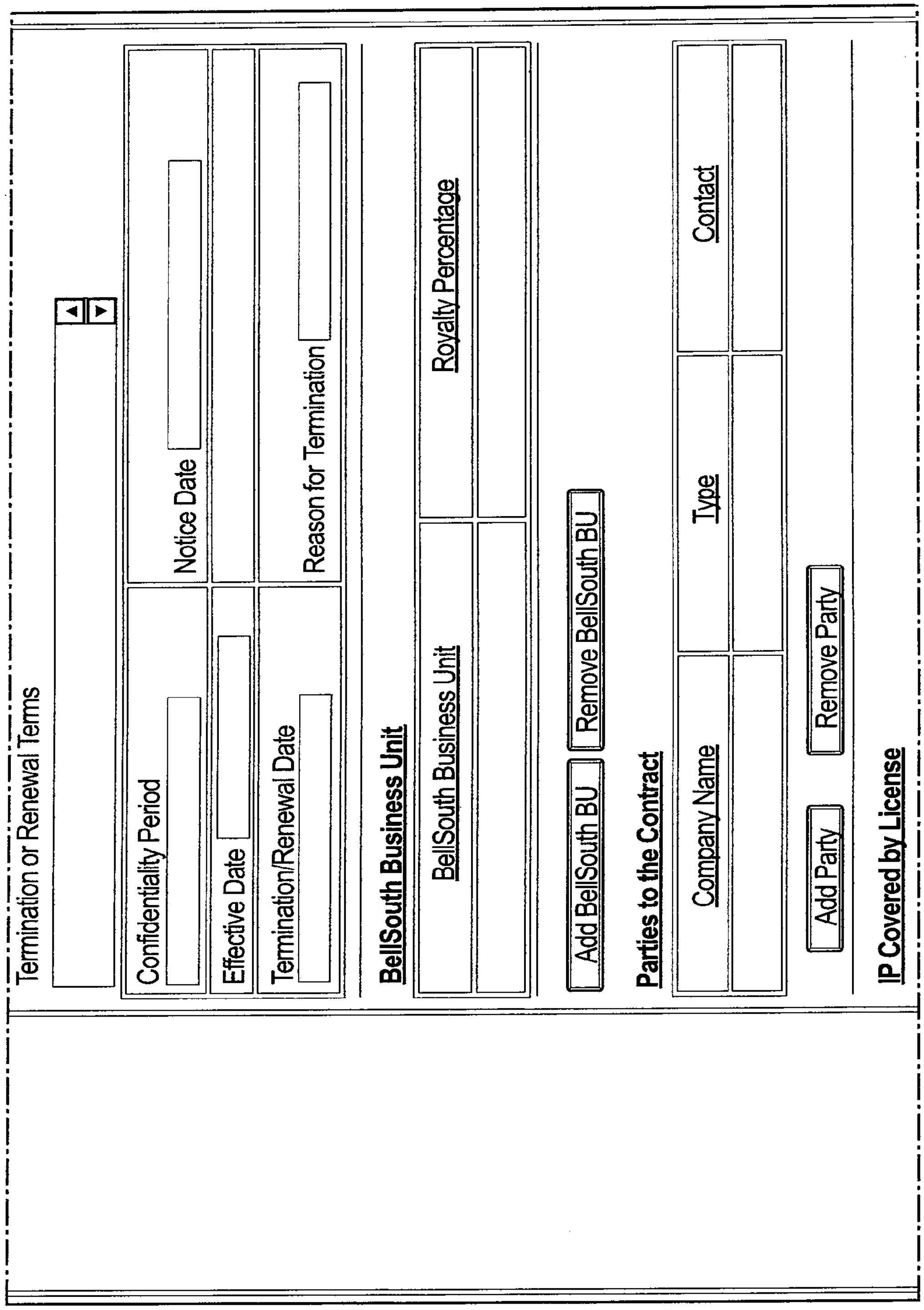
Figure 130:
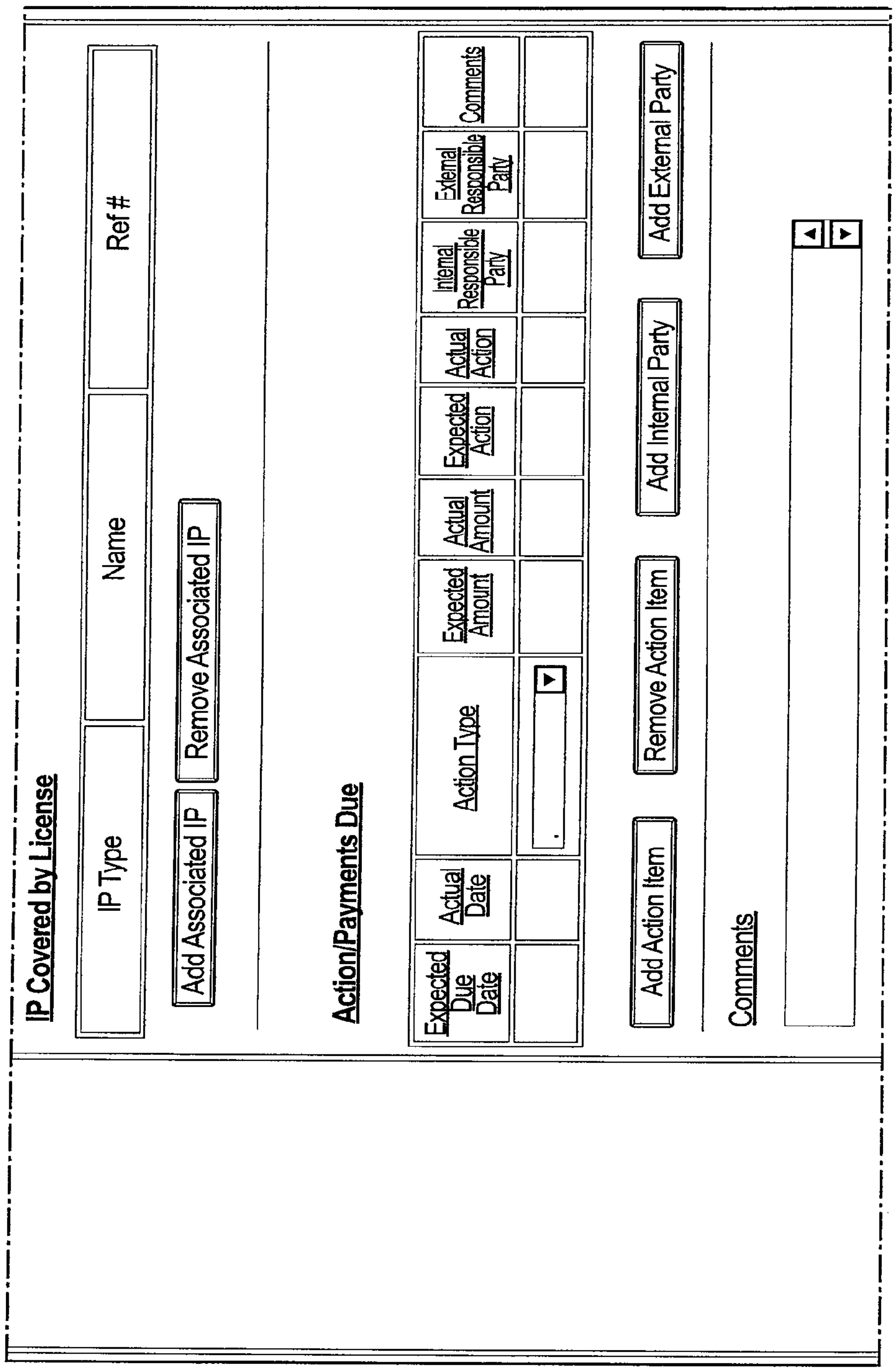
Figure 131:
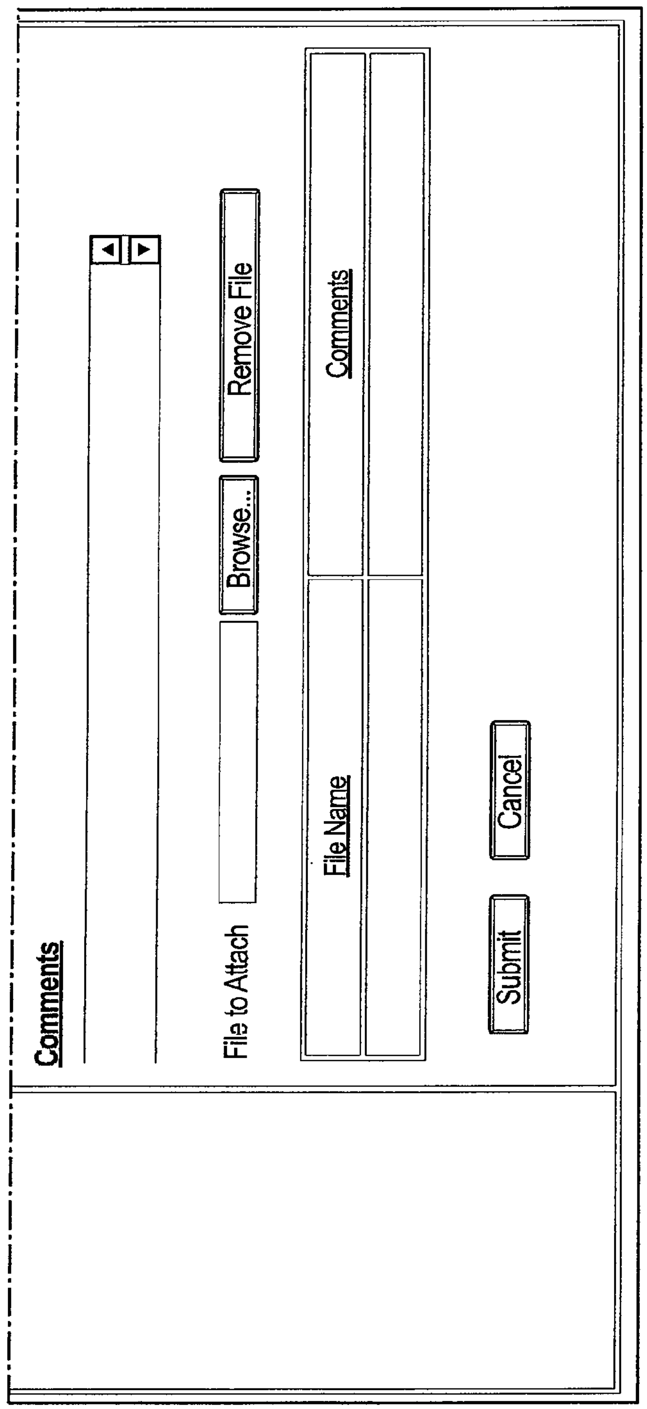

FIGS. 125-127 show a view contract/agreement GUI component that can display information corresponding to a contract/agreement data record. For example, after a user has selected and activated a row of information displayed by the search results GUI component illustrated in FIG. 124, the view contract/agreement GUI component illustrated in FIGS. 125-127 can provide a more detailed view of the information corresponding to the contract/agreement data record displayed in the row of the search results GUI component. The information relating to the contract/agreement that can be displayed by the contract/agreement GUI component can include information relating to the agreement name, agreement number, agreement type, project number, the product. The view contract/agreement GUI component can also display information relating to a contract summary such as exclusivity, form of agreement, type of revenue, unique terms and conditions, frequencies of payment, description, termination or renewal terms, a confidentiality period, a notice date, an effective date, a termination/renewal date, and a reason for termination.

Information from associated data records can be displayed by the contract/agreement GUI component. For example, when there is a company business unit associated with the contract/agreement, the name of the company business unit and the royalty percentage can be displayed. Likewise, when there is a party to the contract associated with the contract/agreement, the company name, type, and contact can be displayed by the view contract/agreement GUI component. The contract/agreement GUI component can also display information relating to any IP data record associated with the contract/agreement data record and in particular can display information such as the IP type, the name, and a reference number. Actions/payments due corresponding to the contract/agreement can also be displayed and can include information relating to expected due date, actual date, action type, expected amount, actual amount, expected action, actual action, internal contact, external contact, and comments. When there are associated files corresponding to the contract/agreement data record, information corresponding to the associated files can be displayed such as file name, and any comments regarding that file.

In an embodiment, the view contract/agreement GUI component illustrated in FIGS. 125-127 can include an edit button link to display and edit contract/agreement GUI component. An example of an edit contract/agreement GUI component is illustrated in FIGS. 128-131. The edit contract/agreement GUI component allows a user to view the information stored in and/or associated with the contract/agreement data record (i.e., it allows the user to modify the data corresponding to the contract/agreement data record). After a user has modified any data corresponding to the contract/agreement data record, the user can select and activate a submit button link to cause the updated contract/agreement data record to be saved. Alternatively, the user can select and activate a cancel button link to exit the edit contract/agreement GUI component without changing the contract/agreement data record.

Figure 132:
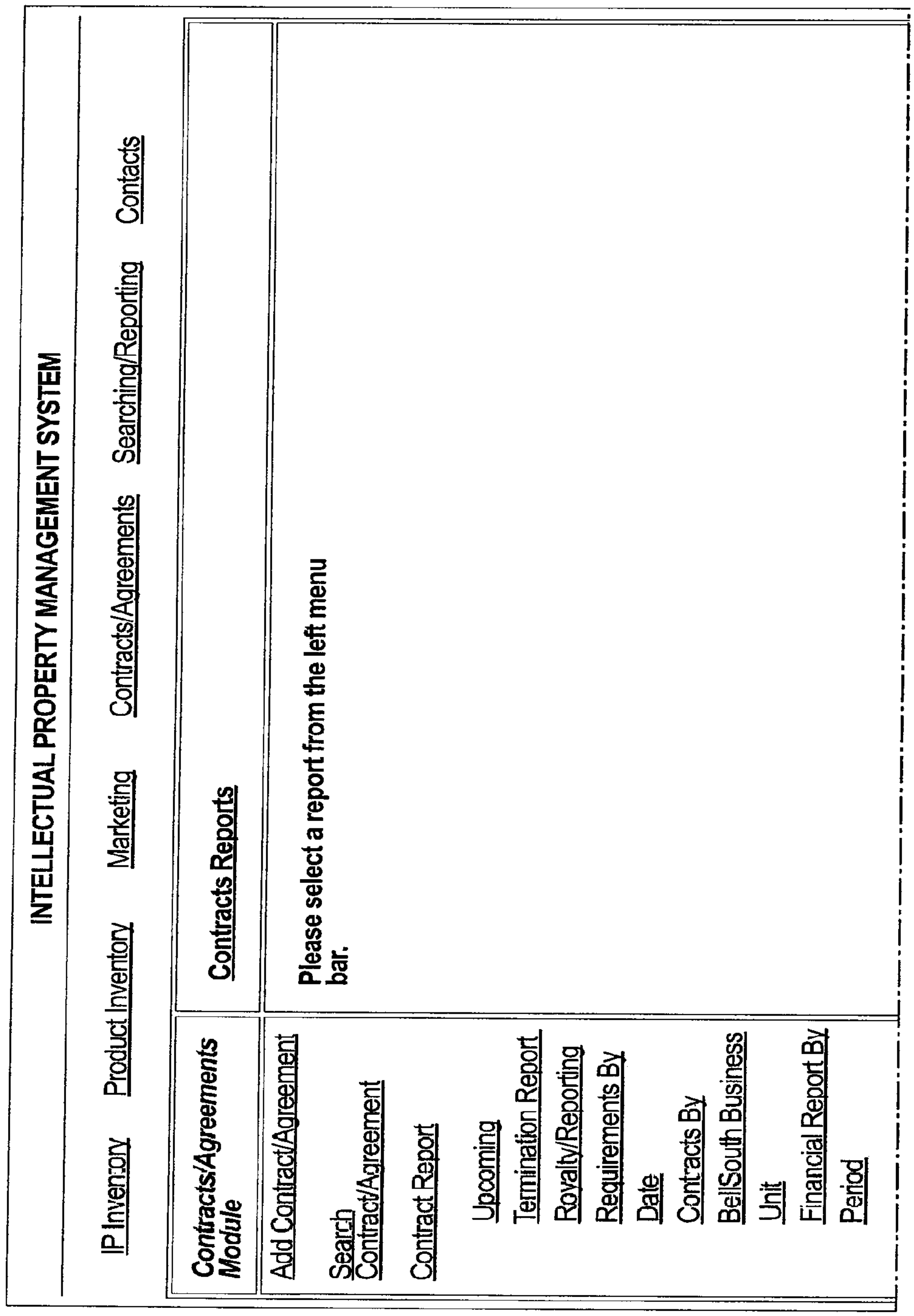
Figure 133:
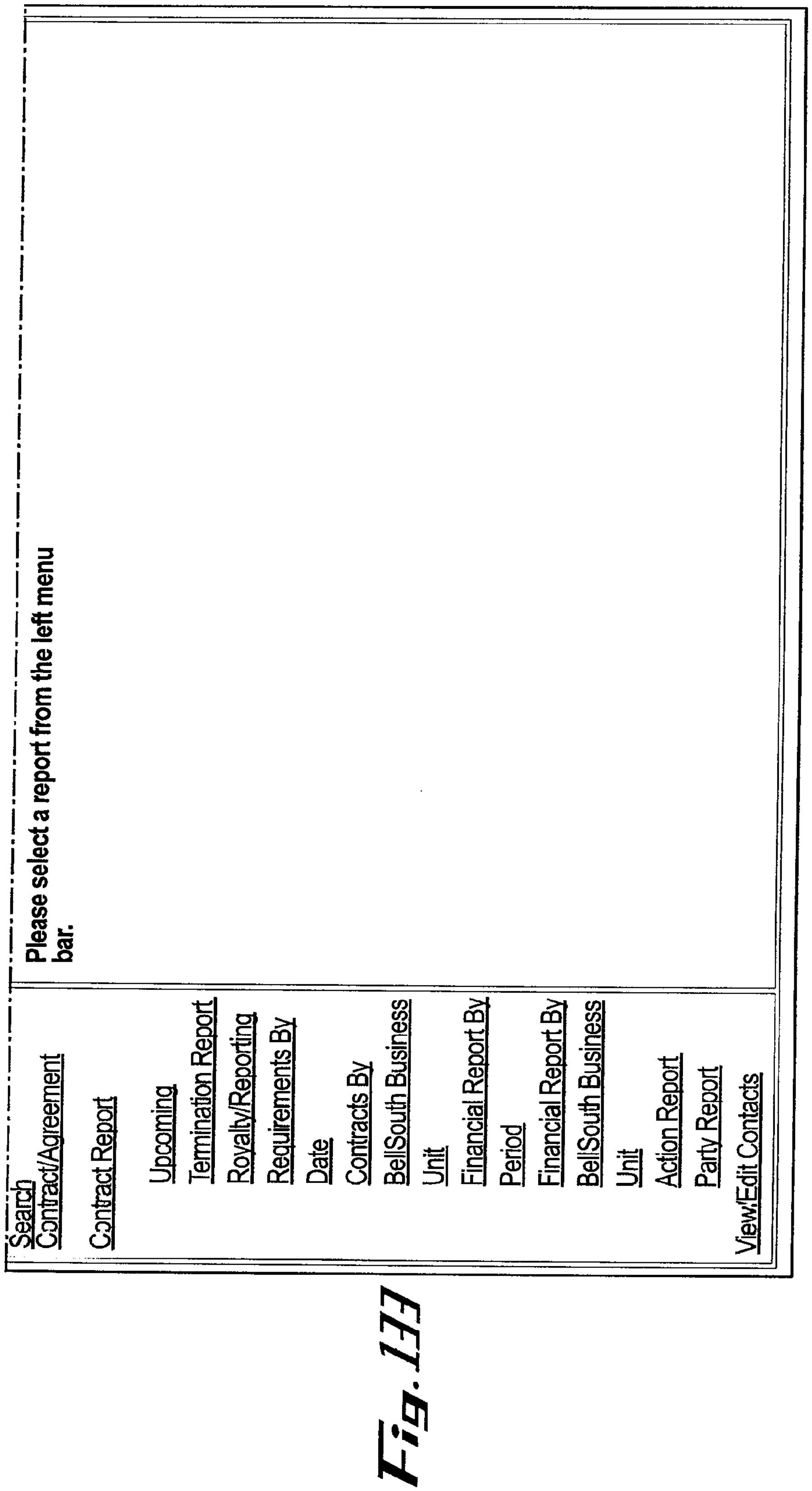

FIGS. 132-133 show an embodiment of a contracts reports GUI component corresponding to a contracts reports submodule of the contract/agreement module of the IP management system. The contracts reports GUI component can include a plurality of links to contract reports submodules that can generate and display one or more contract reports. For example, the contracts reports GUI component illustrated in FIGS. 132-133 can include a plurality of links to contract reports submodules such as: an upcoming termination report module; a royalty/reporting requirements by date module; a contracts by company business unit module; a financial report by period module; a financial report by company business units module; an action report module; and a party report module.

Figure 134:
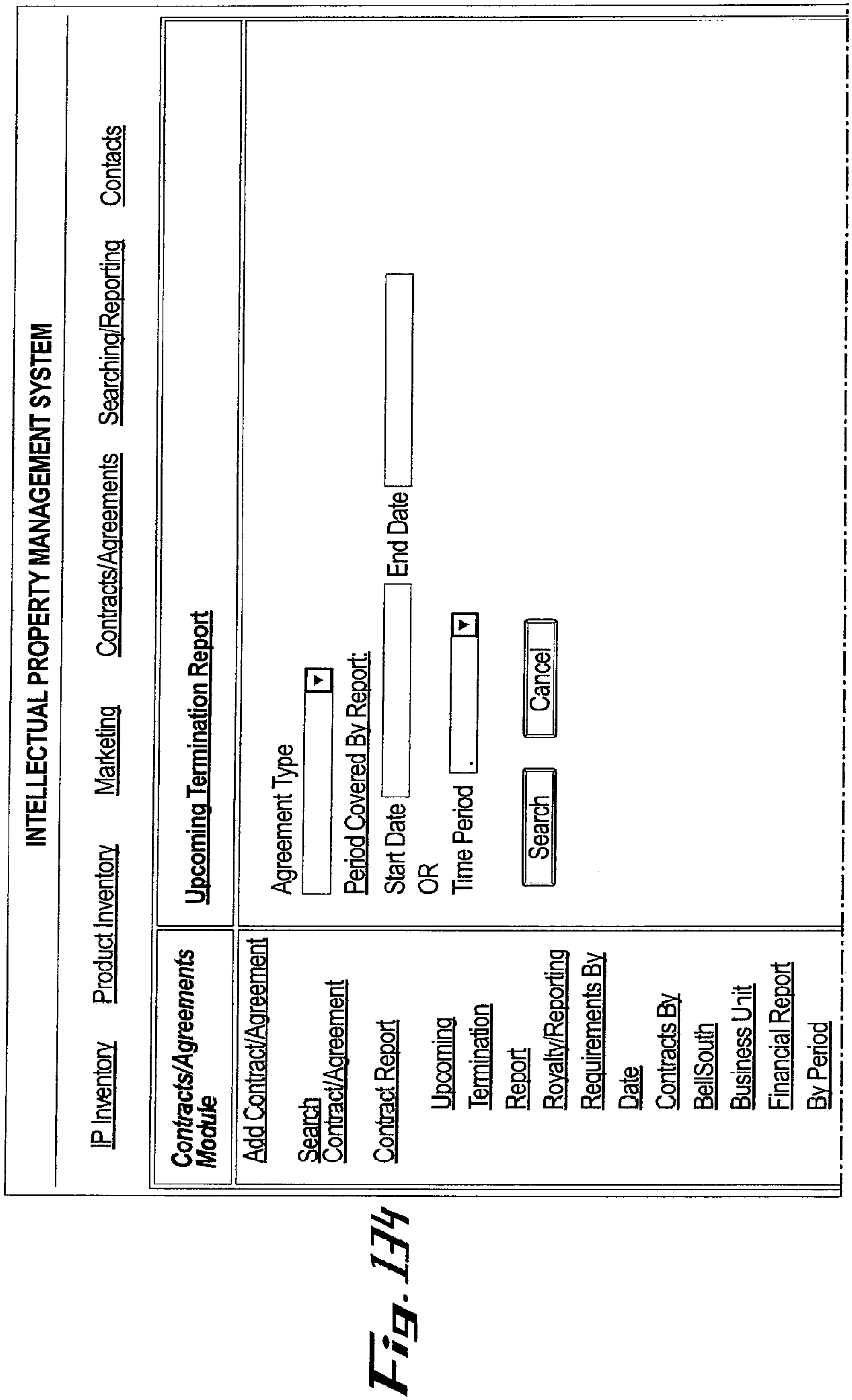
Figure 135:
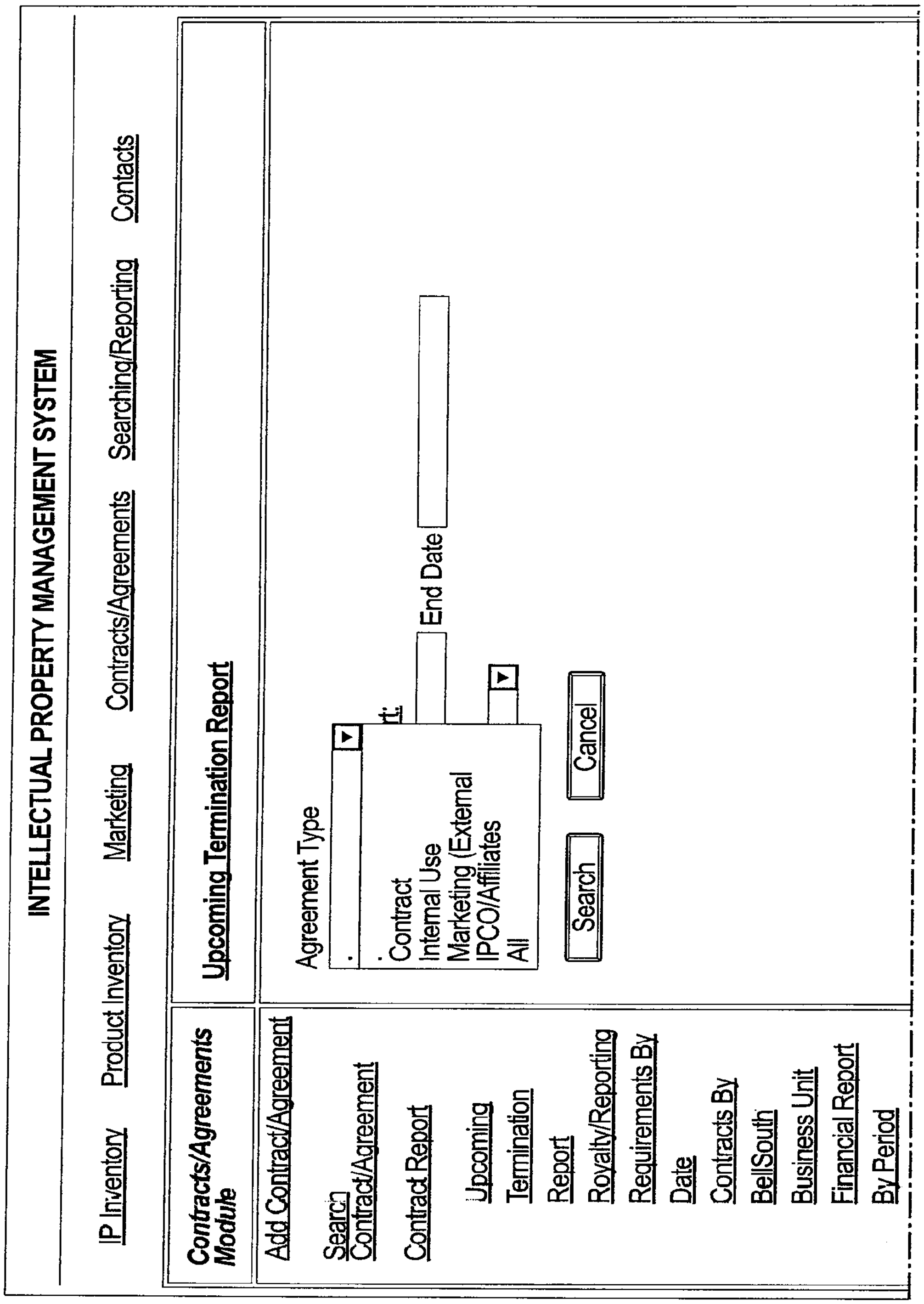
Figure 136:
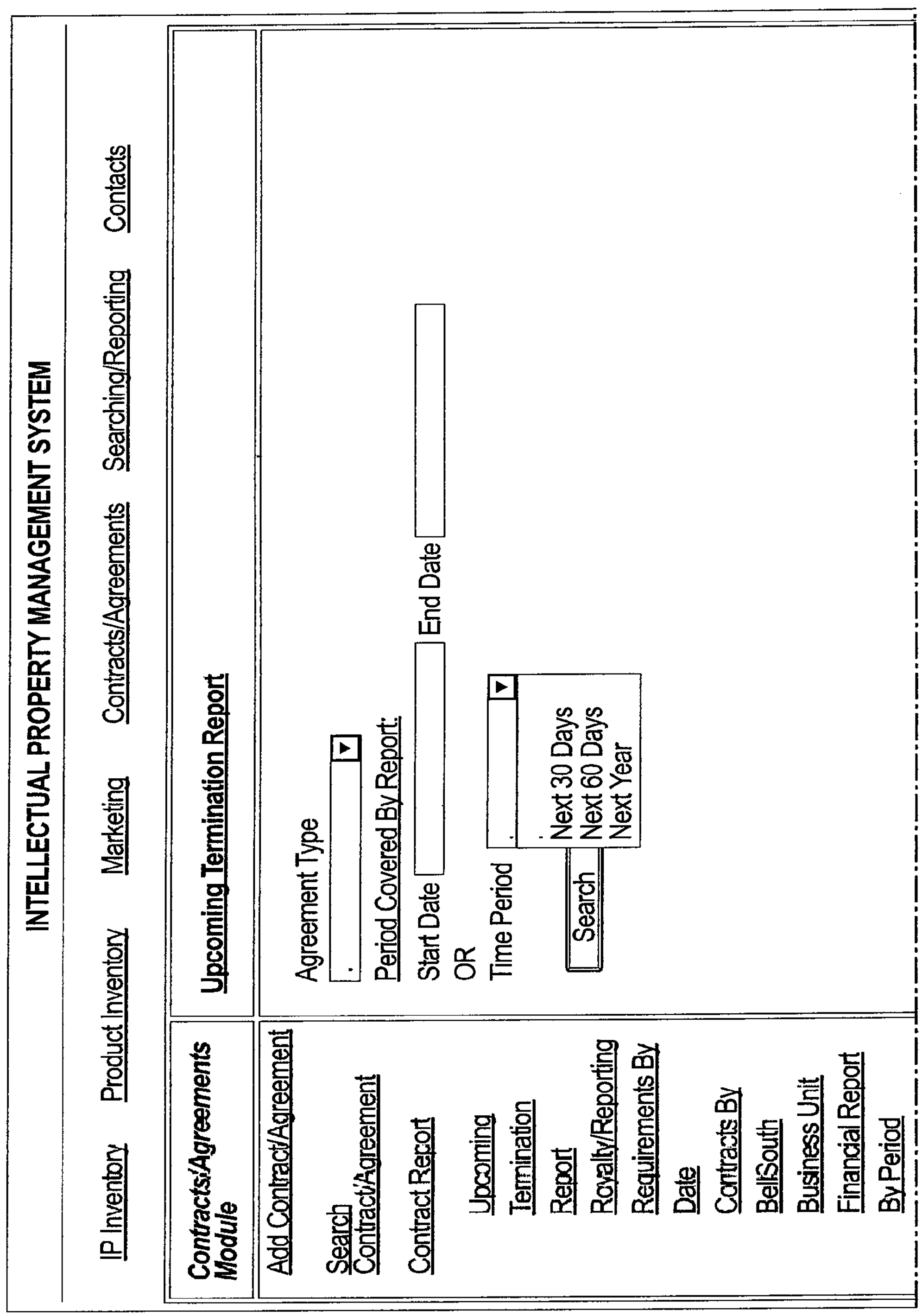

FIG. 134 shows an illustration of an upcoming termination report GUI component that can allow a user to specify criteria for generating an upcoming termination report. A user can select and/or specify an agreement type and a period to be covered by the upcoming termination report. For example, FIG. 135 shows that a user can specify one of a plurality of agreement types by a drop-down menu that includes agreement types such as: contract, internal use agreement, a marketing (external) agreement, intellectual property company/affiliates agreement, or all agreement types. FIG. 136 shows that a time period for an upcoming termination report can be specified by a drop-down menu that specifies time periods such as the next 30 days, the next 60 days, the next year, and so forth.

Figure 137:
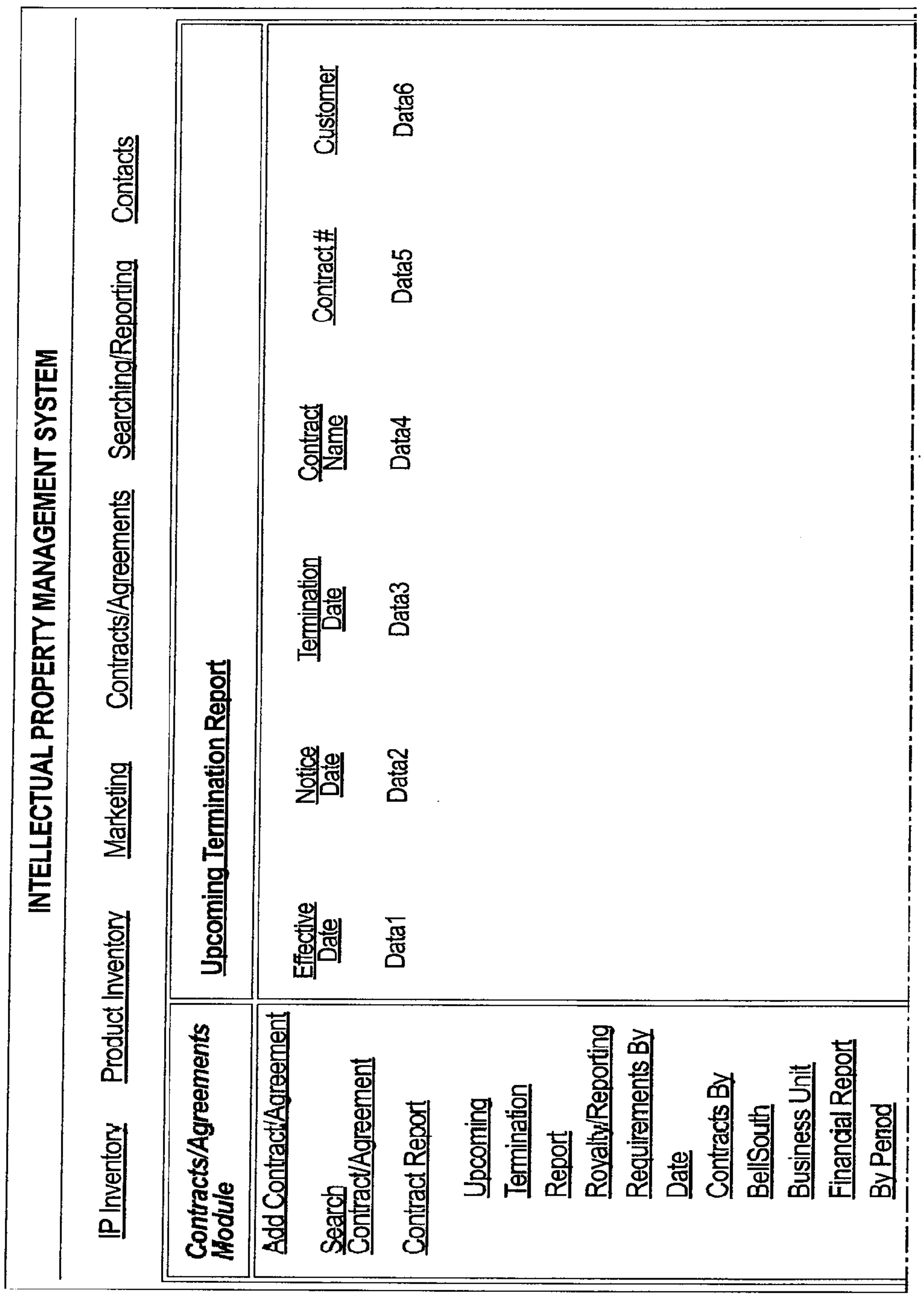

FIG. 137 shows an illustration of an upcoming termination report results GUI component that can be displayed after a user has specified report criteria via the upcoming termination reports GUI component illustrated in FIG. 134. Information corresponding to each contract/agreement satisfying the upcoming termination report criteria can be displayed such as: an effective date, a notice date, a termination date, a contract name, a contract number, and/or customer. A more detailed view of the contract/agreement data record displayed by the upcoming termination report results GUI component can be generated by selecting and activating information corresponding to a displayed contract/agreement data record.

Figure 139:
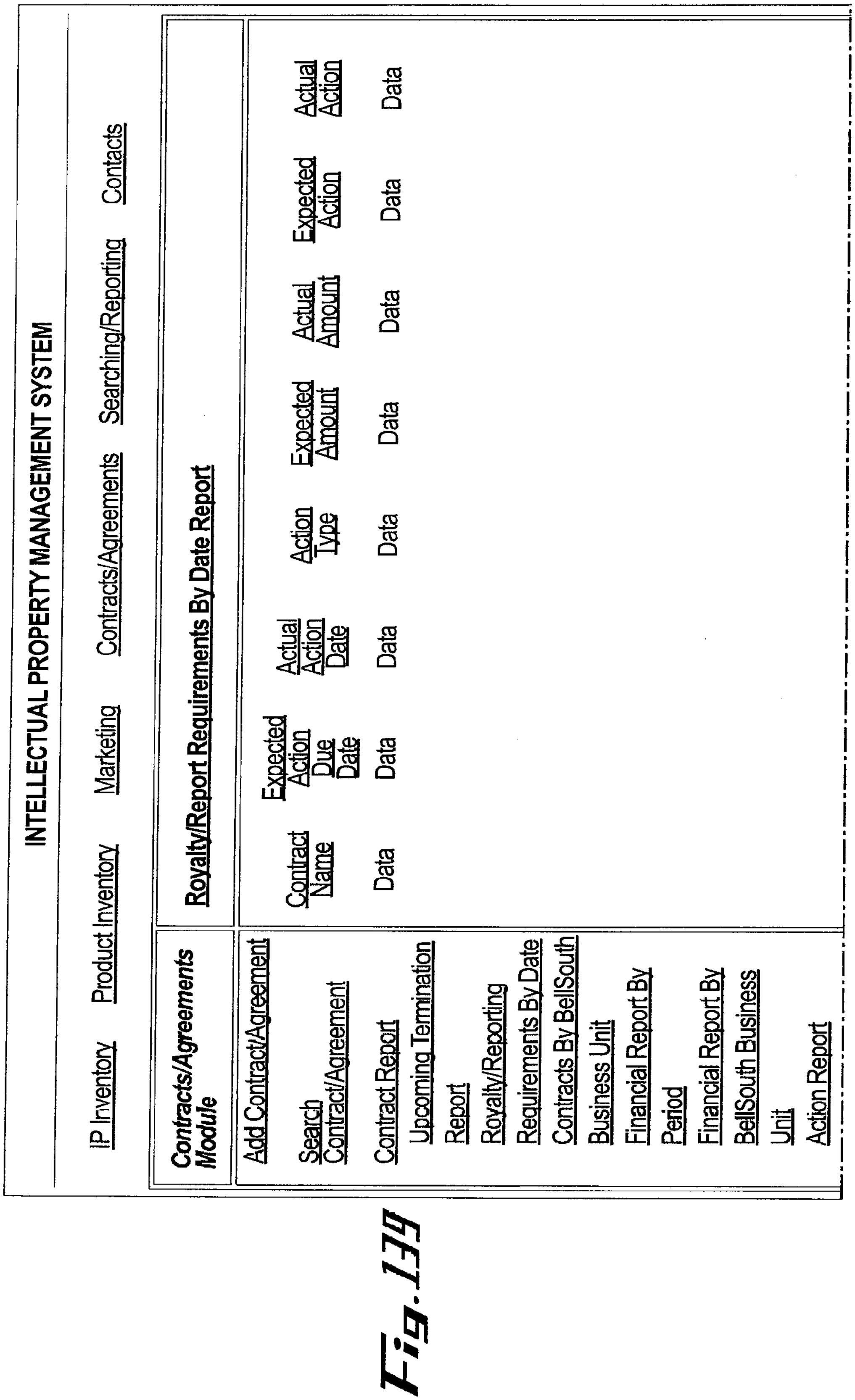

FIG. 138 shows an embodiment of a royalty/reporting requirements by date report GUI component that can allow a user to specify information for generation of a royalty/reporting requirements by date report. For example, a user can specify an agreement type and a period covered by the report. FIG. 139 shows an embodiment of royalty/reporting requirements by date report results GUI component that can display information corresponding to each contract/agreement data record satisfying the specified report criteria such as: contract name, expected action due date, and actual action due date, action type, expected amount, actual amount, expected action, and actual action. A more detailed view of a contract/agreement data record can be generated by clicking on information corresponding to a contract/agreement data record that is displayed by the royalty/reporting requirements by date report results GUI component illustrated in FIG. 139.

Figure 140:
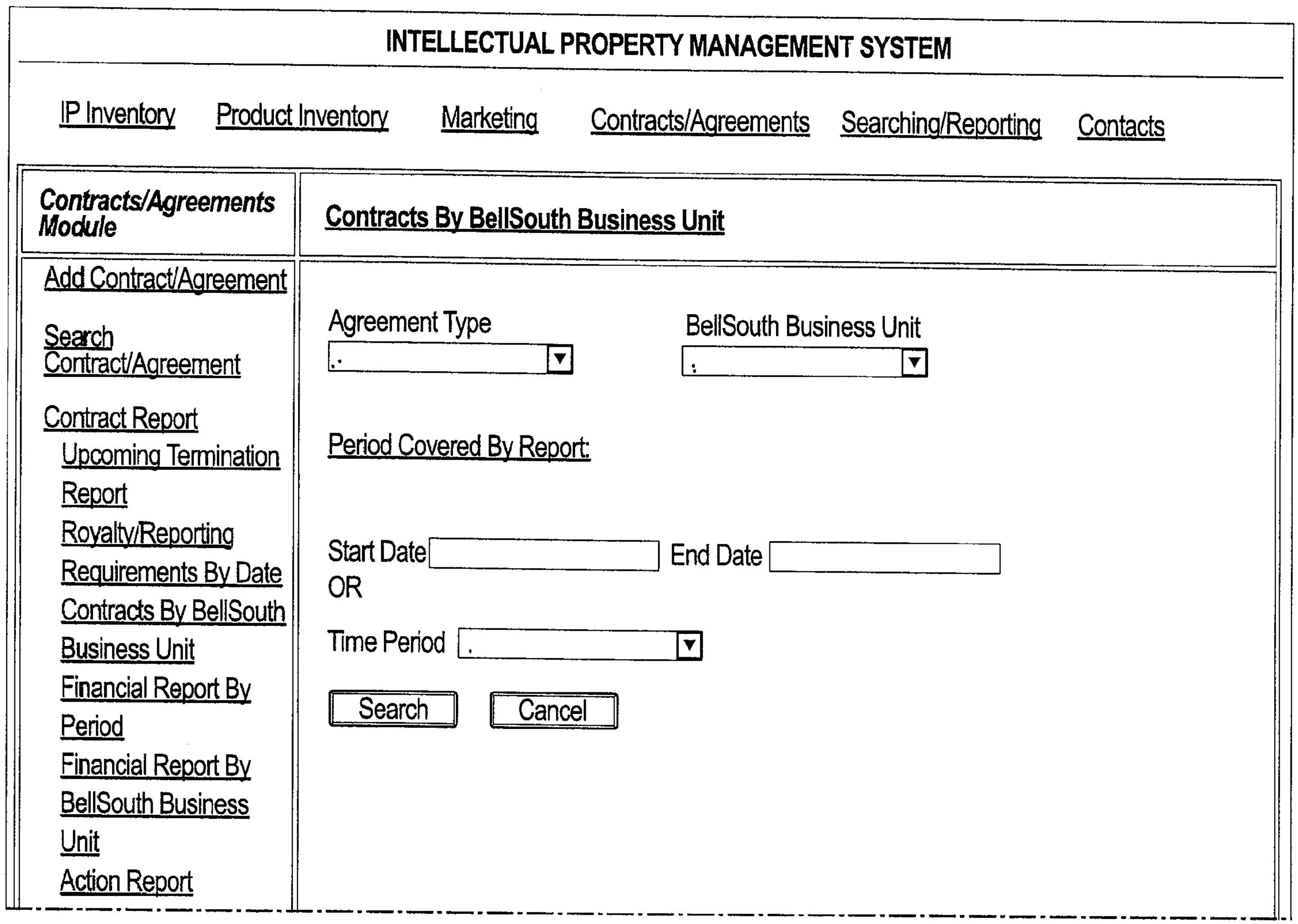
Figure 141:
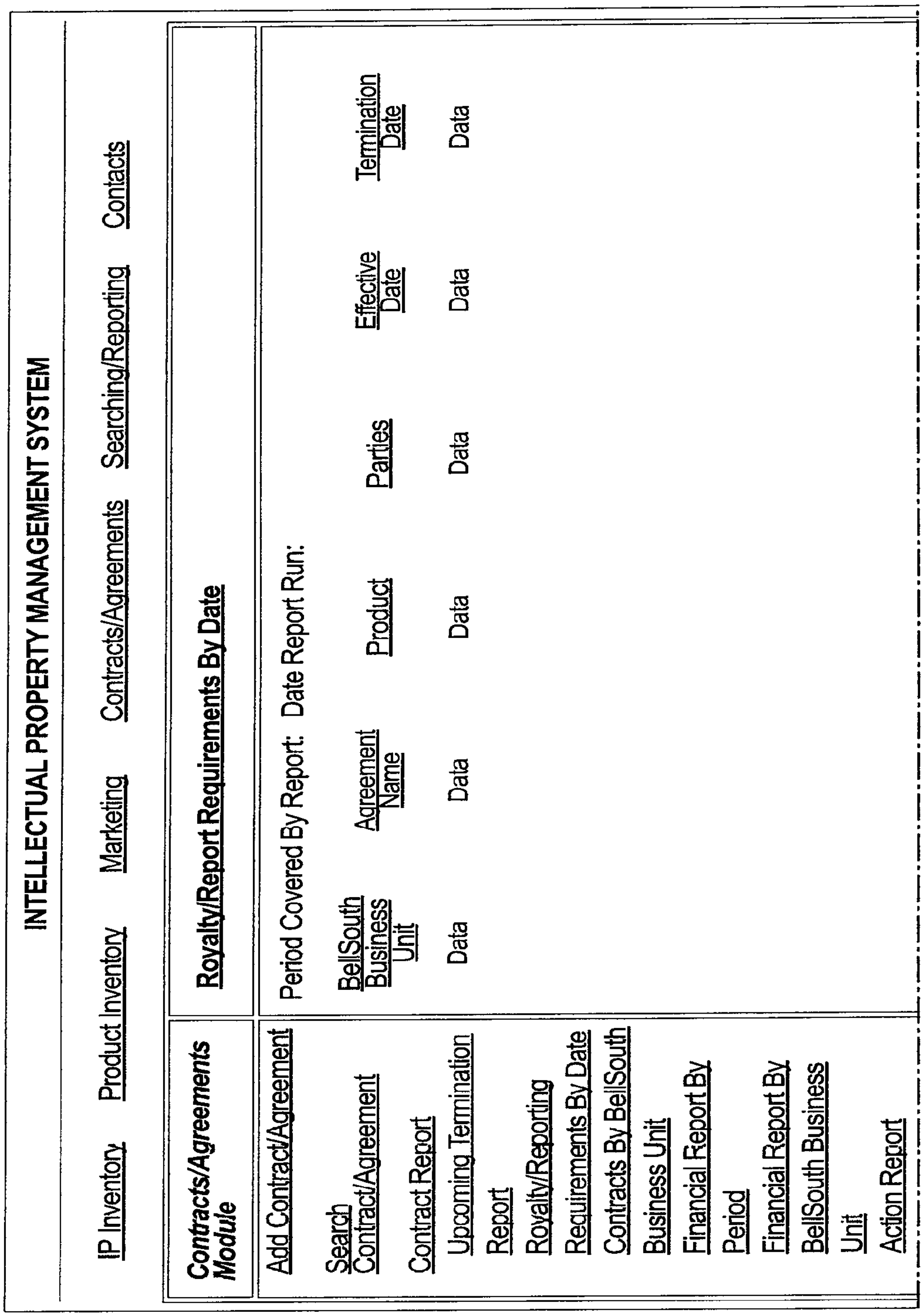

FIG. 140 is an illustration of an embodiment of a contracts by company business unit report GUI component. A user can specify report criteria for generating a report of contracts by company business units such as agreement type, company business unit, and a period covered by the report. FIG. 141 shows a GUI component to display the results of a report of contracts by company business unit. A report of contracts by company business unit results GUI component can display the period covered by the report and the date the report was run. Information relating to each contract/agreement data record satisfying the report criteria can be displayed including information corresponding to the contract/agreement data records such as the company business unit, the agreement name, the product, the parties, the effective date, and the termination date. In an embodiment, a user can cause a more detailed view of each contract/agreement data record to be displayed by selecting and activating information corresponding to the contract/agreement data record.

Figure 142:
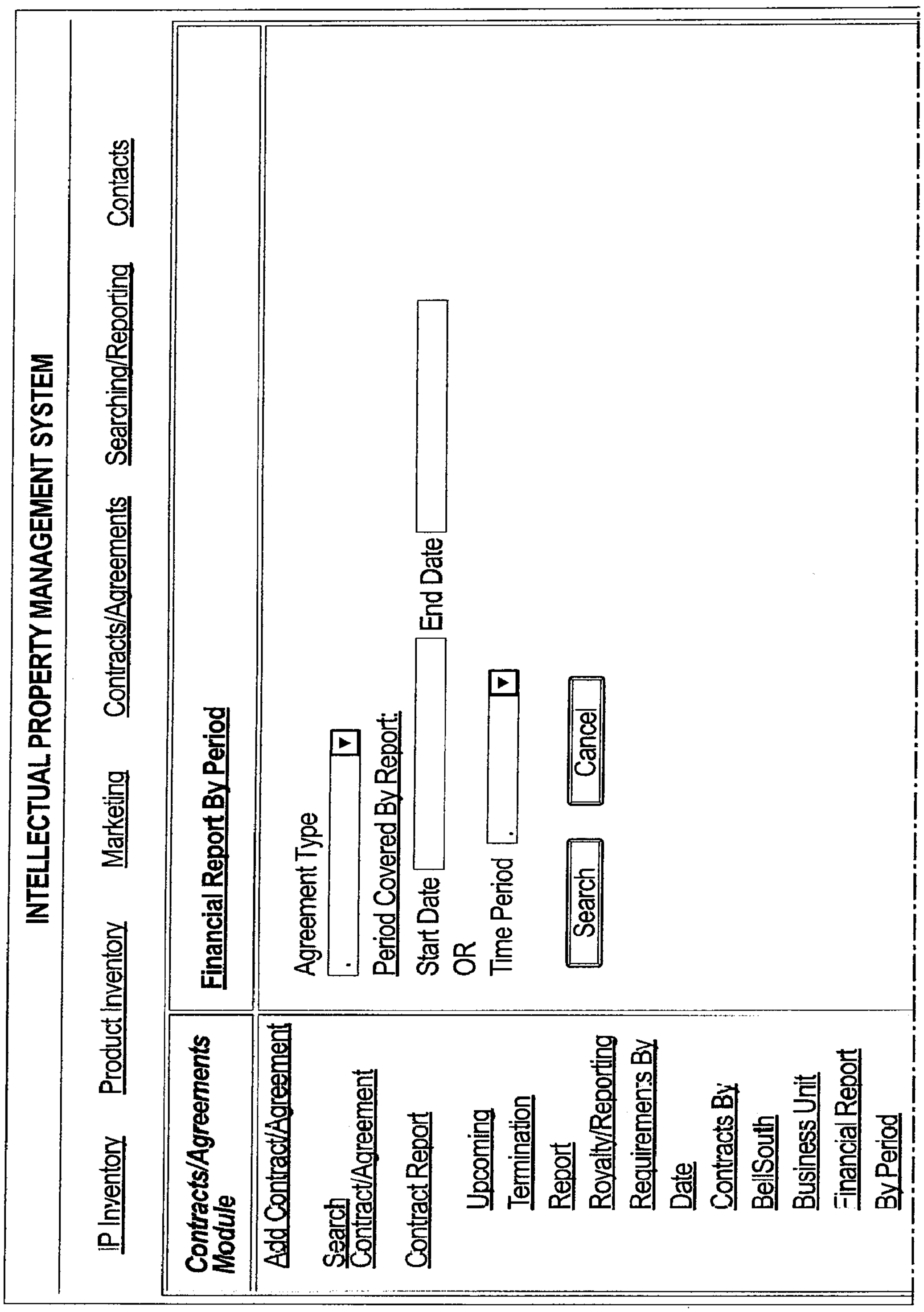
Figure 143:
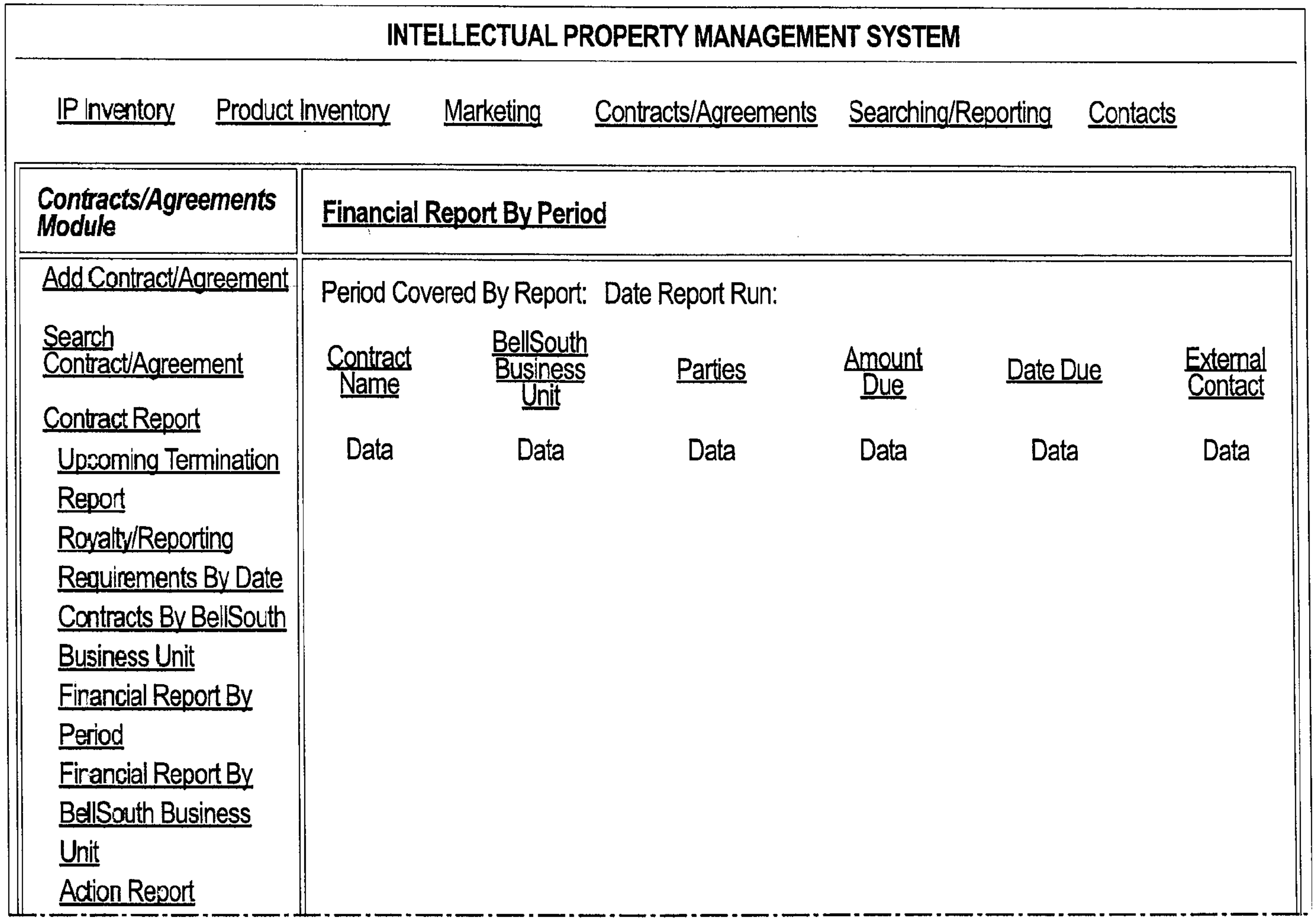

FIG. 142 shows an embodiment of a GUI component to generate a financial report by period. A user can specify the agreement type and the period to be covered by the report. FIG. 143 is an illustration of an GUI component to display the results of a financial report by period and can include a display of the period covered by the report and the date the report was run. The GUI component to display a financial report by period can include a listing of the contract/agreement data records satisfying the specified report criteria. A more detailed view of information related to a contract/agreement data record contained in the financial report by period can be displayed by selecting and activating information corresponding to the contract/agreement data record displayed in the financial report by period.

Figure 144:
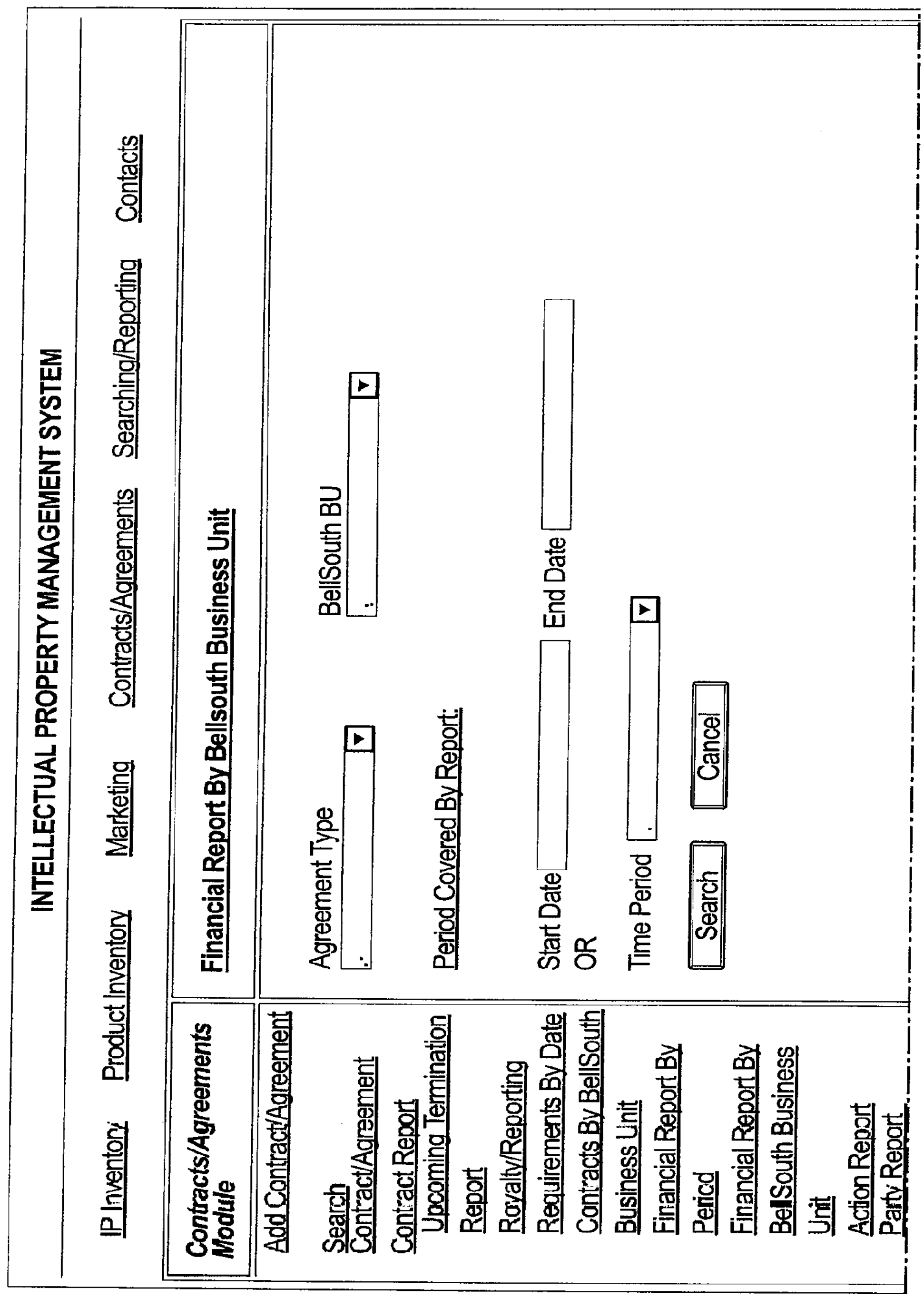
Figure 145:
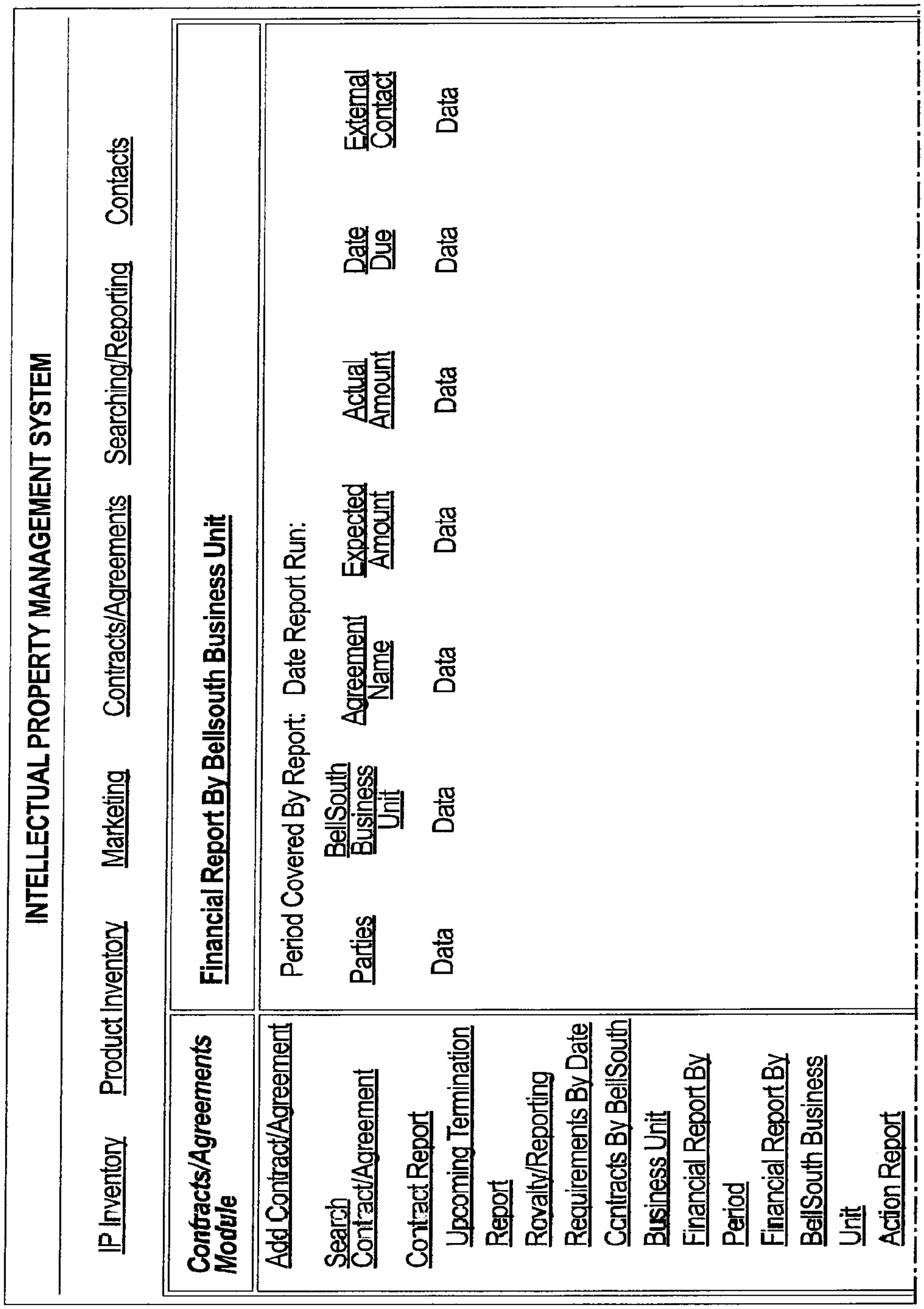

FIG. 144 is an illustration of a GUI component to generate a financial report by company business unit. A user can specify an agreement type, a company business unit, and a period to be covered by the report. FIG. 145 shows an illustration of a GUI component to display a financial report by company business unit. The financial report by company business unit display GUI component can include a listing of the contract/agreement data records corresponding to the report criteria. Information corresponding to each contract/agreement data record can include the parties, company business unit, the agreement name, the agreement name, the expected amount, the actual amount, the due date, and the external contact. In another embodiment, other information corresponding to the contract/agreement data record meeting the report criteria can be displayed. In an embodiment, a user can cause a more detailed view of a contract/agreement data record to be displayed by selecting and activating information corresponding to the contract/agreement data record as displayed by the GUI component to display the financial report by company business unit illustrated in FIG. 145.

Figure 146:
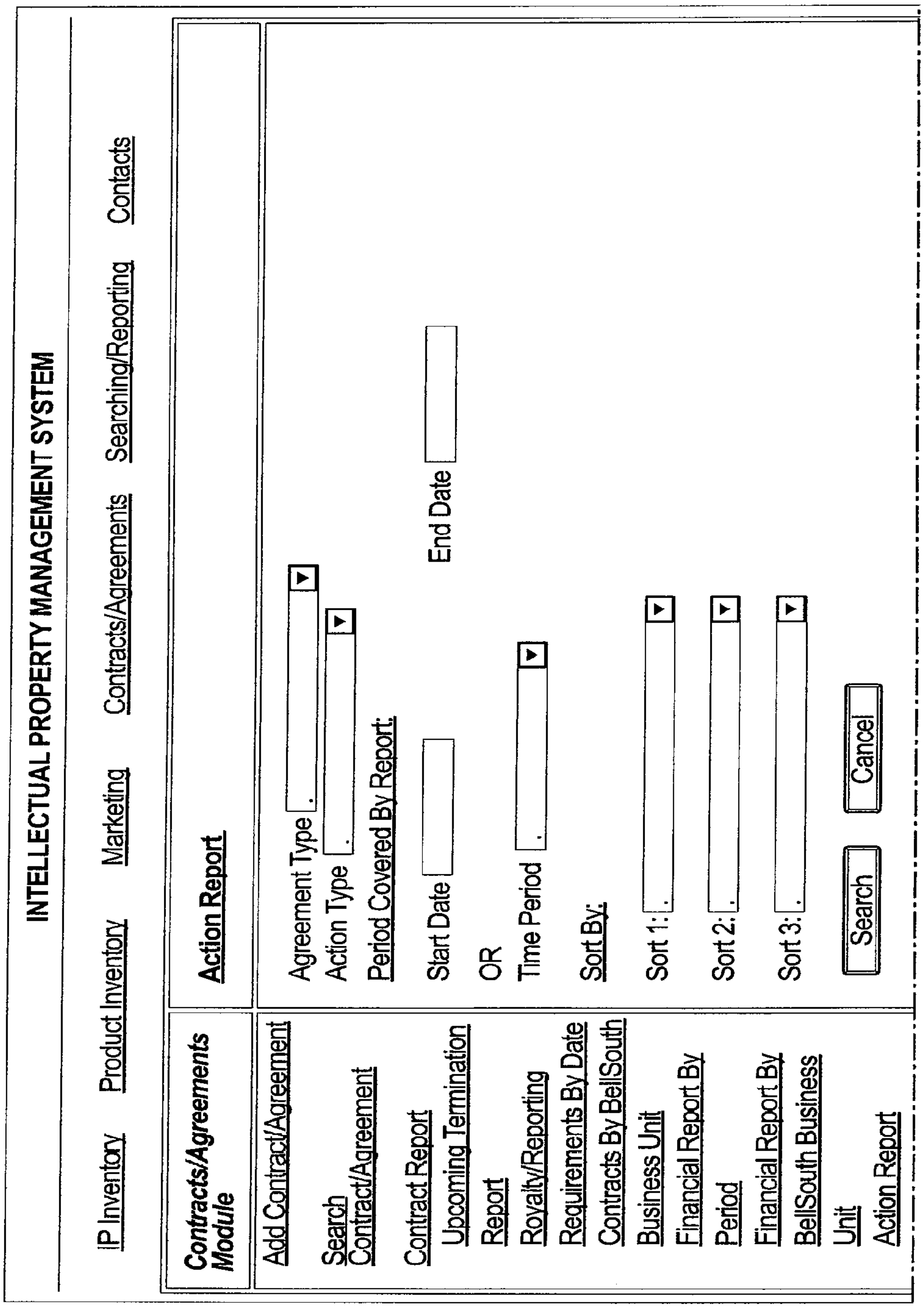
Figure 147:
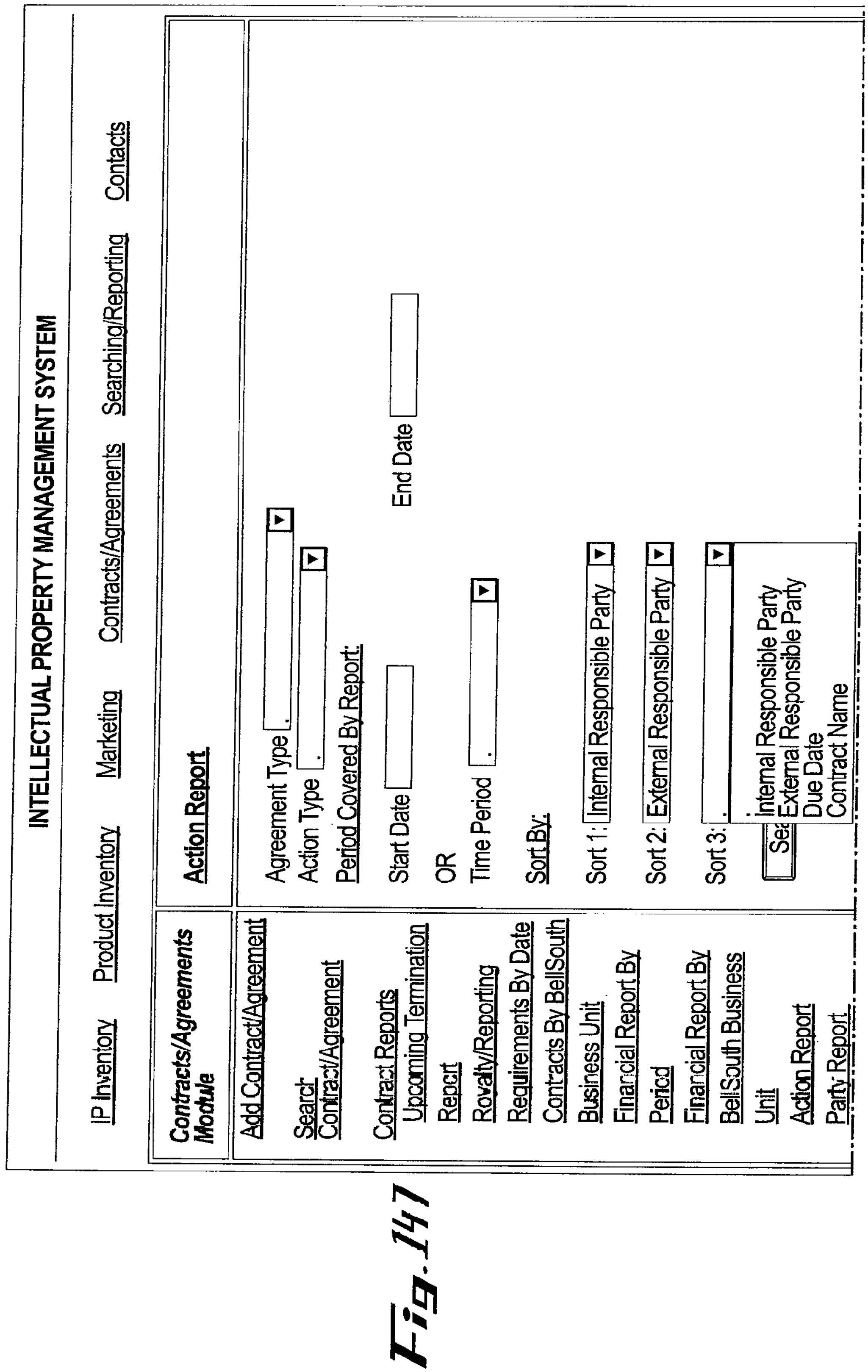
Figure 148:
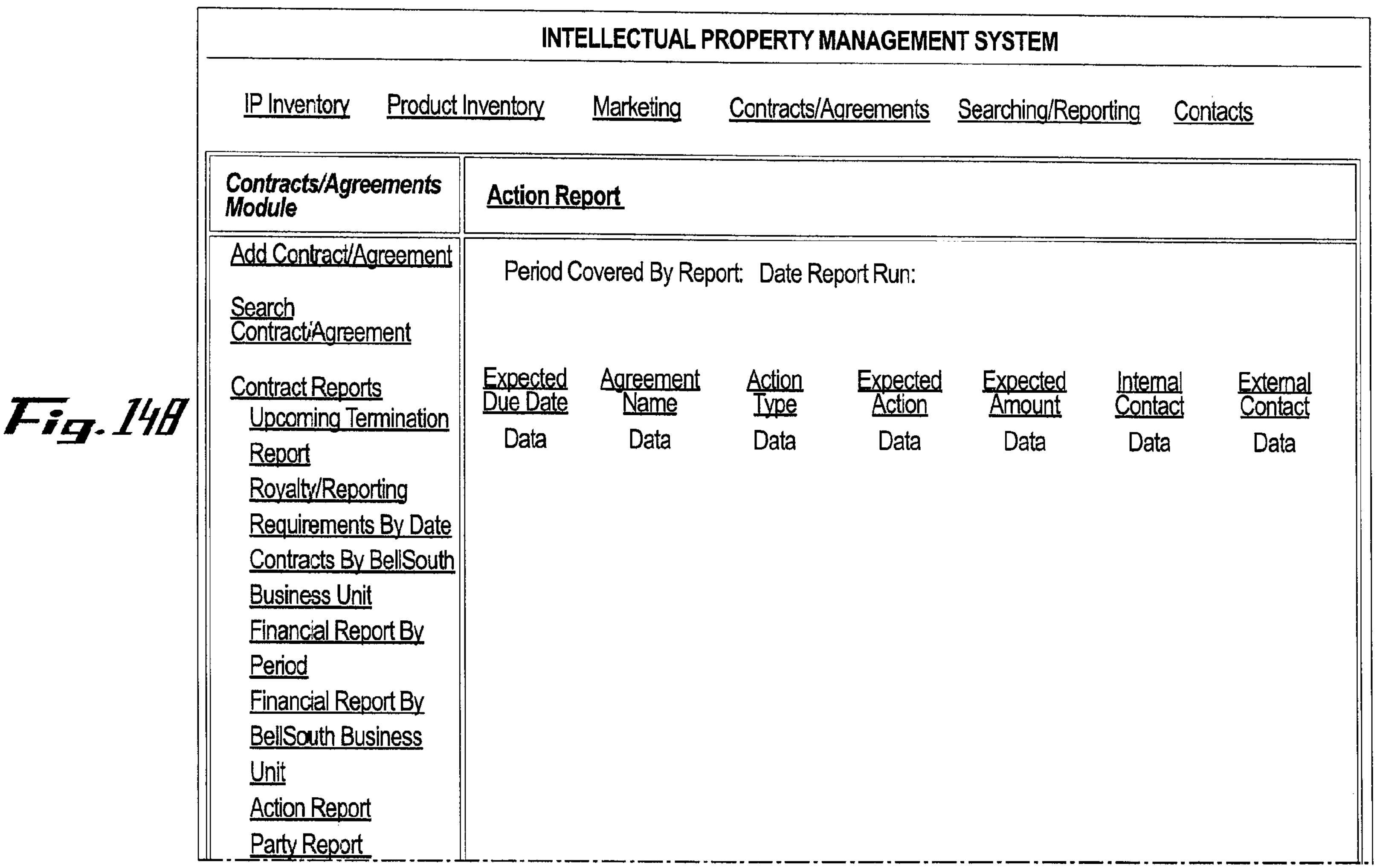

FIG. 146 is an illustration of a GUI component to generate an action report. A user can specify action report criteria such as agreement type, action type, a period covered by the report, and sort criteria. For example, FIG. 147 is an illustration of the GUI component to generate an action report including sort criteria that can be specified by a user via a drop-down menu. The sort criteria can include an internal responsible party, an external responsible party, a due date, and a contract name. FIG. 148 shows an illustration of a GUI component to display a listing of contract/agreement data records meeting the specified action report criteria. Information that can be displayed can include the expected due date, agreement name, action type, expected action, expected amount, internal contact, and external contact of each contract/agreement data record meeting the specified action report criteria. A more detailed view of a contract/agreement data record meeting the specified action report criteria can be generated by a user selecting and activating information corresponding to a displayed contract/agreement data record.

Figure 149:
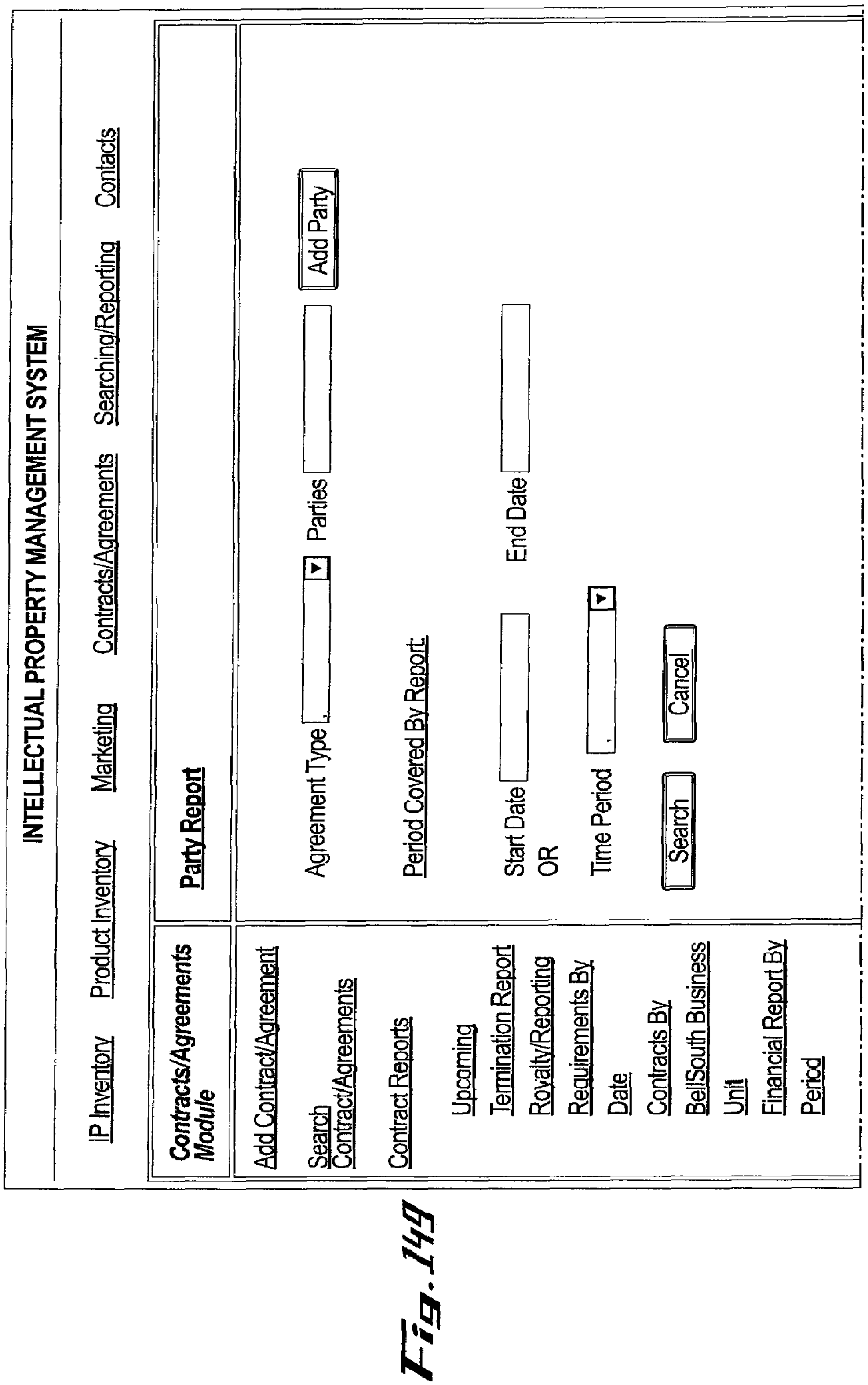
Figure 150:
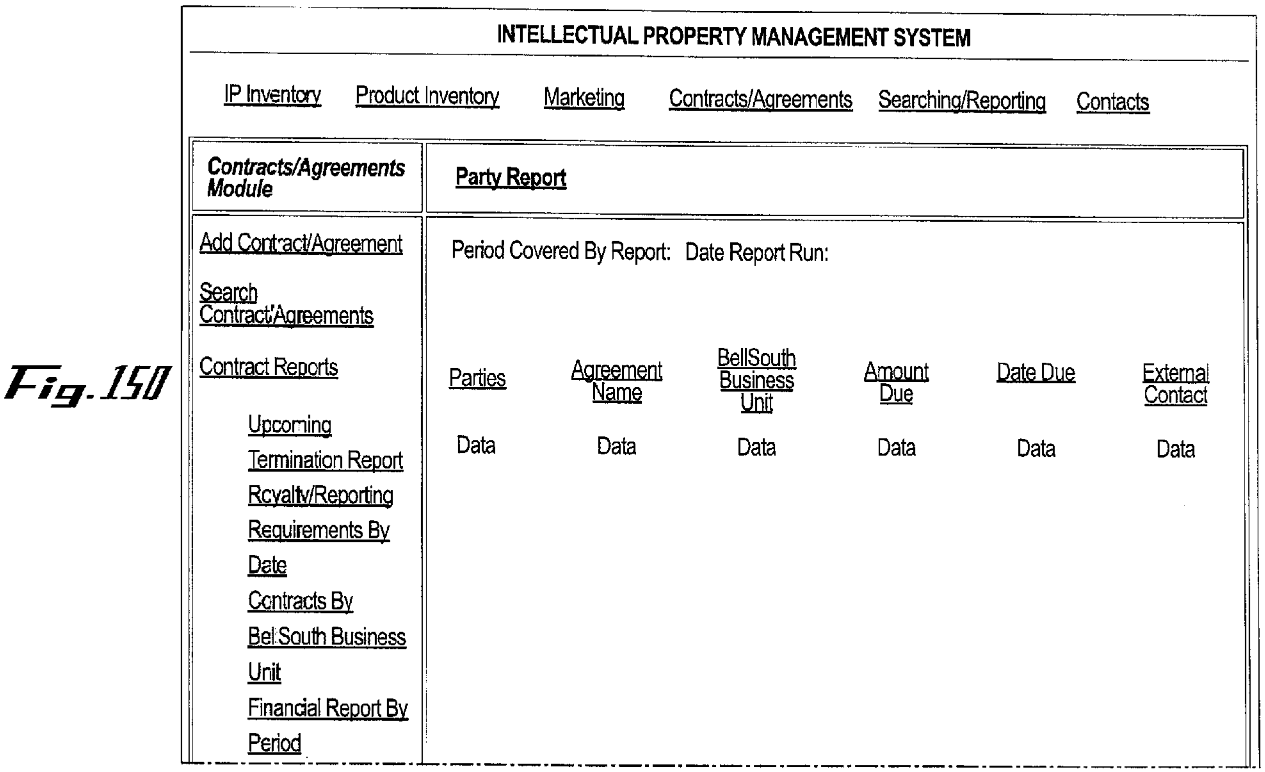

FIG. 149 shows a GUI component to generate a party report. A user can specify report criteria to generate the party report such as agreement type, associated parties, a period covered by the report. FIG. 150 shows an illustration of a GUI component to display a listing of contract/agreement data records that satisfied specified party report criteria. The GUI component to display the party report illustrated in FIG. 150 can include a display of the period covered by the report and the date the report was run. In an embodiment, for each contract/agreement data record meeting the party report criteria, information corresponding to each contract/agreement data record can be displayed such as parties, agreement name, company business unit, amount due, due date, and external contact.

Searching/Reporting Module

FIGS. 151-156 are illustrations of an embodiment of a searching/reporting top-level module and its submodule components. The searching/reporting top-level module allows a user to access report generation modules of other top-level modules. The searching/reporting module thereby allows a user to generate and view various reports from a common access point.

Figure 151:
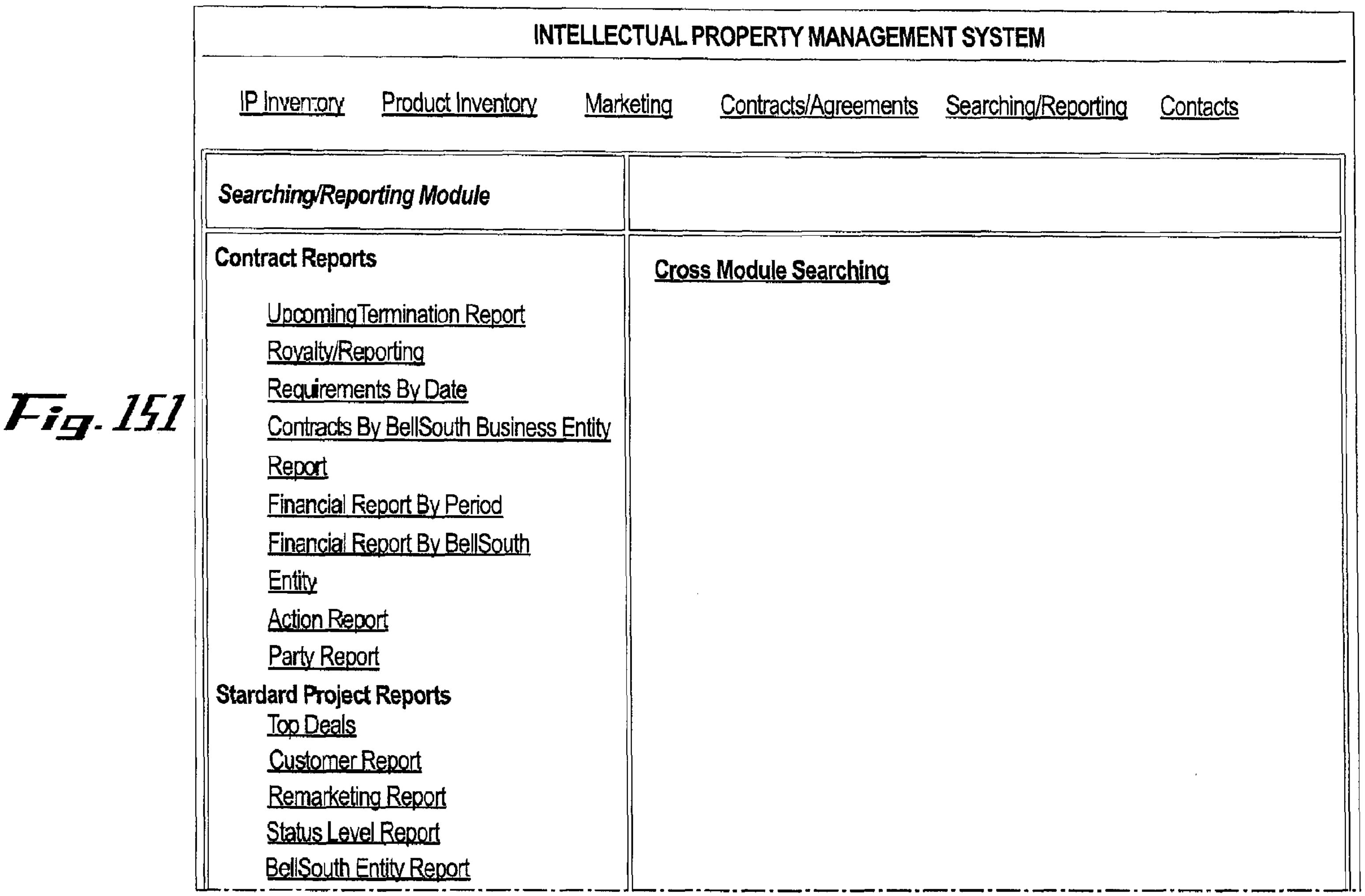

FIG. 151 is an illustration of an embodiment of a searching/reporting top-level GUI component. The searching/reporting top-level GUI component can include a plurality of links to report generation modules of other top-level modules of the IP management system. For example, the searching/reporting top-level GUI component can include links to report modules of the contract/agreements top-level module and links to report generation modules of the marketing top-level module. In particular, the searching/reporting top-level GUI component can include a plurality of links to the report generation submodules of the contract/agreements top-level module such as a link to the upcoming termination report submodule, a link to the royalty/reporting requirements by date submodule, a link to the contracts by company entity report submodule; a link to the financial report by period submodule; a link to the financial report by company entity submodule; a link to the action report submodule; and a link to the party report submodule. The searching/reporting top-level GUI component can also include a plurality of links to the report generation submodules of the marketing top-level module such as a link to the top deals submodule, a link to the customer report submodule, a link to the re-marketing report submodule, a link to the status level report submodule, and a link to a company entity report submodule.

When a user selects and activates the link to the upcoming termination report module displayed by the searching/reporting top-level GUI component, the GUI component to generate the upcoming termination report illustrated in FIG. 134 can be displayed to the user. When a user selects and activates a link to the royalty/reporting requirements by date module displayed by the searching/reporting top-level GUI component, the GUI component to generate a royalty/reporting requirements by date report illustrated in FIG. 138 can be displayed to the user. When a user selects and activates the link to the contracts by company entity report module displayed by the searching/reporting top-level GUI component, the GUI component to generate a report of contracts by company business unit illustrated in FIG. 140 can be displayed to the user. When a user selects and activates the link to the financial report by period module displayed by the searching/reporting top-level GUI component, the GUI component to generate a financial report by period illustrated in FIG. 142 can be displayed to the user. When a user selects and activates the link to the financial report by company entity module displayed by the searching/reporting top-level GUI component, the GUI component to generate a financial report by company business unit illustrated in FIG. 144 can be displayed to the user. When a user selects and activates the link to the action report module displayed by the searching/reporting top-level GUI component, the GUI component to generate an action report illustrated by FIG. 146 can be displayed to the user. When a user selects and activates the link to the party report module displayed by the searching/reporting top-level GUI component, the GUI component to generate a party report illustrated in FIG. 149 can be displayed to a user.

The searching/reporting top-level GUI component also allows a user to generate reports from the marketing top-level module. For example, when a user selects and activates the link to the top deals module displayed by the searching/reporting top-level GUI component, the GUI component to display the top deals report illustrated in FIG. 102 is displayed to the user. When a user selects and activates the link to the customer report module displayed by the searching/reporting top-level GUI component, the GUI component to generate a customer report illustrated by FIG. 103 can be displayed to the user. When a user selects and activates the link to the remarketing report module displayed by the searching/reporting top-level GUI component, the GUI component to generate a remarketing partner report illustrated in FIG. 104 can be displayed to the user. When a user selects and activates a link to the status level report module displayed by the searching/reporting top-level GUI component, the GUI component to generate a status level report illustrated in FIG. 106 can be displayed to the user. When a user selects and activates the link to the company entity report module displayed by the searching/reporting top-level GUI component, the GUI component to generate a company business unit and/or entity report illustrated in FIG. 109 can be displayed to the user.

Figure 152:
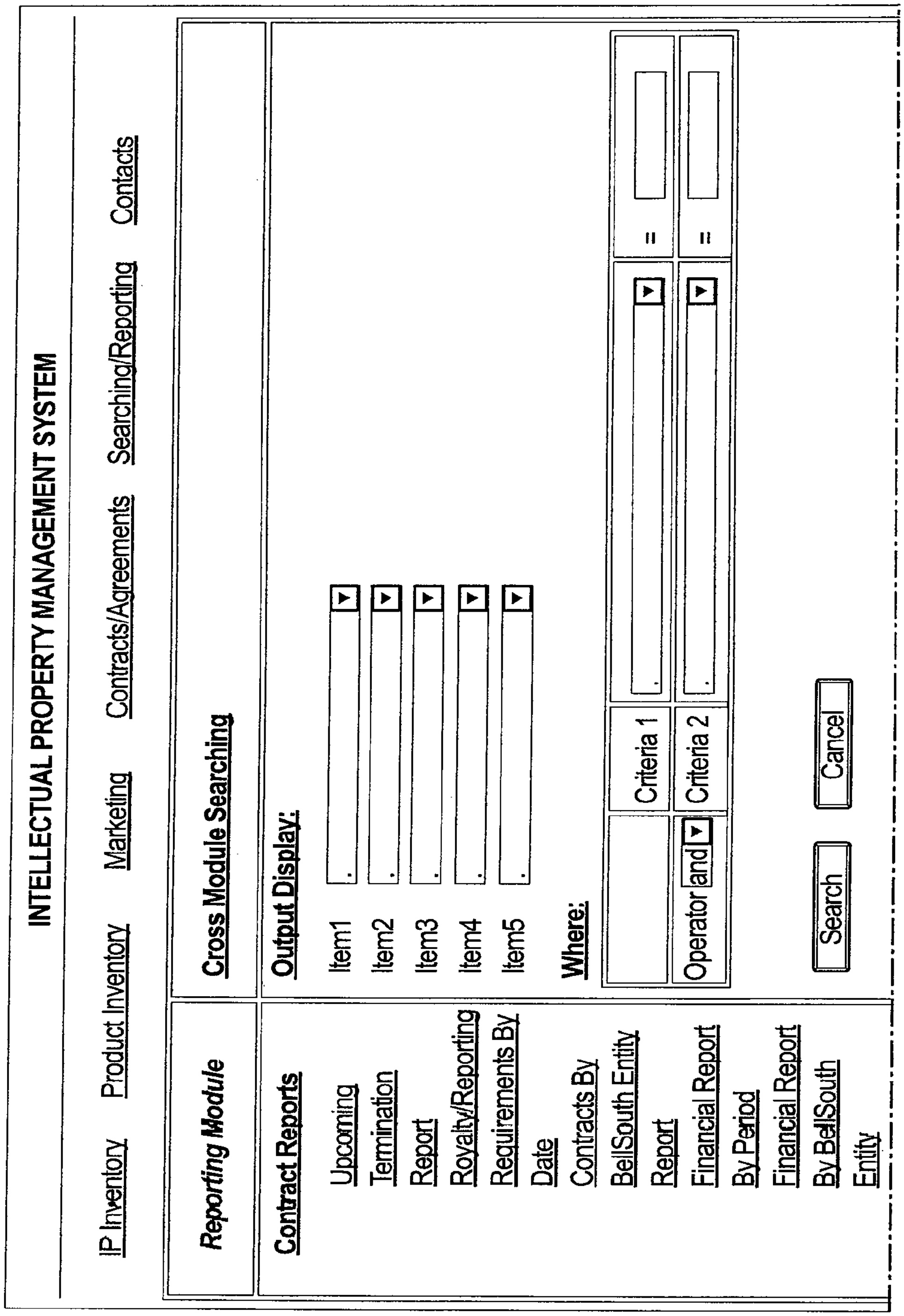
Figure 153:
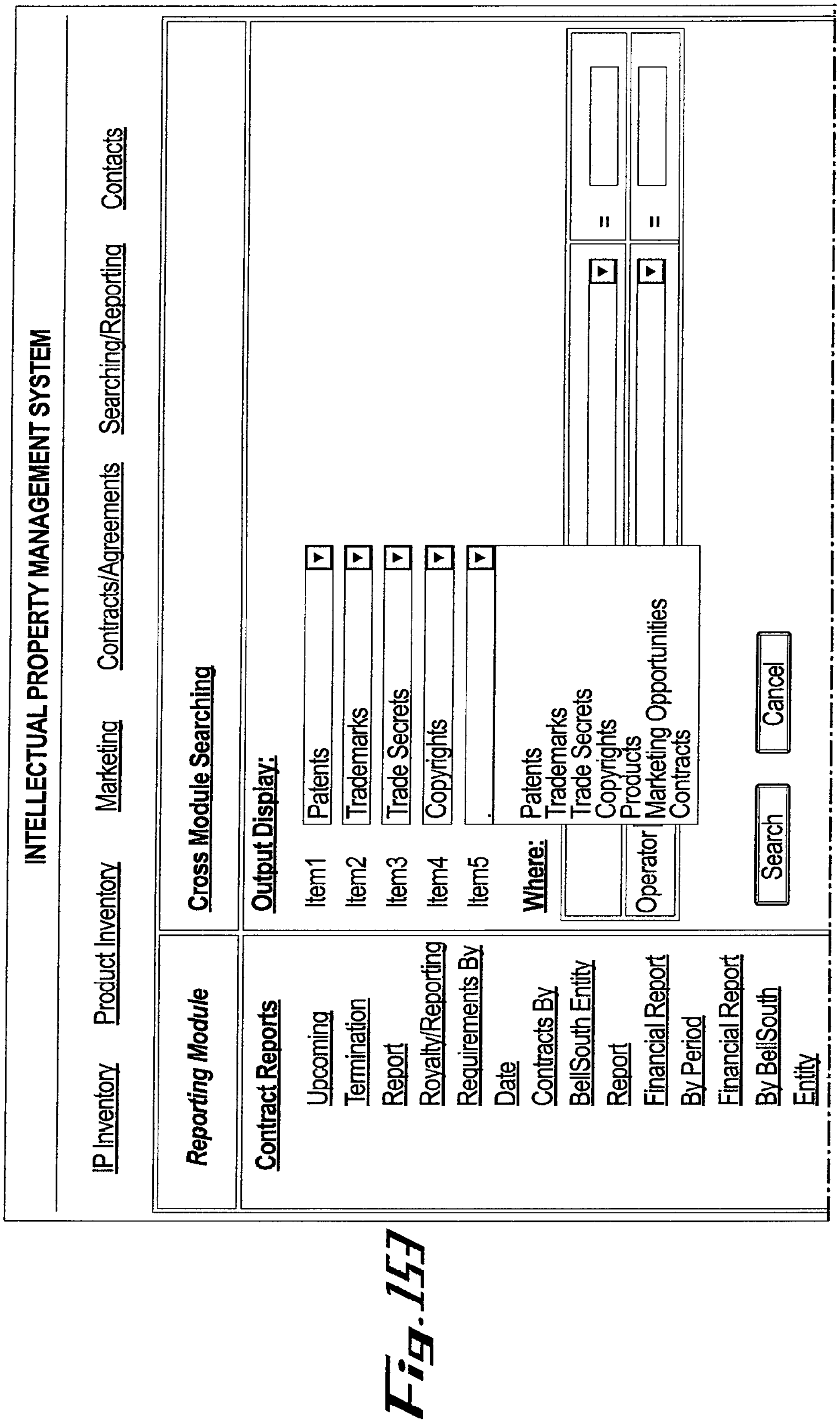
Figure 154:
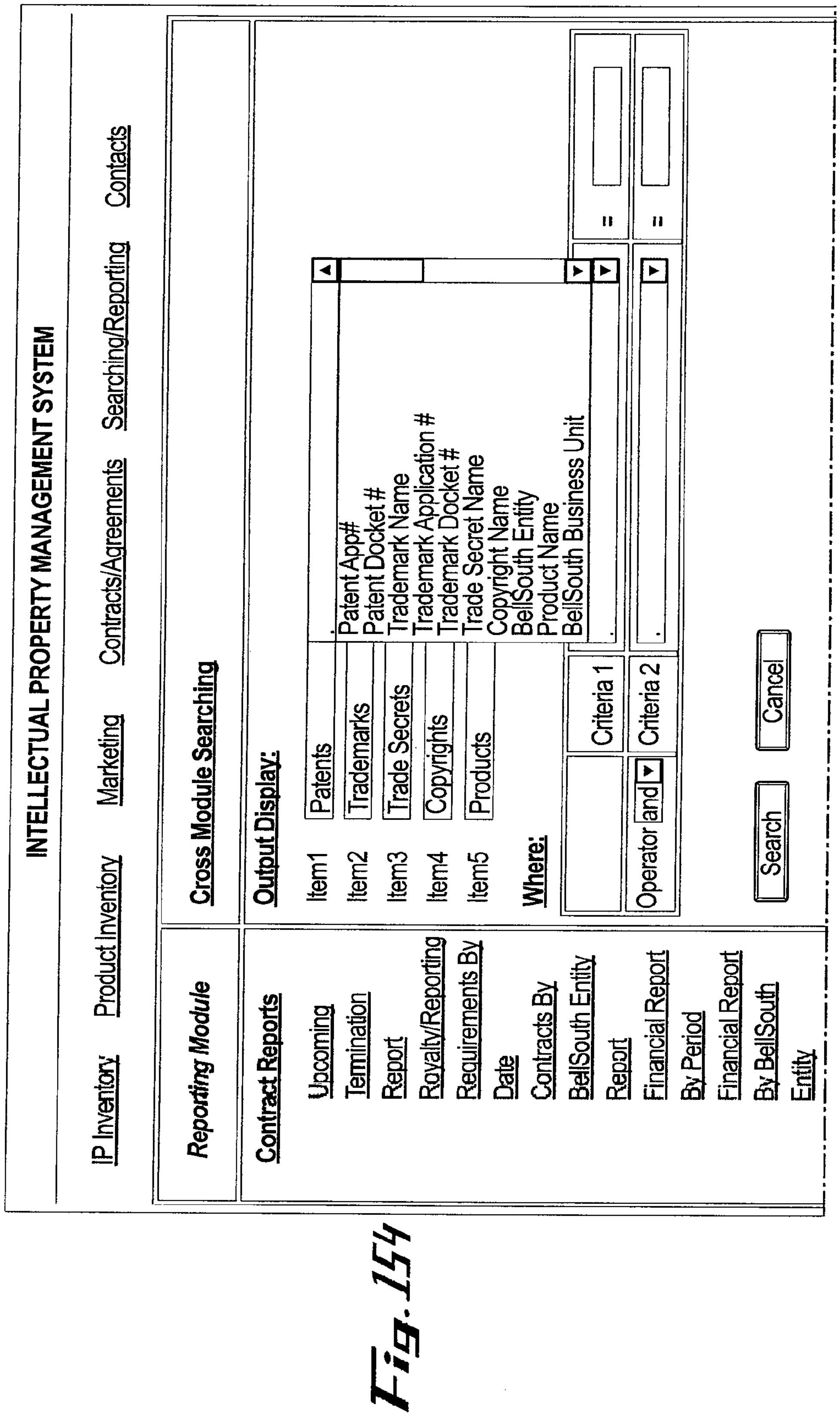
Figure 155:
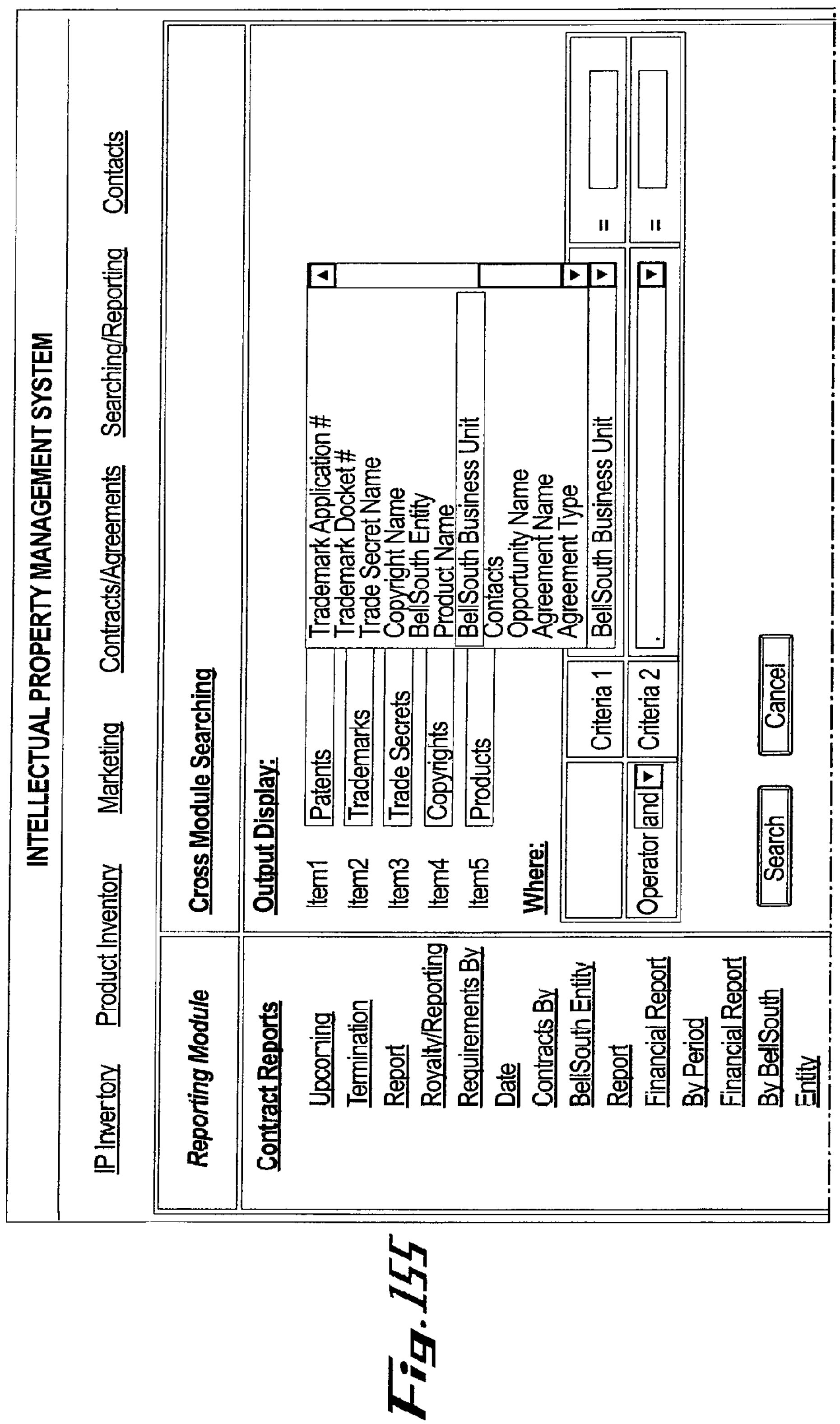

The searching/reporting top-level GUI component illustrated in FIG. 151 also include a link to a module to perform cross-module searching. FIG. 152 illustrates an embodiment of a cross-module searching GUI component that allows a user to direct cross-module searching. In an embodiment, a user can enter and/or specify one or more criteria to control the output display of the cross-module searching module. For example, in the embodiment illustrated in FIG. 152, up to five items can be specified. FIG. 153 is an illustration of the cross-module searching GUI component where a drop-down menu allows selection of items for the output display. The items for the output display can be data records relating to patents, trademarks, trade secrets, copyrights, products, marketing opportunities, and contracts. In another embodiment, additional and/or other data records can be specified as items for output display. FIG. 154 shows an embodiment where a drop-down menu can be used to specify criteria that can control, in part, the cross-module searching. For example, a user can specify that a first criterion has a certain value and that a second criterion has a second value. The relationship between the criteria can have various logical values such as and/or operations. For example, in an embodiment the first and/or second criteria can be selected from a listing of criteria such as patent application number, patent docket number, trademark name, trademark application number, trademark docket number, trade secret name, copyright name, company entity, product name, company business unit. Other criteria and/or additional criteria can be used in another embodiment. For example, FIG. 155 illustrates that additional criteria can be contacts, opportunity name, agreement name, and agreement type. After a user has selected the items for output display and any desired criteria, the user can select and activate the search button link to direct conducting of the cross-module searching based on the specified criteria. Alternatively, a user can cancel the cross-module searching operation by selecting and activating the cancel button which can clear the data fields of the cross-module searching GUI component illustrated in FIG. 155 and/or cause the display of the prior screen.

Figure 156:
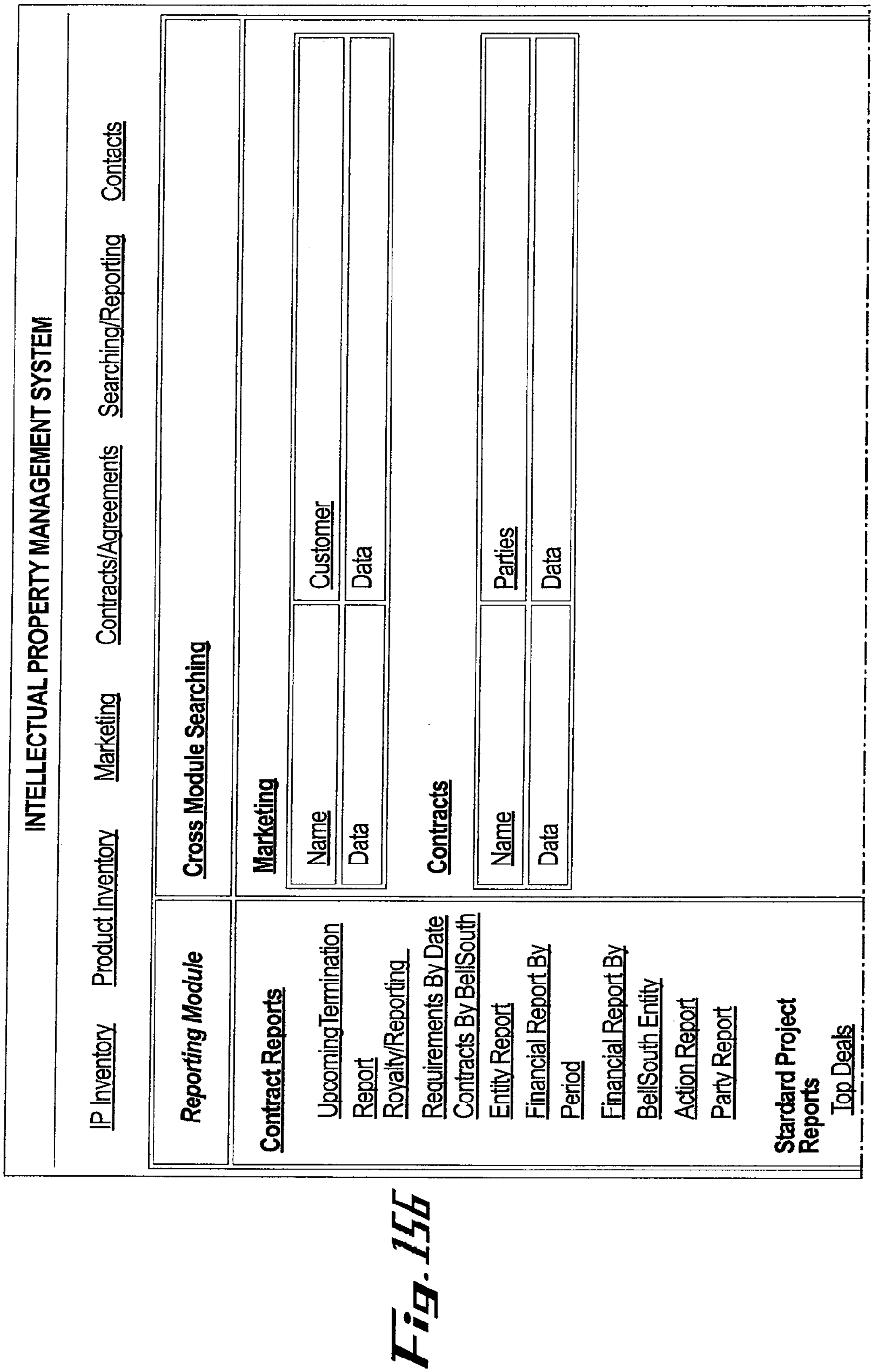

FIG. 156 shows an embodiment of a GUI component to display the results of a cross-module searching operation. For example, when a user has specified that marketing related data records and contracts related data records be the subject of a cross-module searching operation, marketing-related data records and contracts-related data records can be displayed. For example, information relating to the marketing-related data records can include the name and the customer. In another embodiment, other information corresponding to the marketing-related data records can be displayed. Also, information related to the contracts-related data records can be displayed such as the name and parties. In another embodiment, other and/or additional information corresponding to the contracts-related data records can be displayed by the GUI component to display the results of a cross-module searching operation illustrated in FIG. 156.

Contacts Module

FIGS. 157 through 165 illustrate an embodiment of a contacts top-level module of the IP management system. In an embodiment, the contacts module allows a user to view and edit a contact data record. In another embodiment, the contacts module allows a user to create contact data records.

Figure 157:
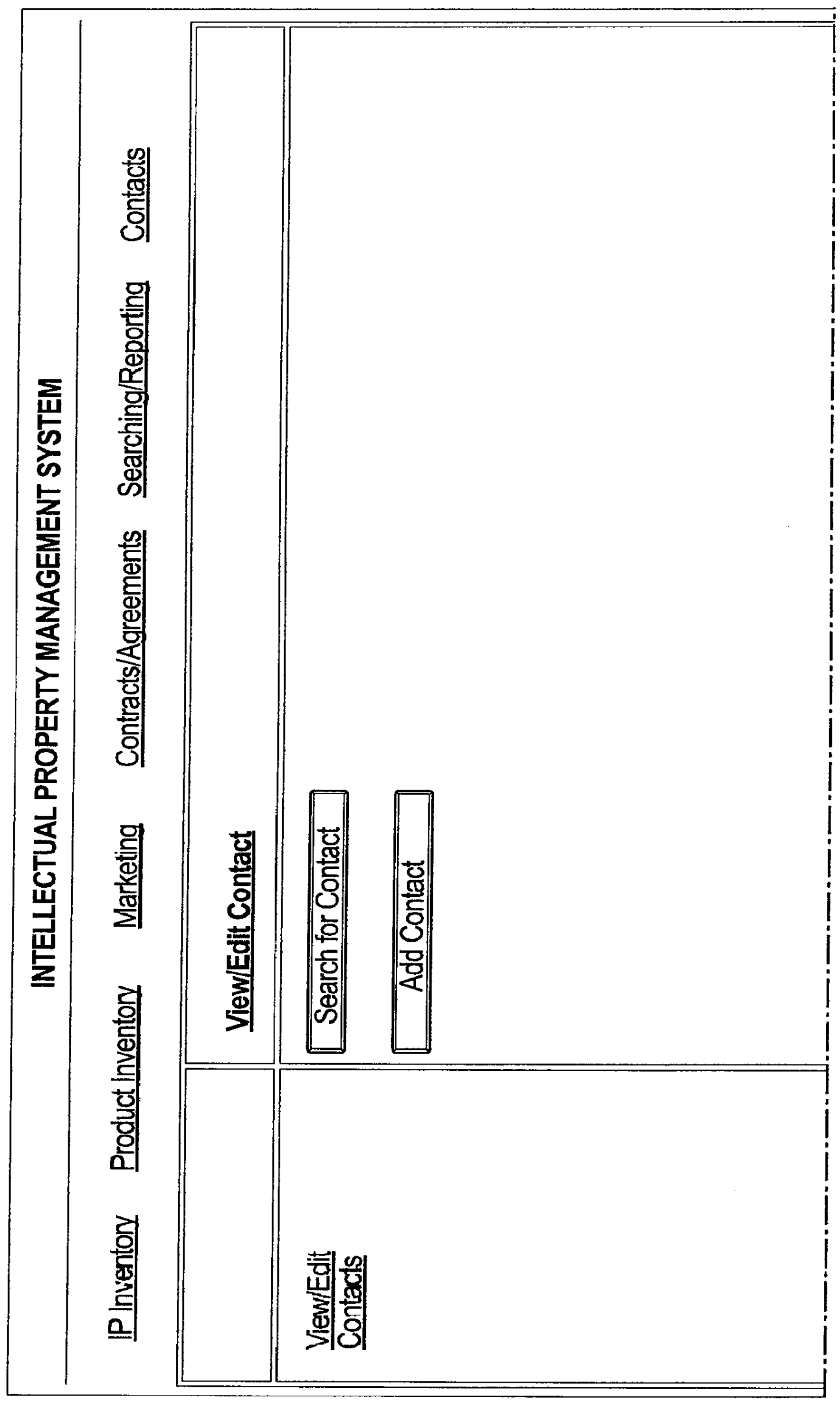

FIG. 157 shows an illustration of an embodiment of a contacts top-level GUI component. In an embodiment of the present invention, the contacts top-level GUI component can be displayed when a user selects and activates a link to the contacts top-level GUI component. In another embodiment, a link to the contacts top-level GUI component can be included in another top-level GUI component as a link to a view/edit contacts submodule. The view/edit contacts GUI component illustrated in FIG. 157 can include a button link to allow a user to search for a contact data record and/or a button link to add a contact data record.

Figure 158:
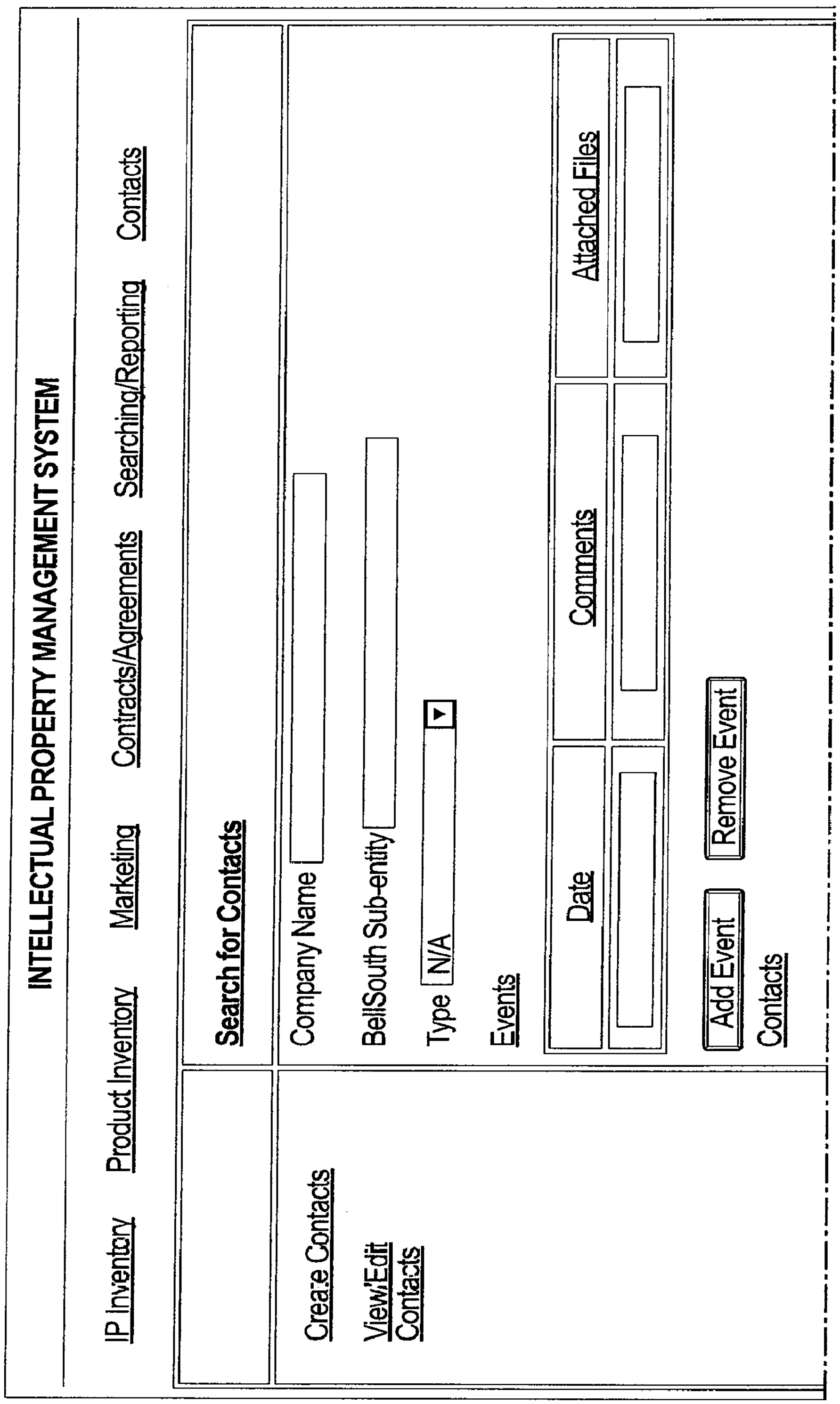
Figure 159:
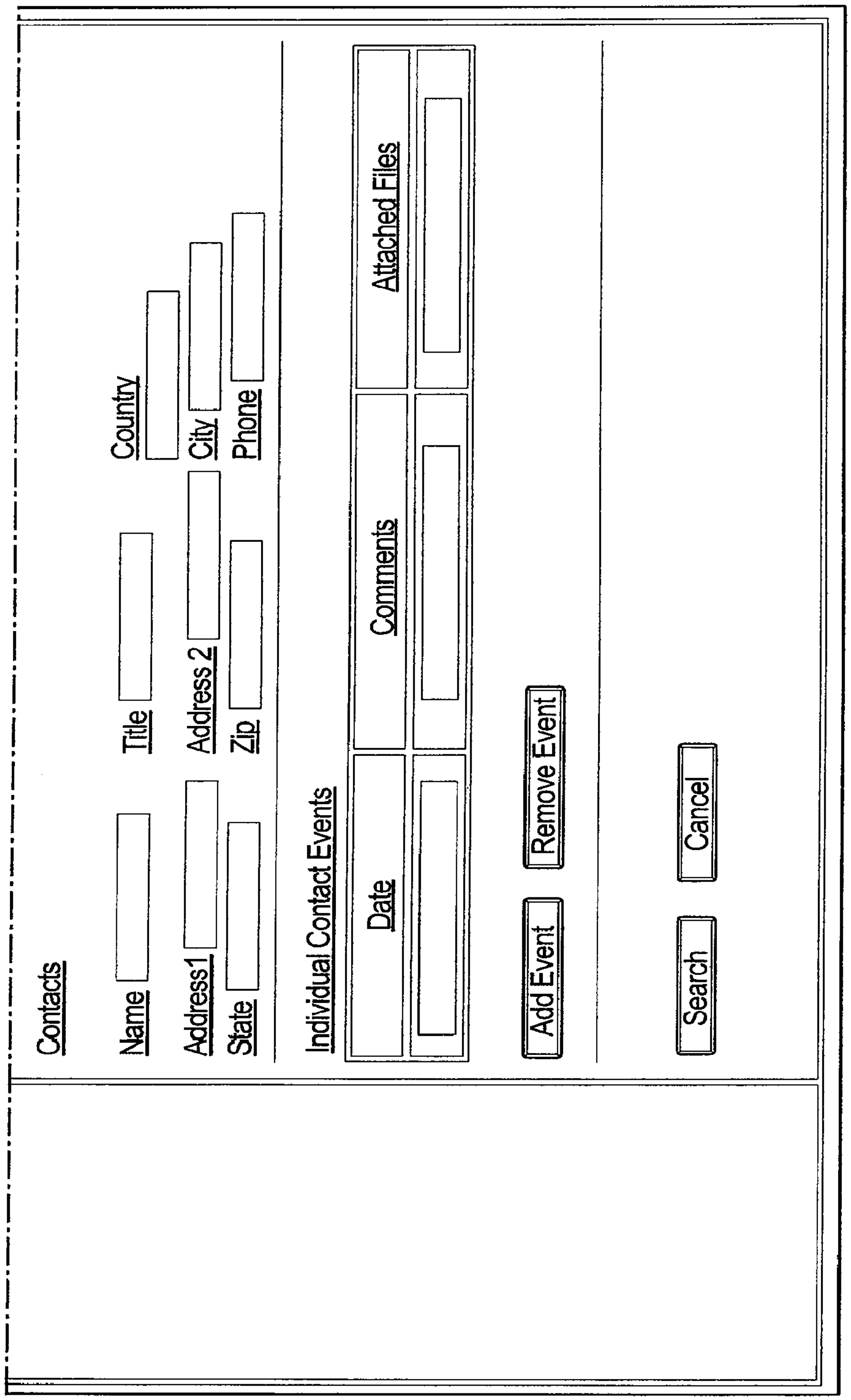

When a user selects and activates the search for contact button link displayed by the view/edit contact GUI component illustrated in FIG. 157, the search for contacts GUI component illustrated in FIGS. 158-159 can be displayed to the user. The search for contacts GUI component illustrated in FIGS. 158-159 can include data fields to allow a user to enter and/or select criteria for the search for contacts operation. For example, a user can enter and/or specify criteria related to a company name, company sub-entity, type, an associated event data record, a date of an event, a comments regarding an event, and attached files regarding an event. In an embodiment, a user can also specify information regarding a contact in order to conduct the search for contacts. For example, a user can specify contact information such as name, title, country, title, address information, city, state, zip, and phone. In addition, a user can specify information regarding an individual contact event that is associated with a contact data record including information such as an individual contact date, an individual contact comments or an attached file associated with an individual contact event. After a user has specified and/or selected search criteria, user can select and activate a search button link to direct performance of the search for contacts operation. Alternatively, the user can select and activate the cancel button link to direct canceling of the search, redisplay of the search for contacts GUI component anew, and/or causing the prior screen to be displayed.

Figure 160:
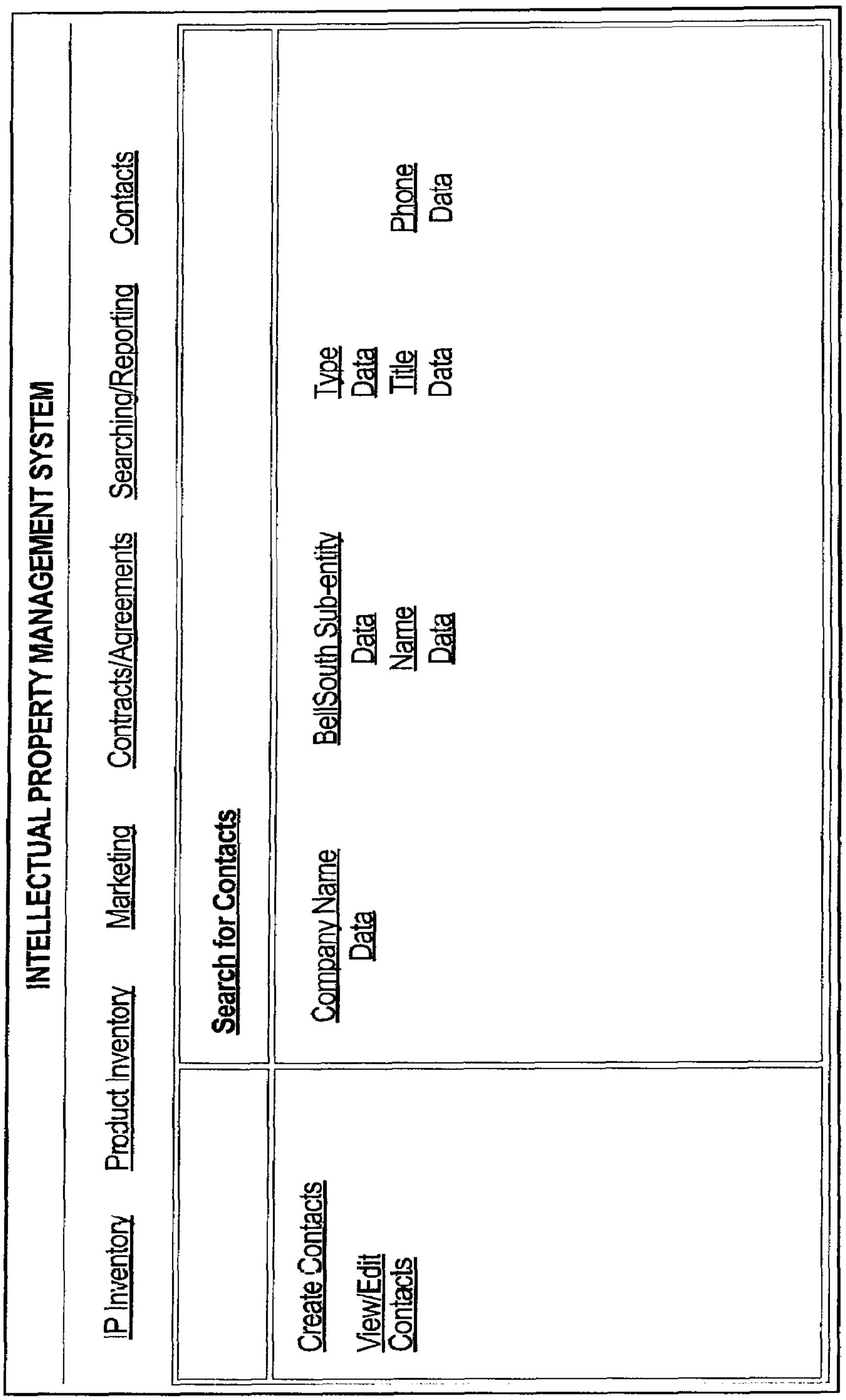

FIG. 160 is an illustration of a GUI component to display the results of a search for contacts. The GUI component to display the results of a search for contacts can include information related to the located contact data records such as company name, company sub-entity, name, type, title and phone. The GUI component to display the results of a search for contacts can display a plurality of contact data records in a series of rows. A user can cause a more detailed view of information corresponding to a contact data record to be displayed by selecting and activating information corresponding to that contact data record. For example, contact data records can be of at least two different types. A contact can be a company contact in one embodiment. In addition, a company contact may be related to a plurality of individual contacts within that company contact. Accordingly, when the GUI component to display the results of the search for contacts illustrated in FIG. 160 displays the name of an individual contacts a user can cause the display of additional information regarding that individual contact to be displayed by selecting and activating that name or other information related to that individual contact.

Figure 161:
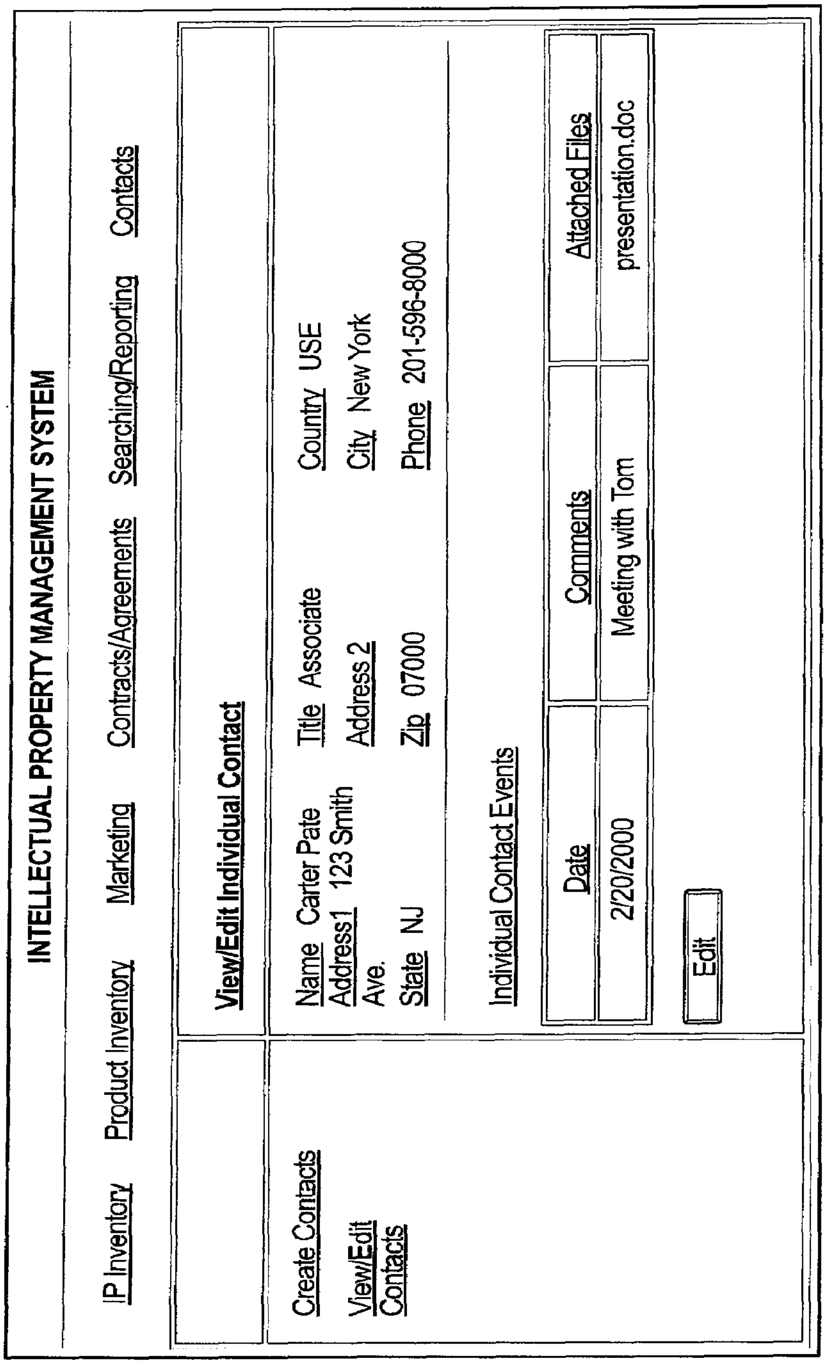
Figure 162:
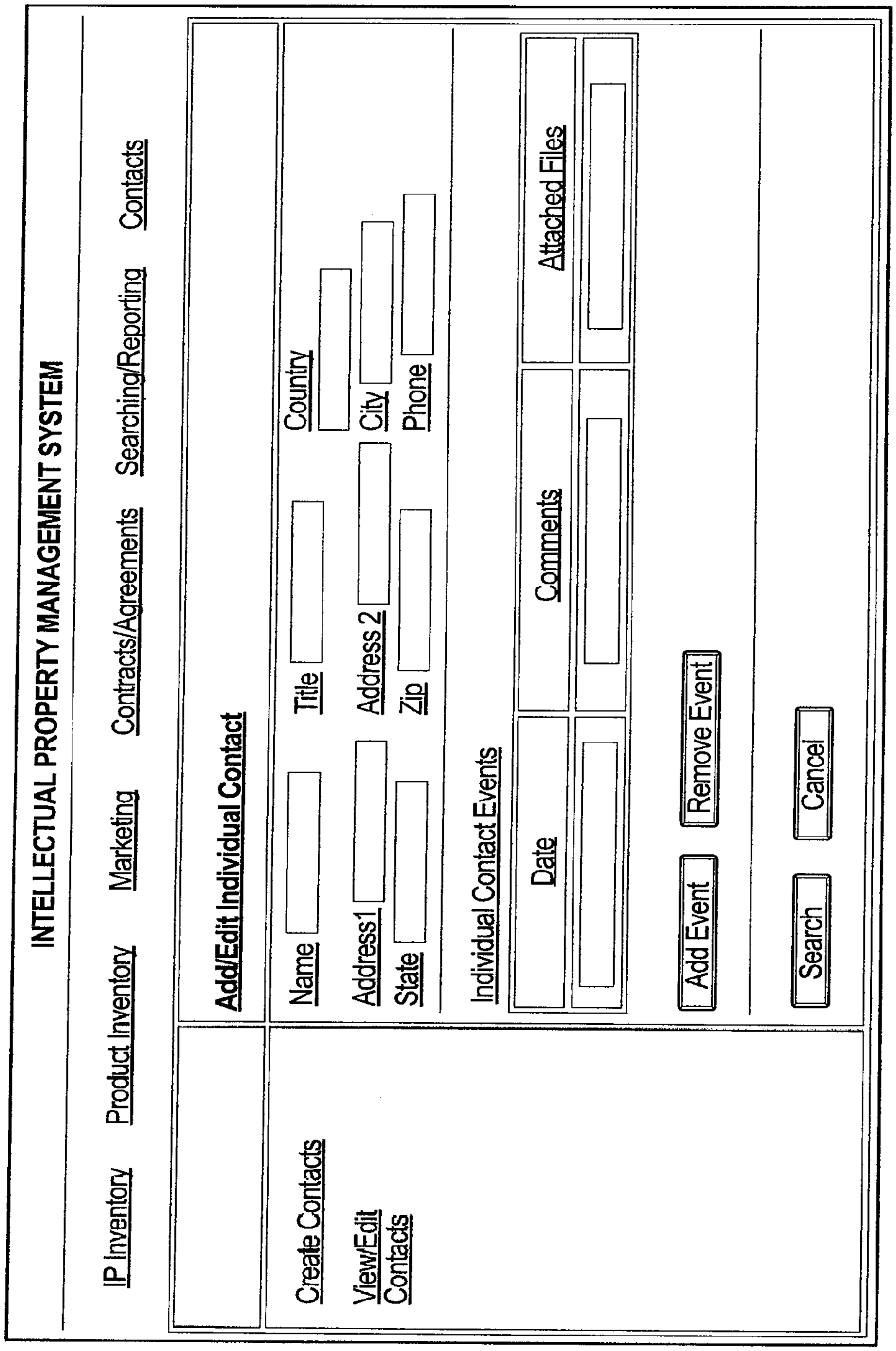

For example, FIG. 161 shows a view/edit individual contact GUI component. The view/edit individual contact GUI component can display information regarding an individual contact such as the individual's name, title, country, address, city, state, zip, phone. The view/edit individual contact GUI component can also allow for the display of information relating to events regarding that individual contact. For example, as illustrated in FIG. 161, the view/edit individual contact GUI component shows that there is an individual contact event for the date of Feb. 20, 2000, having comments of meeting with Tom and having an attached file of Presentation.doc. In an embodiment, a user can select and activate the information corresponding to the attached files to cause the display or printing or other type of interaction with the attached file. In an embodiment, the view/edit individual contact GUI component can include an edit button link to cause the display of a GUI component to allow editing of an individual contact data record. For example, FIG. 162 shows an illustration of an embodiment of an add/edit individual contact GUI component. A user can specify information regarding the individual contact using the add/edit individual contact GUI component. A user can also add individual contact event data records relating to the individual contact. When a user has added an individual contact event data record as being associated with the individual contact data record, the date, comments and any attached files regarding that individual contact event can be displayed. Likewise, a user can edit an individual contact data record by removing an associated individual contact event data record.

Figure 163:
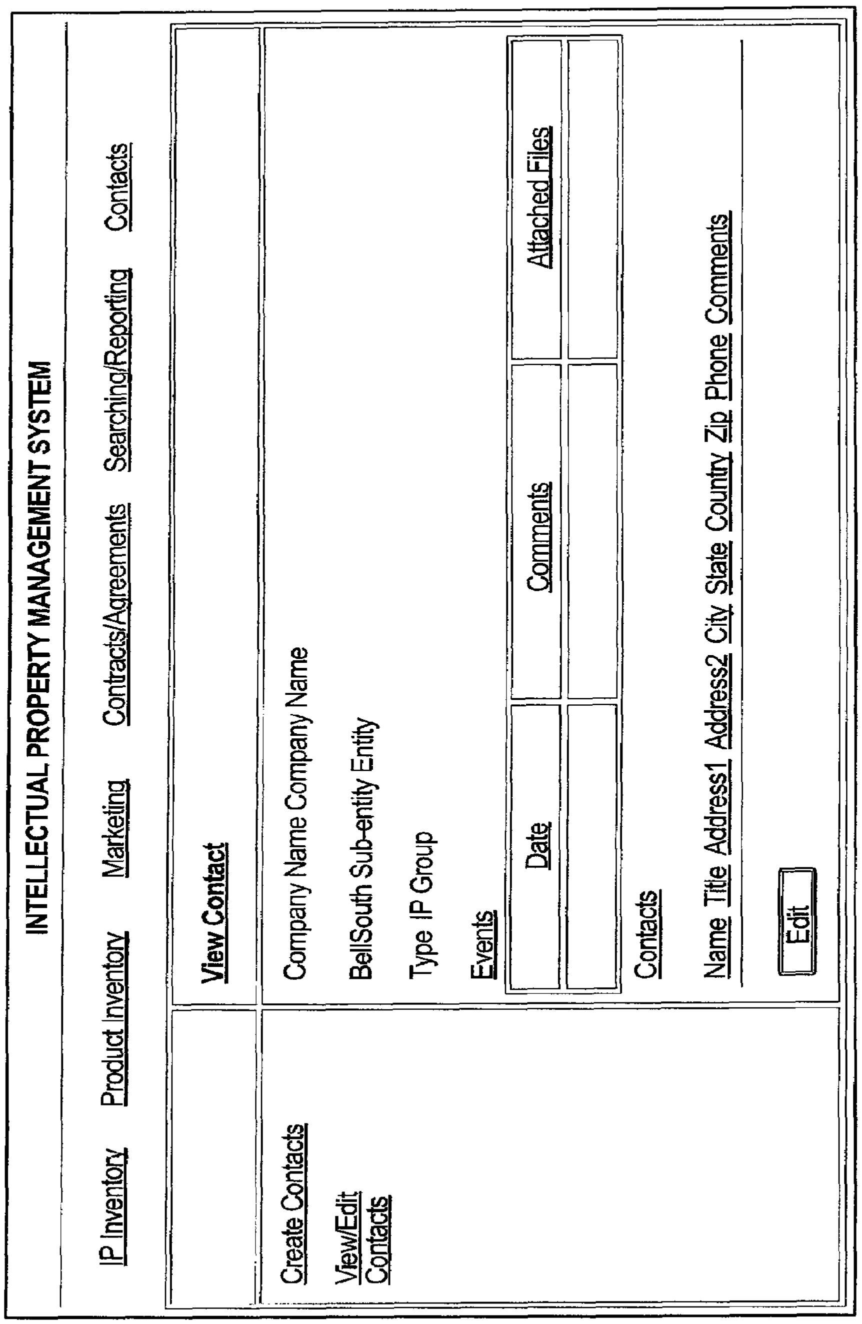

FIG. 163 shows an embodiment of a view contact GUI component. A view contact GUI component can allow the display of company contact information. For example, in the embodiment illustrated in FIG. 163, the contact information displayed can include the company name, a relationship with the company sub-entity, a type of contact, and events regarding the contact. The contact data record can also be associated with individual contact data records corresponding to the contact data record. For example, for a contact data record, information relating to the individual contact data record can include the name of the individual contact, title, address, city, state, country, zip, phone and any comments regarding that individual contact of the contact. In an embodiment, the view contact GUI component illustrated in FIG. 163 can include an edit button link to allow a user to edit the contact data record.

Figure 164:
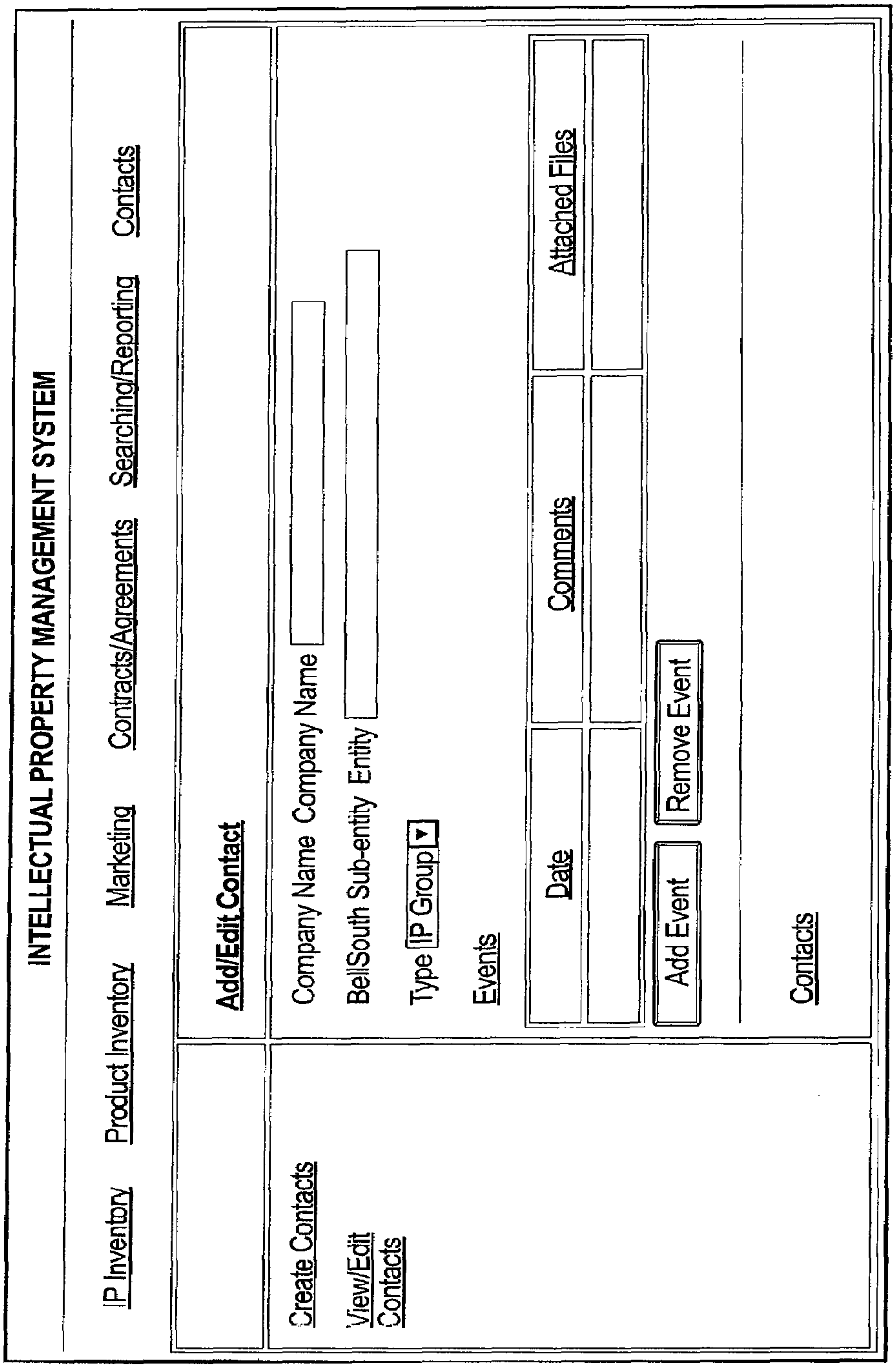

FIGS. 164 to 165 show an illustration of an embodiment of an add/edit contact GUI component. A user can specify and/or select information corresponding to a contact data record via the add/edit contact GUI component. For example, a user can specify a company name, a company sub-entity, a type of contact and events related to the contact. The add/edit contact GUI component can also include an add individual contact and/or remove individual contact button links to allow a user to add and/or remove associated individual contact data records as being associated with the contact data record. After a user has associated an individual contact data record with the contact data record, the add/edit contact GUI component can display information corresponding to the associated contact data record such as name, title, address, city, state, country, zip, phone, and any comments. The add/edit contact GUI component can include a submit button link and a cancel button link to allow a user to save and/or cancel saving of any modified or newly entered contact information. In an embodiment, the add/edit contact GUI component illustrated in FIGS. 164-165 can be displayed to a user when the user selects and activates the button link to add a contact data record illustrated in FIG. 157.

FIGS. 50-165 provide an illustration of a preferred embodiment of an intellectual property management system to create and track data records relating to the marketing of intellectual property. The GUI components illustrated in FIGS. 50 through 165 are merely illustrative of the types of interfaces that can be presented to a user to facilitate the efficient monitoring and creation of intellectual property marketing information.

Section 7: IP Management System—System Diagrams

FIGS. 166-177 show system level diagrams of an embodiment of the present invention. In an embodiment of the present invention, an IP management system can store and update data records relating to the marketing of intellectual property in an advantageous and efficient manner. Whereas FIGS. 50-165 show a specific implementation of an IP management system having a graphical user interface with web browser-based functionality, other embodiments of an IP management system may be differently configured. For example, another embodiment of an IP management system may be a text-based user interface system. In another embodiment of the present invention, an IP management system may use a different type of graphical user interface. Further, another embodiment of the present invention can have a user interface that is responsive to voice commands and is capable of generating audio prompts, video prompts, text prompts, data prompts, and other interactive prompts to solicit information and generate reports. In an embodiment, an IP management system includes components for generating reports to supervisory personnel and promulgation of alerts to prompt for additional information relating to the management of marketing intellectual property.

Figure 166:
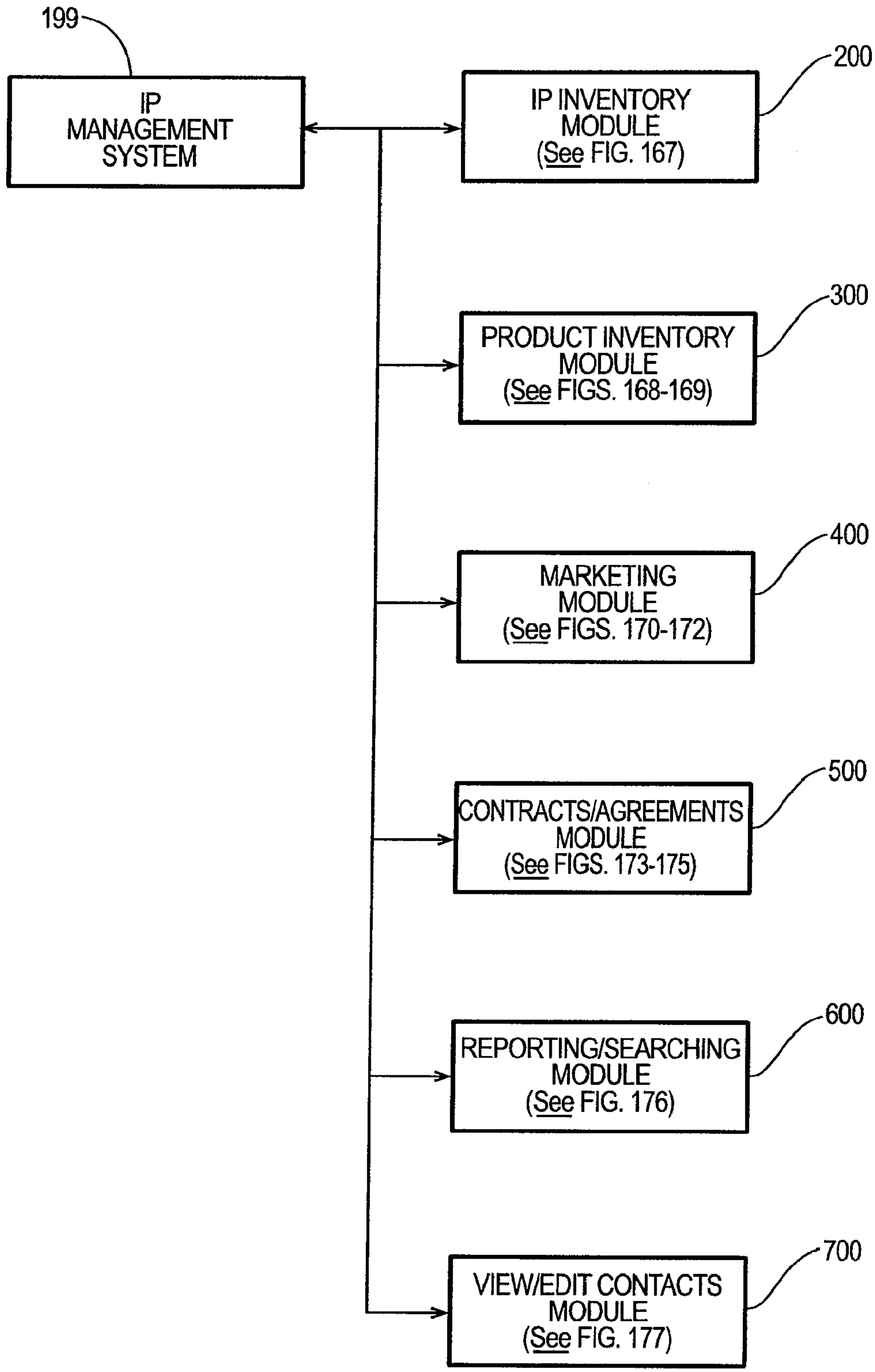
FIGS. 166-177 show system level diagrams of an embodiment of the present invention.

FIG. 166 shows a high level system diagram of an IP management system 199. IP management system 199 can include a plurality of modules relating to IP management operations. For example, IP management system 199 can include an IP inventory module 200, a product inventory module 300, a marketing module 400, a contracts/agreements module 500, a reporting/searching module 600, and a view/edits contacts module 700. FIG. 166 shows a generic representative of an IP management system to manage the marketing of intellectual property, whereas FIGS. 50-165 show one example of a specific intellectual property system for the marketing of intellectual property.

In an embodiment, each module of the IP management system 199, such as modules 200, 300, 400, 500, 600, 700, can include a plurality of instructions to be executed by a processor to perform the methods and operations herein described. For example, in an embodiment, the IP management system 199 described in FIGS. 166-177 can include computer software that can be distributed to corporations and other entities to manage the marketing of IP.

In an embodiment, when a user accesses IP management system 199, the user is provided with the ability to access one or more of IP inventory module 200, product inventory module 300, marketing module 400, contract/agreements module 500, reporting/searching module 600, and/or view/edit contacts module 700. In another embodiment, when a user accesses IP management system 199, the system determines one or more pending actions that are required and accesses the appropriate modules corresponding to the one or more required actions. For example, in an embodiment, when a user accesses the IP management system 199, there may be a required marketing action that is outstanding. Accordingly, the IP management system 199 will display information corresponding to the marketing module 400 to the user or display the marketing module 400 or a submodule of marketing module 400 to the user to prompt for required input and/or action.

Figure 167:
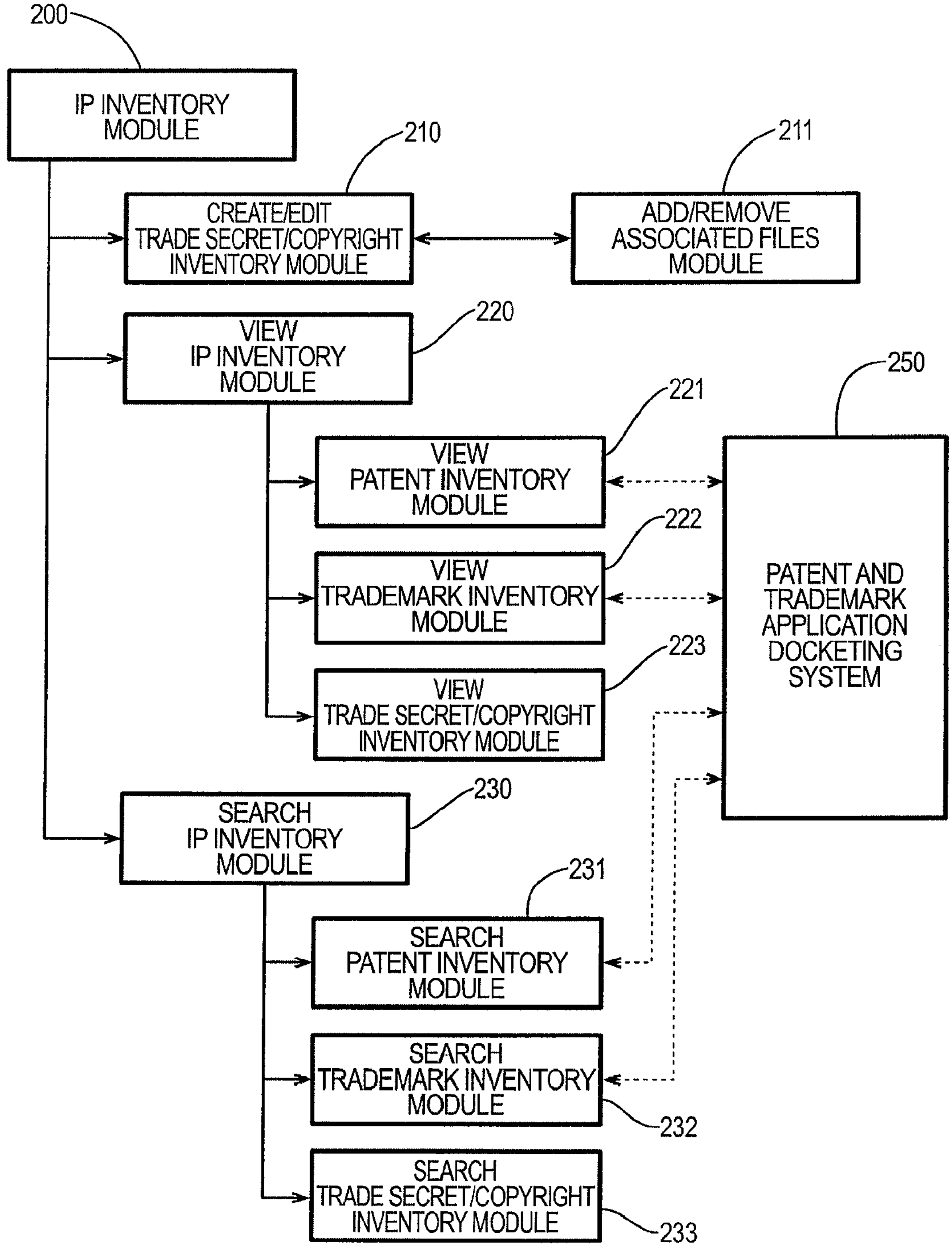

FIG. 167 shows an embodiment of an IP inventory module 200. An example of a particular implementation of an IP inventory module 200 is illustrated in FIGS. 54-64. In an embodiment, the IP inventory module 200 can include a plurality of submodules such as a create/edit trade secret/copyright inventory module 210, a view IP inventory module 220, and a search IP inventory module 230. In another embodiment, IP inventory module 200 can include a create/edit patent inventory module, a create/edit trademark inventory module, and other create/edit intellectual property inventory modules. The IP inventory module 200 can interact with a patent and trademark application docketing system 250. Patent and trademark application docketing system 250 can comprise one or more systems that can track and generate reports regarding the status of patent and/or trademark applications.

In an embodiment, the create/edit trade secret/copyright inventory module 210 allows the user to create or edit a data record corresponding to a trade secret or a copyright. The trade secrets and/or copyrights data records can correspond to trade secrets and/or copyrights in various stages of development (e.g., pending, filed, registered, under development, protected, etc.). The IP inventory module 200 including and/or coupled to the create/edit trade secret/copyright inventory module 210 allows a user (e.g., an individual, a corporation, an entity, an organization) to track and develop an inventory of trade secret and copyright-related intellectual property. In an embodiment, the create/edit trade secret/copyright inventory module 210 is coupled to an add/remove associated files module 211. The add/remove associated files module 211 allows a user to associate a file with an IP data record. For example, for a trade secret-related IP data record, an associated file can include a description of the trade secret. Alternatively, for a copyright-related IP data record, an associated file can include documents related to the copyright. As a further example for a trade secret-related IP data record, an associated file can include a listing of individuals having access to or control over the trade secret corresponding to the trade secret data record. Thus, according to an embodiment of a present invention, data records for inventorying IP can be created and can include associated files related to the IP units corresponding to the IP data records.

In an embodiment of the present invention, view IP inventory module 220 allows a user to view information corresponding to an IP data record. The view IP inventory module 220 can cause the display of data fields of the IP data record. In an embodiment, the view IP inventory module 220 includes submodules directed to the viewing of data records related to patents, trademarks, and/or trade secret/copyrights. For example, in an embodiment, view IP inventory module 220 can include or be coupled to a view patent inventory module 221, a view trademark inventory module 222, and a view trade secret/copyright inventory module 223. In another embodiment, there are discrete modules for viewing trade secret inventory data records and viewing copyright inventory data record. In the embodiment illustrated in FIG. 167, the view patent inventory module 221 is coupled to the patent and trademark application docketing system 250 to retrieve information corresponding to the patent data records. In an embodiment, the patent and trademark application docketing system 250 controls the creation and editing of patent-related IP data records, and view patent inventory module 221 can only display information of the patent-related IP data records (not create or edit the patent-related IP data records). In an embodiment, the view trademark inventory module 222 can receive and display information from the patent and trademark application docketing system 250 regarding trademark-related IP data records. The view trade secret/copyright inventory module 223 can access and display information corresponding to trade secret/copyright-related IP data records. In an embodiment, each of view inventory modules 221, 222, 223 can include links to modules to edit the displayed IP data records.

Search IP inventory module 230 can control searching for IP data records. In an embodiment, the search IP inventory module 230 can include and/or be coupled to a search patent inventory module 231, a search trademark inventory module 232, and a search trade secret/copyright inventory module 233. A user can provide search criteria or select a predefined set of search criteria in order to search for IP data records. Search patent inventory module 231 and search trademark inventory module 232 can each generate a search query to be sent to patent and trademark application docketing system 250 and can receive a response from patent and trademark application docketing system 250 corresponding to the query. In an embodiment, each of search inventory modules 231, 232, 233, can display information relating to the IP data records satisfying the search criteria. In an embodiment, a user can instruct the IP management system 199 to display a more detailed view of the IP data record located pursuant to the specified search.

Figure 168:
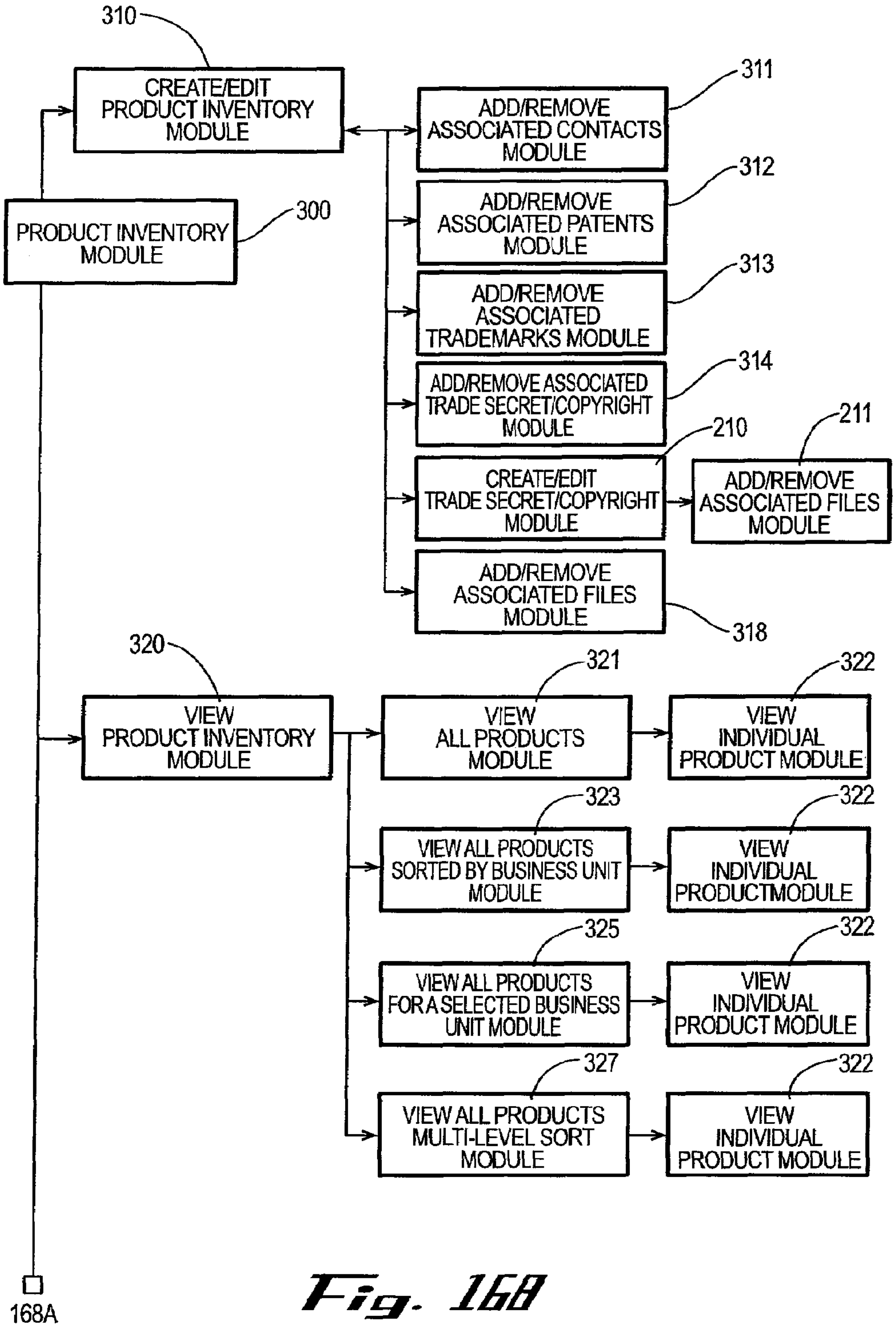
Figure 169:
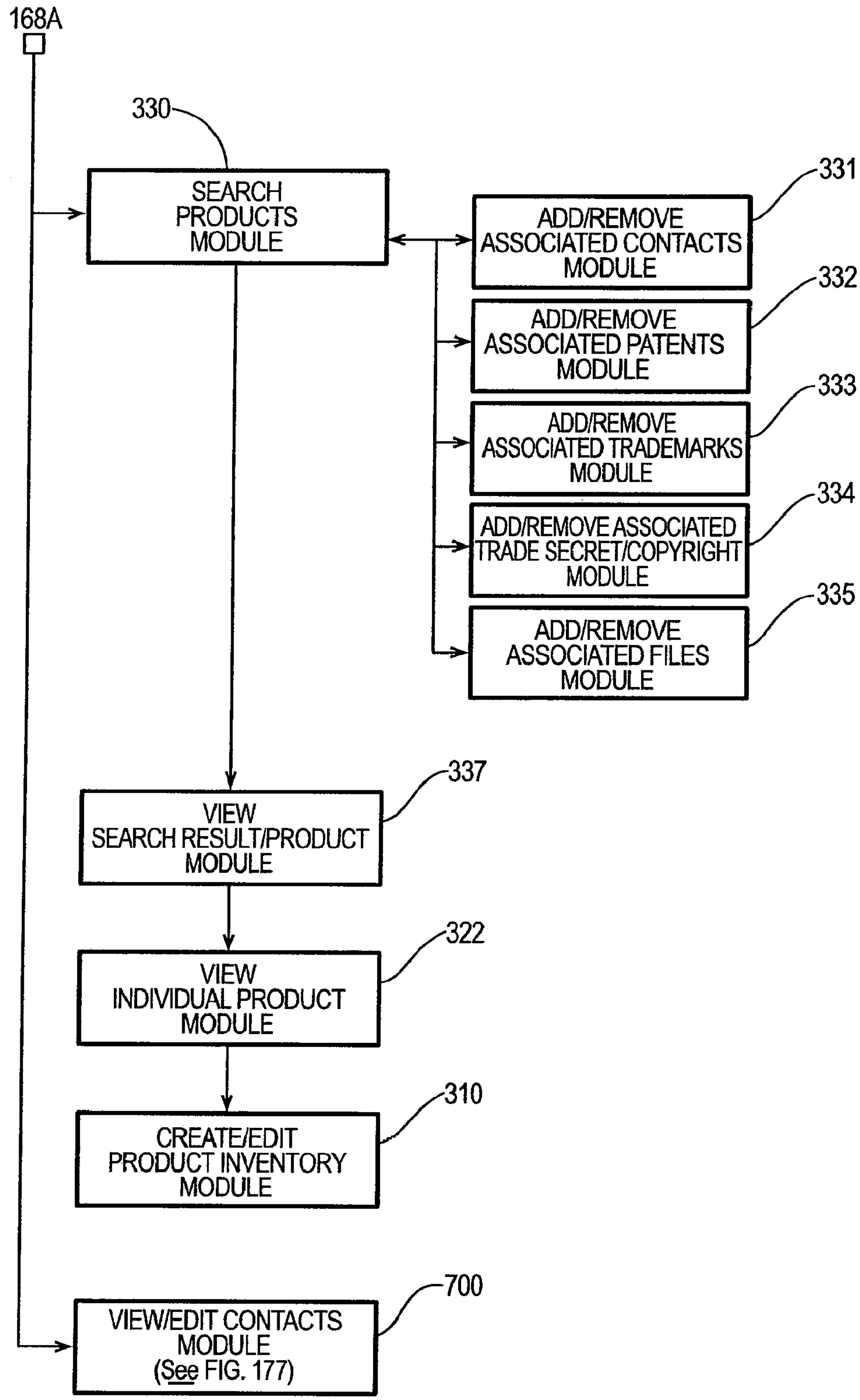

FIGS. 168-169 shows a system level diagram of a product inventory module 300. An example of a particular implementation of a product inventory module 300 is shown by the graphical user interface Web browser-based module illustrated in FIGS. 65-83. However, other embodiments of a product inventory module 300 are not limited to a graphical user interface Web browser-based implementation and can be implemented with other user interfaces.

In an embodiment, product inventory module 300 includes and/or is coupled to a create/edit product inventory module 310, a view product inventory module 320, a search projects module 330, and a view/edit contacts module 700. The product inventory module 300 and its associated submodules can allow a user to create a product data record as part of creating an inventory of product data records related to the marketing of intellectual property. For example, a product data record related to the marketing of intellectual property can include data records relating to a preferred embodiment of an invention for which a patent application has been filed. In another example, the product data record can include data records relating to an innovation that is protected, covered by, or related to a patent application, the subject matter of copyright application, the subject matter of a trademark application, and/or a trade secret. Product inventory module 300 can create and update an inventory of product data records, and provides for association of those product data records with IP data records to advantageously allow enhanced management of IP marketing.

In an embodiment, product inventory module 300 includes and/or is coupled to create/edit product inventory module 310. Create/edit product inventory module 310 can allow a user to create or edit a product data record of a database of product data records. Each product data record can correspond to a product such as a product of a corporation, a product of a company, a product of an individual, a product of an entity, and so forth. Examples of products include, without limitation, articles of manufacturing, business processes, and other known products. In an embodiment, the create/edit product inventory module 310 can be coupled to an add/remove associated contacts module 311 that can allow a user to specify contacts that are associated with a product. For example, a contact can be a company that may be a potential target of a marketing effort to sell the product and/or the related intellectual property or a strategic sales partner to assist in selling the IP asset. Create/edit product inventory module 310 can be coupled to the add/remove associated patents module 312, which can allow a user to associate patent-related IP data records with the product data record. For example, a product may be the subject of one or more patent applications, and add/remove associated patents module 312 allows a user to associate patent-related IP data records corresponding to the patent applications to be associated with the product data record corresponding to the product. Similarly, add/remove associated trademarks module 313 and add/remove associated trade secret/copyright module 314 allow trademark, trade secret and copyright-related IP data records to be associated with a product data record. In an embodiment, the create/edit product inventory module 310 can include or be coupled to a module to create a trade secret/copyright data record such as create/edit trade secret/copyright module 210. The create/edit trade secret/copyright inventory module 210 that allows a user to enter or revise information corresponding to a trade secret/copyright-related IP data record. The create/edit product inventory module 210 can be coupled to add/remove associate files module 211 to allow a user to associate files (e.g., computer files) with a trade secret/copyright-related IP data record. In an embodiment create/edit product inventory module 310 can be coupled to an add/remove associated files module 318 that can allow a user to associate computer files with the product record. For example, a computer file may describe a product, a plan of development for a product, a strategy regarding a product, a marketing plan regarding a product, and so forth. Such files can be associated with a product data record via the add/remove associated files module 318.

In an embodiment, the product inventory module 300 includes and/or is coupled to a view product inventory module 320. The view product inventory module 320 can allow the user to view product data records, in a variety of ways. For example, view product inventory module 320 can be coupled to a view all projects module 321 to allow a user to direct a display of all product data records. The view product inventory module 320 can be coupled to modules to generate reports regarding product data records, such as a view all products sorted by business unit module 323 and a view all products for a business unit module 325. View all products sorted by business unit module 323 can generate a report listing all product data records sorted by business unit. A user can select a specific business unit using view all products for a business unit module 325 and a listing of all product data records corresponding to that selected business unit can be generated. The view product inventory module 320 can also include and/or be coupled to a view all projects multi-level sort module 327 that can allow a user to specify sort criteria for generating a listing of all products data records. In an embodiment of the present invention, a user can select to view in greater detail an individual product record via a view individual product module 322 that can be coupled to each of view modules 321, 323, 325, and 327. In an embodiment, when a report listing product data records is generated by one of the view modules 321, 323, 325, and 327, a user can select activation of the view individual product module 322 and a more detailed view of information relating to the individual product data record can be displayed to the user. In an embodiment, view individual project module 322 can include and/or be coupled to a module to edit the individual product data record so that the individual product data record can be updated or otherwise edited.

In an embodiment, product inventory module 300 can include or be coupled to a search projects module 330. Search products module 330 can allow a user to specify search criteria or generate a search of the product data records. A search can be based on search criteria such as whether a product data record is associated with a particular contact data record, associated with one or more patent-related IP data records, associated with one or more trademark-related IP data records, associated with one or more trade secret/copyright-related IP data records, associated with a particular computer file, and so forth. Search products module 330, thereby can be coupled to an add/remove associated contacts module 331, an add/remove associated patents module 332, an add/remove associated trademark module 333, an add/remove trade secret/copyright module 334, and an add/remove associated files module 335 to allow a user to specify search criteria. In an embodiment, add/remove associated contacts module 311 is generally the same as the add/remove associated contacts module 331, and can be called by either create/edit product inventory module 310 and/or search projects module 330 to add/remove an associated contacts data record with a product data record or a search inquiry.

After a user has specified search criteria using the search projects module 330, the user can direct execution of the search and the results of the search can be displayed to the user via the view search result/product module 337. In an embodiment in which view search results/product module 337 allows the display of information corresponding to a plurality of product data records, a user can direct the display of additional information corresponding to an individual product data record via view individual product module 322. In an embodiment, view individual product module 322 can be coupled to create/edit product inventory module 310 to allow a user to edit the product data record displayed by the view individual product module 322.

In an embodiment, product inventory module 300 is coupled to a view/edit contacts module 700. The view/edit contact module 700 can allow a user to view, edit, and create contacts that can be associated with a product data record. In an embodiment, contacts can be one of at least two types: a organizational contact and an individual contact. In an embodiment, organizational contacts can be associated with one or more individual contacts. For example, a particular business can be an organizational contact, and the employees of that business can be individual contacts associated with the organizational contact. The operation of the view/edits contacts modules 700 is set forth in greater detail by FIG. 177 and the accompanying text describing FIG. 177.

Figure 170:
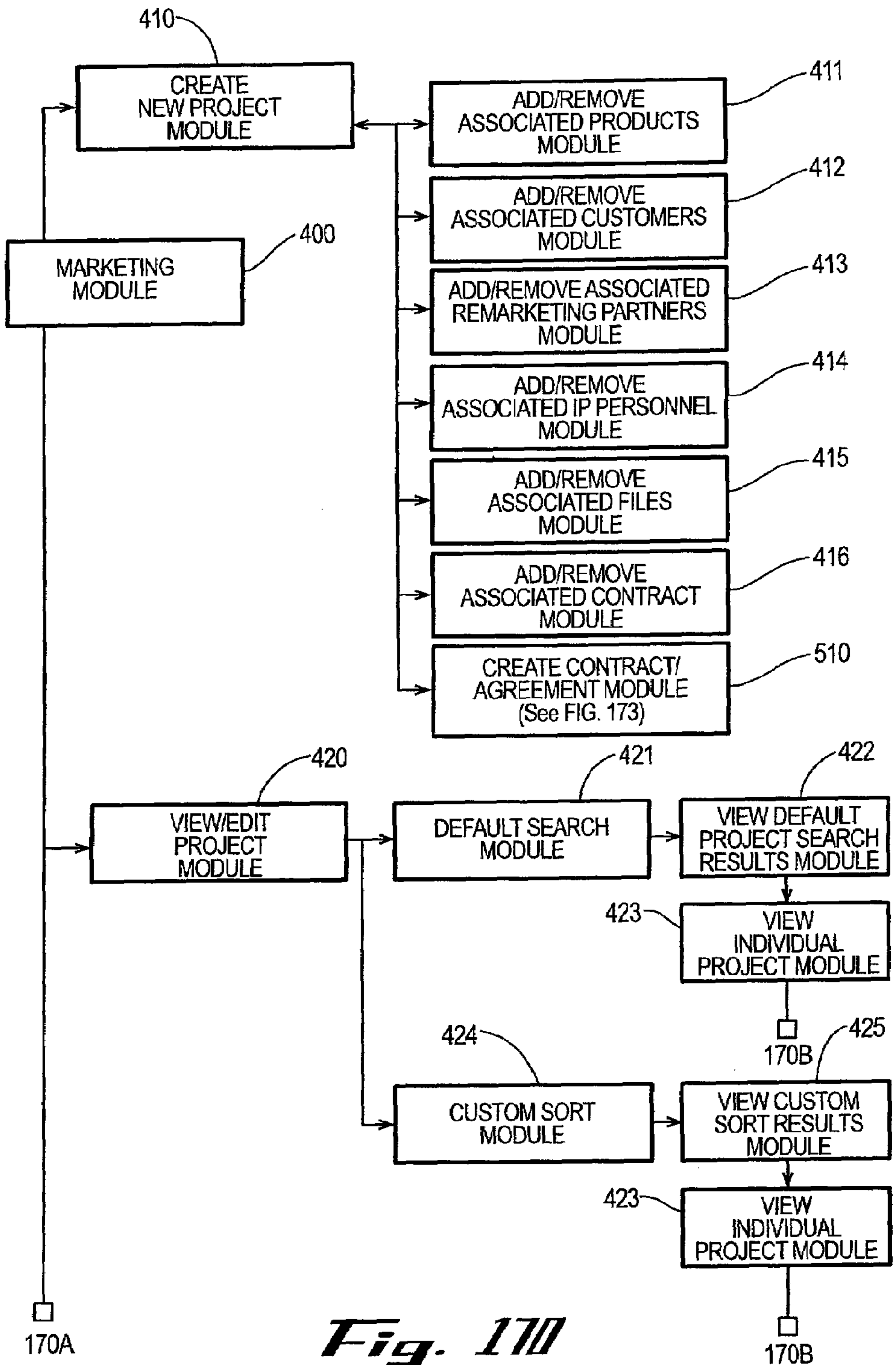
Figure 171:
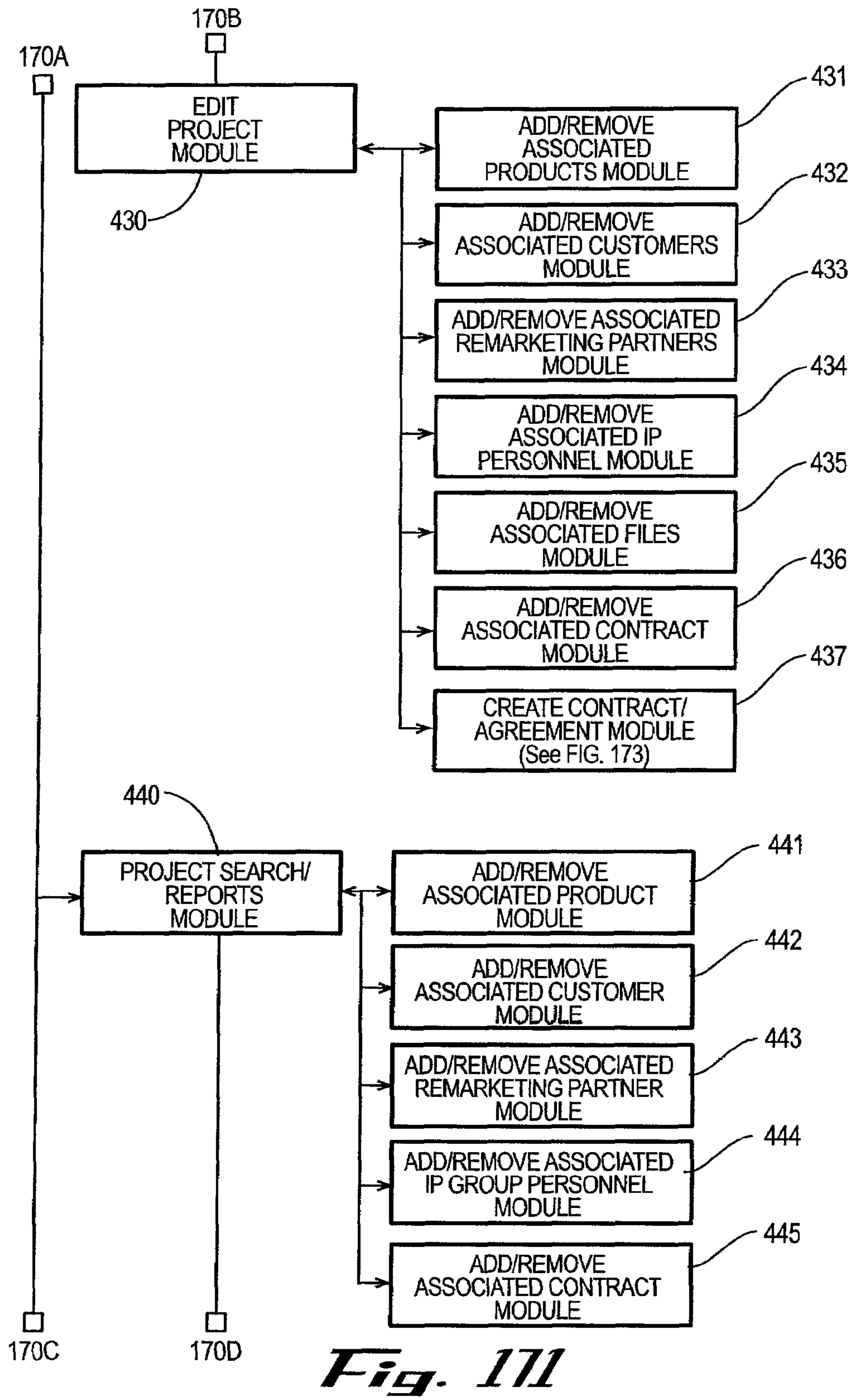
Figure 172:
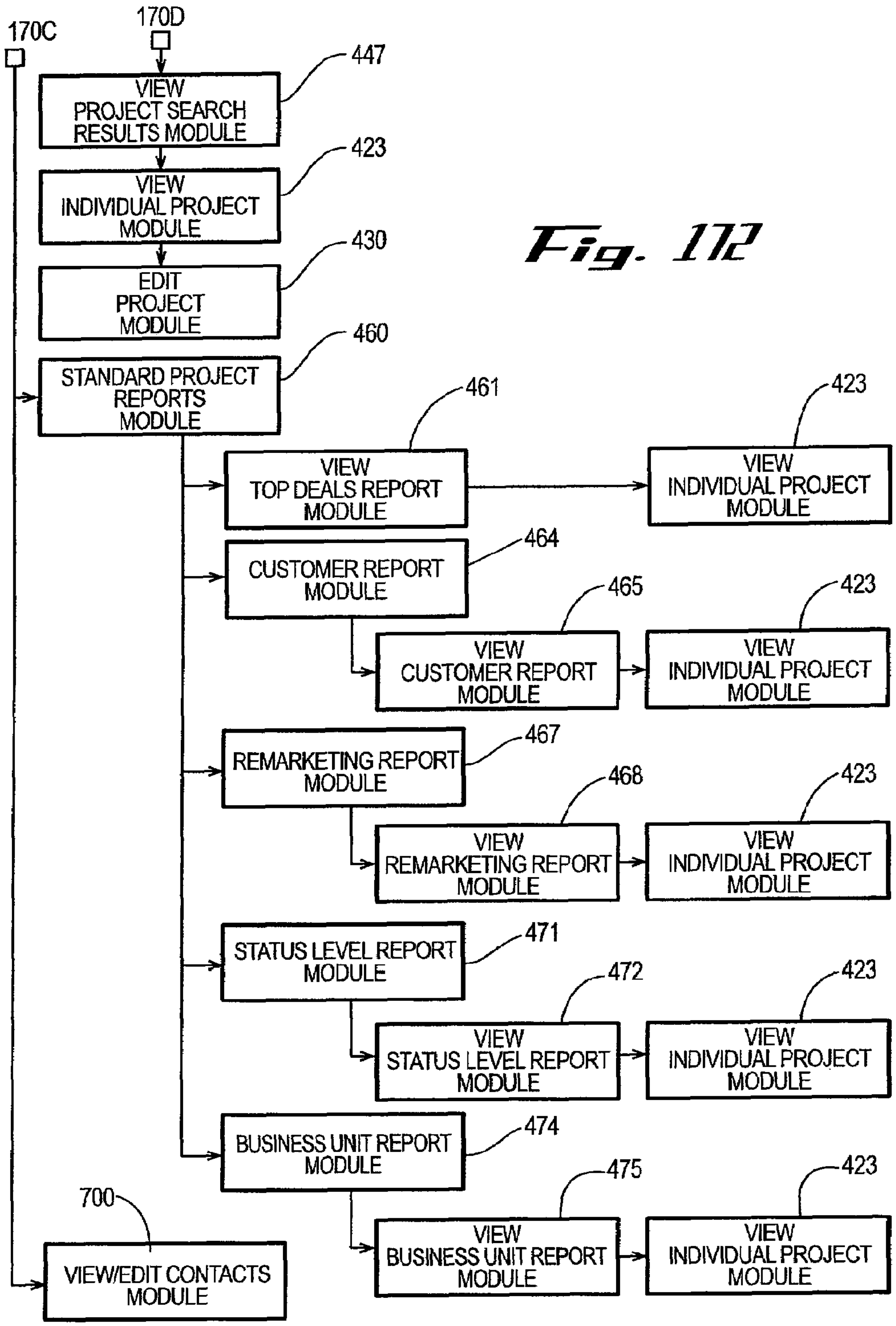

FIGS. 170-172 show an embodiment of a system level diagram of a marketing module 400. A particular example of a marketing module is illustrated by FIGS. 84-110, which show an example of a graphical user interface web browser-based implementation of a marketing module 400. However, other implementations of a marketing module 400 can include other types of user interfaces.

In an embodiment, marketing module 400 is coupled to create new project module 410, a view/edit project module 420, a project search/reports module 440, a standard project report module 460, and a view/edit contacts module 700. In an embodiment, each of submodules 410, 420, 440, 460 and 700 can be accessed via marketing module 400.

In an embodiment, marketing module 400 includes and/or is coupled to create new project module 410. Create new project module 410 can allow a user to create a project data record. A project data record can specify and include information relating to a project for the marketing of IP. The create new project module 410 can include or be coupled to an add/remove associated products module 411, an add/remove associated customer module 412, an add/remove associated remarketing partners module 413, an add/remove associated IP personnel module 414, an add/remove associated files module 415, an add/remove associated contract module 416, and a create contract/agreement module 510. The submodules 411, 412, 413, 414, 415, 416, 510 can allow a user to specify information and/or associated data records of the project data record.

View/edit project module 420 can be part of or be coupled to marketing module 400. In an embodiment, view/edit project module 420 can allow a user to view and potentially edit a project data record by performing a search for one or more project data records. For example, view/edit project module 420 can include or be coupled to a default search module 421 and a custom sort module 424. Default search module 421 can allow a user to specify a search of the project data records based on default search criteria, and the project data records meeting the default search criteria can be displayed by the view default search results module 422. Likewise, a user can specify custom sort criteria via custom sort module 424, and view custom sort results module 425 can display the project data records corresponding to the specified custom sort criteria. When one or more project data records are displayed by view default project search results module 422 and/or view custom sort results module 425, a user can direct that a more detailed view of the project data record be displayed by view individual project module 423. In an embodiment view individual project module 423 can be coupled to an edit project module 430 to allow a user to edit a project data record after viewing the project data record. In an embodiment, a user can edit a project data record via submodules of the edit project module 430, such as an add/remove associated products module 431, an add/remove associated customers module 432, an add/remove associated remarketing partners modules 433, an add/remove associated IP personnel module 434, an add/remove associated files module 435, an add/remove associated contract module 436, and a create contract/agreement module 437.

In an embodiment, project search/reports module 440 is part of or coupled to marketing module 400. Project search/reports module 440 can allow a search of and/or generation of reports regarding the project data records to be performed. For example, a search of the project data records can be conducted using project search/reports module 440 and submodules that can specify search criteria such as an add/remove associated product module 441, an add/remove associated customer module 442, an add/remove associated remarketing partner module 443, an add/remove associated IP group personnel module, and an add/remove associated contract module 445. After search criteria are specified, the results of the search of the project data records can be viewed using view project/search results module 447. When view project search results module 447 displays one or more project data records, a more detailed view of a project data record can be displayed by view individual project module 423. In an embodiment, the view individual project module 423 can be coupled to an edit project module 430 to allow a user to edit a project data record after viewing the project data record via view individual project module 423.

In an embodiment, standard project reports module 460 can generate one or more standard reports of project data records based on various report criteria. For example, standard project reports module 460 can include or be coupled to a view top deals report module 461 to generate a top deals report, a customer report module 464 and view customer report module 465 to generate a customer report, a remarketing report module 467 and view remarketing report module 468 to generate a remarketing report, a status level report module 471 and view status level report module 472 to generate a status level report and a business unit report module 474 and view business unit report module 475 to generate and view a business unit report. In an embodiment, each of view report modules 461, 465, 468, 472, and 475 can display a listing of project data records satisfying report criteria. For example, a customer report can be based on a user-identified customer. Likewise, a status level report can be based on project data records having an indicated status level. Similarly, a business unit report can include a listing of project data records corresponding to a business unit selected by a user. In an embodiment, each of view report modules 461, 465, 468, 472, 475 can be coupled to a view individual project module 423 to allow a user to view in greater detail a project data record included in a report. In an embodiment, view individual module 423 can be coupled to edit project module 430 to allow a user to edit the project data record displayed by the view individual project module 423.

In an embodiment, marketing module 400 can be coupled to a view/edit contacts module 700 to allow a user to view/edit or create contact data records that can be associated with a project data record.

Figure 173:
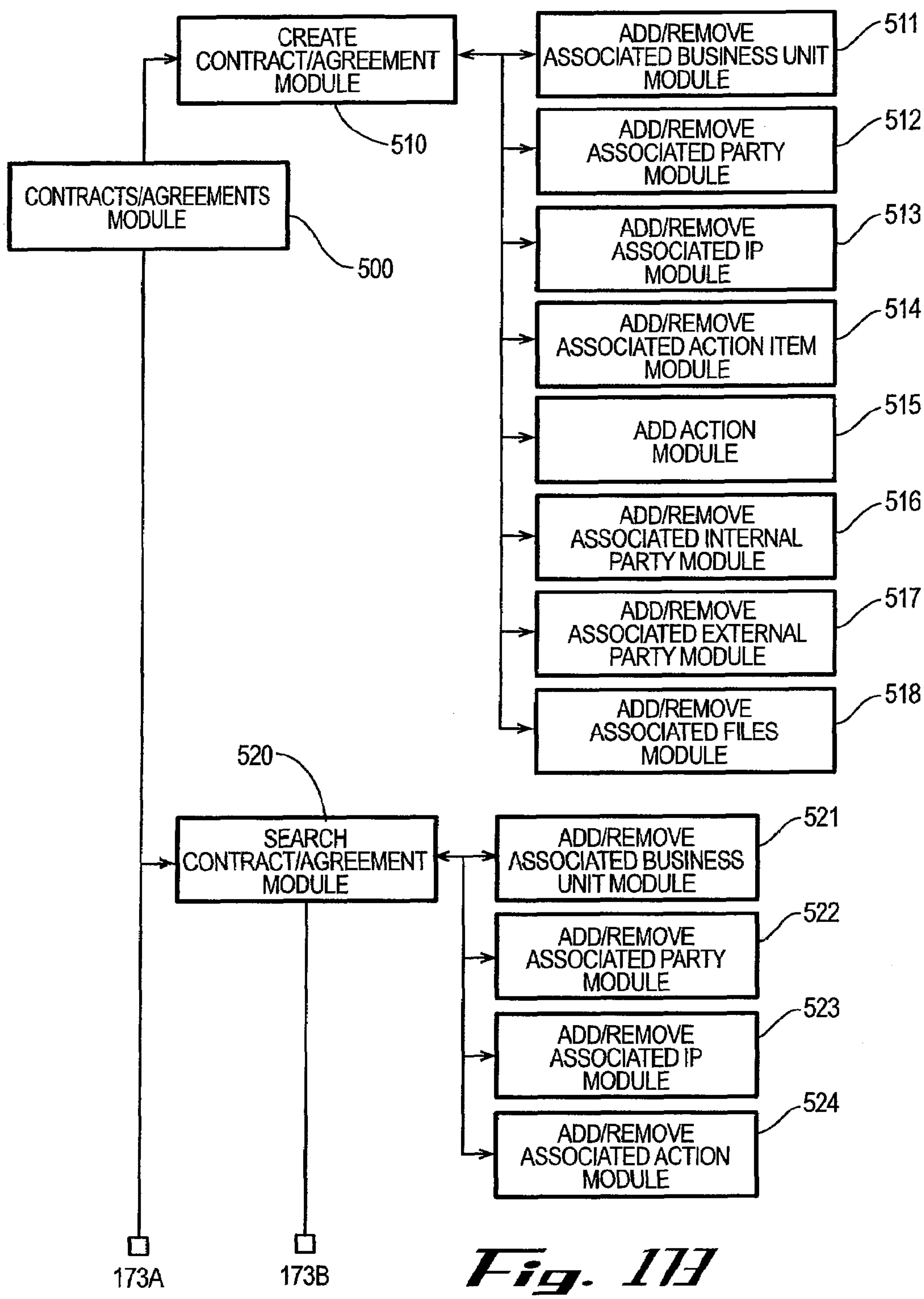
Figure 174:
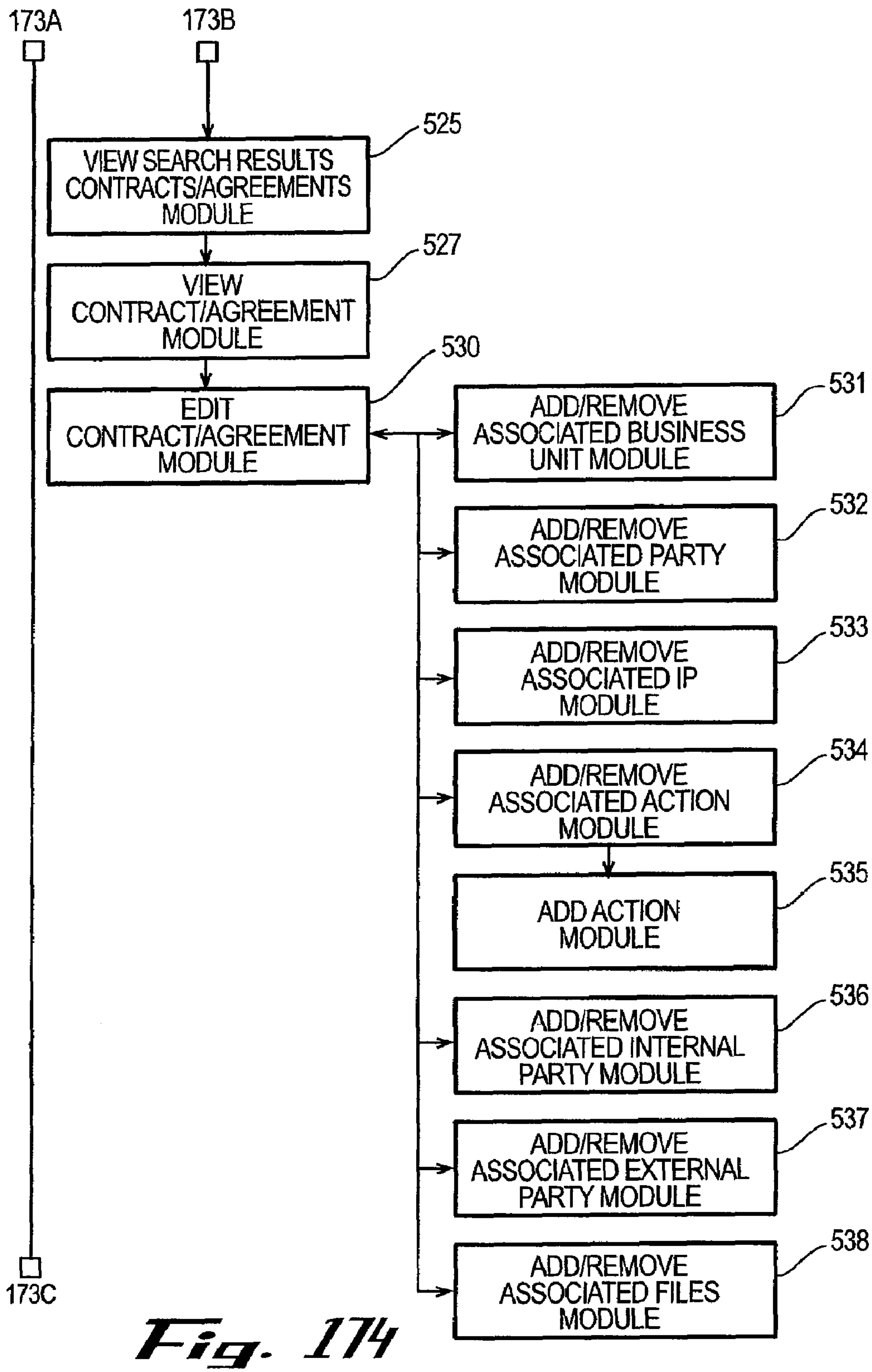
Figure 175:
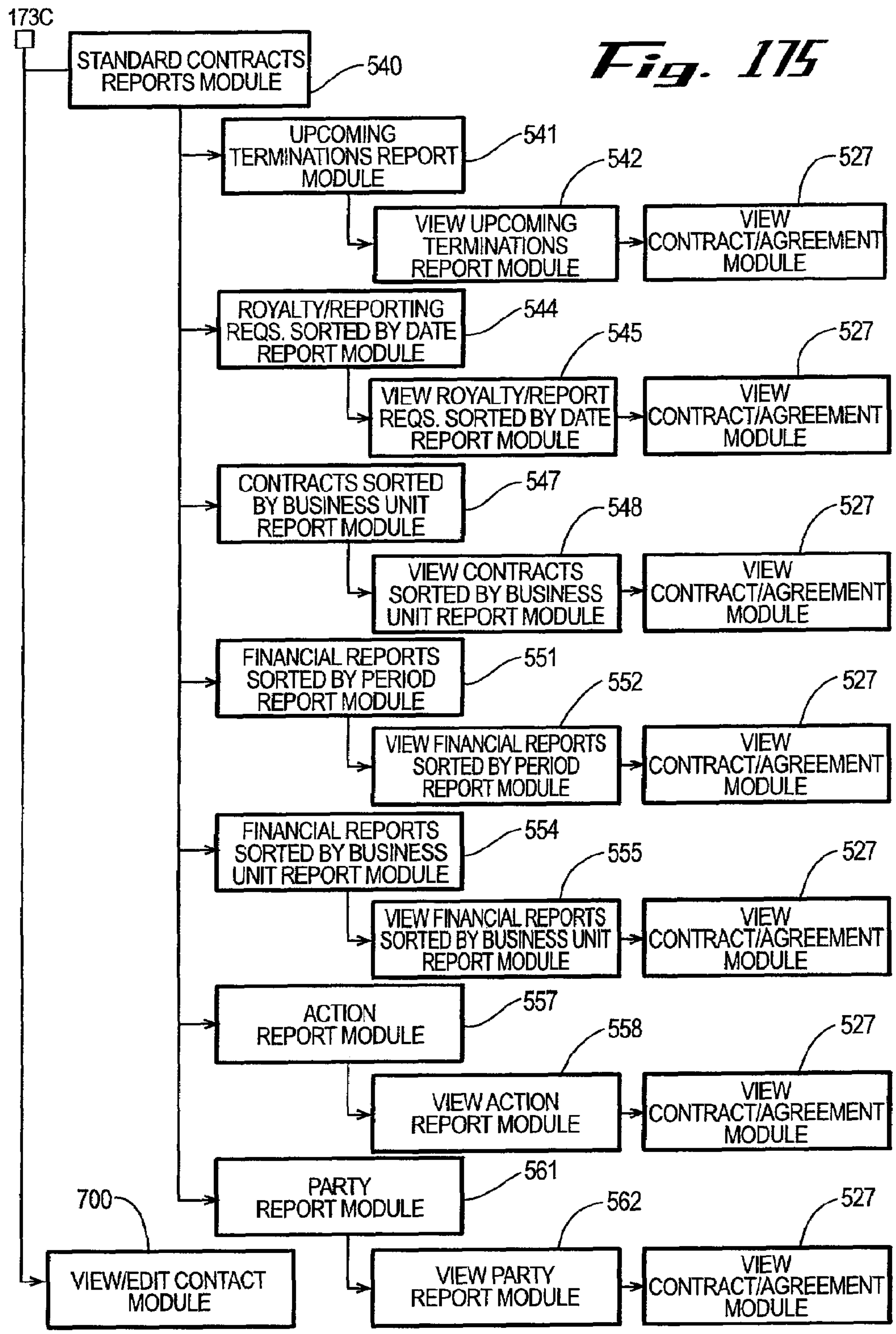

FIGS. 173-175 show an embodiment of a system level diagram of a contracts/agreements module 500. A particular example of a contracts/agreements module is illustrated in FIGS. 111 to 150, which show a graphical user interface Web browser-based embodiment of a contracts/agreements module. However, other contracts/agreements modules can be implemented using other user interfaces. For example, examples of other user interfaces include text-based user interfaces, voice interactive user interfaces, and other user interfaces. In an embodiment, contracts/agreements module 500 allows a user to create a data record corresponding to a contracts/agreement relating to the marketing of intellectual property. For example, the marketing of intellectual property can relate to an execution of a license, a contract to sell or otherwise dispose of intellectual property, and other agreements relating to the marketing and assertion of intellectual property. In accordance with an embodiment of present invention, contracts/agreement data records can be created, modified, and tracked in order to manage the marketing of intellectual property.

In an embodiment, contracts/agreements module 500 includes and/or is coupled to a create contract/agreement module 510. Create contract/agreement module 510 can create and/or edit a contract/agreement data record based on user inputs and/or specifications. In an embodiment, create contract/agreement module 510 is coupled to an add/remove associated business unit module 511 to allow a user to associate a business unit data record with the contract data record, an add/remove associated party module 512 to allow a user to specify associated party data records that are to be associated with the contracts/agreement data record, an add/remove associated IP module 513 to allow a user to specify associated IP data records that should be associated with the contracts/agreement data record, an add/remove associated action item module 514 that can (in concert with add action module 515) allow a user to specify action item data records that can be associated with the contracts/agreement data record, an add/remove associated internal party module 516 to allow a user to specify an associated internal party data record with the contract/agreement data record, an add/remove associated external party module 517 to allow a user to specify external party data records that are to be associated with the contract/agreement data record, and an add/remove associated files module 518 to allow a user to specify computer files that are to be associated with the contract/agreement data record.

Search contracts/agreements module 520 can be coupled to contracts/agreements module 500. Search contracts/agreements module 520 can allow a user to specify search criteria and/or search terms for searching the contract/agreement data records. In an embodiment, a user can specify search terms and/or criteria via one or more submodules of the search contracts/agreements module 520. In an embodiment, the submodules to specify search terms and/or criteria can include an add/remove associated business unit module 521, an add/remove associated party module 522, an add/remove associated IP module 523, and an add/remove associated action module 524.

After a user has specified search criteria and/or search terms, the user can direct execution of the search. View search results contracts/agreements module 525 can display the contract/agreement data records meeting the user specified search criteria and/or terms. In an embodiment, the view search results contracts/agreements module 525 can display information from one or more contract/agreement data records. A user can cause a more detailed view of a contract/agreement data record to be displayed via view contract/agreement module 527 that can be coupled to the view search results contracts/agreements module 525. In an embodiment, after a user has viewed a contract/agreement data record via view contract/agreement module 527, a user can edit the contract/agreement data record via edit contract/agreement module 530. Edit contract/agreement module 530 can be coupled to a plurality of submodules allowing the contract/agreement data record to be edited. For example, the edit contract/agreement module 530 submodules can include: an add/remove associated business unit module 531, an add/remove associated party module 532, an add/remove associated IP module 533, an add/remove associated action module 534 coupled to an add action module 535, an add/remove associated internal party module 536, an add/remove associated external party module 537, and an add/remove associated files module 538. In an embodiment, the submodules of the edit contract/agreement module 530 generally correspond to the submodules of the create contract/agreement module 510.

In accordance with an embodiment of the present invention, a standard contracts reports module 540 is part of or coupled to contracts/agreements module 500. Standard contracts reports module 540 can allow a user to generate reports based on contract/agreement data records. In an embodiment, standard contracts reports module 540 allows one or more standard reports to be generated based on the contract/agreement data records and predefined report criteria. In an other embodiment, standard contracts reports module 540 includes or is coupled to a plurality of submodules to generate standard reports that can include user specified report criteria. For example, standard contracts reports module 540 can be coupled to an upcoming terminations report module 541 that can allow a user to specify the scope of an upcoming terminations report. In an embodiment, after a user has specified the scope of an upcoming terminations report, view upcoming terminations report module 542 can display the contract/agreement data records meeting the criteria of the specified upcoming terminations report. A royalty/reporting requirements sorted by date report module 544 can allow a user to generate a royalty/reporting requirements sorted by date report.

In an embodiment, a user can specify certain report criteria such as the scope of time covered by the report and/or other related factors. In an embodiment, view royalty/report requirements sorted by date report module 545 can display a listing of the contract/agreement data records meeting the report requirements specified by a user in conjunction with royalty/reporting requirements sorted by date report module 544. A user can view a report of contracts sorted by business unit via contracts sorted by business unit report module 547 and view contracts sorted by business unit report module 548. A user can direct the display of a financial report with records sorted by period via financial report sorted by period report module 551 and view financial report sorted by period report module 552. Financial reports sorted by business unit report module 554 can allow a user to specify generation of a financial report sorted by business unit, and view financial report sorted by business unit report module 555 can display a financial report sorted by business unit. In an embodiment, action report module 557 can allow a user to specify action criteria that can be the basis of an action report, and view action report module 558 can display contract/agreement data records meeting the action report criteria. Party report module 561 can generate a party report of contract/agreement data records based on specified report criteria. In an embodiment, each of the view report modules 542, 545, 548, 552, 555, 558, and 562 can display information corresponding to contract/agreement data records meeting specified report criteria. In an embodiment, each of the view report modules 542, 545, 548, 552, 555, 558, and 562 can be coupled to a view contracts/agreement module 527 to allow a user to view a more detailed display of information relating to the contracts/agreement data records.

In an embodiment, contracts/agreements module 500 is coupled to a view/edit contact module 700. The view/edit contact module 700 can allow a user to view, edit and create contact data records related to the contract/agreement data records.

Figure 176:
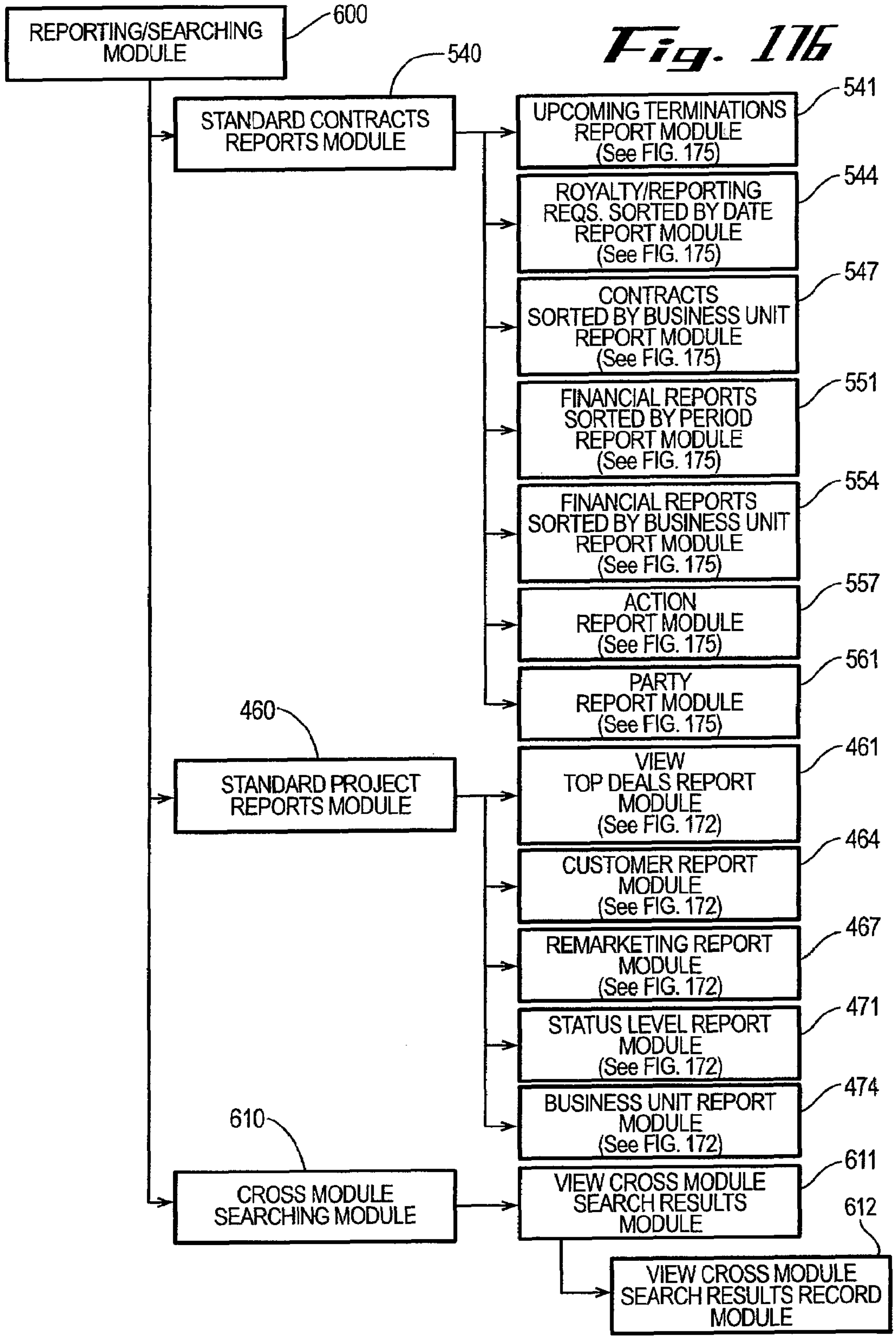

FIG. 176 shows an illustration of a system diagram of a reporting/searching module 600. A particular embodiment of a reporting/searching module is illustrated in FIGS. 151-156, which show an illustration of a graphical user interface Web browser-based embodiment of reporting/searching module. Other embodiments of a reporting/searching module can utilize alternative user interfaces. In an embodiment, reporting/searching module 600 can include and/or be coupled to a standard contracts report module 540, a standard project report module 460, and a cross module searching module 610. In an embodiment, the standard contracts reports module 540 coupled to the reporting/searching module of 600 of FIG. 176 corresponds to the standard contracts reports module 540 of FIG. 175. In an other embodiment, the standard project reports module 460 coupled to the reporting/search module 600 of FIG. 176 can correspond to the standard project reports module 460 of FIG. 172.

In an embodiment, cross module searching module 610 is part of and/or is coupled to reporting/searching module 600. Cross module searching module 610 can allow a user to specify criteria relating to a cross module search of various data records related to intellectual property marketing. View cross module search results module 611 can allow a user to view data records satisfying the cross module searching criteria specified by a user and/or by cross module searching module 610. In an embodiment, view cross module search results module 611 can display a plurality of data records and/or information corresponding to data records. A user can have additional information of a data record displayed by the view cross module search results module 611. In an embodiment, view cross module search results record module 612 can direct the display of and/or display additional information corresponding to a selected data record.

Figure 177:
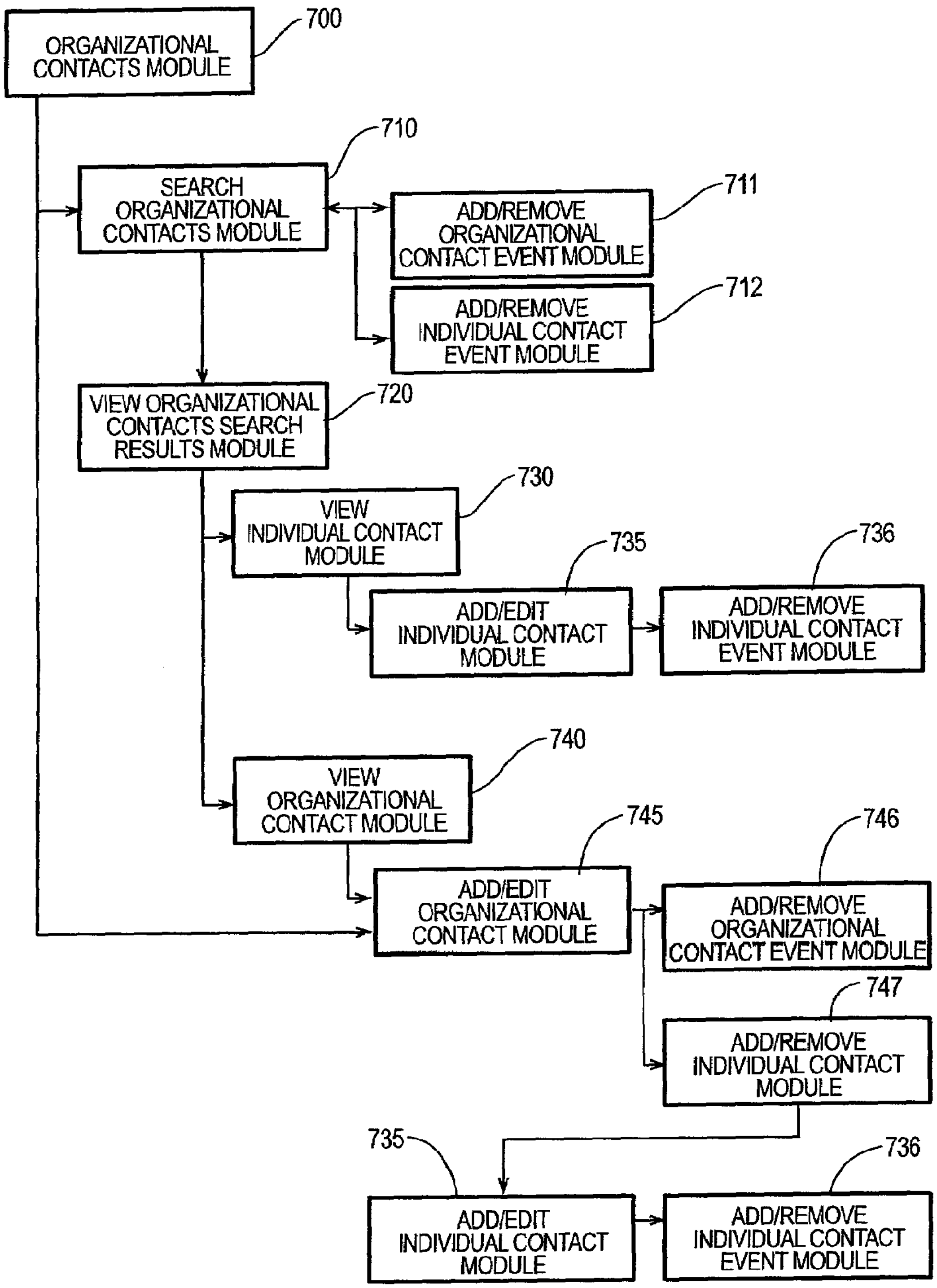
Figure 178:
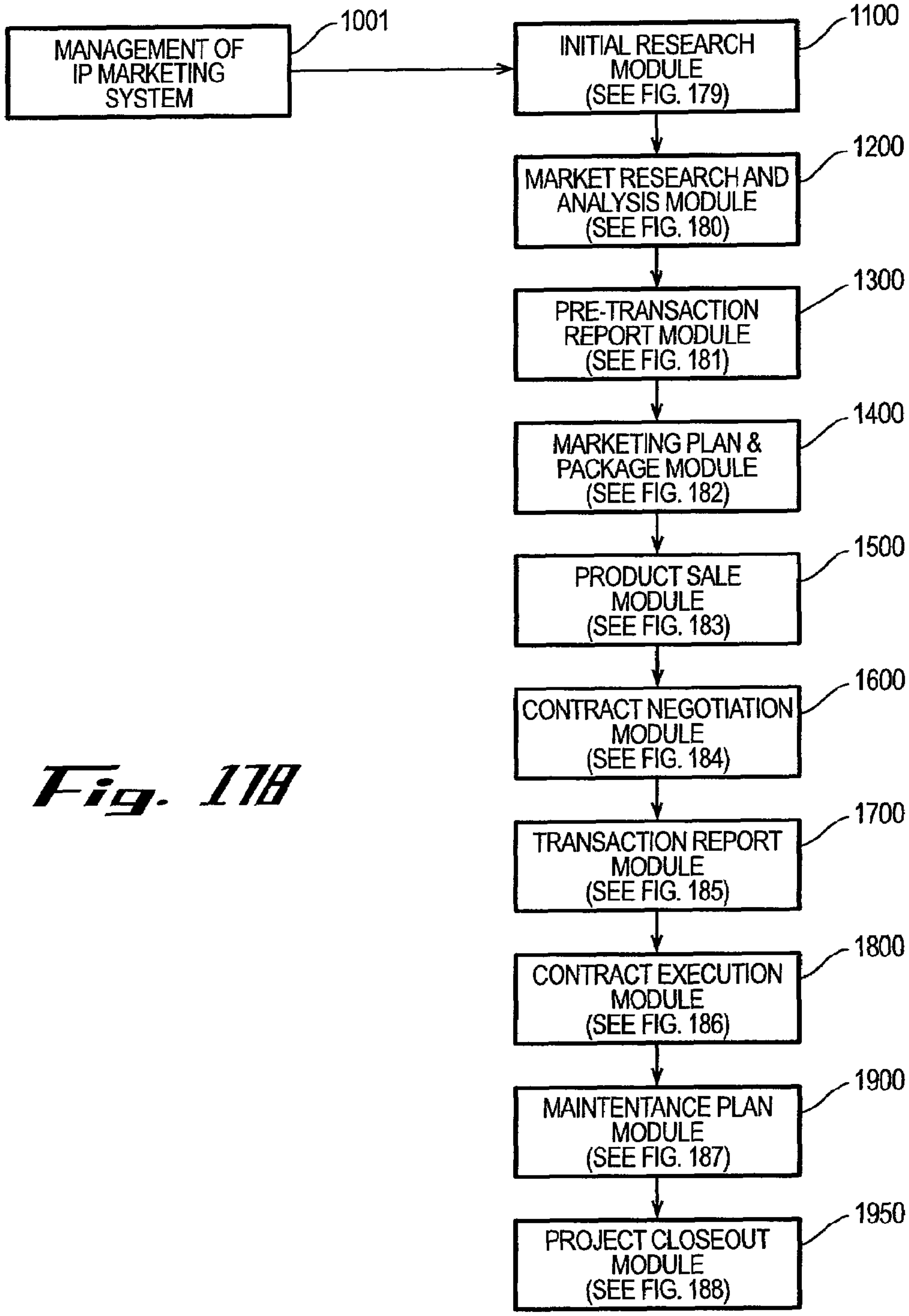

FIG. 177 shows a system level diagram of an embodiment of an organizational contacts module in accordance with an embodiment of the present invention. In an embodiment, FIGS. 157-165 illustrate a particular embodiment of an organization contacts module 700 having a Web browser-based graphical user interface. In another embodiment of the present invention, organizational contacts module 700 has another type of user interface such as a text-based user interface, an interactive voice interface, and so on.

In accordance with an embodiment, organizational contacts module 700 can include or be coupled to a search organizational contacts module 710. Search organizational contacts module 710 can allow a user to search organizational contact data records. A user can specify the search terms and/or search criteria for the search of the organizational contact data records via add/remove organizational contact event module 711, and add/remove individual contact event module 712. In an embodiment, an organizational contact data record can be associated with an organizational contact event data record and/or an individual contact event data record. Examples of event data records include data records regarding actions to be taken with respect to a contact and the marketing of IP. After a user has specified any search criteria via search organizational contacts module 710 and any submodules, a user can view the organizational contacts search results via view organizational contacts search results module 720. In an embodiment, view organizational contacts search results module 720 can display a listing of information corresponding to the organizational contacts data records meeting the specified search criteria. A user can select to view additional information about an individual contact data record associated with an organizational contact data record via view individual contact module 730. In an embodiment, the view individual contact module 730 can be coupled to an add/edit individual contact module 735 to add and/or edit individual contact data records associated with the organizational contact data record. In an embodiment, add/edit individual module 735 can be coupled to an add/remove individual contact event module 736 to specific individual contact events associated with an individual data record.

A user can select to view additional information about an organizational contact data record via view organizational contact module 740. In an embodiment, the user can choose to edit information corresponding to the organizational contact data record via the add/edit organizational contact module 745. Add/edit organizational contact module 745 can be coupled to organizational contacts module 700 to allow a user to add an organizational contact data record to the IP management system. In an embodiment, add/edit organizational contact event module 745 can be coupled to add/remove organizational contact event module 746 to allow a user to specify an event data record associated with the organizational contact data record. Examples of event data records include data records related to deadlines, goals, meetings, and other events related to the marketing of intellectual property. In an embodiment, add/edit organizational contact module 745 can be coupled to an add/remove individual contact module 747 to specify individual contact data records associated with an organizational contact data record. When a user has invoked add/remove individual module 747, a user may access add/edit individual module 735 to add or edit an individual contact data record. In an embodiment, add/edit individual contact module 735 can be coupled to add/remove individual contact event module 736 to allow a user to specify individual contact event data records associated with an individual contact data record.

Section 8: Management of IP Marketing—System Diagrams

FIGS. 178-188 show a system level diagram of a management of IP marketing system in accordance with an embodiment of the precedent invention. Moreover, FIGS. 178-188 illustrate both systems and methods for the management of intellectual property marketing and can include a plurality of components and/or stages to perform functions and tasks regarding the management of intellectual property marketing. In the embodiment illustrated in FIGS. 178-188, a management of intellectual property marketing system 1001 comprises of ten subsystems and/or modules. In another embodiment of the present invention, a different number of subsystems and modules can be used to comprise a management of IP marketing system. In still another embodiment, the management of IP marketing systems may have a different number of submodules, as well as different durations, precedents steps, successors steps, resources, etc.

Figure 178:
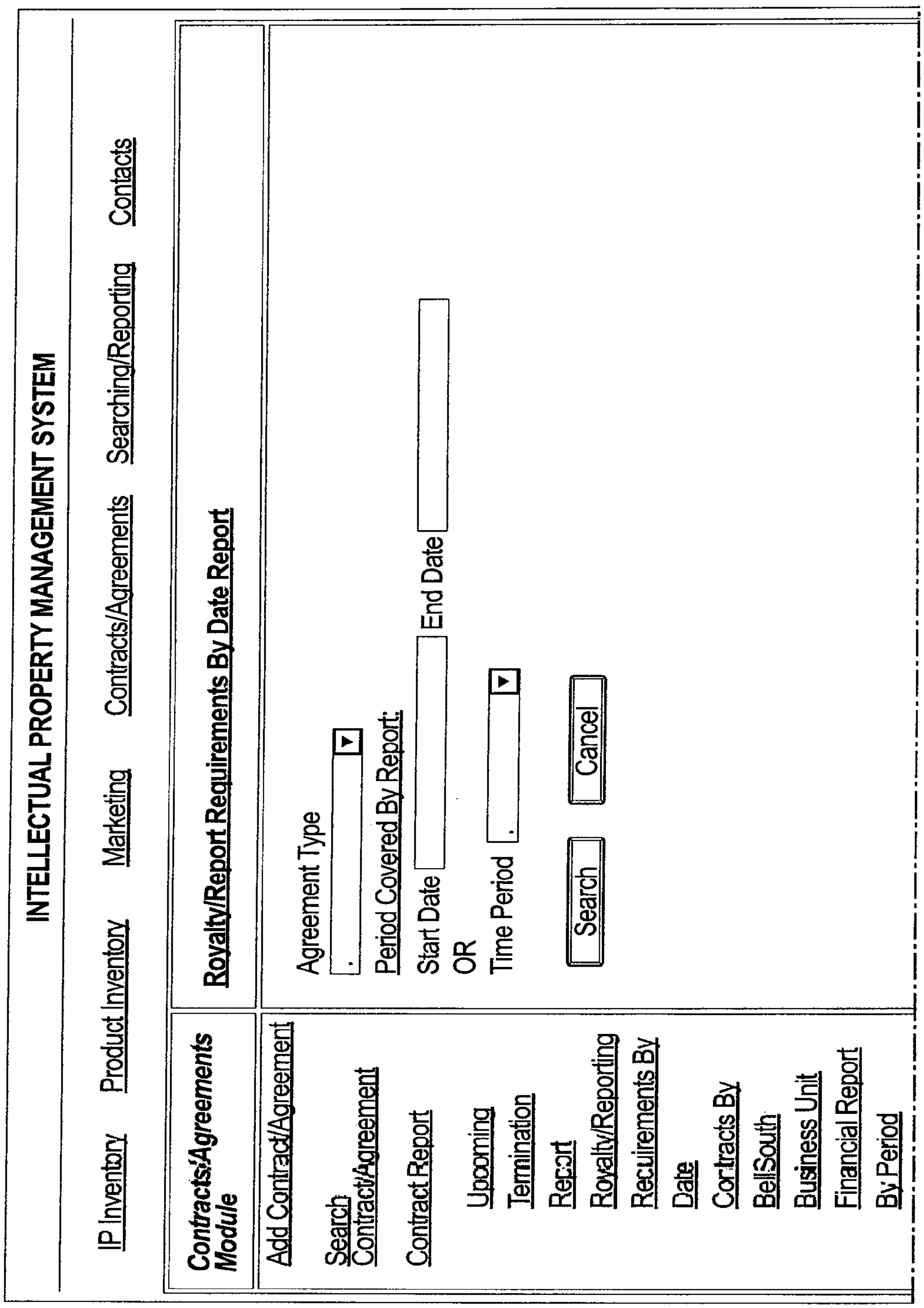

FIG. 178 shows an overview of a management of IP property marketing system 1001. The management of IP marketing system 1001 can include ten modules such as initial research module 1100, market research and analysis module 1200, pre-transaction report module 1300, marketing plan and package module 1400, product sale module 1500, contract negotiation module 1600, transaction report module 1700, contract execution module 1800, maintenance plan module 1900, and project closeout module 1950. In an embodiment, each of modules 1100-1950 can comprise a plurality of instructions to be executed by a processor to perform functions and/or steps associated with the management of IP marketing. In an embodiment, the management of IP marketing system 1001 can generate reports, prompt decision makers, provide for data storage, and perform other tasks related to the management of IP marketing.

Figure 179:
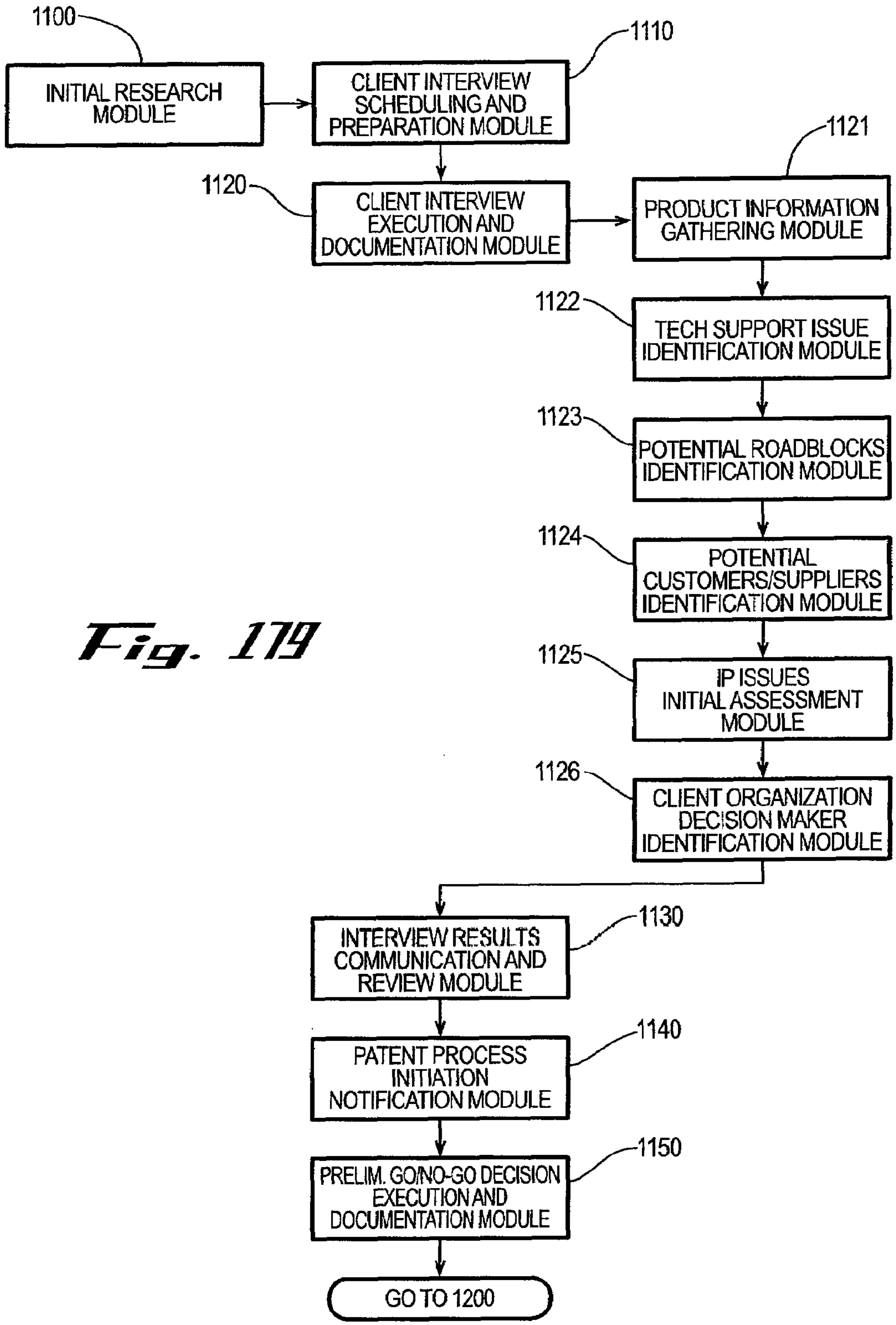
Figure 18D:
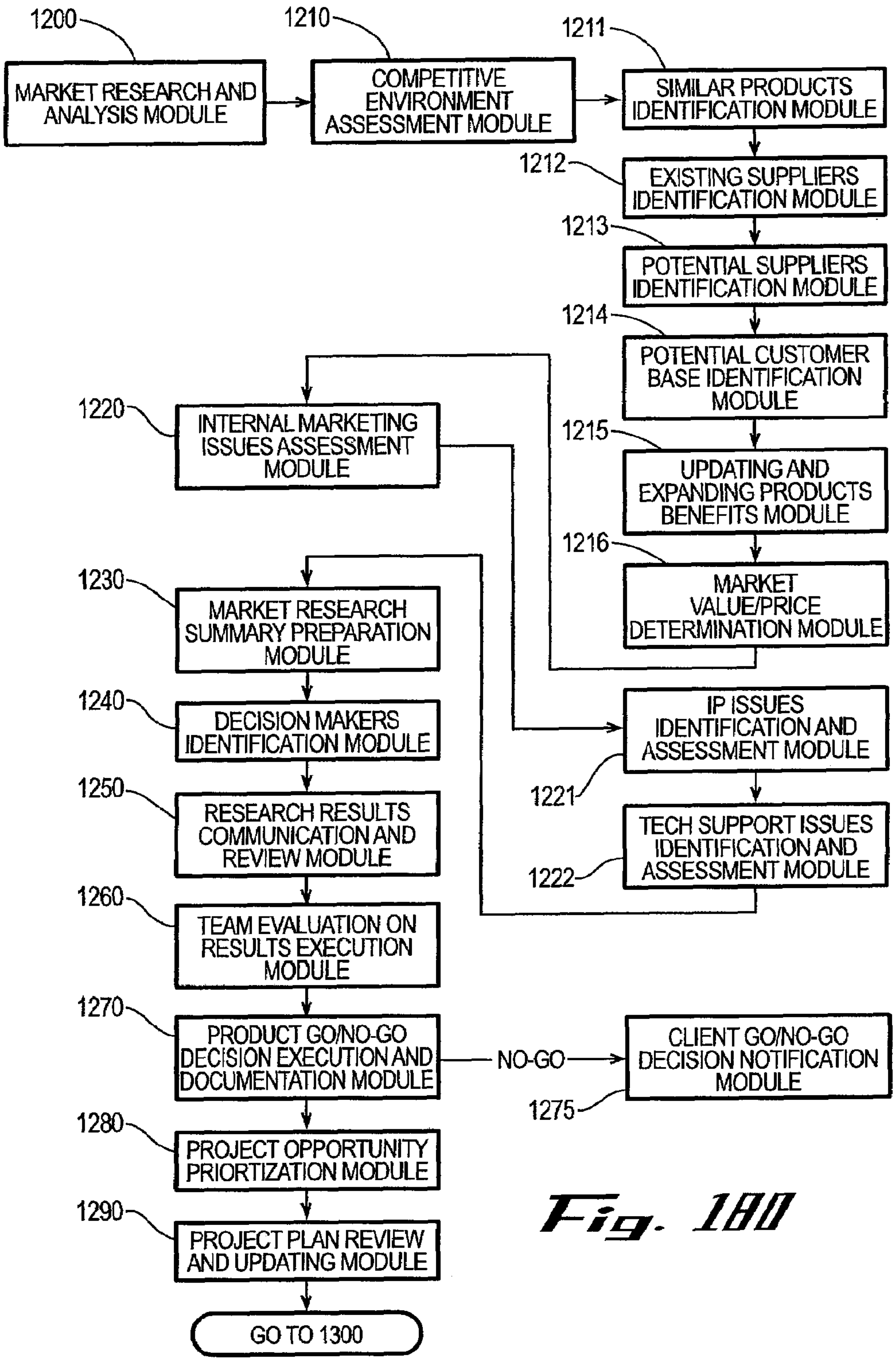

FIG. 179 shows a system level diagram of an initial research module 1100. The initial research module 1100 can perform operations related to conducting initial research regarding potential development of intellectual property. In an embodiment, initial research module 1100 includes and/or is coupled to a client interview scheduling and preparation module 1110. Client interview scheduling and preparation module 1110 can perform operations to schedule interviews with potential developers and creators of intellectual property. For example, client interview scheduling and preparation module 1110 can create and/or modify a data record corresponding to a person associated with the creation and/or development of intellectual property regarding an interview to describe a potential intellectual property unit and confirm that preparations for such an interview meeting are completed.

A client interview execution and documentation module 1120 can be coupled to the client interview schedule and preparation module 1110. The client interview execution and documentation module 1120 can create and/or modify data records regarding the execution and documentation of the client interview. In one embodiment, the client interview execution and documentation module 1120 can prompt a user as to the completion of tasks associated with the client interview and can generate a report regarding the preparation and execution of a client interview. For example, the client interview execution and documentation module 1120 can be coupled to and/or and include a plurality of submodules module. A product information gathering module 1121 can prompt, record, and/or report whether product information relating to a client interview has been gathered, recorded, and/or indexed. Technical support issue identification module 1122 can determine in part whether or not there is a technical support issue with respect to the client interview. An example of a technical support issues include installation support needed (e.g., not plug and play) and helpline assistance required. Potential roadblocks identification module 1123 can assist a user in determining whether there are any potential roadblocks regarding the client interview. Examples of potential roadblocks include intellectual property that may infringe another's IP, IP that is not yet fully operational, and senior management that may not want to sell or license the IP. Potential customers/suppliers identification module 1124 can prompt a user to identify potential customers and/or suppliers. In an embodiment, potential customers/suppliers identification module 1124 can be coupled to a database having a plurality of data records regarding potential customers and/or suppliers. In another embodiment, potential customers/suppliers identification module 1124 can allow a user to identify potential customers and/or suppliers by entering text and/or creating a data record to identify a potential customer/supplier. IP issues initial assessment module 1125 can perform an operation regarding initial assessment of IP issues. For example IP issues initial assessment module 1125 can prompt, record, and/or generate a report regarding whether there appear to be any intellectual property issues with respect to the client interview. The IP issues initial assessment module can access a listing or database of common or typical IP issues.

Another submodule of client interview and execution and document module 1120 can be client organization decision maker identification Module 1126. In an embodiment, client organization decision maker identification module 1126 will prompt a user to enter identification on the appropriate client organization decision maker regarding the potential intellectual property associated with the client interview. In another embodiment, client organization decision maker identification module 1126 can identify the client organization decision maker based upon certain parameters related to the potential intellectual property associated with the client interview.

Coupled to client interview execution and documentation module 1120 can be an interview results communication and review module 1130. In an embodiment, interview results communication and review module 1130 can prompt, record, and/or generate a report regarding whether the interview results were communicated and reviewed by appropriate client organization decision makers. Couple to interview results communication and review module 1130 can be a patent process initiation notification Module 1140. In an embodiment, patent process initiation notification module 1140 can prompt a user, record user inputs, and/or generate a report to a user regarding whether the patent process should be initiated, whether the patent process has been initiated, and whether such information has been communicated to users and/or personnel with responsibility for obtaining protection of intellectual property. In another embodiment, other intellectual property process initial notification modules can be coupled to interview results and review module. For example, a trademark process initial notification module, a trade secret initial notification module, a copyright process initiation notification module, and/or another IP related process initiation notification module can be coupled to the interview results communications and review module 1130 to perform operations regarding initiation of protection of intellectual property.

A preliminary go/no-go decision execution and documentation module II 50 can be coupled to the patent process initiation notification module 1140 and/or the interview results communications and review module 1130. In an embodiment, the preliminary go/no-go decision execution and documentation module 1150 can prompt a user, record information from a user, generate a report regarding the execution and documentation of a preliminary go/no-go decision with respect to undertaking further actions with respect to marketing of a unit of intellectual property associated with a client interview conducted per the client interview scheduling and preparation module 1110 and the client interview execution and documentation module 1120.

FIG. 180 shows a system level diagram of a market research and analysis module in accordance with an embodiment of the present invention. Market research and analysis module 1200 can be coupled to initial research module 1100. In an embodiment, market research and analysis module 1200 can include and/or be coupled to a plurality of submodules such as competitive environment assessment module 1210, internal marketing issues assessment modules 1220, market research summary preparation module 1230, decision makers identification module 1240, research results communication and review module 1250, team evaluation on results execution module 1260, product go/no-go decision execution and documentation module 1270, project opportunity prioritization module 1280, and/or project plan review and updating module 1290.

In an embodiment, competitive environment assessment module 1210 can prompt for the input of, record information relating to, and generate reports regarding a competitive environment assessment concerning the potential marketing of intellectual property. Competitive environment assessment module 1210 can include and/or be coupled to a plurality of submodules including similar products identification module 1211, existing suppliers identification module 1212, potential suppliers identification module 1213, potential customer base identification module 1214, updating and expanding product benefits module 1215, and market value/price determination module 1216. Similar product identification module 1211 can conduct operations respecting the identification of similar products corresponding to the marketing of an item of intellectual property and/or a product related to that intellectual property. Similar products identification module 1211 can include a database of records of products that can be indexed by a particular product classifications, markets, marketing strategies, competitors, and/or other factors related to marketing intellectual property. Links to online resources such as various websites, search engines, Lexis®, etc. may also be added. Existing suppliers identification module 1212 can document and/or generate an identification of existing suppliers of products related to a unit of intellectual property. Likewise, potential existing suppliers identification module 1213 can perform operations with respect to the identification of potential suppliers. In an embodiment, potential customer base identification module 1214 can perform operations with respect to identifying the potential customer base of one or more units of intellectual property. Potential customer base identification module 1214 can be coupled to the existing suppliers identification module 1212 and the potential existing suppliers identification module 1213 to generate the potential customer base identification. In an embodiment, potential customer base identification module 1214 can also receive input from a user and/or allow a user to access a database of potential customer data records. Updating and expanding product benefits module 1215 can allow and/or prompt a user to determine whether or not and how the product benefits can be updated/and or expanded. Examples of updating expanded product benefits includes faster routing of information, maintenance alarms, and first to market in this product category. Market value/price determination module 1216 can receive input from user, prompt a user for inputs, access a database of market value/price determination records, and/or generate a report regarding market value/price determination. In an embodiment, a market value/price determination module 1216 can compare the market value/price determination for a particular item of intellectual property to other intellectual property items having a market value/price determination to provide a user with potentially advantageous information. In addition, links to various websites, e-publications, and databases may be added to obtain pricing information.

Internal marketing issues assessment module 1220 can be coupled to the competitive environment assessment module 1210 and/or a sub-module of competitive environment assessment module 1210. Internal marketing issues assessment module 1220 can include and/or be coupled to a plurality of sub-modules such as IP issues identification and assessment module 1221 and tech support issues identification and assessment module 1222. In an embodiment IP issues identification and assessment module 1221 can capture customer privacy issues and product completion issues. Technical support issues identification and assessment module 1222 can capture man hour resources required for training and installation, as well as man hours required for helpline assistance.

Market research summary preparation module 1230 can generate a summary and/or a report regarding market research based on information recorded and/or generated by competitive environment assessment module 1210, internal marketing assessment module 1220 and/or other modules of the management of IP marketing systems. In an embodiment, market research summary preparation module 1230 is coupled to a decision makers identification module 1240. Decision makers identification module 1240 can access data records regarding decision makers corresponding to the marketing of intellectual property and/or can prompt a user to select criteria and/or specify appropriate decision makers. Research, results, communication and review module 1250 can prompt for, report, and store information with respect to communicating research results for review by the appropriate decision makers.

Team evaluation results execution module 1260 can receive user inputs and/or perform operations relating to evaluation of the market research and analysis by personnel associated with intellectual property marketing. Product go/no-go decision execution and documentation module 1270 can receive inputs generated at least in part based on the team evaluation results execution module 1260 and/or from a user with respect to a go/no-go decision. For example, in an embodiment, when product go/no-go decision execution documentation module 1270 determines that a no-go decision has been made. Client no-go decision notification module 1275 is accessed. In an embodiment, client no-go decision notification module 1275 can generate appropriate reports regarding a client no-go decision, update data records regarding a no-go decision, and/or inform users regarding a no-go decision.

In an embodiment, when a go decision has been made, project opportunity prioritization module 1280 can determine an opportunity prioritization rating for a project to market the intellectual property related to the go decision. In an embodiment, the opportunity prioritization rating can be based on criteria relating to the competitive environment, an internal marketing issues assessment, potential price for IP, estimated timeframe to close a deal, amount of resources needed to close a deal and so forth. In another embodiment, an opportunity prioritization can be generated based at least on part on the criteria of the opportunity scoring card illustrated in FIG. 212. Project plan review and updating module 1290 can generate an initial project plan for review and updating. In an embodiment, a project plan is based on a template and user specified information can be input to populate the project plan. In another embodiment, the project plan can retrieve and incorporate data from IP marketing databases (e.g., from databases containing records regarding potential customer base, market value/price, market research summary information, and other IP marketing information) to further populate the project plan.

Figure 181:
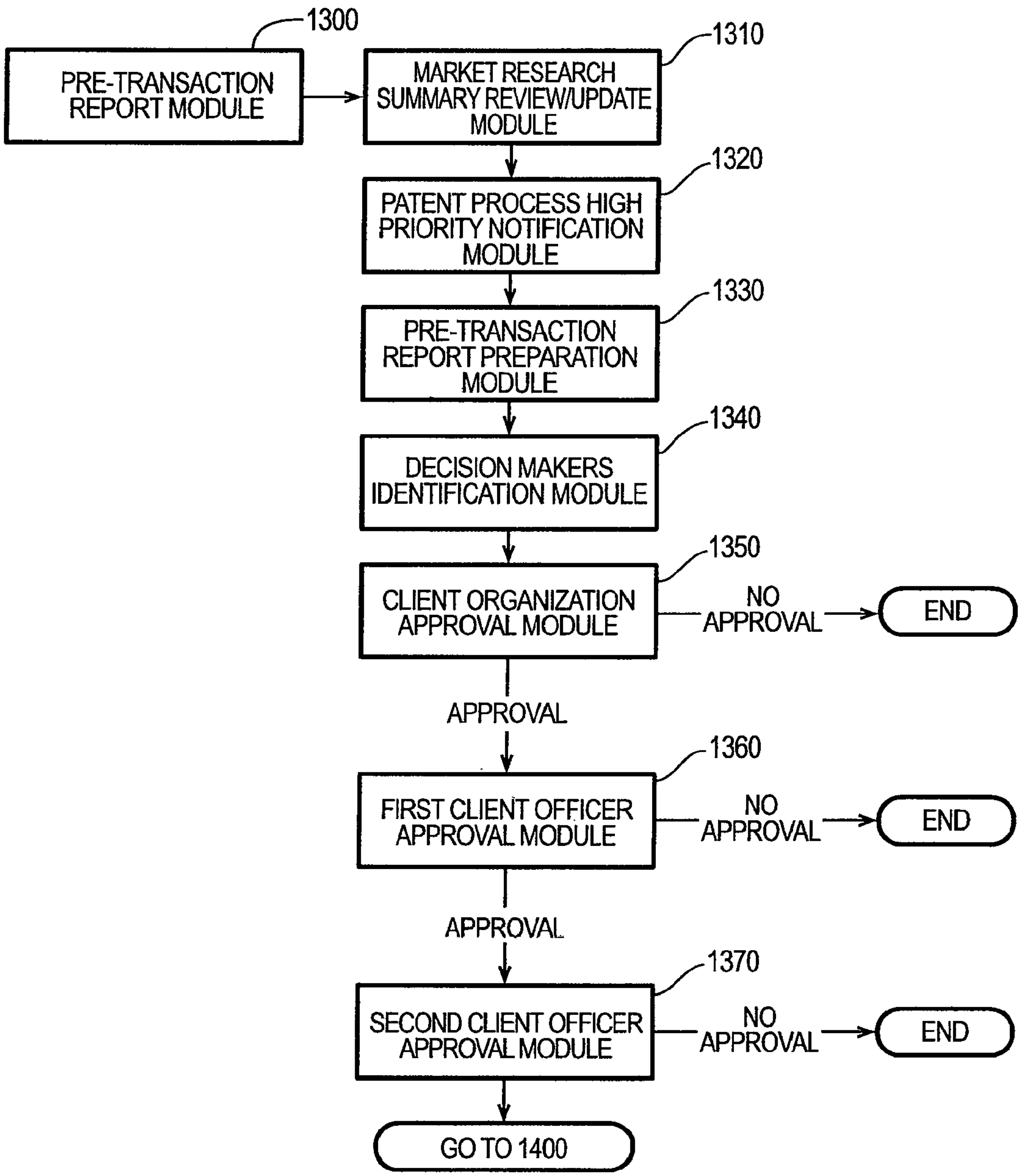

FIG. 181 is an illustration of a system level diagram of a pre-transaction report module 1300. In an embodiment, pre-transaction report module 1300 can prompt for input from users, record information from users and/or generate information and reports relating to a pre-transaction report associated with the marketing of intellectual property. Pre-transaction report module 1300 can include and/or be coupled to a plurality of submodules such as: market research summary review/update module 1310; patent process high priority notification module 1320; pre-transaction report preparation module 1330; client organization approval module 1350; first client officer approval module 1360; second client office approval module 1370.

In an embodiment, market research summary review/update module 1310 can receive information generated by market research summary preparation module 1230 illustrated in FIG. 180. Market research summary review/update module 1310 can prompt a user for additional information, receive additional information from a user, and generate a updated, if any, market research summary review/update report. In an embodiment, patent process high priority notification module 1320 can determine, for example, based on a user input and/or assessment of other criteria related to the marketing of an intellectual property unit, whether or not a high priority is to be established with respect to patenting of the intellectual property unit. Pre-transaction report preparation module 1330 can perform operations related to preparation of a pre-transaction report. In an embodiment, a pre-transaction report includes information relating to intellectual property description, market analysis, competitive analysis, financial analysis, and technical resources needed. In another embodiment, a pre-transition report includes information from the initial research module illustrated in FIG. 179 and the market research and analysis module illustrated in FIG. 188. Pre-transaction report preparation module 1330 can receive information from a user, receive information from associated databases, and/or generate a pre-transaction report. In an embodiment, decision makers identification module 1340 determines appropriate decision makers for review of a pre-transaction report generated at least in part by pre-transaction report preparation module 1330. Decision makers identification module 1340 allows a user to select appropriate decision makers. In another embodiment, decision makers identification module 1340 can determine the appropriate decision makers based on user input and/or access to decision maker identification data records.

After the appropriate decision makers are identified, a pre-transaction report generated at least in part by pre-transaction report preparation module 1330 can be sent to decision makers identified at least in part by decision makers identification module 1340. The report can be sent electronically over an Intranet, Internet, or otherwise forwarded using an e-mail system. In an embodiment, client organization approval module 1350 can determine and/or receive information regarding whether or not a client organization approval decision has been made with respect to a pre-transaction report. In an embodiment, when a no-approval decision is identified and/or received, client organization approval module 1350 can make appropriate notifications regarding the no-approval decision, generate appropriate reports regarding a no approval decision and indicate that no further action is to be taken at this time. When client organization approval module 1350 determines or receives an indication that there has been approval, first client officer approval module 1360 can determine whether or not a first client officer has approved and/or disapproved of the project described by the pre-transaction report. If the first client officer has indicated no approval, first client officer approval module 1360 can indicate that there has been a lack of approval, update any appropriate records and take no further action at this point. When the first client officer approves, second client officer approval module 1370 can determine whether or not a second client officer approves of the project described by the pre-transaction report. If there is no approval, second client officer approval module 1370 can generate the appropriate reports, send information to appropriate users, and take no further action at this point. When a second client officer has given approval, second client officer approval module 1370 can alert users, generate appropriate reports, and/or receive additional information from a user regarding further progress to be made with respect to the project described by the pre-transaction report. In other embodiments, the number and types of approving decision makers can vary.

FIG. 182 is an illustration of a system level diagram of an embodiment of a marketing plan and package module. Marketing plan and package module 1400, according to an embodiment of the present invention, can include a plurality of submodules including a marketing plan details collection module 1410, a marketing plan formulization module 1420, and a marketing materials creation module 1430. In an embodiment, marketing plan and package module 1400 can prompt users regarding creation of a marketing plan and package, receive user input regarding a marketing plan and package, and/or generate reports regarding a marketing plan and package. For example, the marketing plan and package module may contain presentations, including pricing information and IP benefits, potential customers and sales partners, including contact information and background information, etc. Marketing plan details collection module 1410 can include a plurality of submodules, such as a module for the identification and prioritization of target customers/sales partners 1411, a module for the identification and documentation of customer specific benefits 1412, a module for final valuation and price structure determination 1413, a module for channel strategy development 1414, a module for IP strategy development 1415, and a module for available technical support identification and development 1416. Each of submodules 1411 to 1416 can prompt for user input regarding the operations related to each respective module, receive user input and/or generate reports. In an embodiment, marketing plan formulization module 1420 can generate a formal marketing plan based on information received from a user such as information from the marketing plan details collection module 1410. In another embodiment, marketing plan formulization module 1420 can receive information from databases related to the marketing of intellectual property. Marketing materials creation module 1430 can generate marketing materials based on information received from marketing plan formulization module 1420. In another embodiment, marketing materials creation module 1430 can generate a marketing materials based on information received from one or more users and information received from one or more databases related to the management of intellectual property and marketing. Marketing materials creation module 1430 can include or be coupled to a sales presentation creation/customization module 1431 and/or an other marketing materials creation/customization module 1432. Sales presentation creation customization module 1431 can present information for sales presentations such as reports, presentation material, and/or prompt for information from a user regarding such sales presentations. Other marketing materials creation/customization module 1432 can create other marketing materials such as reports for users regarding other marketing materials. Examples of other marketing materials include PowerPoint presentations, brochures, and financial breakdowns.

FIG. 183 is an illustration of a system level diagram of a product sale module. In an embodiment, product sale module 1500 can include a plurality of submodules and/or can be connected to a plurality of submodules. In an embodiment, the plurality of submodules can include modules that prompt users for information, receive information from users, and generate reports relating to product sales. In an embodiment, the plurality of submodules can include a module for customer/sales partner initial contact 1510, a module for customer/sales partner non-disclosure agreement "NDA" receipt 1520, a module for sales meeting, coordination and planning 1530, a module for sales meeting execution 1540, a module for sales activities follow-up identification 1550, a module for sales activities follow-up execution 1560, a module for sales decision finalization 1570, a module for go sales decision documentation 1580, a module for project plan, review and update 1585, and/or a module for pre-negotiation activities performance 1590. In an embodiment, sales decision finalization module 1570 can receive information regarding a no-go decision and can access a no-go sales decision documentation module 1571. No go sales decision documentation module 1571 can send users information, prompt users for information, and generate reports based on a no-go sales decision.

In an embodiment, pre-negotiation activities performance module 1590 can include a plurality of submodules such as a module for meeting to discuss deal parameters, coordination, and planning 1591, a module for meeting to discuss deal parameters execution 1592, a module for term sheet preparation 1593, and a module for term sheet communication 1594. In an embodiment, the module for term sheet communication can direct and/or confirm communication of the term sheet to a department such as the contracts department.

FIG. 184 is a schematic system diagram of an embodiment of a contract negotiation module 1600. In an embodiment, contract negotiation module 1600 can include and/or be coupled to a plurality of submodules such as a customer draft contract generation module 1610 and a contract negotiation and finalization 1620. In an embodiment, customer draft contract generation module 1610 can receive user inputs, send information to users, track status information, and generate reports regarding customer draft contract generation. Likewise, contract generation and finalization module 1620 can receive information, send information, update status information, and generate reports regarding contraction negotiation and finalization.

FIG. 185 is an illustration of a system level diagram of a transaction report module. In an embodiment, transaction report module report 1700 can generate a transaction report. Transaction report module 1700 can include a plurality of submodules and/or be coupled to a plurality of submodules. The plurality of submodules, in an embodiment, can include a module for review and update of identification of decision maker 1710, a module for transaction report preparation 1720, a module for client legal approval 1730, a module for client organizational approval 1740, a module for first client officer approval 1750 and a module for second client officer approval 1760. In an embodiment, for each of modules 1730, 1740, 1750, 1760, if an indication regarding a no approval decision is received, information can be sent to users and/or reports can be generated regarding the lack of approval and suspension and/or termination of the project to market intellectual property. The report may be transmitted electronically using an e-mail system or over an Intranet or the Internet.

FIG. 186 is an illustration of a system level diagram of a contract execution module in accordance with an embodiment of the present invention. Contract execution module 1800 can include a plurality of submodules can and/or be coupled to a plurality of submodules. In an embodiment, the plurality of submodules can include a customer contract execution module 1810 and/or a client contract execution module 1820. In an embodiment, customer contract execution module 1810 can receive information, store status information, send information to users, and/or generate a report regarding customer execution of a contract related to the marketing of an intellectual property unit. Likewise, client contract execution module 1820 can receive and send information corresponding to execution of the contract to market the intellectual property unit. The contract can be transmitted electronically over an Intranet or Internet, or an e-mail system.

Figure 187:
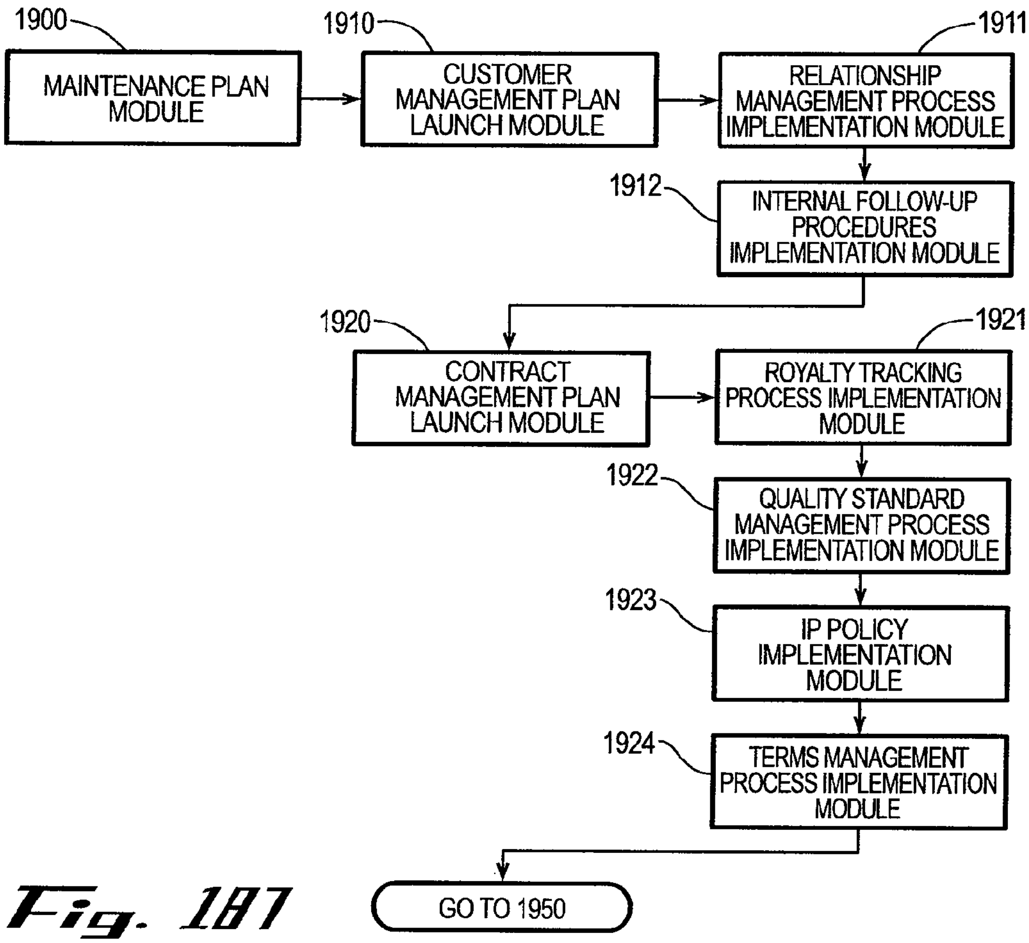

FIG. 187 is an illustration of a system diagram of an embodiment of a maintenance plan module. In an embodiment, maintenance plan module 1900 can include a plurality of submodules and/or be coupled to plurality of submodules such as customer management plan launch module 1910 and contract management plan launch module 1920. In an embodiment, customer management plan launch module 1910 can include a plurality of submodules such as a module for relationship management process implementation 1911. Examples of relationship management process implementation include operations such as key contact information and automatic Internet or Lexis® searches for updated articles and information on the customer. Internal follow-up procedures implementation module 1912 can send information, receive information, record status information, and generate reports regarding implementation of internal follow-up procedures. Examples of follow-up procedures implementation include follow-up reminder information, internal personnel familiar with the customer, and customer account representatives. Contract management plan launch module 1920 can include a plurality of submodules related to sending information, prompting for information, updating status information, and generating reports such as the module for royalty tracking process implementation 1921, a module for quality standard management process implementation 1922, a module for IP policy implementation 1923, and a module for terms management process information 1924.

Figure 188:
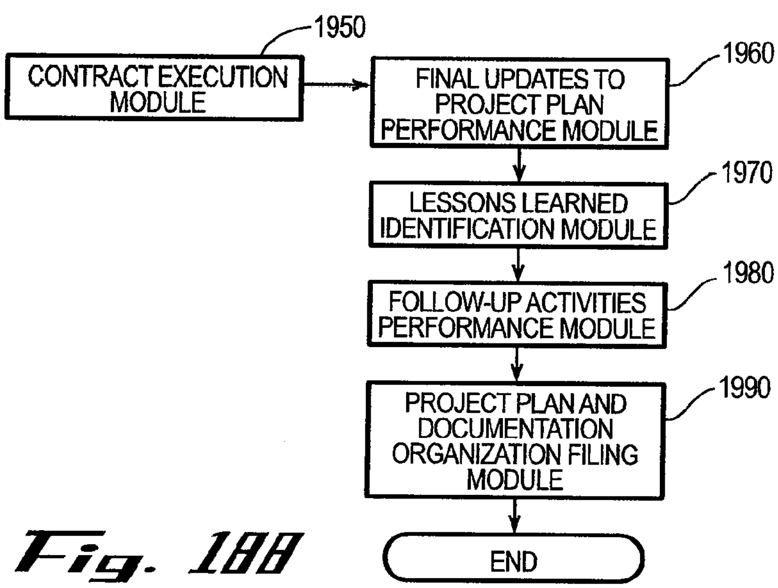

FIG. 188 is an illustration of a system diagram of a contract execution module in accordance with an embodiment of the present invention. Contract execution module 1950 can include and/or be coupled to a plurality of submodules such as a module for final updates to project plan performance 1960, a module for lessons learned identification 1970, a module for follow-up activities performance 1980, and a module for project plan and documentation organization and filing 1990.

In an embodiment, each of modules 1960 to 1990 can receive user information, prompt a user for information, send users information, and/or generate reports regarding contract execution activities such as updating project plan performance, identifying lessons learned from the project, performance of follow-up activities, and other activities and actions related to the project plan for the management of intellectual property marketing.

Section 9: Management of IP Marketing—Project Plans

FIGS. 189-212 illustrate an embodiment of the present invention that is related to methods and systems to manage the development and marketing (e.g., licensing, sale, leveraging, etc.) of various assets. Although a preferred embodiment of the present invention relates to the management of the developing and marketing intellectual property assets, other embodiments can be used in connection with developing and marketing other assets. Accordingly, the present invention should not be limited to use solely in connection with intellectual property assets. Examples of intellectual property assets (i.e., intellectual property units) include, for example, inventions, ideas, patents, trademarks, service marks, copyrights, trade secrets, data, computer code and software.

It can be readily appreciated that embodiments of the present invention may be used by a variety of different entities ranging from (i) small companies with small or modest intellectual property portfolios to (ii) large corporations having separate groups or related companies to manage the corporation's research and development efforts, managing the corporation's intellectual property assets and managing the intellectual property asset marketing efforts for the corporation. Thus, embodiments of the present invention are not limited to uses by entities that have the particular corporate and legal structures of the examples disclosed herein. As used herein: (i) the term "Owner" encompasses a corporation (e.g., parent corporation, subsidiary, affiliate, integrated corporation, and so on) that may ultimately own intellectual property assets; (ii) the term "IPMAN" encompasses the group or entity responsible for managing the intellectual property assets of the Owner; and (iii) the term "IPMARK" encompasses the group or entity responsible for marking the intellectual property assets.

In an embodiment of the present invention, a system, method or process can includes a product identification stage, a development into the marketplace stage, and a contract stage. In the various stages, tasks are identified, tracked, and recorded into a project management software program. In an embodiment, Microsoft Project® software can be utilized. However, other project management software and/or application specific software can be employed.

Each task can have an anticipated duration required to complete the task. In addition, relationships between the tasks are defined. Tasks that require a deliverable upon completion are determined, and a list of resources available for allocation to the process can be established and accessed.

FIGS. 189-190 depict an example of a project template project plan in accordance with an embodiment of the present invention. The project template plan illustrated in FIGS. 189-190 defines tasks for taking an intellectual property marketing opportunity through an advantageous multi-step process including tasks such as (i) conduct initial research, (ii) conduct market research and analysis, (iii) complete and approve pre-transaction report (PTR), (iv) develop marketing plan and package, (v) sell product, (vi) negotiate contract, (vii) complete and approve transaction report (TR), (viii) execute contract, (ix) set up maintenance plan, and (x) close out project. Each task has a predefined duration, a projected start date, a projected finish data, a predecessor (tasks before), a successor (tasks after), a percentage complete indicator, an indicator related to a deliverable (e.g., a deliverable is required, a deliverable is not expected), and a resources indicator. For example, the duration of predefined tasks can vary from 5 days (e.g., business days, calendar days) to 50 days. As another example, the resources indicator can identify resources required for completion of a task and can include resources such as a product manager, a marketing analyst, a marketing/sales representative, a contract manager, and a project lead.

In an embodiment, after completion of development of a marketing plan and package of a project plan, the project plan can be duplicated for each target customer for the product of the project plan. A separate project plan can then be employed to manage the marketing of the product to each target customer. A project can potentially end at one or more points within a project plan. For example, the complete and approve pre-transaction report task may not be completed is the requisite approval is not secured. Accordingly, execution of the project can jump to the close out project task to complete and record execution of close out tasks.

FIGS. 191-196 show a more detailed illustration of the project template plan illustrated in FIGS. 189-190. The tasks illustrated in FIGS. 189-190 can have associated subtasks and sub-subtasks (e.g., a parent task can have child tasks and grandchild tasks, a top-level task can have second-level and third-level tasks, etc.) as illustrated in FIGS. 191-196.

To assist in the implementation and completion of the various tasks and sub-tasks, predefined forms can be utilized. In an embodiment, word processing software such as Microsoft Word® can be used to create the forms, and the forms can be linked to a task associated with the form. For example, a first task can include completing a form, a second task can include communicating a completed form, a third task can include evaluating the communicated form, a fourth task can include approving the evaluated form, and a fifth task can include communicating the approved form. By creating forms and linking them to appropriate tasks, the user is provided with access to helpful and/or required resources. Moreover, standardized forms may help maintain consistency and enhance efficiency of the process, method and/or system.

FIGS. 197-212 show examples of forms that can assist in the completion of tasks. For example, such forms can be GUIs on a computer for instantaneous collection, storage and distribution as an entire form or a portion of a form. For example, as shown in FIG. 191, task 1.2 comprises "Conduct & document client interview." To assist the user in completion of that task and/or management of the task and the process, a client interview questionnaire form illustrated in FIG. 197 can be utilized. The form can be presented to the user (e.g., via a computer display, printed out as a paper form, and so forth), and the user can enter appropriate information. In an embodiment, a system stores the completed form for subsequent access, communication, and evaluation.

FIG. 198 is an illustration of a form entitled "Assess competitive environment," which is related to task 2.1 shown in FIG. 191. The "Assess competitive environment checklist" form illustrated in FIG. 198 can be presented to the user, and the user can enter appropriate information to assist the user in completion of the task and/or management of the task and the process. FIG. 199 is an illustration of a form entitled "Assess internal marketing issues," which is related to task 2.2 described in FIG. 191.

FIG. 200 shows an illustration of an embodiment of a form entitled "Intellectual Property Outmarketing Pre-Transaction Report," which is related to task 3 shown in FIG. 192. The "Intellectual Property Outmarketing Pre-Transaction Report" can be used to record information related to the product/project name, the entity requesting the potential transaction, contacts, the intellectual property assets involved, the background of the potential transaction, a financial analysis, a competitive analysis, a status, a timeline, and other related information. The pre-transaction report can advantageously allow one to capture a significant amount of valuable information in a short, simple, concise, easy to read, utilize and approve format.

For task 4.1 (entitled "Gather marketing plan details") of FIG. 192, the form entitled "Marketing Plan Checklist" illustrated in FIG. 201 can be provided. For task 5.2 (entitled "Obtain NDA from customers/sales partner") of FIG. 193, a Nondisclosure Agreement form as depicted in FIGS. 202-205 may be employed.

FIGS. 206-207 shows an embodiment of a license agreement term sheet form, which is related to at least tasks 5.10.3 (entitled "Prepare term sheet") and 5.10.4 (entitled "Communicate term sheet to Contacts") shown in FIG. 193. FIGS. 208-210 show an illustration of an embodiment of an "Intellectual Property Outmarketing Transaction Report," which is related to task 7 (entitled "Complete and approve transaction report (TR)") shown in FIGS. 193-194. Much of this information can be retrieved electronically from the information stored for the Pretransaction Report.

In an embodiment of the present invention, a user may be a project leader (e.g., a project manager, a marketing representative, a sales representative) who is at least in part responsible for and/or managing a potential transaction to market an intellectual property asset. FIG. 211 is an illustration of a project activity sheet form. In an embodiment, the project activity sheet form can be displayed to a user via a graphical user interface and can be completed by the user by entering text, selecting data from drop-down menus, selecting data from look-up tables, etc. After the user has entered project activity information, the user can save the project activity form and project data is updated based at least in part on the project activity information submitted by the user.

In another embodiment, a project leader can completes a project activity sheet form illustrated in FIG. 211 to initiate a project related to an opportunity to market an intellectual property asset. A project leader can receive a hard copy version of the project activity sheet form, enter information, and forward the project activity sheet form to a project SME ("Subject Matter Expert") to request activation of the project to define tasks, timelines, and other project criteria related to the new opportunity. The project activity form may provide the project name (e.g., in a standard format for all projects), a project start date, and assigned project resources. The project activity form may then be returned to the project leader upon activation of the project and may be used on an ongoing basis to submit updated project information to the project SME for input into the project management system. The project leader's responsibility can be to manage the project and to ensure that the project management system is updated with information concerning the project. The project leader may also be required to ensure that a file of deliverables for completed tasks is retained.

To assist a user with prioritizing amongst a plurality of opportunities to market intellectual property assets, embodiments of the present invention may include a system and/or method for opportunity scoring. FIG. 212 shows an embodiment of a method for opportunity scoring. In this embodiment, opportunity scoring permits the user to rate opportunities in a number of predetermined areas such as, for example, market potential, project time frame, projected revenue potential, competitive threat to the user, intangible value, and so on. Each of the areas are then rated on a scale of one to ten, with ten being the most favorable score. Many variables may be considered when assigning scores to an area, and the scores may be assigned either analytically or holistically. When a score is assigned analytically, the scorer can rate each of the variables in a given scoring area and average those scores to arrive at the final score in that area. When a score is assigned holistically, the scorer can assign one overall score to the scoring area. The final score for the opportunity can be calculated by adding the scores from the five major scoring areas. A graphical user interface (GUI) may be used to receive this information.

Though there are many other predetermined areas and variables, the following variables are examples of variables that may be considered in connection with each of the major scoring areas:

- Market Potential: product viability, potential customers, competitive products/suppliers, market size and market saturation;
- Project Time Frame: product ready to market, ownership/patent status, interested customers, deal complexity, anticipated time to sell/negotiate;
- Projected Revenue Potential: anticipated total revenue from the project (may be one times the value if no strong customers identified or a multiple of the value for each immediate customer);
- Competitive Threat to the User: this issue involves the determination as to whether the sales give a potential buyer of the IP units a competitive advantage over the user; and
- Intangible value: this issue involves the determination as to whether the present deal or sale set the stage for future deals, build or foster a relationship with a customer, involve a member of upper management such as an officer, etc. and/or create a public relations opportunity.

As indicated above, the entire method and/or portions of the method may be tracked and monitored using the project management methods and systems. To assist in the implementation of the method, an individual may be selected to become the project SME. The project SME can be responsible for inputting and updating any information in the project system for one or more active opportunities. In another embodiment, the project SME can be responsible for periodically reviewing reports generated by the project system to redirect resources, select certain opportunities as top priorities, and perform other management responsibilities with respect to the marketing of intellectual property assets.

Thus, from the foregoing discussion, it is apparent that embodiments of the present invention can provide an effective method for managing the development and exploitation of a variety of different assets so that a user can advantageously work toward meeting financial and business goals. In particular, embodiments of the present invention can enable a user to: more effectively allocate resources; better manage its business by actively managing timing of projects (products/deals); better distribute business opportunities among sales and marketing staff; and actively and effectively manage a multitude of opportunities. Those of ordinary skill in the art will, of course, appreciate that various changes in the details, processes, etc. which have been herein described and illustrated in order to explain the nature of the invention may be made by the skilled artisan within the principle and scope of the invention as expressed in the appended claims.

Section 10: IP Marketing Opportunity Scoring System

FIGS. 213-218 show a system level illustration of an embodiment of an IP marketing opportunity scoring module in accordance with an embodiment of the present invention.

An IP marketing opportunity scoring system can provide a scoring and/or rating system for determining an opportunity score for an IP marketing project. In an embodiment, the IP marketing opportunity score and/or rating can be used to prioritize amongst different projects and to focusing resources and/or organizational efforts. In another embodiment, the IP marketing opportunity score can provide information that can be used for IP marketing personnel to determine an estimated potential value and/or worth of an IP marketing opportunity.

Figure 213:
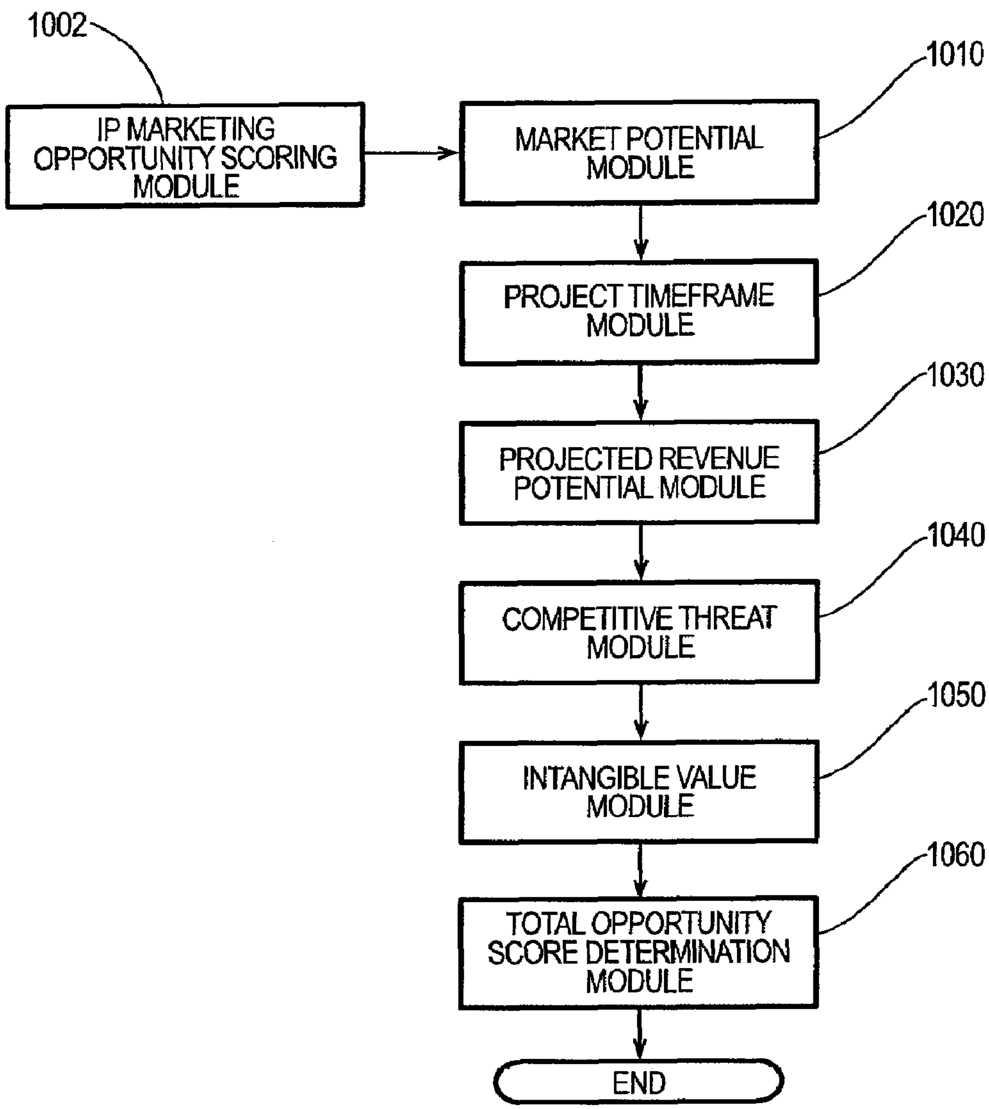
FIGS. 213-218 show system level illustrations of an embodiment of an IP marketing opportunity scoring module in accordance with an embodiment of the present invention.

FIG. 213 is a schematic diagram of an embodiment of an IP marketing opportunity scoring system 1002, which can include and/or be coupled to a plurality of submodules. In an embodiment, the plurality of submodules can include a market potential module 1010, a project timeframe module 1020, a projected revenue potential module 1030, a competitive threat module 1040, an intangible value module 1050, and a total opportunity score determination module 1060. Whereas the embodiment illustrated in FIGS. 213-218 includes six modules for the determination of an opportunity score of an IP marketing project, other embodiments of the present invention can include a greater and/or fewer number of modules and/or system components.

Figure 214:
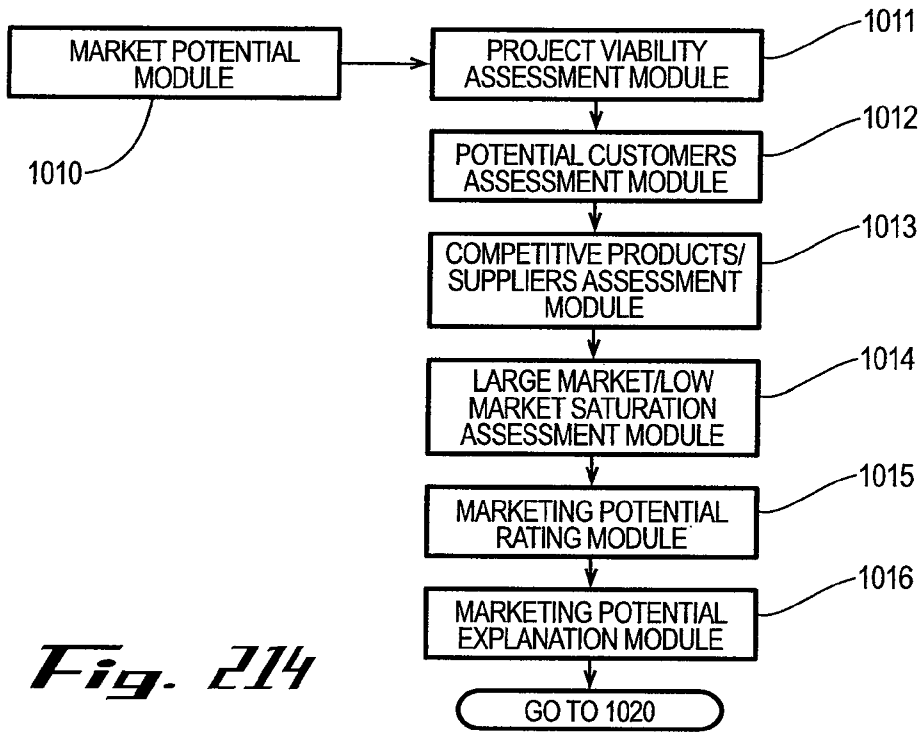

FIG. 214 shows a system level illustration of a market potential module in accordance with embodiment of the present invention. Market potential module 1010 in an embodiment comprises of plurality of instructions to receive, process, and output information corresponding to a determination of a market potential relating to the marketing of an IP unit. For example, market potential module 1010 can include a plurality of submodules such as: product viability assessment module 1011, potential customers assessment module 1012, competitive products/suppliers assessment module 1013, large market/low market saturation assessment module 1014, marketing potential rating module 1015, marketing potential explanation module 1016. In an embodiment, each of the submodules 1011-1016 can receive user input, user assessment, user selection of criteria, responses to prompts from a user, and may compare such inputs to other data of a database of information relating to, IP marketing to generate a marketing potential subscore. For example, product viability assessment module 1011, can receive an input from a user corresponding to a subjective and/or objective assessment of the product viability where the product is a unit of IP that may be and/or is being marketed. As another example, potential customers assessment module 1012 may prompt a user to input information regarding an assessment of potential customers and/or may present a user with a set of criteria that can be selected with respect to the assessment. Competitive products/suppliers assessment module 1013 can receive input from a user and compare the inputs as well as other information corresponding to the unit of IP that may be and/or is being marketed against a database of information corresponding to other units of IP that may be and/or have been marketed to generate a competitive product/suppliers assessment subscore. Marketing potential module 1010 thereby can produce and/or generate a marketing potential subscore based on quantitative and/or qualitative information received by product viability assessment module 1011, potential customers assessment module 1012, competitive products/suppliers assessment module 1013, large market/low market saturation assessment module 1014, marketing potential rating module 1015, and marketing potential explanation module 1016.

Figure 215:
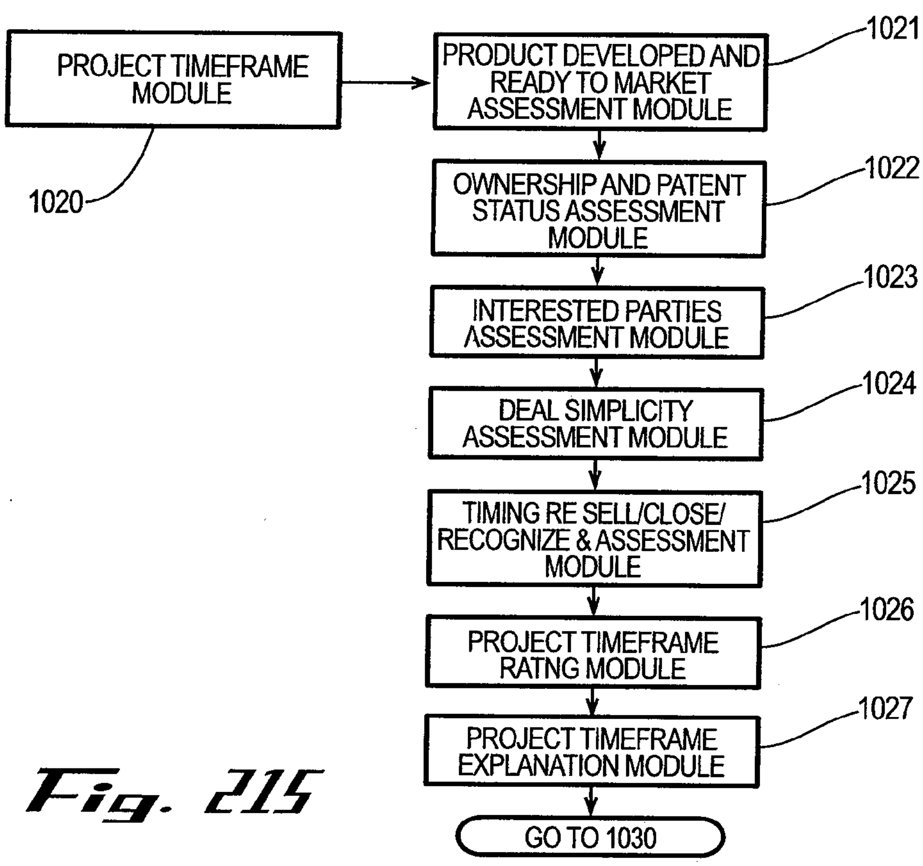

FIG. 215 shows an illustration of an embodiment of a project timeframe module 1020. According to an embodiment, project timeframe module 1020 can generate a project timeframe subscore based on information from a plurality of submodules regarding project timeframe criteria. For example, project timeframe module 1020 can generate a project timeframe subscore based on information from module 1021 that can generate a product developed and ready to market assessment, module 1022 that can generate an ownership and patent status assessment, module 1023 that can generate an interested parties assessment, module 1024 that can generate a deal simplicity assessment rating, module 1025 that can generate a timing regarding or related to sell/close/recognizes $ (money) assessment, module 1026 that can generate a project timeframe rating, and module 1027 that can generate a project timeframe explanation. In an embodiment, the assessment and/or rating can be generated based on a sliding scale, such as a scale of 1 to 10 or other sliding scales. In another embodiment, assessments and/or ratings can be based on a variety of criteria having pre-selected scale weights. For example, with respect to a deal simplicity assessment pre-selected criteria could include criteria from very simple to very complex, with variations there between.

Figure 216:
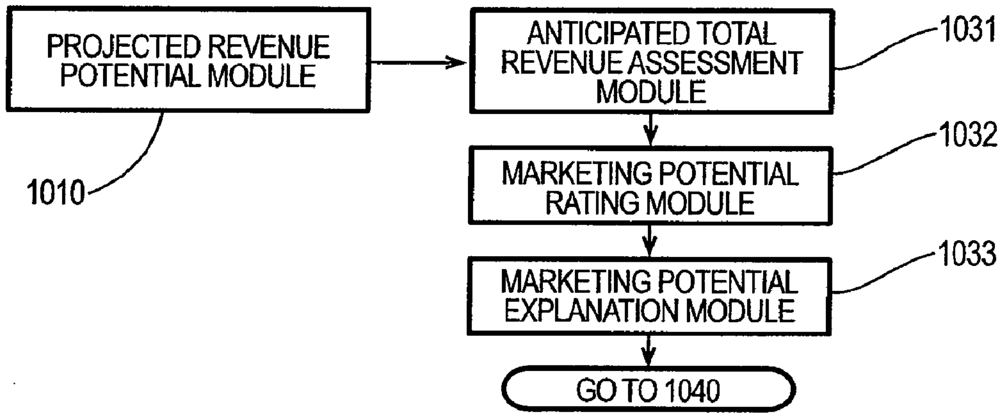

FIG. 216 shows an illustration of a system level diagram of a projected revenue potential module. Projected revenue potential module 1030 can include a plurality of submodules that can generate subscores for determination and/or generation of a projected revenue potential subscore based on user inputs and/or information from an IP marketing database. For example, in an embodiment module 1031 can generate an anticipated total revenue assessment, module 1032 can generate a marketing potential rating, and module 1033 can generate a marketing potential explanation. In an embodiment, projected revenue potential module 1030 can generate both a projected revenue potential rating and may or may not be accompanied by an explanation that can qualitatively set forth certain criteria and/or factors. For example, anticipated total revenue assessment module 1031 may generate a quantitative and/or qualitative assessment of the anticipated total revenue and can be accompanied by an explanation generated by marketing potential explanation module 1033.

Figure 217:
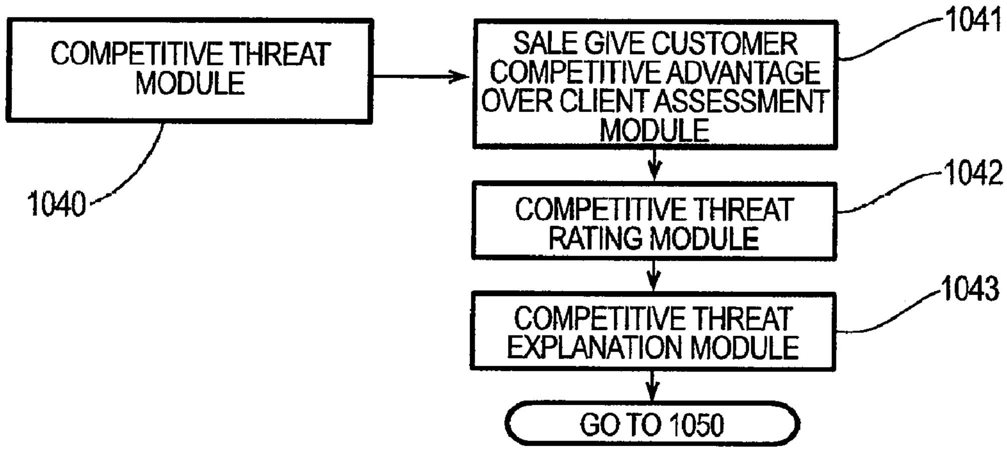

FIG. 217 shows an illustration of a system level diagram of an embodiment of competitive threat module 1040. Competitive threat module 1040 can generate a qualitative and/or quantitative assessment of a competitive threat regarding the marketing of a unit of IP. For example, in an embodiment, a competitive threat rating and/or explanation can be generated by a plurality of submodules. For example, a plurality of submodules can include module 1041 regarding whether a sale can give a customer competitive advantage over the client assessment, module 1042 to generate a competitive threat rating, and module 1043 that can generate a competitive threat explanation. For example, in an embodiment, Module 1041 regarding sale give customer competitive advantage over client assessment can generate a variable assessment regarding the competitive advantage. In another embodiment, competitive threat rating module 1042 can provide an assessment based on user input or historical data or on a combination of user input and historical data regarding a competitive threat rating. Competitive threat explanation module 1043, in an embodiment, can provide an explanation regarding the competitive threat rating and/or the customer competitive advantage assessment generated by module 1042 and module 1041, respectively.

Figure 218:
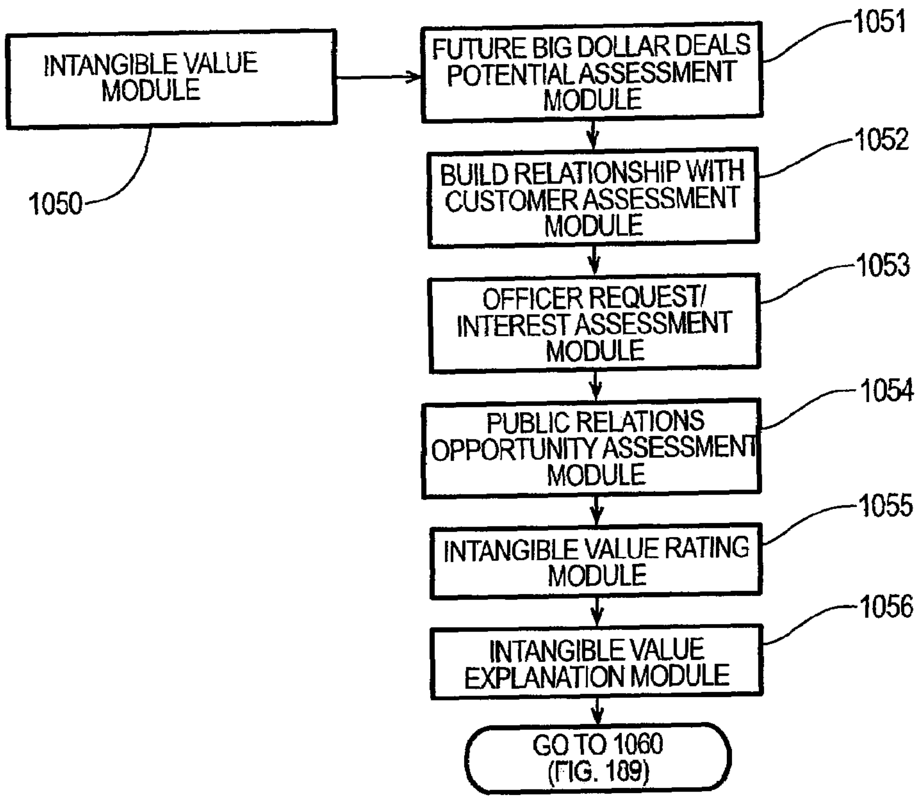

FIG. 218 shows an illustration of a system level diagram of an embodiment of an intangible value module. Intangible value module 1050, in an embodiment, can provide a qualitative and/or quantitative assessment of the tangible value regarding the marketing of a unit of IP. In an embodiment, the qualitative and/or quantitative rating of intangible value can be based on and/or generated by a plurality of submodules.

For example, the plurality of submodules can include module 1051 to provide an assessment regarding future big dollar deal potential, module 1052 regarding an assessment of whether the deal will build a relationship with the customer, module 1053 regarding a corporate officer request/interest assessment, module 1054 regarding an assessment of the public relations opportunity, module 1055 regarding an intangible value rating, and module 1056 regarding an intangible value explanation. In an embodiment, the intangible value score can be qualitative and/or quantitative and can be based on outputs generated by modules 1051-1056.

FIG. 213 shows total opportunity score determination module 1060. Total opportunity score determination module 1060 can receive subscores from each of market potential module 1010, project timeframe module 1020, projected revenue potential module 1030, competitive threat module 1040, and intangible value module 1050 to generate a total opportunity score. While the embodiment illustrated in FIG. 213 shows a serial progression of assessment, in another embodiment of the present invention, the assessment with respect to the submodules can occur in parallel and/or a mixture of in serial and/or parallel based upon a decision making process established in accordance with the organization of the IP marketing opportunity scoring system. The total opportunity score determination module 1060 can output, in an embodiment, both a qualitative and/or quantitative assessment regarding the total opportunity score of an IP marketing opportunity project.

Section 11: IP Managing Tracking System

In accordance with an embodiment of the present invention, an intellectual property tracking system can manage and track information related to IP, presenting awards to innovators for generating and submitting innovation disclosures and tracking the status of the IP. Moreover, an intellectual property awards system can further incentivize innovators to assist in the process of securing intellectual property legal rights that protect innovations.

An intellectual property awards system can include an intellectual property ("IP") awards database. The IP awards database, in an embodiment, can: track the IP awards process; track the participation of employees in the awards program; track the number of innovation disclosures processed during a given year; track the number of intellectual property applications (e.g., patent applications, trademark applications, and so on) filed during a given year; track the number of intellectual property rights (e.g., patents, trademarks, copyrights, an so forth) issued during a given year; track disclosure gifts distributed to innovators; track costs associated with the purchase of disclosure gifts; track the disposition of non-employee innovation disclosures; maintain a contact list of IP coordinators for affiliated organizations (e.g., companies, divisions, units, etc.); maintain an electronic document corresponding to participating innovators; and link database tables to produce analysis reports.

In an embodiment, an IP awards database can include a plurality of components including components such as tables, queries, forms and reports. Queries, forms and reports can be based on field properties that are first created in a table. In an embodiment, an IP awards database can include five linked tables: an awards database table; an organization (e.g., company) names table; a disclosure gift table; an inventors (i.e., innovators) table; and an IP coordinator table. The awards database table can store data relative to the incentive and monetary gifts granted to inventors. The organization (e.g., company) names table can store data relative to organizations (e.g., affiliate companies). The disclosure gift table can store data relative to gifts, such as a listing of gifts purchased, quantities, cost, and supplier. The inventors table can store data relative to an inventor such as employee contact information, employee supervisor, employer name and IP coordinator. The IP coordinator table can store data relative to a point of contact on IP matters for inventors and/or organizations.

An IP awards database form can include a plurality of sections such as a vendor (e.g., inventor, innovator) profile, a vendor input, a disclosure award, a filing award, an issuance award, a publication award, an inventor achievement award, and a general award. A vendor profile can store information associated with a particular inventor. For example, when a new record is initially opened, a cursor can default to a field labeled "Identifier". A user can press a drop-down arrow of the Identifier box, and a listing of vendor profiles that are linked to the inventors can be displayed. Each vendor in the database can been assigned a unique identifier number as a participant in the awards program. Once an inventor's name is located, it can be selected. Then, a number can appear in the Identifier box, and the inventor's address information can appear at the top of the screen in the inventor profile section. In an embodiment, the profile section is a viewing mechanism and information cannot be queried or entered. When an inventor is not shown in the Identifier box, his or her profile must be added to the Inventor table before a record can be entered and/or updated in the awards database.

In an embodiment, Table 1 includes a description of the fields in the vendor profile section.

TABLE 1

| | |
|---|---|
| FullName1: | Inventor's Full Name |
| Last Name1: | Inventor's Last Name |
| First Name1: | Inventor's First Name |
| Phone #: | Inventor's Phone # |
| Affiliate Name: | Name of Affiliate where inventor is employed |
| Suite1: | Room # of inventor's business address |
| Address 1: | Street address of inventor |
| City1: | City of inventor's street address |
| State1: | State of inventor's street address |
| Zip1: | Zip code of inventor's street address |
| Dept Head1: | VP/General Manager of department where inventor is employed |
| Supervisor1: | Supervisor of inventor |
| Last Gift Count: | Total # of disclosure gifts that employee has received from the IP Group to date |
| Verification: | Explaining if employee has retired, resigned, etc. |

Table 2, in an embodiment, includes a description of each field in the vendor input section.

TABLE 2

| | |
|---|---|
| ID: | Number automatically generated by database for each new record |
| Legal Case #: | Number assigned by IP Administrator and used to track inventor throughout awards process |
| Title: | Mr., Ms., Mrs., Dr. |
| FullName: | Inventor's Full Name |
| Last Name: | Inventor's Last Name |
| First Name: | Inventor's First Name |
| Phone #: | Inventor's Phone # |
| Affiliate Name: | Name of BellSouth Affiliate where inventor is employed |
| Suite: | Room # of inventor's business address |
| Address: | Street address of inventor |
| City: | City of inventor's street address |
| State: | State of inventor's street address |
| Zip: | Zip code of inventor's street address |

TABLE 2-continued

| | |
|---|---|
| Dept Head: | VP/General Manager of department where inventor is employed |
| Supervisor: | Supervisor of inventor |
| IP Coordinator: | IP Coordinator assigned to the company displayed in the Affiliate Name box |
| BellSouth Employee: | "1" if inventor is a BellSouth Employee; "0" if inventor is a Contractor |
| Represented Employee: | "1" if inventor is Non-management; "0" if inventor is Management |
| Signed Agreement: | Type "1" if Represented inventor has signed an IP Agreement |
| Lead Source: | Initials of IP employee that has initiated this disclosure |

Table 3 shows an example of a description of each field in the disclosure award section.

TABLE 3

| | |
|---|---|
| Disclosure Award #: | The IP Administrator provides this number. It can appear as DXX-XXX. |
| Primary Disclosure: | If only one inventor is shown on the disclosure, place "A" in this box. If there are multiple inventors, the 1st inventor can be coded as "A" and all of the subsequent inventors can be coded as "B". The database has been designed to track each unique disclosure number. Since some disclosure numbers can be used multiple times when there are numerous inventors, the coding of "A" tells the database to count the Disclosure number only once for the individual designated as the primary name on file. |
| Disclosure Count: | If only one inventor is shown on the disclosure, place a "1" in this box. If there are multiple inventors, the 1st inventor can be coded as "1" and all of the subsequent inventors can be coded as "0". The database has been designed to count each disclosure number that has a "1" in this box. Since some disclosures can have multiple inventors, the coding of "1" tells the database to count this document only once for the individual designated as the primary name on file. |
| Total # of Inventors: | Since multiple inventors of a specific idea are shown on different screens/records, this feature allows you to know the total number of inventors that are associated with a particular disclosure #. |
| Disclosure Title: | Title of the invention |
| Disclosure Rev by BIPMAN: | Date the invention was reviewed by the IP Group. The date keyed here can be taken from the Disclosure Tracking Sheet. |
| Date Submitted to Legal: | After disclosure has been keyed, the date the document is given to Legal goes here. |
| Date of Disclosure Meeting: | The IP Group Lead Source provides this date. |
| Action Date: | The IP Group Lead Source provides this date. |
| Law Firm Assigned: | This date can be found on the Disclosure Tracking Sheet |
| Current Status: | Five (5) choices are given in a drop down menu to describe the stage the disclosure is currently in. |
| Date Letter/Gift Mailed: | This date is provided by secretary when she mails the letter and disclosure gift. |
| Gift Id: | This is a unique number assigned to each disclosure gift given. |

Table 4 shows a description of each field in the filing award section.

TABLE 4

| | |
|---|---|
| Filing Award #: | This number is provided by the IP Administrator. It can appear as AXX-XXX. |
| Primary Filer: | If only one inventor is shown on the filing, place "A" in this box. If there are multiple inventors, the 1st inventor can be coded as "A" and all of the subsequent inventors can be coded as "B". The database has been designed to track each unique file award number. Since some file numbers can be used multiple times when there are numerous inventors, the coding of "A" tells the database to count the filing number only once for the individual designated as the primary name on file. |
| File Count: | If only one inventor is shown on the filing, place a "1" in this box. If there are multiple inventors, the 1st inventor can be coded as "1" and all of the subsequent inventors can be coded as "0". The database has been designed to count each file number that has a "1" in this box. Since some filings can have multiple inventors, the coding of "1" tells the database to count this document only once for the individual designated as the primary name on file. |
| Total # of Filers: | Since multiple filers of a specific idea are shown on different screens/records, this feature allows you to know the total number of inventors that are associated with a particular file award #. |
| File Title: | Title of the filed invention |
| Date of Draft Application: | This date is provided by the IP Group Lead Source |
| Date Application Filed: | This date is provided by the representing legal firm. They fax notification to IP and paperwork is processed for an inventor's award payment. |
| Provisional Application: | This date is provided by the IP Group Lead Source |
| Filing Award Sent to IPC: | The date paperwork is sent to an IPC to process an award payment |
| Filing Award Conf Received: | The date the IPC notifies the IP Administrator a payment has been processed |
| Filing Award Recognized at Banquet: | Date inventor is recognized at the annual spring IP banquet |

Table 5, in an embodiment, includes a description of each field in the issuance award section.

TABLE 5

| | |
|---|---|
| Patent Award #: | This number is provided by the IP Administrator. It can appear as AXX-XXX. |
| Primary Issued to: | If only one inventor is shown on the issuance, place "A" in this box. If there are multiple inventors, the 1st inventor can be coded as "A" and all of the subsequent inventors can be coded as a B. The database has been designed to track each unique issuance award number. Since some issuance numbers can be used multiple times when there are multiple inventors, the coding of "A" tells the database to count the issuance number only once for the individual designated as the primary name on file. |
| Patent Count: | If only one inventor is shown on the issuance, place "1" in this box. If there are multiple inventors, the 1st inventor can be coded as "1" and all of the subsequent inventors can be coded as "0". The database has been designed to count each issuance number that has a "1" in this box. Since some patents can have multiple inventors, the coding of "1" tells the database to count this document only once for the individual designated as the primary name on file. |
| # of Issues: | Since multiple inventors of a specific idea are shown on different screens/records, this feature allows you to know the total number of inventors that are associated with a particular issuance award #. |
| Patent Title: | Title of the patented invention |
| Date Patent Issued: | This date is provided by the representing legal firm |
| Issuance Award Sent to IPC: | The date paperwork is sent to an IPC to process an award payment |
| Issuance Award Conf Received: | The date the IPC notifies the IP Administrator a payment has been processed |
| Issuance Award Recognized at Banquet: | Date inventor is recognized at the annual spring IP banquet |

In an embodiment, Table 6 includes a description of each field in the publication award section.

TABLE 6

| | |
|---|---|
| Pub Award #: | This number is provided by the IP Administrator. It can appear as AXX-XXX. |
| Primary Pub Writer: | If only one writer is shown on the publication, place "A" in this box. If there are multiple writers, the 1st writer can be coded as "A" and all of the subsequent writers can be coded as "B". The database has been designed to track each unique publication award number. Since some publication numbers can be used multiple times when there are numerous writers, the coding of "A" tells the database to count the publication number only once for the individual designated as the primary name on file. |
| Publication Count: | If only one writer is shown on the publication, place "1" in this box. If there are multiple writers, the 1st inventor can be coded as "1" and all of the subsequent writers can be coded as "0". The database has been designed to count each publication number that has a "1" in this box. Since some articles can have multiple writers, the coding of "1" tells the database to count this document only once for the individual designated as the primary name on file. |
| # of Pub Writers: | Since multiple writers of an article are shown on different screens/records, this feature allows you to know the total number of writers that are associated with a particular publication award # |
| Publication Title: | Title of the published article |
| Date Article Published: | Date the article appeared in published print form |
| Recd Request for Release Form: | Date a release form was received by the IP Group from the inventor |
| Pub Award Sent to IPC: | The date paperwork is sent to an IPC to process an award payment |
| Pub Award Conf Received: | The date the IPC notifies the IP Administrator a payment has been processed |
| Pub Award Recognized at Banquet: | Date inventor is recognized at the annual spring IP banquet |

Table 7 shows a description of each field in the inventor achievement award section.

TABLE 7

| | |
|---|---|
| I A Award #: | This number is provided by the IP Administrator. It can appear as AXX-XXX. |
| I A Count: | This section cannot have multiple inventors. It is designed to recognize each inventor that has achieved multiple patent issuances; therefore, this box can always be coded "1" when an award is being processed. |
| Patent #s: | List all patent numbers that an inventor is being recognized for. |
| Date Last Patent Issued: | Date of the most recent patent that has issued. |
| Date BIPMAN Notified on Inv Ach Awd: | Date IP Administrator notifies IP Director of eligible recipients. |
| Inv Ach Awd Sent to IPC: | The date paperwork is sent to an IPC to process an award payment |
| Inv Ach Awd Conf Received: | The date the IPC notifies the IP Administrator a payment has been processed |
| Inv Ach Awd Recognized at Banquet: | Date inventor is recognized at the annual spring IP banquet |

For example, Table 8 shows a description of each field in the general award section.

TABLE 8

| | |
|---|---|
| General Award #: | This number is provided by the IP Administrator. It can appear as AXX-XXX. |
| General Count: | This section cannot have multiple inventors. It is designed to recognize each inventor that is being recognized for outstanding achievement by the IP Group; therefore, this box can always be coded "1" when an award is being processed. |
| $ Amount of Award: | Amount of the award payment. |
| General Awd Appl Recd: | Date IP Administrator notifies IP Director of eligible recipients. |
| General Awd Sent to IPC: | The date paperwork is sent to an IPC to process an award payment |
| General Awd Conf Received: | The date the IPC notifies the IP Administrator a payment has been processed |
| General Awd Recognized at Banquet: | Date inventor is recognized at the annual spring IP banquet |

In an embodiment, an IP award database includes a plurality of queries and reports that allow a user to view and/or analyze information stored in the IP award database. For example, an affiliate disclosure count query/affiliate disclosure count report can track the number of disclosures associated with each individual organization (e.g., affiliate, company, division, units, and so forth). Each time records are entered and/or updated in the awards database form, totals can be automatically tallied. A user can view results by opening and/or printing the affiliated disclosure count report.

An affiliate filing count query/affiliate filing count report can track the number of filings associated with each individual organization (e.g., affiliated company). For example, each time records are entered and/or edited in the IP awards database form, the totals can be automatically tallied. A user can view the results by opening and/or printing the affiliated filing count report. An affiliate issuance count query/affiliate issuance count report can track the number of issued patents associated with each individual organization (e.g., affiliate company). For example, each time records are entered and/or updated in the IP awards database form, the totals can be automatically tallied. A user can view the results by opening, displaying, and/or printing the affiliated issuance count report.

An awards count query/awards count report can track documented year-to-date disclosures, filings, patents, publications, inventor achievements and general awards. In an embodiment, when an award number has numerous inventors, that award number is counted only once. Each time records are entered and/or updated in the awards database form, the totals can be automatically tallied. A user can view the results by opening, printing, or causing the display of the awards count report.

In an embodiment, an affiliate query can be based at least in part on a table such as a organization (e.g., company) names table. The affiliate query allows a user to display a quick view of the IP coordinators that represent each organization (e.g., an affiliate company).

A closed disclosures query/closed disclosures report is included in an embodiment. Closed disclosures can be based at least in part by the date a disclosure was submitted to the IP legal group as indicated on the IP award database form. In an embodiment, anytime a date is entered and/or updated in this field, an identification of the disclosure can appear on the closed disclosures report. A user can view the results by opening, printing and/or causing the display of the closed disclosures report.

A closed filings query/closed filings report can be included in an embodiment. Closed filings are based at least in part on the date an inventor receives a filing award payment as indicated on the IP award database form. In an embodiment, anytime a date is entered and/or updated in this field, the filing can appear on the closed filings report. A user can view the results by opening, printing and/or causing the display of the closed filings report. An embodiment can include a closed issuances query/closed issuances report. Closed patent issuances can be based at least in part on the date an inventor receives a patent award payment as indicated on the IP award database form. When a date is entered and/or updated in this field, the issuance can appear on the closed issuances report. A user can view the results by opening, printing and/or causing the display of the closed issuances report.

A closed generals query/closed generals report can be based at least in part on the date an inventor receives a general award payment as indicated on the IP award database form. When a date is entered and/or updated in this field, the general award can appear on the closed generals report. A user can view the results by opening, printing and/or causing the display of the closed generals report. A closed publications query/closed publications report can be based at least in part on the date an inventor receives a publication award payment as indicated on the IP award database form. When a date is entered and/or updated in this field, the publication can appear on the closed publications report. A user can view the results by opening, printing and/or causing the display of the closed publications report.

In an embodiment, a closed inventor achievement query/closed inventor achievement report can be based at least in part on the date an inventor receives an achievement award as indicated on the IP award database form. When a date is entered and/or updated in this field, the inventor achievement can appear on the closed inventor achievement report. A user can view the results by opening, printing and/or causing the display of the closed inventor achievement report.

A department head query can be based on information taken from the inventors database. For example, this information can be linked to the "Dept Head" field in the vendor profile section as indicated on the IP award database form. In an embodiment, this query is for use by an IP administrator.

A disclosure gifts by inventor query/disclosure gifts by inventor report can provide information regarding all disclosure gifts sent to every inventor and the dates they were mailed. A user can view the results by opening, printing and/or causing the display of the disclosure gifts by inventor report. A year-to-date ("YTD") gift balance query/YTD gift balance report can determine the quantities of each incentive item stocked by the IP group. Each time a disclosure gift is selected for an inventor, the gift balance is adjusted in this query to reflect a decrease in stock. Current stock balances can be viewed in the YTD gift balance report. A user can access this report by opening, printing and/or causing the display of the YTD Gift Balance report.

An IP coordinator query/IP coordinator report can be linked to two other tables such as the inventors and organization (e.g., company) names table. A user can view which IP Coordinator is assigned to an organization by opening, printing and/or causing the display of the IP coordinator by organization report. A user can view which IP Coordinator is assigned to an inventor by opening, printing and/or causing the display of the IP coordinator by inventor report.

A disclosure award letter query/disclosure award letter report can process the paperwork for a disclosure award. Once an award number has been entered and/or updated into this query and saved, the associated records can be generated and displayed. This document can be linked to a Microsoft Word document that automatically generates a form letter to process an inventor award payment, and the form letter can be emailed directly to an IP coordinator. In an embodiment, a filing award letter query/filing award letter report can process the paperwork for a patent filing award. Once an award number has been entered and/or updated into this query and saved, the associated records can be displayed. This document can be linked to a Microsoft Word document that automatically generates a form letter to process an inventor award payment, and that form letter can be emailed directly to an IP coordinator.

A general award letter query/general award letter report can process the paperwork for a general award. Once an award number has been entered and/or updated into this query and saved, the associated records can be displayed. This document can be linked to a Microsoft Word document that automatically generates a form letter to process an inventor award payment, and that form letter can be emailed directly to an IP coordinator. In an embodiment, an inventor achievement award letter query/inventor achievement award letter report can process the paperwork for an inventor achievement award. Once an award number has been entered and/or updated into this query and saved, the associated records can be displayed. This document can be linked to a Microsoft Word document that automatically generates a form letter to process an inventor award payment, and the form letter can be emailed directly to an IP coordinator.

A patent award letter query/patent award letter report can process the paperwork for a patent issuance award. Once an award number has been entered and/or updated into this query and saved, the associated records can be displayed. This document can be linked to a Microsoft Word document that automatically generates a form letter to process an inventor award payment, and that form letter can be emailed directly to an IP coordinator. In an embodiment, a publication award letter query/publication award letter report can process the paperwork for a publication award. Once an award number has been entered and/or updated into this query and saved, the associated records can be displayed. This document can be linked to a Microsoft Word document that automatically generates a form letter to process an inventor award payment, and the letter can be emailed directly to an IP Coordinator.

An open filings query/open filings report can be included in an embodiment of the present invention. For example, open filings can be based at least in part on the absence of a date in the confirmed payments field as indicated on the IP award database form. A user can view the results by opening, printing and/or causing the display of the open filings report. An embodiment of an IP award database can include an open issuances query/open issuances report. Open patent issuances can be based at least in part on the absence of a date in the confirmed payments field as indicated on the IP award database form. A user can view the results by opening, printing and/or causing the display of the open issuances report.

In an embodiment, an open generals query/open generals report is included. Open generals can be based at least in part on the absence of a date in the confirmed payments field as indicated on the IP award database form. A user can view the results by opening, printing and/or causing the display of the open generals report. An embodiment of the present invention can include an open publications query/open publications report. Open publications can be based at least in part on the absence of a date in the confirmed payment field as indicated on the IP award database form. A user can view the results by opening, printing and/or causing the display of the open publications report. An open inventor achievement query/open inventor achievement report can be based at least in part on the absence of a date in the confirmed payment field as indicated on the IP award database form. A user can view the results by opening, printing and/or causing the display of the open inventor achievement report.

A year-end filing verifications query/year-end filing verifications report can be included in an embodiment. The year-end filing verifications query and report can generate a year-end summary of all patent filings during a twelve month period (e.g., a calendar year, a fiscal year, a performance period, etc.). Once the time span has been entered and/or updated into the query for the specified year, a user can view the results by printing, opening or causing the display of the year-end filing verifications report. In an embodiment, a year-end issuance verifications query/year-end issuance verifications report can generate a year-end summary of all patent issuances during a twelve month period. Once the time span has been entered and/or updated into the query for the specified year, a user can view the results by printing, opening or causing the display of the year-end issuance verifications report.

Figure 219:
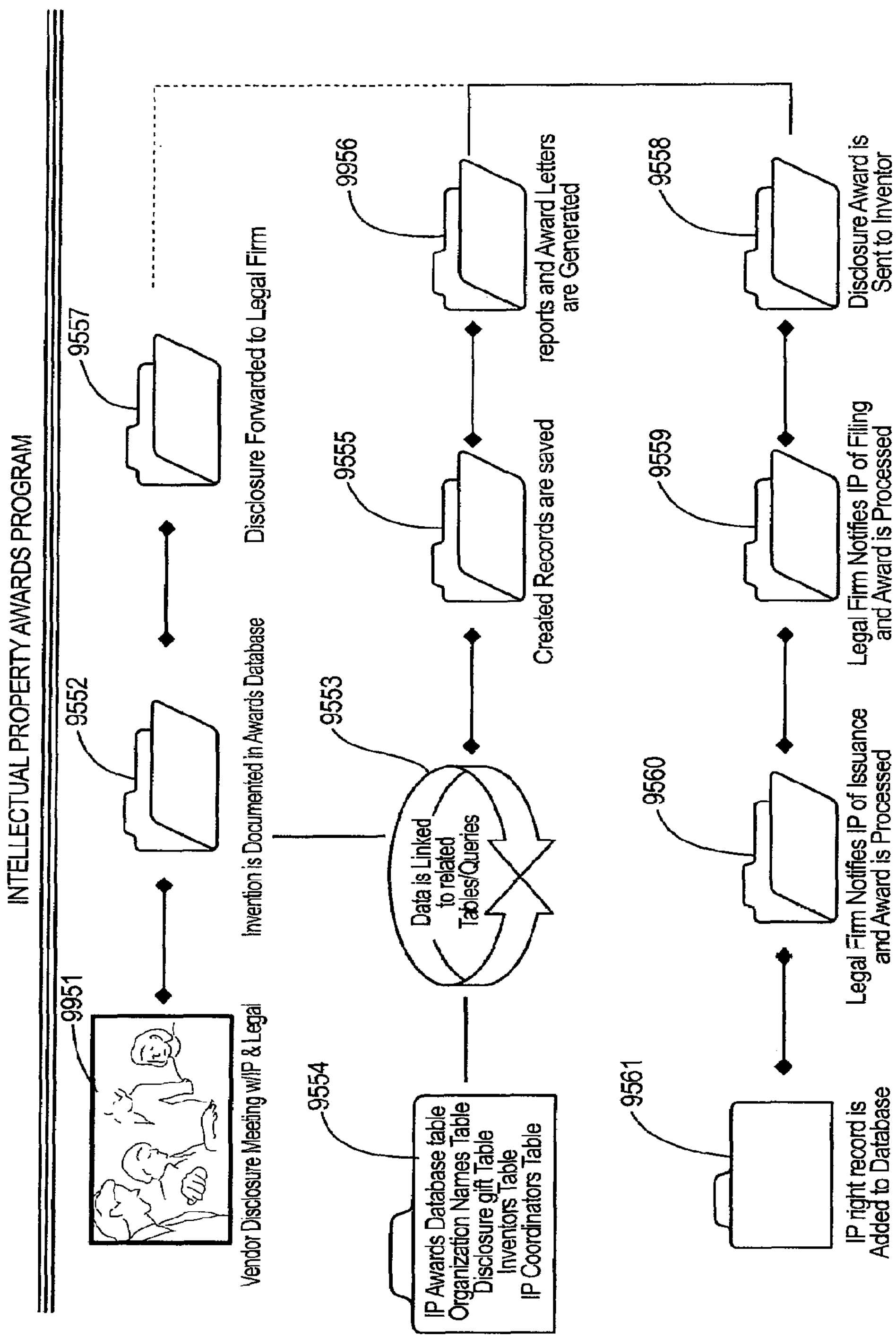
FIG. 219 shows an illustration of an embodiment of the present invention.

FIG. 219 illustrates an embodiment of the present invention. A vendor (e.g., inventor) disclosure meeting can be conducted with IP and/or legal personnel (box 9551). An innovation can be documented by entering data in an IP awards database (box 9552), and that data can be linked to related tables and/or queries (box 9553) such as one or more of an IP awards database table, an organization names table, a disclosure gift table, an inventors table, and an IP coordinators table (box 9554). The created data records can be saved (box 9555), and disclosure reports and award letters can be generated (box 9556). Disclosure forms based at least in part on the innovation can be forwarded to a legal firm (e.g., a law firm, a legal division of an organization, a patent professional, a trademark professional) (box 9557), and a disclosure award can be sent to the vendor (e.g., inventor) (box 9558). When the legal firm sends a notification (e.g., to IP personnel) that a filing based at least in part on the disclosure form has been made, a filing award for the vendor (e.g., inventor) can be processed (box 9559). When the legal firm sends a notification (e.g., to IP personnel) that an intellectual property right (e.g., a patent, trademark) based at least in part on the disclosure form has been issued, an issuance award for the vendor (e.g., inventor) can be processed (box 9560). Based at least in part on the issuance notification, an IP right record (e.g., a patent record, a trademark record) can be entered in a database (e.g., the IP awards database, a database linked to the IP awards database) (box 9561).

Section 12

An embodiment of the present invention relates to a method for the development and implementation of intellectual property marketing. A targeted innovation to fulfill an internal need can be developed, and actions can be taken to legally protect the targeted innovation as an intellectual property asset. The intellectual property asset can be analyzed to determine a marketing assessment. Based at least in part on the marketing assessment, a decision can be made as to whether to market the intellectual property asset. When the marketing assessment meets a predetermined threshold, the intellectual property asset can be marketed.

A targeted innovation to fulfill an internal need, in an embodiment, is an innovation (e.g., process, product, system, technology, business method, method of training, expression, name, slogan, and so forth) that is developed to support the core business of an organization without consideration of the use of that innovation outside of the organization. For example, an organization (e.g., company, corporation, firm, university, research institution, and so on) may develop an innovation, e.g., a billing system, a data trafficker, a maintenance protocol, for its core business without consideration at the time of development that an external organization would buy, use, or acquire.

As a further example, a targeted innovation to fulfill an internal need can be an innovation that is developed without any external customer in mind. Thus, a targeted innovation to fulfill an internal need can comprise an innovation developed without instruction for external entities, without help screens, without support plans, without external maintenance support, and/or without plans for external training, marketing, and/or advertising. In a further example, an internal need innovation can be developed without any research and development cost versus revenue assessment. In still another example, an internal need innovation can be developed without any sales or revenue projections. Moreover, developing a targeted innovation to fulfill an internal need can be based at least in part on a determination that acquiring the targeted innovation from an external source is not feasible.

Thus, in accordance with an embodiment of the present innovation, developing and implementing intellectual property marketing can include developing a targeted innovation to fulfill an internal need. Then, the organization can act to legally protect the targeted innovation as an intellectual property asset. The intellectual property asset can be analyzed to determine a marketing assessment. For example, in an embodiment, a marketing assessment can be an absolute marketing assessment as described in FIG. 212 and the accompanying written description. The absolute marketing assessment can result in a marketing decision based on predetermined thresholds, e.g., high marketing assessment results in a decision to market the intellectual property asset, and a low marketing assessment results in a decision to abandon the intellectual property asset. In another embodiment, a marketing assessment can be a relative marketing assessment where decisions on marketing are based on the relative strength of the marketing assessments. For example, even if an intellectual property asset receives a low assessment, a decision to market the intellectual property asset may be made because no other intellectual property asset received a higher assessment.

The targeted innovation, in an embodiment, can also be maintained. Examples of maintaining the targeted innovation include enhancing the targeted innovation (e.g., improving features of the innovation), and maintaining one or more intellectual property assets related to the targeted innovation (e.g., paying maintenance fees, auditing the intellectual property assets, etc.). An example of maintaining an intellectual property asset includes assessing the intellectual property asset to determine whether additional intellectual property protection should be sought (e.g., by filing a continuing application, a continuation-in-part application, a divisional application, a reissue application, another copyright registration, a child application, and so on).

Acting to legally protect the targeted innovation as an intellectual property asset can comprises acting to secure protection under an intellectual property law. However, certain intellectual property rights can arise as a matter of setting forth protectable expression (e.g., using an expression indicative of the source of the product, setting forth copyrightable expression, and so forth). Examples of intellectual property law include patent law, trademark law, copyright law, trade secret law, and contract law. Contract law can provide intellectual property protection to an innovation through the use of non-disclosure agreements ("NDAs"), agreements to take reasonable steps to keep secret, and agreements to include proper marking (e.g., confidential and proprietary).

Examples of acting to legally protect a targeted innovation can also include: directing preparation and filing of a patent application claiming at least a portion of the targeted innovation, receiving an issued patent where the issued patent is based at least in part on the patent application; directing preparation and filing of a trademark application; acting to secure copyright protection (either by operation of law (e.g., common, state, federal) or by seeking registration); taking reasonable steps to protect the targeted innovation as a trade secret; and contracting with a party to protect the targeted innovation as proprietary information.

In accordance with an embodiment of the present invention, marketing the targeted innovation can include negotiating a marketing transaction and/or executing the marketing transaction. Examples of marketing transactions include a licensing transaction, a cross-licensing transaction, a patent pooling agreement, an assignment transaction, a sales transaction, an abandonment transaction, a trade transaction, and a donation transaction.

Section 13

FIG. 220 illustrates an embodiment in accordance with the present invention. In particular, FIG. 220 shows an illustration of a company intellectual property 10-step checklist.

The company intellectual property 10-step checklist can comprise an electronic form, a graphical user interface (GUI), or a printed form. In accordance with an embodiment of the present invention, an electronic form such as one illustrated in FIG. 200 can be sent to a user via a network.

FIG. 220 shows an illustration of a 10-step checklist that can educate innovators as to intellectual property protection issues. The intellectual property protection can relate to patents, trademarks, copyrights, proprietary information, ownership issues, and marketing issues. In an embodiment, the 10-step checklist can include policy statements regarding the protection of innovations that may be patented. For example, a policy related to patent protection can state that work produced by company employees or with company resources be assessed for patentability in a number of situations. For example, when there is a development of a new product, feature, process or software that seems unique, patentability can be assessed. As another example, when improvements to existing technology, product, process or software are made, patentability may be assessed. Patentability can also be assessed when an employee or project funded with company resources results in improved efficiency and/or decreased costs. In a still further example, patentability may be accessed when a new business method is created.

A company intellectual property 10-step checklist as illustrated in FIG. 220 can educate an employee as to company policies regarding patents and prompt the employee to indicate (e.g., check-off) that the company patent policy is understood and efforts that are being made to comply with the company patent policy. FIG. 220 shows examples of company policies that can be conveyed to employees such as trademark policies, copyright policies, proprietary information policies, ownership policies, and/or marketing policies. The examples of company policies presented in FIG. 220 are illustrative of policies regarding intellectual property that can be conveyed to employees for education and compliance purposes.

Figure 221:
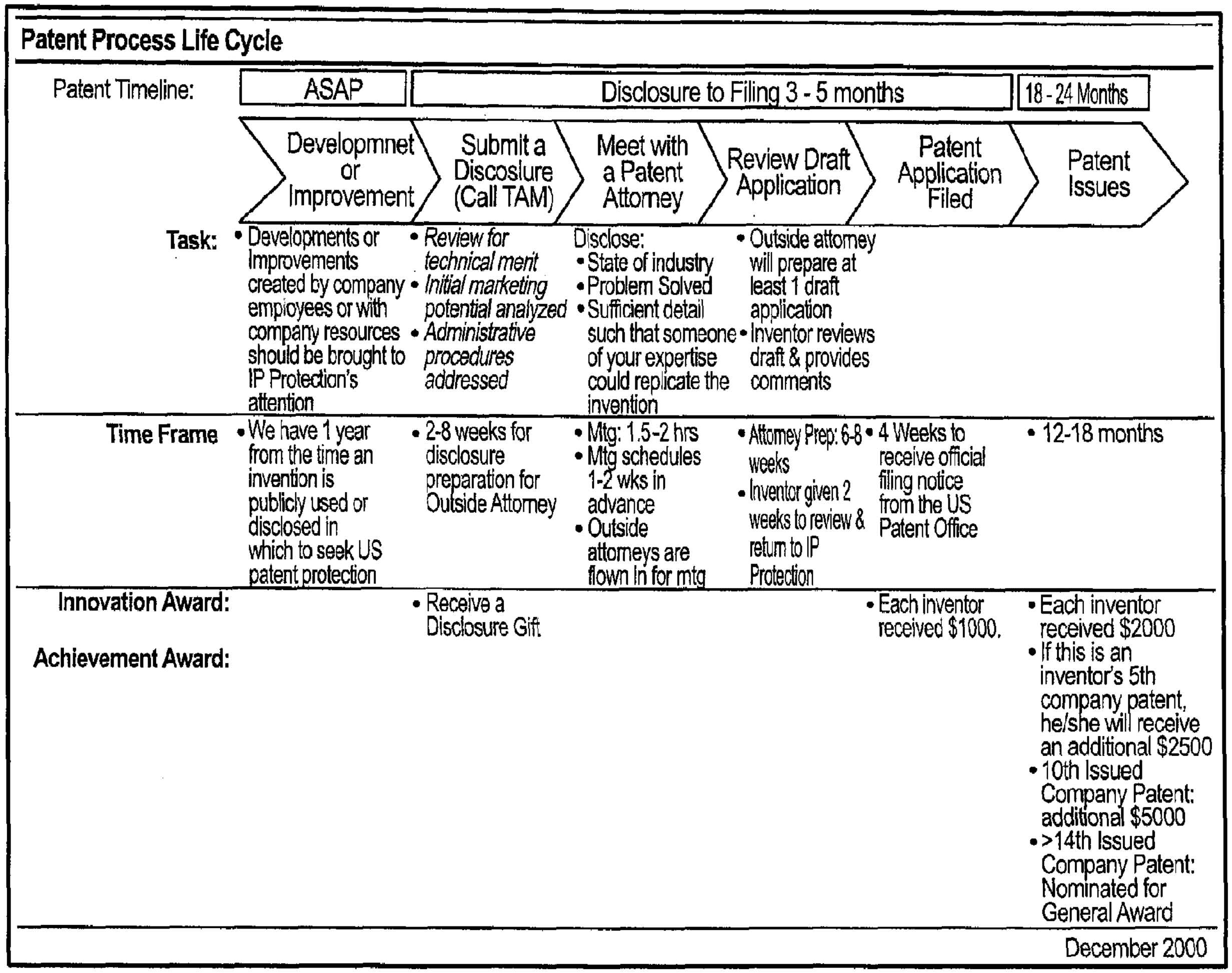
FIG. 221 shows an illustration of an embodiment of a patent process life cycle.

FIGS. 221 to 225 show examples of intellectual property protection methods in accordance with an embodiment of the present invention. FIG. 221 shows an illustration of a patent process life cycle. A patent process life cycle in accordance with an embodiment of the present invention can include a plurality of stages such as: a development or improvement stage; a submit disclosure stage; a meet with patent attorney stage; a review draft application stage; a patent application filed stage; and a patent issues stage.

In the development or improvement stage, developments or improvements created by company employees or with company resources can be brought to the attention of an intellectual property protection unit of a company. The development or improvement stage can be related to the one-year period from a time an invention is publicly used or disclosed for filing a patent application that is allowed under the United States patent law. The submit disclosure stage can include a plurality of operations such as reviewing the disclosure for technical merit, analyzing an initial marketing potential and addressing any administrative procedures relating to disclosure submission. In an embodiment, two to eight weeks for disclosure preparation can be allotted. After a disclosure is received from an innovator, a disclosure gift can be sent to the innovator to reward the innovator for submission of the disclosure and to incentivise the innovator to further submit innovation disclosures.

In the meet with patent attorney stage, a plurality of tasks can be accomplished such as disclosure by the innovator of: the state of the industry; the problems solved; and confirmation that sufficient detail has been disclosed so that another innovator with skill in the art can practice the disclosed innovation. In an embodiment, one and one-half to two hours can be allotted for a patent attorney meeting that can be scheduled one to two weeks in advance. The review draft application stage can relate to preparation of at least one draft application by an outside attorney. After an outside attorney has prepared a draft application, the innovator can review the draft and provide comments. In an embodiment, six to eight weeks can be allotted for preparation of the draft application by an attorney, and an innovator can be allotted two weeks to review the application and provide comments.

During the patent application filed stage, four weeks can be allotted to receive official notice of the filing of the patent application from the United States Patent Office. After filing of the patent application, an innovator can receive an innovation award such as a monetary gift to reward the innovator for participating in the patent application filing process and to incentivise the innovator to further cooperate in prosecution of the patent application. The patent issue stage can occur roughly twelve to eighteen months after filing of the patent application. After a patent issues, an inventor can receive a patent issuance award such as a monetary gift. Such a patent issues innovation award can award the innovator and further incentivise the innovator. In an embodiment, an innovator will receive additional innovation awards when certain milestones are met such as issuance of innovator's fifth issued patent, an innovator's tenth issued patent and an innovator's fourteenth issued patent.

Figure 222:
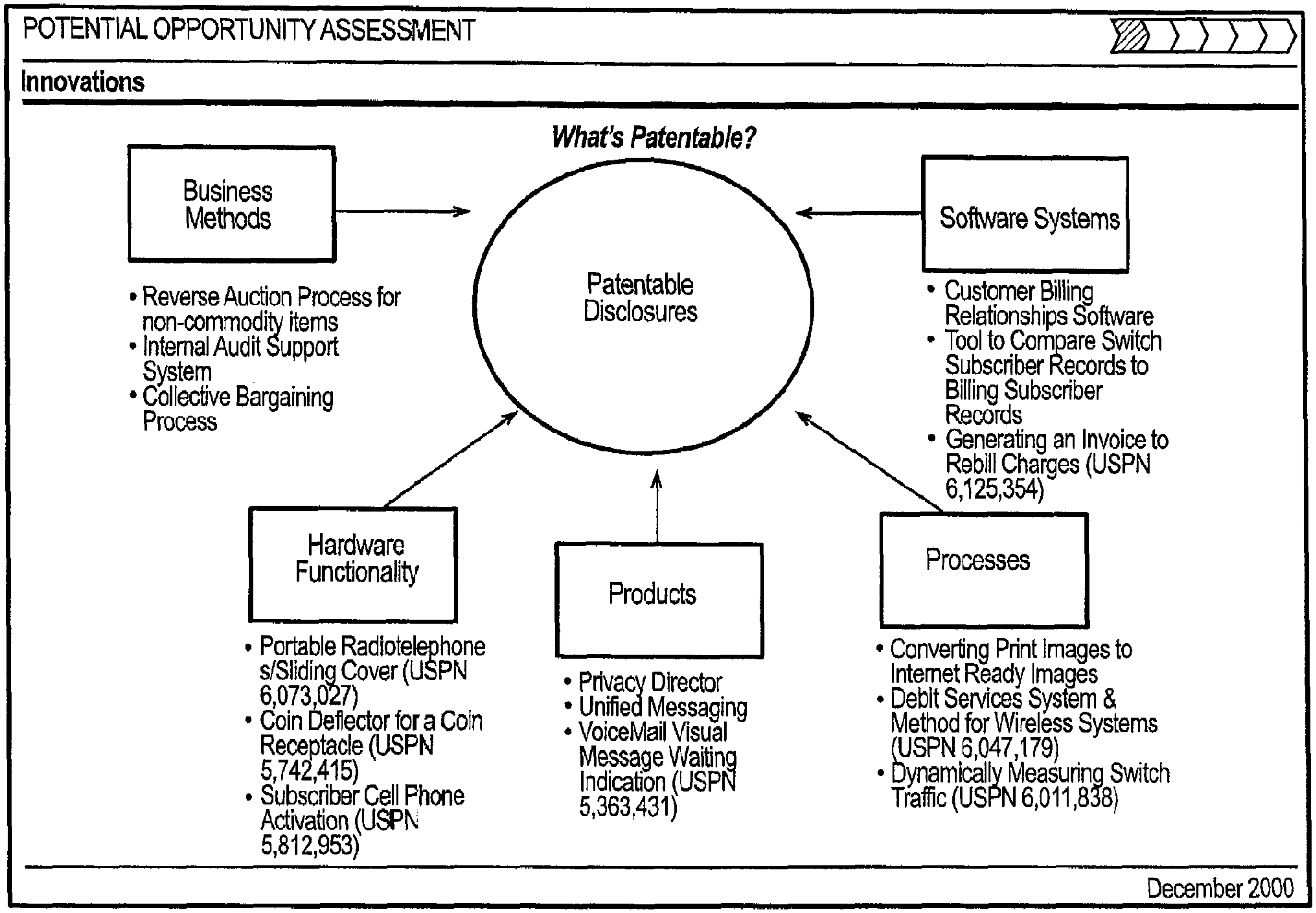
FIG. 222 illustrates an embodiment of an innovation educational form.

FIG. 222 shows an illustration of educational materials that can be presented to potential innovators with respect to patentable subject matter. As illustrated in FIG. 222, patentable disclosures can be based on business methods, hardware functionality, products, processes, and software systems. In accordance with an embodiment of the present invention, educational material such as that illustrated in FIG. 222 can be electronically presented to employees and/or potential innovators.

Figure 223:
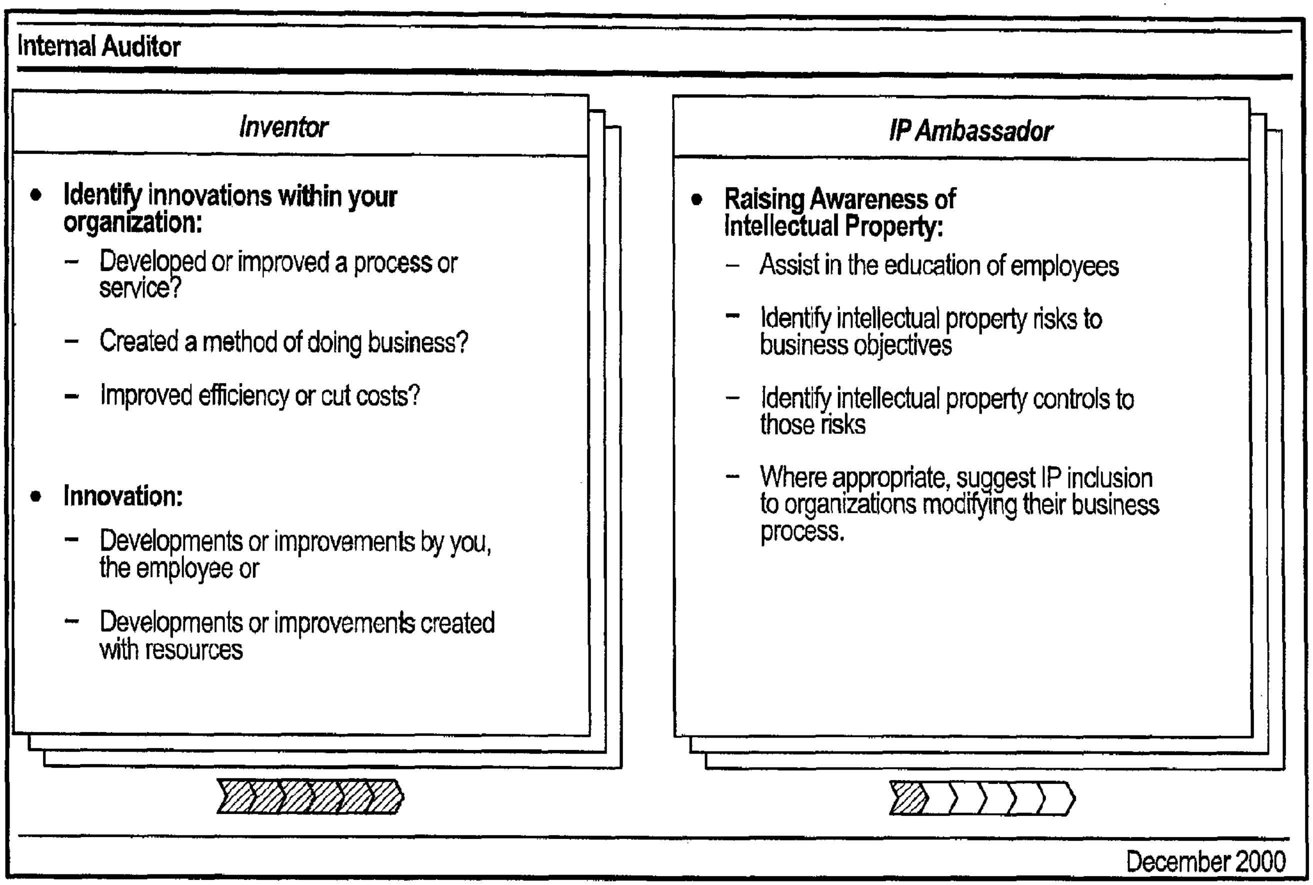
FIGS. 223-224 show illustrations of embodiments of internal intellectual property audit processes.

FIG. 223 shows an embodiment of the present invention related to an internal auditor. In accordance with an embodiment with the present invention, an internal auditor can set forth company policies and goals with respect to innovators and personnel responsible for identifying and protecting intellectual property. For example, an innovator can be informed (e.g., electronically) that he or she should identify innovations within his or her organization, such as processes or services that have been developed or improved, methods of doing business that have been created, and innovations that have cut costs or improved efficiency. The innovator can also be informed that an innovation can be a development or improvement created by a company employee or a development or improvement created with company resources. In an embodiment of the present invention, an intellectual property ambassador can be responsible for managing and protecting intellectual property. An intellectual property ambassador can raise awareness of intellectual property issues to employees regarding innovations and intellectual property. For example, an intellectual property ambassador can assist in the education of employees with respect to intellectual property issues, identify intellectual property risks to business objections, identify intellectual property controls to those risks, and suggest, where appropriate, intellectual property inclusion to organizations that modify business processes and/or methods.

Figure 224:
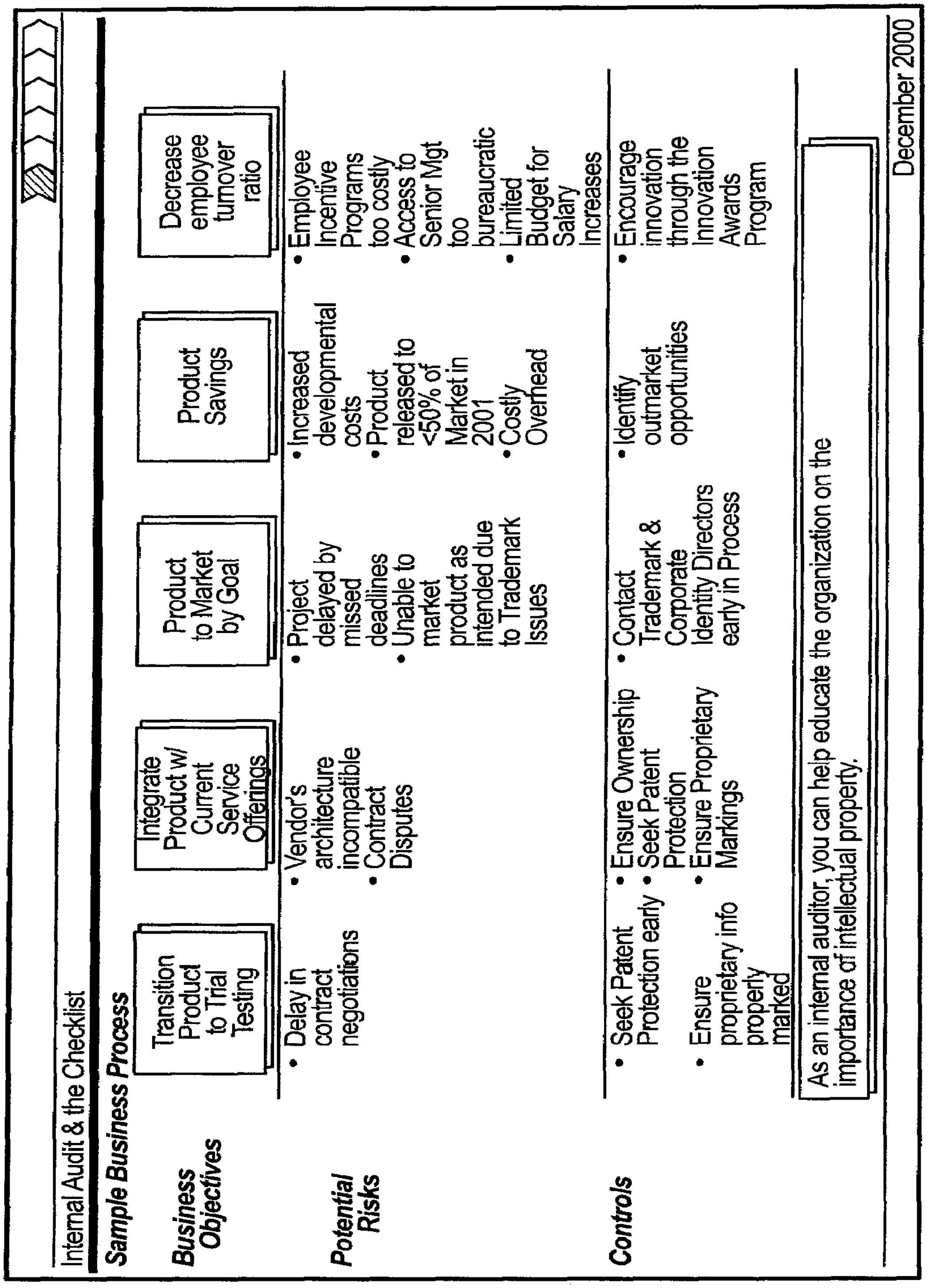

For example, FIG. 224 shows an example of an internal audit and a checklist regarding intellectual property protection. As illustrated in FIG. 224, a sample business process can have business objectives, potential risks, and controls. In an embodiment, the business objectives can include a plurality of objectives such as: transition product to trial testing; integrate product with current service offerings; product to market by deadline; produce savings; and decrease employee turnover ratio.

The transition product to trial testing objective can include potential risks such as a delay in contract negotiations. Controls related to the transition product to trial testing objective can include seeking early patent protection and insuring proprietary information is properly marked. Potential risks related to the integrate product with current service offering objective can include architecture incompatibility issues as well as contract disputes. For example, the integrate product with current services offerings objective can include controls such as ensuring intellectual property ownership, seeking patent protection, and further ensuring proprietary markings.

The potential risks associated with a product to market by deadline objective can include that the project is delayed by missed deadlines and an inability to market a product as intended due to trademark issues. Controls related to the product to market by deadline objective can include contacting a trademark and corporate identity organization early in the business process. The produced savings objective can include a plurality of potential risks such as increased developmental costs and costly overhead. Controls related to producing savings can include identifying outmarket opportunities. The decrease employee turnover ratio objective can include risks such as employee incentive programs being too costly, access to senior management being too bureaucratically controlled, and/or limited budget for employee salary increases. A control related to the decrease employee turnover ratio can be to encourage innovation through an innovation awards program.

Figure 225:
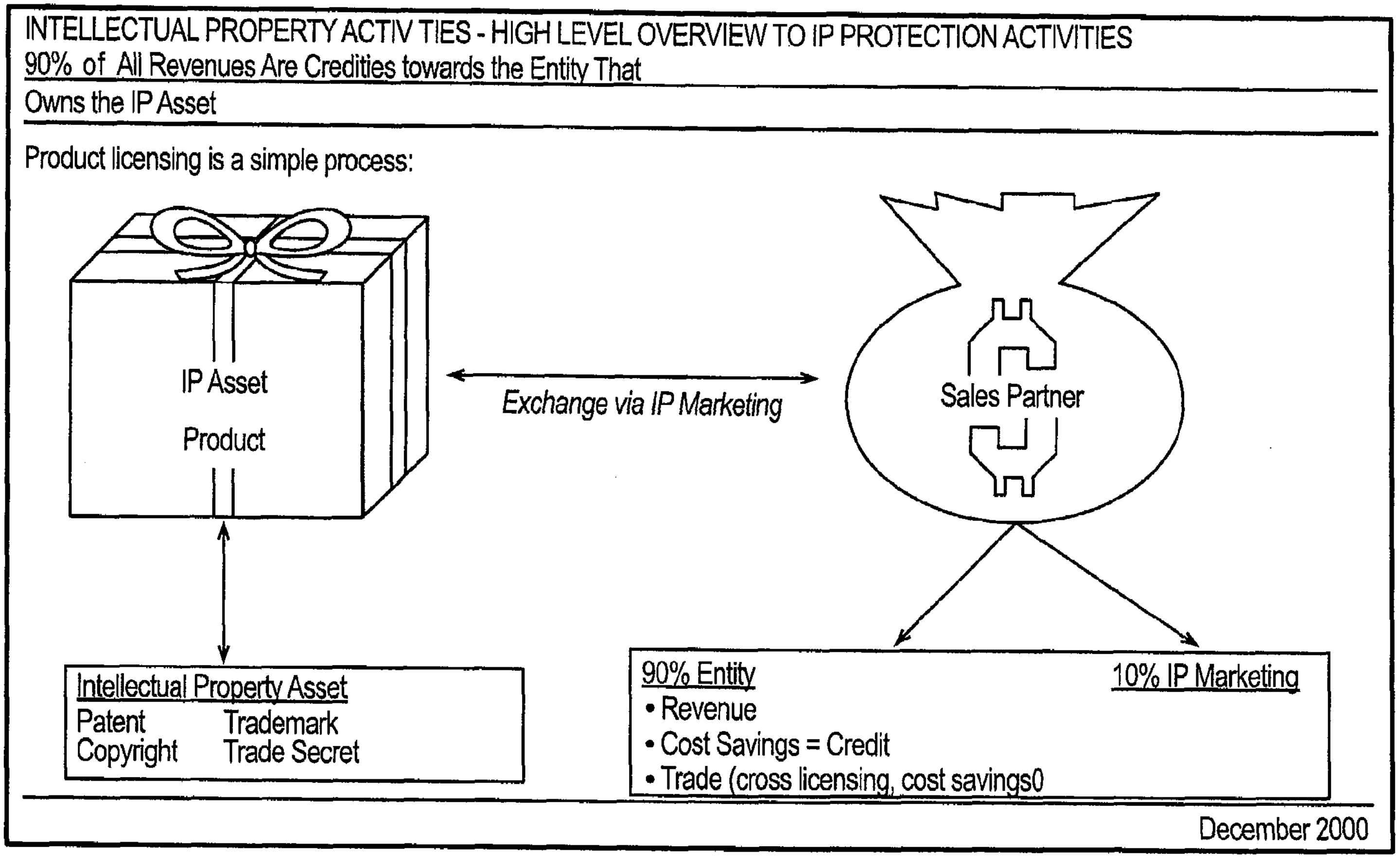
FIG. 225 shows an illustration of a high level overview of intellectual property protection activities.

FIG. 225 shows a high level overview to intellectual property protection activities in accordance with an embodiment of the present invention. FIG. 225 illustrates that in accordance with an embodiment with the present invention, 90 percent of all revenues generated by intellectual property marketing efforts can be credited toward the entity that owns the IP asset. For example, IP product licensing can be a process where an IP asset is identified and protected such as a patent, copyright, trademark and trade secret. After the IP asset is protected, the IP asset can be marketed to generate revenue, cost savings, or be used in trades related to intellectual property. For example, in an embodiment, after an IP asset is identified and protected, IP marketing can undertake marketing of the IP asset. When the IP marketing effort is successful and generates revenue, the revenue can be allocated between the entity that owns the IP asset and the IP marketing organization. For example, in an embodiment, an IP asset can be owned by one organization within a company and the IP marketing can be performed by another organization within the company.

Section 14: Additional Examples of Embodiments

Additional embodiments of the present invention are described by the following examples.

A first example includes a method for managing intellectual property assets, the method including: managing an intellectual property protection life cycle of an intellectual property asset; and managing an intellectual property marketing life cycle of the intellectual property asset.

A second example includes the first example, wherein managing the intellectual property protection life cycle of an intellectual property asset includes: identifying an innovation of an innovator; developing the innovation; initiating an intellectual property protection process to obtain an intellectual property right based at least in part on the innovation; managing the intellectual property protection process; receiving the intellectual property right; and maintaining the intellectual property right. A third example includes the second example, wherein identifying the innovation of the innovator includes conducting internal intellectual property protection awareness and education activities. A fourth example includes the second example, wherein identifying the innovation of the innovator includes identifying innovation protection opportunities. A fifth example includes the second example, wherein identifying the innovation of the innovator includes identifying one or more types of intellectual property protection for the innovation. A sixth example includes the second example, wherein identifying the innovation of the innovator includes cataloging the innovation. A seventh example includes the second example, wherein identifying the innovation of the innovator includes qualifying the innovation. An eighth example includes the second example, wherein identifying the innovation of the innovator includes generating a marketing notification based at least in part on the identified innovation. A ninth example includes the second example, wherein identifying the innovation of the innovator includes assigning an intellectual property protection team member as responsible for managing protection of the innovation. A tenth example includes the second example, wherein developing an innovation includes further educating the innovator with respect to information needed for intellectual property protection of the innovation. An eleventh example includes the second example, wherein developing an innovation includes assisting the innovator to develop the innovation to a point for intellectual property protection, the assisting including confirming that one or more legal requirements are met, the one or more legal requirements including a best mode requirement, an enablement requirement, an inventorship requirement, and taking reasonable steps to protect as a trade secret. A twelfth example includes the second example, wherein developing an innovation includes assisting one or more intellectual property marketing personnel with technical understanding related to the innovation. A thirteenth example includes the second example, wherein developing an innovation includes receiving an innovation disclosure form from the innovator. A fourteenth example includes the second example, wherein initiating an intellectual property protection process includes assessing the protectability of the innovation. A fifteenth example includes the second example, wherein initiating an intellectual property protection process includes sending a notification to one or more intellectual property protection legal personnel. A sixteenth example includes the second example, wherein initiating an intellectual property protection process includes verifying the innovator received a disclosure award. A seventeenth example includes the second example, wherein initiating an intellectual property protection process includes directing filing of an application. An eighteenth example includes the second example, wherein managing the intellectual property protection process includes verifying the innovator received an application filing award. A nineteenth example includes the second example, wherein managing the intellectual property protection process includes assisting the innovator with issues relating to using the innovation during the intellectual property protection process. A twentieth example includes the second example, wherein managing the intellectual property protection process includes generating communications regarding the status of the intellectual property protection process. A twenty-first example includes the second example, wherein managing the intellectual property protection process includes analyzing a communication regarding the status of the intellectual property protection process and generating at least a portion of a response to the communication. A twenty-second example includes the second example, wherein receiving the intellectual property right includes receiving a message regarding receipt of the intellectual property right. A twenty-third example includes the second example, wherein receiving the intellectual property right includes notifying the innovator of the receipt of the intellectual property right. A twenty-fourth example includes the second example, wherein receiving the intellectual property right includes assisting innovator in marking innovation with information corresponding to the intellectual property right. A twenty-fifth example includes the second example, wherein receiving the intellectual property right includes assisting the innovator in understanding the extent of intellectual property protection related to the intellectual property right. A twenty-sixth example includes the second example, wherein receiving the intellectual property right includes assisting the innovator in understanding the extent of intellectual property protection related to the intellectual property right. A twenty-seventh example includes the second example, wherein maintaining the intellectual property right includes verifying the innovator received an issuance award. A twenty-eighth example includes the second example, wherein maintaining the intellectual property right includes conducting internal follow-up regarding the intellectual property right. A twenty-ninth example includes the second example, wherein maintaining the intellectual property right includes conducting intellectual property policing related to the intellectual property right. A thirtieth example includes the first example, wherein managing the intellectual property marketing life cycle of the intellectual property asset includes: identifying a marketing opportunity based at least in part on the intellectual property asset; conducting initial research on the marketing opportunity; generating a pre-transaction report on the marketing opportunity; conducting negotiations for a marketing transaction based at least in part on the intellectual property asset; generating a transaction report based at least in part on the marketing transaction negotiations; executing the marketing transaction; and maintaining the marketing transaction. A thirtieth-first example includes the thirtieth example, wherein identifying the marketing opportunity includes conducting internal innovation marketing awareness and education. A thirtieth-second example includes the thirtieth example, wherein identifying the marketing opportunity includes identifying a potential marketing opportunity. A thirtieth-third example includes the thirtieth example, wherein identifying the marketing opportunity includes cataloging a potential marketing opportunity. A thirtieth-fourth example includes the thirtieth example, wherein identifying the marketing opportunity includes qualifying a potential marketing opportunity. A thirtieth-fifth example includes the thirtieth example, wherein identifying the marketing opportunity includes generating a protection notification based at least in part on the identified marketing opportunity. A thirtieth-sixth example includes the thirtieth example, wherein identifying the marketing opportunity includes assigning one or more marketing personnel to manage the marketing opportunity. A thirtieth-seventh example includes the thirtieth example, wherein conducting initial research on the marketing opportunity includes beginning market research. A thirtieth-eighth example includes the thirtieth example, wherein conducting initial research on the marketing opportunity includes conducting an interview with a subject matter expert regarding the marketing opportunity. A thirtieth-ninth example includes the thirtieth example, wherein conducting initial research on the marketing opportunity includes beginning a marketing opportunity assessment. A fortieth example includes the thirtieth example, wherein conducting initial research on the marketing opportunity includes assessing the competitive environment. A forty-first example includes the thirtieth example, wherein conducting initial research on the marketing opportunity includes performing an initial assessment of the marketing opportunity. A forty-second example includes the thirtieth example, wherein conducting initial research on the marketing opportunity includes prioritizing the marketing opportunity within a plurality of marketing opportunities. A forty-third example includes the thirtieth example, wherein conducting negotiations for a marketing transaction based at least in part on the intellectual property asset includes generating a non-disclosure agreement. A forty-fourth example includes the thirtieth example, wherein conducting negotiations for a marketing transaction based at least in part on the intellectual property asset includes confirming the initiation of an intellectual property protection process related to the intellectual property asset. A forty-fifth example includes the thirtieth example, wherein conducting negotiations for a marketing transaction based at least in part on the intellectual property asset includes determining the structure and pricing of a deal related to the marketing transaction. A forty-sixth example includes the thirtieth example, wherein generating a transaction report based at least in part on the marketing transaction negotiations includes. A forty-seventh example includes the thirtieth example, wherein executing the marketing transaction includes signing a contract. A forty-eighth example includes the thirtieth example, wherein maintaining the marketing transaction includes tracking royalties related to the marketing transaction. A forty-ninth example includes the thirtieth example, wherein maintaining the marketing transaction includes conducting internal follow-up related to the marketing transaction. A fiftieth example includes the thirtieth example, wherein maintaining the marketing transaction includes conducting quality standards management related to the marketing transaction. A fifty-first example includes the thirtieth example, wherein maintaining the marketing transaction includes conducting intellectual property policing.

A fifty-second example includes a system for managing an intellectual property asset, the system including: means for managing an intellectual property protection life cycle of an intellectual property asset; and means for managing an intellectual property marketing life cycle of the intellectual property asset.

A fifty-third example includes the fifty-second example, wherein the means for managing the intellectual property protection life cycle of an intellectual property asset includes: means for identifying an innovation of an innovator; means for developing the innovation; means for initiating an intellectual property protection process to obtain an intellectual property right based at least in part on the innovation; means for managing the intellectual property protection process; means for receiving the intellectual property right; and means for maintaining the intellectual property right. A fifty-fourth example includes the fifty-third example, wherein the means for developing the innovation includes means for receiving an innovation disclosure based at least in part on the innovation. A fifty-fifth example includes the fifty-third example, wherein the means for managing the intellectual property protection process includes means for verifying the innovator received an innovation incentive award based at least in part on the initiation of the intellectual property protection process. A fifty-sixth example includes the fifty-third example, wherein the means for receiving the intellectual property right includes means for directing the innovator to perform marking based at least in part on the intellectual property right. A fifty-seventh example includes the fifty-third example, wherein the means for managing the intellectual property marketing life cycle of the intellectual property asset includes: means for identifying a marketing opportunity based at least in part on the intellectual property asset; means for conducting initial research on the marketing opportunity; means for generating a pre-transaction report on the marketing opportunity;

means for conducting negotiations for a marketing transaction based at least in part on the intellectual property asset; means for generating a transaction report based at least in part on the marketing transaction negotiations; means for executing the marketing transaction; and means for maintaining the marketing transaction. A fifty-eighth example includes the fifty-seventh example, wherein the means for conducting initial research on the marketing opportunity includes means for prioritizing the marketing opportunity. A fifty-ninth example includes the fifty-seventh example, wherein the means for conducting negotiations for a marketing transaction based at least in part on the intellectual property asset includes means for determining transaction pricing and structure.

A sixtieth example includes a computer-readable medium storing a plurality of instructions to be executed by a processor for managing an intellectual property asset, the plurality of instructions including instructions to: manage an intellectual property protection life cycle of an intellectual property asset; and manage an intellectual property marketing life cycle of the intellectual property asset.

A sixty-first example includes the sixtieth example, wherein the instructions to manage the intellectual property protection life cycle of an intellectual property asset include instructions to: identify an innovation of an innovator; develop the innovation; initiate an intellectual property protection process to obtain an intellectual property right based at least in part on the innovation; manage the intellectual property protection process; receive the intellectual property right; and maintain the intellectual property right. A sixty-second example includes the sixtieth example, wherein the instructions to manage the intellectual property marketing life cycle of the intellectual property asset include instructions to: identify a marketing opportunity based at least in part on the intellectual property asset; conduct initial research on the marketing opportunity; generate a pre-transaction report on the marketing opportunity; conduct negotiations for a marketing transaction based at least in part on the intellectual property asset; generate a transaction report based at least in part on the marketing transaction negotiations;

execute the marketing transaction; and maintain the marketing transaction.

CONCLUSION

Embodiments of systems and methods for managing the life cycle of intellectual property have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, systems and methods in accordance with embodiments of the present invention have been described with reference to specific exemplary embodiments. Accordingly, the present specification and figures are to be regarded as illustrative rather than restrictive.

What is claimed is:

1. A computer-readable medium containing a program for use with a computer for processing data for managing protection and licensing of intellectual property rights assets, the program comprising:

receiving intellectual property rights asset protection data, wherein the intellectual property rights asset protection data includes protection data corresponding to a plurality of intellectual property rights assets, wherein each intellectual property rights asset is defined and maintained as an asset by the existence of legally-enforceable intellectual property protection rights pertaining to that intellectual property rights asset;

storing the intellectual property rights asset protection data in an intellectual property rights asset protection database including a plurality of intellectual property rights asset protection data records, wherein each intellectual property rights asset protection data record of the plurality of intellectual property rights asset protection data records in the intellectual property rights asset protection database corresponds to at least one intellectual property rights asset;

integrating, in a computer system, the intellectual property rights asset protection data with intellectual property rights asset marketability data to produce integration result data that is dependent on the integration of the intellectual property rights asset protection data and the intellectual property rights asset marketability data, wherein the integrating includes providing information from at least one intellectual property rights asset protection data record in the intellectual property rights asset protection database corresponding to at least one intellectual property rights asset to an intellectual property utilization system, determining, through user input into the intellectual property utilization system, a utilization decision regarding how the intellectual property rights asset should be utilized based upon intellectual property rights asset marketability data, and automatically updating the intellectual property rights asset protection database based upon the utilization decision; and outputting the integration result data that is dependent on the integration of the intellectual property rights asset protection data and intellectual property rights asset marketability data to at least aid a decision about the at least one intellectual property rights asset.

2. The computer-readable medium of claim 1, wherein the integrating further comprises integrating the intellectual property rights asset protection data and the intellectual property rights asset marketability data to produce a virtual intellectual property data packet associated with an intellectual property rights asset, wherein the virtual intellectual property data packet includes at least a portion of the intellectual property rights asset protection data and at least a portion of the intellectual property rights asset marketability data.

3. The computer-readable medium of claim 2, wherein the integrating further comprises mapping between the intellectual property rights asset protection data associated with an intellectual property rights asset and the intellectual property rights asset marketability data associated with the intellectual property rights asset.

4. The computer-readable medium of claim 2, wherein the integrating further comprises mapping between the intellectual property rights asset protection data associated with an intellectual property rights asset stored in the intellectual property rights asset protection database and the intellectual property rights asset marketability data associated with the intellectual property rights asset stored in an intellectual property rights asset marketability database, wherein the intellectual property rights asset protection database and the intellectual property rights asset marketability database are distinct from each other.

5. The computer-readable medium of claim 2, wherein the integrating further comprises mapping, using tagging data, between the intellectual property rights asset protection data associated with an intellectual property rights asset and the intellectual property rights asset marketability data associated with the intellectual property rights asset.

6. The computer-readable medium of claim 2, wherein the integrating further comprises mapping, using tagging data, between the intellectual property rights asset protection data associated with an intellectual property rights asset stored in the intellectual property rights asset protection database and the intellectual property rights asset marketability data associated with the intellectual property rights asset stored in an intellectual property rights asset marketability database, wherein the intellectual property rights asset protection database and the intellectual property rights asset marketability database are distinct from each other and are both indexed by a same key.

7. The computer-readable medium of claim 2, the program further comprising generating a view of the intellectual property rights asset protection data and the intellectual property rights asset marketability data included in the virtual intellectual property data packet.

8. The computer-readable medium of claim 7, wherein the generating further comprises selecting at least a portion of the intellectual property rights asset protection data and at least a portion of the intellectual property rights asset marketability data included in the virtual intellectual property data packet.

9. The computer-readable medium of claim 2, the program further comprising generating a view of the intellectual property rights asset protection data and the intellectual property rights asset marketability data included in the virtual intellectual property data packet, the view including a technology embodying the intellectual property rights asset.

10. The computer-readable medium of claim 2, the program further comprising generating a view of the intellectual property rights asset protection data and the intellectual property rights asset marketability data included in the virtual intellectual property data packet, the view including a type of intellectual property protection.

11. The computer-readable medium of claim 2, the program further comprising generating a view of the intellectual property rights asset protection data and the intellectual property rights asset marketability data included in the virtual intellectual property data packet, the view including a status of intellectual property protection.

12. The computer-readable medium of claim 1, wherein the integrating further comprises integrating the intellectual property rights asset protection data and the intellectual property rights asset marketability data to produce utilization decision data.

13. The computer-readable medium of claim 1, wherein the integrating further comprises integrating the intellectual property rights asset protection data and the intellectual property rights asset marketability data, including a potential value of the asset, to produce a recommendation to abandon the asset when the potential value is below a threshold.

14. The computer-readable medium of claim 1, wherein the integrating further comprises integrating the intellectual property rights asset protection data, including a maintenance fee schedule, and the intellectual property rights asset marketability data, including a potential value of the asset, to produce a recommendation to not pay a maintenance fee to a patent office for the asset when the potential value is below a threshold.

15. The computer-readable medium of claim 1, wherein the integrating further comprises integrating the intellectual property rights asset protection data and the intellectual property rights asset marketability data, including potential infringer data, to produce a recommendation to file a continuation patent application for the asset when a potential infringer has been identified.

16. The computer-readable medium of claim 1, the program further comprising:

- receiving, by the computer system, the intellectual property rights asset protection data from an external entity; and
- receiving, by the computer system, the intellectual property rights asset marketability data from an external entity.

17. The computer-readable medium of claim 1, the program further comprising:

- receiving, by the computer system, the intellectual property rights asset protection data from a user; and
- receiving, by the computer system, the intellectual property rights asset marketability data from a user.

18. The computer-readable medium of claim 1, the program further comprising:

- receiving, by the computer system, the intellectual property rights asset protection data from another computer system; and
- receiving, by the computer system, the intellectual property rights asset marketability data from another computer system.

19. The computer-readable medium of claim 1, the program further comprising:

- accessing, by the computer system, the intellectual property rights asset protection data; and
- accessing, by the computer system, the intellectual property rights asset marketability data.

20. An apparatus configured to process data for managing protection and licensing of intellectual property rights assets, the apparatus comprising:

- at least one memory having stored thereon program code; and at least one processor that is programmed by at least the program code to enable the apparatus to:

receive intellectual property rights asset protection data, wherein the intellectual property rights asset protection data includes protection data corresponding to a plurality of intellectual property rights assets, wherein each intellectual property rights asset is defined and maintained as an asset by the existence of legally-enforceable intellectual property protection rights pertaining to that intellectual property rights asset;

store the intellectual property rights asset protection data in an intellectual property rights asset protection database including a plurality of intellectual property rights asset protection data records, wherein each intellectual property rights asset protection data record of the plurality of intellectual property rights asset protection data records in the intellectual property rights asset protection database corresponds to at least one intellectual property rights asset;

integrate the intellectual property rights asset protection data with intellectual property rights asset marketability data to produce integration result data that is dependent on the integration of the intellectual property rights asset protection data and the intellectual property rights asset marketability data, wherein the integration includes providing information from at least one intellectual property rights asset protection data record in the intellectual property rights asset protection database corresponding to at least one intellectual property rights asset to an intellectual property utilization system, determining, through user input into the intellectual property utilization system, a utilization decision regarding how the intellectual property rights asset should be utilized based upon intellectual property rights asset marketability data, and automatically updating the intellectual property rights asset protection database based upon the utilization decision; and output the integration result data that is dependent on the integration of the intellectual property rights asset protection data and intellectual property rights asset marketability data to at least aid a decision about the at least one intellectual property rights asset.

21. The apparatus of claim 20, wherein the at least one processor is further programmed to enable the apparatus to integrate the intellectual property rights asset protection data and the intellectual property rights asset marketability data to produce a virtual intellectual property data packet associated with an intellectual property rights asset, wherein the virtual intellectual property data packet includes at least a portion of the intellectual property rights asset protection data and at least a portion of the intellectual property rights asset marketability data.

22. The apparatus of claim 21, wherein the at least one processor is further programmed to enable the apparatus to map between the intellectual property rights asset protection data associated with an intellectual property rights asset and the intellectual property rights asset marketability data associated with the intellectual property rights asset.

23. The apparatus of claim 21, wherein the at least one processor is further programmed to enable the apparatus to: map between the intellectual property rights asset protection data associated with an intellectual property rights asset stored in the intellectual property rights asset protection database and the intellectual property rights asset marketability data associated with the intellectual property rights asset stored in an intellectual property rights asset marketability database, wherein the intellectual property rights asset protection database and the intellectual property rights asset marketability database are distinct from each other.

24. The apparatus of claim 21, wherein the at least one processor is further programmed to enable the apparatus to map, using tagging data, between the intellectual property rights asset protection data associated with an intellectual property rights asset and the intellectual property rights asset marketability data associated with the intellectual property rights asset.

25. The apparatus of claim 21, wherein the at least one processor is further programmed to enable the apparatus to map, using tagging data, between the intellectual property rights asset protection data associated with an intellectual property rights asset stored in the intellectual property rights asset protection database and the intellectual property rights asset marketability data associated with the intellectual property rights asset stored in an intellectual property rights asset marketability database, wherein the intellectual property rights asset protection database and the intellectual property rights asset marketability database are distinct from each other and are both indexed by a same key.

26. The apparatus of claim 21, wherein the at least one processor is further programmed to enable the apparatus to generate a view of the intellectual property rights asset protection data and the intellectual property rights asset marketability data included in the virtual intellectual property data packet.

27. The apparatus of claim 26, wherein the at least one processor is further programmed to enable the apparatus to select at least a portion of the intellectual property rights asset protection data and at least a portion of the intellectual property rights asset marketability data included in the virtual intellectual property data packet.

28. The apparatus of claim 21, wherein the at least one processor is further programmed to enable the apparatus to generate a view of the intellectual property rights asset protection data and the intellectual property rights asset marketability data included in the virtual intellectual property data packet, the view including a technology embodying the intellectual property rights asset.

29. The apparatus of claim 21, wherein the at least one processor is further programmed to enable the apparatus to generate a view of the intellectual property rights asset protection data and the intellectual property rights asset marketability data included in the virtual intellectual property data packet, the view including a type of intellectual property protection.

30. The apparatus of claim 21, wherein the at least one processor is further programmed to enable the apparatus to generate a view of the intellectual property rights asset protection data and the intellectual property rights asset marketability data included in the virtual intellectual property data packet, the view including a status of intellectual property protection.

31. The apparatus of claim 20, wherein the at least one processor is further programmed to enable the apparatus to integrate the intellectual property rights asset protection data and the intellectual property rights asset marketability data to produce utilization decision data.

32. The apparatus of claim 20, wherein the at least one processor is further programmed to enable the apparatus to integrate the intellectual property rights asset protection data and the intellectual property rights asset marketability data, including a potential value of the asset, to produce a recommendation to abandon the asset when the potential value is below a threshold.

33. The apparatus of claim 20, wherein the at least one processor is further programmed to enable the apparatus to integrate the intellectual property rights asset protection data, including a maintenance fee schedule, and the intellectual property rights asset marketability data, including a potential value of the asset, to produce a recommendation to not pay a maintenance fee to a patent office for the asset when the potential value is below a threshold.

34. The apparatus of claim 20, wherein the at least one processor is further programmed to enable the apparatus to integrate the intellectual property rights asset protection data and the intellectual property rights asset marketability data, including potential infringer data, to produce a recommendation to file a continuation patent application for the asset when a potential infringer has been identified.

35. The apparatus of claim 20, wherein the at least one processor is further programmed to enable the apparatus to receive the intellectual property rights asset protection data from an external entity; and receive the intellectual property rights asset marketability data from an external entity.

36. The apparatus of claim 20, wherein the at least one processor is further programmed to enable the apparatus to:

receive the intellectual property rights asset protection data from a user; and receive the intellectual property rights asset marketability data from a user.

37. The apparatus of claim 20, wherein the at least one processor is further programmed to enable the apparatus to:

receive the intellectual property rights asset protection data from another computer system; and receive the intellectual property rights asset marketability data from another computer system.

38. The apparatus of claim 20, wherein the at least one processor is further programmed to enable the apparatus to:

access the intellectual property rights asset protection data; and access the intellectual property rights asset marketability data.

39. A method for processing data for managing protection and licensing of intellectual property rights assets, the method comprising:

receiving intellectual property rights asset protection data, wherein the intellectual property rights asset protection data includes protection data corresponding to a plurality of intellectual property rights assets, wherein each intellectual property rights asset is defined and maintained as an asset by the existence of legally-enforceable intellectual property protection rights pertaining to that intellectual property rights asset;

storing the intellectual property rights asset protection data in an intellectual property rights asset protection database including a plurality of intellectual property rights asset protection data records, wherein each intellectual property rights asset protection data record of the plurality of intellectual property rights asset protection data records in the intellectual property rights asset protection database corresponds to at least one intellectual property rights asset;

integrating, in a computer system, the intellectual property rights asset protection data with intellectual property rights asset marketability data to produce integration result data that is dependent on the integration of the intellectual property rights asset protection data and the intellectual property rights asset marketability data, wherein the integrating includes providing information from at least one intellectual property rights asset protection data record in the intellectual property rights asset protection database corresponding to at least one intellectual property rights asset to an intellectual property utilization system, determining, through user input into the intellectual property utilization system, a utilization decision regarding how the intellectual property rights asset should be utilized based upon intellectual property rights asset marketability data, and automatically updating the intellectual property rights asset protection database based upon the utilization decision; and outputting the integration result data that is dependent on the integration of the intellectual property rights asset protection data and intellectual property rights asset marketability data to at least aid a decision about the at least one intellectual property rights asset.

40. The method of claim 39, wherein the integrating further comprises integrating the intellectual property rights asset protection data and the intellectual property rights asset marketability data to produce a virtual intellectual property data packet associated with an intellectual property rights asset, wherein the virtual intellectual property data packet includes at least a portion of the intellectual property rights asset protection data and at least a portion of the intellectual property rights asset marketability data.

41. The method of claim 40, wherein the integrating further comprises mapping between the intellectual property rights asset protection data associated with an intellectual property rights asset and the intellectual property rights asset marketability data associated with the intellectual property rights asset.

42. The method of claim 40, wherein the integrating further comprises mapping between the intellectual property rights asset protection data associated with an intellectual property rights asset stored in the intellectual property rights asset protection database and the intellectual property rights asset marketability data associated with the intellectual property rights asset stored in an intellectual property rights asset marketability database, wherein the intellectual property rights asset protection database and the intellectual property rights asset marketability database are distinct from each other.

43. The method of claim 40, wherein the integrating further comprises mapping, using tagging data, between the intellectual property rights asset protection data associated with an intellectual property rights asset and the intellectual property rights asset marketability data associated with the intellectual property rights asset.

44. The method of claim 40, wherein the integrating further comprises mapping, using tagging data, between the intellectual property rights asset protection data associated with an intellectual property rights asset stored in the intellectual property rights asset protection database and the intellectual property rights asset marketability data associated with the intellectual property rights asset stored in an intellectual property rights asset marketability database, wherein the intellectual property rights asset protection database and the intellectual property rights asset marketability database are distinct from each other and are both indexed by a same key.

45. The method of claim 40, further comprising generating a view of the intellectual property rights asset protection data and the intellectual property rights asset marketability data included in the virtual intellectual property data packet.

46. The method of claim 45, wherein the generating further comprises selecting at least a portion of the intellectual property rights asset protection data and at least a portion of the intellectual property rights asset marketability data included in the virtual intellectual property data packet.

47. The method of claim 40, further comprising generating a view of the intellectual property rights asset protection data and the intellectual property rights asset marketability data included in the virtual intellectual property data packet, the view including a technology embodying the intellectual property rights asset.

48. The method of claim 40, further comprising generating a view of the intellectual property rights asset protection data and the intellectual property rights asset marketability data included in the virtual intellectual property data packet, the view including a type of intellectual property protection.

49. The method of claim 40, further comprising generating a view of the intellectual property rights asset protection data and the intellectual property rights asset marketability data included in the virtual intellectual property data packet, the view including a status of intellectual property protection.

50. The method of claim 39, wherein the integrating further comprises integrating the intellectual property rights asset protection data and the intellectual property rights asset marketability data to produce utilization decision data.

51. The method of claim 39, wherein the integrating further comprises integrating the intellectual property rights asset protection data and the intellectual property rights asset marketability data, including a potential value of the asset, to produce a recommendation to abandon the asset when the potential value is below a threshold.

52. The method of claim 39, wherein the integrating further comprises integrating the intellectual property rights asset protection data, including a maintenance fee schedule, and the intellectual property rights asset marketability data, including a potential value of the asset, to produce a recommendation to not pay a maintenance fee to a patent office for the asset when the potential value is below a threshold.

53. The method of claim 39, wherein the integrating further comprises integrating the intellectual property rights asset protection data and the intellectual property rights asset marketability data, including potential infringer data, to produce a recommendation to file a continuation patent application for the asset when a potential infringer has been identified.

54. The method of claim 39, further comprising:

receiving, by the computer system, the intellectual property rights asset protection data from an external entity; and receiving, by the computer system, the intellectual property rights asset marketability data from an external entity.

55. The method of claim 39, further comprising:

receiving, by the computer system, the intellectual property rights asset protection data from a user; and receiving, by the computer system, the intellectual property rights asset marketability data from a user.

56. The method of claim 39, further comprising:

receiving, by the computer system, the intellectual property rights asset protection data from another computer system; and receiving, by the computer system, the intellectual property rights asset marketability data from another computer system.

57. The method of claim 39, further comprising:

accessing, by the computer system, the intellectual property rights asset protection data; and accessing, by the computer system, the intellectual property rights asset marketability data.

* * * * *